US011656758B2

(12) United States Patent
Chang et al.

(10) Patent No.: US 11,656,758 B2
(45) Date of Patent: May 23, 2023

(54) INTERACTING WITH HANDWRITTEN CONTENT ON AN ELECTRONIC DEVICE

(71) Applicant: Apple Inc., Cupertino, CA (US)

(72) Inventors: Jae Woo Chang, Santa Jose, CA (US); Lee S. Broughton, Santa Cruz, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/031,678

(22) Filed: Sep. 24, 2020

(65) Prior Publication Data

US 2021/0349606 A1 Nov. 11, 2021

Related U.S. Application Data

(60) Provisional application No. 63/041,980, filed on Jun. 21, 2020, provisional application No. 63/023,094, filed on May 11, 2020.

(51) Int. Cl.

| | |
|---|---|
| ***G06F 3/048*** | (2013.01) |
| ***G06F 3/04883*** | (2022.01) |
| ***G06F 3/04842*** | (2022.01) |
| ***G06F 3/0488*** | (2022.01) |
| ***G06F 3/0482*** | (2013.01) |
| ***G06F 3/0354*** | (2013.01) |

(52) U.S. Cl.

CPC ...... *G06F 3/04883* (2013.01); *G06F 3/03545* (2013.01); *G06F 3/0482* (2013.01); *G06F 3/0488* (2013.01); *G06F 3/04842* (2013.01)

(58) Field of Classification Search

CPC .. G06F 3/0482; G06F 3/04842; G06F 3/0488; G06F 3/04883

See application file for complete search history.

(56) References Cited

U.S. PATENT DOCUMENTS

| | | | |
|---|---|---|---|
| 6,323,846 | B1 | 11/2001 | Westerman et al. |
| 6,570,557 | B1 | 5/2003 | Westerman et al. |

(Continued)

FOREIGN PATENT DOCUMENTS

| | | | |
|---|---|---|---|
| JP | 2003-296029 | A | 10/2003 |
| JP | 2012-238295 | A | 12/2012 |

(Continued)

OTHER PUBLICATIONS

International Search Report received for PCT Patent Application No. PCT/US2020/031727, dated Oct. 8, 2020, 10 pages.

(Continued)

*Primary Examiner* — Claudia Dragoescu
(74) *Attorney, Agent, or Firm* — Kubota & Basol LLP

(57) ABSTRACT

In some embodiments, an electronic device selects and provides for interaction with handwritten content in a content entry region. In some embodiments, an electronic device generates normalized shapes based on handwritten inputs. In some embodiments, an electronic device identifies actionable text within handwritten content and updates the identified text to be actionable. In some embodiments, an electronic device presents tutorials for text manipulation operations. In some embodiments, an electronic device displays visual feedback of text manipulation operations. In some embodiments, an electronic device selects units of content.

45 Claims, 175 Drawing Sheets

(56) References Cited

U.S. PATENT DOCUMENTS 6,677,932 B1 1/2004 Westerman
7,614,008 B2 11/2009 Ording
7,633,076 B2 12/2009 Huppi et al.
7,653,883 B2 1/2010 Hotelling et al.
7,657,849 B2 2/2010 Chaudhri et al.
7,663,607 B2 2/2010 Hotelling et al.
7,844,914 B2 11/2010 Andre et al.
7,957,762 B2 6/2011 Herz et al.
8,006,002 B2 8/2011 Kalayjian et al.
8,239,784 B2 8/2012 Hotelling et al.
8,279,180 B2 10/2012 Hotelling et al.
8,381,135 B2 2/2013 Hotelling et al.
8,479,122 B2 7/2013 Hotelling et al.
9,348,458 B2 5/2016 Hotelling et al.
9,933,937 B2 4/2018 Lemay et al.
9,959,037 B2 5/2018 Chaudhri et al.
10,168,899 B1 1/2019 Feiszli et al.
11,429,274 B2 8/2022 Missig et al.
2002/0015024 A1 2/2002 Westerman et al.
2002/0107885 A1 8/2002 Brooks et al.
2003/0071850 A1 4/2003 Geidl
2003/0214539 A1* 11/2003 Iwema .................. G06F 3/0488 715/861
2005/0190059 A1 9/2005 Wehrenberg
2006/0017692 A1 1/2006 Wehrenberg et al.
2006/0033724 A1 2/2006 Chaudhri et al.
2006/0071910 A1 4/2006 Kim et al.
2006/0197753 A1 9/2006 Hotelling
2009/0161958 A1 6/2009 Markiewicz et al.
2010/0107099 A1* 4/2010 Frazier .................. G06F 3/0481 715/765
2010/0293460 A1* 11/2010 Budelli ............... G06F 3/04883 715/702
2012/0032925 A1 2/2012 Sekiya
2012/0229471 A1 9/2012 Takai
2013/0046544 A1* 2/2013 Kay .................... G06F 16/3322 704/275
2014/0019855 A1 1/2014 Kim et al.
2014/0108004 A1 4/2014 Sternby et al.
2014/0108976 A1 4/2014 Steiner et al.
2014/0194162 A1 7/2014 Tsudik
2014/0219564 A1 8/2014 Demiya
2015/0058718 A1 2/2015 Kim et al.
2015/0082217 A1* 3/2015 Tumwattana ....... G06F 3/04883 715/769
2015/0205398 A1 7/2015 Le
2015/0221106 A1 8/2015 Winnemoeller et al.
2016/0349897 A1 12/2016 Ishikawa
2017/0091153 A1* 3/2017 Thimbleby ........ G06K 9/00402
2017/0109032 A1 4/2017 Mélinand et al.
2018/0121074 A1 5/2018 Peron et al.
2018/0129391 A1* 5/2018 Files ..................... G06F 40/171
2018/0335932 A1 11/2018 Ta
2020/0356254 A1 11/2020 Missig et al.
2020/0401796 A1 12/2020 Chateigner
2021/0349627 A1 11/2021 Chang et al.
2022/0197493 A1 6/2022 Missig et al.

FOREIGN PATENT DOCUMENTS

JP 2015-049901 A 3/2015
TW 201112040 A 4/2011
WO 2010/119603 A1 10/2010
WO 2013/169849 A2 11/2013
WO 2014/105276 A1 7/2014
WO 2016/200586 A1 12/2016
WO 2020/227445 A1 11/2020

OTHER PUBLICATIONS

Non-Final Office Action received for U.S. Appl. No. 16/868,449, dated May 26, 2021, 30 pages.
Notice of Allowance received for U.S. Appl. No. 16/868,449, dated Nov. 3, 2021, 8 pages.
Non-Final Office Action received for U.S. Appl. No. 17/031,844, dated Dec. 3, 2021, 29 pages.
Notice of Allowance received for U.S. Appl. No. 16/868,449, dated Apr. 14, 2022, 8 Pages.
Final Office Action received for U.S. Appl. No. 17/031,844, dated Aug. 8, 2022, 33 Pages.
Hou et al., “An Algorithm of Calligraphy Beautification Based on Improved Velocity and Width Model”, Computer Engineering, and Social Media (CSCESM), 2015 Second International Conference on Computer Science, 2015, 4 Pages.
International Search Report received for PCT Patent Application No. PCT/US2021/031866, dated Nov. 8, 2021, 7 pages.
Adak et al., “Extraction of Doodles and Drawings from Manuscripts”, ICIAP, 17th International Conference, Naples, Italy, Dec. 10, 2013, pp. 515-520.
Fosseide et al., “Character Recognition in the Presence of Occluding Clutter”, Proceedings of SPIE, vol. 7247, Jan. 18, 2009, p. 724701.

* cited by examiner

Figure 7A:
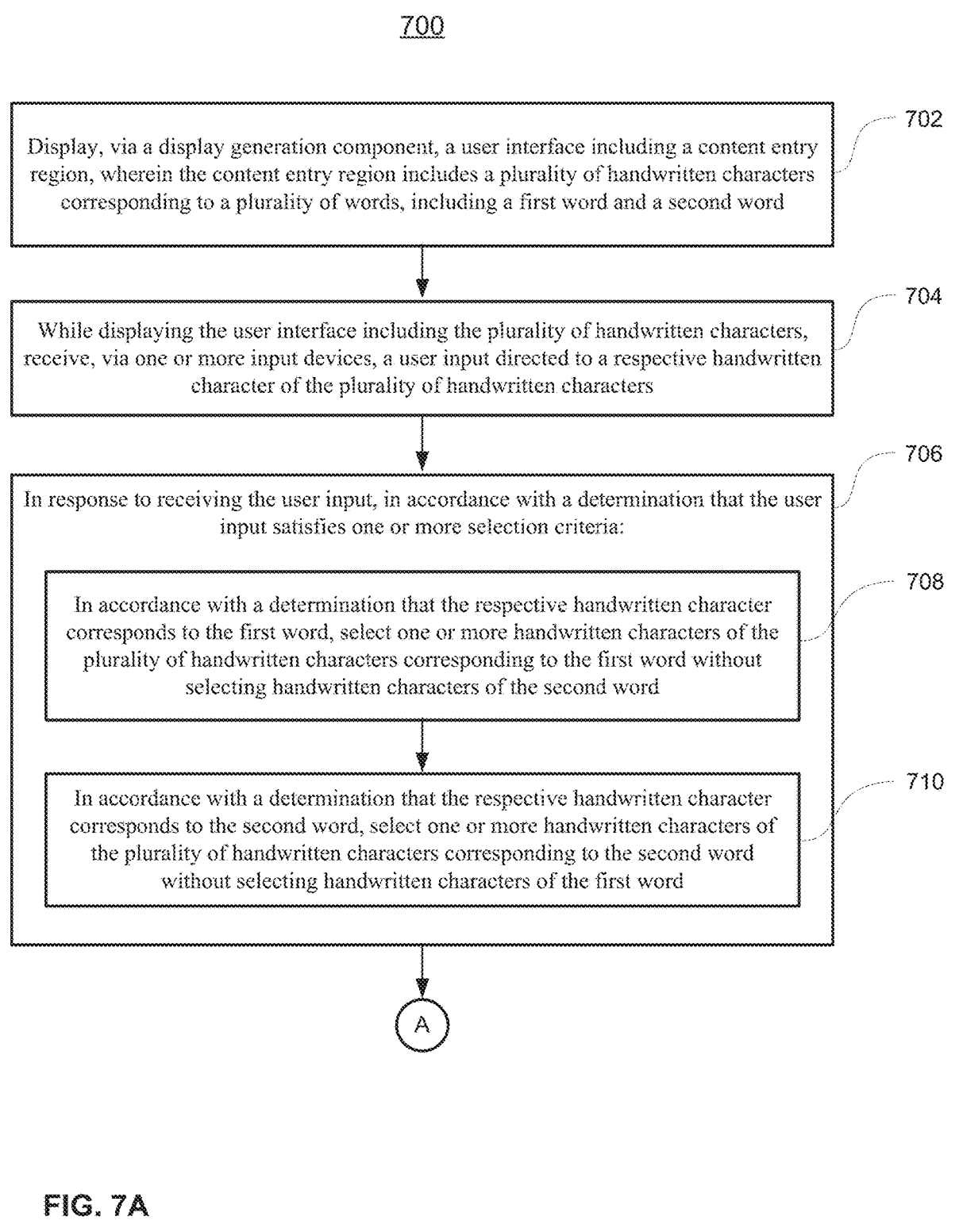

700

702 Display, via a display generation component, a user interface including a content entry region, wherein the content entry region includes a plurality of handwritten characters corresponding to a plurality of words, including a first word and a second word 704 While displaying the user interface including the plurality of handwritten characters, receive, via one or more input devices, a user input directed to a respective handwritten character of the plurality of handwritten characters 706 In response to receiving the user input, in accordance with a determination that the user input satisfies one or more selection criteria:

708 In accordance with a determination that the respective handwritten character corresponds to the first word, select one or more handwritten characters of the plurality of handwritten characters corresponding to the first word without selecting handwritten characters of the second word 710 In accordance with a determination that the respective handwritten character corresponds to the second word, select one or more handwritten characters of the plurality of handwritten characters corresponding to the second word without selecting handwritten characters of the first word

Figure 7D:
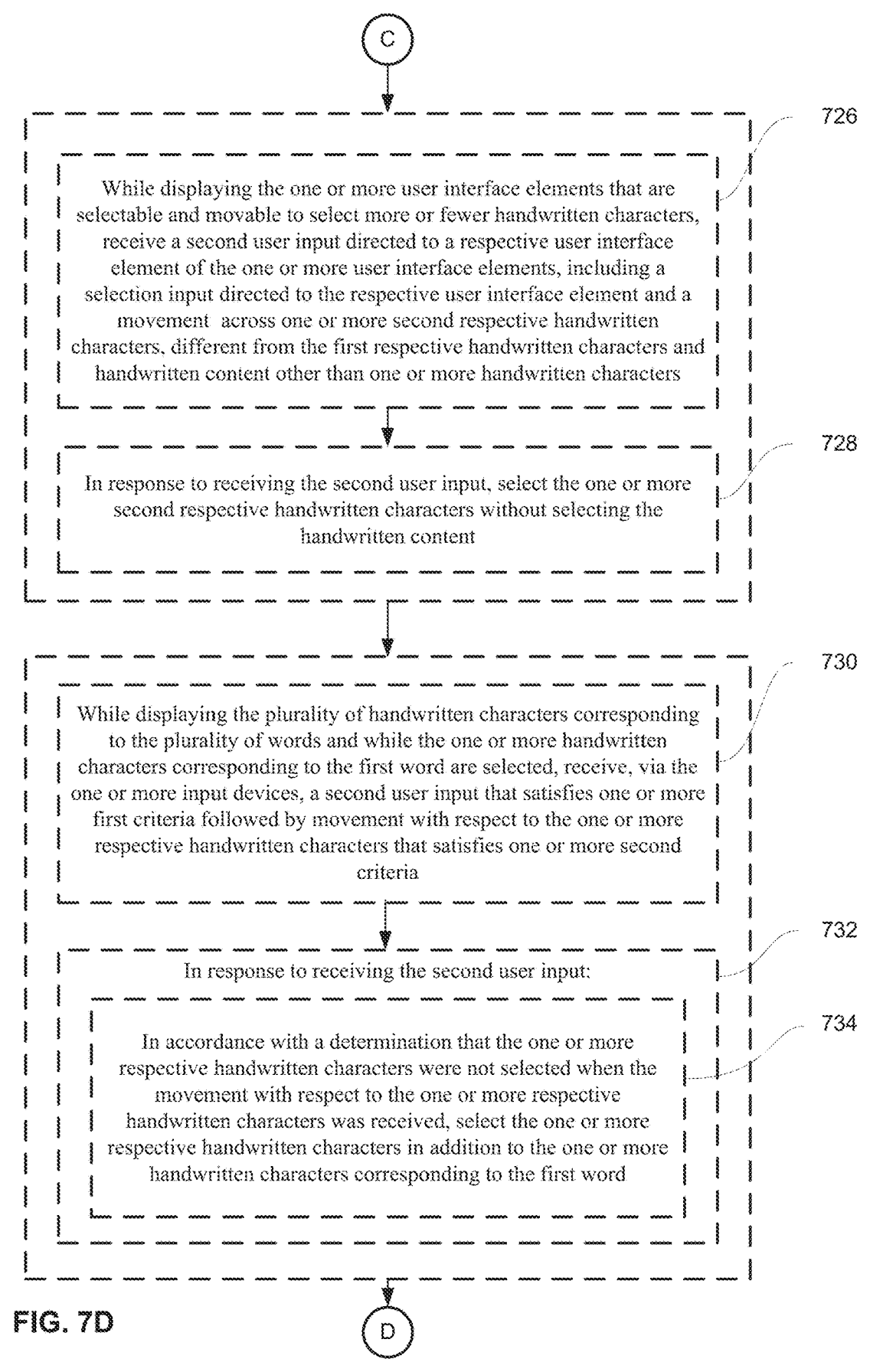

While displaying the one or more user interface elements that are selectable and movable to select more or fewer handwritten characters, receive a second user input directed to a respective user interface element of the one or more user interface elements, including a selection input directed to the respective user interface element and a movement across one or more second respective handwritten characters, different from the first respective handwritten characters and handwritten content other than one or more handwritten characters

728

In response to receiving the second user input, select the one or more second respective handwritten characters without selecting the handwritten content

730

While displaying the plurality of handwritten characters corresponding to the plurality of words and while the one or more handwritten characters corresponding to the first word are selected, receive, via the one or more input devices, a second user input that satisfies one or more first criteria followed by movement with respect to the one or more respective handwritten characters that satisfies one or more second criteria

732

In response to receiving the second user input:

734

In accordance with a determination that the one or more respective handwritten characters were not selected when the movement with respect to the one or more respective handwritten characters was received, select the one or more respective handwritten characters in addition to the one or more handwritten characters corresponding to the first word

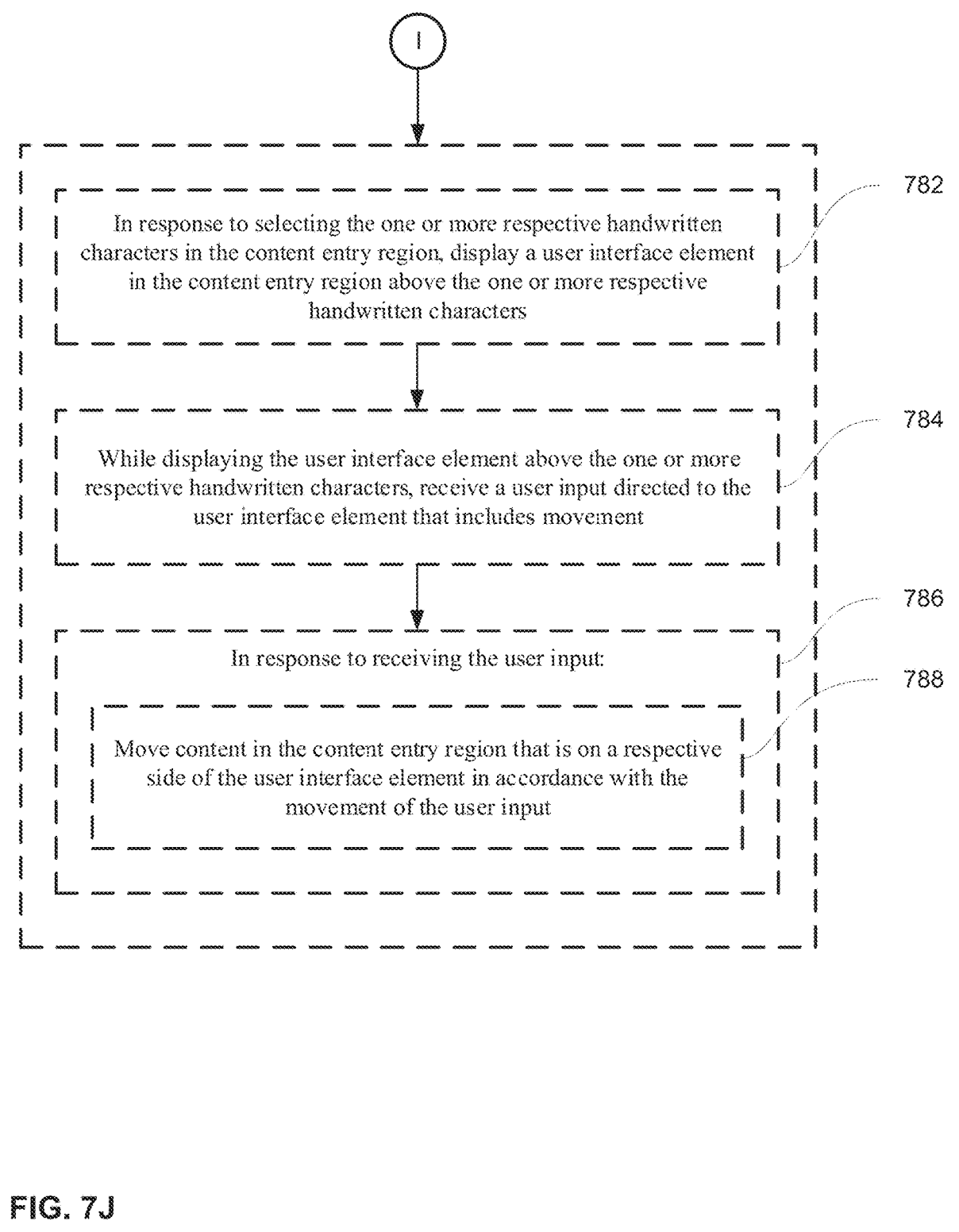

782 In response to selecting the one or more respective handwritten characters in the content entry region, display a user interface element in the content entry region above the one or more respective handwritten characters 784 While displaying the user interface element above the one or more respective handwritten characters, receive a user input directed to the user interface element that includes movement 786 In response to receiving the user input:

788 Move content in the content entry region that is on a respective side of the user interface element in accordance with the movement of the user input

FIG. 7J

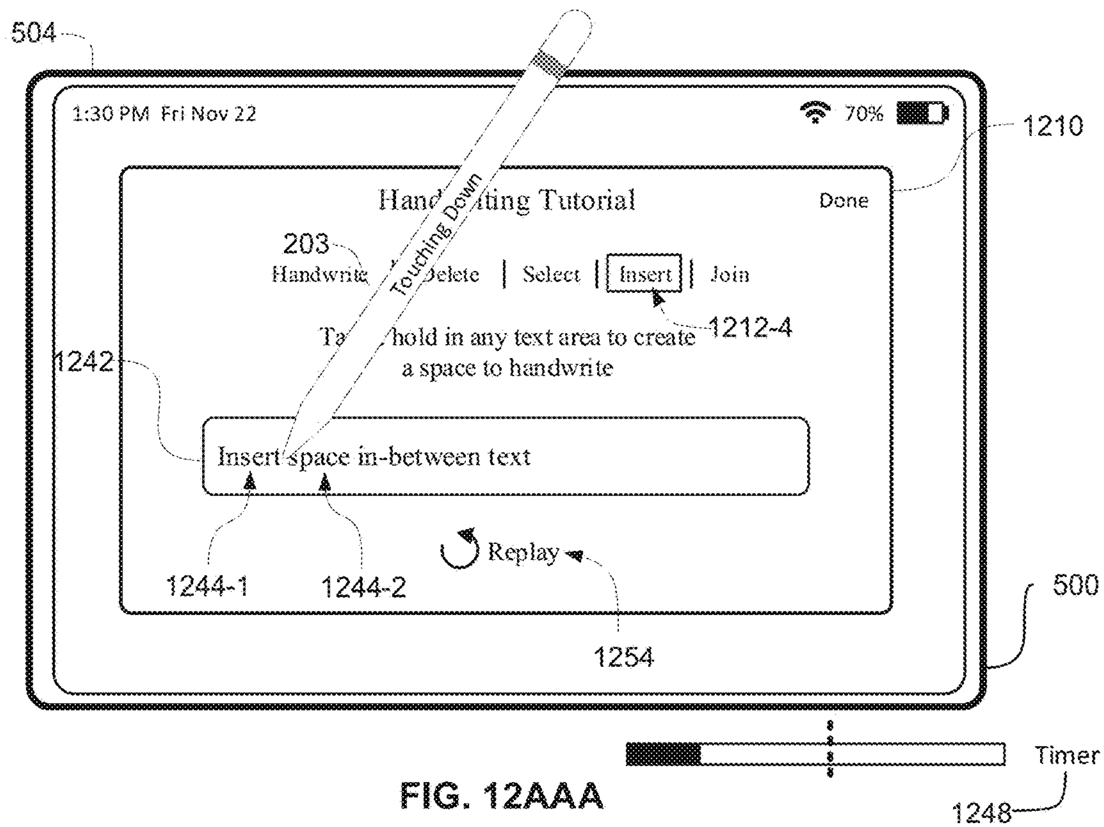
FIG. 12AAA
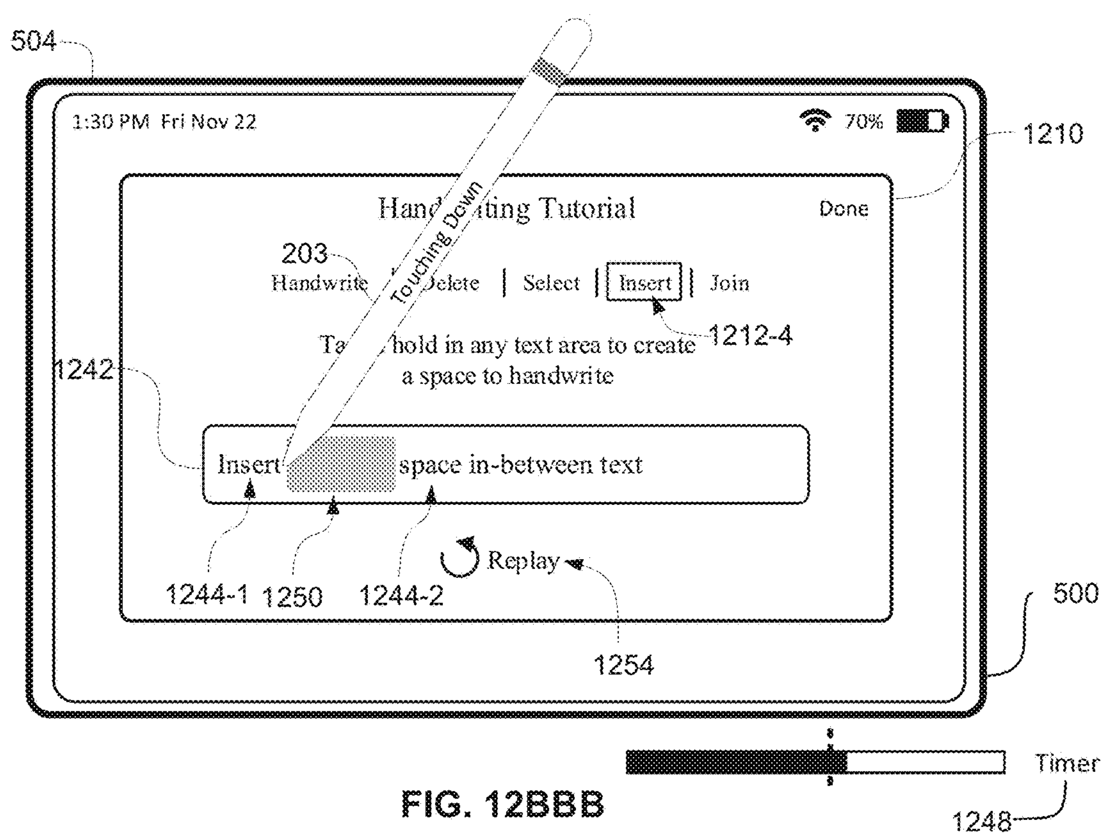
FIG. 12BBB

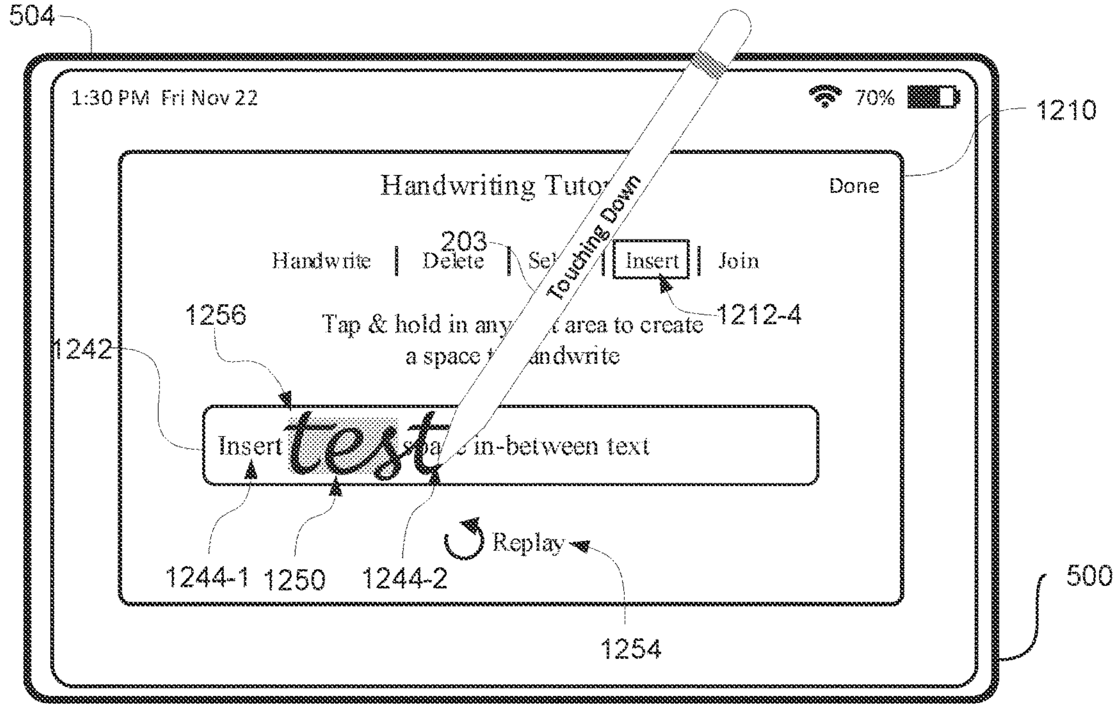
FIG. 12CCC
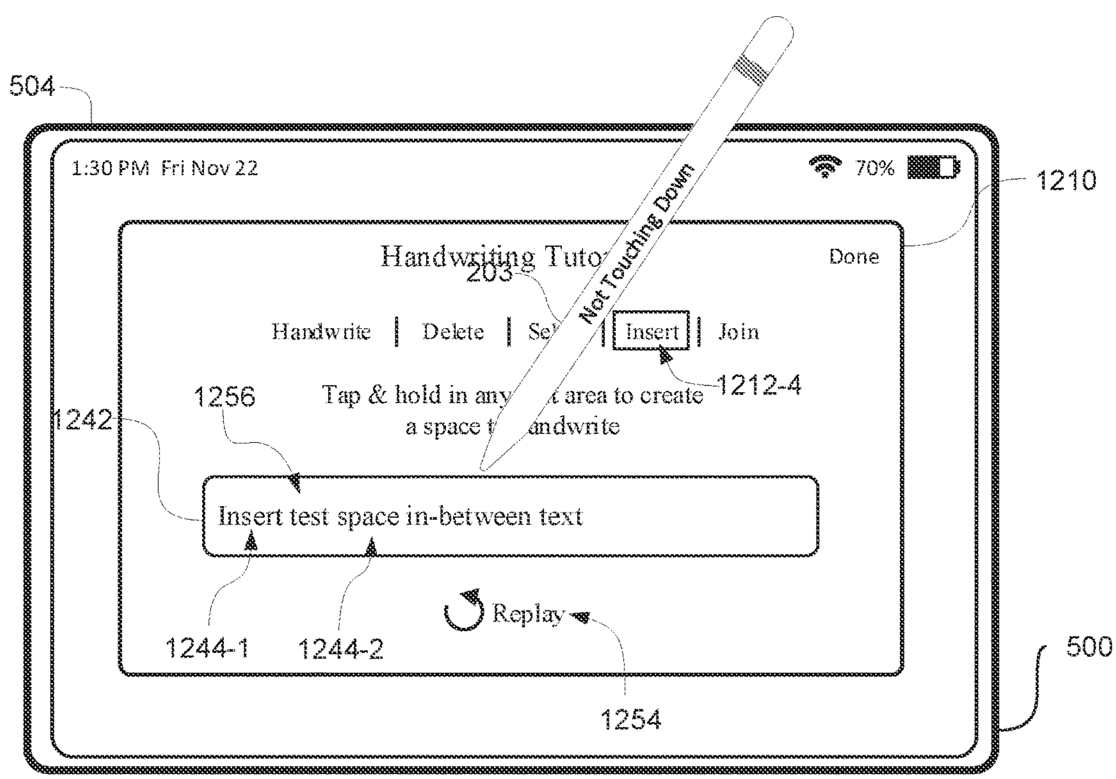
FIG. 12DDD

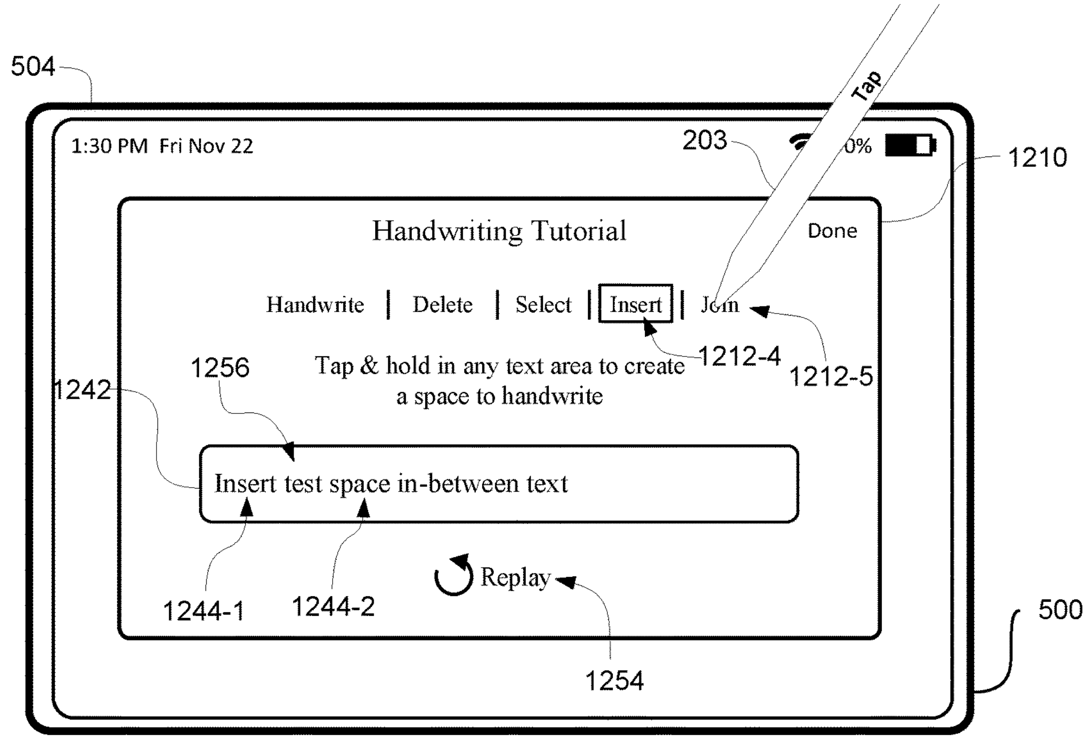
FIG. 12EEE
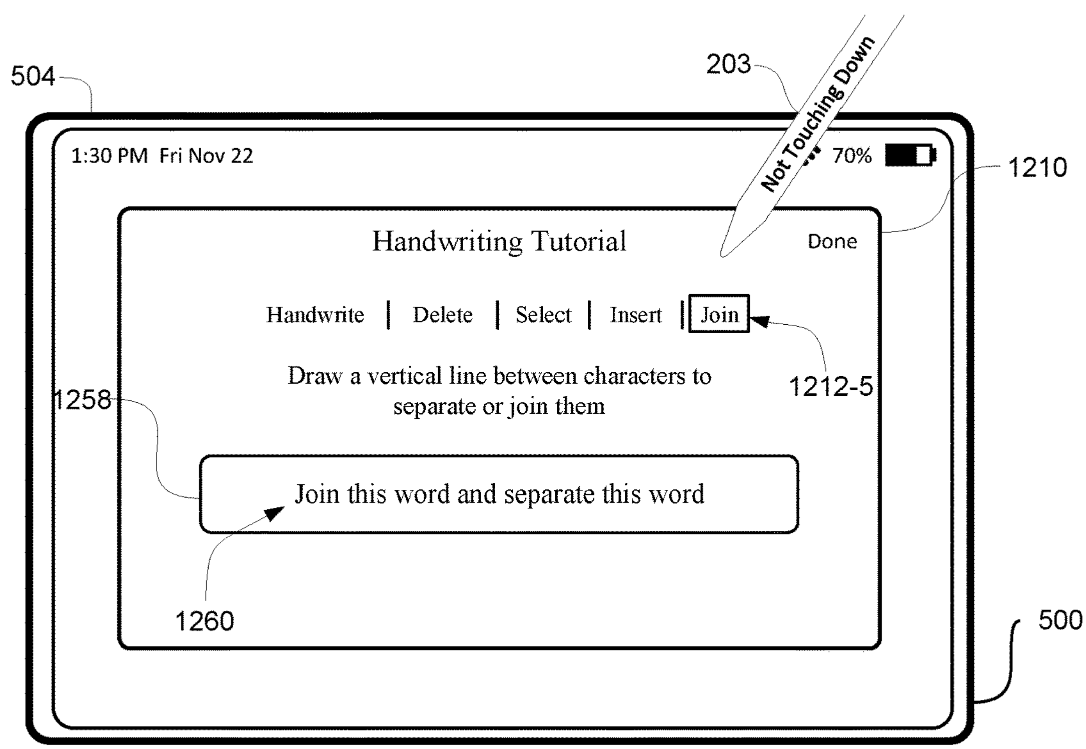
FIG. 12FFF

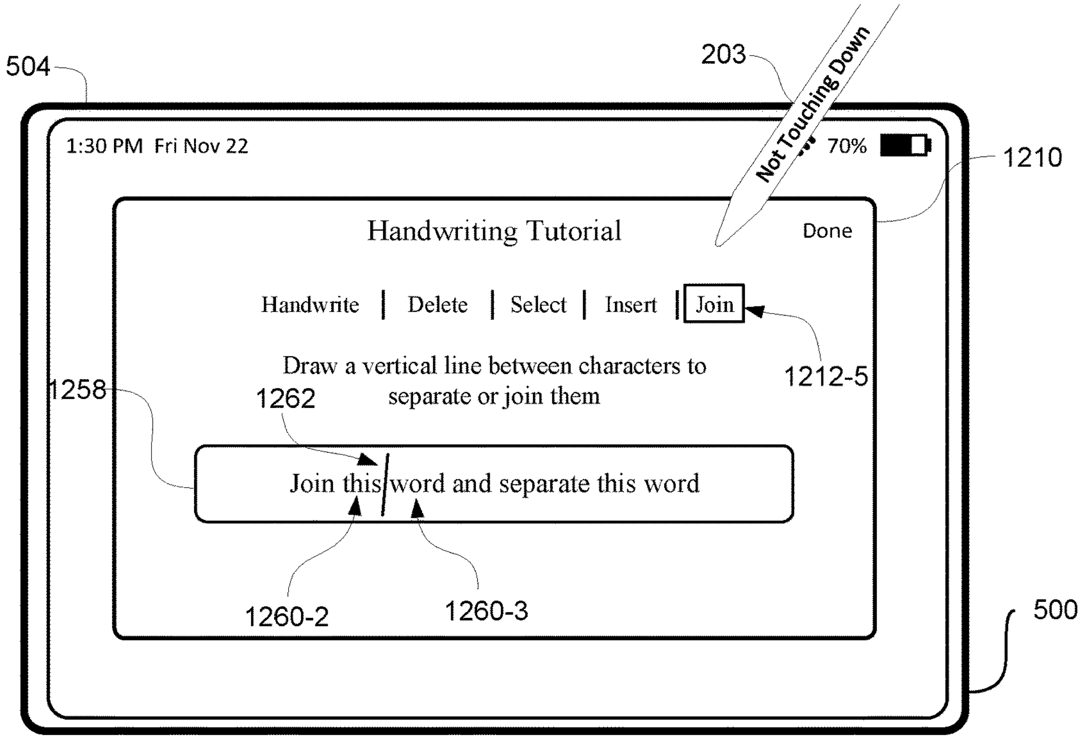
FIG. 12GGG
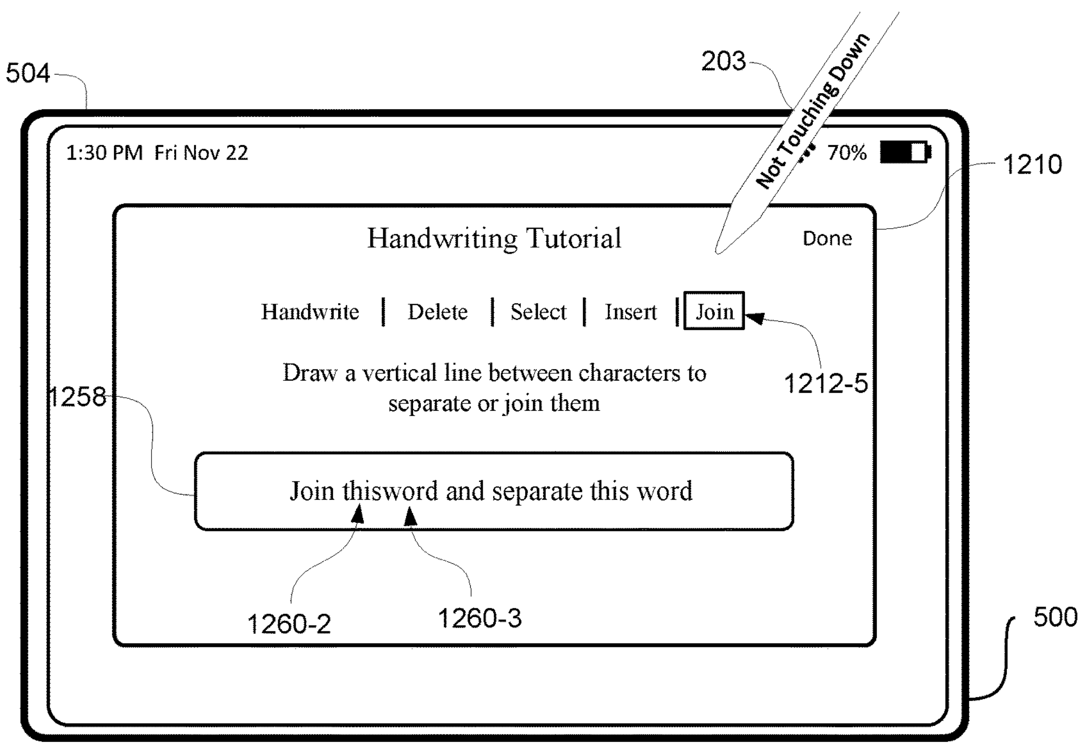
FIG. 12HHH

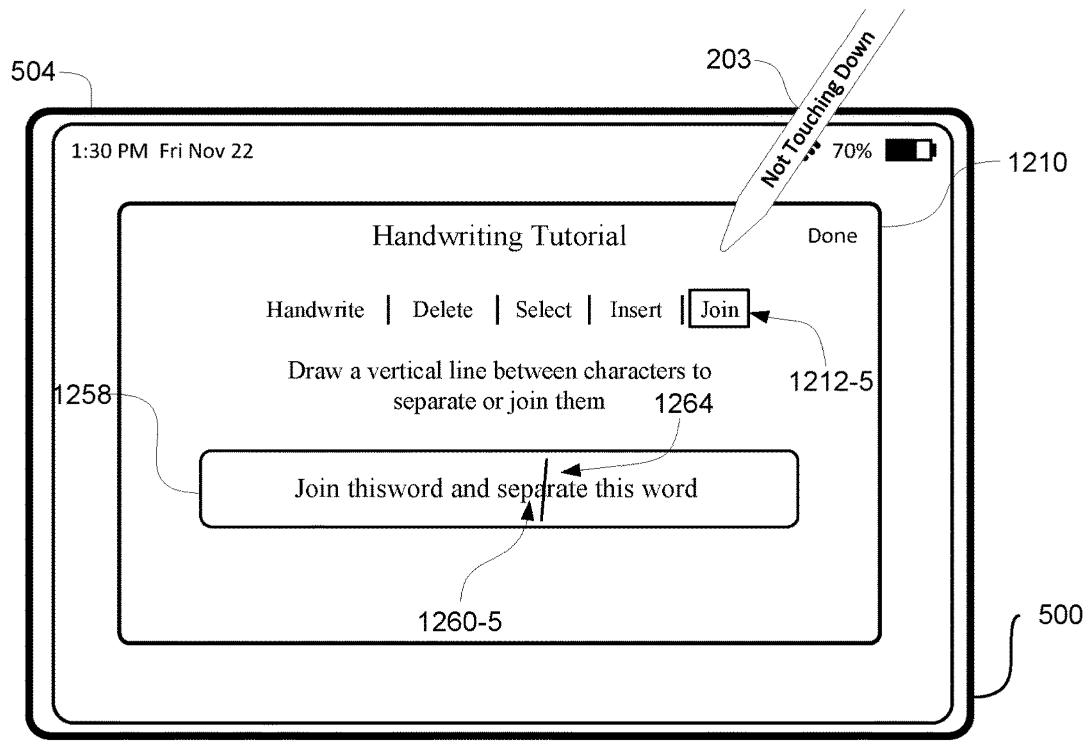
FIG. 12III
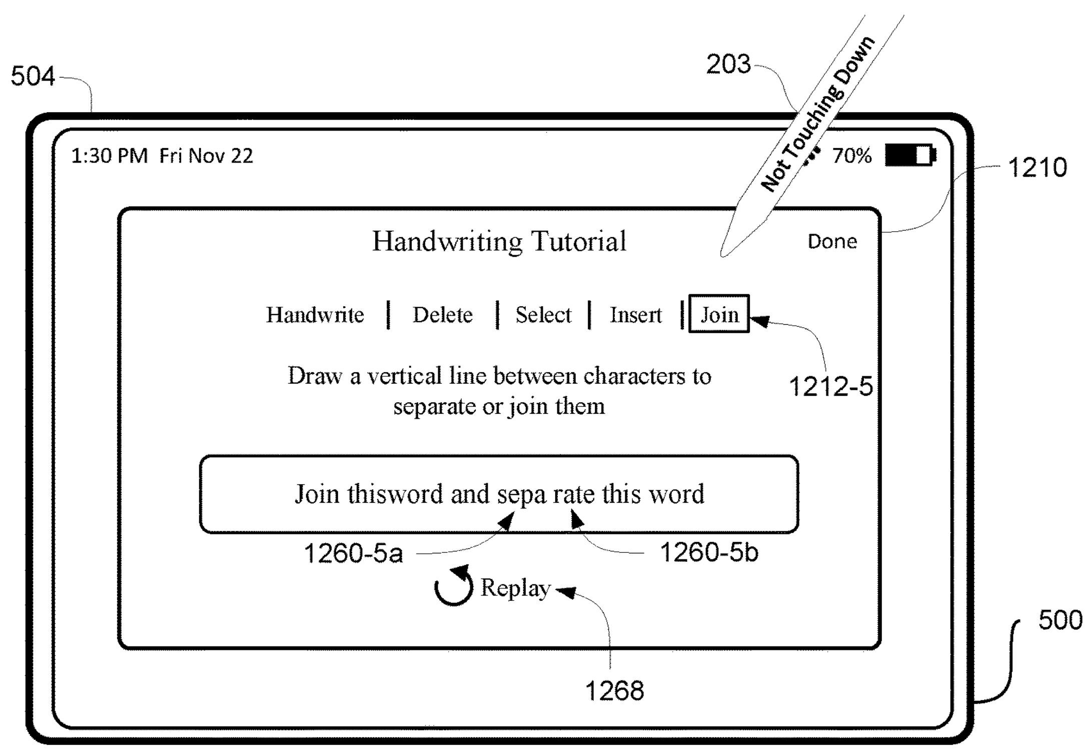
FIG. 12JJJ

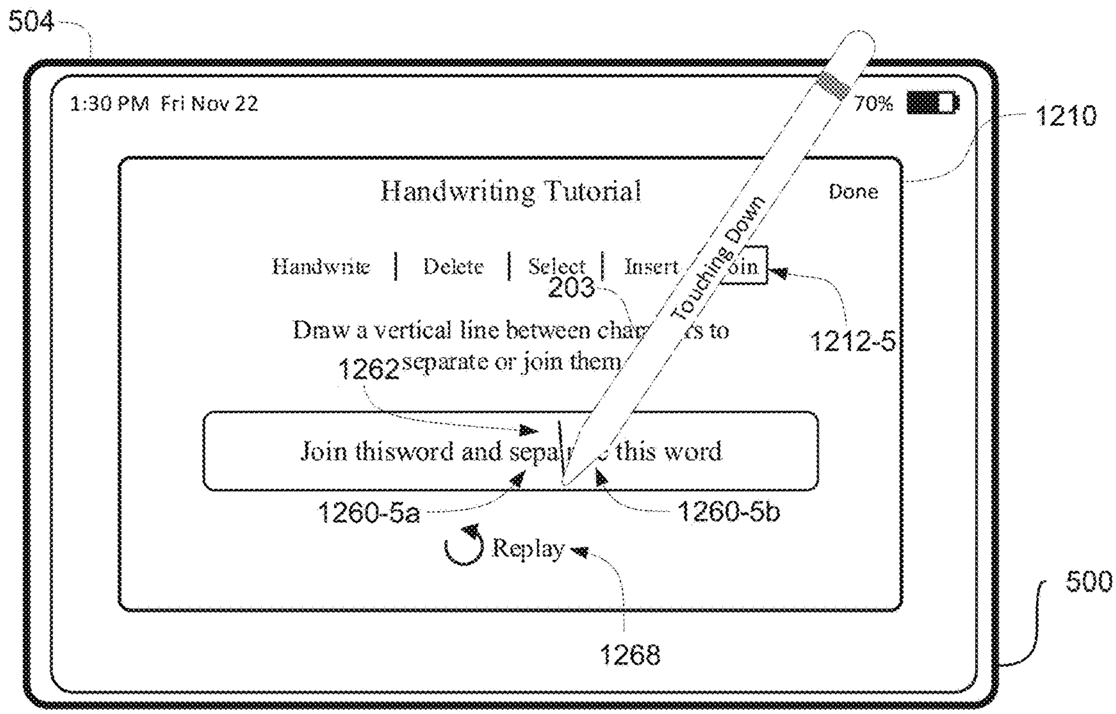
FIG. 12KKK
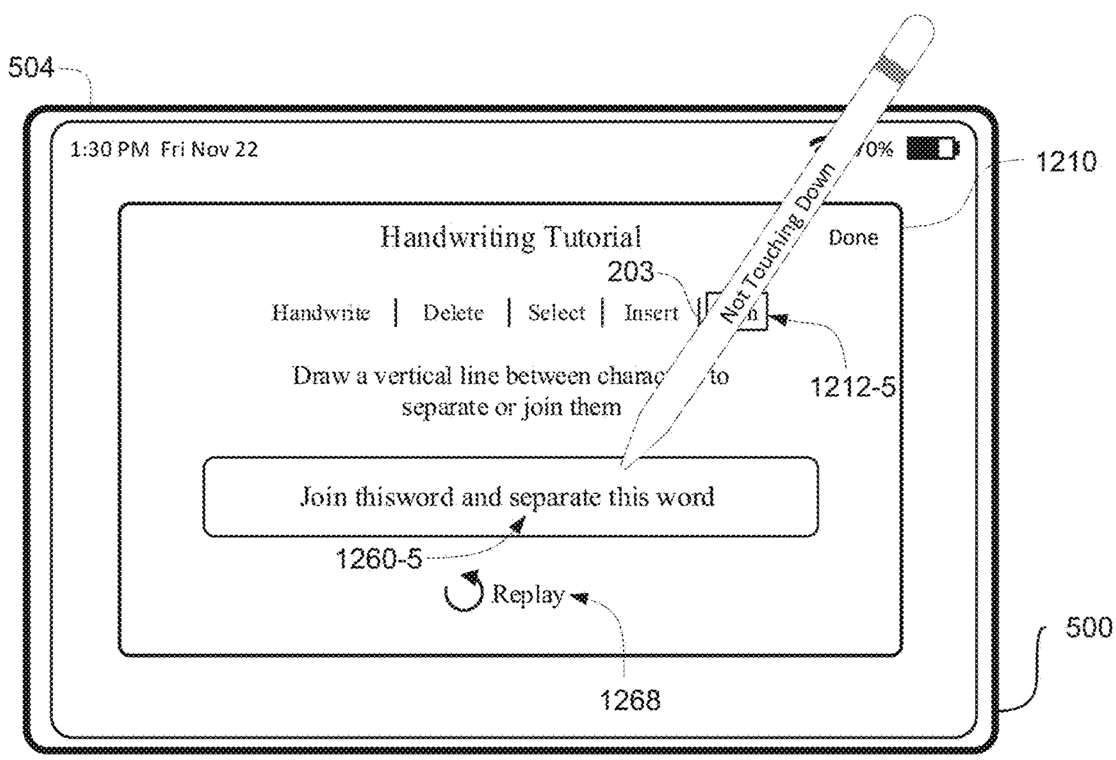
FIG. 12LLL

Figure 15A:
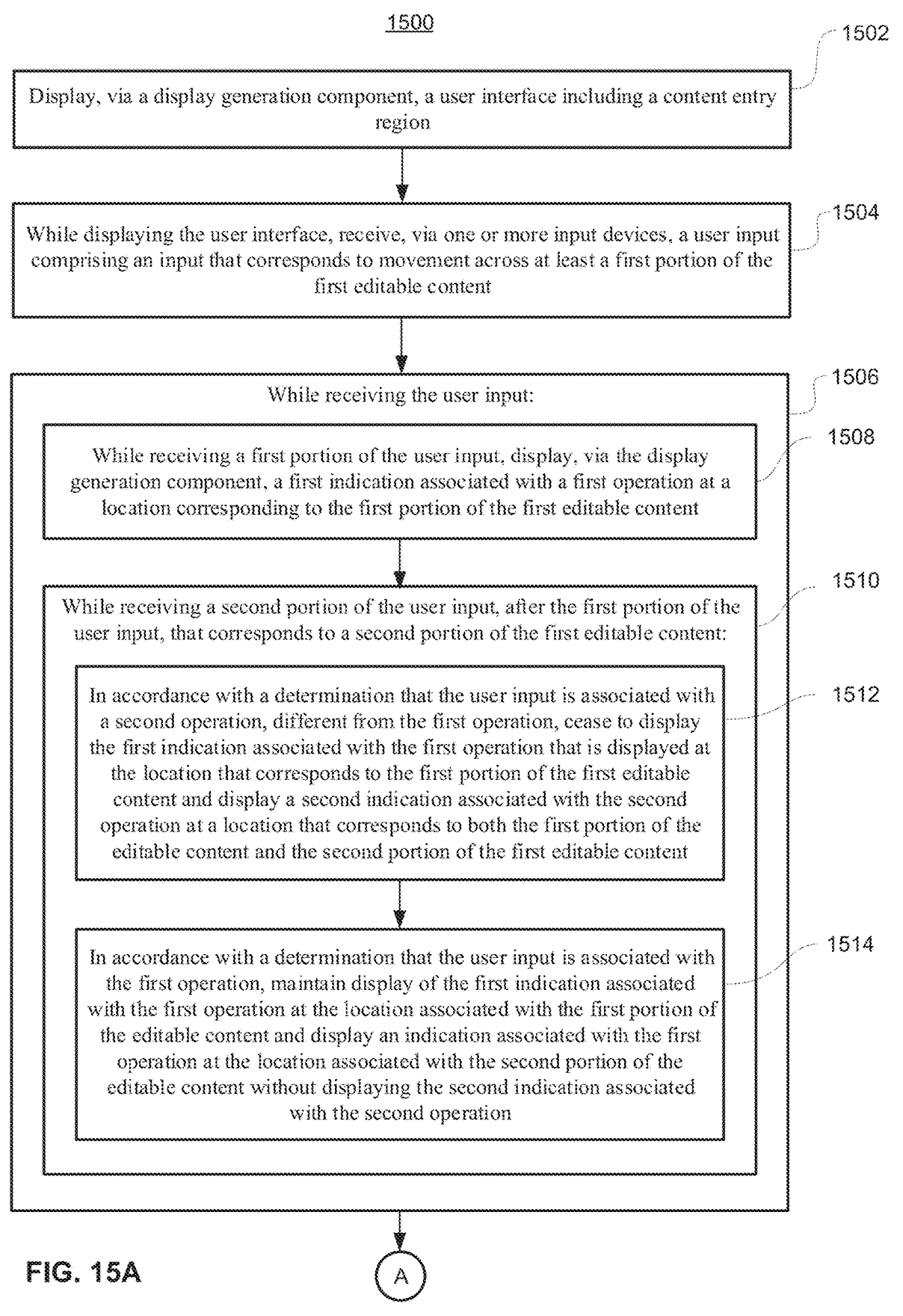

1500

1502: Display, via a display generation component, a user interface including a content entry region 1504: While displaying the user interface, receive, via one or more input devices, a user input comprising an input that corresponds to movement across at least a first portion of the first editable content 1506: While receiving the user input:

1508: While receiving a first portion of the user input, display, via the display generation component, a first indication associated with a first operation at a location corresponding to the first portion of the first editable content 1510: While receiving a second portion of the user input, after the first portion of the user input, that corresponds to a second portion of the first editable content:

1512: In accordance with a determination that the user input is associated with a second operation, different from the first operation, cease to display the first indication associated with the first operation that is displayed at the location that corresponds to the first portion of the first editable content and display a second indication associated with the second operation at a location that corresponds to both the first portion of the editable content and the second portion of the first editable content 1514: In accordance with a determination that the user input is associated with the first operation, maintain display of the first indication associated with the first operation at the location associated with the first portion of the editable content and display an indication associated with the first operation at the location associated with the second portion of the editable content without displaying the second indication associated with the second operation

Figure 17E:
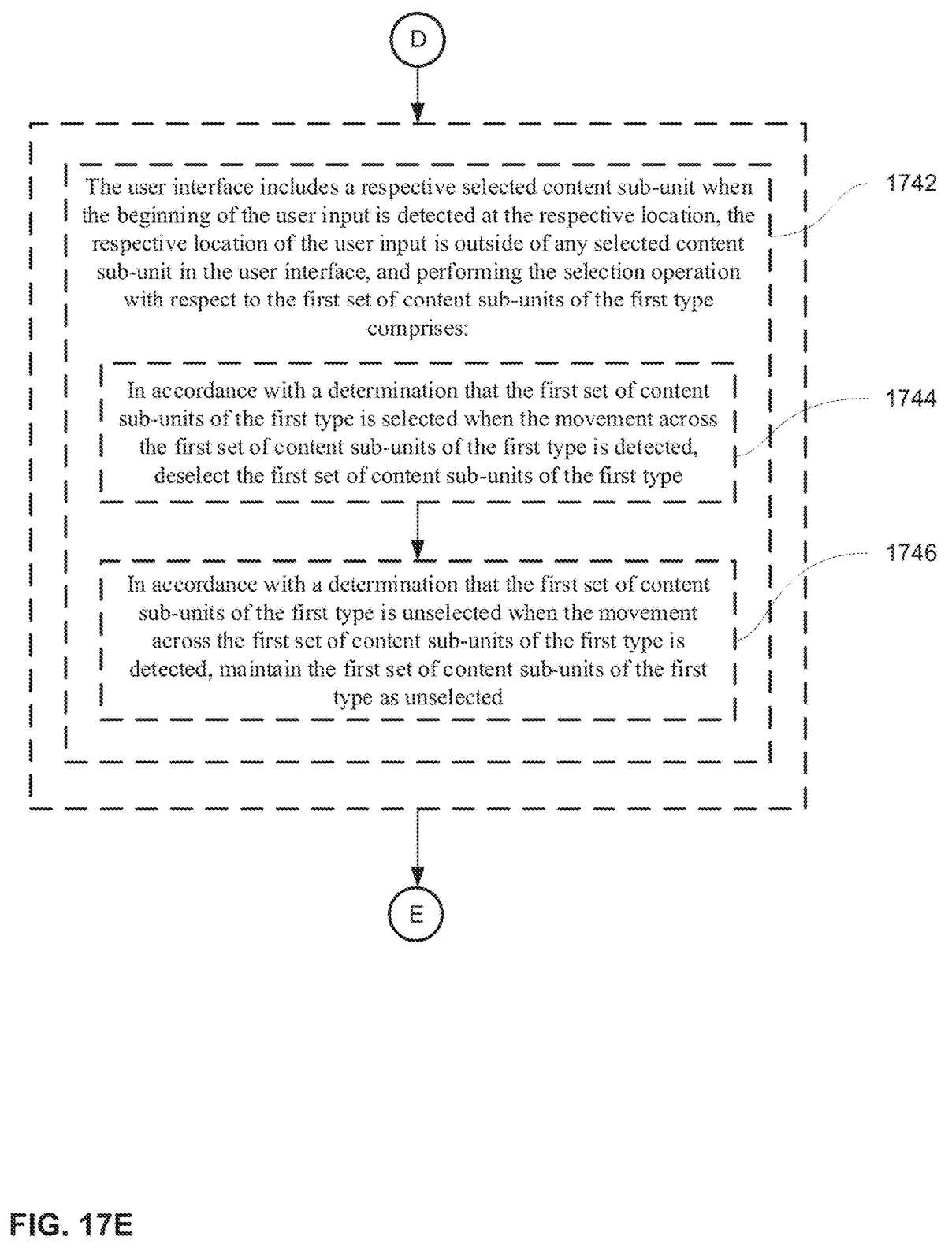

The user interface includes a respective selected content sub-unit when the beginning of the user input is detected at the respective location, the respective location of the user input is outside of any selected content sub-unit in the user interface, and performing the selection operation with respect to the first set of content sub-units of the first type comprises: 1742

In accordance with a determination that the first set of content sub-units of the first type is selected when the movement across the first set of content sub-units of the first type is detected, deselect the first set of content sub-units of the first type 1744

In accordance with a determination that the first set of content sub-units of the first type is unselected when the movement across the first set of content sub-units of the first type is detected, maintain the first set of content sub-units of the first type as unselected 1746

INTERACTING WITH HANDWRITTEN CONTENT ON AN ELECTRONIC DEVICE

CROSS REFERENCE TO RELATED APPLICATIONS

This application claims the benefit of U.S. Provisional Patent Application No. 63/023,094, filed May 11, 2020, and U.S. Provisional Patent Application No. 63/041,980, filed Jun. 21, 2020, the contents of which are hereby incorporated by reference in their entireties for all purposes.

FIELD OF THE DISCLOSURE

This relates generally to electronic devices that display handwritten content, and user interactions with such devices.

BACKGROUND

User interaction with electronic devices has increased significantly in recent years. These devices can be devices such as computers, tablet computers, televisions, multimedia devices, mobile devices, and the like.

In some circumstances, users wish to insert handwritten content on an electronic device or otherwise interact with an electronic device with a stylus. In some circumstances, users wish to select or otherwise interact with previously written handwritten text. In some circumstances, users desire to insert well-formed shapes or actionable text. In some circumstances, users with to view tutorials of text manipulation operations. Enhancing these interactions improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

SUMMARY

Some embodiments described in this disclosure are directed to selecting handwritten content in a content entry region. Some embodiments described in this disclosure are directed to generating normalized shapes based on handwritten inputs. Some embodiments of the disclosure are directed to identifying actionable text within handwritten content and updating the identified text to be actionable. Some embodiments of the disclosure are directed to presenting tutorials for text manipulation operations. Some embodiments of the disclosure are directed to displaying visual feedback of text manipulation operations. Some embodiments of the disclosure are directed to selecting units of content.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 7A-7J are flow diagrams illustrating a method of selecting and providing for interaction with handwritten content in accordance with some embodiments.

FIGS. 15A-15E are flow diagrams illustrating a method of displaying visual feedback of text manipulation operations in accordance with some embodiments.

FIGS. 17A-17I are flow diagrams illustrating a method of selecting units of content in accordance with some embodiments.

DETAILED DESCRIPTION

Figure 1A:
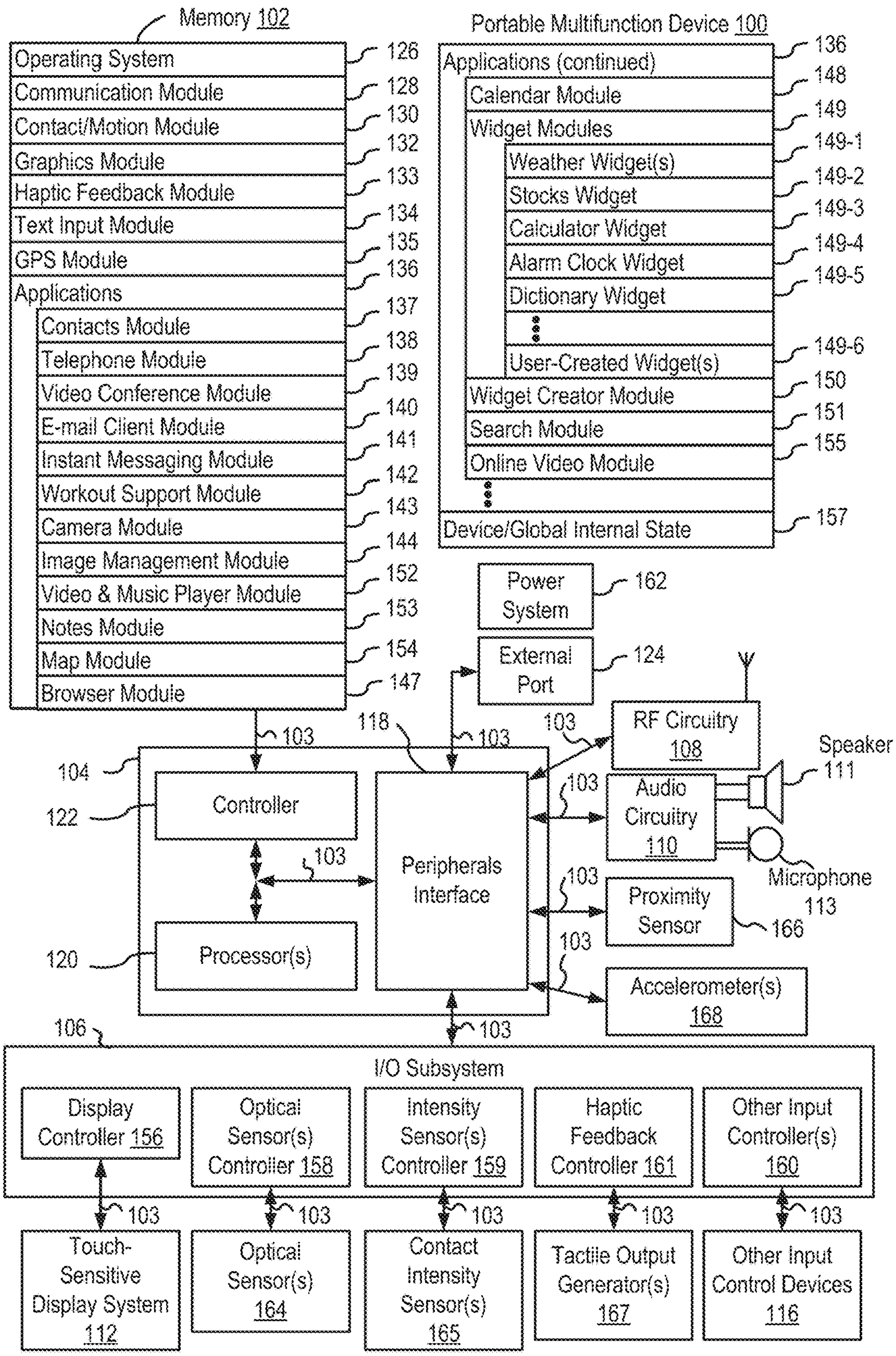
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods for receiving and interpreting handwritten inputs (e.g., from a stylus or other handwriting input device). Such techniques can reduce the cognitive burden on a user who uses such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker

111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, device 100 is a portable computing system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system (e.g., an integrated display, touch screen 112, etc.). In some embodiments, the display generation component is separate from the computer system (e.g., an external monitor, a projection system, etc.). As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions)

Figure 3:
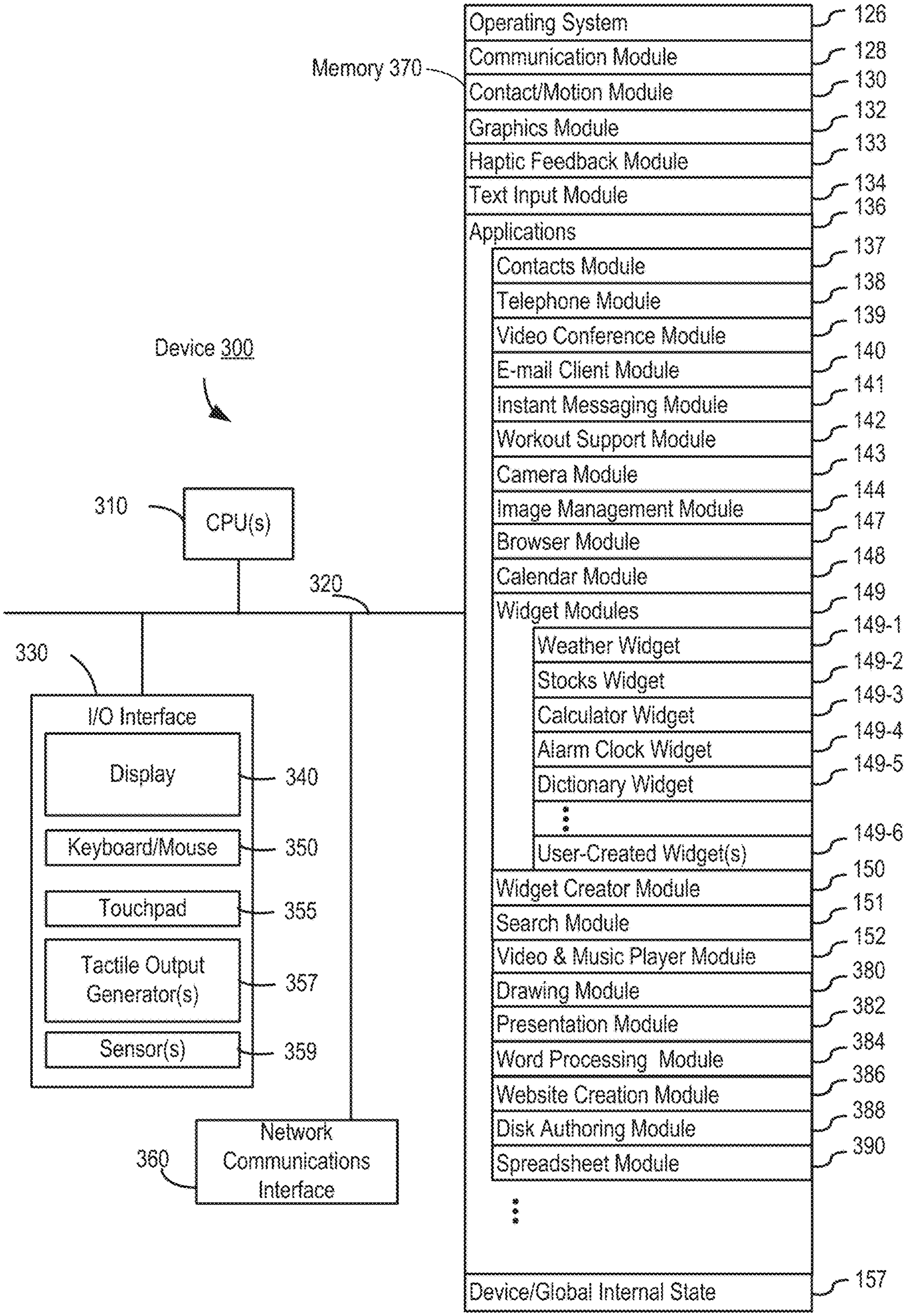
FIG. 3 is a block diagram of an exemplary multifunction device with a display and a touch-sensitive surface in accordance with some embodiments.

134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;

- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
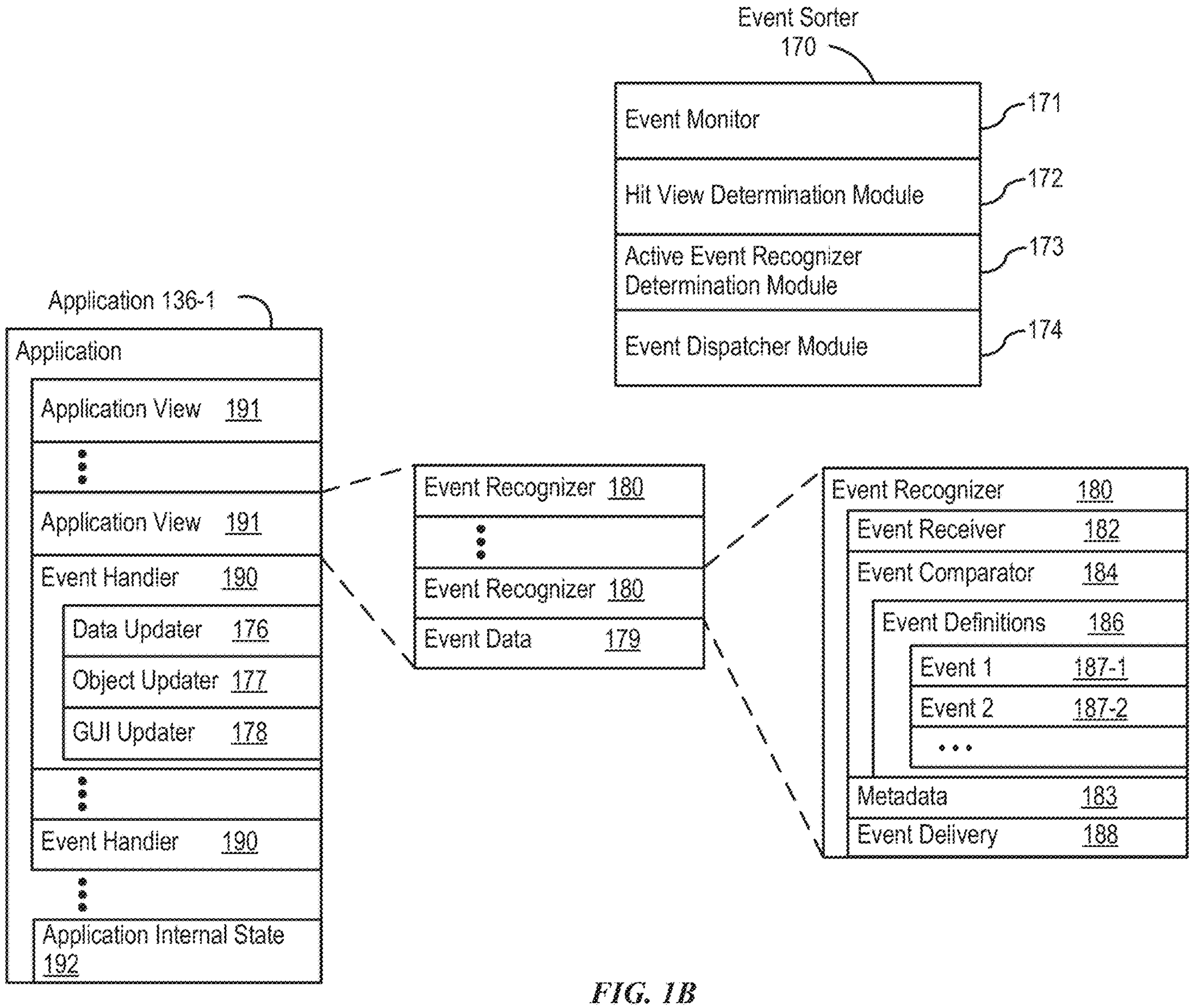
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
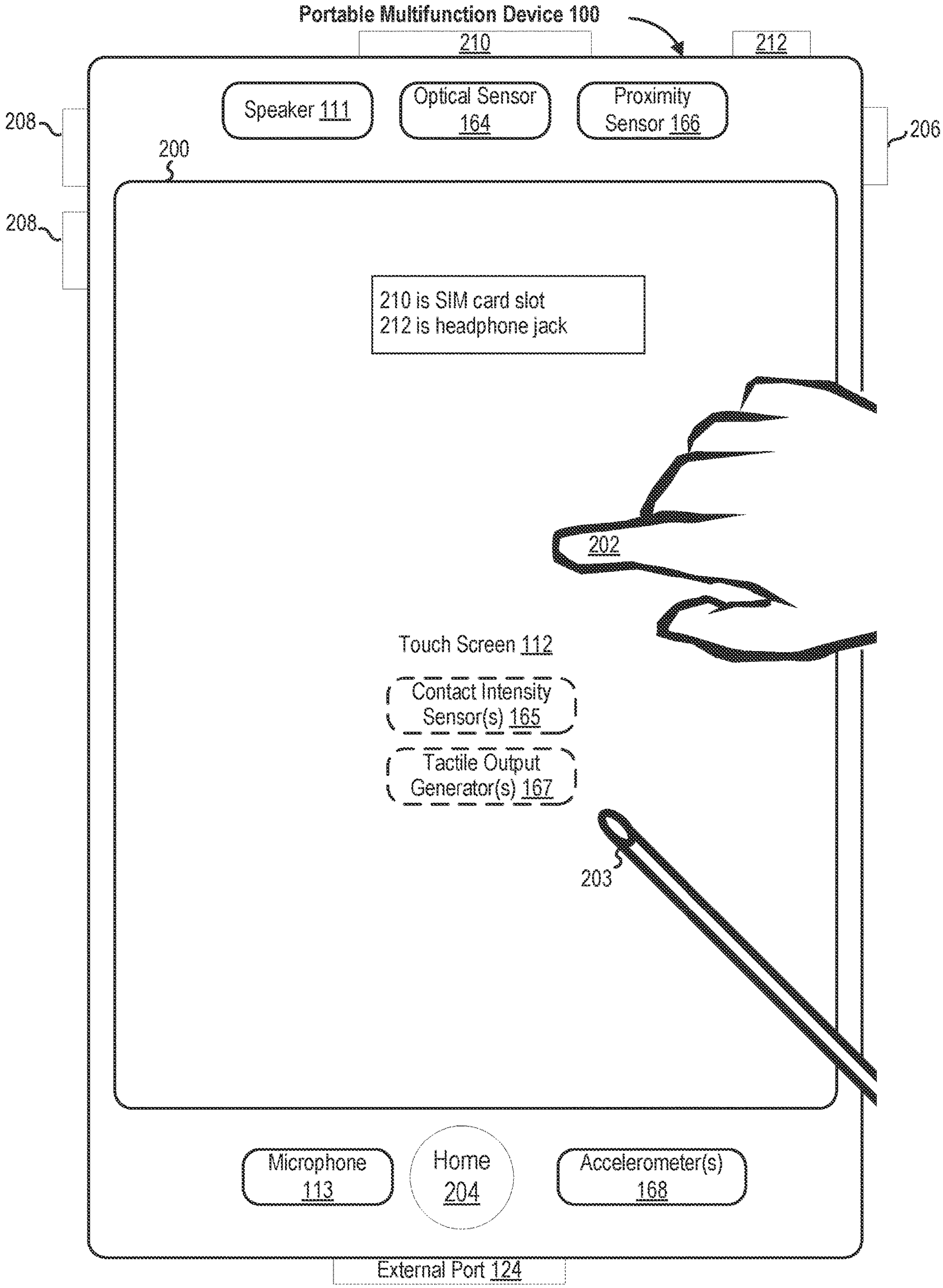
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

In some embodiments, stylus 203 is an active device and includes one or more electronic circuitry. For example, stylus 203 includes one or more sensors, and one or more communication circuitry (such as communication module 128 and/or RF circuitry 108). In some embodiments, stylus 203 includes one or more processors and power systems (e.g., similar to power system 162). In some embodiments, stylus 203 includes an accelerometer (such as accelerometer 168), magnetometer, and/or gyroscope that is able to determine the position, angle, location, and/or other physical characteristics of stylus 203 (e.g., such as whether the stylus is placed down, angled toward or away from a device, and/or near or far from a device). In some embodiments, stylus 203 is in communication with an electronic device (e.g., via communication circuitry, over a wireless communication protocol such as Bluetooth) and transmits sensor data to the electronic device. In some embodiments, stylus 203 is able to determine (e.g., via the accelerometer or other sensors) whether the user is holding the device. In some embodiments, stylus 203 can accept tap inputs (e.g., single tap or double tap) on stylus 203 (e.g., received by the accelerometer or other sensors) from the user and interpret the input as a command or request to perform a function or change to a different input mode.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
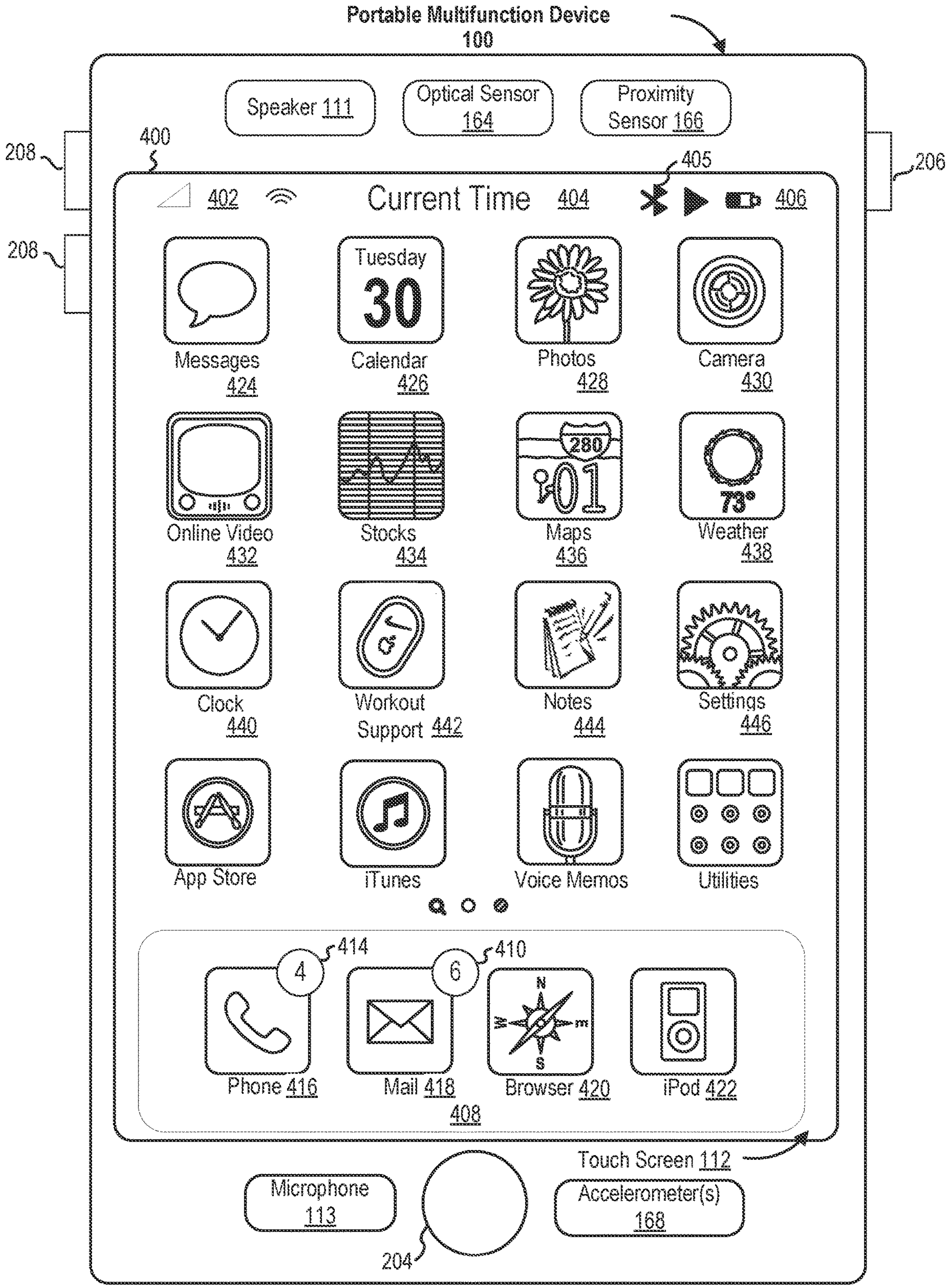
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
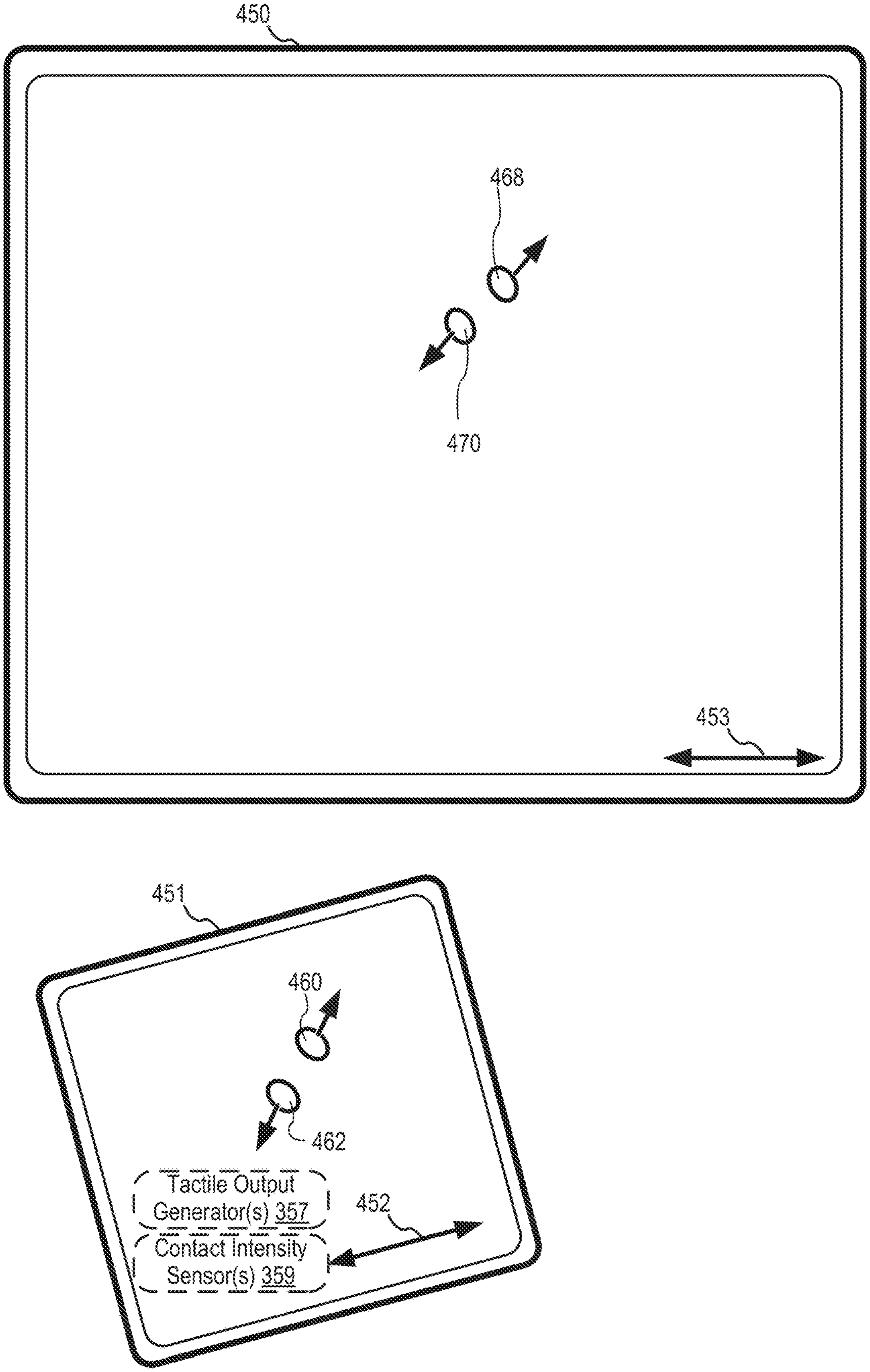
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
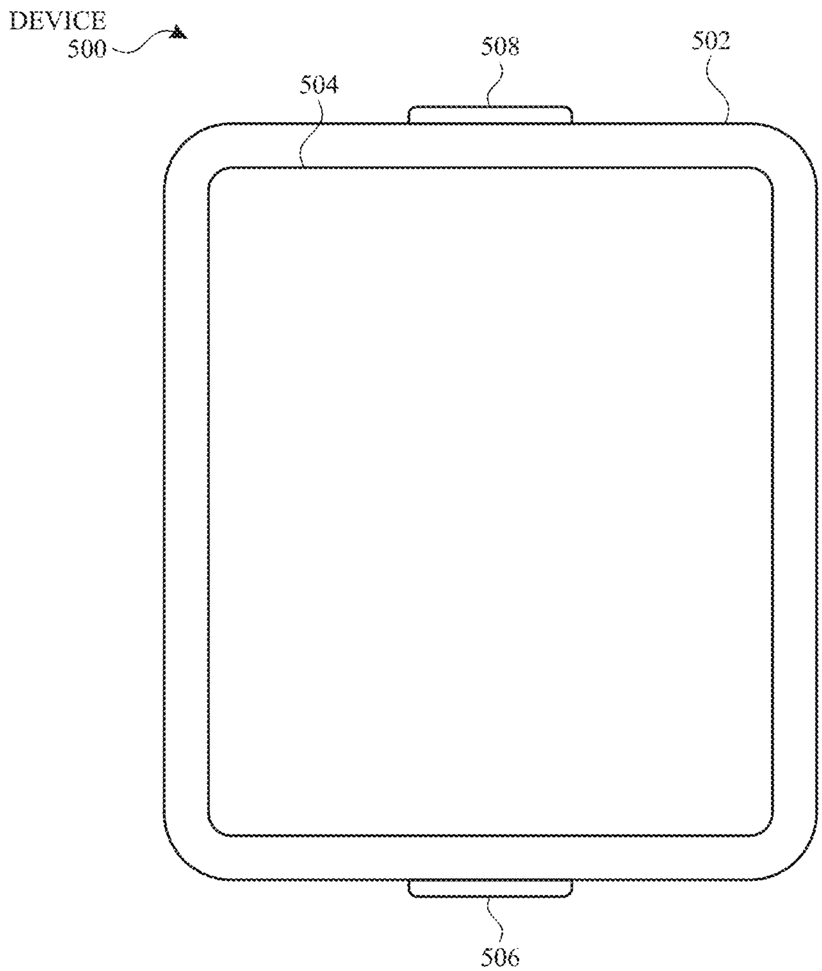
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
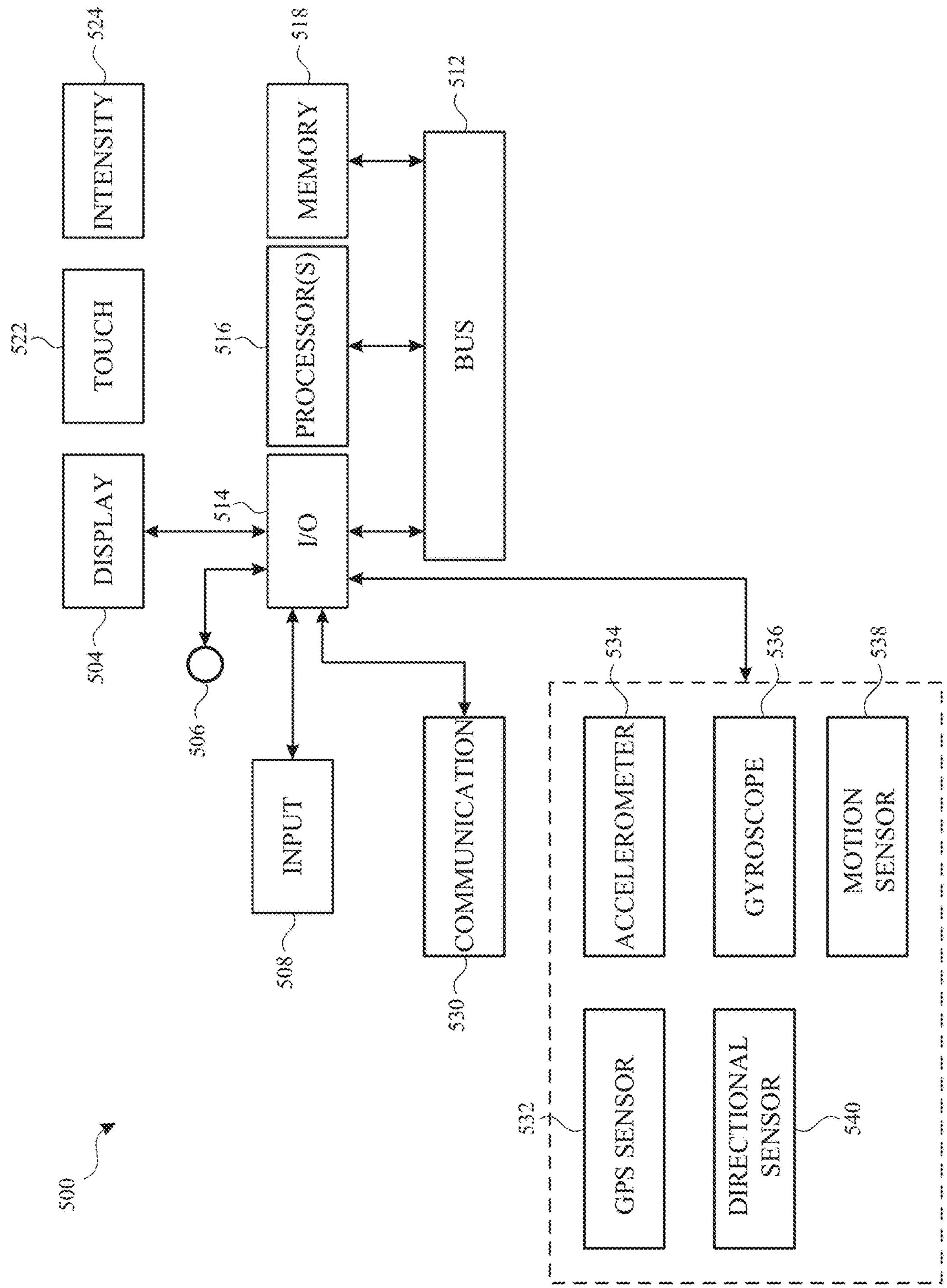
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, 1300, 1500, and 1700 (FIGS. 7, 9, 11, 13, 15, 17). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term “affordance” refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term “focus selector” refers to an input element that indicates a current part of a user interface with which a user is interacting. In some implementations that include a cursor or other location marker, the cursor acts as a “focus selector” so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a “focus selector” so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user’s intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term “characteristic intensity” of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
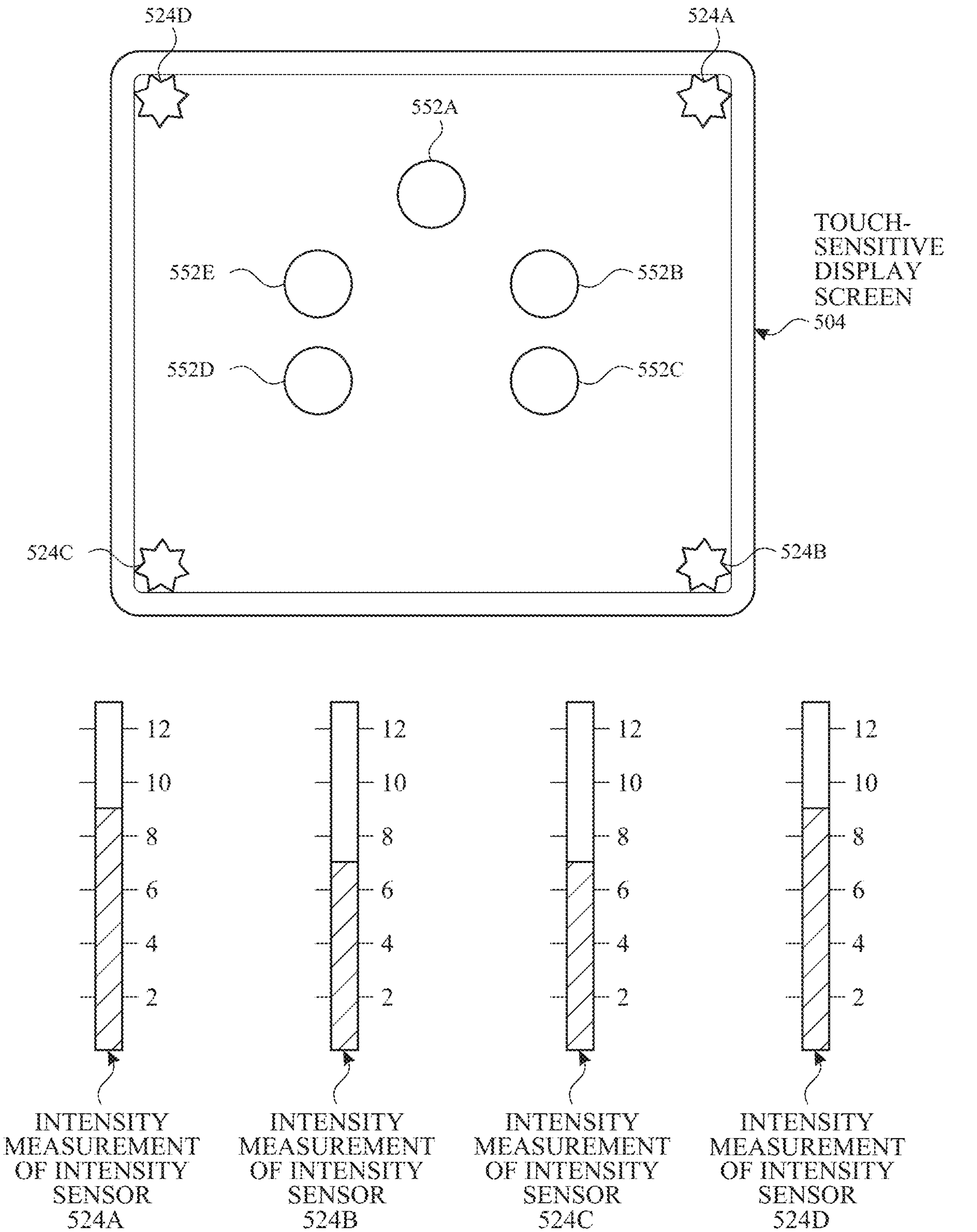
FIGS. 5C-5D illustrate exemplary components of a personal electronic device having a touch-sensitive display and intensity sensors in accordance with some embodiments.
Figure 5D:
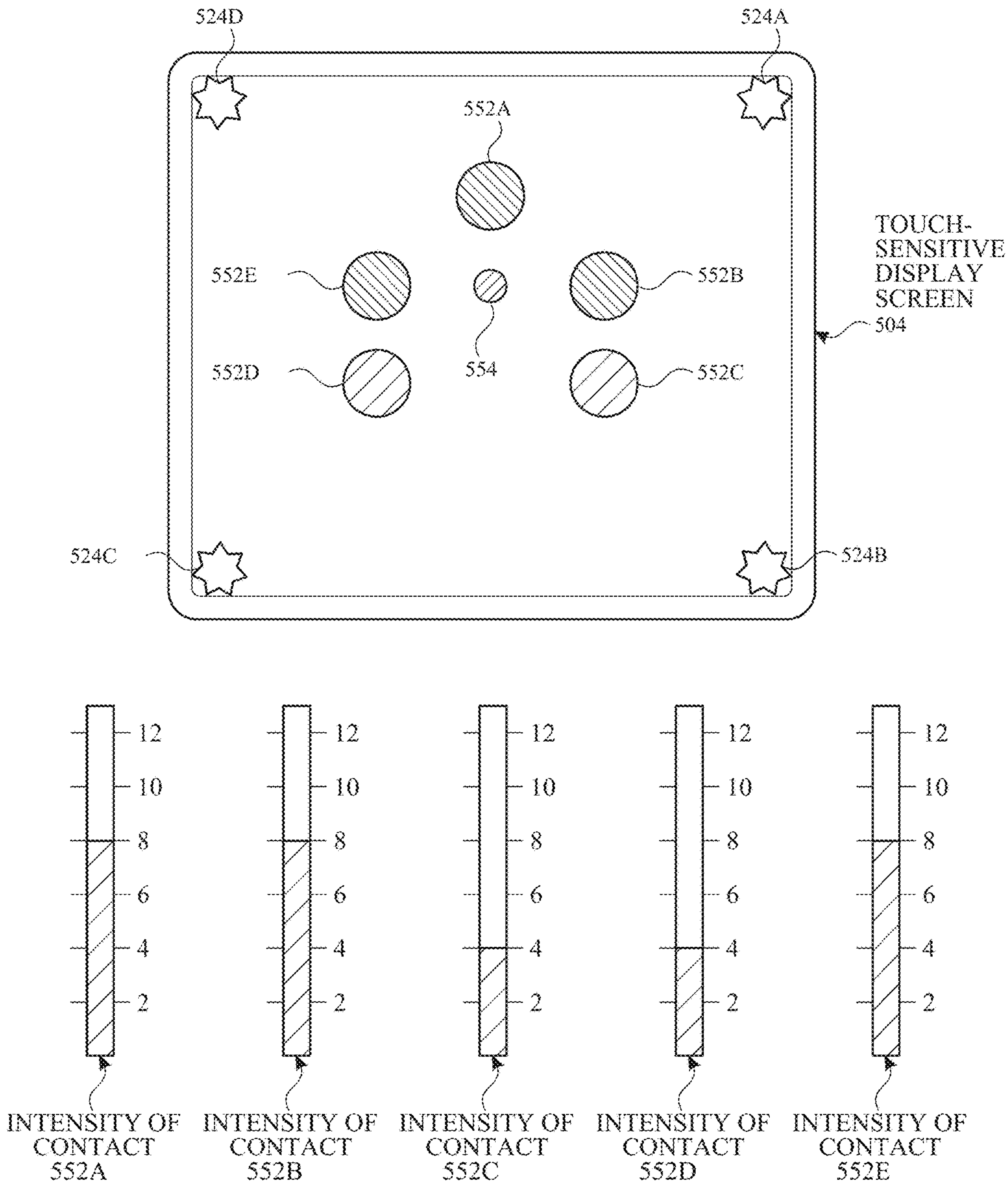

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
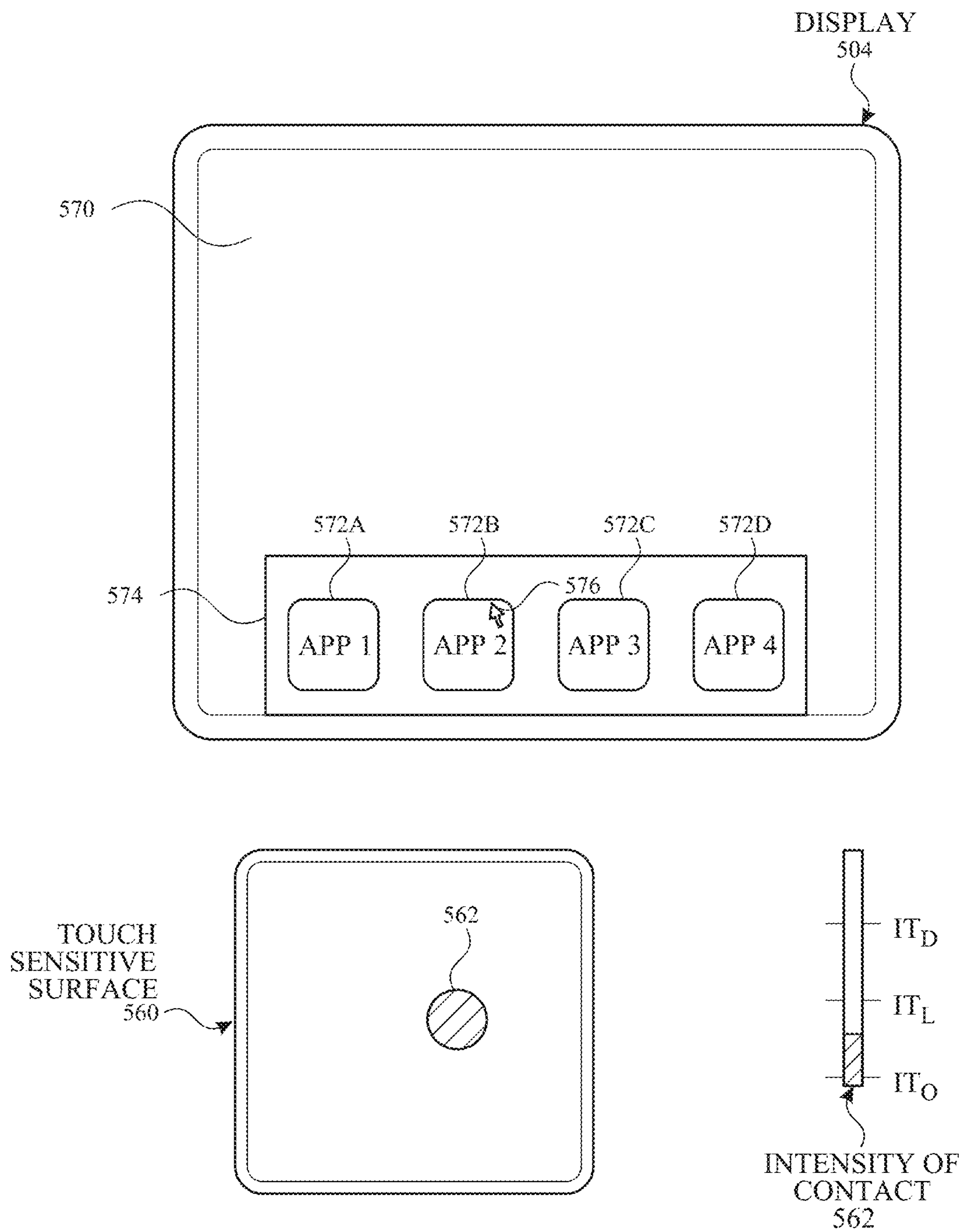
FIGS. 5E-5H illustrate exemplary components and user interfaces of a personal electronic device in accordance with some embodiments.
Figure 5F:
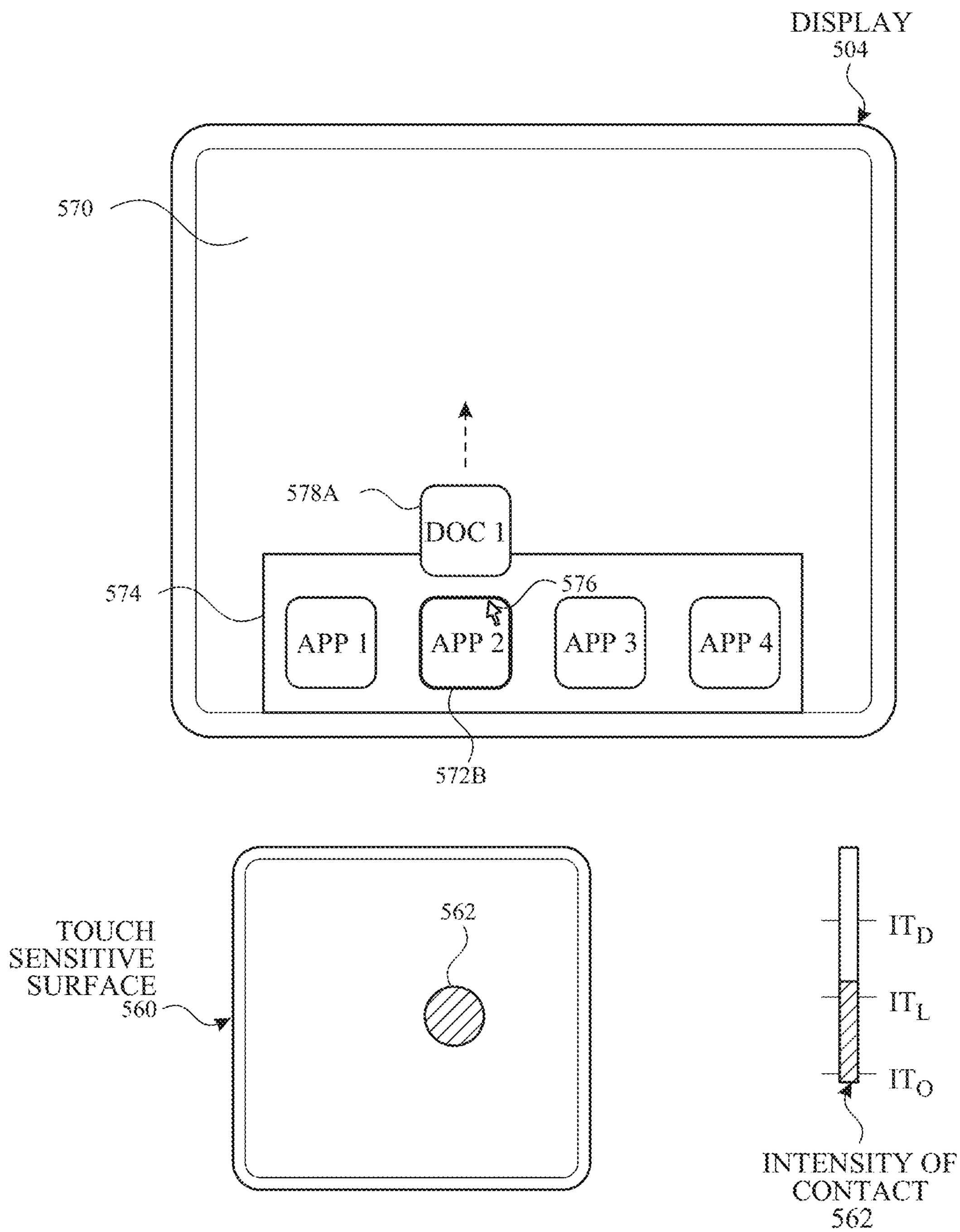
Figure 5G:
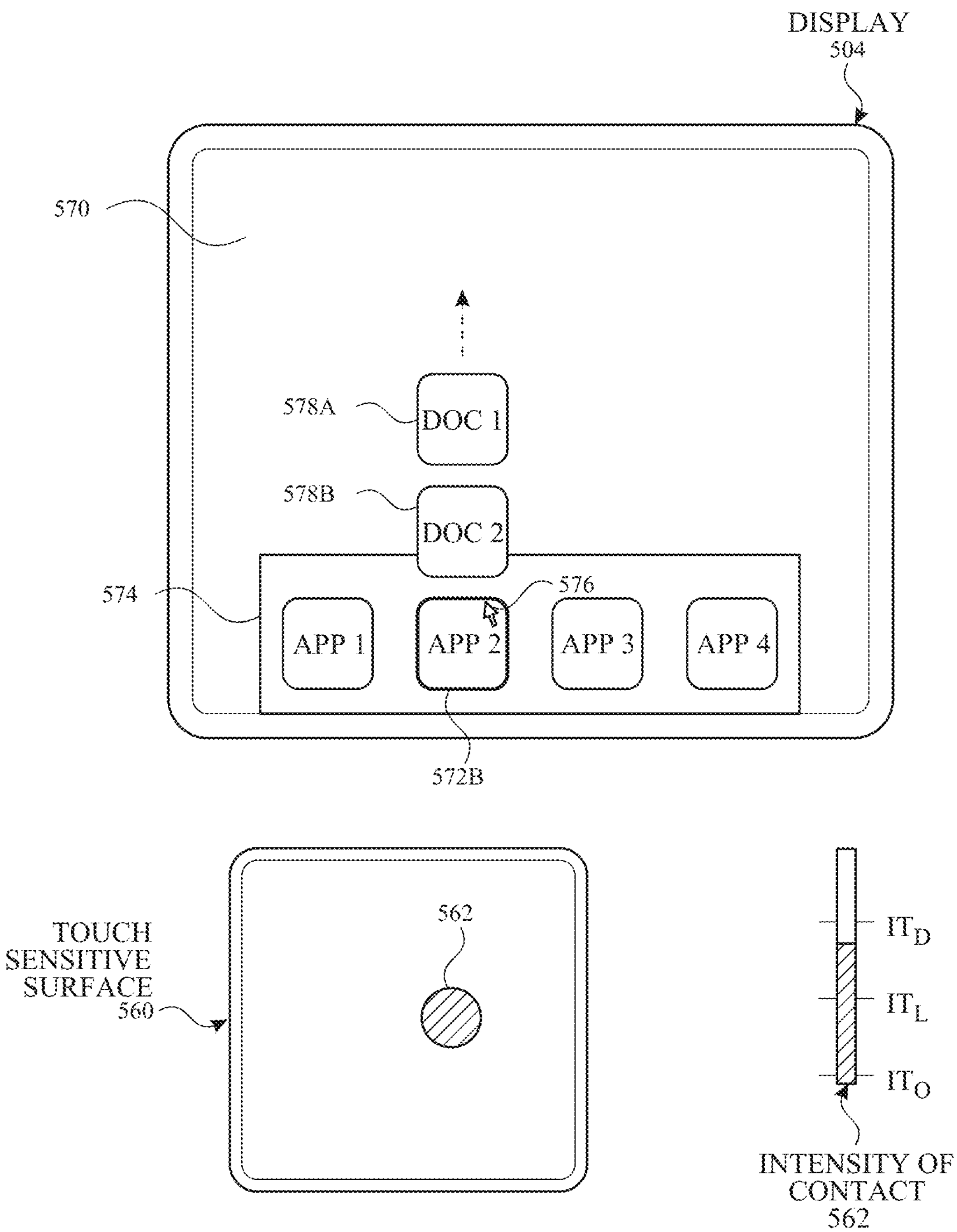
Figure 5H:
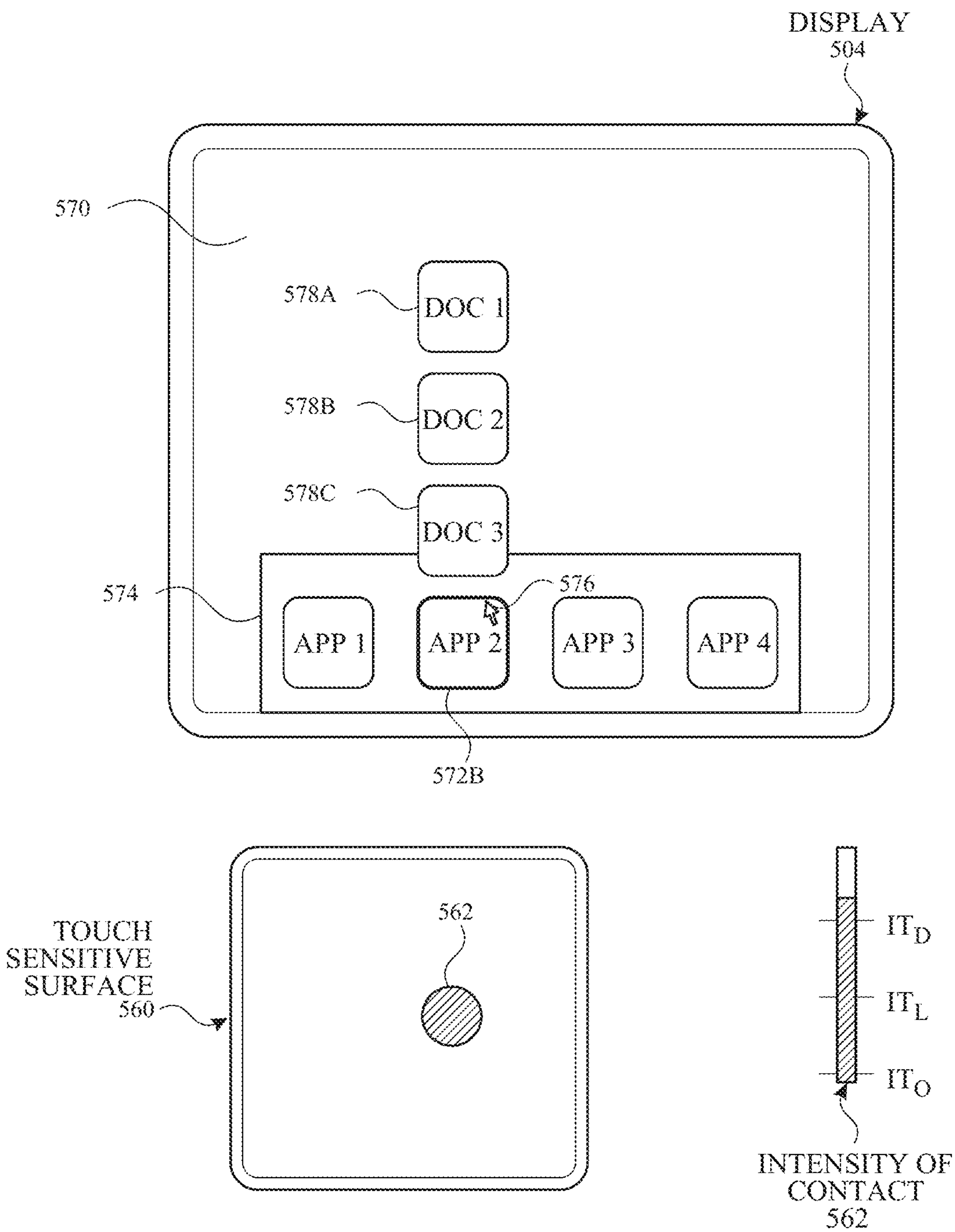

FIGS. 5E-5H illustrate detection of a gesture that includes a press input that corresponds to an increase in intensity of a contact 562 from an intensity below a light press intensity threshold (e.g., "ITL") in FIG. 5E, to an intensity above a deep press intensity threshold (e.g., "ITD") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "ITD"). Contact 562 is maintained on touch-sensitive surface 560. In response to the detection of the gesture, and in accordance with contact 562 having an intensity that goes above the deep press intensity threshold (e.g., "ITD") during the gesture, reduced-scale representations 578A-578C (e.g., thumbnails) of recently opened documents for App 2 are displayed, as shown in FIGS. 5F-5I. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITD"). In some embodiments, the intensity, on which the progress of the animation is based, is the characteristic intensity of the contact. The operations described with reference to FIGS. 5E-5H can be performed using an electronic device similar or identical to device 100, 300, or 500.

Figure 5I:
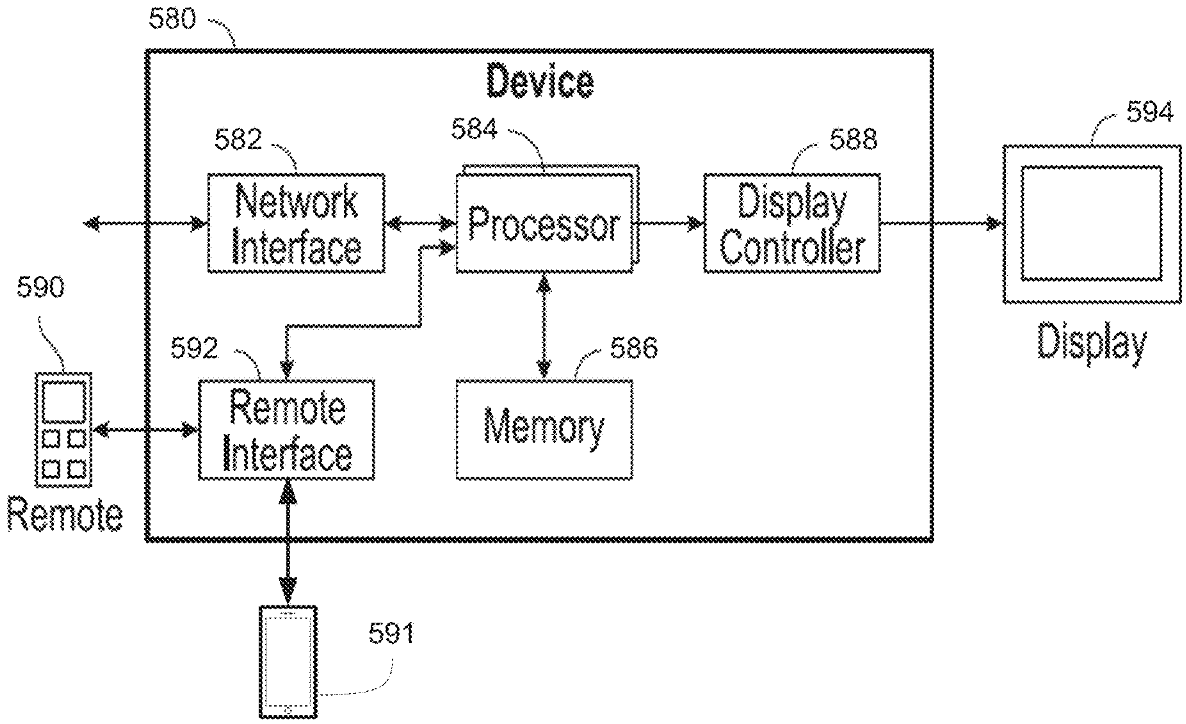
FIG. 5I illustrates a block diagram of an exemplary architectures for devices according to some embodiments of the disclosure.

FIG. 5I illustrates a block diagram of an exemplary architecture for the device 580 according to some embodiments of the disclosure. In the embodiment of FIG. 5I, media or other content is optionally received by device 580 via network interface 582, which is optionally a wireless or wired connection. The one or more processors 584 optionally execute any number of programs stored in memory 586 or storage, which optionally includes instructions to perform one or more of the methods and/or processes described herein (e.g., methods 700, 900, 1100, 1300, 1500, and 1700).

In some embodiments, display controller 588 causes the various user interfaces of the disclosure to be displayed on display 594. Further, input to device 580 is optionally provided by remote 590 via remote interface 592, which is optionally a wireless or a wired connection. In some embodiments, input to device 580 is provided by a multifunction device 591 (e.g., a smartphone) on which a remote control application is running that configures the multifunction device to simulate remote control functionality, as will be described in more detail below. In some embodiments, multifunction device 591 corresponds to one or more of device 100 in FIGS. 1A and 2, device 300 in FIG. 3, and device 500 in FIG. 5A. It is understood that the embodiment of FIG. 5I is not meant to limit the features of the device of the disclosure, and that other components to facilitate other features described in the disclosure are optionally included in the architecture of FIG. 5I as well. In some embodiments, device 580 optionally corresponds to one or more of multifunction device 100 in FIGS. 1A and 2, device 300 in FIG. 3, and device 500 in FIG. 5A; network interface 582 optionally corresponds to one or more of RF circuitry 108, external port 124, and peripherals interface 118 in FIGS. 1A and 2, and network communications interface 360 in FIG. 3; processor 584 optionally corresponds to one or more of processor(s) 120 in FIG. 1A and CPU(s) 310 in FIG. 3; display controller 588 optionally corresponds to one or more of display controller 156 in FIG. 1A and I/O interface 330 in FIG. 3; memory 586 optionally corresponds to one or more of memory 102 in FIG. 1A and memory 370 in FIG. 3; remote interface 592 optionally corresponds to one or more of peripherals interface 118, and I/O subsystem 106 (and/or its components) in FIG. 1A, and I/O interface 330 in FIG. 3; remote 590 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 594 optionally corresponds to one or more of touch-sensitive display system 112 in FIGS. 1A and 2, and display 340 in FIG. 3.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Selecting and Providing for Interaction with Handwritten Content

Users interact with electronic devices in many different manners, including entering text into such devices. In some embodiments, an electronic device displays handwritten text in content entry regions. The embodiments described below provide ways in which an electronic device receives inputs to select and interact with portions of the handwritten text, thus enhancing the user's interactions with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6B:
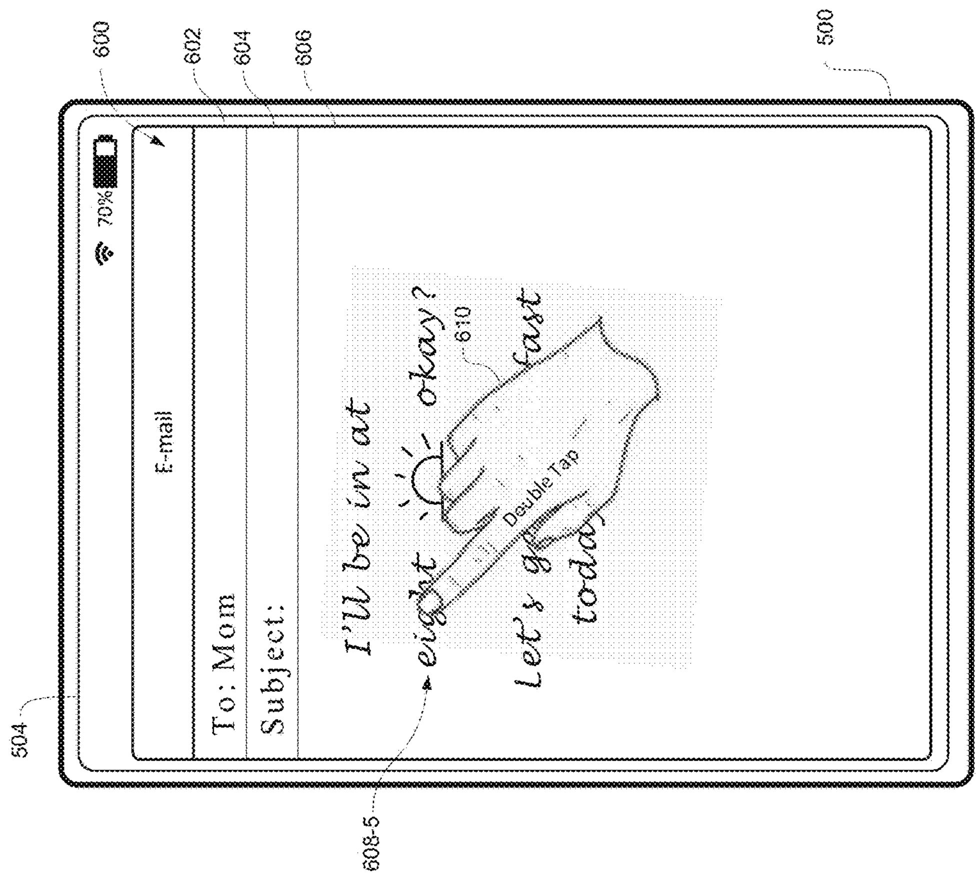
FIGS. 6A-6QQ illustrate exemplary ways in which an electronic device selects and provides for interaction with handwritten content in accordance with some embodiments.
Figure 6A:
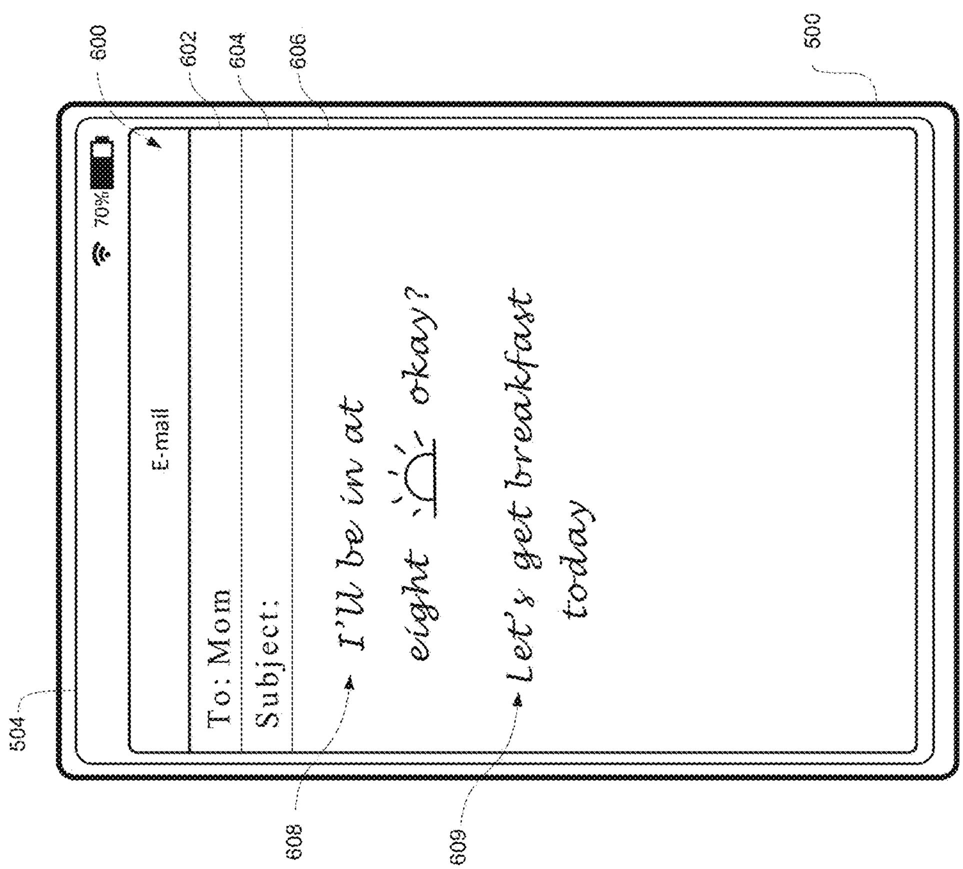
Figure 6C:
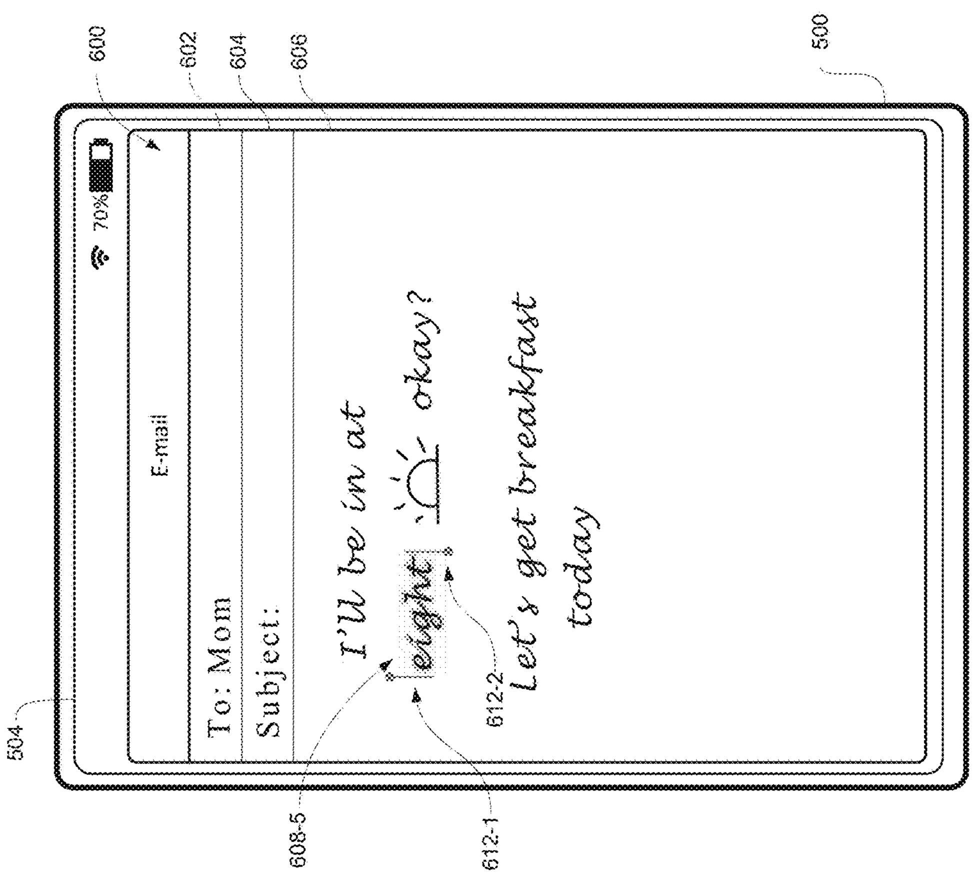
Figure 6D:
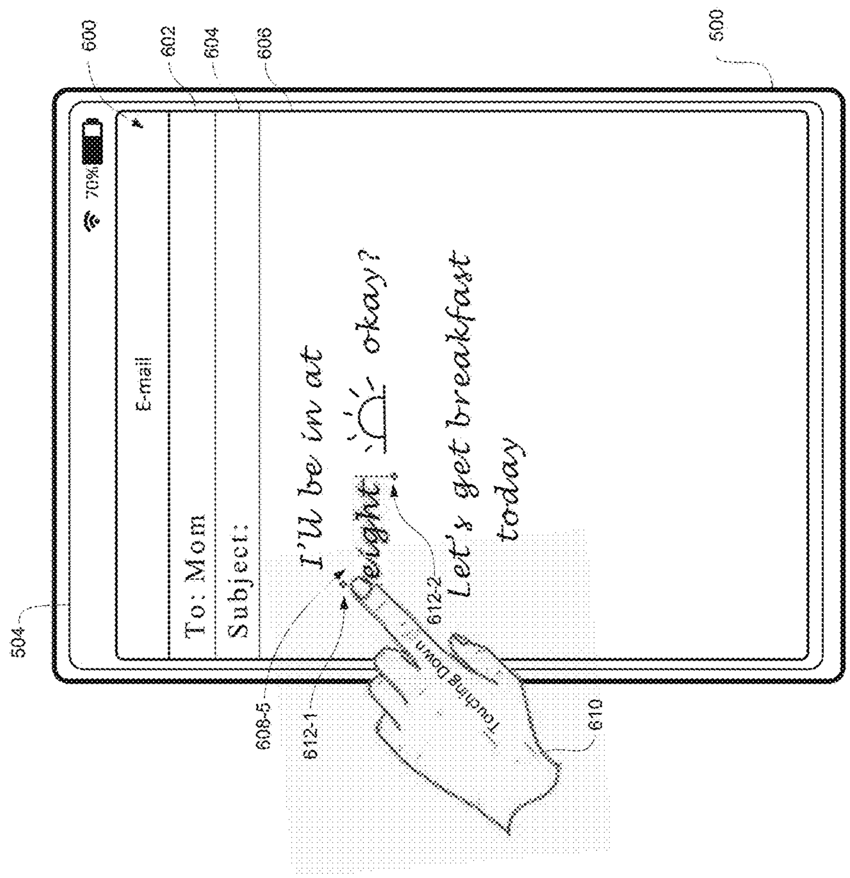
Figure 6F:
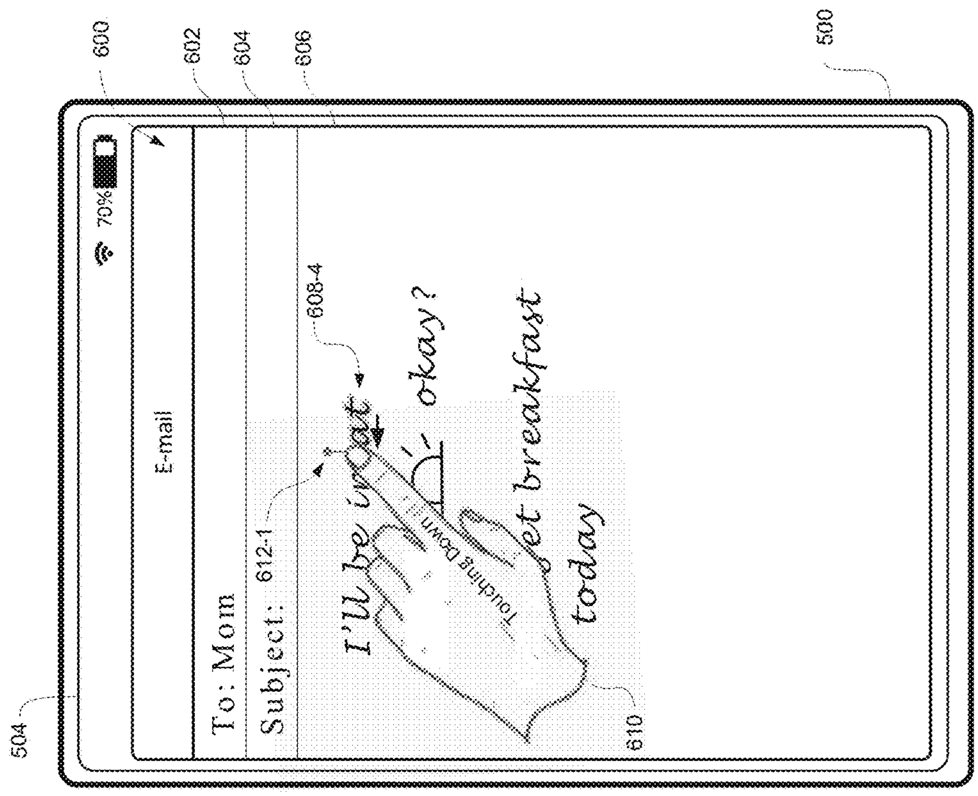
Figure 6E:
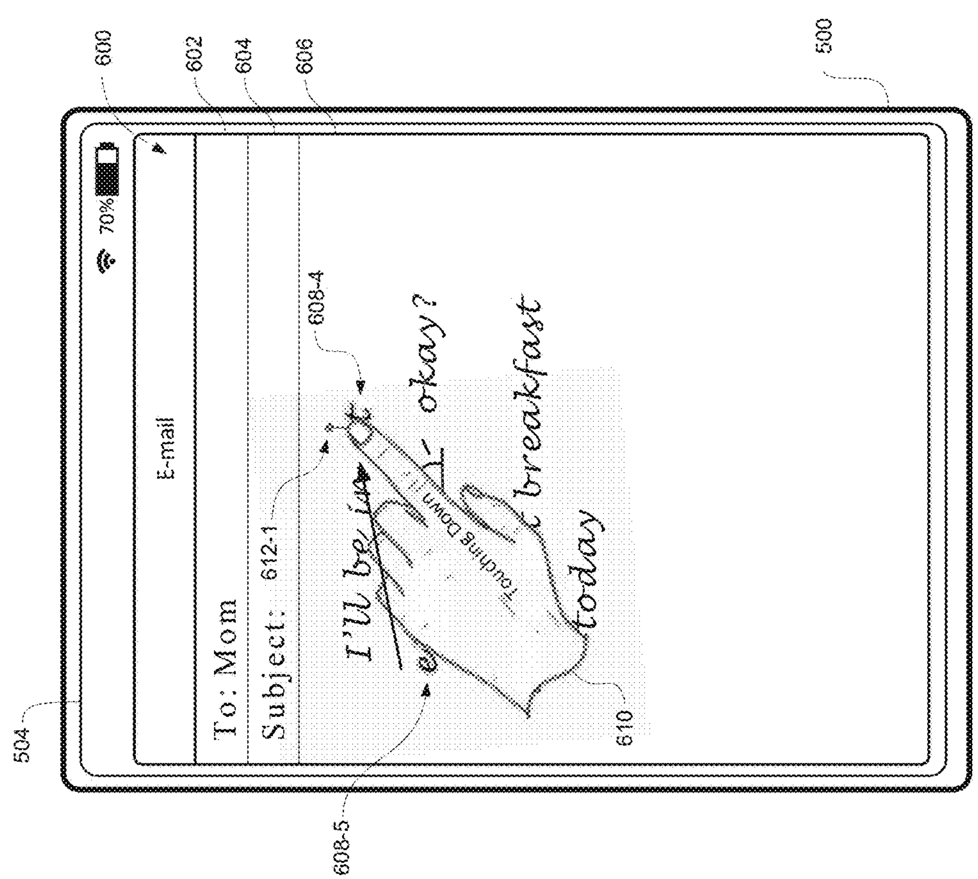
Figure 6H:
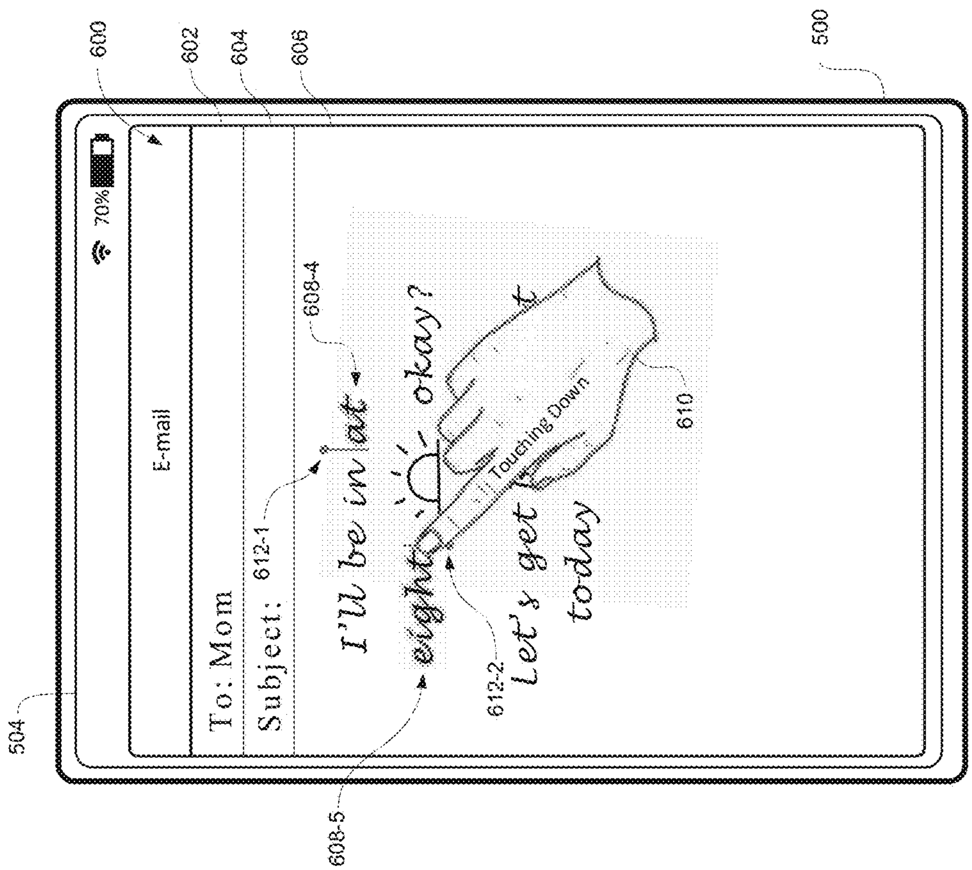
Figure 6G:
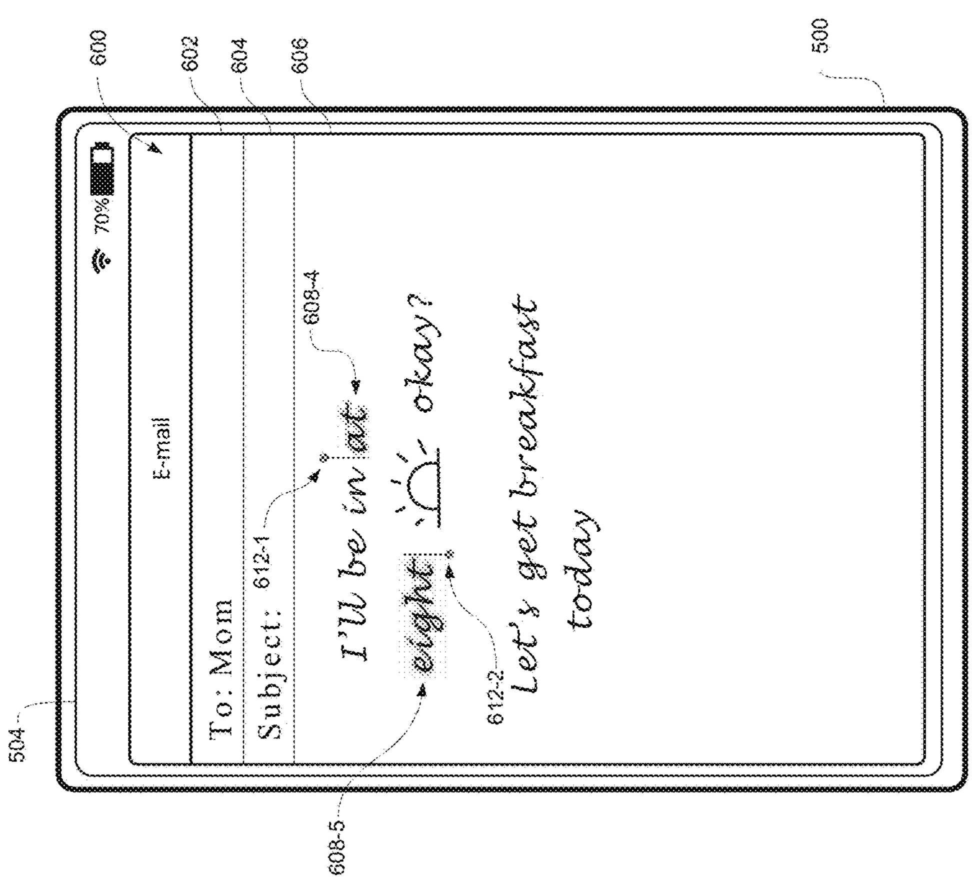
Figure 6J:
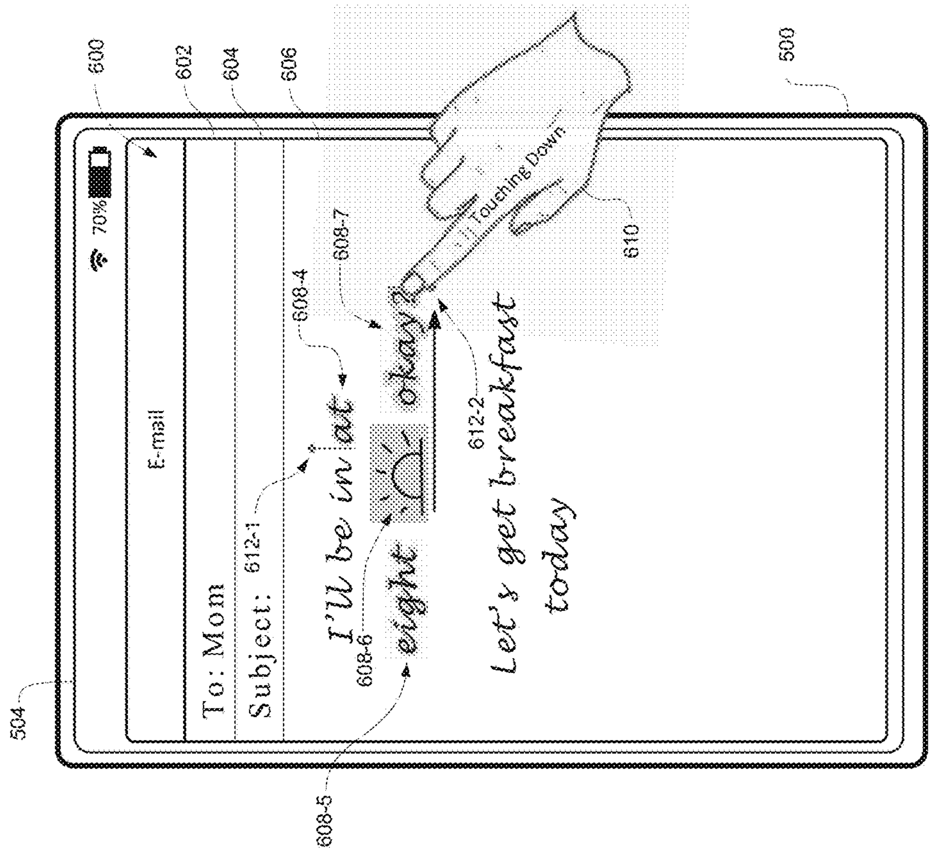
Figure 6I:
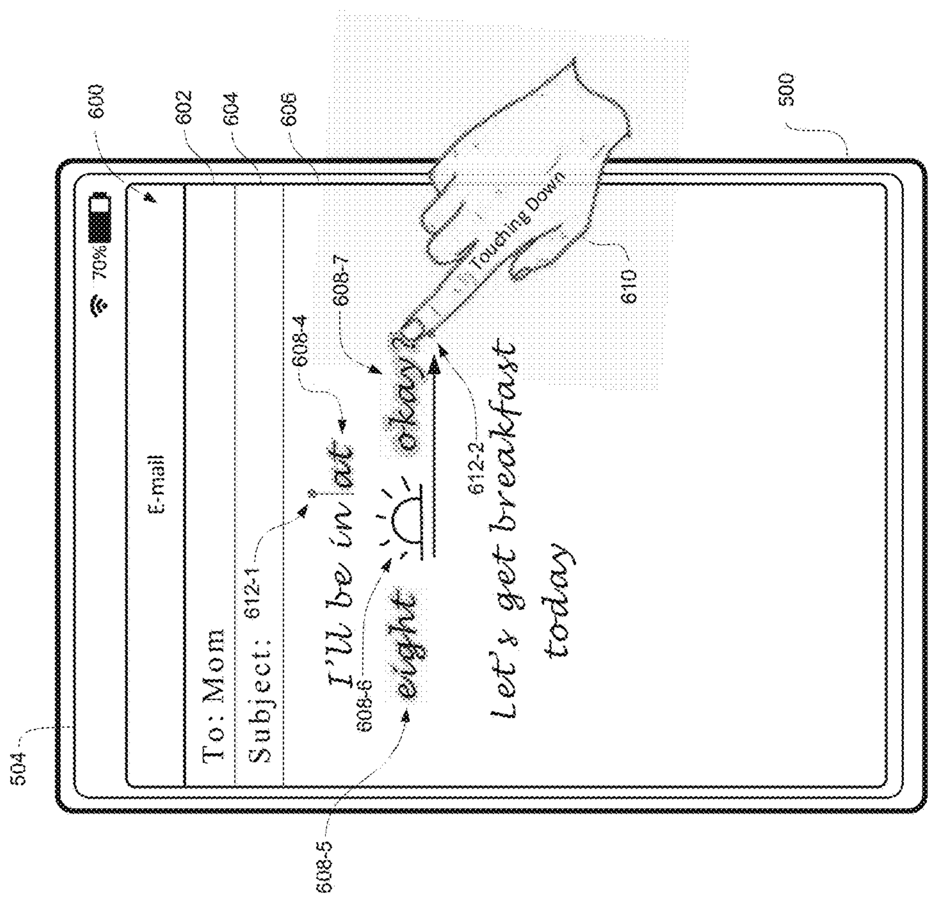
Figure 6L:
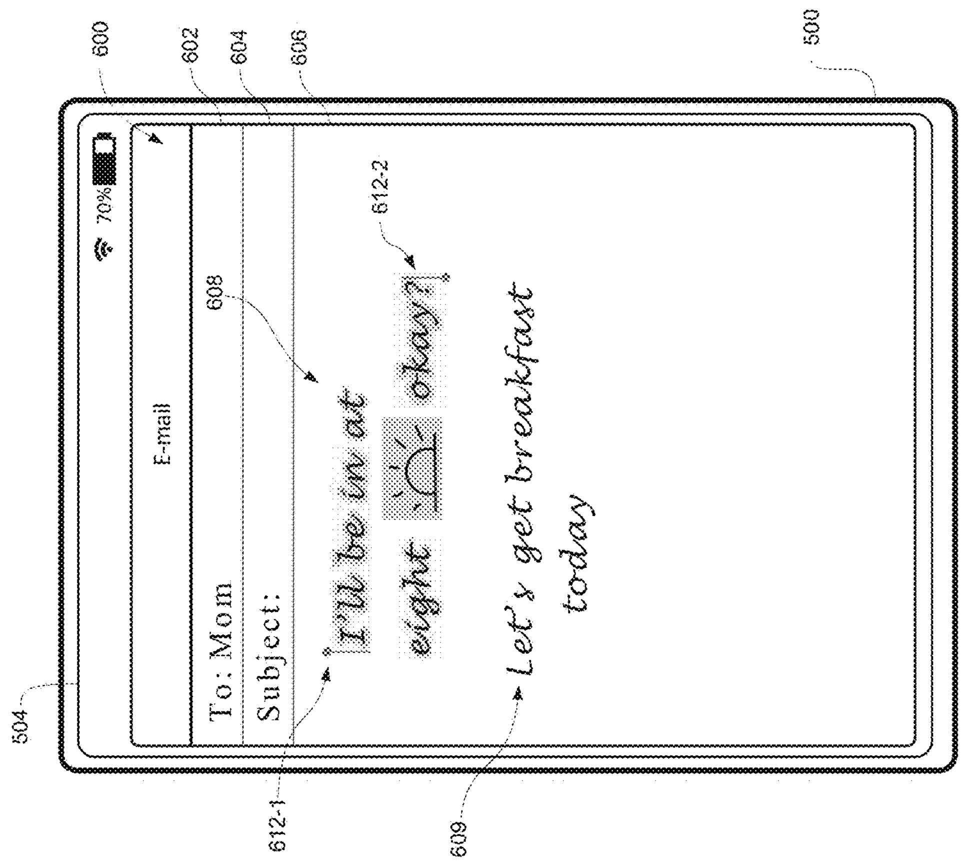
Figure 6K:
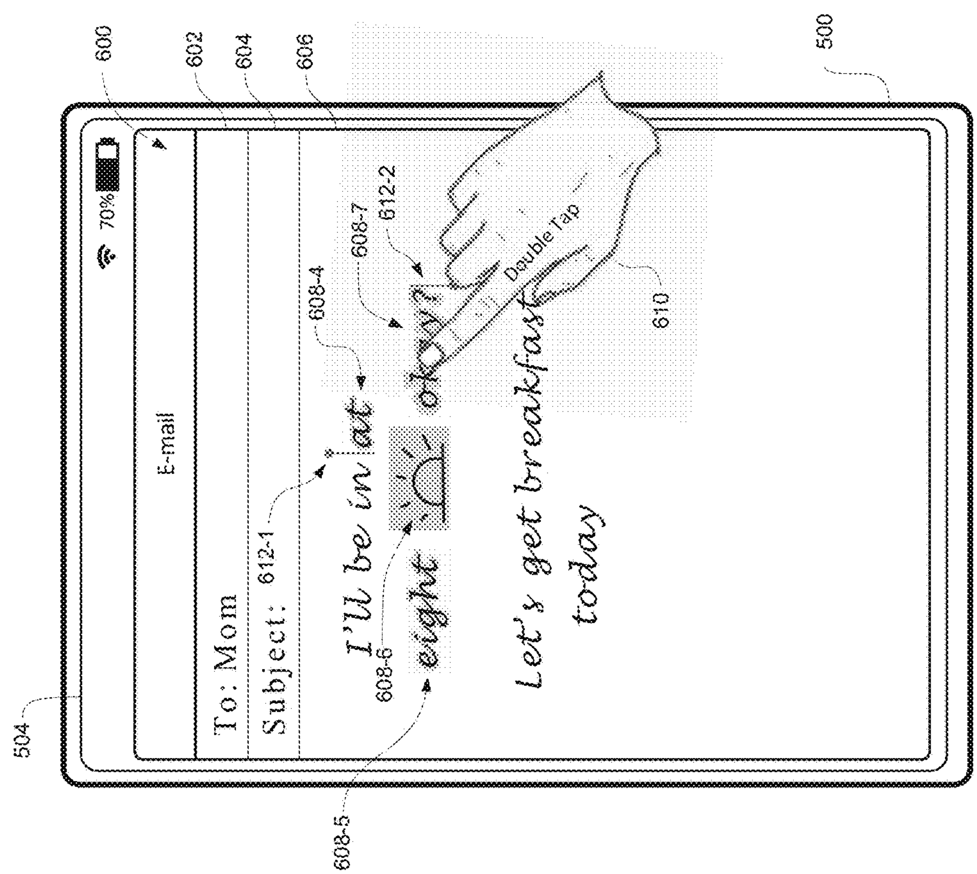
Figure 6N:
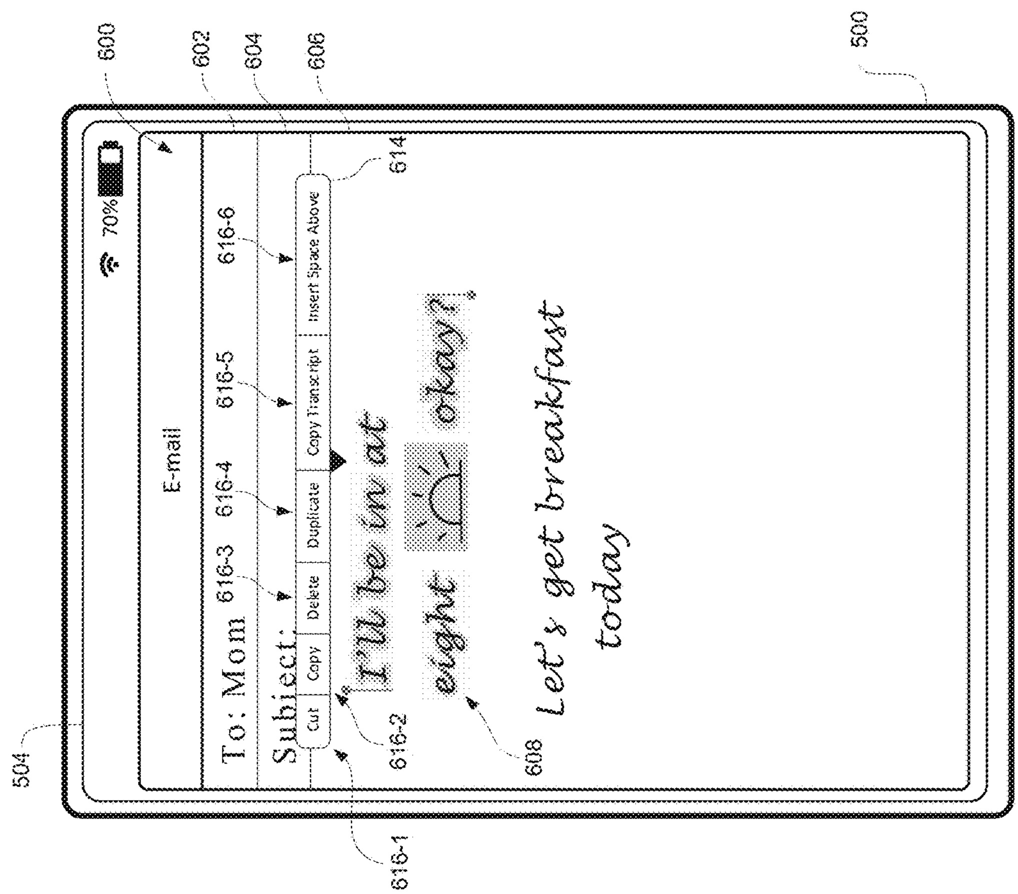
Figure 6M:
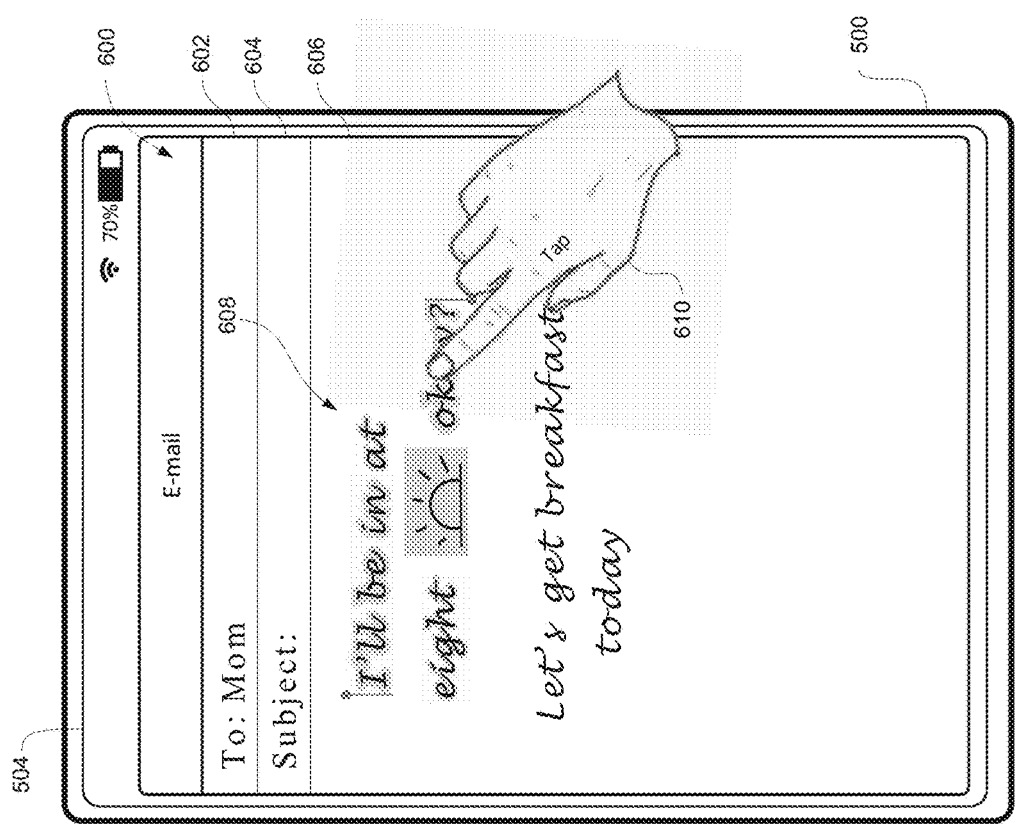
Figure 6P:
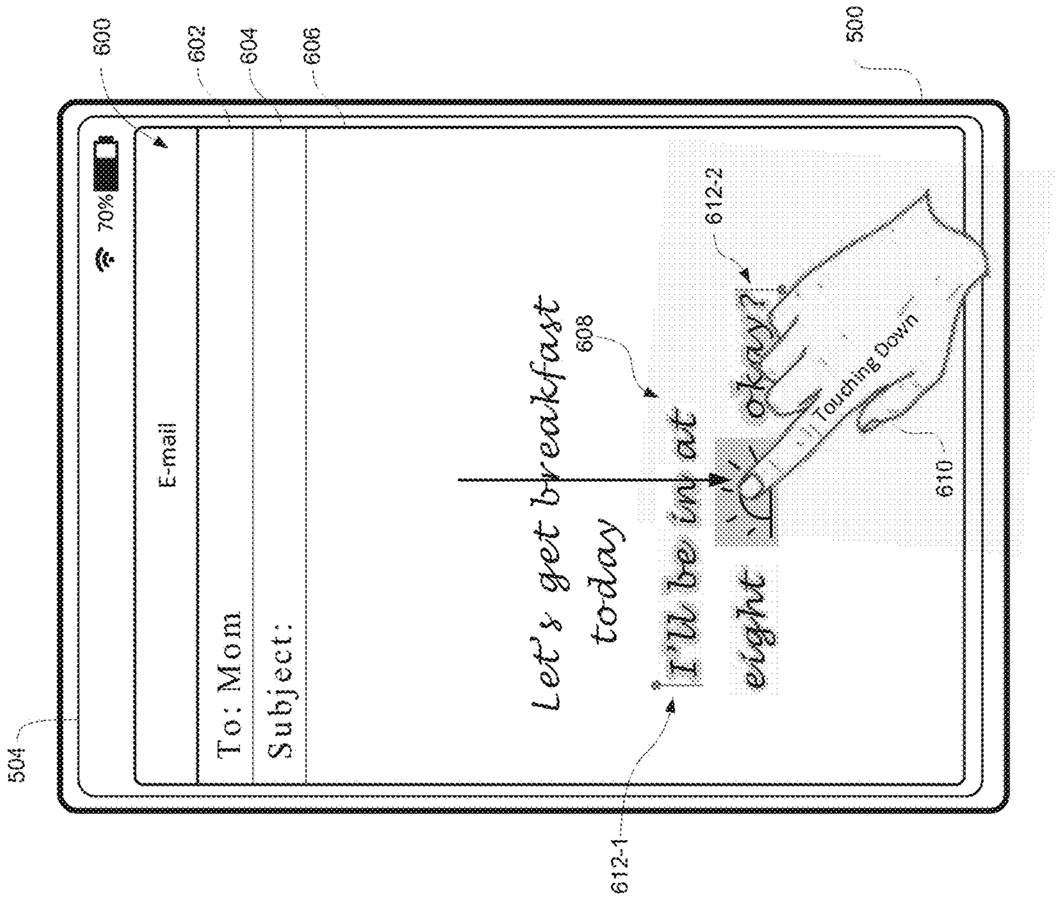
Figure 6O:
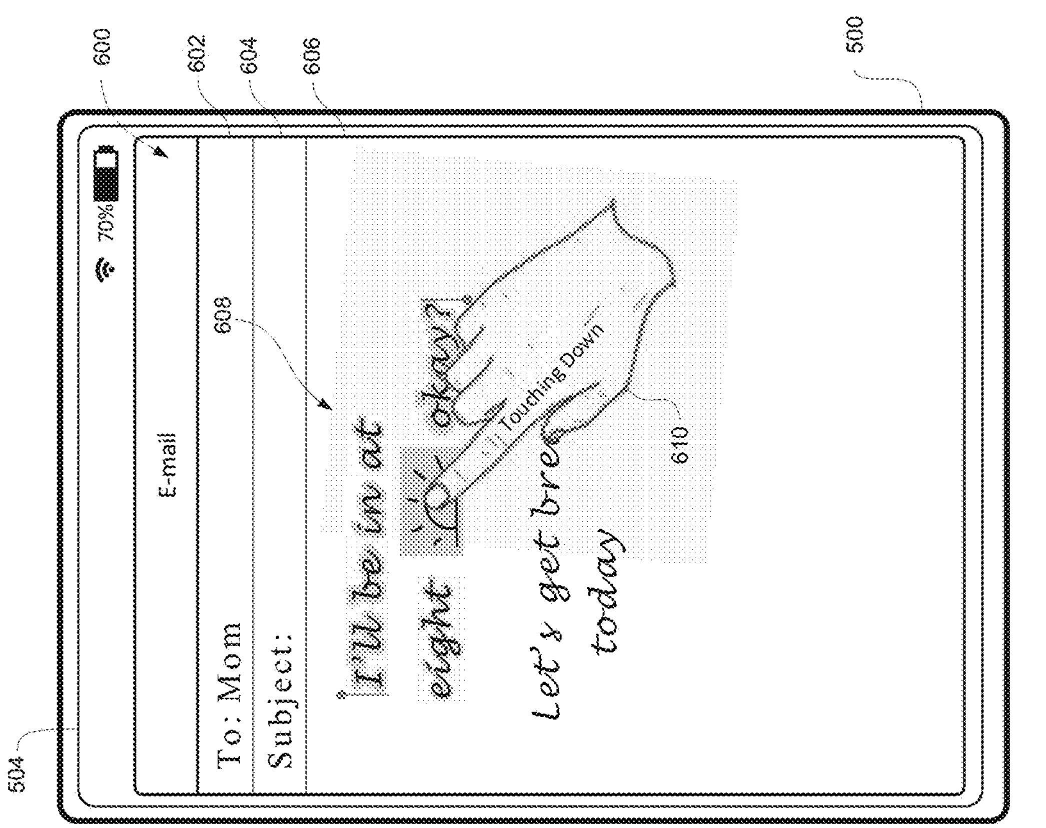
Figure 6R:
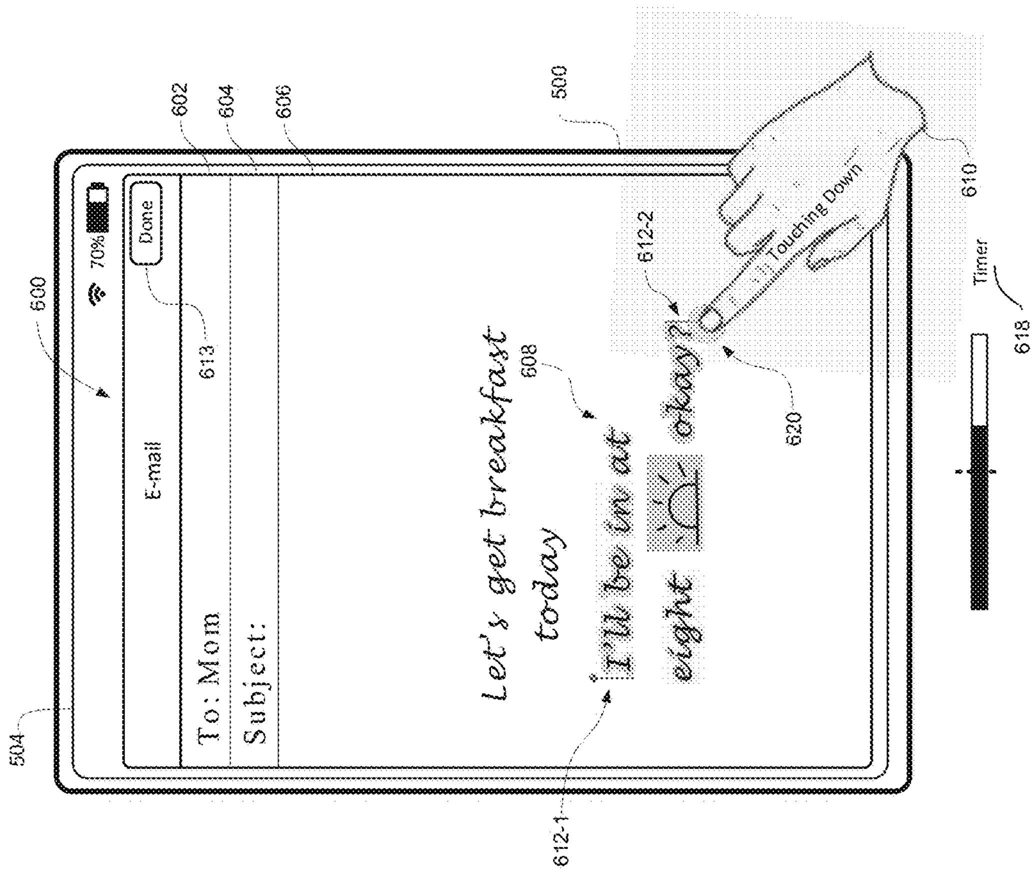
Figure 6Q:
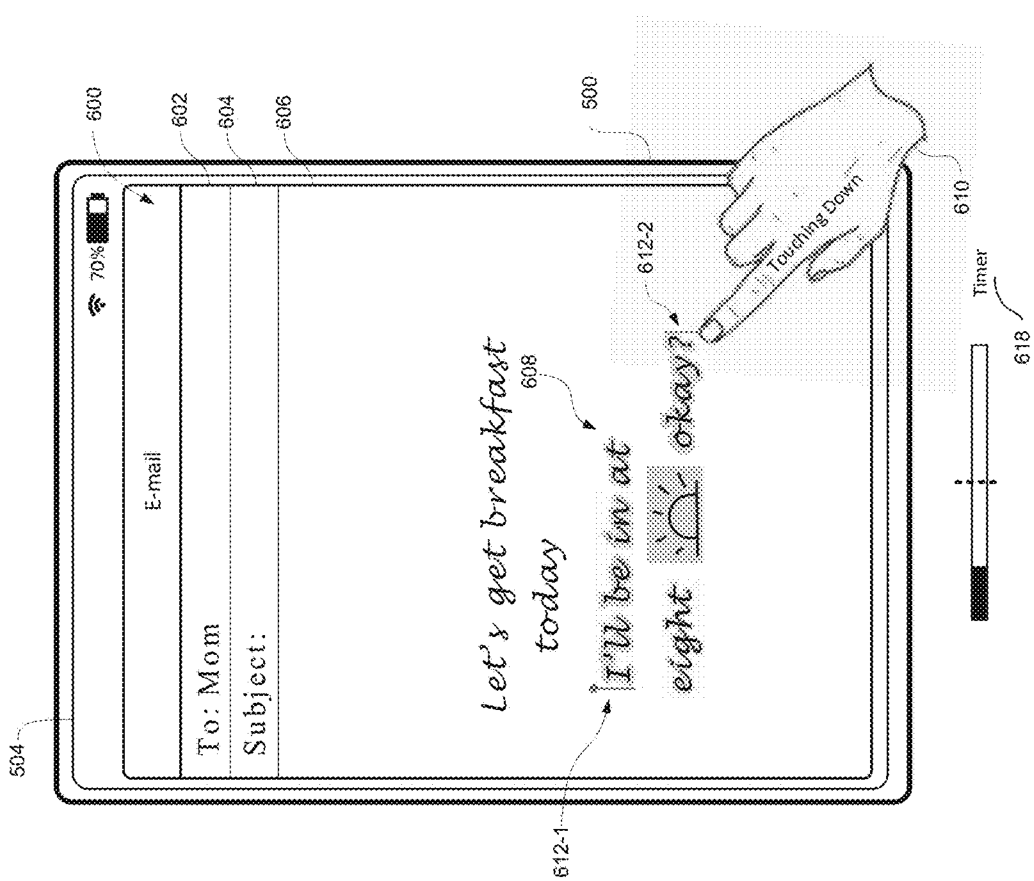

FIGS. 6A-6QQ illustrate exemplary ways in which an electronic device selects and provides for interaction with handwritten content. The embodiments in these figures are used to illustrate the processes described below, including the processes described with reference to FIGS. 7A-7J.

FIGS. 6A-6QQ illustrate operation of the electronic device 500 for selecting and providing for interaction with handwritten content. FIG. 6A illustrates electronic device 500 displaying user interface 600 (e.g., via a display device, via a display generation component, etc.). In some embodiments, user interface 600 is displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500.

In some embodiments, user interface 600 is a user interface of an email application (e.g., for composing and sending emails, receiving and viewing emails, etc.). In some embodiments, the email application is an application installed on device 500.

In FIG. 6A, user interface 600 includes text entry field 602, text entry field 604, and content entry field 606. In some embodiments, text entry field 602 corresponds to the recipient field of the email being composed. In some embodiments, text entry field 604 corresponds to the subject field of the email being composed. In some embodiments, content entry field 606 corresponds to the body of the email being composed. In some embodiments, content entry field 606 is compatible with text, pictures, drawings, etc. In some embodiments, content entry field 606 is configured to receive handwritten input (e.g., a drawing input via a stylus device) and display a representation of the handwritten input. In some embodiments, device 500 analyzes the handwritten input to identify valid characters, words, and/or sentences in the handwritten input (e.g., as opposed to drawings, which correspond to content that has not been identified by device 500 as valid characters). In some embodiments, device 500 identifies words semantically (e.g., based on whether the combination of characters result in a valid word). In some embodiments, device 500 identifies words based on spacing (e.g., based on whether the spacing between characters suggest that the characters are part of the same word or are a part of different words). In some embodiments, device 500 identifies words based on timing (e.g., based on whether the timing of pauses between writing characters suggest that two characters are part of the same word or are a part of different words). In some embodiments, words are identified using a combination of the above factors.

In FIG. 6A, content entry region 606 includes sentence 608 and sentence 609. In FIG. 6A, sentence 608 is composed of a plurality of words and a drawing, and sentence 609 is composed of a plurality of words without a drawing. In some embodiments, sentence 608 and/or sentence 609 were previously inserted into content entry region 606 using a stylus. In some embodiments, sentence 608 and/or sentence 609 were inserted into content entry region 606 while device 500 was in a drawing entry mode (e.g., as opposed to a text entry mode). In some embodiments, while in a drawing entry mode, handwritten inputs from a stylus cause insertion of a representation of the handwritten input as a drawing (e.g., an image, a rich image, a graphical object, etc.). In some embodiments, while in a text entry mode, handwritten inputs from a stylus cause insertion of a representation of the handwritten input which is analyzed by device 500 and converted into font-based text corresponding to the handwritten input (e.g., corresponding to the characters identified in the handwritten input). Thus, in FIG. 6A, although sentence 608 and sentence 609 include valid words, device 500 has not converted sentence 608 or sentence 609 into font-based text, and sentence 608 and sentence 609 are maintained with their "as-drawn" styling.

In FIG. 6B, a user input is received from finger 610 corresponding to a double-tap selection (e.g., two taps in quick succession within a threshold amount of time such as within 0.25 seconds, 0.5 seconds, 1 second, 3 seconds, 5 seconds, etc.) on word 608-5 (e.g., of sentence 608). In some embodiments, in response to receiving the double-tap selection on word 608-5, device 500 selects word 608-5, as shown in FIG. 6C. In some embodiments, selecting word 608-5 includes highlighting word 608-5. In some embodiments, the highlighting around word 608-5 is displayed as a halo or shadow around handwritten word 608-5. In some embodiments, the shape of the highlighting around word 608-5 is based on the handwritten shape of word 608-5. In some embodiments, selecting word 608-5 includes displaying movement element 612-1 and movement element 612-2. In some embodiments, movement element 612-1 and movement element 612-2 are displayed to the left and right of word 608-5 (e.g., movement element 612-1 and movement element 612-2 book-end word 608-5). In some embodiments, as will be described in more detail below, movement element 612-1 and movement element 612-2 are interactable to select more or fewer handwritten characters and/or words by moving movement element 612-1 and/or movement element 612-2.

In FIG. 6D, a contact from finger 610 is received on movement element 612-1 (e.g., a touch-down from finger 610 on touch screen 504 at a location corresponding to movement element 612-1). In FIG. 6E, a movement of finger 610 while maintaining contact with touch screen 504 is detected. In some embodiments, in response to detecting the movement of finger 610, movement element 612-1 moves in accordance with the movement of finger 610, as shown in FIG. 6E. In FIG. 6E, the movement of finger 610 moved movement element 612-1 to between the characters "a" and "t" of word 608-4 in the line of text above word 608-5. In some embodiments, in response to finger 610 moving movement element 612-1 moving to between the characters "a" and "t" of word 608-4, device 500 further highlights the character "t" of word 608-4. Thus, device 500 is able to detect that word 608-4 and word 608-5 are on different lines of text and that "t" of word 608-4 and all of word 608-5 fall between movement element 612-1 and movement element 612-2, and selects "t" of word 608-4 and word 608-5.

In FIG. 6F, a further movement of finger 610 while maintaining contact with touch screen 504 is detected. In some embodiments, the movement of finger 610 moved movement element 610-1 to the left of word 608-4. In some embodiments, in response to the movement of finger 610 moving movement element 610-1 to the left of word 608-4, device 500 further highlights the "a" of word 608-4 (e.g., thus highlighting word 608-4 and word 608-5), as shown in FIG. 6F.

In FIG. 6G, a termination of the contact of finger 610 with touch screen 504 is detected (e.g., lift-off of finger 610 from touch screen 504). In some embodiments, in response to detecting the termination of the contact of finger 610, device 500 maintains selection of words 608-4 and 608-5. In some embodiments, as shown in FIG. 6G, movement element 612-1 is located to the left of word 608-4 and movement element 612-2 is located to the right of word 608-5.

In FIG. 6H, a contact from finger 610 is received on movement element 612-2 (e.g., a touch-down from finger 610 on touch screen 504 at a location corresponding to movement element 612-2). In FIG. 6I, a movement of finger 610 while maintaining contact with touch screen 504 is detected moving movement element 612-2 rightwards. In some embodiments, in response to detecting the movement of finger 610, movement element 612-2 is moved in accordance with the movement of finger 610 to the right of word 608-7, as shown in FIG. 6I. In some embodiments, device 500 determines that words 608-4, 608-5 and 608-7 are located between movement element 612-1 and movement element 612-2, and selects (e.g., optionally highlights) words 608-4, 608-5, and 608-7. In some embodiments, device 500 identifies drawing 608-6 as not a valid word/character (optionally identifies drawing 608-6 as a drawing), and thus drawing 608-6 is not selected or highlighted despite being located between movement element 612-1 and movement element 612-2.

FIG. 6J illustrates an alternative embodiment in which device 500 selects and highlights drawing 608-6 despite identifying drawing 608-6 as not being a valid word. In some embodiments, the highlighting around drawing 608-6 is a rectangular highlighting around drawing 608-6. In some embodiments, the highlighting around drawing 608-6 is fitted to the shape of drawing 608-6. As shown in FIG. 6J, the highlighting around words 608-5, drawing 608-6 and word 608-7 is not contiguous, even though word 608-5, drawing 608-6 and word 608-7 are adjacent selected objects.

In FIG. 6K, a user input is received from finger 610 corresponding to a double-tap selection on word 608-7 (e.g., an already selected word). In some embodiments, in response to the double-tap selection on word 608-7, device 500 selects the words in the sentence containing word 608-7, as shown in FIG. 6L. Thus, as shown, a double-tap selection of a word that is selected causes selection of the other handwritten words in the same handwritten sentence. In some embodiments, device 500 selects the handwritten words in the same handwritten sentence if the characters of the respective word is highlighted (e.g., as opposed to only a subset of characters of the respective word being highlighted, in which case the double-tap selection causes the entirety of the respective word to be highlighted).

In FIG. 6M, a selection input (e.g., single tap) from finger 610 is received selecting sentence 608 (e.g., a currently selected word or drawing in sentence 608). In some embodiments, in response to the selection input, device 500 displays pop-up 614, as shown in FIG. 6N. In some embodiments, pop-up 614 includes one or more options associated with the selected content. In FIG. 6N, pop-up 614 includes options 616-1 to 616-6. In some embodiments, more or fewer options are possible. In some embodiments, option 616-1 is selectable to perform a cut option (e.g., copy the selected content into a clipboard and delete the selected content from region 606). In some embodiments, option 616-2 is selectable to perform a copy option (e.g., copy the selected content into a clipboard without deleting the selected content from region 606). In some embodiments, option 616-3 is selectable to delete the selected content from region 606. In some embodiments, option 616-4 is selectable to insert a duplicate of the selected content into content entry region 606. In some embodiments, option 616-5 is selectable to copy a transcript of the selected text into the clipboard. In some embodiments, option 616-6 is selectable to insert space above the selected content and display a movement element above the selected content that is selectable to move the content below the movement element upwards or downwards, as will be described later.

In FIG. 6O, a contact from finger 610 is received on sentence 608 (e.g., a currently selected word or drawing in sentence 608). In FIG. 6P, while maintaining contact with touch screen 504, a downward movement of finger 610 is detected. In some embodiments, in response to the movement of finger 610, sentence 608 moves downwards in accordance with the movement of finger 610 (e.g., to below sentence 609), as shown in FIG. 6P. In some embodiments, sentence 608 moves in accordance with the movement of finger 610 if contact on sentence 608 is held for more than a threshold amount of time (e.g., 0.25 seconds, 0.5 seconds, 1 second, 3 seconds, 5 seconds, etc.) before the movement of finger 610 is received. Otherwise, region 606 is optionally scrolled instead of sentence 608 being moved.

In FIG. 6Q, a contact from finger 610 is received on a respective portion of movement element 612-2. In some embodiments, finger 610 is selecting the bulb portion of movement element 612-2. In FIG. 6Q, the contact with movement element is held for less than a threshold amount of time (e.g., as illustrated by timer 618). In FIG. 6R, the contact with the respective portion of movement element 612-2 is held for longer than the threshold amount of time (e.g., 0.25 seconds, 0.5 seconds, 1 second, 3 seconds, 5 seconds, etc.).

In some embodiments, in response to the contact with the respective portion of movement element 612-2 being held for longer than the threshold amount of time, device 500 enters into a selection painting mode, as shown in FIG. 6R. In some embodiments, while in the selection painting mode, painter element 620 is displayed at the location of the contact of finger 610 with touch screen 504. In some embodiments, while in selection painting mode, the user is able to swipe across or otherwise touch one or more words in content entry region 606 to cause selection or de-selection of the one or more words. As will be described in more detail below, if the first word encountered by painter element 620 is highlighted, then the first word and subsequent words are de-selected (e.g., unhighlighted), but if the first word encountered by painter element 620 is not highlighted, then the first word and subsequent words are selected (e.g., highlighted).

In some embodiments, if a contact with a portion of movement element 612-2 other than the bulb portion of movement element 612-2 is held for longer than the threshold amount of time, device 500 does not enter into selection painting mode. In some embodiments, contact with a portion of movement element 612-2 other than the bulb portion allows the user to drag movement element 612-2 to select more or fewer characters, as described above with respect to FIG. 6I.

Figure 6T:
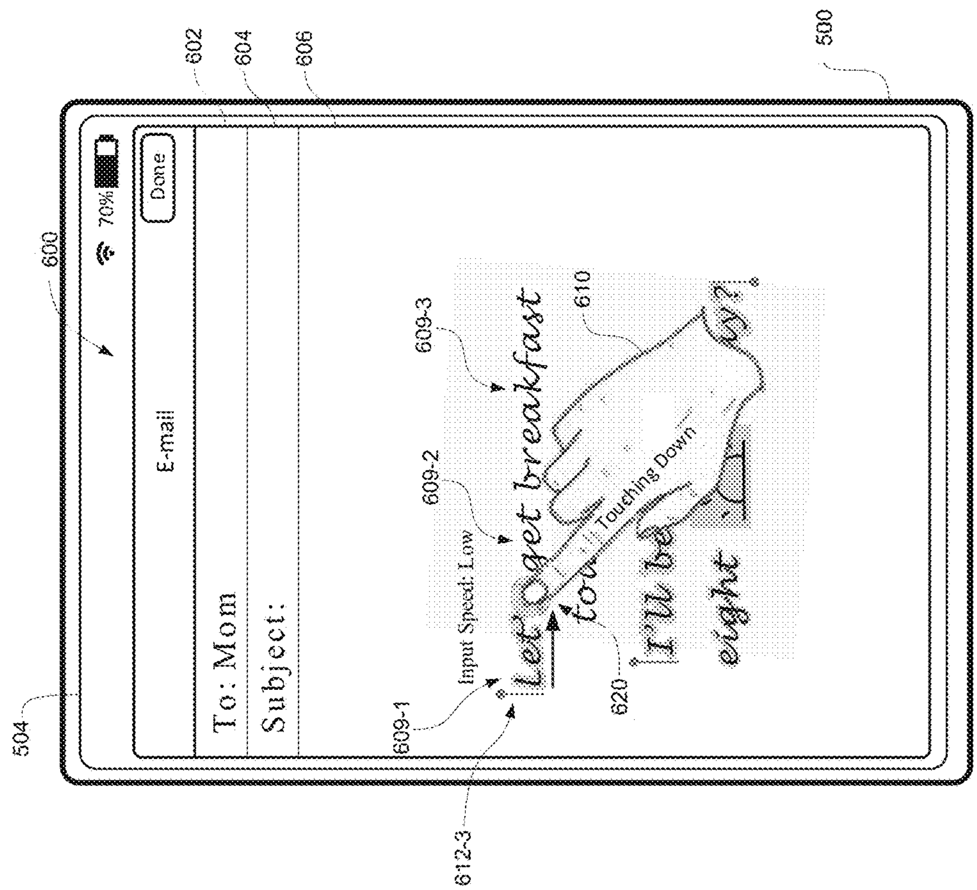
Figure 6S:
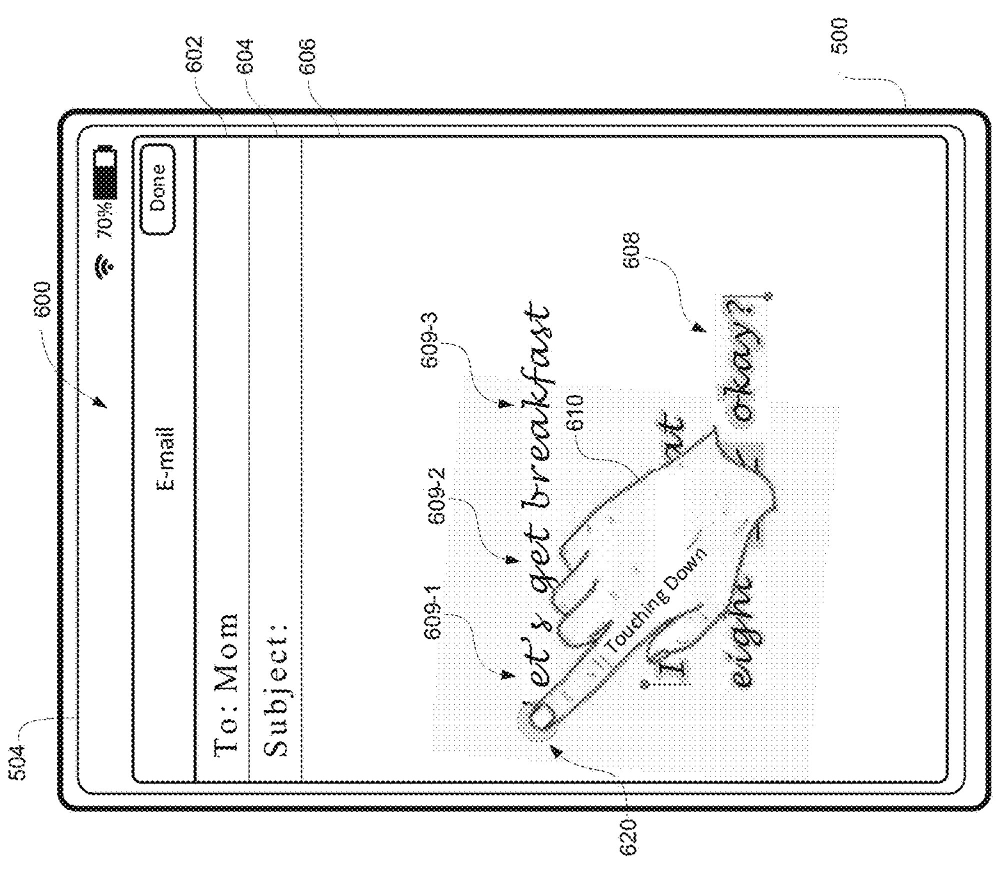

In FIG. 6S, after lift-off from touch screen 504 after having entered into selection painting mode, a contact from finger 610 is detected just to the left of word 609-1. In some embodiments, in response to detecting the contact from finger 610, painter element 620 is displayed centered at the location of the contact, as shown in FIG. 6S. In FIG. 6T, while maintaining contact with touch screen 504, a rightward movement of finger 610 is detected swiping across word 609-1. In some embodiments, in response to the rightward movement of finger 610 swiping across word 609-1, painter element 620 moves across word 609-1 in accordance with the rightward movement and word 609-1 is selected as a result, as shown in FIG. 6T. As described above, because word 609-1 is the first word encountered by painter element 620 and word 609-1 is not yet selected, word 609-1 is selected (e.g., highlighted) and subsequent characters or words encountered by painter element 620 (e.g., subsequent characters or words encountered by painter element) are also selected (e.g., if the characters or words are already selected, they optionally remain selected in response to being encountered by painter element 620).

As shown in FIG. 6T, the input speed (e.g., movement speed) of the rightward movement of finger 610 is low. In some embodiments, because the input speed of the movement of finger 610 is low, painter element 620 has a small size (e.g., 0.5 mm^2, 1 mm^2, 4 mm^2, 25 mm^2, 100 mm^2, etc.). Thus, because painter element 620 has a small size, the contact of finger 610 has to be within a small distance (e.g., the radius of painter element 620) from a character or word for the respective character or word to be selected. As shown in FIG. 6T, during the selection painting mode, device 500 is able to select noncontiguous words (e.g., selecting word 609-1 and sentence 608 without selecting the other words/characters in sentence 609). In some embodiments, movement elements are displayed to the left and right of word 609-1 as a result of being selected (e.g., movement elements 612-3 and 612-4, in addition to the separate movement elements displayed with sentence 608).

Figure 6V:
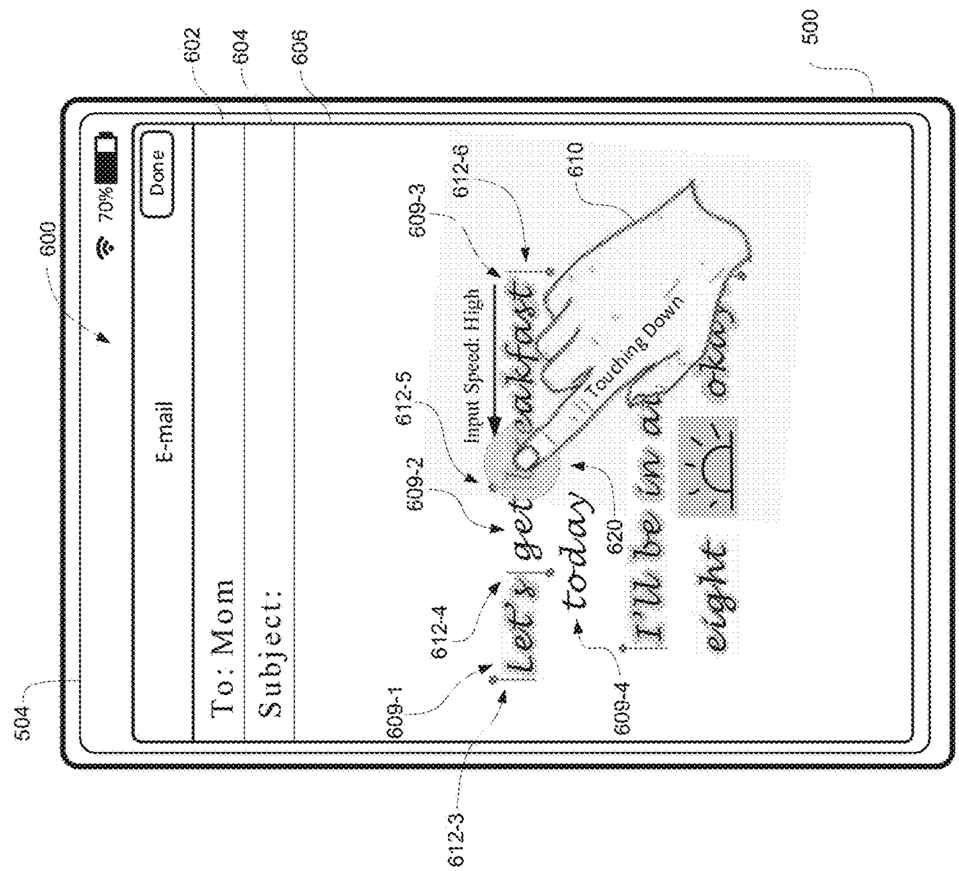
Figure 6U:
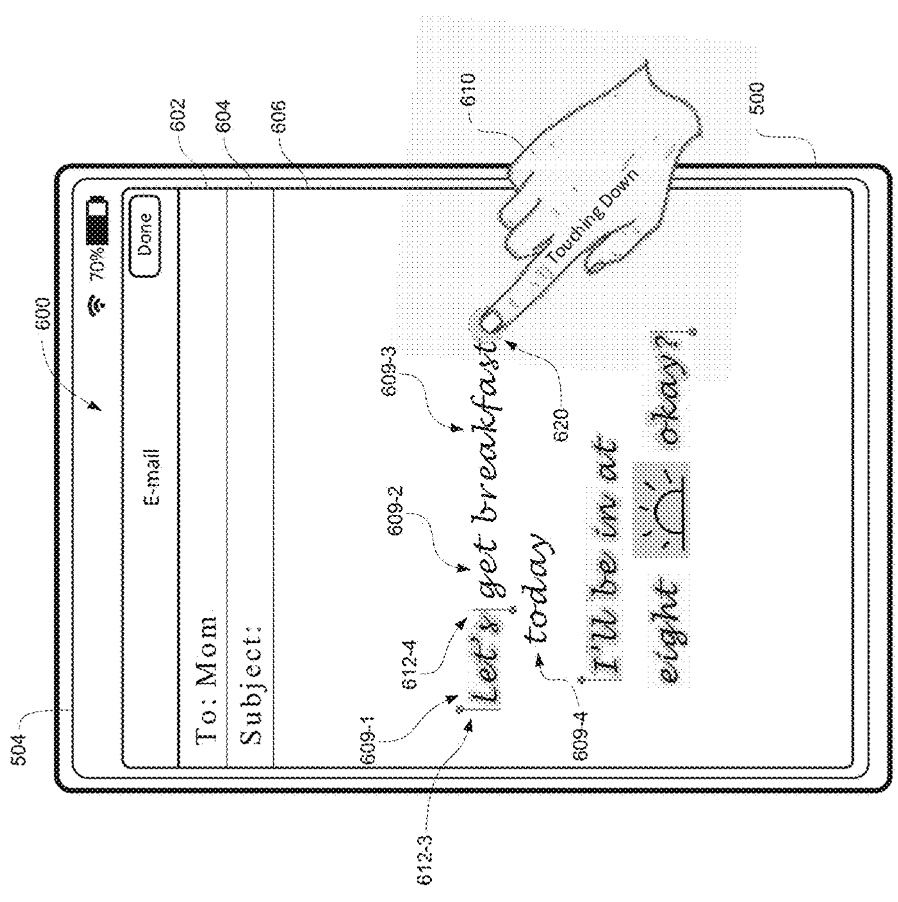

In FIG. 6U, a contact from finger 610 is detected just to the right of word 609-3. In some embodiments, in response to detecting the contact from finger 610, painter element 620 is displayed centered at the location of the contact, as shown in FIG. 6U. In FIG. 6V, while maintaining contact with touch screen 504, a leftward movement of finger 610 is detected swiping across word 609-3. In some embodiments, in response to the leftward movement of finger 610 swiping across word 609-3, painter element 620 moves across word 609-3 in accordance with the leftward movement and word 609-3 is selected as a result, as shown in FIG. 6V. As described above, because the first word encountered by painter element 620 is not selected, word 609-3 is selected (e.g., word 609-3 is a subsequently interacted word after word 609-1). As shown in FIG. 6V, the input speed (e.g., movement speed) of the rightward movement of finger 610 is high. In some embodiments, because the input speed of the movement of finger 610 is high, painter element 620 has a larger size (e.g., 4 mm^2, 25 mm^2, 50 mm^2, 100 mm^2, 1000 mm^2, etc.). Thus, because painter element 620 has a larger size, the contact of finger 610 is able to be within a larger distance (e.g., the radius of painter element 620) from a character or word for the respective character or word to be selected. In some embodiments, movement elements are displayed to the left and right of word 609-3 (e.g., movement elements 612-5 and 612-6).

Figure 6X:
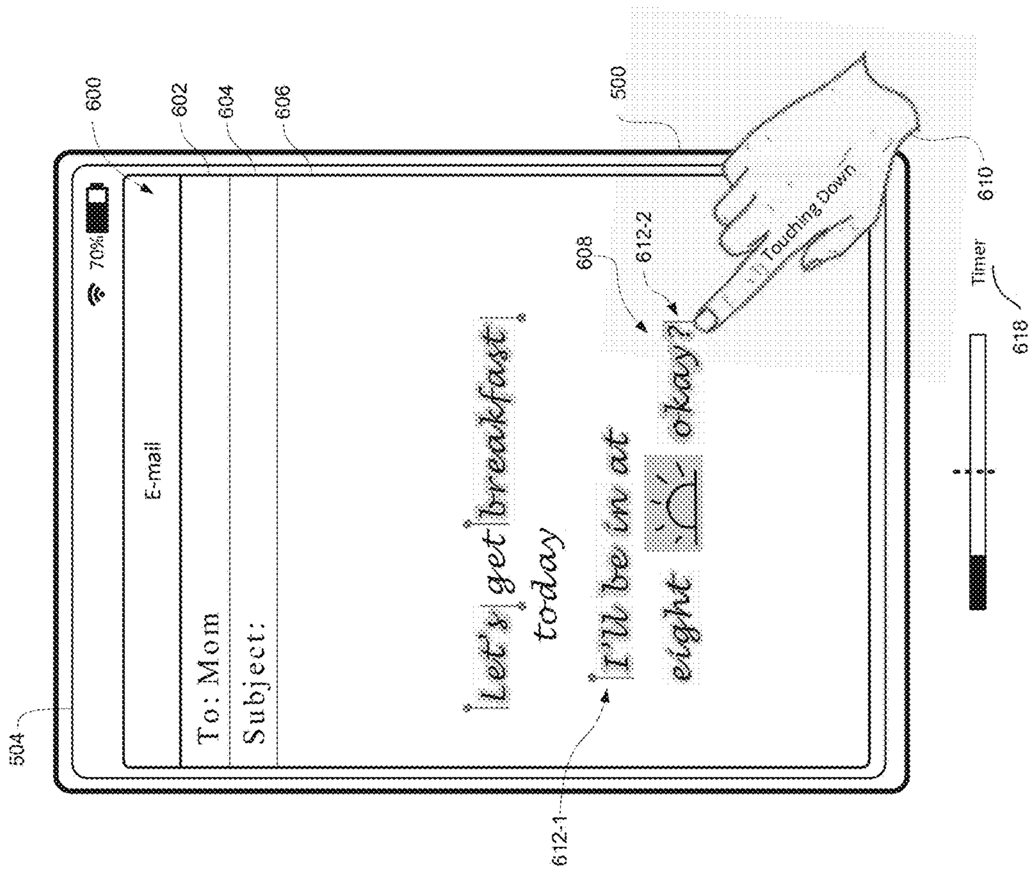
Figure 6W:
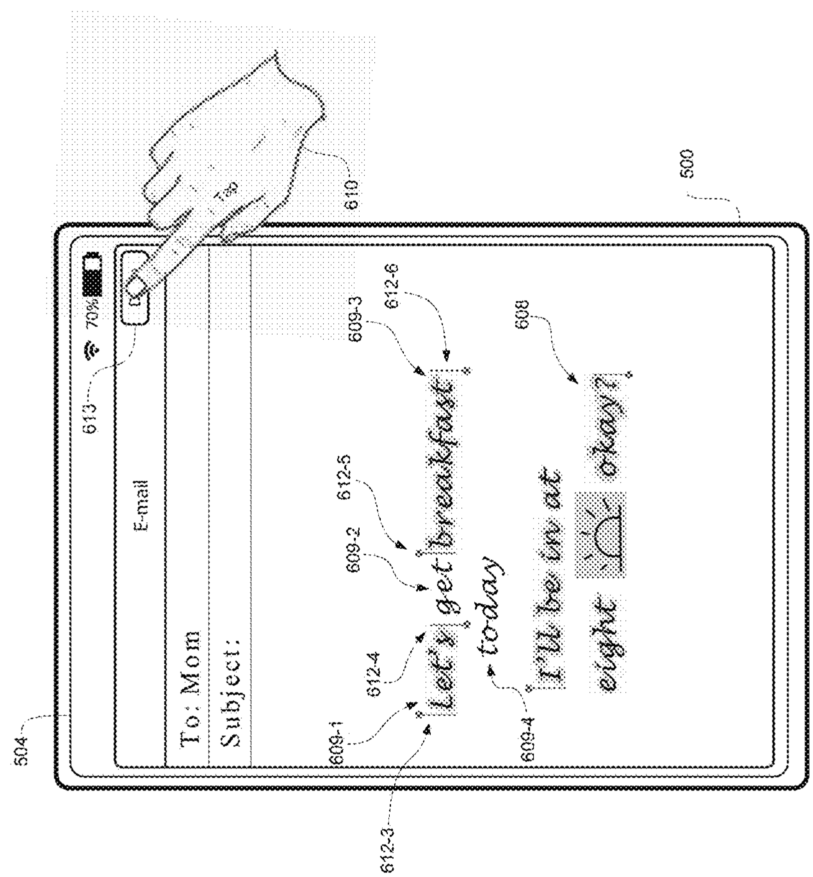

In FIG. 6W, a selection input on affordance 613 is received. In some embodiments, in response to the selection input, device 500 terminates selection painting mode, as shown in FIG. 6X. In some embodiments, affordance 613 is displayed in response to device 500 entering selection painting mode.

In FIG. 6X, a contact from finger 610 is received on a respective portion of movement element 612-2. In some embodiments, finger 610 is selecting the bulb portion of movement element 612-2. In FIG. 6X, the contact with movement element 612-2 is held for less than the threshold amount of time (e.g., as illustrated by timer 618). In FIG. 6Y, the contact with the respective portion of movement element 612-2 is held for longer than the threshold amount of time (e.g., 0.25 seconds, 0.5 seconds, 1 second, 3 seconds, 5 seconds, etc.). In some embodiments, in response to the contact with the respective portion of movement element 612-2 being held for longer than the threshold amount of time, device 500 enters into a selection painting mode, as shown in FIG. 6Y. In some embodiments, while in selection painting mode, painter element 620 is displayed at the location of the contact of finger 610 with touch screen 504.

In some embodiments, as described above, if a contact with a portion of movement element 612-2 other than the bulb portion of movement element 612-2 is held for longer than the threshold amount of time, device 500 does not enter into selection painting mode. In some embodiments, contact with a portion of movement element 612-2 other than the bulb portion allows the user to drag movement element 612-2 to select more or fewer characters, as described above with respect to FIG. 6I.

Figure 6Z:
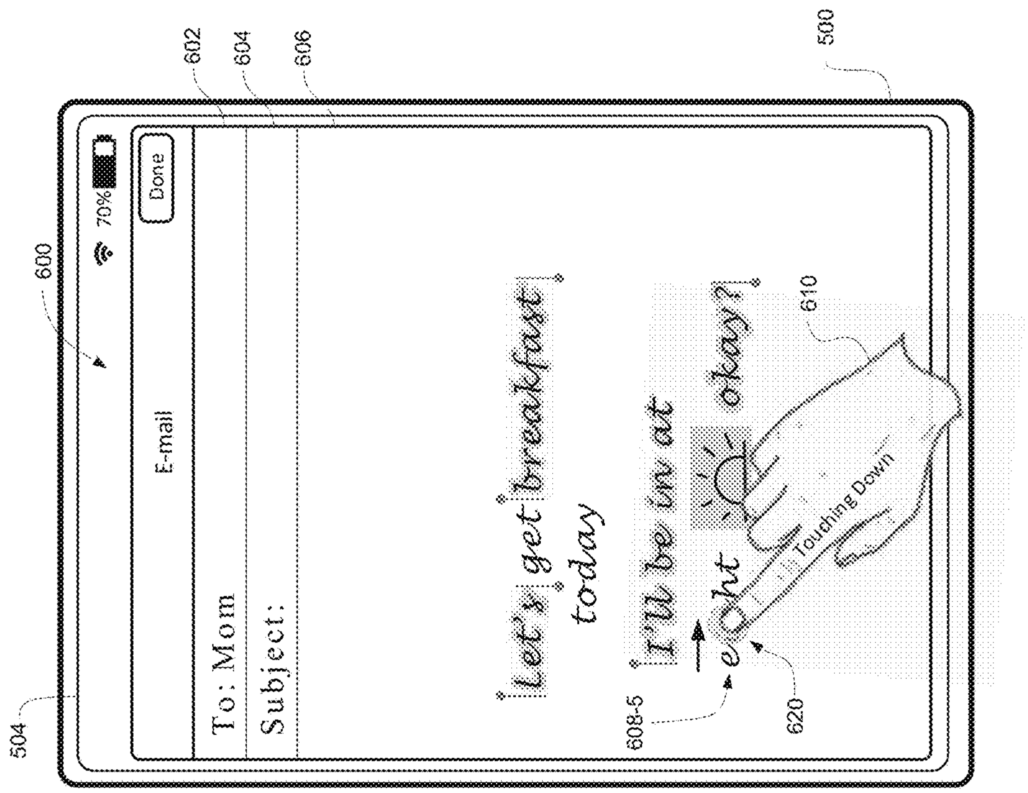
Figure 6Y:
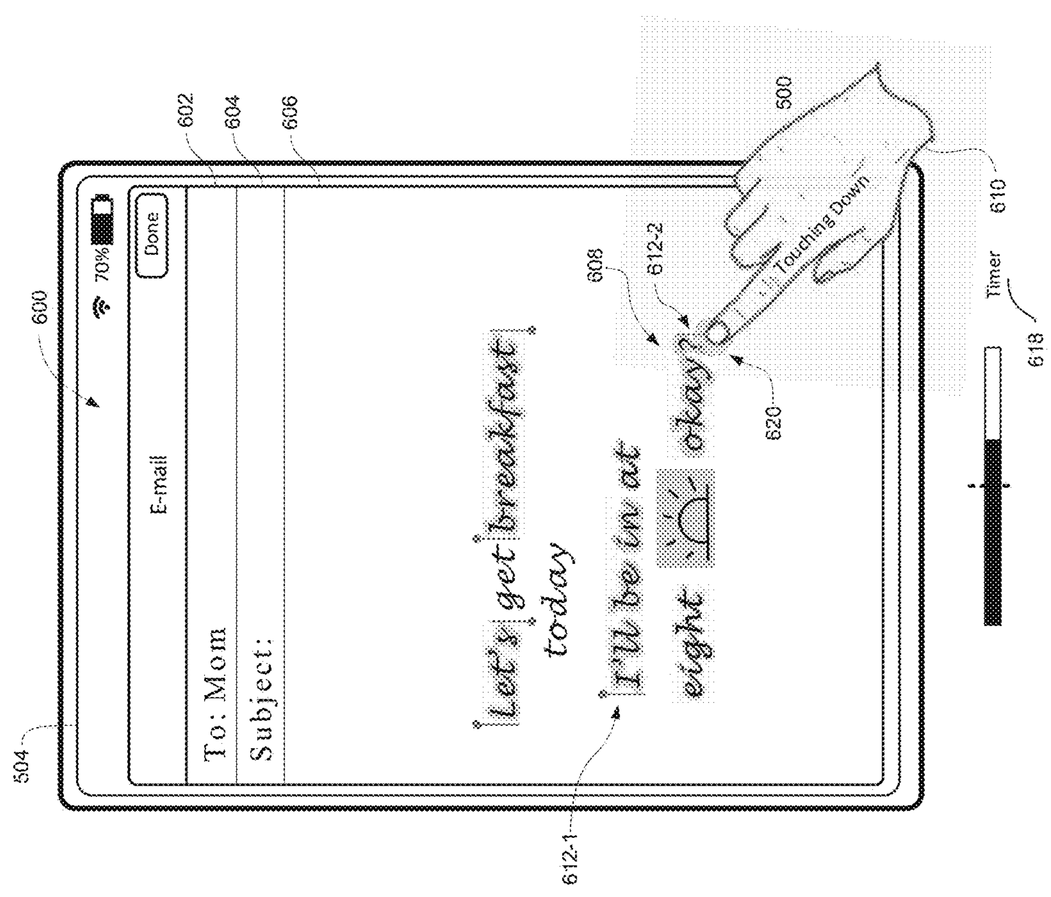
Figure 6B:
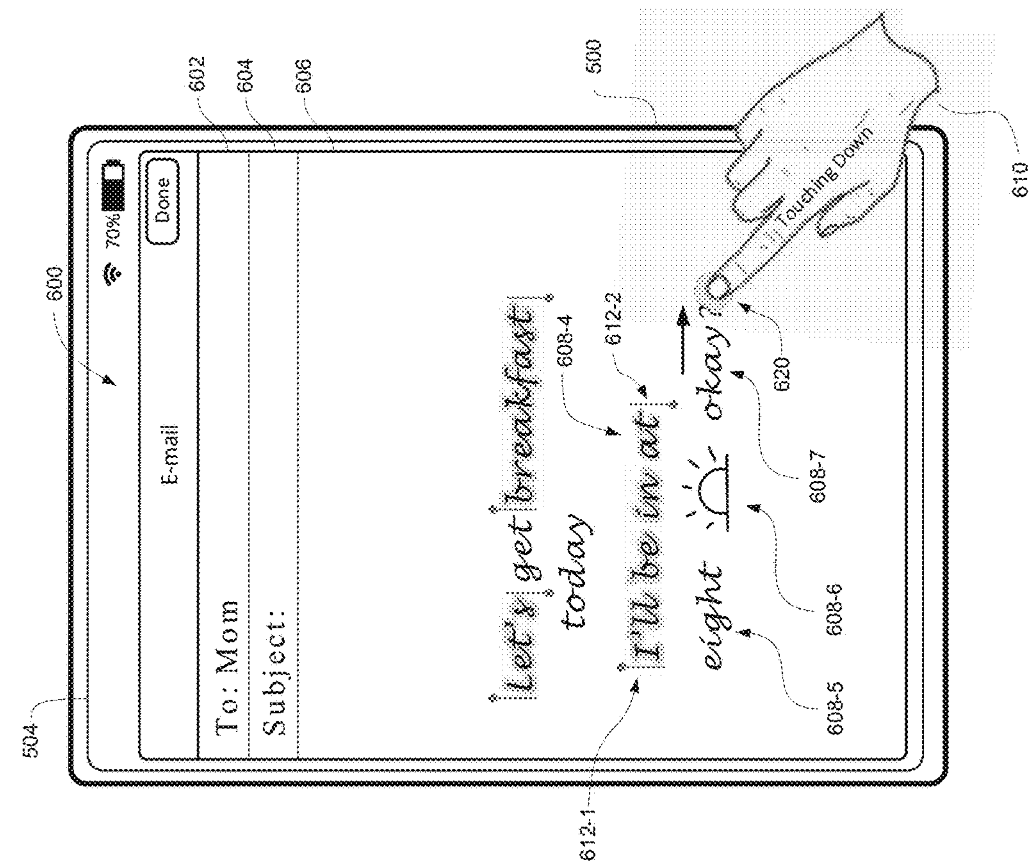
Figure 6A:
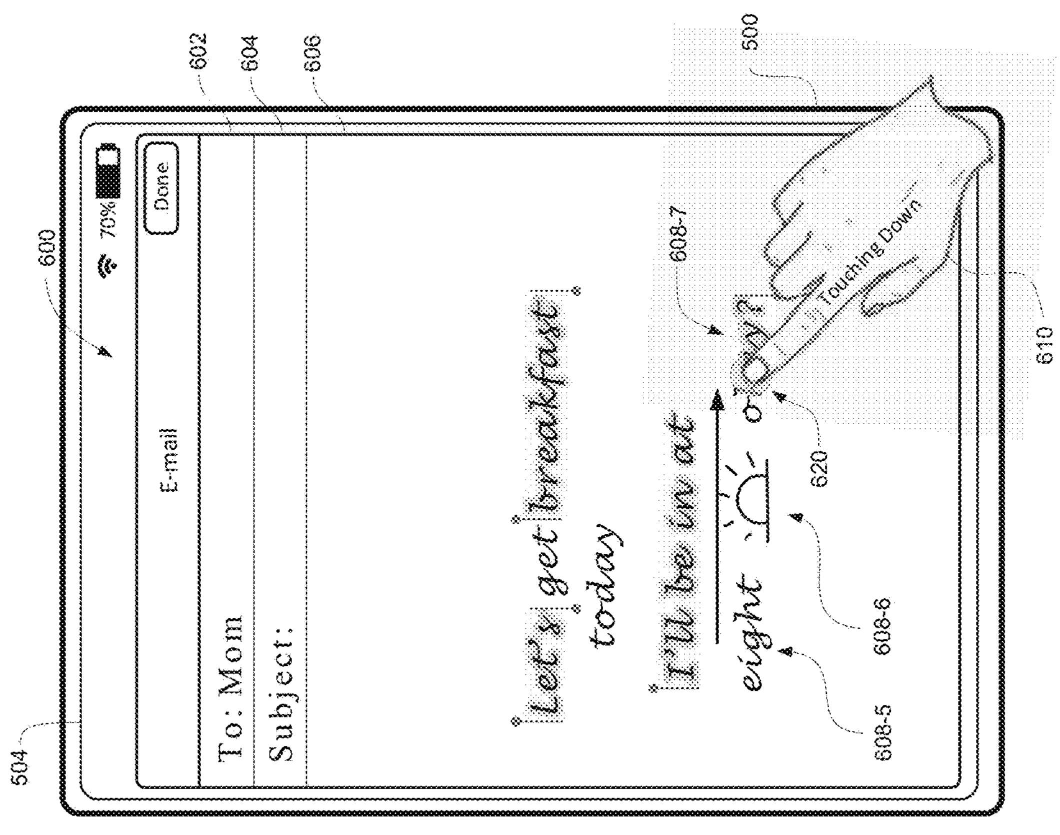
Figure 6D:
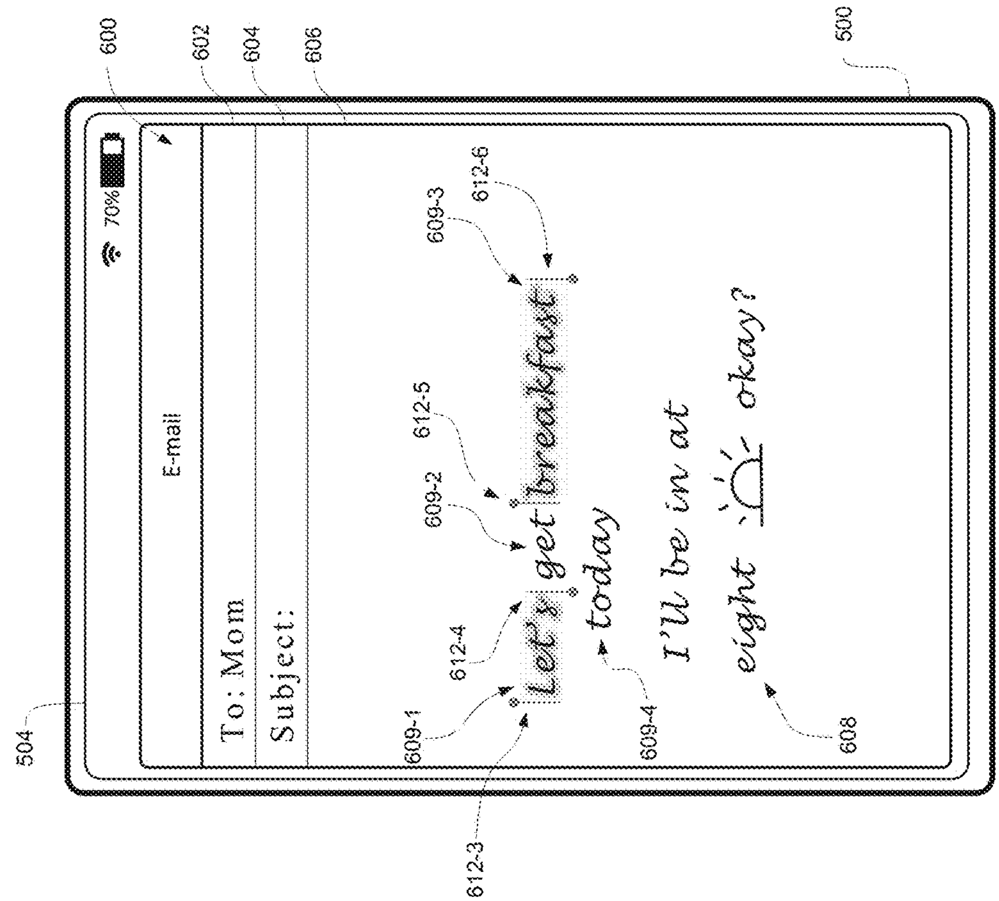
Figure 6C:
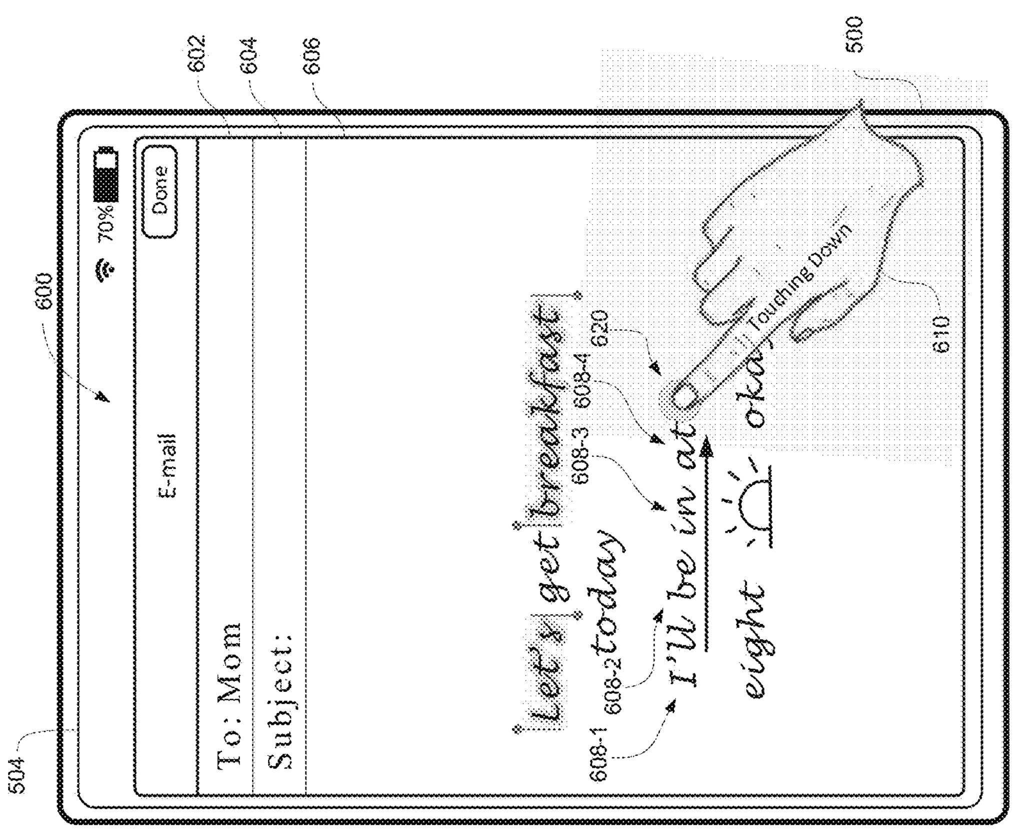
Figure 6E:
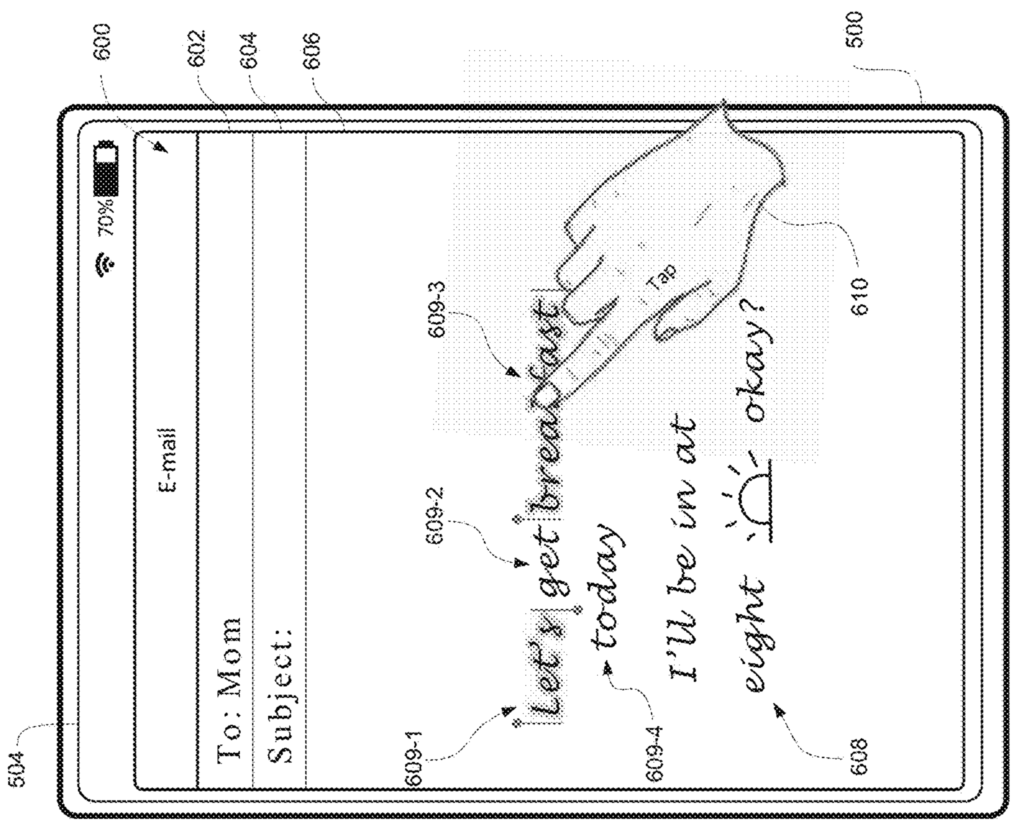
Figure 6F:
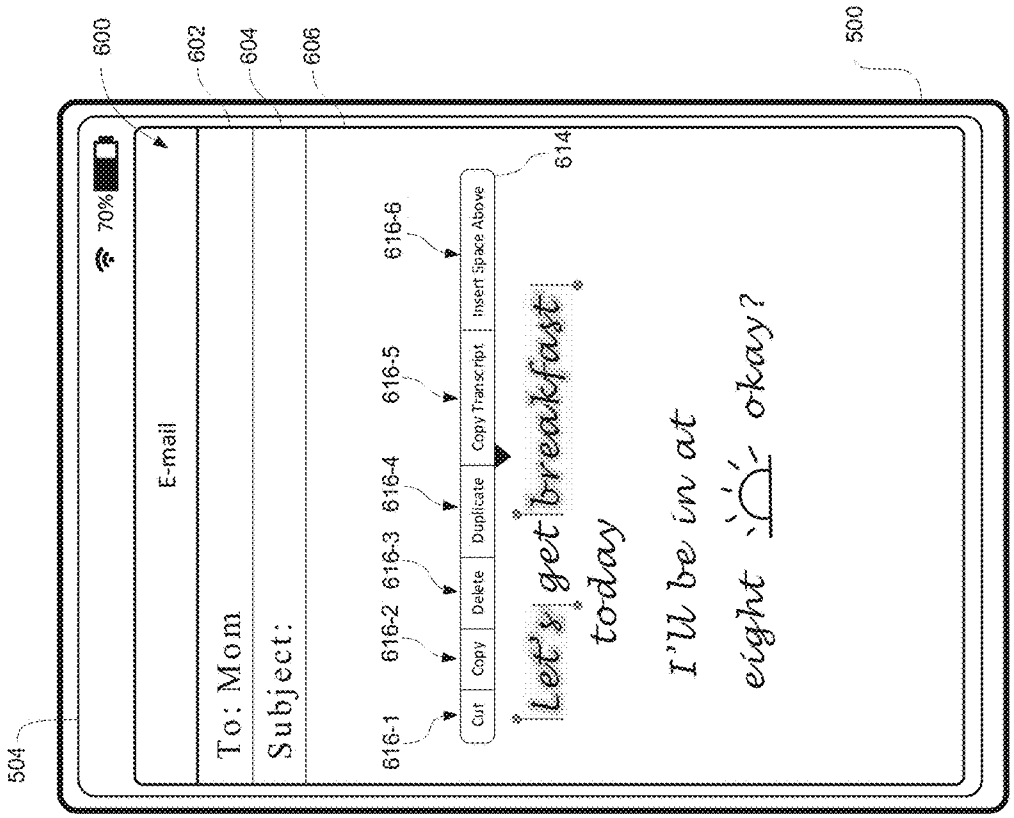
Figure 6G:
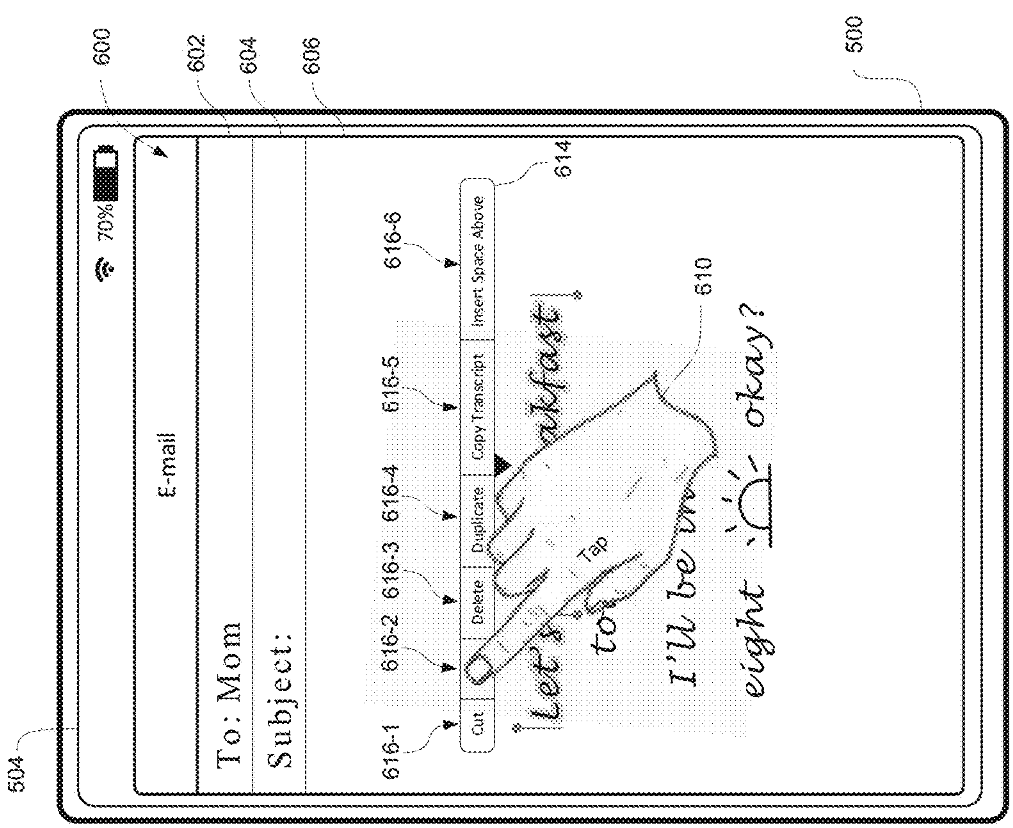
Figure 6H:
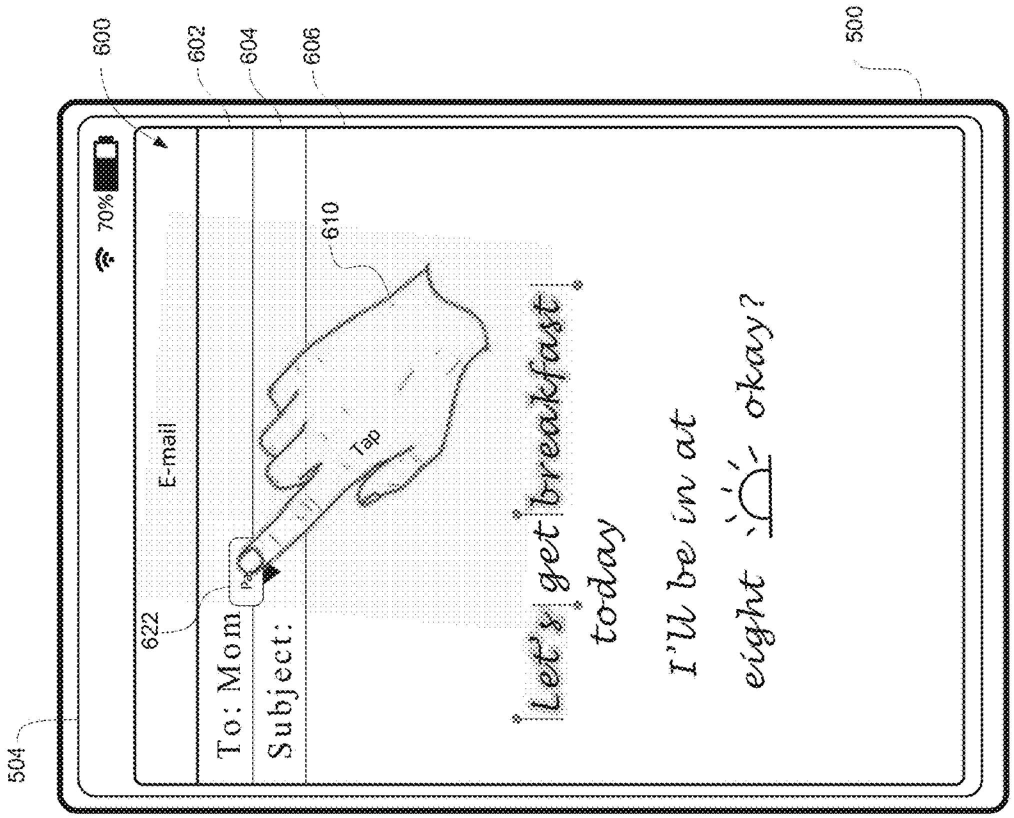
Figure 6I:
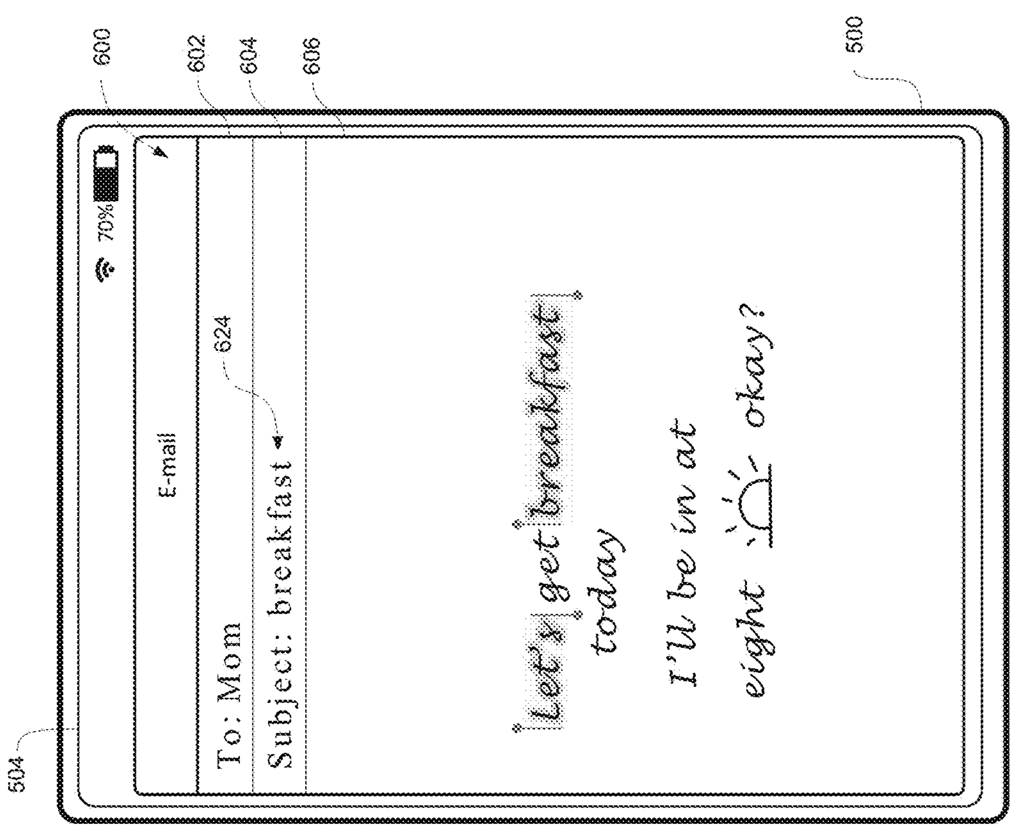
Figure 6J:
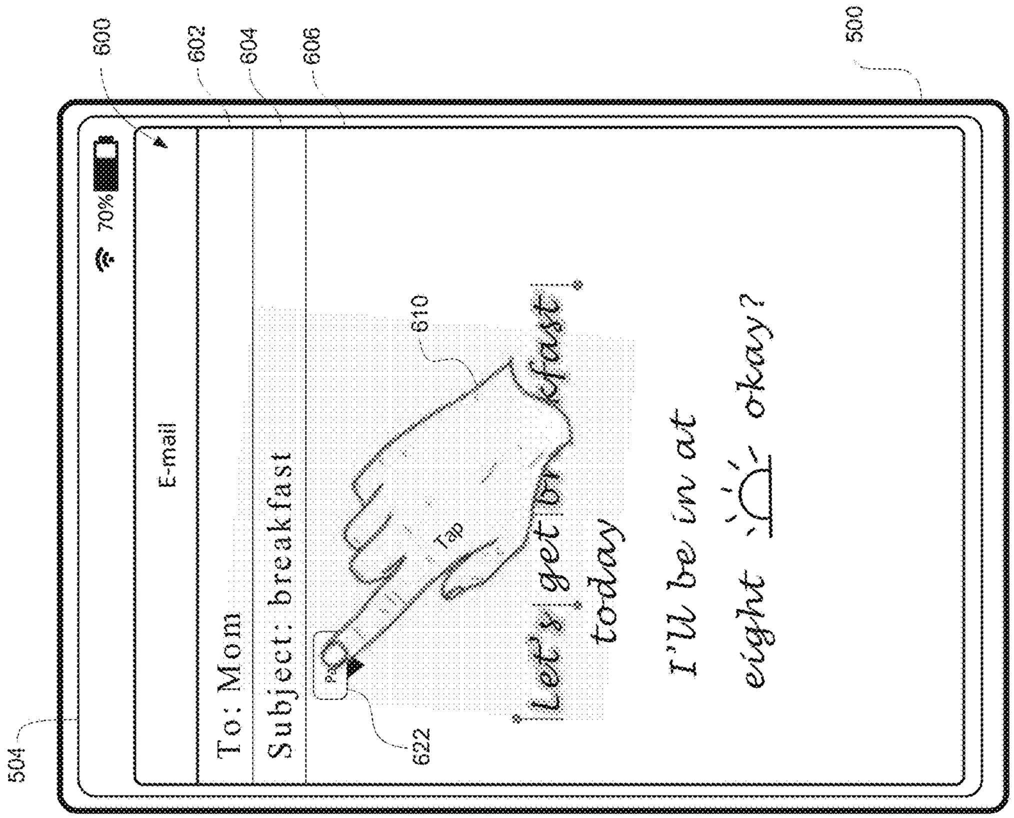
Figure 6L:
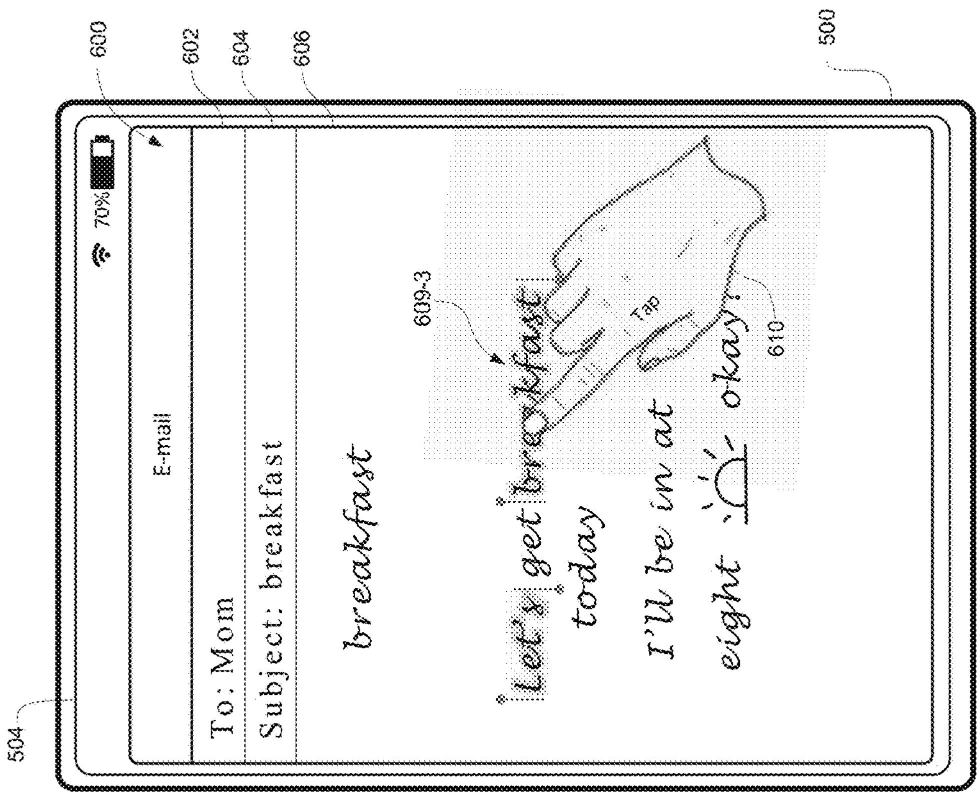
Figure 6K:
Figure 6N:
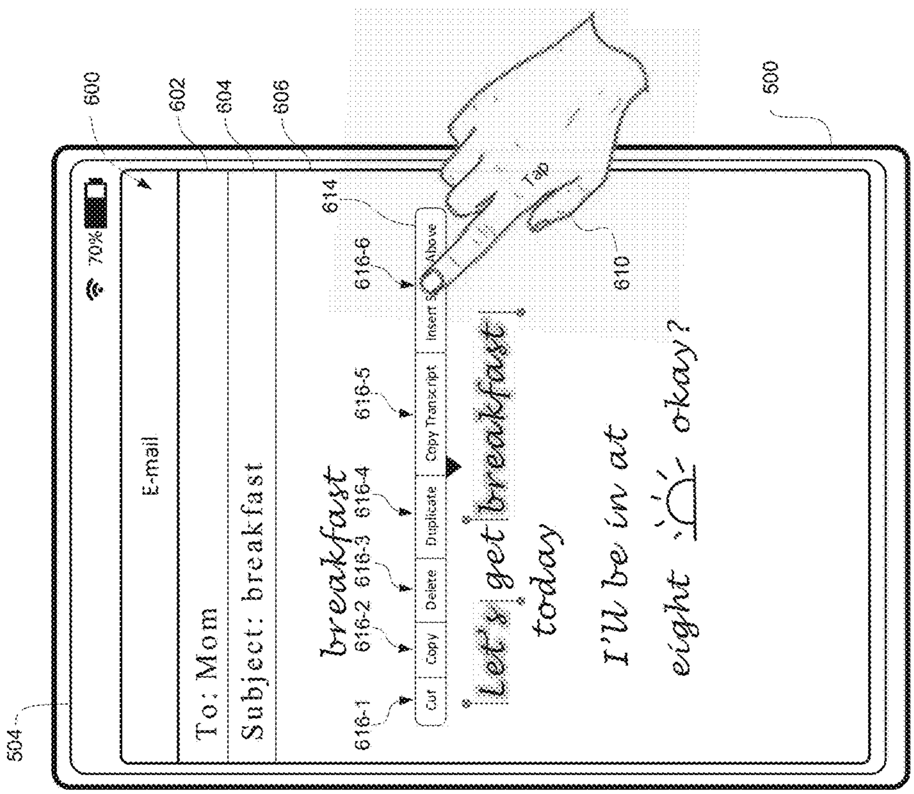
Figure 6M:
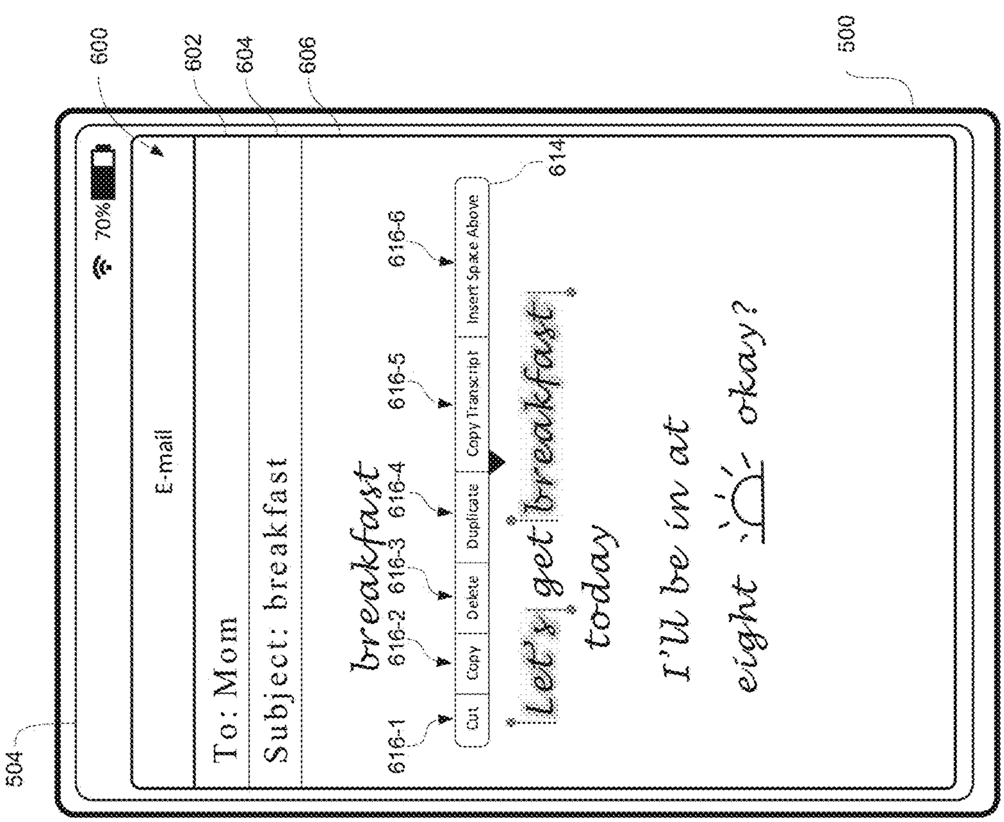
Figure 6P:
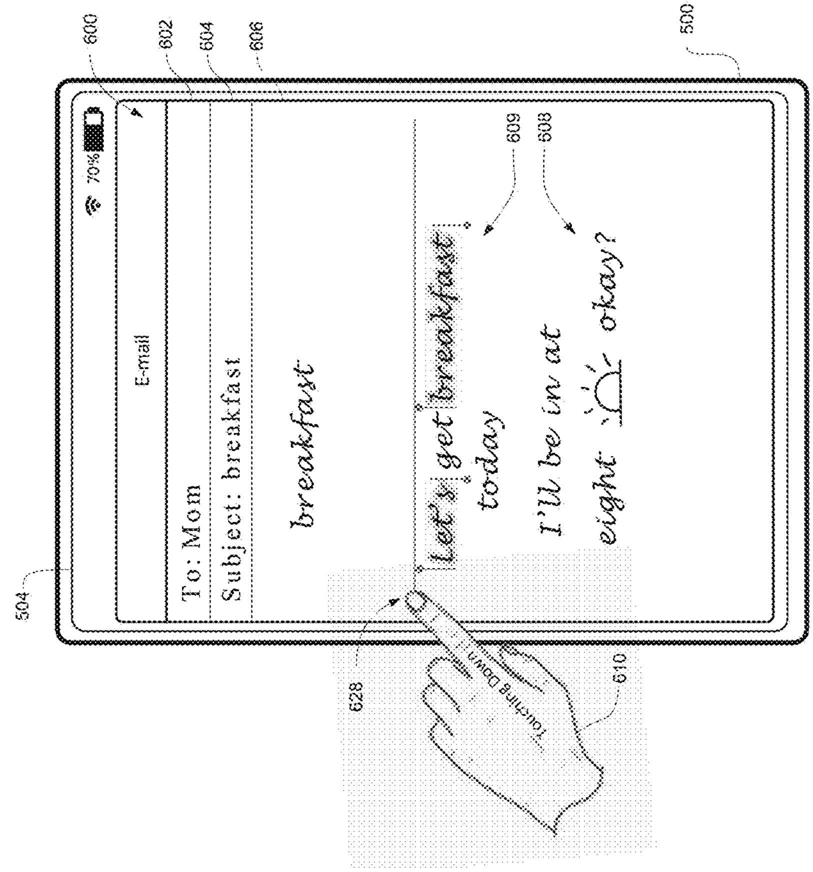
Figure 6O:
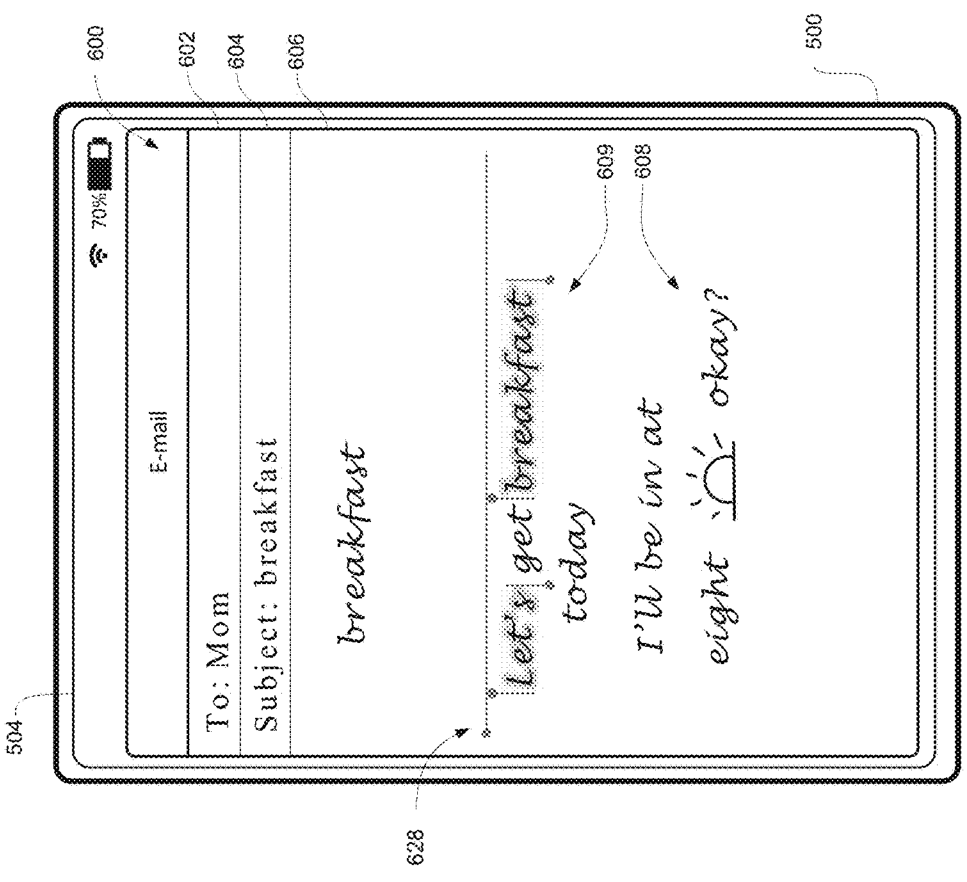
Figure 6Q:
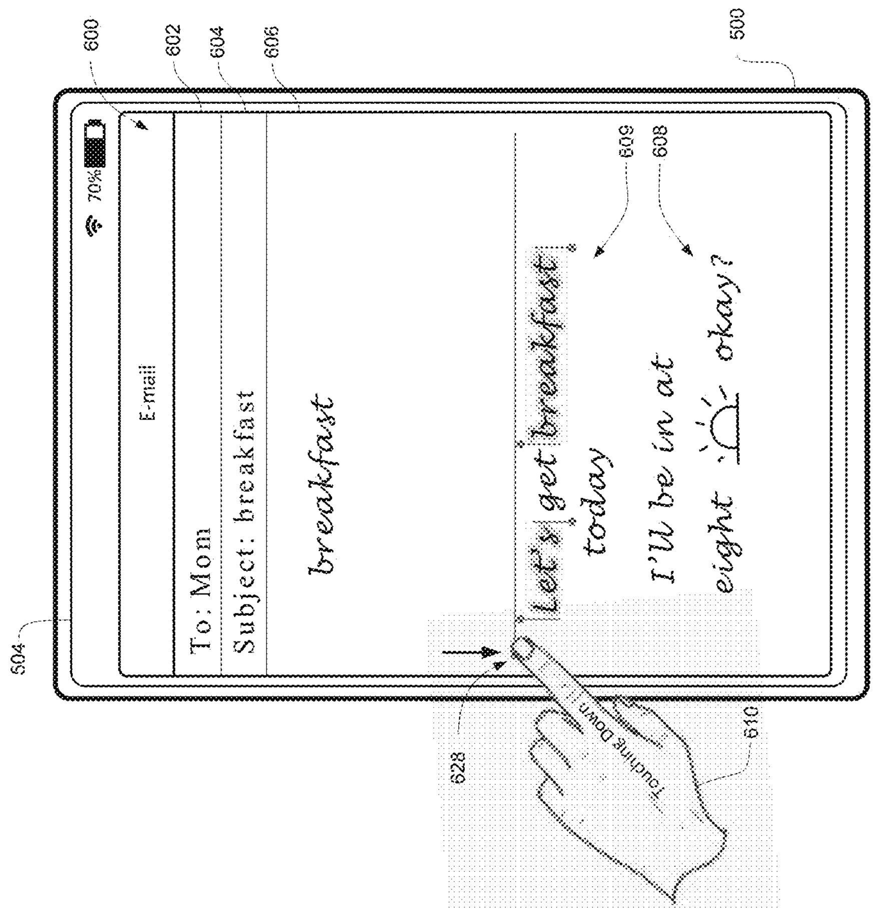
Figure 7B:
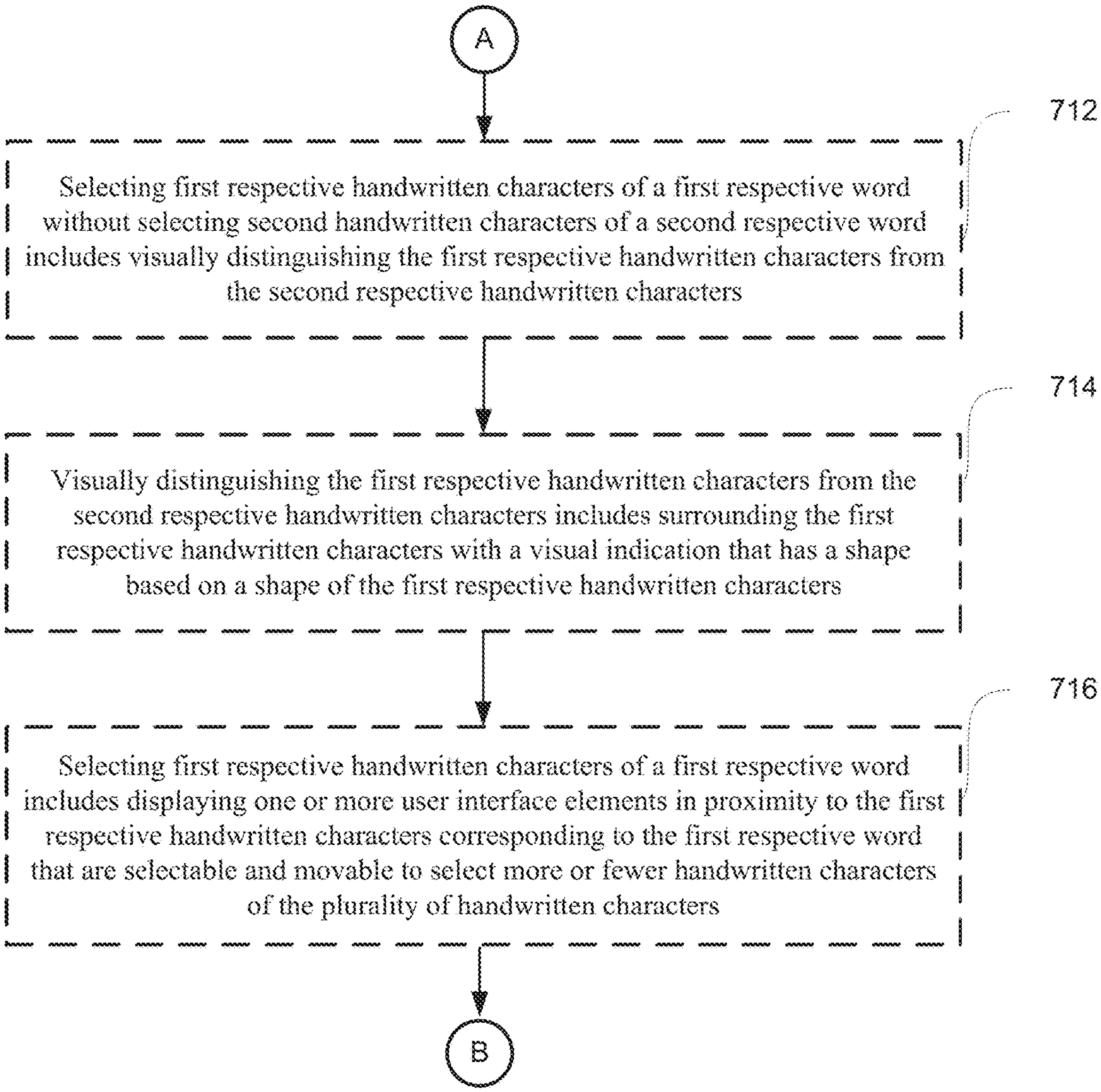
Figure 7C:
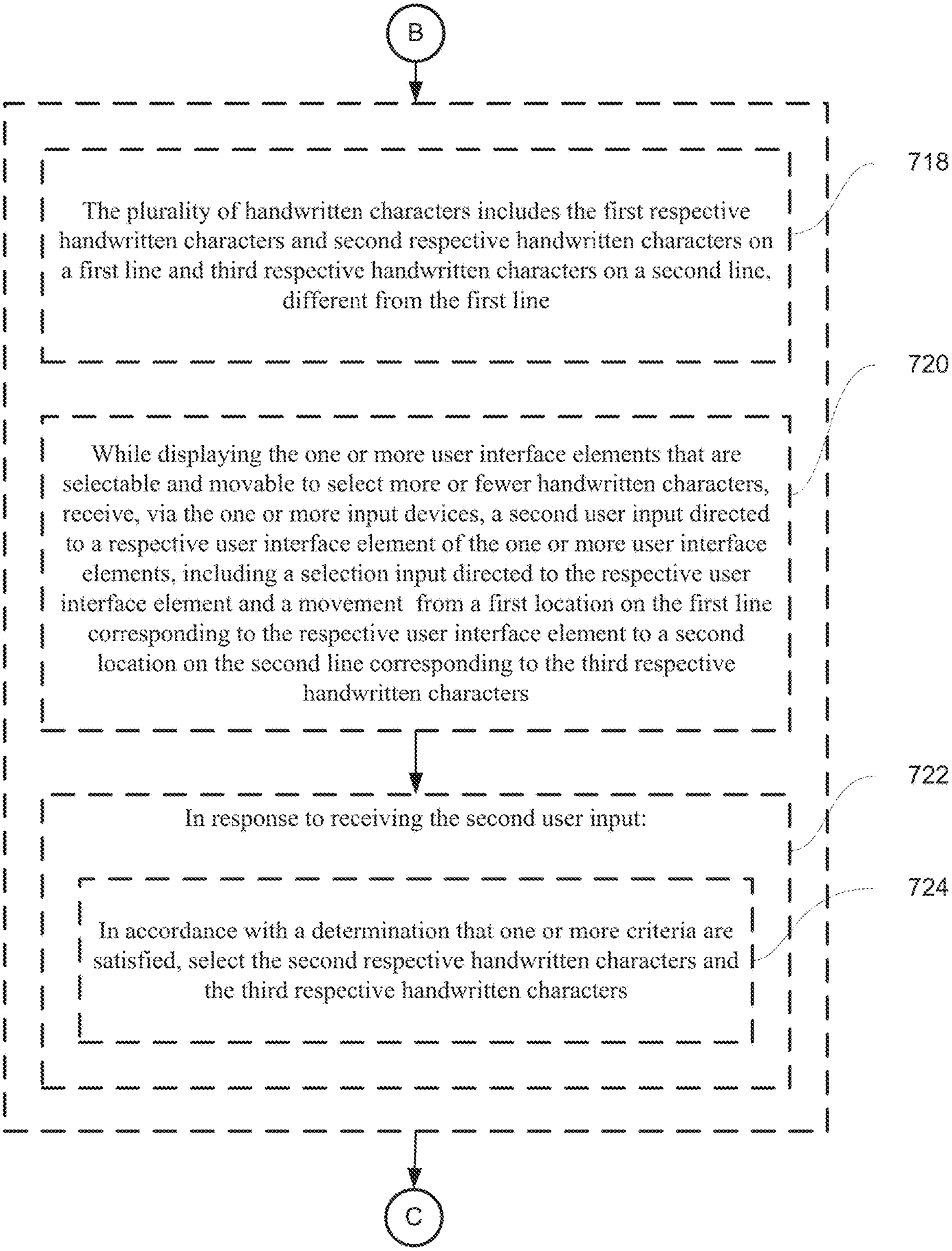
Figure 7E:
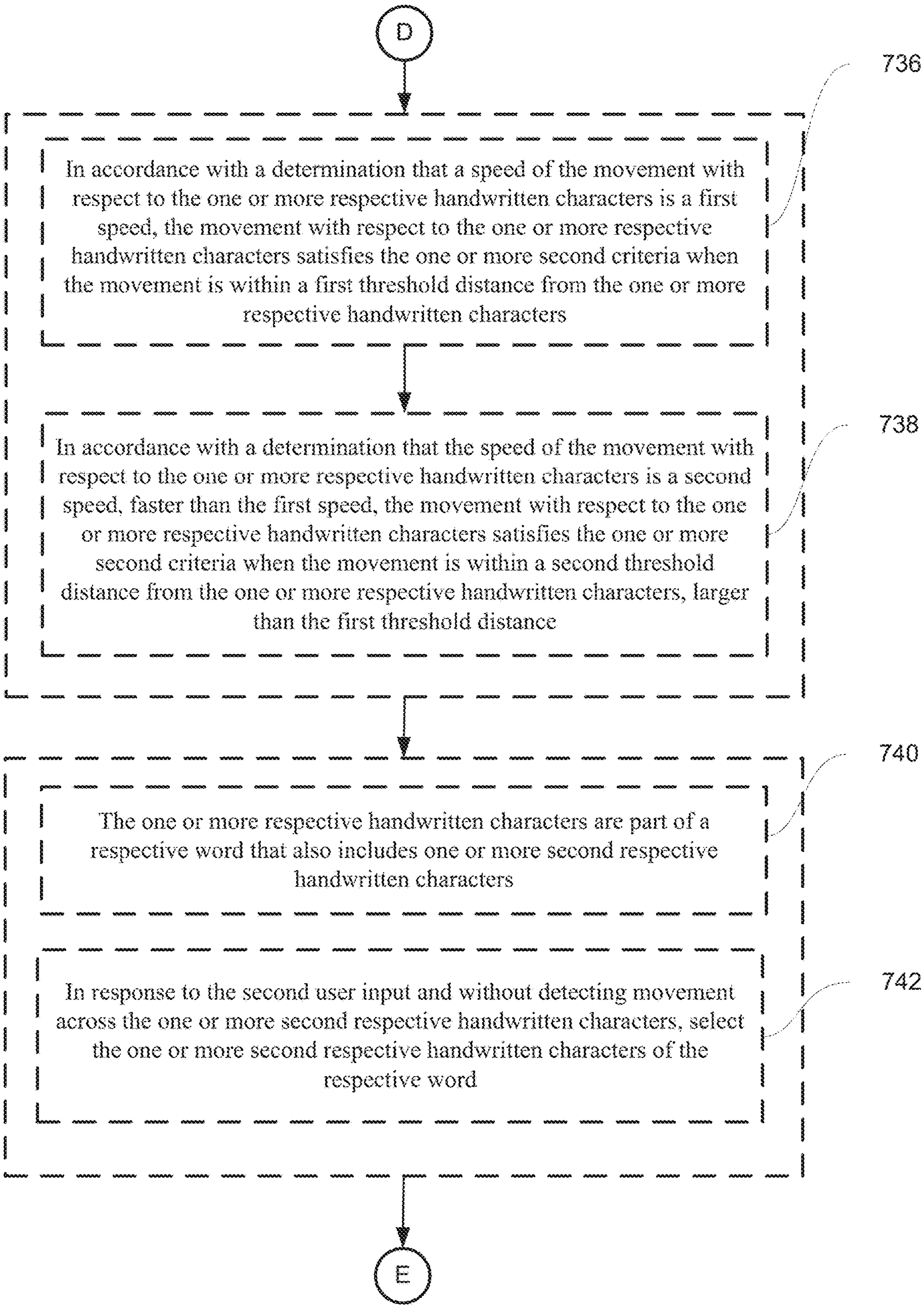
Figure 7F:
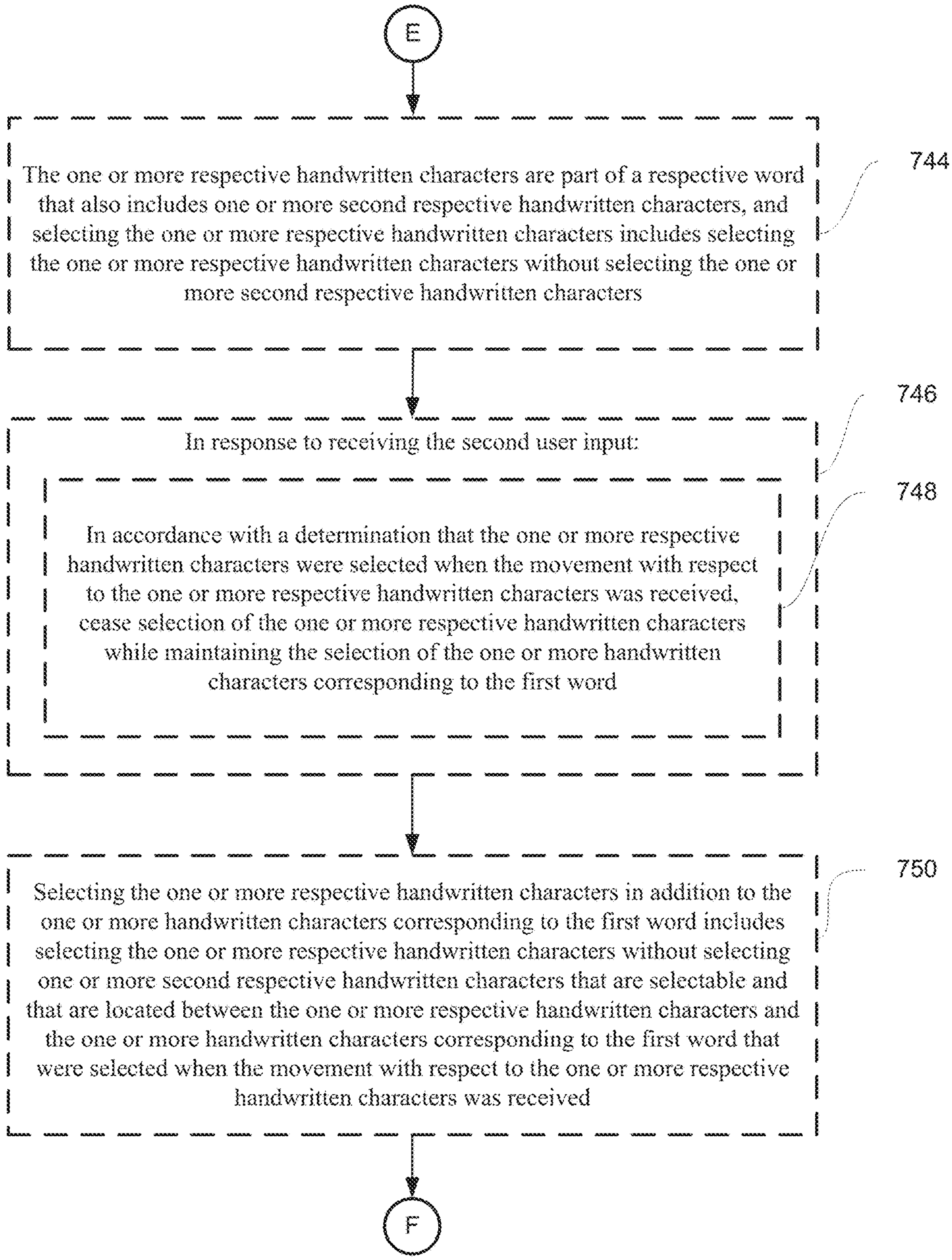
Figure 7G:
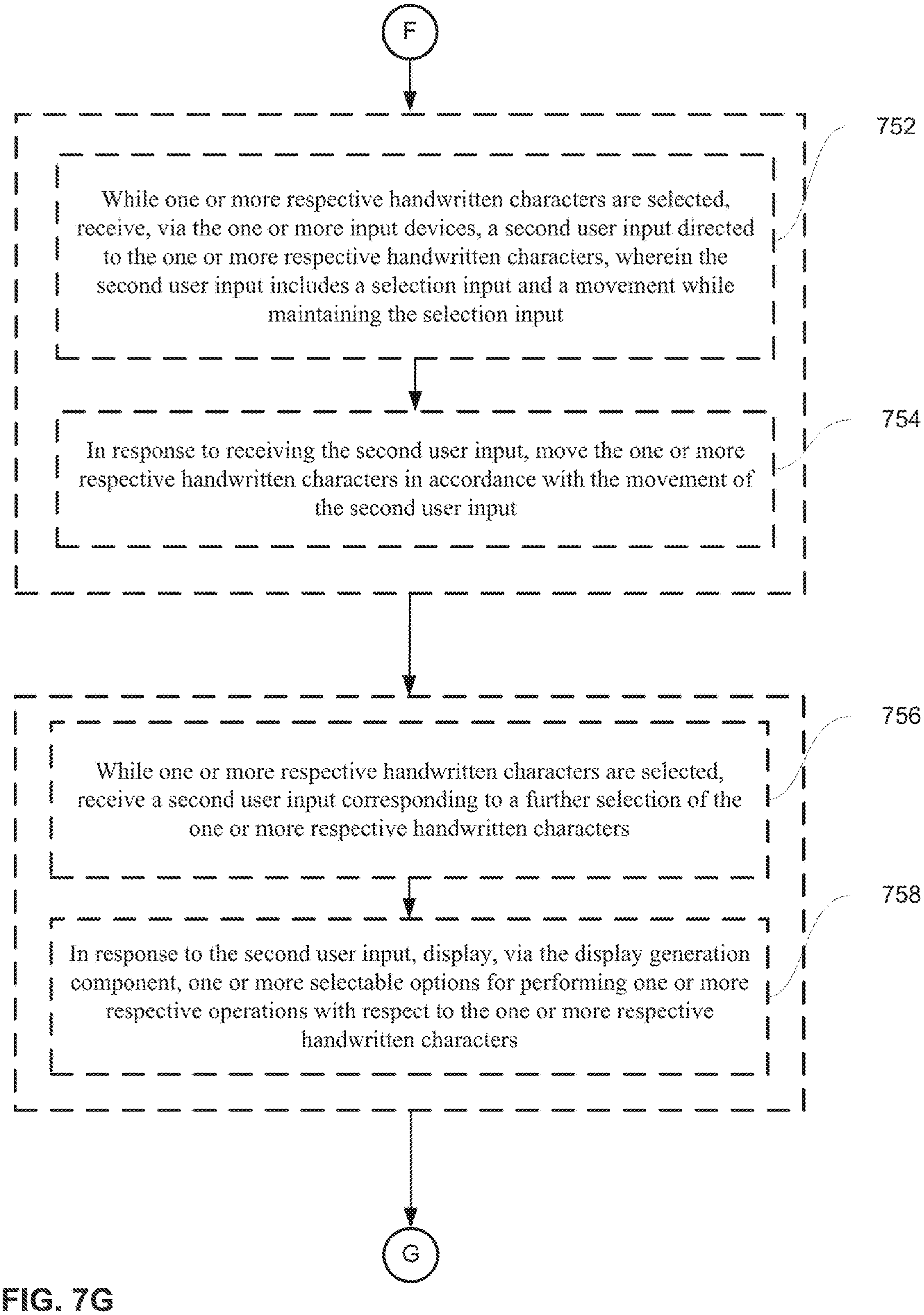
Figure 7H:
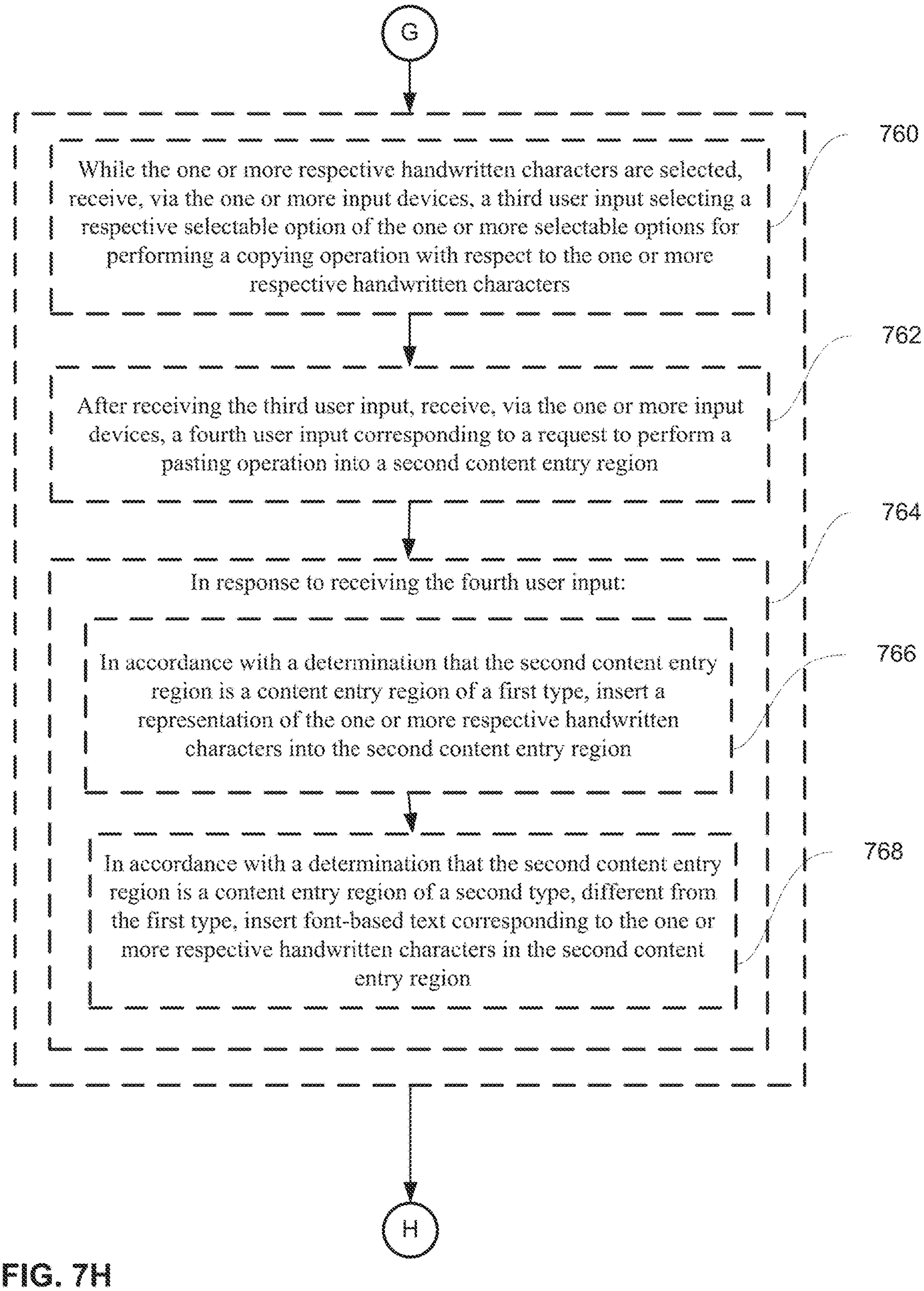
Figure 7I:
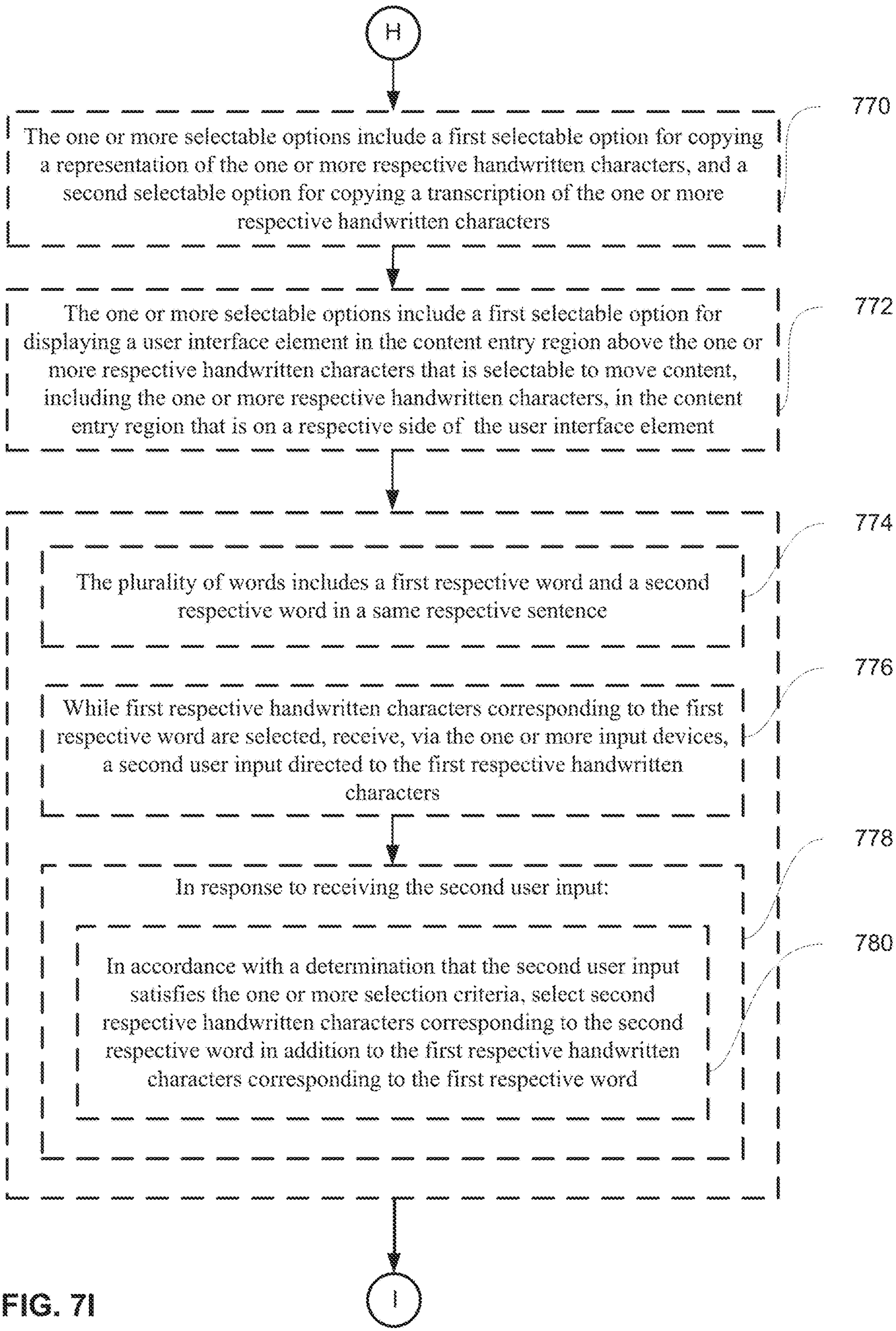

In FIG. 6Z, a contact and rightward movement from finger 610 is received from the left side of word 608-5. In some embodiments, in response to receiving the contact and movement from finger 610 across the letters of word 608-5, painter element 620 moves rightwards in accordance with the rightward movement and letters "e" and "i" of word 608-5 are deselected, as shown in FIG. 6Z. As described above, because word 608-5 is the first word encountered by painter element 620 and word 608-5 is already selected, letters "e" and "i" of word 608-5 are deselected (e.g., unhighlighted) and subsequent characters or words encountered by painter element 620 are also de-selected (e.g., optionally even if the characters or words are already not selected). As shown in FIG. 6Z, in some embodiments, highlighting or unhighlighting any letter of a word causes the entire word to be highlighted or unhighlighted, respectively. Thus, in FIG. 6Z, in response to the user interacting with the letters "e" and "i", word 608-5 is deselected (e.g., the characters "ght" of word 608-5 are unhighlighted, even though the user has not yet directly interacted with them).

As shown in FIG. 6Z, using painter element 620 (e.g., using selection painting mode), a user is able to deselect any letters or words in a sequence of words, without requiring that the deselected words be at the beginning or end of the sequence of words. For example, using a movement element (e.g., such as movement element 612-1 and movement element 612-2) allows a user to de-select words at the beginning or end of the sequence of selected words, but does not allow a user to de-select characters or words in the middle of the sequence of selected words.

FIG. 6AA illustrates an alternative embodiment to FIG. 6Z in which movement across particular characters cause the particular characters to be selected or selected without also selecting other characters in the same word that were not directly interacted with. In FIG. 6AA, a further rightward movement of finger 610 is detected moving painter element 620 across drawing 608-6 and the letters "o" and "k" of word 620. In some embodiments, in response to the further rightward movement, drawing 608-6 and letters "o" and "k" of word 620 are deselected, as shown in FIG. 6AA. In the embodiment illustrated in FIG. 6AA, movement across particular letters of a respective word causes the particular letters to be selected or deselected (e.g., as opposed to the entire word as shown in FIG. 6Z) and does not select or deselect the letters in the word that were not encountered by painter element 620.

In FIG. 6BB, a further rightward movement of finger 610 is detected moving painter element 620 across the rest of the letters of word 608-7. In some embodiments, in response to the further rightward movement, the remaining letters of word 608-7 are de-selected, as shown in FIG. 6BB. Thus, as illustrated above, in some embodiments, when painter element 620 is moved across one or more letters of a word, the entirety of the word is highlighted or unhighlighted (as the case may be) and in other embodiments, when painter element 620 is moved across one or more letters of a word, the one or more letters are highlighted or unhighlighted (as the case may be). In FIG. 6BB, because none of words 608-5, 608-7, or drawing 608-6 are selected, movement element 620-2 is relocated to the right side of word 608-4 (e.g., optionally movement element 612-2 is ceased to be displayed and a new movement element is displayed to the right of word 608-4). In some embodiments, the movement elements are dynamically updated based on the characters and words that are highlighted.

In FIG. 6CC, a contact and rightward movement from finger 610 is received moving painter element 620 across words 608-1 to 608-4. In some embodiments, in response to moving painter element 620 rightwards across words 608-1 to 608-4, words 608-1 to 608-4 are deselected, as shown in FIG. 6CC. As shown in FIG. 6CC, movement elements to the left and right of word 608-1 and word 608-4, respectively (e.g., movement elements 612-1 and 612-2 in FIG. 6BB), are no longer displayed in user interface 600.

In FIG. 6DD, selection painting mode has ended and word 609-1 and word 609-3 remain selected. In some embodiments, because word 609-1 and word 609-3 are selected and are noncontiguous (e.g., separated by word 609-2), two pairs of movement elements are displayed to the left and right of each of word 609-1 and word 609-3, as shown in FIG. 6DD.

In FIG. 6EE, a selection input from finger 610 (e.g., a tap) is received on word 609-3. In some embodiments, in response to the selection input, device 500 displays pop-up 614, as shown in FIG. 6FF. As described above with respect to FIG. 6M, pop-up 614 includes options 616-1 to 616-6. In FIG. 6GG, a selection input from finger 610 (e.g., a tap) is received on option 616-2. In some embodiments, in response to the selection input, handwritten word 609-3 is copied to device 500's clipboard. In some embodiments, word 609-3 is copied into the clipboard as a rich drawing (e.g., optionally including metadata indicating the recognized characters of word 609-3).

In FIG. 6HH, a request to paste the contents of the clipboard into text entry region 604 is received (e.g., a user input selecting option 622 to paste the contents of the clipboard, a user input selecting a keyboard shortcut corresponding to a "paste" function). In some embodiments, in response to the request to paste the contents of the clipboard into text entry region 604, font-based text 624 is inserted into text entry region 604, as shown in FIG. 6II. In some embodiments, text entry region 604 is compatible with font-based text and is not compatible with drawings or other graphics. In some embodiments where text entry region 604 is only compatible with font-based text, font-based text 624 corresponding to word 609-3 is inserted into text entry region 604 (e.g., in accordance with a determination that text entry region 604 is only compatible with font-based text, font-based text 624 corresponding to word 609-3 is inserted into text entry region 604)). In some embodiments, word 609-3 is converted into font-based text (e.g., by device 500) in response to receiving the request to paste word 609-3 into text entry region 604.

In FIG. 6JJ, a request to paste the contents of the clipboard into content entry region 606 is received (e.g., a user input selecting option 622 to paste the contents of the clipboard, a user input selecting a keyboard shortcut corresponding to a "paste" function). In some embodiments, in response to the request to paste the contents of the clipboard into content entry region 606, word 626 is inserted with the same "as-written" style as word 609-3 (e.g., handwritten styling), as shown in FIG. 6KK. Thus, in some embodiments, as illustrated above, device 500 automatically inserts either font-based text or a representation of the handwritten input based on whether the content is being inserted into a region that only supports font-based text or a region that supports drawing content and/or rich content (e.g., optionally if the region only supports drawing content or optionally even if the region also supports font-based text).

In FIG. 6LL, a selection input from finger 610 (e.g., a tap) is received on word 609-3. In some embodiments, in response to the selection input, device 500 displays pop-up 614, as shown in FIG. 6MM. As described above with respect to FIG. 6M, pop-up 614 includes options 616-1 to 616-6. In FIG. 6NN, a selection input from finger 610 (e.g., a tap) is received on option 616-6. In some embodiments, in response to the selection input, a horizontal movement element 628 is displayed above sentence 609 (e.g., above word 609-3), as shown in FIG. 6OO. In some embodiments, additionally or alternatively to display of horizontal movement element 628, sentence 609 and the content below sentence 609 is moved downwards and horizontal space is inserted above sentence 609.

In FIG. 6PP, a contact from finger 610 is received on a respective portion of horizontal movement element 628. In some embodiments, finger 610 is selecting the bulb portion of horizontal movement element 628. In FIG. 6QQ, a downward movement of finger 610 is detected while maintaining contact with touch screen 504. In some embodiments, in response to detecting the downward movement of finger 610, horizontal movement element 628 moves downward in response to the downward movement of finger 610, as shown in FIG. 6QQ. In some embodiments, the content in content entry region 606 below horizontal movement element 628 (optionally all content below horizontal movement element 628) is moved downwards in accordance with horizontal movement element 628 moving downwards. In some embodiments, the content in content entry region 606 below horizontal movement element 628 moves upwards when horizontal movement element 628 is moved upwards (e.g., via an upward swipe input). In some embodiments, the content in content entry region 606 above horizontal movement element 628 does not move in response to the movement of horizontal movement element 628 and remains at their original positions. Thus, a downward movement of horizontal movement element 628 causes the creation of space between the content below horizontal movement element 628 and the content above horizontal movement element 628 whereas an upward movement of horizontal movement element 628 causes a reduction of the space between the content below horizontal movement element 628 and the content above horizontal movement element 628.

In some embodiments, horizontal movement element 628 is displayed in response to content in content entry region 606 being selected. For example, if content entry region 606 includes selected content, then horizontal movement element 628 is displayed in content entry region 606 (e.g., without requiring a selection of option 616-6). As described above, horizontal movement element 628 optionally includes a bulb portion (e.g., the portion that is displayed in the left margin, the portion is displayed on the left side of the horizontal line portion, the portion that is selectable and moveable to cause content in content entry region 606 to be moved) and a horizontal line portion. In some embodiments, in response to content in content entry region 606 being selected, the bulb portion of horizontal movement element 628 is displayed and the horizontal line portion is not displayed. In some embodiments, in response to the user selecting the bulb portion, such as in FIG. 6PP, the horizontal portion is displayed concurrently with the bulb portion (e.g., extending rightwards from the bulb portion, across 50%, 66%, 75%, 90%, 95%, 99%, 100% of the width of content entry region 606). While the bulb portion is selected, an upward or downward movement of the contact causes horizontal movement element 628 to move upwards or downwards, respectively, and the content below the horizontal movement element 628 to move upwards or downwards, accordingly, as described above in FIG. 6QQ. In some embodiments, initially forgoing displaying the horizontal line portion (e.g., until a selection of the bulb portion) simplifies the display and reduces the number of elements in content entry region.

In some embodiments, if horizontal movement element 628 bisects some content in content entry region 606 (e.g., the horizontal movement element is placed at a vertical position that divides some content), then device 500 is able to detect that the bisected content is a single unit and moves both portions of the content (e.g., the portion above and the portion below horizontal movement element 628) together when horizontal movement element 628 is moved. Thus, in some embodiments, moving horizontal movement element 628 can cause content both above and below horizontal movement 628 to move (e.g., if the content on one side is recognized as being a part of the content on the other side, such as being parts of the same handwritten stroke, drawing, object, etc.). In some embodiments, device 500 moves the bisected content together (e.g., as one unit) only if the portion on the "wrong" side of horizontal movement element 628 is less than a threshold amount (e.g., less than 10%, 20%, 30%, 50%, 70% of the object is on the "wrong" side, or the content on the "wrong" side has a vertical height less than 0.5 mm, 1 mm, 5 mm, 1 cm, 2 cm, etc.).

For example, if content entry region 606 includes a drawing object (e.g., a shape, such as a rectangle, circle, etc.), and horizontal movement element 628 bisects through the top third of the drawing object, device 500 is able to recognize that the top third of the drawing object is a part of the same object as the bottom third of the drawing object. Thus, in this example, moving horizontal movement element 628 causes the drawing object to move (e.g., both the top third and bottom two thirds move together). In another example, if content entry region 606 includes a sentence and horizontal movement element 628 crosses through the center of the sentence (e.g., bisects the sentence vertically in half), device 500 is able to recognize the words in the sentence as a single unit and keep the entire unit (e.g., both the portions of the words above horizontal movement element 628 and the portions of the words below horizontal movement element 628) together when moving content. In some embodiments, if more than the threshold amount of the content is on the "wrong" side of the horizontal movement element 628, device 500 still keeps the content as a single unit, but does not move the content in accordance with the movement of the horizontal movement element. For example, in the examples described above, the drawing object or sentence is maintained at its original position while other content that falls on the respective side of horizontal movement element 628 moves in accordance with the movement of the horizontal movement element 628. In some embodiments, if more than the threshold amount of the content is on the "wrong" side of the horizontal movement element 628, device 500 bisects the content and the content is separated in accordance with the movement of the horizontal movement element 628.

FIGS. 7A-7J are flow diagrams illustrating a method 700 of selecting and providing for interaction with handwritten content. The method 700 is optionally performed at an electronic device such as device 100, device 300, device 500, device 501, device 510, and device 591 as described above with reference to FIGS. 1A-1B, 2-3, 4A-4B and 5A-5I. Some operations in method 700 are, optionally combined and/or order of some operations is, optionally, changed.

As described below, the method 700 provides ways to select and provide for interaction with handwritten content. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., device 500) in communication with a display generation component and one or more input devices (e.g., a mobile device (e.g., a tablet, a smartphone, a media player, or a wearable device), or a computer, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.) displays (702), via the display generation component, a user interface including a content entry region (e.g., a region in the user interface in which a user is able to input and/or enter text, images, multimedia, etc.), wherein the content entry region includes a plurality of handwritten characters corresponding to a plurality of words, including a first word and a second word, such as the words in sentence 608 and sentence 609 in FIG. 6A (e.g., a plurality of handwritten characters).

In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, in an email composition user interface, a content entry region for the body of the email is capable of receiving (and transmitting over email) text, still images, videos, attachments, etc. In another example, in a note taking application, a content entry region capable of receiving handwritten text, drawings, figures, etc. and capable of including/receiving images, drawings, etc. In some embodiments, the plurality of handwritten characters was previously inputted by the user or was pre-populated without user input. In some embodiments, the handwritten characters are or were inputted using a stylus.

In some embodiments, while displaying the user interface including the plurality of handwritten characters, the electronic device receives (704), via the one or more input devices, a user input directed to a respective handwritten character of the plurality of handwritten characters, such as the double tap input on word 608-5 in FIG. 6B (e.g., a user input selecting a respective character of a respective word). For example, a double-tap using a finger or stylus on a character of the respective word.

In some embodiments, in response to receiving the user input, in accordance with a determination that the user input satisfies one or more selection criteria (706), such as that the user input is a double tap in FIG. 6B (e.g., the input is a double tap), in accordance with a determination that the respective handwritten character corresponds to the first word (e.g., the handwritten character selected by the user input is a character of a first word in the plurality of characters), the electronic device selects (708) one or more handwritten characters of the plurality of handwritten characters corresponding to the first word without selecting handwritten characters of the second word, such as selection of word 608-5 in FIG. 6B (e.g., selecting the characters of the first word to which the selected character belongs, and not selecting the other handwritten characters of the plurality of handwritten characters, such as those corresponding to the second word).

In some embodiments, in accordance with a determination that the respective handwritten character corresponds to the second word (e.g., the handwritten character selected by the user input is a character of a second word), the electronic device selects (710) one or more handwritten characters of the plurality of handwritten characters corresponding to the second word without selecting handwritten characters of the first word, such as in FIG. 6B (e.g., selecting the characters of the second word to which the selected character belongs, and not selecting the other handwritten characters of the plurality of handwritten characters, such as those corresponding to the first word).

In some embodiments, a double tap input is a short contact with the touch-sensitive display (e.g., less than 0.1 seconds, 0.25 seconds, 0.5 seconds, 1 second, 2 seconds, 3 seconds, 5 seconds, etc.) followed by a lift-off of the contact, followed shortly (e.g., within 0.1 seconds, 0.25 seconds, 0.5 seconds, 1 second, 2 seconds, 3 seconds, etc.) by a second short contact and lift-off. In some embodiments, the selection criterion includes a requirement that the handwritten characters are recognized by the device as characters and/or text (e.g., the handwriting is recognizable and the device recognized and/or identified one or more characters in the handwriting). In some embodiments, handwritten characters that have been recognized and/or identified remain displayed in their handwritten form and are not converted into font-based text. In some embodiments, the selection criterion does not include a requirement that the handwritten characters are recognized as characters (optionally the device is able to determine based on the characteristics of the handwriting whether certain strokes are likely to be a character and/or word and perform selection using this determination). In some embodiments, the selection criteria include a requirement that the handwritten input is performed while the device is in a handwritten text entry mode (e.g., a mode in which handwritten inputs are identified as text).

In some embodiments, selecting a character (or set of characters) includes highlighting the character (or set of characters). In some embodiments, the selected character(s) have a focus and/or are selected for input. In some embodiments, a user is able to interact with the selected character(s) such as cut, copy, delete, move, replace, etc.

In some embodiments, the device is able to text-recognize the characters in the handwritten input, while maintaining display of the handwritten input as handwritten input, and thus identify multiple words in the plurality of handwritten characters if they exist. In some embodiments, a word is identified semantically. In some embodiments, a word is identified based on spacing. For example, if a set of characters are spaced such that the characters are identified as a proper word, then the device identifies the set of characters as a word. In some embodiments, if a set of characters are spaced in such a way to indicate a potential word, but the string of characters do not match a recognized word, then the device does not recognize the string of characters as a word. In such embodiments, the device is able to determine whether fewer characters than those in the potential word are a proper word (e.g., despite the spacing not otherwise suggesting that the set of fewer characters is a word). In some embodiments, the device is able to determine whether more characters than those in the potential word are a proper word (e.g., despite the spacing not otherwise suggesting that the set of more characters is a word). In some embodiments, a word is identified based on the timing of the handwritten input. For example, if the handwritten input inserts a string of characters without pausing and then pauses for a threshold length of time (e.g., 0.1 seconds, 0.25 seconds, 0.5 seconds, 1 second, 2 seconds, 5 seconds, etc.) before entering a second string of characters, then the device is able to identify the first string of characters as a potential word separate from the second string of characters. In some embodiments, a word is identified using any combination of the above described factors.

The above-described manner of selecting handwritten characters (e.g., by selecting characters in a word of handwritten input in response to an input directed to a character of the word) allows the electronic device to quickly and efficiently select characters that make up words from handwritten input, which simplifies the interaction between the user and the electronic device and enhances the operability of the electronic device and makes the user-device interface more efficient (e.g., providing the ability to intelligently select collections of handwritten characters), which additionally reduces power usage and improves battery life of the electronic device by enabling the user to use the electronic device more quickly and efficiency, while reducing errors in usage.

In some embodiments, selecting first respective handwritten characters of a first respective word without selecting second handwritten characters of a second respective word includes visually distinguishing the first respective handwritten characters from the second respective handwritten characters (712), such as the highlighting on word 608-5 in FIG. 6B (e.g., highlighting the first respective handwritten characters and not highlighting the second respective handwritten characters).

In some embodiments, highlighting the first respective handwritten characters includes displaying a background or shadow behind the first respective handwritten characters with a predetermined color (e.g., yellow) or with a color different from the color of the respective handwritten characters (e.g., if the handwritten characters are yellow, the highlighting is a color other than yellow).

The above-described manner of selecting handwritten characters (e.g., visually distinguishing the selected characters from the characters that are not selected) allows the electronic device to quickly and efficiently differentiate selected characters from unselected characters, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, visually distinguishing the first respective handwritten characters from the second respective handwritten characters includes surrounding the first respective handwritten characters with a visual indication that has a shape based on a shape of the first respective handwritten characters (714), such as the highlighting on word 608-5 in FIG. 6B (e.g., the shape of the highlighting is based on the shape of the handwritten characters it is highlighting). In some embodiments, the highlighting is a halo or shadow surrounding the handwritten characters that has the same shape/profile as the handwritten characters (optionally wider and/or thicker than the handwritten characters).

The above-described manner of selecting handwritten characters (e.g., by highlighting the characters with a visual indication that has a shape similar to the shape of the handwritten characters) allows the electronic device to quickly and efficiently indicate highlighted handwritten characters and differentiate them from highlighted font-based characters which optionally are displayed with rectangular highlighting that does not conform to the shape of the font-based text, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, selecting first respective handwritten characters of a first respective word includes displaying one or more user interface elements in proximity to the first respective handwritten characters corresponding to the first respective word that are selectable and movable to select more or fewer handwritten characters of the plurality of handwritten characters (716), such as movement elements 612-1 and 612-2 in FIG. 6C (e.g., displaying one or more vertical bars on the left and/or right side of the highlighted characters (e.g., book-ending, flanking the highlighted characters)).

In some embodiments, the one or more vertical bars are selectable and draggable to highlight more or fewer characters. For example, if a respective vertical bar is selected and dragged such that more characters are between the two vertical bars, then the previously unhighlighted characters that are now between the two vertical bars are now highlighted. In another example, if a respective vertical bar is selected and dragged such that fewer characters are between the two vertical bars, then previously highlighted characters that are now outside of the two vertical bars are now no longer highlighted.

The above-described manner of selecting more or fewer characters (e.g., by displaying user interface element in proximity to the selected characters that are moveable to select more or fewer words) allows the electronic device to quickly and efficiently modify the characters that are selected (e.g., without requiring the user to perform additional inputs to cancel the current selection and re-selecting the desired characters), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, the plurality of handwritten characters includes the first respective handwritten characters and second respective handwritten characters on a first line and third respective handwritten characters on a second line, different from the first line (718), such as sentence 608 encompassing two lines in FIG. 6C (e.g., the content entry region includes at least two lines of characters).

In some embodiments, the first line includes the first and second respective handwritten characters and the second line, adjacent to the first line (e.g., right below the first line), includes a third respective handwritten characters. In such embodiments, the first respective handwritten characters are highlighted while the second and third respective handwritten characters are not yet highlighted.

In some embodiments, while displaying the one or more user interface elements that are selectable and movable to select more or fewer handwritten characters, the electronic device receives (720), via the one or more input devices, a second user input directed to a respective user interface element of the one or more user interface elements, including a selection input directed to the respective user interface element and a movement (e.g., while maintaining the selection input) from a first location on the first line corresponding to the respective user interface element to a second location on the second line corresponding to the third respective handwritten characters, such as the movement of movement element 612-1 in FIG. 6E (e.g., a touch-down on the vertical bar followed by a movement of the vertical bar that is at one of the ends of the first respective handwritten character to a second line (e.g., that is below or above the first line) without moving across the second respective handwritten characters).

In some embodiments, in response to receiving the second user input (722), in accordance with a determination that one or more criteria are satisfied (e.g., in accordance with a determination that the second respective handwritten characters are between the first respective handwritten character and the third respective handwritten characters), the electronic device selects (724) the second respective handwritten characters and the third respective handwritten characters, such as selection of the "t" character in FIG. 6E (e.g., selecting characters in the first line on the respective side of the first handwritten characters that were previously unselected).

For example, the first respective handwritten characters and the second respective handwritten characters are on the same line and the second respective handwritten characters are after the first respective handwritten characters (e.g., to the right of the first respective handwritten characters). In such example, one of the two vertical bars is displayed between the first and second respective handwritten characters. In some embodiments, if the user input drags the bar that is between the first and second respective handwritten characters downwards to the second line (the second line being a line below the first line), then the second respective handwritten characters are selected even though the user did not directly interact with the second respective handwritten characters. Thus, in some embodiments, the one or more criteria includes a requirement that the user-selected respective vertical bar is between currently highlighted characters and currently unhighlighted characters that are to the right of the currently highlighted characters, and the user then dragged the respective vertical bar in the respective direction to a second line (e.g., to a line below the first line if the unhighlighted characters are after the highlighted characters or to a line above the first line if the unhighlighted characters are before the highlighted characters). Thus, in some embodiments, the electronic device identifies lines of handwritten characters (e.g., even though the characters are handwritten and not font-based) and is able to select the handwritten characters appropriately).

The above-described manner of selecting characters (e.g., by selecting other characters on the same line as currently selected characters in response to a user moving the user interface elements to another line) allows the electronic device to quickly and efficiently select characters in a line (e.g., without requiring the user to move across all characters in the line), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, while displaying the one or more user interface elements that are selectable and movable to select more or fewer handwritten characters, the electronic device receives (726) a second user input directed to a respective user interface element of the one or more user interface elements, including a selection input directed to the respective user interface element and a movement (e.g., while maintaining the selection input) across one or more second respective handwritten characters, different from the first respective handwritten characters (e.g., a contact on the vertical bar followed by a movement of the vertical bar such that previously unselected handwritten characters are now within the space between the two vertical bars) and handwritten content other than one or more handwritten characters, such as in FIG. 6I (e.g., the space between the two vertical bar also includes handwritten content that are not handwritten characters such as drawings, etc.).

In some embodiments, in response to receiving the second user input, the electronic device selects (728) the one or more second respective handwritten characters without selecting the handwritten content, such as in FIG. 6I (e.g., select the previously unselected handwritten characters that are now within the space between the two vertical bars without selecting the handwritten content that is within the two vertical bars that are not handwritten characters).

Thus, in some embodiments, the device selects handwritten characters and recognizes other handwritten input (e.g., drawings) as not handwritten characters and does not highlight that non-handwritten character content. In some embodiments, the handwritten content that is not handwritten characters is also selected. Thus, in some embodiments, the device detects both handwritten characters and other handwritten content that isn't handwritten characters.

The above-described manner of selecting handwritten characters (e.g., by selecting handwritten characters but not selecting handwritten content that is not recognized as characters) allows the electronic device to quickly and efficiently select characters (e.g., selecting items that the user is most likely intending to select), which simplifies the interaction between the user and the electronic device and enhances the operability of the electronic device and makes the user-device interface more efficient (e.g., without requiring the user to perform additional inputs to manually select only handwritten characters or de-select unintended characters), which additionally reduces power usage and improves battery life of the electronic device by enabling the user to use the electronic device more quickly and efficiency, while reducing errors in usage.

In some embodiments, while displaying the plurality of handwritten characters corresponding to the plurality of words and while the one or more handwritten characters corresponding to the first word are selected, the electronic device receives (730), via the one or more input devices, a second user input that satisfies one or more first criteria (e.g., a user input selecting the one of the user interface elements that are selectable and moveable (e.g., a touch-down on the respective user interface element) to select more or fewer handwritten characters and maintaining the selection input for more than a threshold amount of time (e.g., 0.1 seconds, 0.2 seconds, 0.25 seconds, 0.5 seconds, 1 second, 3 seconds, 5 seconds, 10 seconds, etc.)) followed by movement with respect to the one or more respective handwritten characters that satisfies one or more second criteria, such as the contact with the bulb portion of movement element 612-2 for longer than the threshold amount of time in FIG. 6R (e.g., a movement of the user input across handwritten characters that are current unselected).

For example, after a selection and hold input, receiving a swipe gesture (optionally without detecting a termination of the selection input) across one or more handwritten characters that are not currently selected. In some embodiments, the one or more second criteria includes a requirement that the movement with respect to the one or more respective handwritten characters is within a threshold distance of the one or more handwritten characters of the first word that are currently selected (e.g., within 1 inch, 2 inches, 5 inches, 8 inches, etc.). In some embodiments, if the one or more respective handwritten characters are farther than the threshold distance from the one or more handwritten characters of the first word, then the one or more respective handwritten characters are not selected. In some embodiments, the one or more respective handwritten characters need not be contiguous with the one or more handwritten characters of the first word (e.g., the one or more respective handwritten characters are separated from the one or more handwritten characters of the first word by one or more words or are on different lines).

In some embodiments, in response to receiving the second user input (732), in accordance with a determination that the one or more respective handwritten characters were not selected when the movement with respect to the one or more respective handwritten characters was received, the electronic device selects (734) the one or more respective handwritten characters in addition to the one or more handwritten characters corresponding to the first word, such as the selection of word 609-1 in FIG. 6T (e.g., if the handwritten characters are unselected when the swipe gesture was received, then select and/or highlight the handwritten characters).

In some embodiments, if the first handwritten character encountered by the swipe gesture is unselected, then the other handwritten characters that the swipe gesture interacts with (e.g., for which the one or more second criteria are satisfied) is highlighted (optionally regardless of whether the characters are already highlighted). In some embodiments, in response to receiving the second user input that satisfies the one or more first criteria, the device enters into a freeform selection mode (optionally a selection painting mode). In some embodiments, freeform selection mode includes displaying a user interface element (such as a circular element) indicating that the user is in freeform selection mode. In some embodiments, while in freeform selection mode, swipe gestures (e.g., a "painting" gesture) across handwritten characters that coincide with the circular user interface element cause the handwritten characters to be selected. In some embodiments, if the one or more respective handwritten characters are separated from the one or more handwritten characters of the first word that are already selected by one or more handwritten characters that are not selected, then the one or more respective handwritten characters are selected without selecting the one or more handwritten characters that are between the one or more respective handwritten characters and the one or more handwritten characters of the first word that are already selected.

The above-described manner of selecting handwritten characters (e.g., swiping over unselected handwritten characters after entering into freeform highlighting mode) allows the electronic device to quickly and efficiently select handwritten content (e.g., which may be irregularly spaced or irregularly aligned as compared to font-based text, without requiring the user to more precisely move the user interface elements to select the desired characters), which simplifies the interaction between the user and the electronic device and enhances the operability of the electronic device and makes the user-device interface more efficient (e.g., by providing an intuitive method of highlighting characters), which additionally reduces power usage and improves battery life of the electronic device by enabling the user to use the electronic device more quickly and efficiency, while reducing errors in usage.

In some embodiments, in accordance with a determination that a speed of the movement with respect to the one or more respective handwritten characters is a first speed, the movement with respect to the one or more respective handwritten characters satisfies the one or more second criteria when the movement is within a first threshold distance from the one or more respective handwritten characters (736), such as the low input speed in FIG. 6T (e.g., the radius and/or size of the selection scales based on the speed of the user input).

For example, if the user is swiping slowly, then the radius of the circular element is small and handwritten characters that fall within the radius of the circular element are selected. Thus, if the speed of the movement is a first speed, then only characters within a first threshold distance from the centroid of the input are selected. In some embodiments, handwritten characters that are outside of the first threshold distance do not satisfy the second criteria and are not selected (e.g., characters that fall outside the radius of the circular element are not selected).

In some embodiments, in accordance with a determination that the speed of the movement with respect to the one or more respective handwritten characters is a second speed, faster than the first speed, the movement with respect to the one or more respective handwritten characters satisfies the one or more second criteria when the movement is within a second threshold distance from the one or more respective handwritten characters, larger than the first threshold distance (738), such as the high input speed in FIG. 6V (e.g., if the speed of the swipe gesture is fast, then the radius of the circular element is large, thus increasing the distance from the centroid of the input within which handwritten characters are selected).

Thus, in some embodiments, if the user moves quickly, the device provides a larger tolerance to select handwritten characters such that characters within a second, larger, threshold distance from the centroid of the input are selected. In some embodiments, handwritten characters that are outside of the second threshold distance do not satisfy the second criteria and are not selected. Alternatively, in some embodiments, if the speed of the swipe gesture is fast, then the radius of the circular element is small and if the swipe gesture is slow, then the radius of the circular element is large.

The above-described manner of selecting handwritten characters (e.g., by changing the size of the highlighter based on the movement speed of the user input) allows the electronic device to quickly and efficiently select characters (e.g., by providing a larger highlighting radius if the user is moving quickly, thus accepting a lower precision for selection), which simplifies the interaction between the user and the electronic device and enhances the operability of the electronic device and makes the user-device interface more efficient (e.g. without requiring the user to perform additional inputs to change the size of the selection area), which additionally reduces power usage and improves battery life of the electronic device by enabling the user to use the electronic device more quickly and efficiency, while reducing errors in the usage of the device.

In some embodiments, the one or more respective handwritten characters are part of a respective word that also includes one or more second respective handwritten characters (740), such as word 608-5 in FIG. 6Z. In some embodiments, in response to the second user input and without detecting movement across the one or more second respective handwritten characters, the electronic device selects (742) the one or more second respective handwritten characters of the respective word, such as the de-selection of characters "ght" as well as characters "ei" in word 608-5 in FIG. 6Z (e.g., swiping across one character of a word causes selection of the entire word). Thus, in some embodiments, the device detects that a string of characters constitutes a word and selects the characters of the word.

The above-described manner of selecting handwritten words (e.g., by selecting the entire word when the user selects at least one character of the word) allows the electronic device to quickly and efficiently select words (e.g., without requiring the user to manually highlight each character in the word), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, the one or more respective handwritten characters are part of a respective word that also includes one or more second respective handwritten characters, and selecting the one or more respective handwritten characters includes selecting the one or more respective handwritten characters without selecting the one or more second respective handwritten characters (744), such as the de-selection of characters “ok” but not “ay?” in word 608-7 in FIG. 6AA (e.g., swiping across one character of a word without swiping across the other characters of the word causes selection of the characters that was swiped across and does not select the characters that were not swiped across).

The above-described manner of selecting handwritten characters (e.g., by selecting the characters that the user manually selected, without selecting the characters of the word that the user did not explicitly select) allows the electronic device to quickly and efficiently select characters (e.g., without requiring the user to perform additional inputs to remove the selection of characters in the word that were not intended to be selected), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, in response to receiving the second user input (746), in accordance with a determination that the one or more respective handwritten characters were selected when the movement with respect to the one or more respective handwritten characters was received (e.g., the first character encountered by the user's movement input after the second user input satisfied the first criteria is already selected), the electronic device ceases (748) selection of the one or more respective handwritten characters while maintaining the selection of the one or more handwritten characters corresponding to the first word, such as the unhighlighting of word 608-5 in FIG. 6Z (e.g., unselecting the characters that the user swiped across).

Thus, in some embodiments, if the first character that the user swiped across is already highlighted, then the device enters into a freeform unhighlighting mode in which subsequent characters that the user swipes across are deselected/unhighlighted (e.g., removes highlighting from characters that are already highlighted and maintains the unhighlighted state of characters that are already not highlighted).

The above-described manner of de-selecting handwritten characters (e.g., by de-selecting characters that are already selected in response to a user input directed at the characters) allows the electronic device to quickly and efficiently de-select characters, which simplifies the interaction between the user and the electronic device and enhances the operability of the electronic device and makes the user-device interface more efficient (e.g., performing a selection or de-selection function based on the first character encountered, without requiring the user to perform additional inputs to switch between selection or de-selection modes), which additionally reduces power usage and improves battery life of the electronic device by enabling the user to use the electronic device more quickly and efficiency, while reducing errors in usage.

In some embodiments, selecting the one or more respective handwritten characters in addition to the one or more handwritten characters corresponding to the first word includes selecting the one or more respective handwritten characters without selecting one or more second respective handwritten characters that are selectable and that are located between the one or more respective handwritten characters and the one or more handwritten characters corresponding to the first word that were selected when the movement with respect to the one or more respective handwritten characters was received (750), such as selection of word 609-3 without selecting word 609-2 in FIG. 6V (e.g., selecting the characters that the user swiped across without selecting characters that the user didn't swipe across that are located between previously selected characters and the characters that the user swiped across).

Thus, in some embodiments, the user is able to select any characters in the content entry region without regard to whether the newly selected characters are contiguous with previously highlighted characters. In some embodiments, if the one or more respective handwritten characters are separated from the one or more handwritten characters of the first word that are already selected by one or more second respective handwritten characters that are not selected, then the one or more respective handwritten characters are selected without selecting the one or more second respective handwritten characters that are between the one or more respective handwritten characters and the one or more handwritten characters of the first word that are already selected. Thus, in some embodiments, the one or more respective handwritten characters that are selected in response to the movement input need not be contiguous with previously selected characters.

The above-described manner of selecting handwritten characters (e.g., by selecting characters that are not contiguous to previously selected characters) allows the electronic device to quickly and efficiently select characters (e.g., without limiting the user to only selection of contiguous characters), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, while one or more respective handwritten characters are selected, the electronic device receives (752), via the one or more input devices, a second user input directed to the one or more respective handwritten characters, wherein the second user input includes a selection input and a movement while maintaining the selection input, such as the contact with sentence 608 in FIG. 6O and movement of the contact in FIG. 6P (e.g., a selection input directed to the one or more highlighted characters (e.g., a contact on the one or more highlighted characters) followed by a swipe input). In some embodiments, the selection input is required to be held for a threshold amount of time (e.g., 0.1 seconds, 0.25 seconds, 0.5 seconds, 1 second, 3 seconds, 5 seconds, etc.) to enable movement of the highlighted characters.

In some embodiments, in response to receiving the second user input, the electronic device moves (754) the one or more respective handwritten characters in accordance with the movement of the second user input, such as the movement of sentence 608 in FIG. 6P (e.g., moving the handwritten characters in the content entry region in accordance with the movement input). In some embodiments, upon lift-off of the contact with the touch-sensitive display, the handwritten characters are inserted into the content entry region at the final location of the movement input.

The above-described manner of moving handwritten characters (e.g., by performing a selection input on selected characters followed by a movement input) allows the electronic device to quickly and efficiently move characters (e.g., without requiring the user to perform additional inputs to delete characters and insert characters at the desired location), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, while one or more respective handwritten characters are selected, the electronic device receives (756) a second user input corresponding to a further selection of the one or more respective handwritten characters, such as the tap input in FIG. 6M (e.g., while the handwritten characters are highlighted, receiving a tap input on the handwritten characters).

In some embodiments, in response to the second user input, the electronic device displays (758), via the display generation component, one or more selectable options for performing one or more respective operations with respect to the one or more respective handwritten characters, such as pop-up 614 in FIG. 6N (e.g., providing or displaying a pop-up or dialog box with one or more options for performing one or more operations on the selected text).

For example, the operations include copying the selected characters into a clipboard, cutting the selected characters (e.g., copying the selected text into a clipboard and concurrently deleting the text), replacing the selected characters with the contents of the clipboard (e.g., paste), changing one or more font characteristics of the selected text (e.g., size, font, bold, italics, underline, strikethrough, etc.), and/or copying a transcript of the characters, etc.

The above-described manner of displaying options for interacting with the selected characters (e.g., in response to a tap input on the selected characters) allows the electronic device to quickly and efficiently provide the user with options (e.g., without requiring the user to perform additional inputs to navigate to different user interfaces to perform operations on the selected text), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, while the one or more respective handwritten characters are selected, the electronic device receives (760), via the one or more input devices, a third user input selecting a respective selectable option of the one or more selectable options for performing a copying operation with respect to the one or more respective handwritten characters, such as in FIG. 6GG (e.g., receiving a selection of an option for copying the selected content into the system's clipboard, such as a tap input). In some embodiments, in response to the third user input, the handwritten characters are copied into the system clipboard. In some embodiments, the handwritten characters are copied as a drawing, as a rich drawing, as an editable handwritten character, etc.

In some embodiments, after receiving the third user input, the electronic device receives (762), via the one or more input devices, a fourth user input corresponding to a request to perform a pasting operation into a second content entry region, such as in FIG. 6HH (e.g., while the handwritten characters have been copied into the clipboard, receiving an input to paste the clipboard contents into a second content entry region, such as a tap input).

In some embodiments, in response to receiving the fourth user input (764), in accordance with a determination that the second content entry region is a content entry region of a first type (e.g., the second content entry region is a region that supports handwritten content), the electronic device inserts (766) a representation of the one or more respective handwritten characters into the second content entry region, such as in FIG. 6KK (e.g., inserting a representation of the respective handwritten characters into the second content entry region).

In some embodiments, the representation is inserted as an image, as rich drawing, as editable handwriting, etc. In some embodiments, the representation is inserted as the same data type as the handwritten characters in the first content entry region. In some embodiments, the handwritten characters are not inserted as font-based text.

In some embodiments, in accordance with a determination that the second content entry region is a content entry region of a second type, different from the first type (e.g., the second content entry region does not support handwritten content), the electronic device inserts (768) font-based text corresponding to the one or more respective handwritten characters in the second content entry region, such as in FIG. 6II (e.g., inserting the respective handwritten characters as font-based text).

In some embodiments, the handwritten characters are not inserted as a handwritten representation of the handwriting character (e.g., as a drawing, rich drawing data type, etc.). In some embodiments, the device automatically converts (or has already converted) the handwritten characters into font-based text (e.g., recognizes and identifies the handwriting as characters). Thus, in some embodiments, the handwritten input is inserted based on the type of content entry region into which it is being inserted.

The above-described manner of copying and pasting handwritten characters (e.g., by pasting either a representation of the handwritten characters or font-based text corresponding to the handwritten characters based on the type of content entry region into which the characters are being pasted) allows the electronic device to quickly and efficiently insert content (e.g., by automatically determining whether the to insert handwritten characters or font-based text without requiring the user to determine whether the content entry region supports handwritten characters and performing different copy and/or paste operations based on the determination), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, the one or more selectable options include a first selectable option for copying a representation of the one or more respective handwritten characters (e.g., an option that copies a representation of the handwritten input into the clipboard such that a paste operation inserts either a representation of the handwritten characters or the characters as font-based text based on the type of content entry region (e.g., based on whether the respective content entry region supports only font-based text or also supports drawings)), and a second selectable option for copying a transcription of the one or more respective handwritten characters (770), such as option 616-5 in FIG. 6N (e.g., an option that copies a transcript of the handwritten input into the clipboard such that a paste operation inserts the characters as font-based text regardless of the type of content entry region (optionally only if the respective content entry region accepts font-based text)).

In some embodiments, the data saved into the clipboard is a drawing data type. In some embodiments, conversion into font-based text (when applicable) is performed before and/or upon pasting the contents into a content entry region. In some embodiments, the data saved into the clipboard is a font-based text data type. Thus, in some embodiments, the conversion into font-based text is performed upon and/or before copying the characters into the clipboard.

The above-described manner of copying and pasting handwritten characters (e.g., by providing an option for copying handwritten characters or copying a transcript of the handwritten characters) allows the electronic device to quickly and efficiently copy appropriate content, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, the one or more selectable options include a first selectable option for displaying a user interface element in the content entry region above the one or more respective handwritten characters that is selectable to move content, including the one or more respective handwritten characters, in the content entry region that is on a respective side of (e.g., below, above) the user interface element (772), such as option 616-6 in FIG. 6N (e.g., the dialog box includes an option that displays a horizontal user interface element in the content entry region above the highlighted characters). In some embodiments, the horizontal user interface element is selectable and moveable to move the content in the content entry region that is below the horizontal user interface element up or down in accordance with the user input.

The above-described manner of moving content in the content entry region (e.g., by inserting a user interface element above the selected content that is selectable and moveable to move the content below the user interface element) allows the electronic device to quickly and efficiently move content (e.g., without requiring the user to perform additional inputs to cut and paste the content in the content entry region or delete and then insert the content at the desired location), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, the plurality of words includes a first respective word and a second respective word in a same respective sentence (774), such as the words in sentence 608 in FIG. 6K (e.g., a sentence includes the first and second respective words).

In some embodiments, while first respective handwritten characters corresponding to the first respective word are selected, the electronic device receives (776), via the one or more input devices, a second user input directed to the first respective handwritten characters, such as the double tap in FIG. 6K (e.g., while the characters of the first respective word are selected, receiving a second double tap input on the first respective word).

In some embodiments, in response to receiving the second user input (778), in accordance with a determination that the second user input satisfies the one or more selection criteria (e.g., the one or more selection criteria include a requirement that the second user input is a double tap input on the first respective word and/or a requirement that every character of the first respective word is selected at the time the second user input is received), the electronic device selects (780) second respective handwritten characters corresponding to the second respective word in addition to the first respective handwritten characters corresponding to the first respective word, such as the selection of the words in sentence 608 in FIG. 6L (e.g., selecting all the words in the same sentence (e.g., on the same line or on different lines in the content entry region) as the first respective word while maintaining selection of the characters of the first respective word).

In some embodiments, every word in the respective sentence is selected. In some embodiments, the content entry region includes one or more other words that are not in the same sentence as the first respective word (e.g., in some embodiments, on the same line as the first respective word). In such embodiments, in response to the second user input, the other words that are not in the same sentence are not selected (e.g., even if they are on the same line as the first respective word).

The above-described manner of selecting more words from the same sentence of handwritten characters (e.g., in response to a second double-tap input on the selected word) allows the electronic device to quickly and efficiently select additional words of a sentence (e.g., without requiring the user to perform additional inputs to manually select each word in a sentence), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, in response to selecting the one or more respective handwritten characters in the content entry region, the electronic device displays (782) a user interface element in the content entry region above the one or more respective handwritten characters, such as horizontal movement element 628 in FIG. 6OO (e.g., displaying the user interface element above the highlighted characters and along the left side (e.g., in the left margin) of the content entry region).

In some embodiments, the user interface element is displayed when characters and/or content in the content entry region are highlighted (e.g., optionally without requiring the user to separately select a selectable option to cause display of the user interface element). In some embodiments, the user interface element is displayed in response to a selection of the selectable option on a menu user interface.

In some embodiments, while displaying the user interface element above the one or more respective handwritten characters, the electronic device receives (784) a user input directed to the user interface element that includes movement, such as selection and movement from finger 610 in FIGS. 6PP-6QQ (e.g., while displaying a user interface element in the content entry region above highlighted characters, receiving an input selecting and dragging the user interface element (e.g., moving the user interface element upwards or downwards)).

In some embodiments, in response to receiving the user input (786), the electronic device moves (788) content in the content entry region that is on a respective side of (e.g., the content that is below or above the user interface element) the user interface element in accordance with the movement of the user input, such as in FIG. 6QQ (e.g., moving the content in the content entry region that is below the user interface element up or down in accordance with the movement of the user input moving the user interface element up or down).

In some embodiments, in response to the user input selecting the user interface element (e.g., before and during moving the user interface element), the user interface element is expanded horizontally. For example, a horizontal line is drawn across a portion of the content entry region (e.g., 75% of the content entry region, 90%, 95%, 100%, etc.). In some embodiments, the horizontal line expands rightwards from the user interface element. In some embodiments, the horizontal line indicates the boundary between content that will be moved in response to a user dragging the user interface element upwards or downwards and content that will not be moved in response to the user input. In some embodiments, the content in the content entry region maintains its distance from the horizontal line while being moved up or down. Thus, moving the horizontal line downwards causes the content in the content entry region below the horizontal line to move downwards accordingly (and vice versa). In some embodiments, some content that is above the horizontal line is recognized as a part of content that is below the horizontal line. Thus, in such embodiments, the content above the line that is a part of content below the line optionally moves in accordance with the movement of the horizontal line (e.g., the content is kept intact even if the horizontal line bisects the content).

The above-described manner of moving content in the content entry region (e.g., by selecting a user interface element above the selected content and moving the user interface element upwards or downwards) allows the electronic device to quickly and efficiently move content (e.g., without requiring the user to perform additional inputs to cut and paste the content in the content entry region or delete and then insert the content at the desired location), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

It should be understood that the particular order in which the operations in FIGS. 7A-7J have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, 1300, 1500, and 1700) are also applicable in an analogous manner to method 700 described above with respect to FIGS. 7A-7J. For example, the operation of the electronic device selecting and providing for interaction with handwritten content described above with reference to method 700 optionally has one or more of the characteristics of generating normalized shapes based on handwritten inputs, identifying actionable text within handwritten content, presenting tutorials for text manipulation operations, displaying visual feedback of text manipulation operations, selecting units of content, etc., described herein with reference to other methods described herein (e.g., methods 900, 1100, 1300, 1500, and 1700). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5I) or application specific chips. Further, the operations described above with reference to FIGS. 7A-7J are, optionally, implemented by components depicted in FIGS. 1A-1B. For example, displaying operations 702 and 758, and receiving operations 704, 720, 726, 730, 752, 756, 760, 762, and 776, are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Generating Normalized Shapes

Users interact with electronic devices in many different manners, including entering text into such devices. In some embodiments, an electronic device receives handwritten inputs drawing shapes in a content entry region. The embodiments described below provide ways in which an electronic device recognizes the shapes drawn by the user and proposes normalized shapes based on the user's handwritten shape, thus enhancing interactions with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 8B:
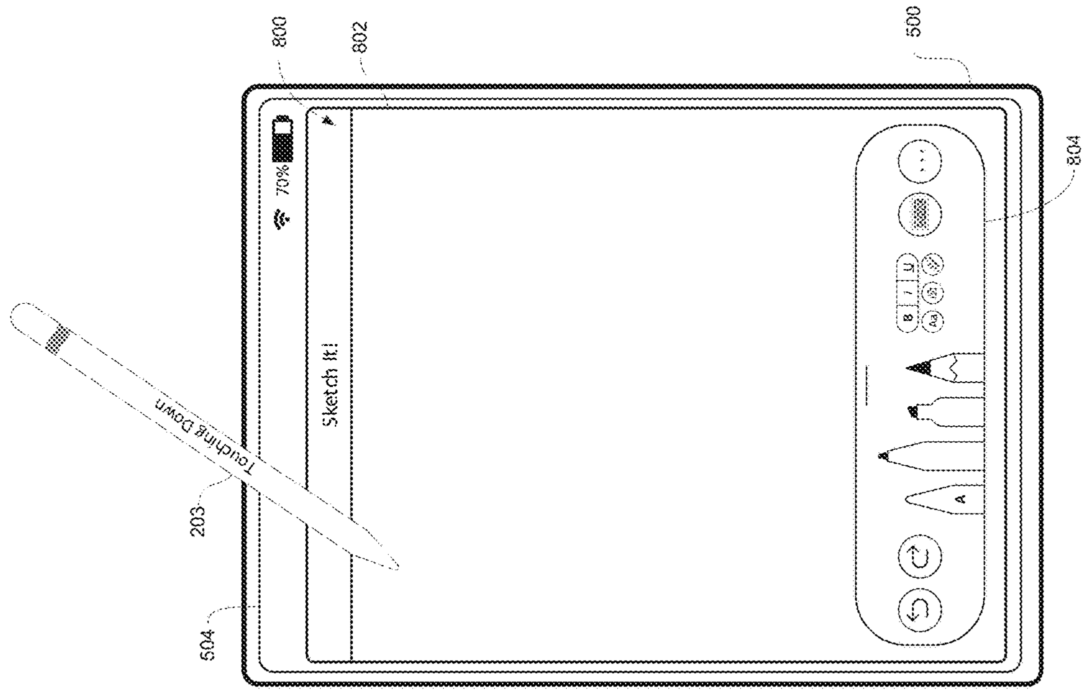
FIGS. 8A-8QQ illustrate exemplary ways in which an electronic device generates normalized shapes based on handwritten inputs in accordance with some embodiments.
Figure 8A:
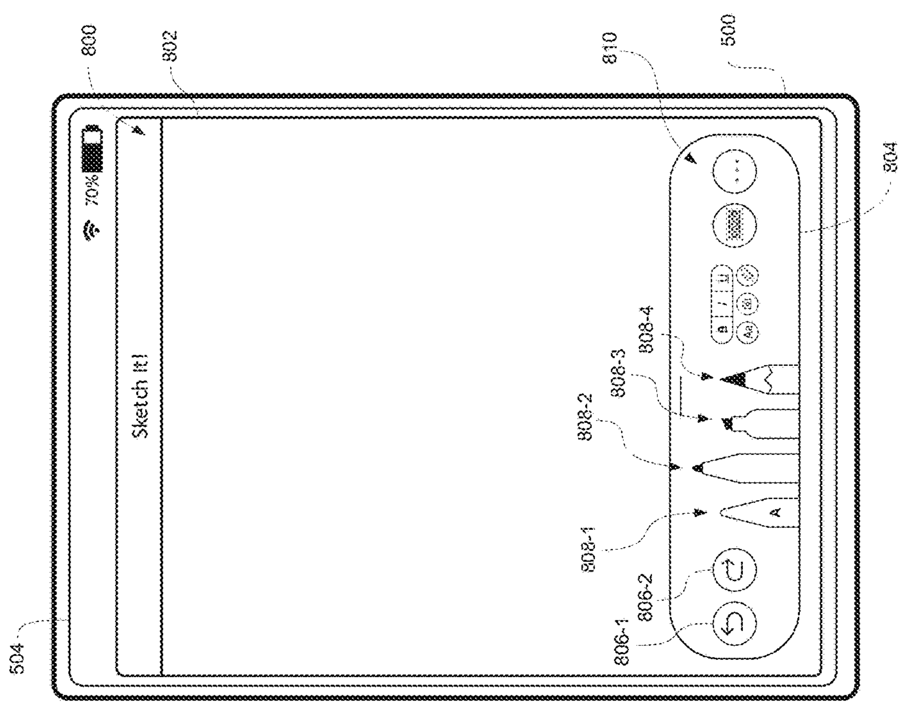
Figure 8D:
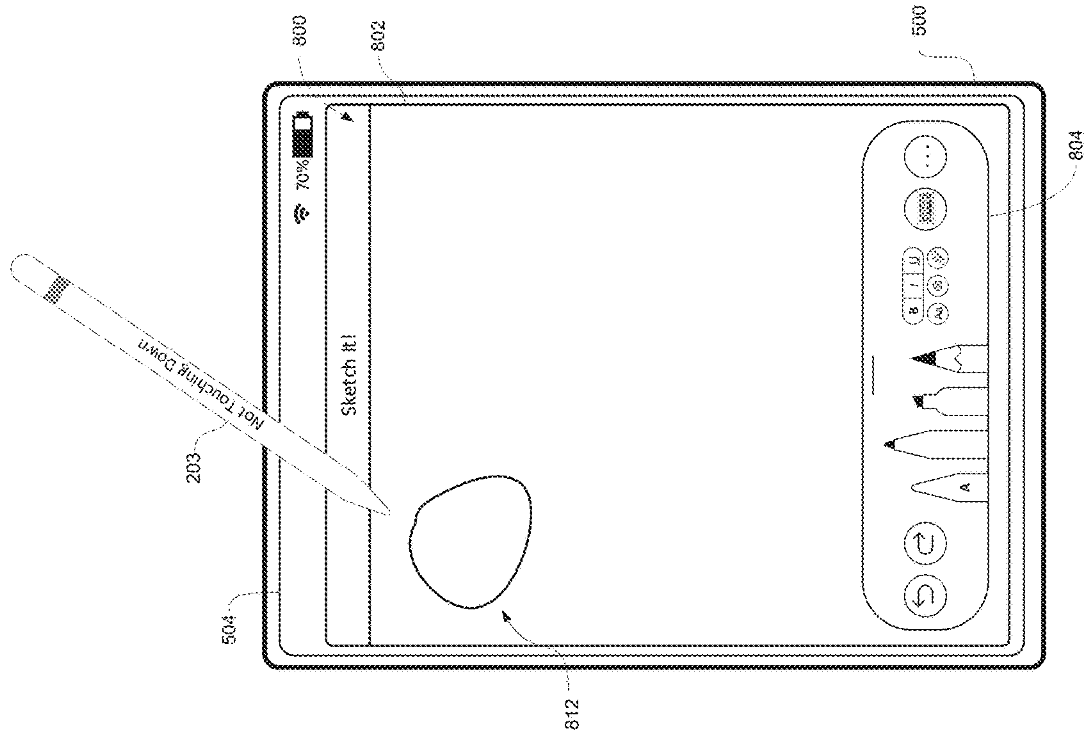
Figure 8C:
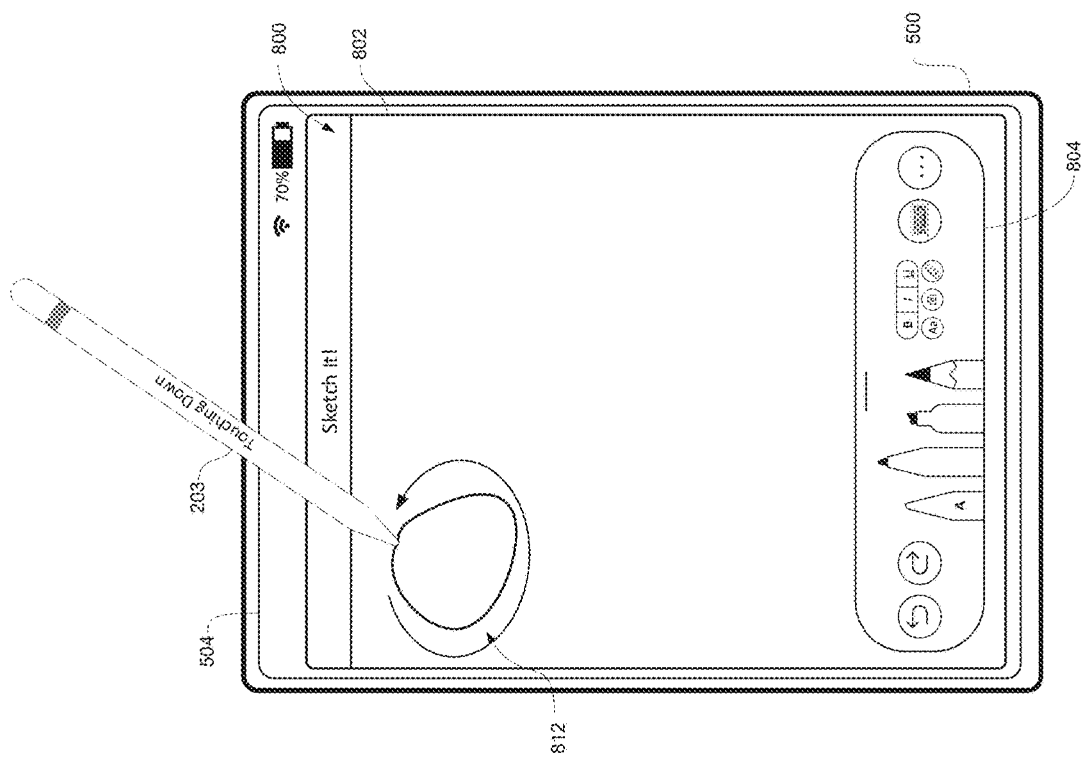
Figure 8F:
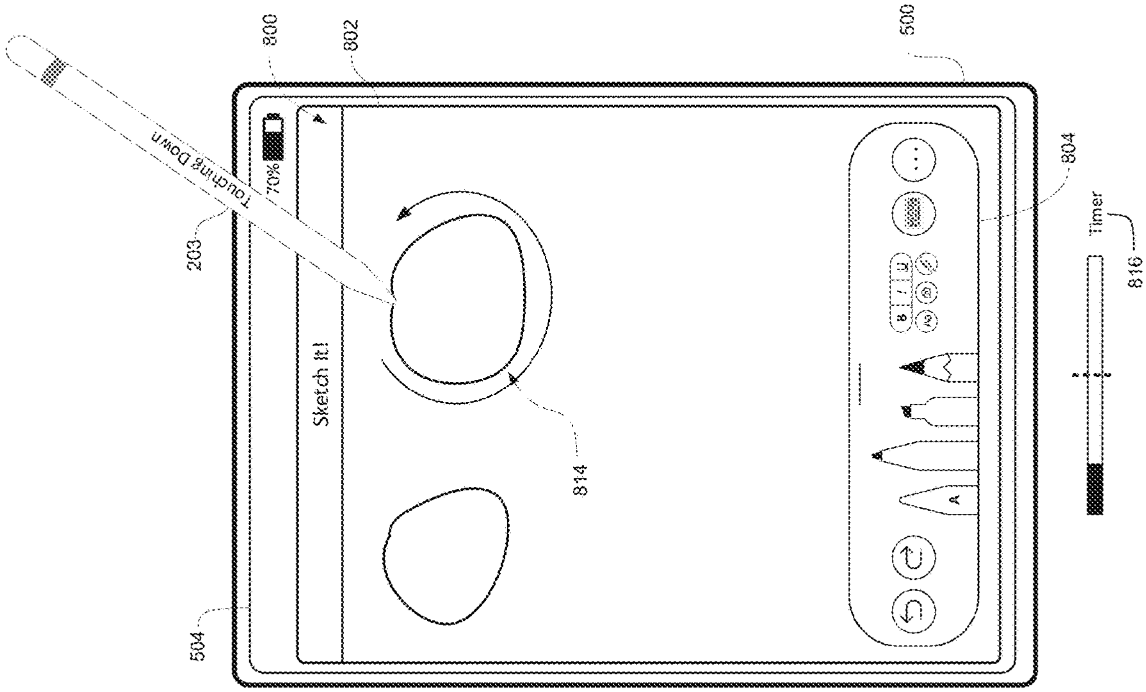
Figure 8E:
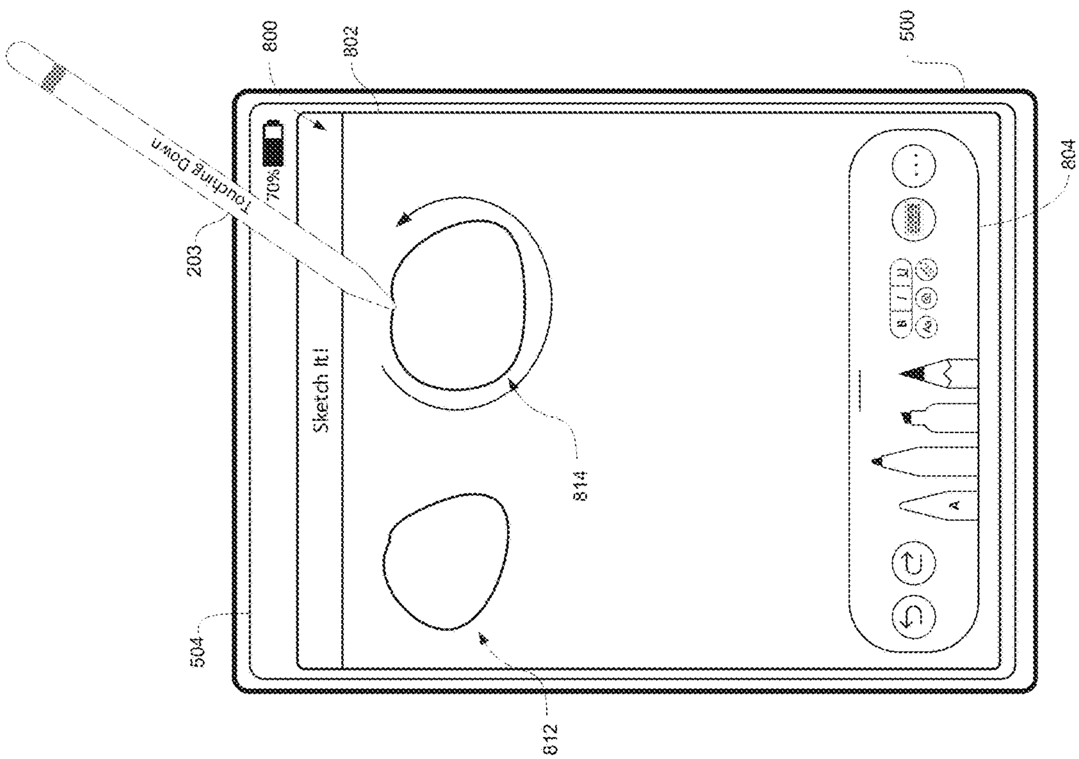
Figure 8H:
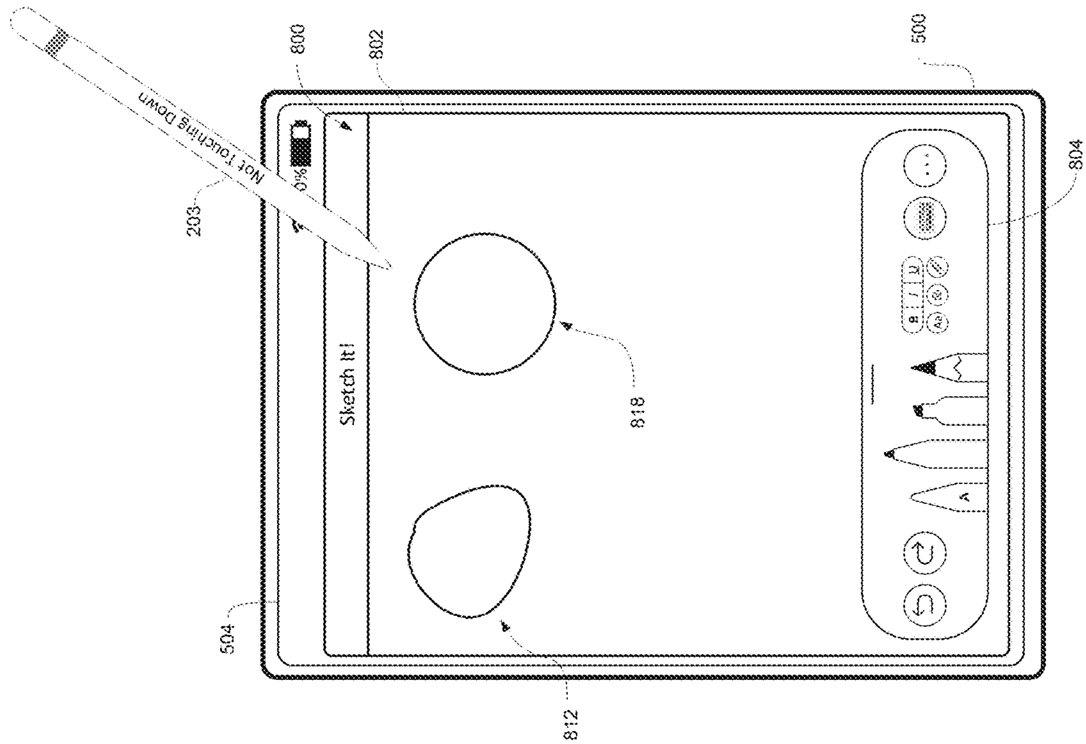
Figure 8G:
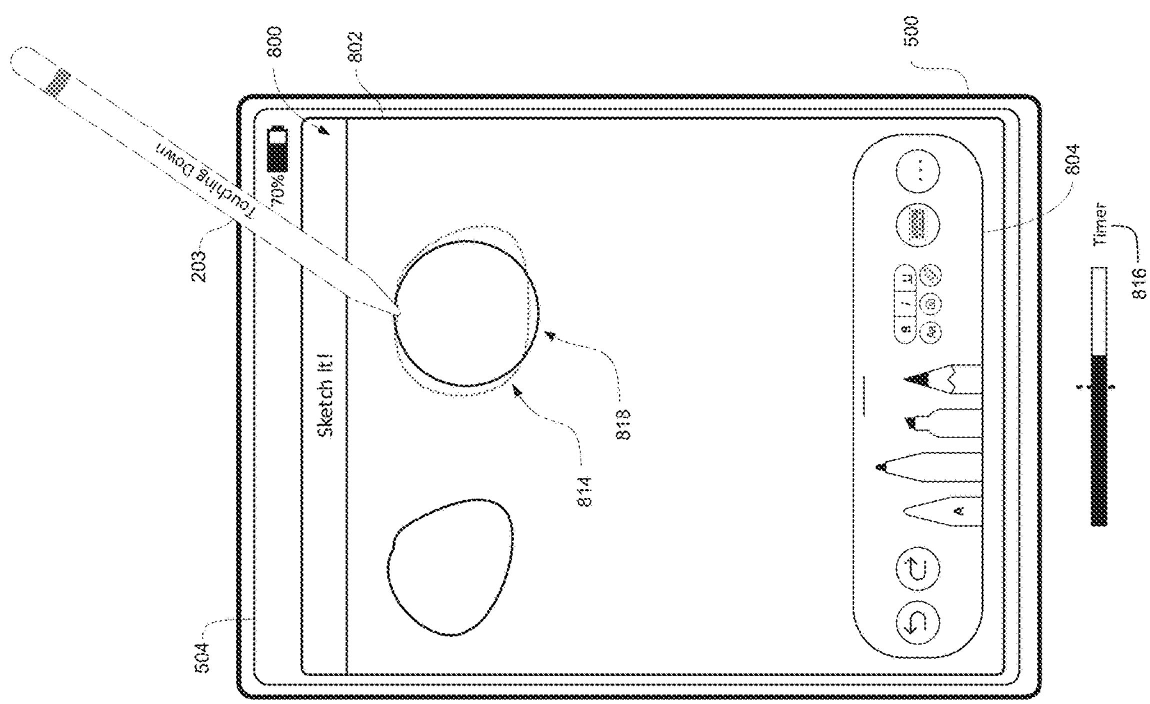
Figure 8J:
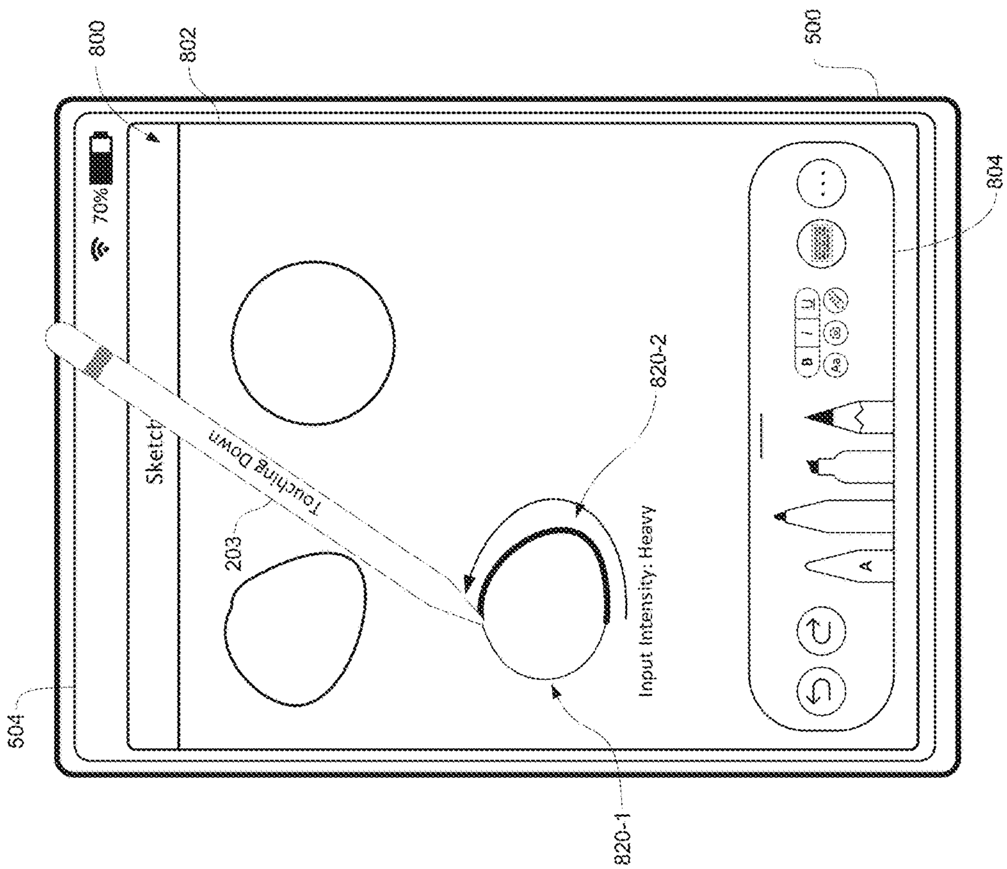
Figure 8I:
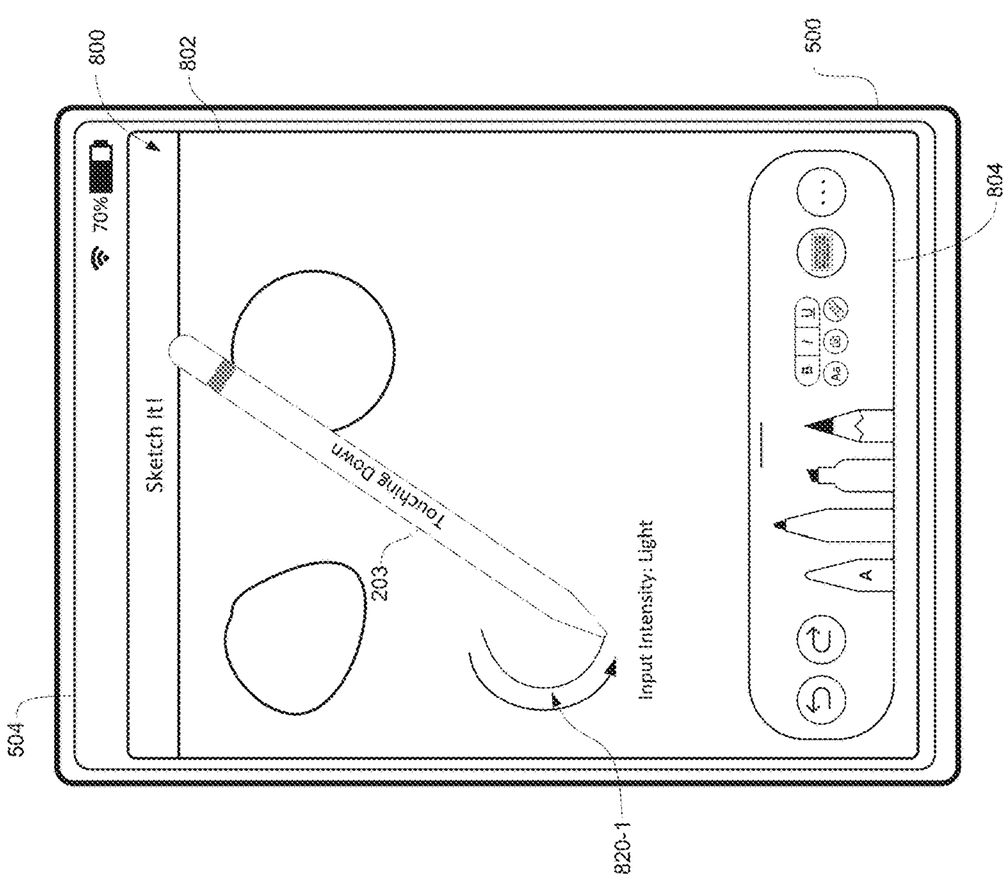
Figure 8L:
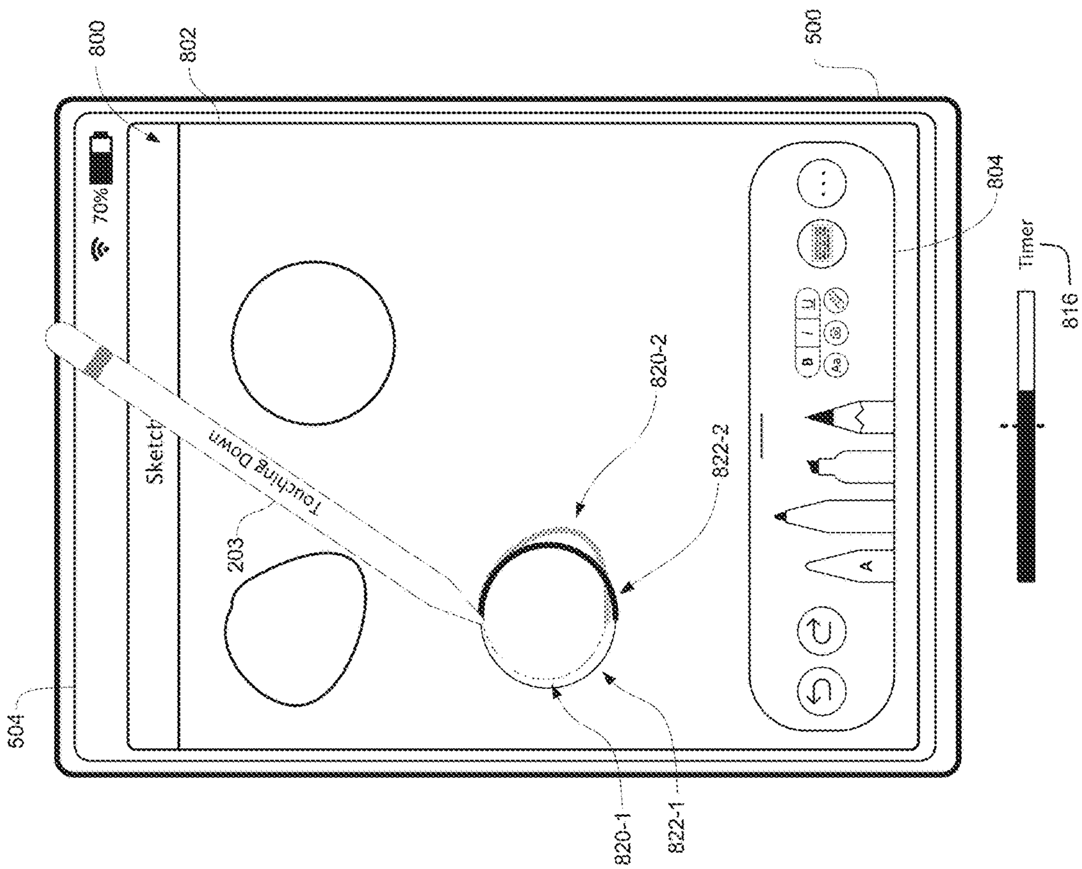
Figure 8K:
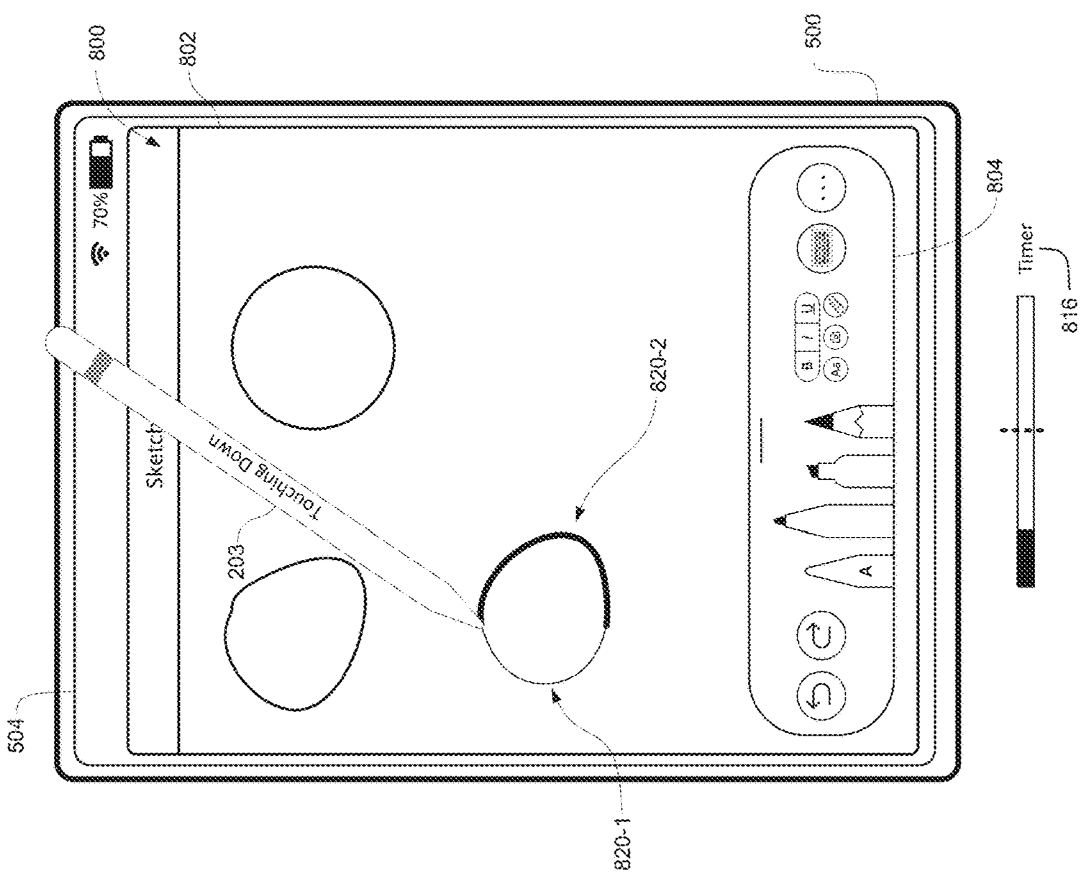
Figure 8N:
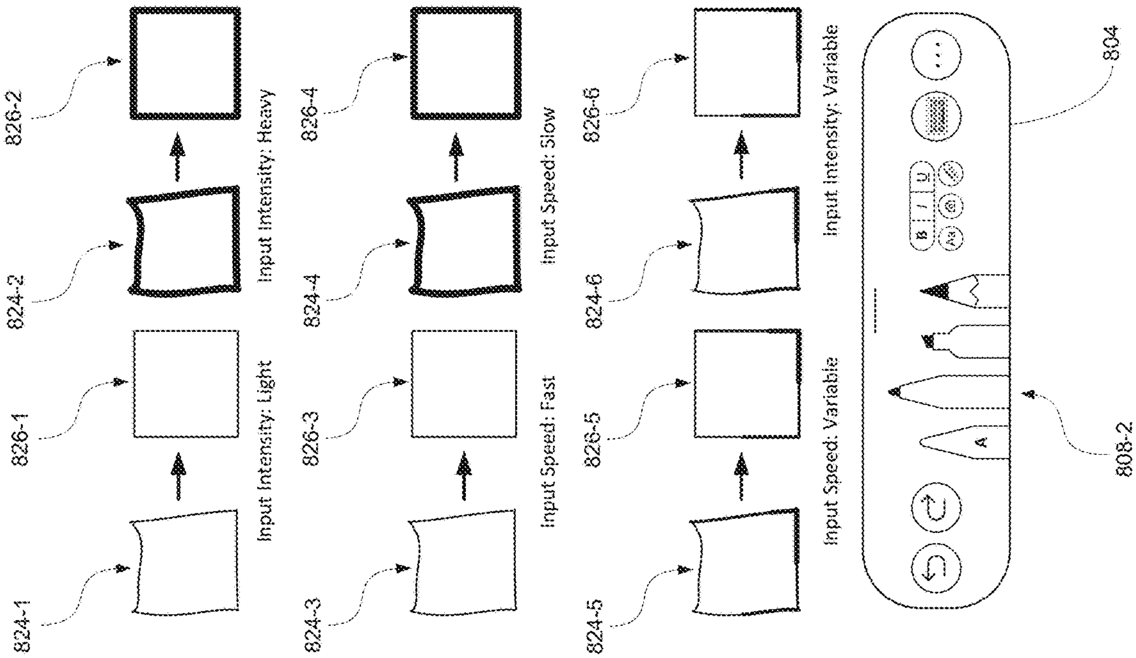
Figure 8M:
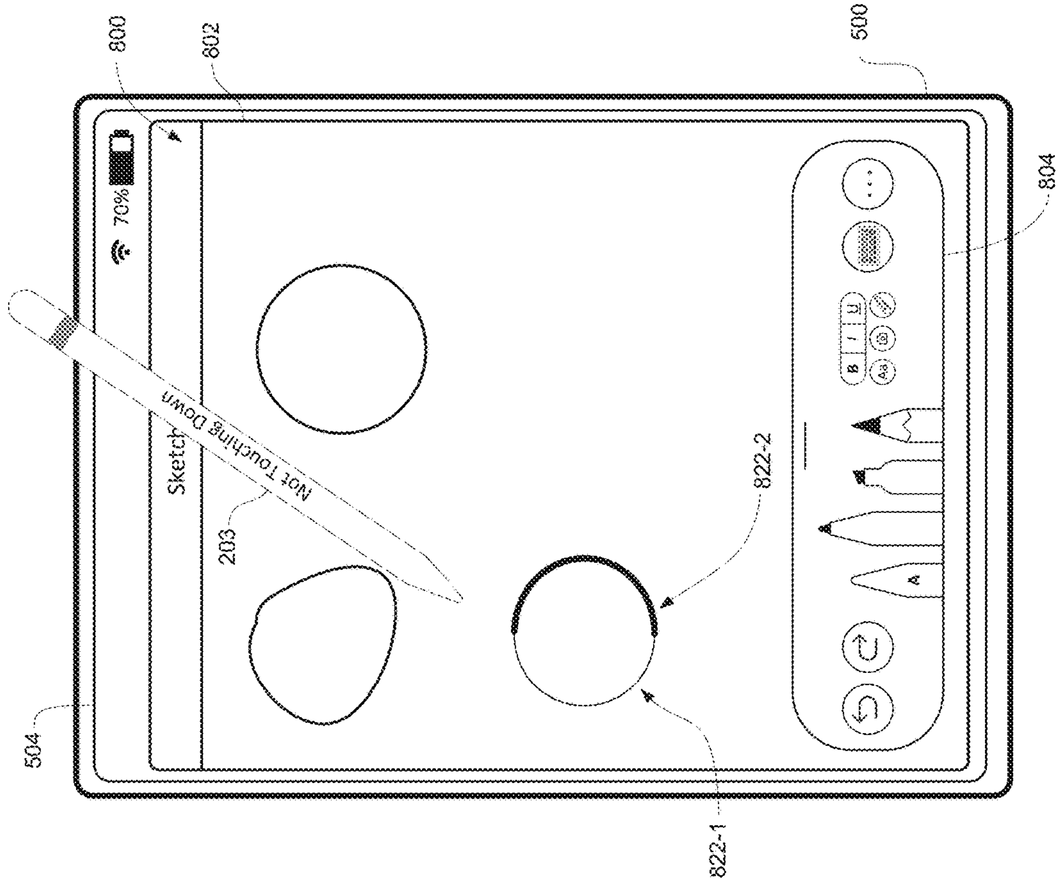
Figure 8P:
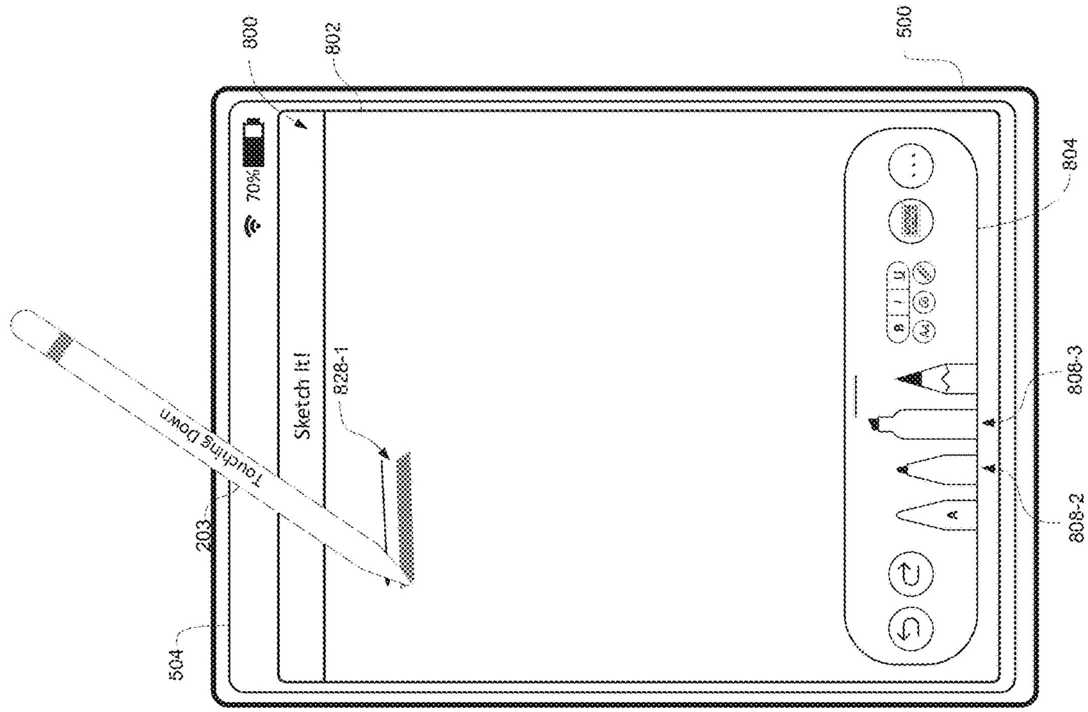
Figure 8O:
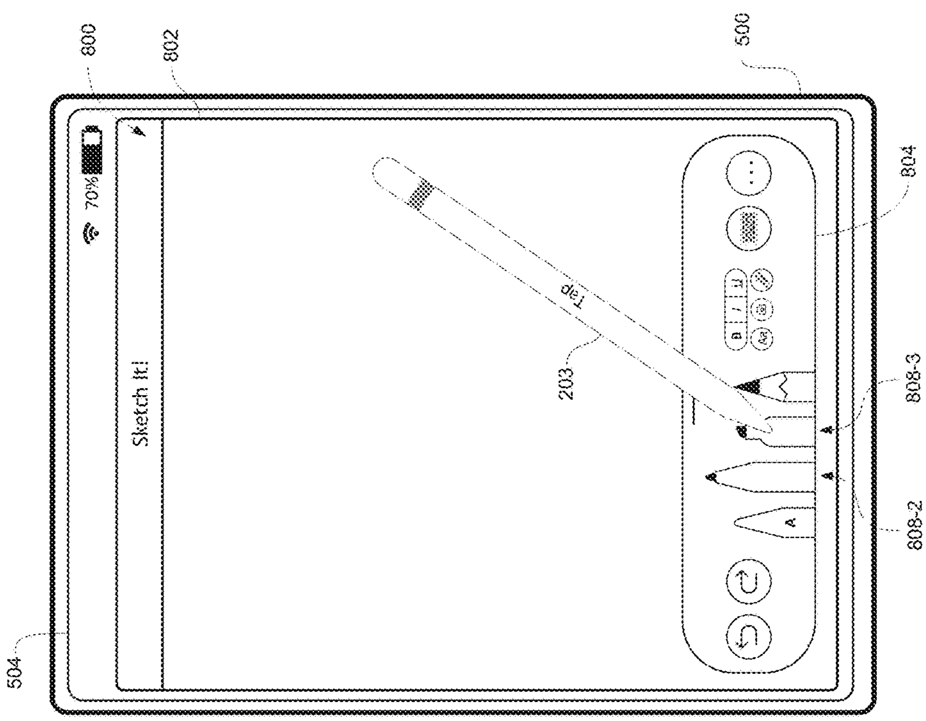
Figure 8R:
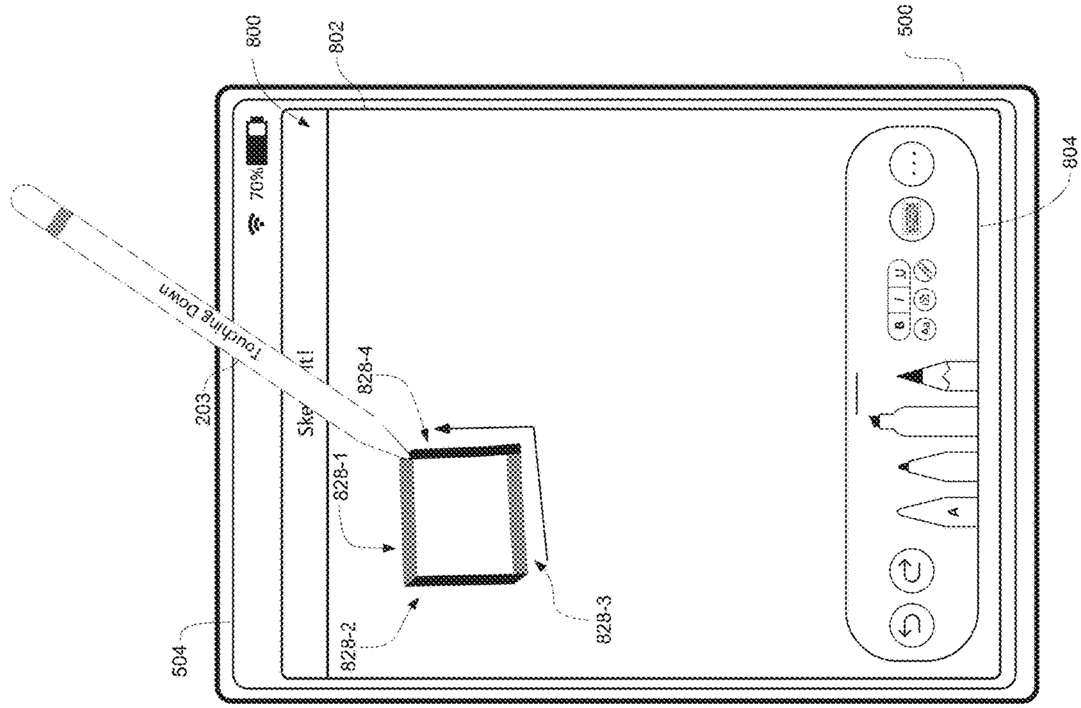
Figure 8Q:
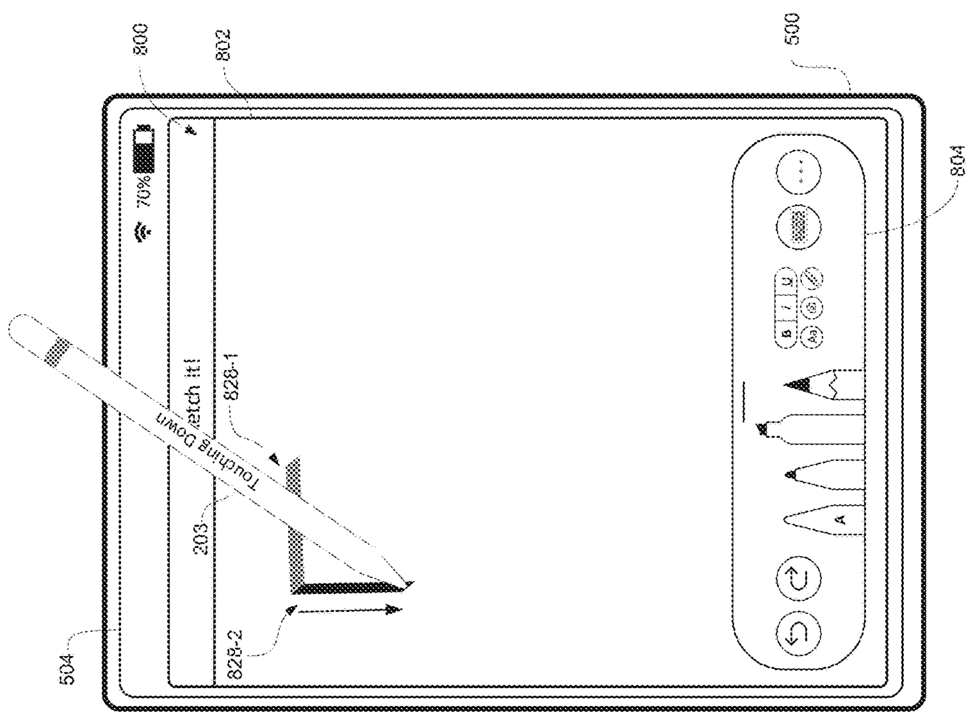

FIGS. 8A-8QQ illustrate exemplary ways in which an electronic device generates normalized shapes. The embodiments in these figures are used to illustrate the processes described below, including the processes described with reference to FIGS. 9A-9F.

FIG. 8A illustrates electronic device 500 displaying user interface 800 (e.g., via a display device, via a display generation component, etc.). In some embodiments, user interface 800 is displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500.

In some embodiments, user interface 800 is a user interface of a drawing application or a user interface in which drawing is able to be performed (e.g., for composing drawings, viewing drawings, etc.). In some embodiments, the drawing application is an application installed on device 500.

In FIG. 8A, user interface 800 includes content entry region 802. In some embodiments, content entry field 802 is configured to receive handwritten input (e.g., a drawing input via a stylus device) and display a representation of the handwritten input (e.g., if drawing input is provided) and/or display font-based text (e.g., if font-based text input is provided). In FIG. 8A, user interface 800 includes content entry palette 804. In some embodiments, content entry palette 804 is a user interface element that includes one or more selectable options associated with content in the content entry region 804. For example, content entry palette 804 includes options for changing a color of content in the content entry region (e.g., changing the color of existing content or changing the content of future content inserted by the user), options for changing the font of text in the content entry region (e.g., changing the font of existing text or changing the font of future text inserted by the user), options for attaching or inserting rich objects (e.g., files, images, etc.), options for selecting the content entry tool, etc.

As shown in FIG. 8A, content entry palette 804 includes undo option 806-1 and redo option 2112-2. In some embodiments, undo option 806-1 is selectable to undo the most recent action (e.g., content entry-related action) and redo option 806-2 is selectable to perform the most recent action again (e.g., content entry-related action). In some embodiments, content entry palette 804 includes text entry tool 808-1, pen entry tool 808-2, marker entry tool 808-3, and pencil entry tool 808-4. In some embodiments, content entry palette 804 includes other options 810 that are selectable to perform other functions or change one or more settings with respect to content in content entry region 802.

In some embodiments, selection of text entry tool 808-1 causes the device to enter into text entry mode in which handwritten inputs drawn in the content entry region are analyzed for text characters, identified, and converted into font-based text in the content entry region 802. In some embodiments, selection of pen entry tool 808-2 causes the device to enter into a pen entry mode in which handwritten inputs drawn in the content entry region are stylized as if drawn by a pen (e.g., without converting them to font-based text). In some embodiments, selection of marker entry tool 808-3 causes the device to enter into a marker entry mode in which handwritten inputs drawn in the content entry region are stylized as if drawn by a marker (e.g., without converting them to font-based text). In some embodiments, selection of pencil entry tool 808-4 causes the device to enter into a pencil entry mode in which handwritten inputs drawn in the content entry region are stylized as if drawn by a pencil (e.g., without converting them to font-based text). In some embodiments, content entry tools other than text entry tool 808-1 are referred to as drawing tools (e.g., because the tools allow a user to draw in the content entry region and are not converted into font-based text). In FIG. 8A, pen entry tool 808-2 is currently active (e.g., as shown by the representation of pen entry tool 808-2 displayed higher than the other entry tools).

In FIG. 8B, a contact with touch screen 504 by stylus 203 is detected while device 500 is in pencil entry mode. In some embodiments, in response to the contact by stylus 203, a representation of the handwritten input (e.g., by stylus 203) is displayed at the contact location. Thus, the user is able to begin directly drawing in content entry region 802.

In FIG. 8C, while maintaining the contact with touch screen 504, a circular movement by stylus 203 is detected. In some embodiments, in response to detecting the circular movement, device 500 displays a representation of the handwritten input 812. In some embodiments, a representation of the input is displayed while the input is being received. In FIG. 8C, representation 812 is a crudely drawn circle (e.g., not a perfect circle) drawn by the user. In FIG. 8D, a termination of the contact with touch screen 504 is detected (e.g., lift-off of stylus 203 from touch screen 504). In some embodiments, in response to detecting the termination of the contact, representation 812 is inserted into content entry region 802 (e.g., display of representation 812 is maintained in content entry region 802).

In FIG. 8E, a hand-drawn input is received from stylus 203 in a circular motion (e.g., similar to the one received in FIG. 8C) corresponding to a crudely drawn circle. In FIG. 8E, in response to the hand-drawn input, device 500 displays representation 814 of the hand-drawn input. In FIG. 8F, after completing drawing the circle (e.g., after closing the loop of the circle), contact by stylus 203 is maintained for less than a threshold amount of time such as 0.5 seconds, 1 second, 2 seconds (as shown by timer 816) (e.g., and while movement of stylus remains less than a threshold distance). In some embodiments, in FIG. 8F, no movement is detected by stylus 203 while maintaining contact with touch screen 504 (or optionally any detected movement is less than a threshold amount, such as 0.1 mm, 0.2 mm, 0.5 mm, 1 mm, 3 mm, etc.).

In FIG. 8G, contact by stylus 203 is maintained for more than the threshold amount of time (e.g., 0.25 seconds, 0.5 seconds, 1 second, 3 seconds, 5 seconds, etc.). In some embodiments, in response to contact by stylus 203 being maintained for more than the threshold amount of time (e.g., with less than the threshold amount of movement by stylus 203), device 500 displays normalized shape 818 in content entry region 802, as shown in FIG. 8G. In some embodiments, device 500 determines that representation 814 corresponds to a pre-determined shape (e.g., a circle) and normalized shape 818 is a normalized version of the pre-determined shape associated with representation 814. For example, in FIG. 8G, device 500 identifies representation 814 as corresponding to a circle and displays a normalized circle (e.g., normalized shape 818) in content entry region 802. In some embodiments, normalized shape 818 is displayed at the location of representation 814 such that a part of normalized shape 818 is at the location of the contact of stylus 203 with touch screen 504. As shown in FIG. 8G, normalized shape 818 is a device-provided (e.g., perfect) circle with a size based on the size of representation 814. In some embodiments, normalized shape 818 has a radius equal to or similar to the average radius of representation 814. In some embodiments, normalized shape 818 is a perfect circle that is the best fit to representation 814. In some embodiments, other algorithms are possible for determining the best size for normalized shape 818 to replace representation 814.

In some embodiments, concurrently with display of normalized shape 818 (optionally before display of normalized shape 818 or after display of normalized shape 818), representation 814 is greyed out or otherwise de-emphasized (e.g., a visual characteristic of representation 814, such as color, transparency, etc., is changed though the display of representation 814 is maintained).

Thus, as discussed above, maintaining the contact with touch screen 504 after drawing a shape is interpreted as a request to insert a normalized shape, and device 500 displays a proposed normalized shape 818 as a replacement for the representation of the user's handwritten input. In FIG. 8H, a termination of the contact with touch screen 504 is detected (e.g., lift-off of stylus 203 from touch screen 504). In some embodiments, in response to detecting the termination of the contact, device 500 ceases display of representation 814 and maintains display of normalized shape 818 (optionally inserts normalized shape 818 into content entry region 802), as shown in FIG. 8H, at the location at which normalized shape 818 was displayed prior to detecting the termination of the contact with touch screen 504. Thus, in some embodiments, the termination of the contact while displaying the proposed normalized shape 818 is interpreted as an acceptance of proposed normalized shape 818.

In some embodiments, the visual characteristics of the proposed normalized shape are based on the visual characteristic of the representation (e.g., handwritten input) on which the normalized shape is based. In some embodiments, different portions of the proposed normalized shape are based on the corresponding portions of the representation on which the normalized shape is based. In some embodiments, the visual characteristics of the representation on which the normalized shape is based are based on a (e.g., physical) characteristic of the handwritten input.

For example, in FIG. 8I, a hand-drawn input is received from stylus 203 in a semi-circular motion corresponding to a crudely drawn half-circle. In some embodiments, in response to the hand-drawn input and while receiving the input, representation 820-1 is displayed in content entry region 802, as shown in FIG. 8I. In some embodiments, while drawing the semi-circle in FIG. 8I, the input intensity by stylus 203 (e.g., pressure against touch screen 504) is relatively light. In some embodiments, because input intensity by stylus 203 was light, representation 820-1 of the semi-circle is thin. In FIG. 8J, a continued hand-drawn input is received from stylus 203 in a semi-circular motion completing the circle. In some embodiments, in response to the continued hand-drawn input and while receiving the input, representation 820-2 is displayed in content entry region 802, as shown in FIG. 8J. In some embodiments, while drawing the second semi-circle in FIG. 8J, the input intensity by stylus 203 (e.g., pressure against touch screen 504) is relatively heavy (e.g., heavier than in FIG. 8I). In some embodiments, because the input intensity was heavy, representation 820-2 of the semi-circle is thick (e.g., thicker than representation 820-1). Thus, as shown in FIG. 8I and FIG. 8J, the thickness of the representation of the handwritten circle is based on the input intensity of stylus 203 on touch screen 504 while drawing respective portions of the circle.

In FIG. 8K, after completing drawing the circle (e.g., after closing the loop of the circle), contact by stylus 203 is maintained for less than a threshold amount of time (as shown by timer 816) (e.g., and while movement of stylus remains less than a threshold distance). In FIG. 8L, contact by stylus 203 is maintained for more than the threshold amount of time (e.g., 0.25 seconds, 0.5 seconds, 1 second, 3 seconds, 5 seconds, etc.). In some embodiments, in response to contact by stylus 203 being maintained for more than the threshold amount of time, device 500 displays normalized shape 822 in content entry region 802, as shown in FIG. 8L. As shown in FIG. 8L, normalized shape 822 has a first portion 822-1 and second portion 822-2 corresponding to representation 820-1 (e.g., the first portion of the hand-drawn circle) and representation 820-2 (e.g., the second portion of the hand-drawn circle), respectively. In some embodiments, first portion 822-1 corresponding to representation 820-1 has a thickness based on the thickness of representation 820-1 and second portion 822-2 corresponding to representation 820-2 has a thickness based on the thickness of representation 820-2. In FIG. 8L, first portion 822-1 is thin and second portion 822-2 is thick.

In FIG. 8M, a termination of the contact with touch screen 504 is detected (e.g., lift-off of stylus 203 from touch screen 504). In some embodiments, in response to detecting the termination of the contact, device 500 ceases display of representations 820-1 and 820-2 and maintains display of normalized shape 822 (e.g., maintains display of first portion 822-1 and second portion 82-2), as shown in FIG. 8M. Thus, in some embodiments, the termination of the contact while displaying the proposed normalized shape 822 is interpreted as an acceptance of proposed normalized shape 822. Thus, as shown, the visual characteristics of the proposed normalized shape are based on the visual characteristic of the representation on which the normalized shape is based.

FIG. 8N illustrates different embodiments in which proposed normalized shapes have different visual characteristics based on the characteristics of the input. In FIG. 8N, hand-drawn representation 824-1 corresponding to a crudely drawn square is drawn with light input intensity (e.g., light pressure against touch screen 504 by stylus 203) and thus has a thin line width. In some embodiments, hand-drawn representation 824-1 is drawn without detecting lift-off of stylus 203 with touch screen 504 (e.g., optionally only shapes that are drawn without lift-off of contact with touch screen 504 are analyzed to generate a normalized shape). In some embodiments, proposed normalized shape 826-1 based on representation 824-1 has a thin border due to the light input intensity. Hand-drawn representation 824-2 corresponding to a crudely drawn square is drawn with a heavy input intensity (e.g., heavy input pressure against touch screen 504 by stylus 203) and thus has a thick line width. In some embodiments, proposed normalized shape 826-2 based on representation 824-2 has a thick border due to the heavy input intensity. Hand-drawn representation 824-6 is drawn with a variable input intensity (e.g., light in certain portions, heavy in certain portions, and medium in other portions). Proposed normalized shape 826-6 based on representation 824-6 has variable thicknesses corresponding to the variable thickness of representation 824-6. Thus, the thickness of representation 824-6 (and thus the resulting thickness of normalized shape 826-6) is analogously based on the amount of input intensity (e.g., not limited to merely thin and thick states, but also includes all potential thicknesses).

In FIG. 8N, hand-drawn representation 824-3 is drawn with a fast input speed (e.g., the movement of stylus 203 on touch screen 504 was fast) and thus has a thin line width. In some embodiments, proposed normalized shape 826-3 has a thin border due to the fast input speed. Hand-drawn representation 824-4 corresponding to a crudely drawn square is drawn with a slow input speed and thus has a thick line width. In some embodiments, proposed normalized shape 826-4 based on representation 824-4 has a thick border due to the slow input speed. Hand-drawn representation 824-5 is drawn with a variable input speed (e.g., fast in certain portions, slow in certain portions, and medium speed in other portions). Proposed normalized shape 826-5 based on representation 824-5 has variable thicknesses corresponding to the variable thickness of representation 824-5. Thus, the thickness of representation 824-5 (and thus the resulting thickness of normalized shape 826-5) is analogously based on the amount of input speed (e.g., not limited to merely thin and thick states, but also includes all potential thicknesses).

As shown above in FIG. 8N, device 500 is able to identify that a user has hand-drawn a square and propose a normalized square based on the hand-drawn square. Similarly, in some embodiments, device 500 is able to identify a rectangle (e.g., different length sides) and propose a normalized rectangle.

Although the proposed normalized shapes are displayed next to the hand-drawn representations on which they are based, this is merely illustrative and it is understood that the proposed normalized shapes are displayed at the location of the respective hand-drawn representation, such as illustrated and described above with respect to FIGS. 8G-8L. Additionally, although FIG. 8N illustrates input intensity and input speed as characteristics of the input that affect the visual characteristic of the handwritten representation (and thus the normalized shape), other physical characteristics of the user input can affect the visual characteristics of the handwritten representation (and thus the normalized shape). Additionally or alternatively, as will be described in further below, the currently active content entry tool affects how the physical characteristics of the input translate into the visual characteristics of the handwritten representation.

FIGS. 8O-8X illustrate an embodiment in which the direction of the input movement and/or the angle of stylus 203 affects the visual characteristics of the resulting normalized shape. In FIG. 8O, a user input selecting marker entry tool 808-3 on content entry palette 804 is received. In some embodiments, in response to the user input, marker entry tool 808-3 becomes the active tool (e.g., and pen entry tool 808-2 becomes inactive), as shown in FIG. 8P. In some embodiments, marker entry tool 808-3 mimics the styling of a marker (e.g., a calligraphy marker) such that drawings in certain directions cause thicker or thinner line widths due to mimicking the rectangular tip shape of a marker.

For example, in FIG. 8P, a leftward swipe from stylus 203 is received in content entry region 802. In some embodiments, in response to receiving the leftward swipe, representation 828-1 is displayed in content entry region 802, as shown in FIG. 8P. In FIG. 8P, the thickness of representation 828-1 is based on the direction of the leftward swipe and representation 828-1 has a thick line width. Additionally or alternatively, the color and/or saturation of representation 828-1 also depends on the direction of the input and thus representation 828-1 is displayed with a grey color.

In FIG. 8Q, a downward swipe from stylus 203 is received in content entry region 802 (e.g., continuing from the leftward swipe in FIG. 8P). In some embodiments, in response to receiving the downward swipe, representation 828-2 is displayed in content entry region 802, as shown in FIG. 8Q. In FIG. 8Q, representation 828-2 has a thinner line width (e.g., as compared to representation 828-1) because representation 828-2 was drawn in a direction different from representation 828-1. Additionally or alternatively, representation 828-2 is displayed with a darker and/or more saturated color than representation 828-1. Thus, as shown in the embodiment illustrated in FIGS. 8P-8Q, a leftward swipe mimics drawing using a marker across the thick dimension of the marker tip whereas a downward swipe mimics drawing using a marker across the thin dimension of the marker tip. As a result, in such embodiments, a leftward swipe causes a thick (e.g., wide) line width that is lighter (e.g., mimicking less ink), whereas a downward swipe causes a thin (e.g., narrow) line width that is darker (e.g., mimicking more ink). Similarly, as shown in FIG. 8Q, the beginning and end of each stroke (e.g., optionally the corners) have an angle to mimic the shape of the marker tip as it interacts with touch screen 504. It is understood that although the figures illustrate the strokes being in a particular direction, device 500 is able to mimic the shape of the marker tip in response to the user drawing non-straight strokes (e.g., the size, shape, darkness and/or transparency optionally dynamically updates based on the instantaneous direction of the stroke).

In FIG. 8R, a continued movement of stylus 203 is received completing the square, thus drawing representations 828-3 and 828-4.

Figure 8T:
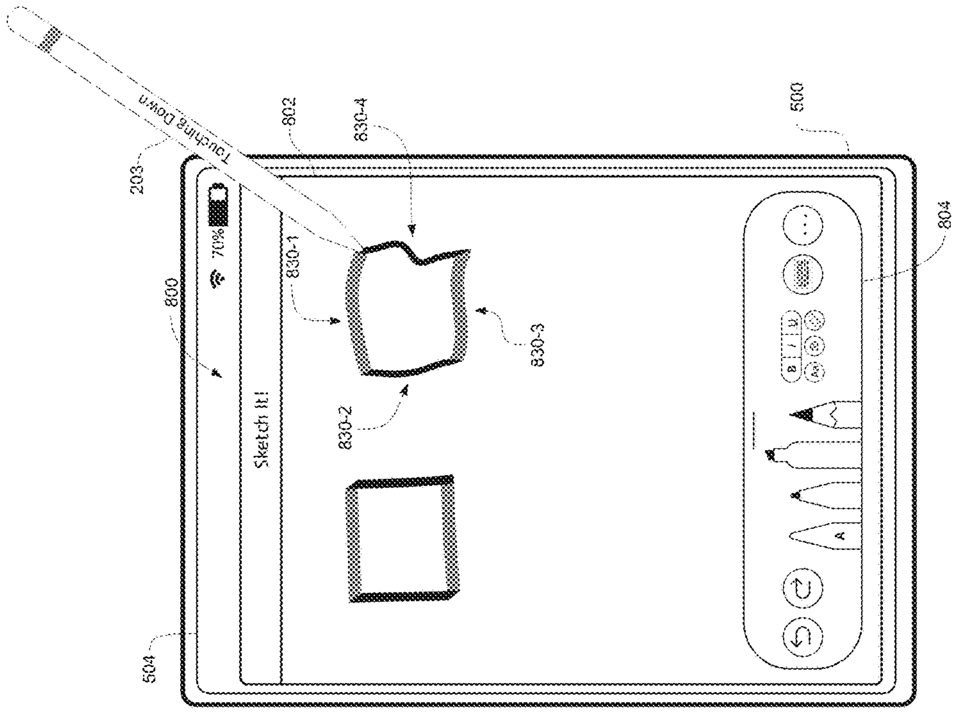
Figure 8S:
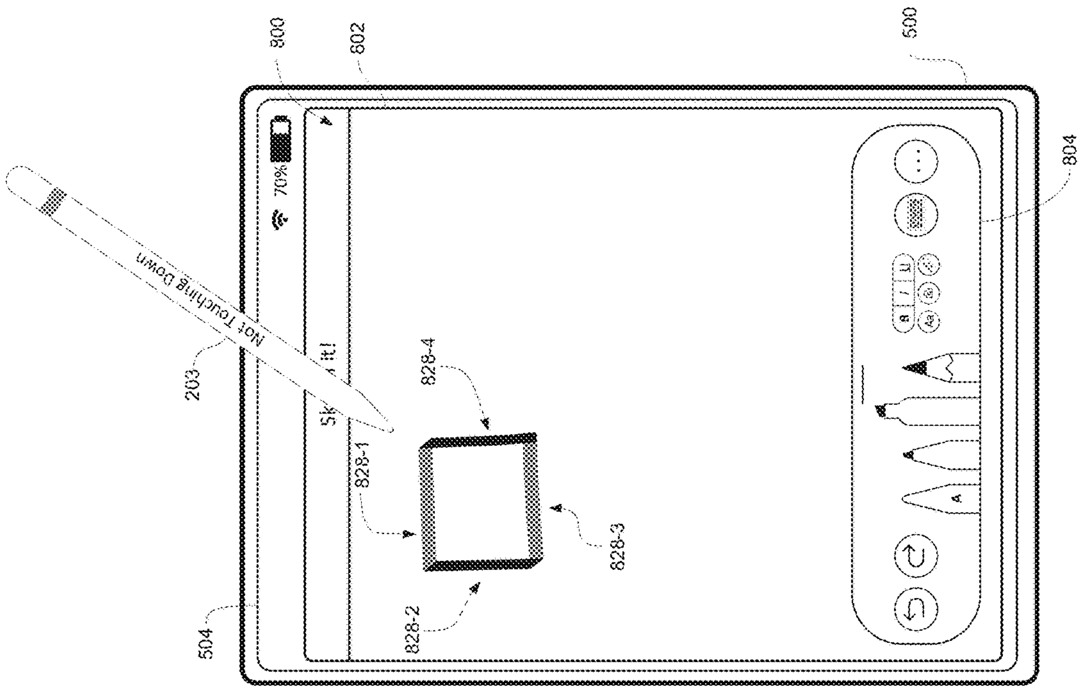

In FIG. 8S, a termination of the contact with touch screen 504 is detected (e.g., lift-off of stylus 203 from touch screen 504). In some embodiments, in response to detecting the termination of the contact, representation 828 is inserted into content entry region 802 (e.g., display of representation 828 is maintained in content entry region 802), as shown in FIG. 8S.

Figure 8V:
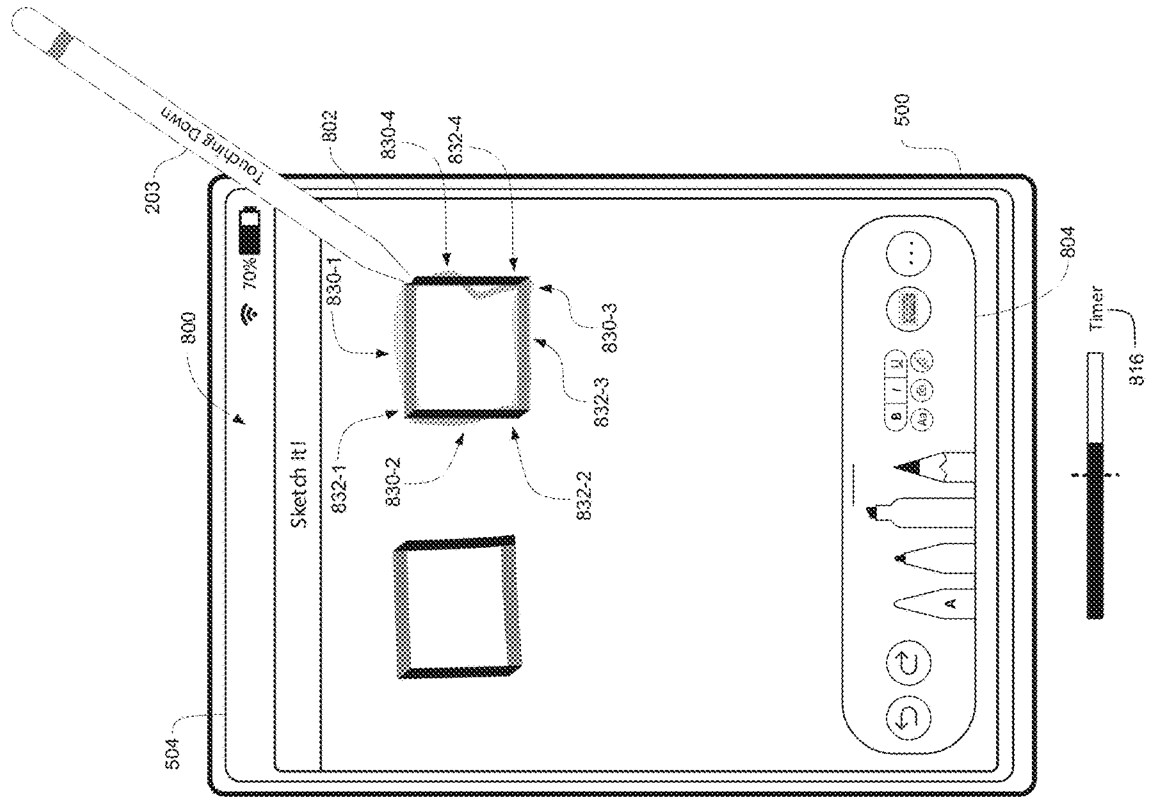
Figure 8U:
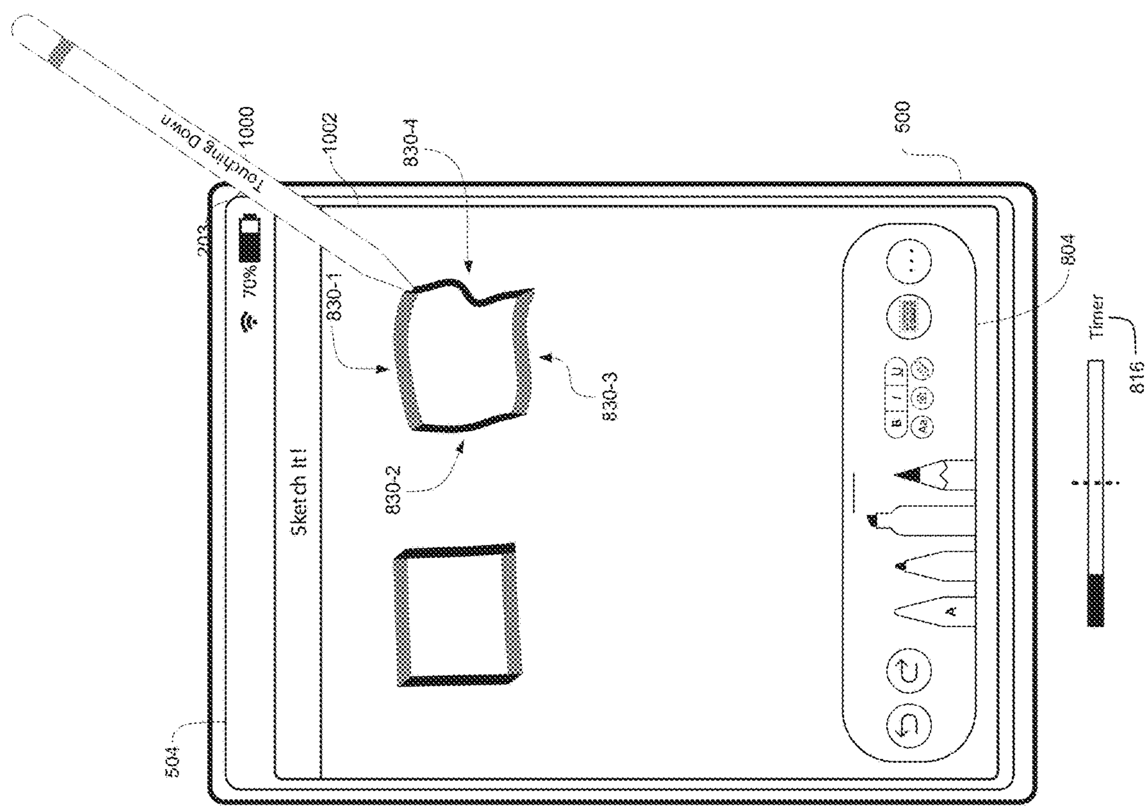

In FIG. 8T, a contact from and movement by stylus 203 is received drawing a crude rectangle shape with the marker tool. In some embodiments, in response to the contact and movement by stylus 203, device 500 displays representation 830 of the handwritten input (e.g., with constituent portions 830-1 to 830-4). In FIG. 8U, after drawing representation 830, contact with touch screen 504 by stylus 203 is maintained for less than a threshold amount of time (e.g., 0.25 seconds, 0.5 seconds, 1 second, 3 seconds, 5 seconds, etc.) (e.g., and while movement of stylus remains less than a threshold distance). In FIG. 8V, contact by stylus 203 is maintained for more than the threshold amount of time (e.g., 0.25 seconds, 0.5 seconds, 1 second, 3 seconds, 5 seconds, etc.). In some embodiments, in response to contact by stylus 203 being maintained for more than the threshold amount of time, device 500 displays normalized shape 832 in content entry region 802, as shown in FIG. 8V. In some embodiments, normalized shape 832 includes four portions (e.g., representations 832-1 to 832-4) corresponding to the four portions from representation 830 (e.g., representations 830-1 to 830-4, respectively).

In some embodiments, the visual characteristics of normalized shape portions 832-1 to 832-4 are based on the visual characteristics of representations 830-1 to 830-4, respectively (which are based on the input characteristics of the handwritten input). In FIG. 8V, normalized shape portion 832-1 has a wider line width with a lighter color, normalized shape portion 832-2 has a thinner line width with a darker color, normalized shape portion 832-3 has a wider line width with a lighter color, and normalized shape 832-4 has a thinner line width with a darker color, based on the respective portions of representation 830. As shown in FIG. 8V, the corners of normalized shape 832 are angled to mimic the shape of the marker tip as the marker changes direction (for example, if the marker is held such that the marker tip is diagonal, then the angles of the corners of normalized shape 832 have the diagonal angle).

Figure 8X:
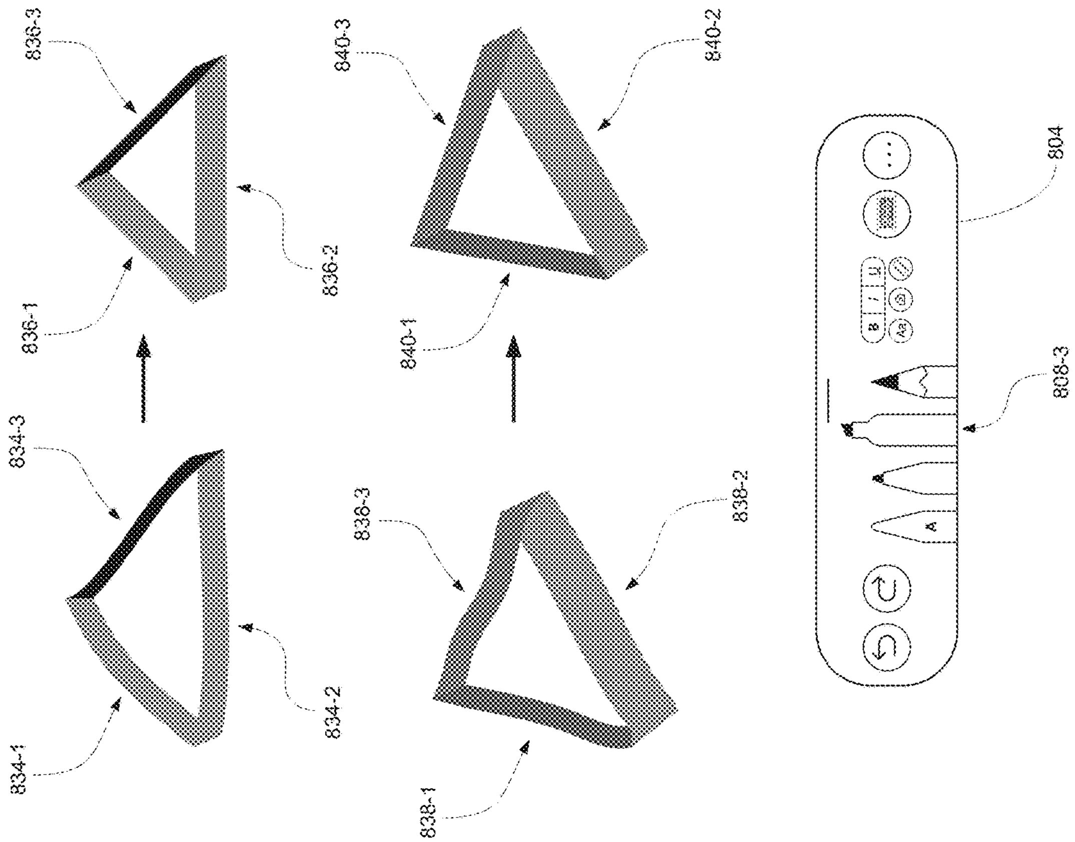
Figure 8W:
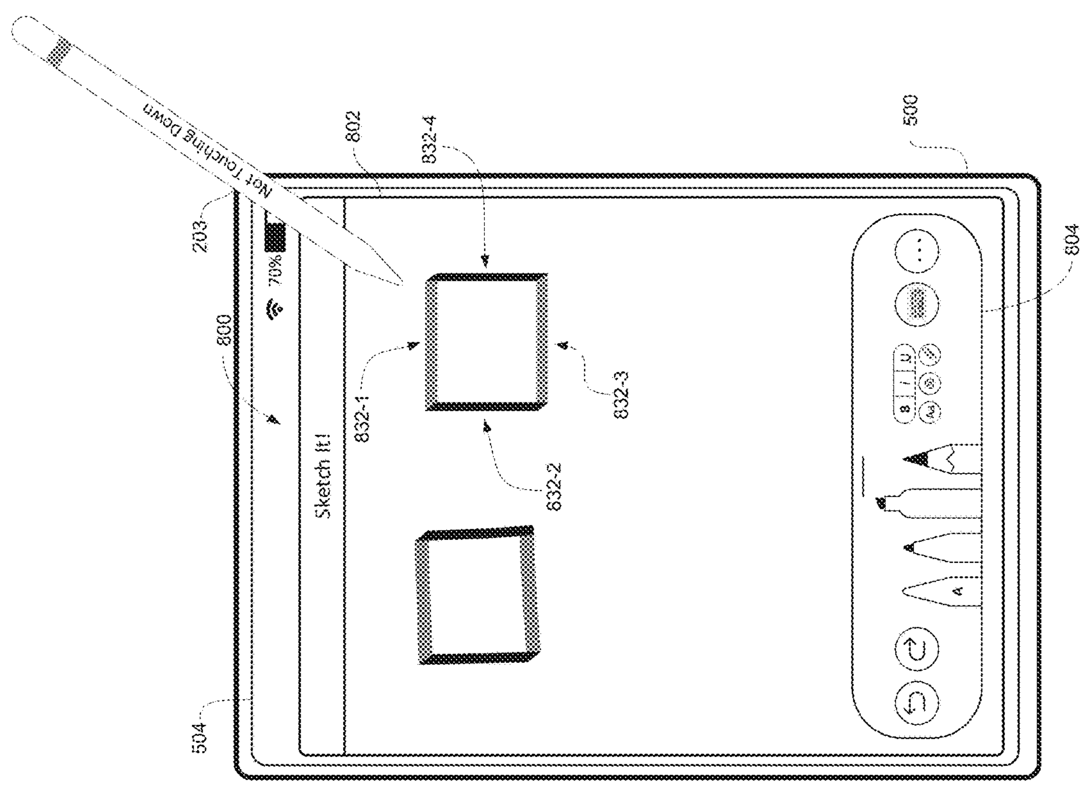

In FIG. 8W, a termination of the contact with touch screen 504 is detected (e.g., lift-off of stylus 203 from touch screen 504). In some embodiments, in response to detecting the termination of the contact, device 500 ceases display of representation 830 and maintains display of normalized shape 832 (optionally inserts normalized shape 832 into content entry region 802), as shown in FIG. 8W.

FIG. 8X illustrates different embodiments in which proposed normalized shapes have different visual characteristics based on the direction of the input. In FIG. 8X, hand-drawn representation 834-1 is drawn in a 45 degree downward-leftward motion, resulting in a thick yet light line. Representation 834-2 is drawn in a horizontal motion, also resulting in a thick yet light line. In some embodiments, the thickness and color of representation 834-1 and 834-2 are similar. Representation 834-3 corresponding to the third side of triangle 834 is drawn in a 45 degree upward-leftward motion, resulting in a thin yet dark line. In some embodiments, based on triangle 834, device 500 proposes normalized shape 836. As shown in FIG. 8X, proposed normalized shape 836 includes section 836-1, section 836-2, and section 836-3 corresponding to representations 834-1, 834-2 and 834-3 of the handwritten input. In some embodiments, section 836-1 is a straight line based on representation 834-1 with a wide line width and light color, section 836-2 is a straight line based on representation 834-2 also with a wide line width and light color, and section 836-3 is a straight line based on representation 834-3 with a narrow line width and dark color. As shown in FIG. 8X, the corners of normalized shape 836 have angles based on the angles of the corners on representation 834.

In FIG. 8X, hand-drawn representation 838-1 is drawn in a 75 degree downward-leftward motion, resulting in a moderately thin and moderately dark line. Representation 838-2 is drawn in a 30 degree horizontal motion, resulting in a thick yet light line. Representation 838-3 corresponding to the third side of triangle 838 is drawn in a 30 degree upward-leftward motion, resulting in a medium thickness line with a medium darkness. In some embodiments, based on triangle 838, device 500 proposes normalized shape 840. As shown in FIG. 8X, proposed normalized shape 840 includes section 840-1, section 840-2, and section 840-3 corresponding to representations 838-1, 838-2 and 838-3 of the handwritten input. In some embodiments, section 840-1 is a straight line based on representation 838-1 with a moderately thin and moderately dark line, section 840-2 is a straight line based on representation 838-2 with a thick yet light line, and section 840-3 is a straight line based on representation 838-3 with a medium thickness line with a medium darkness. As shown in FIG. 8X, the corners of normalized shape 840 have angles based on the angles of the corners on representation 838.

Thus, as shown in FIG. 8X, the representation of a hand-drawn input depends on the characteristics of the active content entry tool in combination with the input characteristics of the handwritten input. In some embodiments, the visual characteristic of the drawing additionally or alternatively depends on the angle of stylus 203 while drawing content in content entry region 802. As shown above in FIG. 8X, device 500 is able to identify that a user has hand-drawn a triangle and propose a normalized triangle based on the hand-drawn triangle.

Figure 8Z:
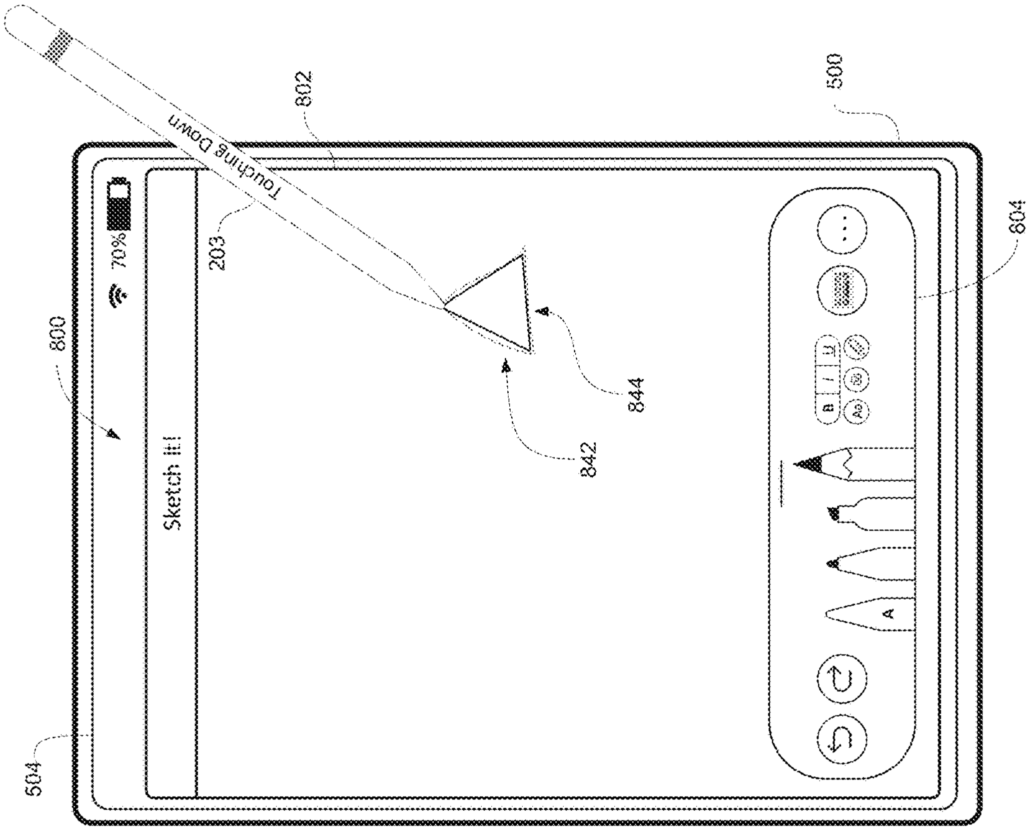
Figure 8Y:
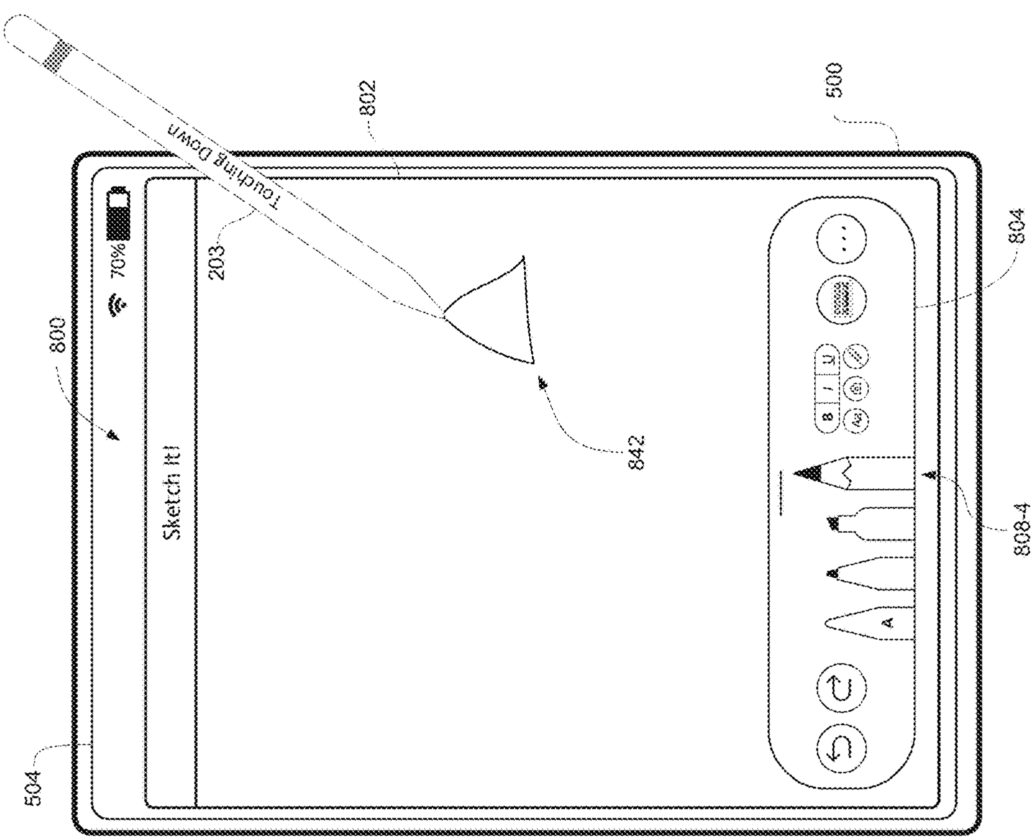
Figure 8B:
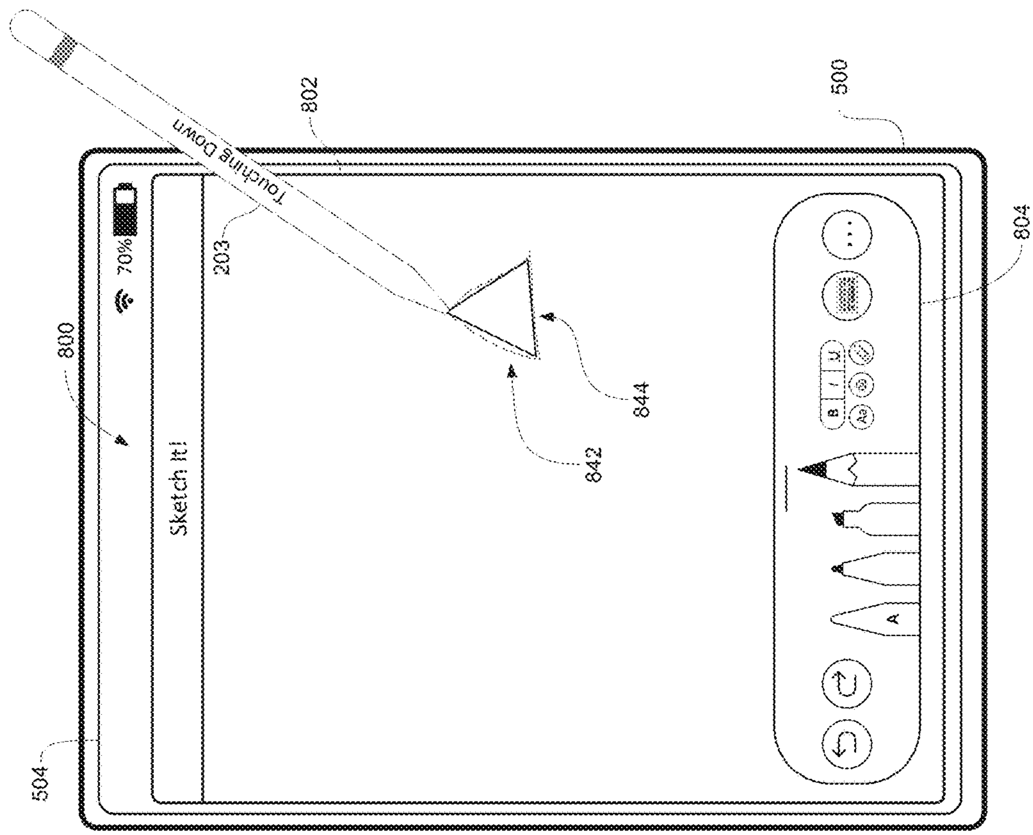
Figure 8A:
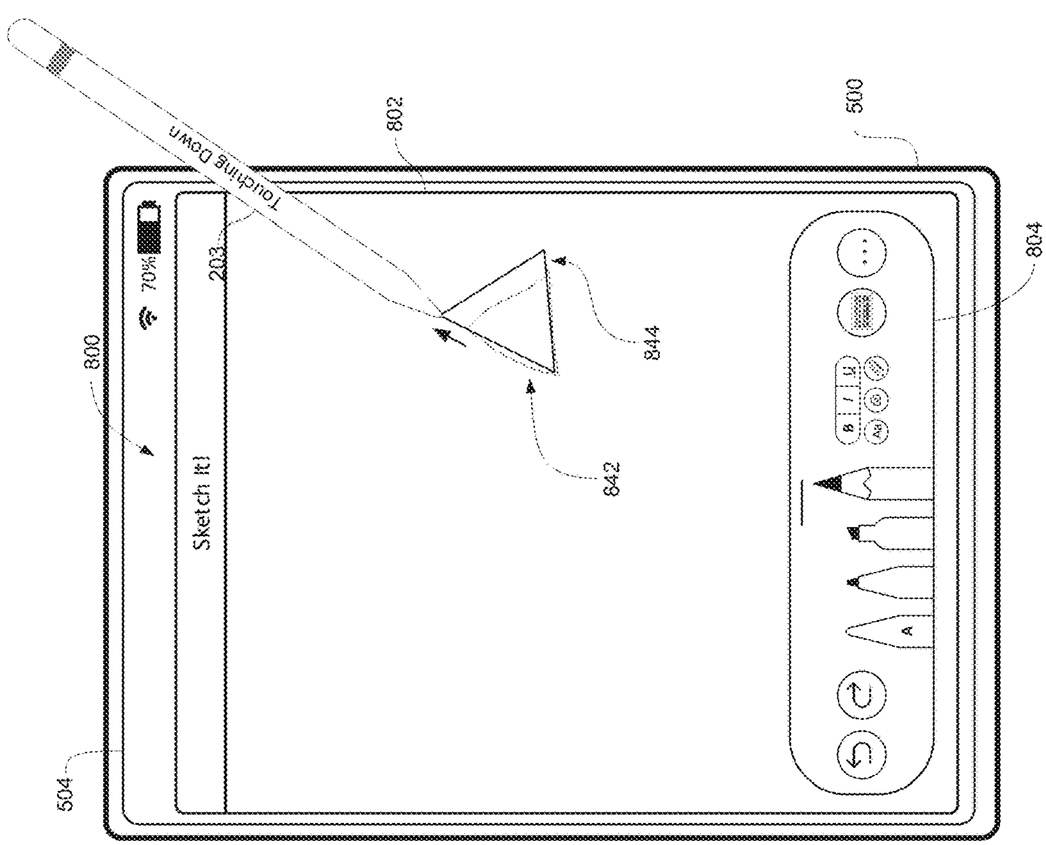
Figure 8D:
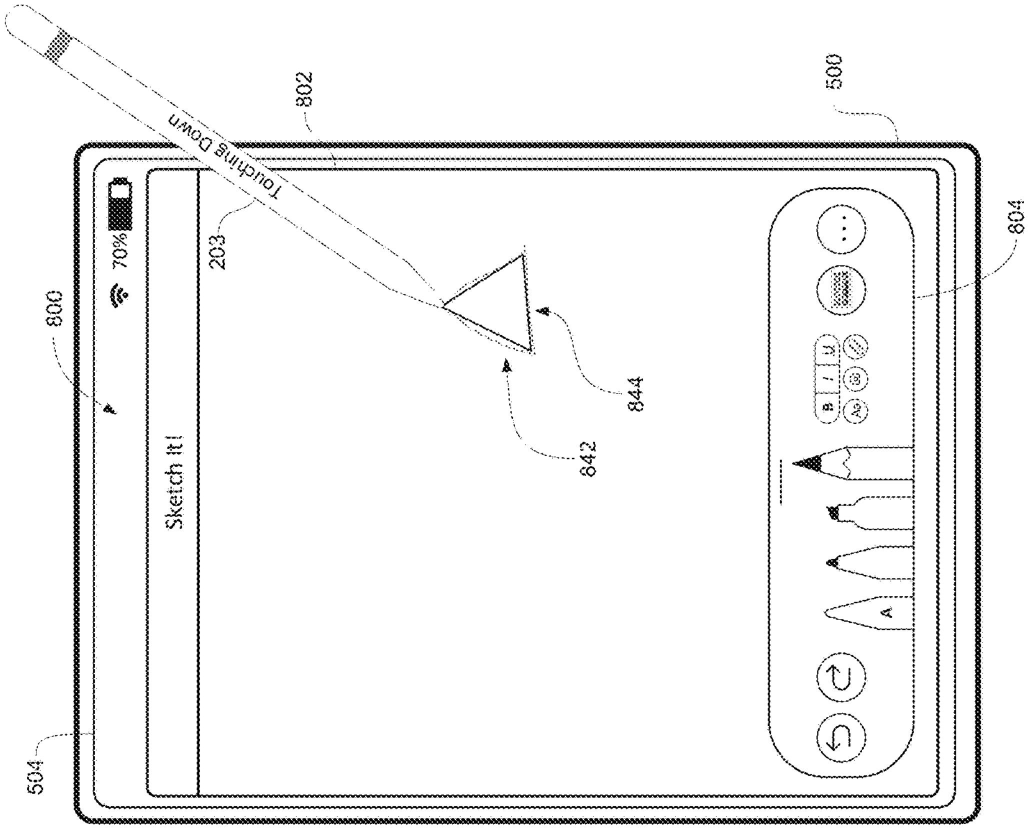
Figure 8C:
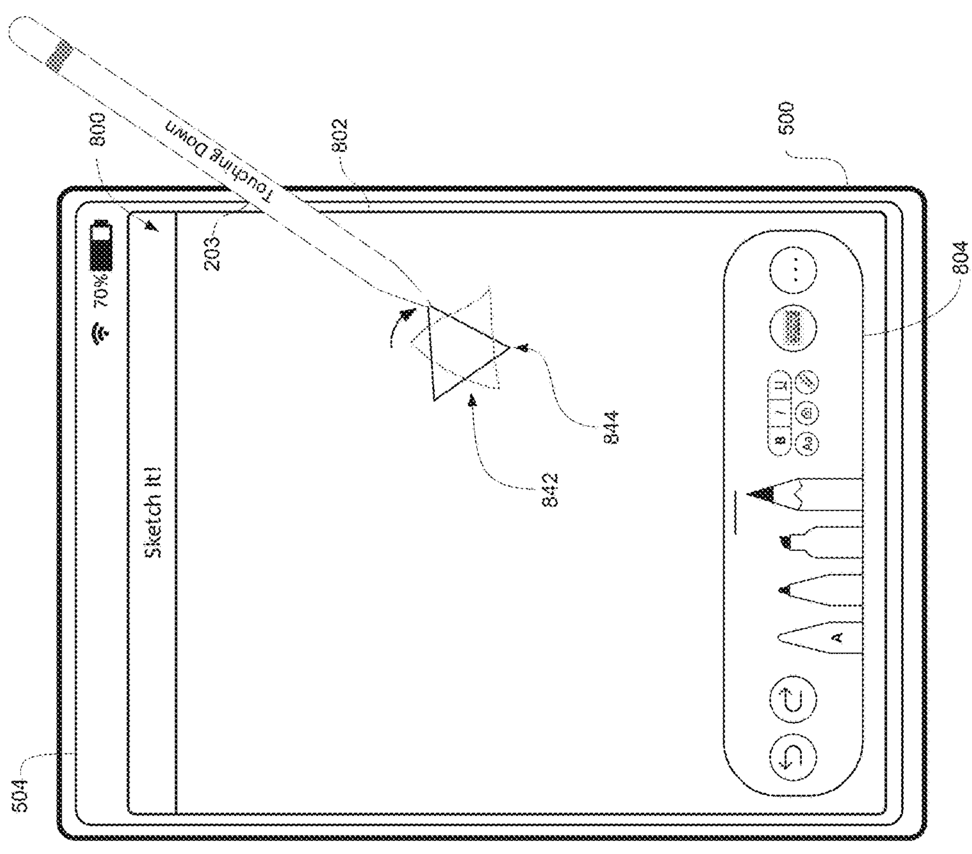
Figure 8F:
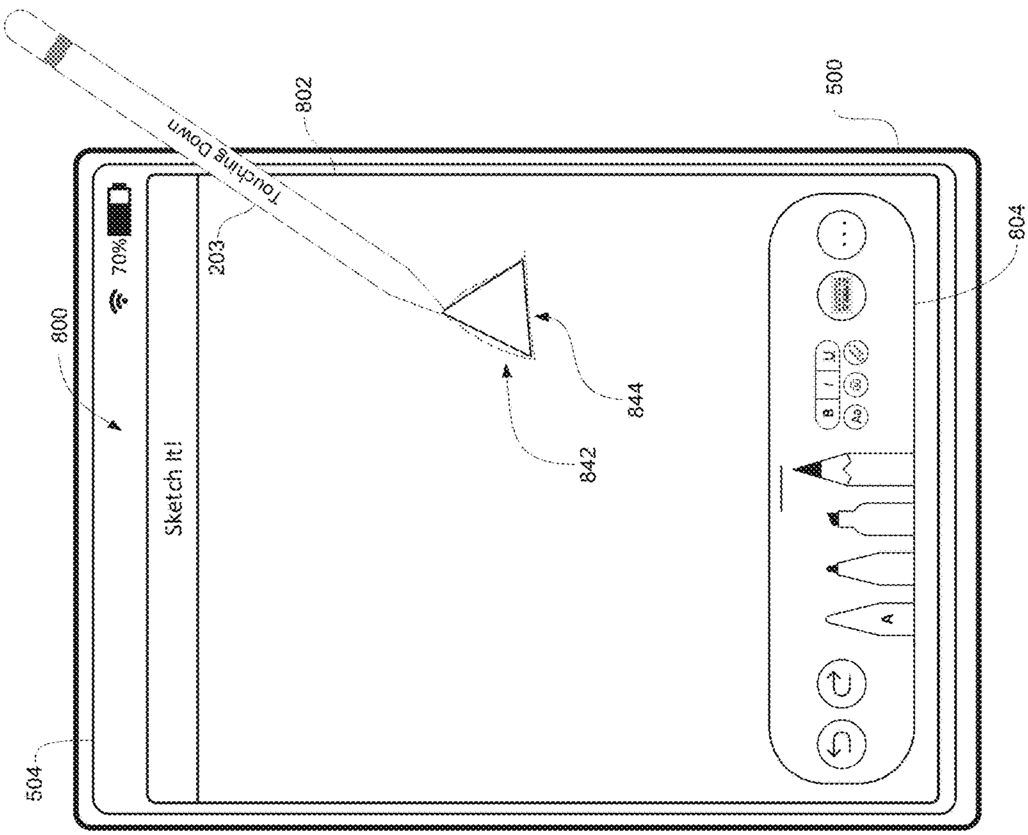
Figure 8E:
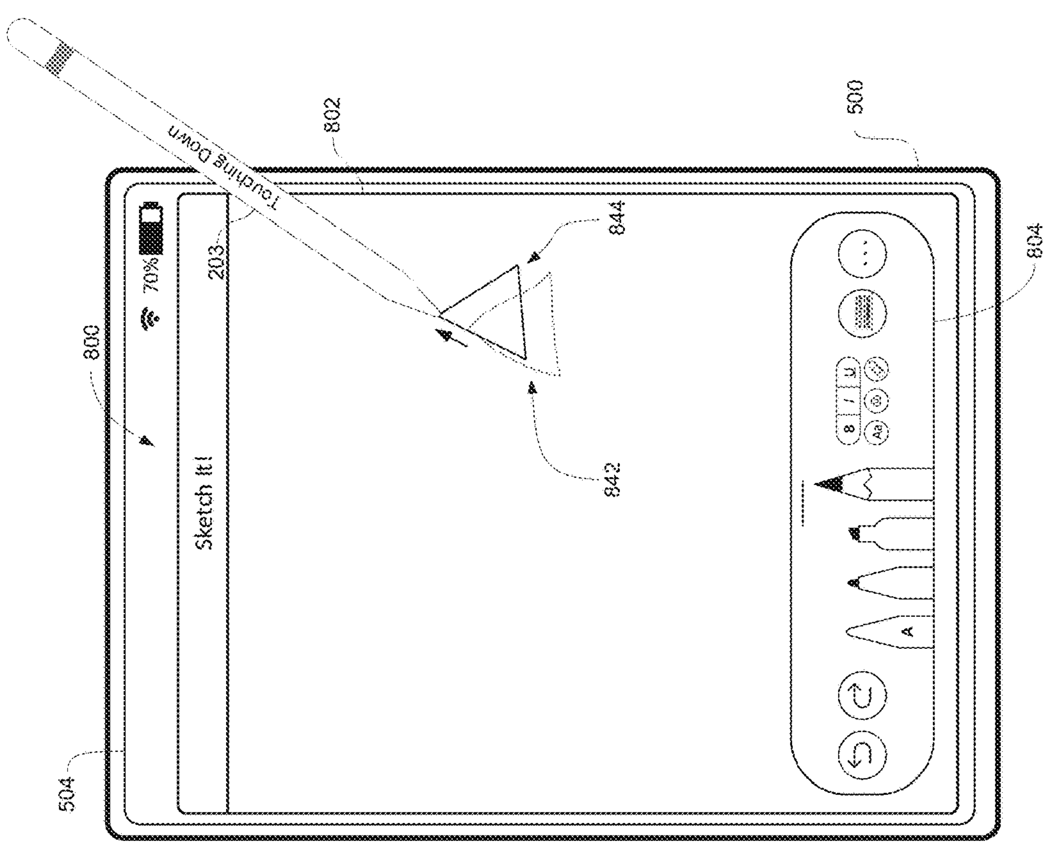
Figure 8G:
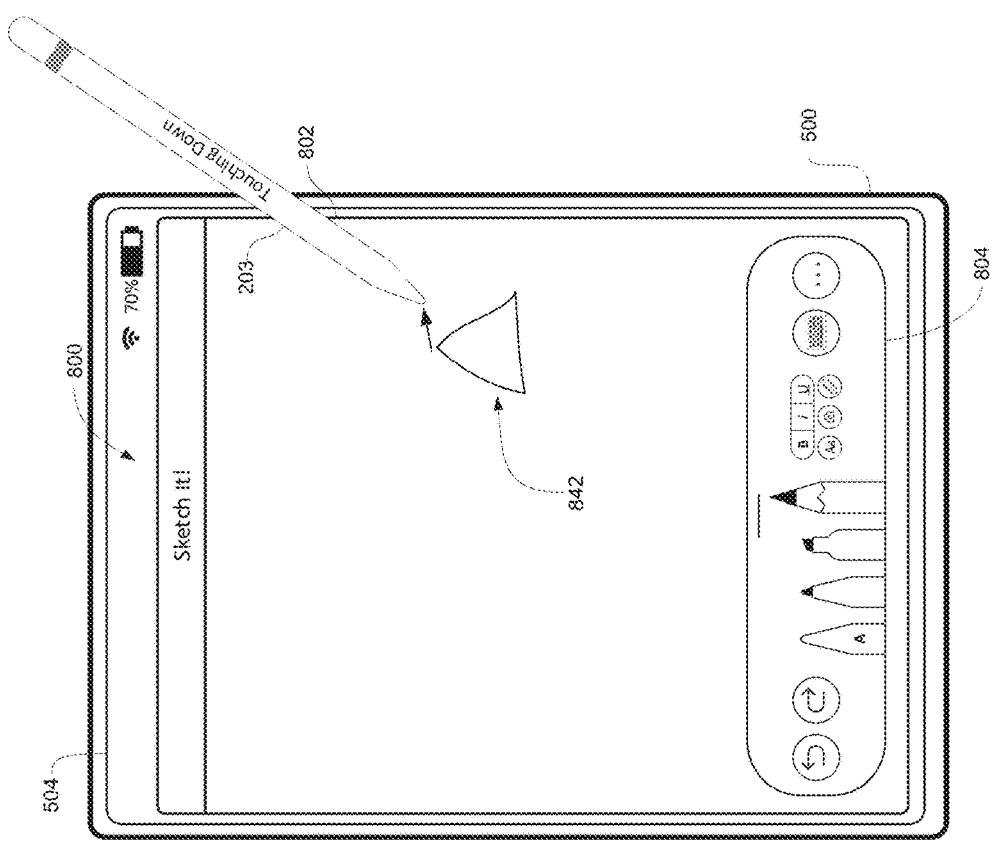
Figure 8H:
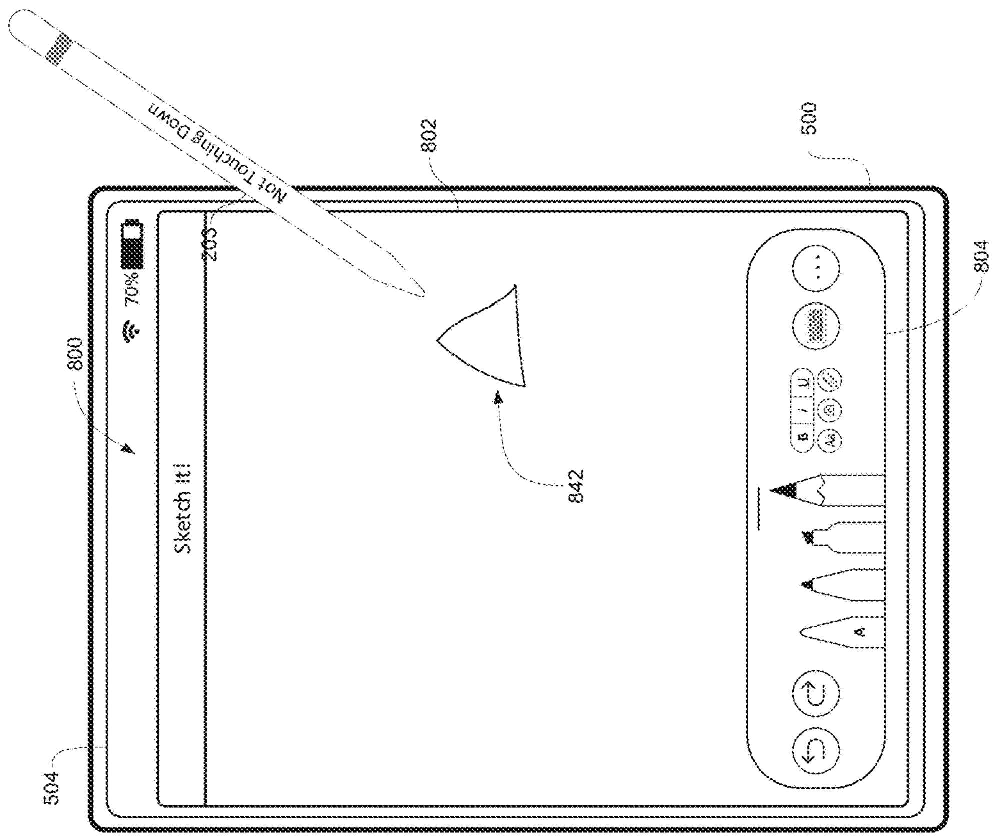
Figure 8J:
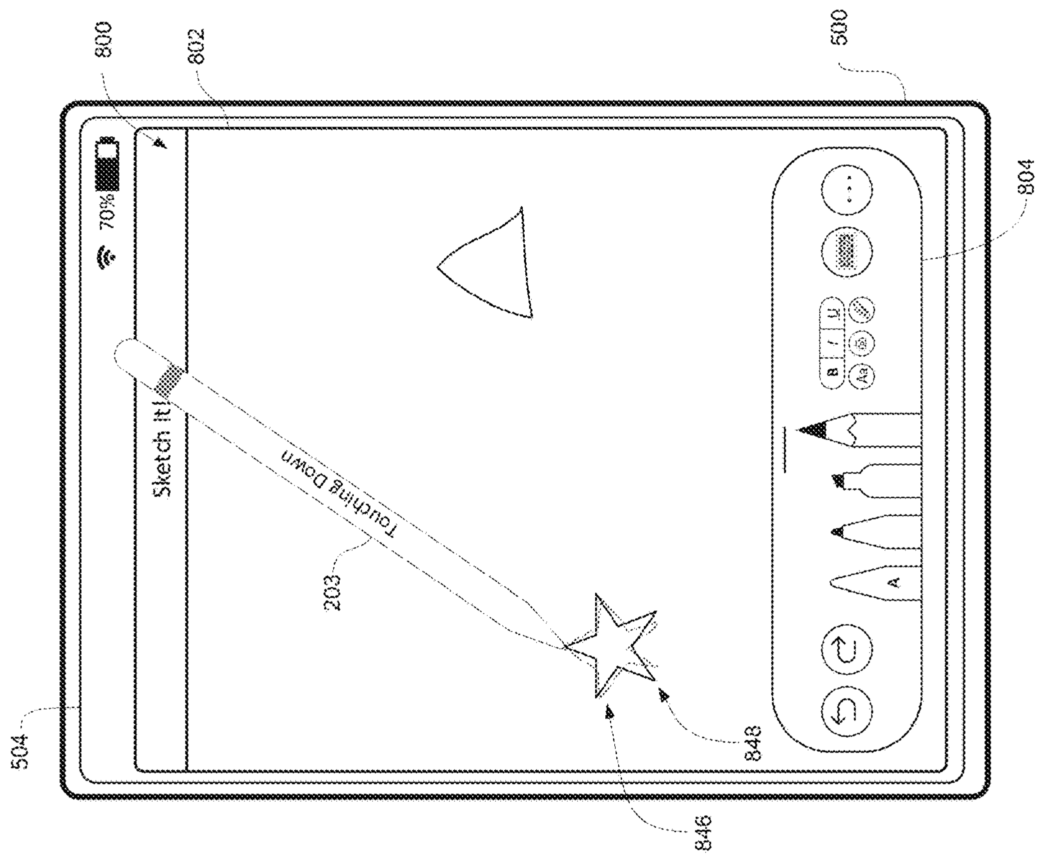
Figure 8I:
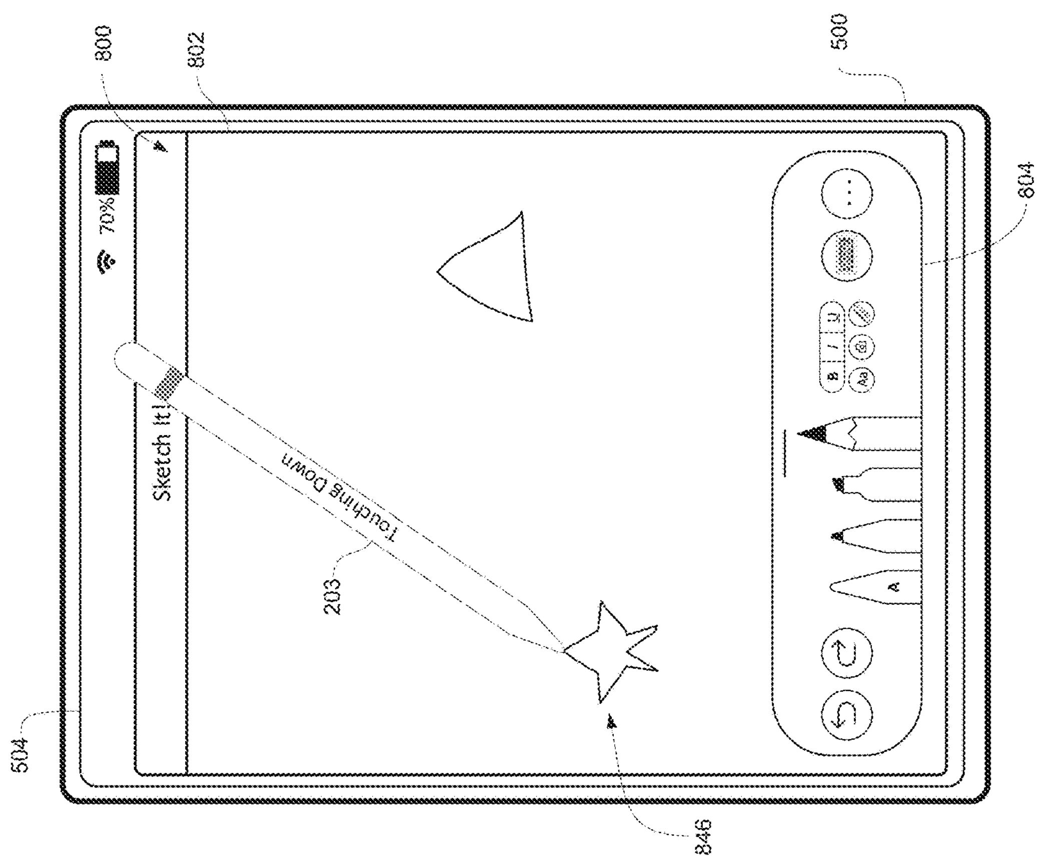
Figure 8L:
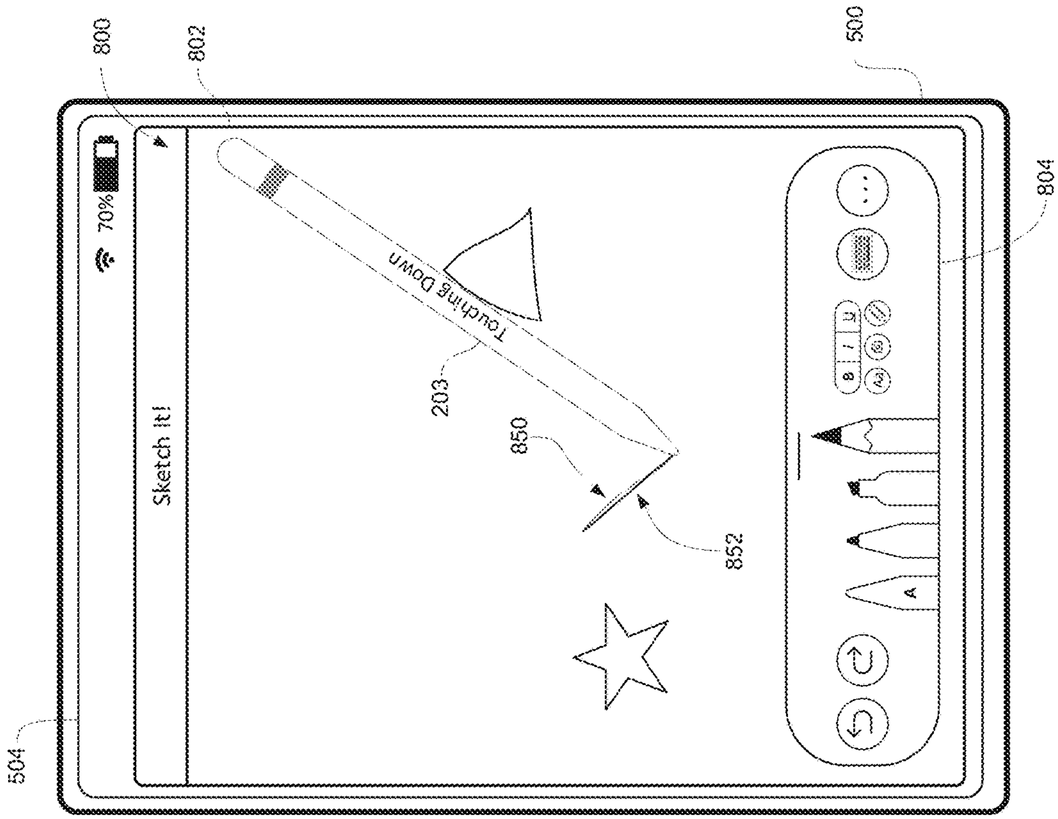
Figure 8K:
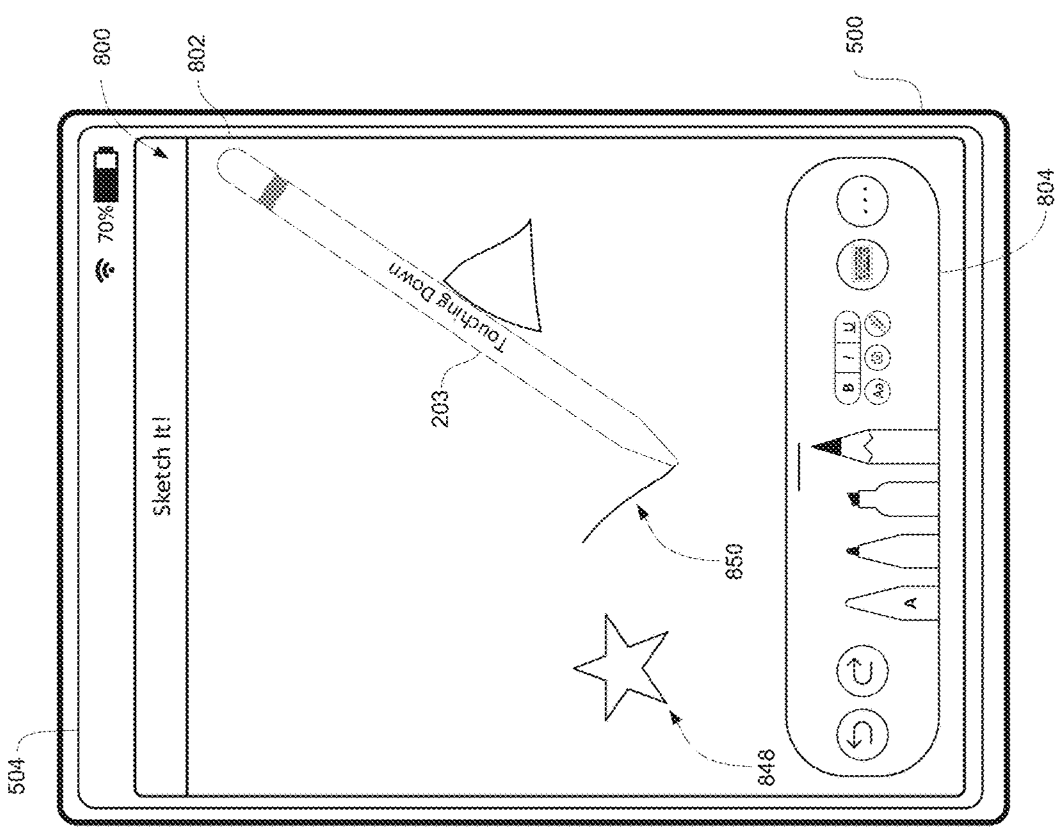
Figure 8N:
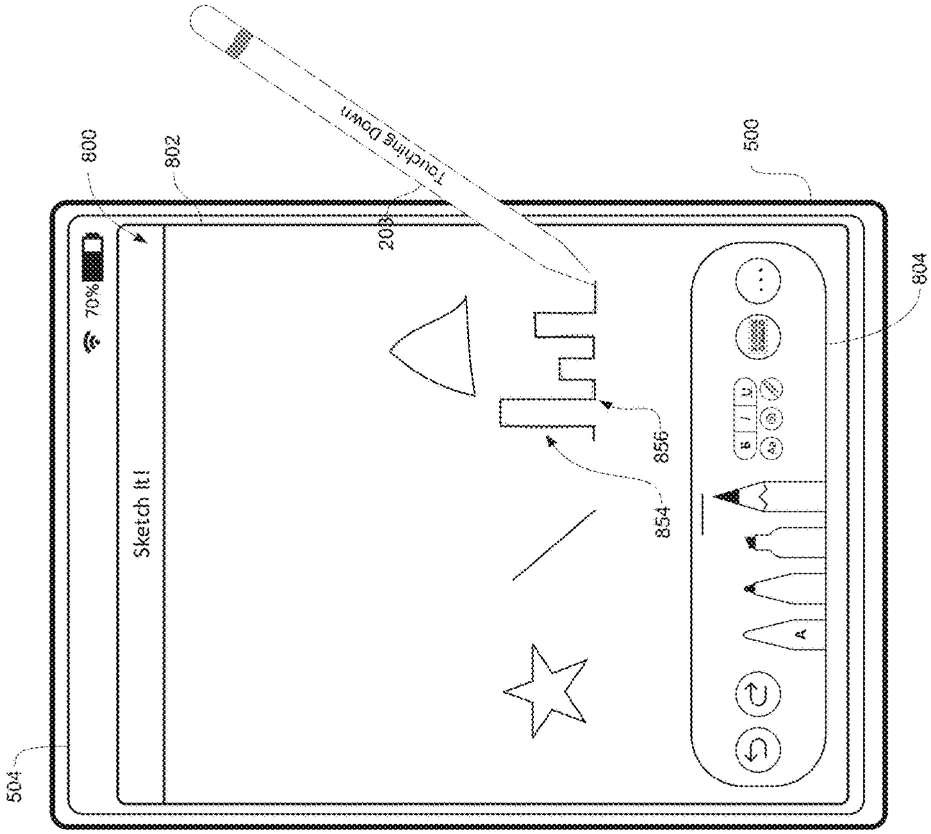
Figure 8M:
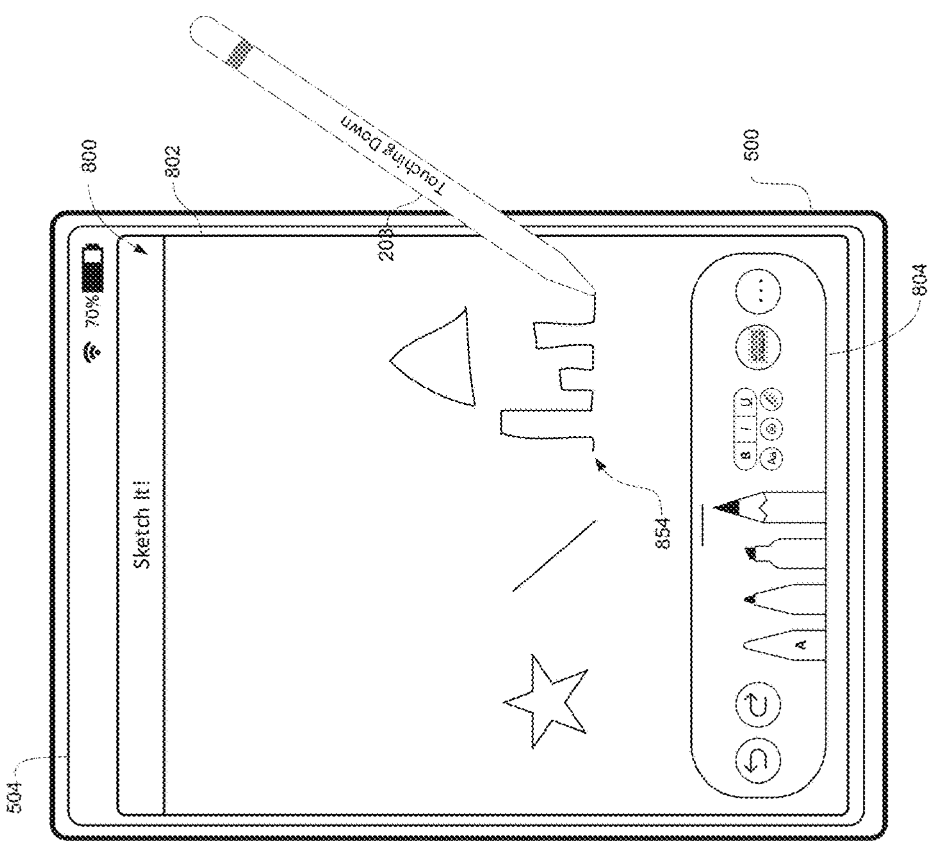
Figure 8P:
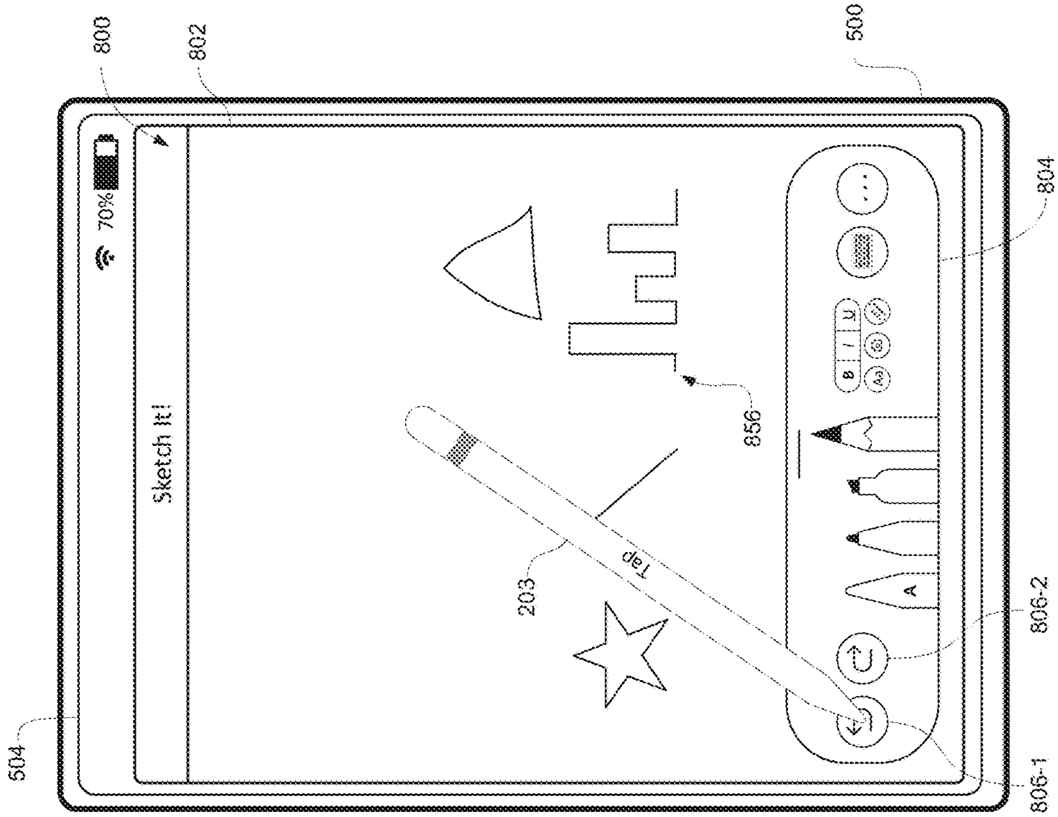
Figure 8O:
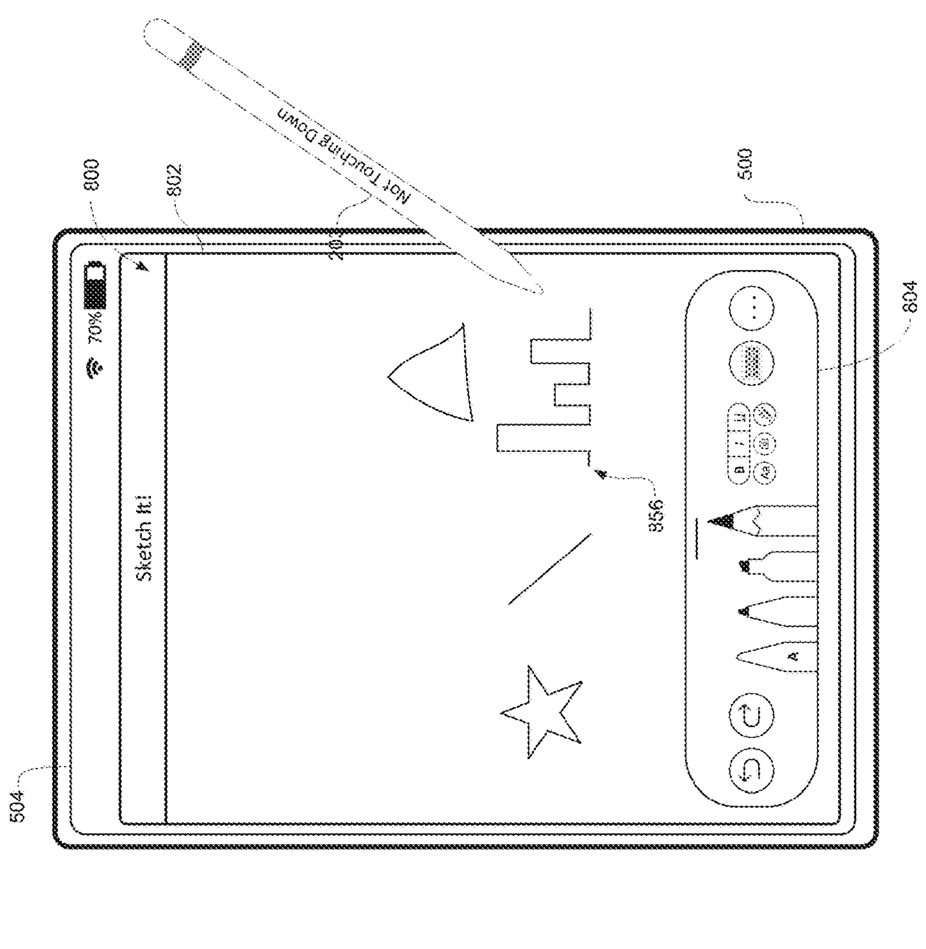
Figure 8Q:
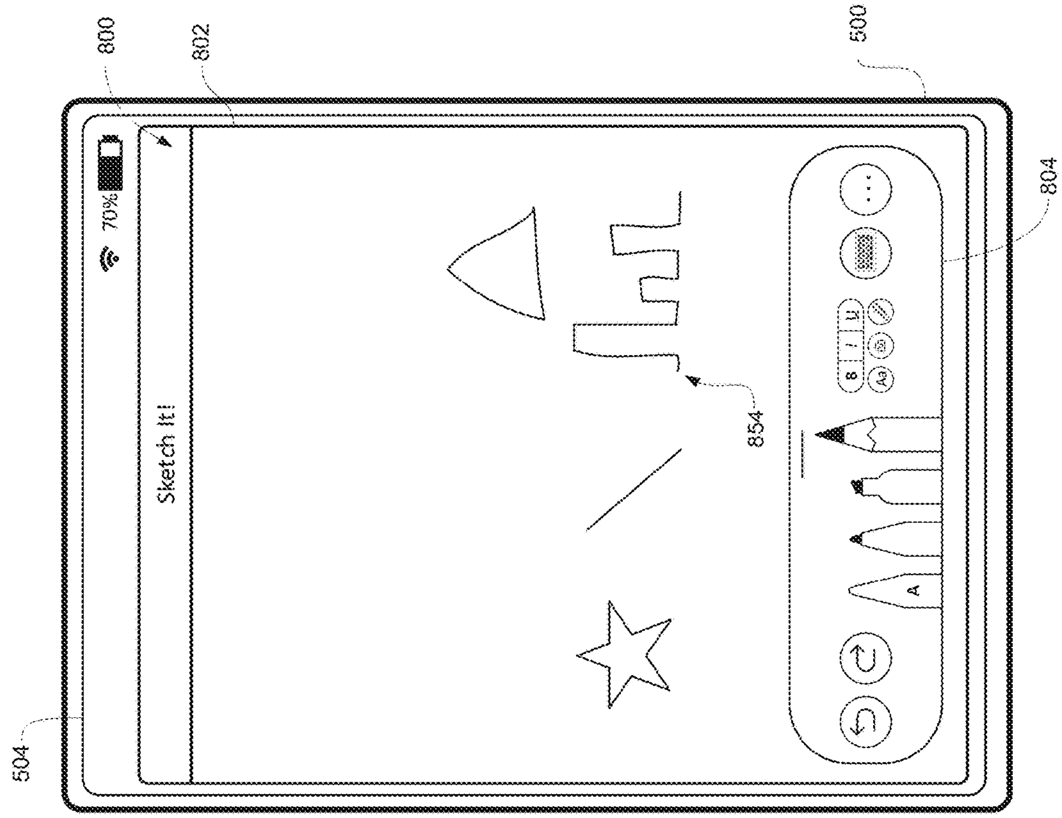

FIGS. 8Y-8HH illustrate embodiments in which a movement of the contact by stylus 203 after the proposed normalized shape is displayed affects the proposed normalized shape. In Fig. a user input is received drawing triangle 842. In FIG. 8Z, in response to maintaining contact with touch screen 504, device 500 displayed normalized shape 844 (and optionally greys out triangle 842). In FIG. 8AA, while normalized shape 844 is displayed and while maintaining contact with touch screen 504, an outward movement of the contact by stylus 203 is detected (e.g., an outward movement away from the centroid of normalized shape 844). In some embodiments, in response to detecting the outward movement of the contact by stylus 203, normalized shape 844 increases in size based on the outward movement of the contact by stylus 203, as shown in FIG. 8AA.

In some embodiments, the bottom-left vertex of normalized shape 844 remains at the same location while the top vertex of normalized shape 844 follows the contact by stylus 203. In some embodiments, the shape of normalized shape 844 is maintained (e.g., ratio of lengths between the sides of the triangle) and thus the bottom-right vertex of normalized shape 844 is extended outward to accommodate the increased size of normalized shape 844. In some embodiments, a respective point on normalized shape 844 is associated with the final drawing contact location of stylus 203 (e.g., where the movement of stylus 203 ended after completion of drawing triangle 842) and the respective point of normalized shape 844 follows the movement of stylus 203 while the other portions of normalized shape 844 either remains fixed or adjusts as needed to maintain the aspect ratio of normalized shape 844. For example, a point on normalized shape 844 opposite to the point that follows the movement of stylus 203 remains fixed while other points of normalized shape 844 move proportionally to achieve the resizing effect.

In some embodiments, if the movement of the contact by stylus 203 is inward towards the center of normalized shape 844, then the top vertex of normalized shape 844 follows the contact by stylus 203 inwards, thus causing normalized shape 844 to decrease in size based on the inward movement of the contact by stylus 203.

In some embodiments, while normalized shape 844 is being resized, triangle 842 (e.g., the original representation of the handwritten input) is not resized and remains at its original location with its original size. In some embodiments, as shown in FIG. 8AA, while receiving the movement of the contact by stylus 203 after displaying normalized shape 844, a representation of the movement of the contact by stylus 203 is not displayed in content entry region 802. For example, after normalized shape 844 is displayed and before normalized shape 844 has been "accepted", device 500 is no longer in a content entry mode and movements of stylus 203 perform one or more functions associated with normalized shape 844, as described in FIGS. 8AA-8HH, as opposed to insertion of content. In some embodiments, after resizing normalized shape 844, in response to detecting the termination of the contact, normalized shape 844 is inserted with the new size (e.g., display is maintained with the new size) and triangle 842 is ceased to be displayed.

FIG. 8BB illustrates an embodiment in which device 500 is displaying triangle 842 and normalized shape 844. In FIG. 8CC, while normalized shape 844 is displayed and while maintaining contact with touch screen 504, a rotational movement of the contact by stylus 203 is detected (e.g., a movement rotating around a centroid of normalized shape 844). In some embodiments, in response to the rotational movement input, normalized shape 844 rotates in accordance with the input, as shown in FIG. 8CC. In some embodiments, the rotation of normalized shape 844 is about the centroid of normalized shape 844 and the top vertex of normalized shape 844 follows the contact by stylus 203. In some embodiments, rotation of normalized shape 844 is combined with the resizing of normalized shape 844 (e.g., if the movement of the contact is both inwards or outwards and rotational).

In some embodiments, while normalized shape 844 is being rotated, triangle 842 (e.g., the original representation of the handwritten input) is not rotated and remains at its original location with its original orientation. In some embodiments, while receiving the movement of the contact by stylus 203 rotating normalized shape 844, a representation of the movement of the contact by stylus 203 is not displayed in content entry region 802. In some embodiments, after rotating normalized shape 844, in response to detecting the termination of the contact, normalized shape 844 is inserted with the new orientation (e.g., display is maintained with the new orientation) and triangle 842 is ceased to be displayed.

FIG. 8DD illustrates an embodiment in which device 500 is displaying triangle 842 and normalized shape 844. In FIG. 8EE, while normalized shape 844 is displayed and while maintaining contact with touch screen 504, an outward movement of the contact by stylus 203 is detected (e.g., an outward movement away from the centroid of normalized shape 844). In some embodiments, in response to detecting the outward movement of the contact by stylus 203, normalized shape 844 moves (while maintaining its original size) in accordance with the movement of the contact by stylus 203, as shown in FIG. 8EE.

In some embodiments, while normalized shape 844 is being moved, triangle 842 (e.g., the original representation of the handwritten input) is not rotated and remains at its original location. In some embodiments, while receiving the movement of the contact by stylus 203 moving normalized shape 844, a representation of the movement of the contact by stylus 203 is not displayed in content entry region 802. In some embodiments, after moving normalized shape 844, in response to detecting the termination of the contact, normalized shape 844 is inserted at the new location (e.g., display is maintained at the new location) and triangle 842 is ceased to be displayed.

FIG. 8FF illustrates an embodiment in which device 500 is displaying triangle 842 and normalized shape 844. In FIG. 8GG, while normalized shape 844 is displayed and while maintaining contact with touch screen 504, an outward movement of the contact by stylus 203 is detected (e.g., an outward movement away from the centroid of normalized shape 844). In some embodiments, in response to detecting the outward movement of the contact by stylus 203 (optionally only if the outward movement of the contact by stylus 203 is more than a threshold amount, such as 0.5 mm, 1 mm, 3 mm, 5 mm, 1 cm, etc.), normalized shape 844 is ceased to be displayed and triangle 842 is returned to its original visual characteristic (e.g., back to its original color, from being greyed out), as shown in FIG. 8GG. Thus, in some embodiments, an outward movement of the contact by stylus 203 is interpreted as a rejection of the proposed shape.

In FIG. 8HH, a termination of the contact with touch screen 504 is detected (e.g., lift-off of stylus 203 from touch screen 504). In some embodiments, while receiving the movement of the contact by stylus 203 moving normalized shape 844, a representation of the movement of the contact by stylus 203 is not displayed in content entry region 802.

In some embodiments, in response to detecting the termination of the contact, triangle 842 is inserted into content entry region 802 (e.g., display of triangle 842 is maintained in content entry region 802), as shown in FIG. 8HH. In some embodiments, if or while the outward movement of the contact by stylus 203 is less than the threshold amount (e.g., 0.5 mm, 1 mm, 3 mm, 5 mm, 1 cm, etc.), then normalized shape 844 is not rejected and remains displayed in content entry region 802. In such embodiments, upon detecting the termination of the contact while the movement of the contact by stylus 203 is less than the threshold amount, normalized shape 844 is accepted and inserted into content entry region 802 and triangle 842 is ceased to be displayed.

FIGS. 8II-8OO illustrate other pre-determined shapes that device 500 is able to recognize and insert normalized versions of In FIG. 8II, a user input is received from stylus 203 drawing a crude star 846. In FIG. 8JJ, after maintaining contact for the threshold amount of time, device 500 displays normalized shape 848 corresponding to star 846. In some embodiments, normalized shape 848 is a well-formed star (e.g., regular angles, uniform length arms, etc.). In FIG. 8KK, a user input is received from stylus 203 drawing a crude line 850. In FIG. 8LL, after maintaining contact for the threshold amount of time, device 500 displays normalized shape 852 corresponding to line 850.

In FIG. 8MM, a user input is received from stylus 203 drawing a plurality of crude lines in the shape of a cityscape or signal profile 854 (e.g., the entirety of which was drawn without lift-off of contact with touch screen 504). In some embodiments, device 500 does not identify that cityscape 854 corresponds to any closed loop shape (e.g., circle, square, rectangle, triangle, star, diamond, etc.). However, in some embodiments, device 500 determines that cityscape 854 consists of a plurality of connected lines segments. Thus, in FIG. 8NN, after maintaining contact for the threshold amount of time, device 500 displays normalized shape 856. In some embodiments, normalized shape 856 includes a plurality of connected straight line segments corresponding to the line segments of cityscape 804. In FIG. 8OO, in response to detecting a termination of the contact, normalized shape 856 is inserted into content entry region 802 (and cityscape 854 is removed from display).

In FIG. 8PP, a user input is received from stylus 203 (e.g., a tap input) selecting undo option 806-1. In some embodiments, in response to the user input, display of normalized shape 856 is replaced with display of the original handwritten cityscape 854, as shown in FIG. 8QQ. Thus, performing an undo function undoes the insertion of the normalized shape and restores the original handwritten content. In some embodiments, in response to a further selection of undo option 806-1 (e.g., after the original handwritten content is restored), cityscape 854 is removed from display (e.g., the insertion of cityscape 854 is undone). In some embodiments, in response to the two selections of the undo option 806-1, other normalized shapes in content entry 802 are maintained. However, in some embodiments, as further selections of undo option 806-1 are received, the preceding normalized shapes are converted back to their original handwritten representations and then removed. For example, in FIG. 8QQ, normalized shape 852 remains displayed (e.g., even after the two selections of undo option 806-1 described in FIG. 8PP), but in response to another selection of undo option 806-1 (e.g., and because normalized shape 852 was the most recently inserted content before cityscape 854 and normalized shape 856), normalized shape 852 is replaced with crude line 850 (e.g., the original handwritten representation) and in response to yet another selection of undo option 806-1, crude line 850 is removed from content entry region 802. In some embodiments, this undo process continues backwards through the other content in content entry region 802 (e.g., first replacement of normalized shape with their original handwritten counterparts, then removal of the handwritten counterpart).

FIGS. 9A-9F are flow diagrams illustrating a method 900 of generating normalized shapes based on handwritten inputs. The method 900 is optionally performed at an electronic device such as device 100, device 300, device 500, device 501, device 510, and device 591 as described above with reference to FIGS. 1A-1B, 2-3, 4A-4B and 5A-5I. Some operations in method 900 are, optionally combined and/or order of some operations is, optionally, changed.

As described below, the method 900 provides ways to generate normalized shapes based on handwritten inputs. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., device 500) in communication with a display generation component and one or more input devices (e.g., a mobile device (e.g., a tablet, a smartphone, a media player, or a wearable device), or a computer, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.) displays (902), via the display generation component, a user interface including a content entry region, such as user interface 800 in FIG. 8A (e.g., a region in the user interface in which a user is able to input and/or enter text, images, multimedia, etc.). For example, in an email composition user interface, a content entry region for the body of the email is capable of receiving (and transmitting over email) text, still images, videos, attachments, etc. In another example, in a note taking application, a content entry region capable of receiving handwritten text, drawings, figures, etc. and capable of inserting images, drawings, etc., such as described above with respect to user interface 601.

In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, while displaying the user interface, the electronic device receives (904), via the one or more input devices, a handwritten input directed to the content entry region, such as the handwritten input in FIG. 8C (e.g., an input via a finger or a stylus at the location of the content entry region). In some embodiments, the input is a contact with a touch-sensitive display. In some embodiments, the input is contactless (e.g., does not require contact with the electronic device, does not require contact with any surface, etc.) using an input device that is in wired or wireless communication with the electronic device. In some embodiments, the handwritten input is an input drawing a respective shape corresponding to a request to insert the respective shape in the content entry region.

In some embodiments, in response to receiving the handwritten input (906), in accordance with a determination that the handwritten input satisfies one or more shape insertion criteria (e.g., the shape insertion criteria include a requirement that the handwritten input maintain contact with the touch-sensitive display (optionally with less than a threshold amount of movement, such as 0.2 mm, 0.4 mm, 0.6 mm, 1 mm, 2 mm, etc.) for a threshold amount of time (e.g., 0.1 seconds, 0.25 seconds, 0.5 seconds, 1 second, 2 seconds, 4 seconds, etc.) after drawing a respective shape), including a criterion that is satisfied when the handwritten input is determined to correspond to a respective shape (e.g., the shape drawn by the handwritten input is recognized as similar to a predetermined compatible shape), the electronic device displays (908), in the content entry region, a representation of the respective shape corresponding to the handwritten input, wherein a path of a border of the representation of the respective shape is different from a path of a border of the handwritten input, such as the handwritten input corresponding to a circle in FIG. 8G (e.g., displaying a representation of the respective shape as a proposed shape for insertion in the content entry region).

In some embodiments, compatible shapes include circles, triangles, squares, rectangles, ovals, etc. In some embodiments, compatible shapes include smileys, emojis, hearts, etc. In some embodiments, compatible shapes include landscapes, cityscapes, bar-graph shapes, and need not be closed-form shapes (e.g., a shape that begins and ends at the same point). In some embodiments, the handwritten input need not be a perfectly formed shape to be recognized as corresponding to a respective shape. For example, a square with sides that are not drawn perfectly straight is still recognizable as a square by the device or a circle that is not drawn perfectly circular is still recognizable as a circle.

In some embodiments, the representation of the respective shape is a well-formed shape. For example, squares have right angles and straight, equal length sides, circles have perfect circular boundaries, etc. Thus, in some embodiments, the device recognizes the shape that the user is attempting to draw and proposes to the user a "clean" shape for insertion based on the user's input. In some embodiments, the path of the border of the representation of the respective shape (e.g., the shape) is different from the path of the border of the handwritten input (e.g., the respective shape is a "straightened" or "cleaned" version of the handwritten input). In some embodiments, after displaying the representation of the respective shape, the representation of the respective shape is inserted in the content entry region upon lift-off of contact with the touch-sensitive surface. Thus, in some embodiments, a termination of contact with the touch-sensitive surface while displaying the representation of the respective shape is interpreted as an acceptance of the proposed respective shape.

In some embodiments, in accordance with a determination that a first portion of the handwritten input has a first characteristic (e.g., the speed of the handwritten input while drawing the first portion is a first speed and affects the respective portion of the path of the border of the representation of the respective shape), a first portion of the representation of the respective shape that corresponds to the first portion of the handwritten input has a second characteristic based on the first characteristic (910), such as first portion 822-1 having a characteristic based on representation 820-1 in FIG. 8L (e.g., the first portion of the representation of the respective shape (e.g., which corresponds to the first portion of the handwritten input) has characteristics that are based on the characteristics of the first portion of the handwritten input). For example, if the first portion of the handwritten input is fast, then the first portion of the representation of the respective shape is thin.

In some embodiments, the intensity of the handwritten input (e.g., pressure against the touch screen) while drawing the first portion is a first intensity and additionally or alternatively affects the respective portion of the path of the border of the representation of the respective shape. In some embodiments, the angle and/or direction of the handwritten input affect the respective portions of the path of the border of the representation of the respective shape (e.g., if drawing in a cardinal direction as opposed to a diagonal direction, or if drawing in one diagonal direction as opposed to another). In some embodiments, the characteristics described above (e.g., speed, intensity, pressure, direction, etc.) cause the resulting shape to have different characteristics based on the characteristics of the input and/or the input tool used for the input. For example, a heavier intensity input causes a thicker line (or curve) to be drawn and a lighter intensity input causes a thinner line (or curve) to be drawn.

In some embodiments, in accordance with a determination that the first portion of the handwritten input has a third characteristic, different from the first characteristic (e.g., the first portion of the handwritten input has a third characteristic instead of the first characteristic (e.g., faster, slower, heavier, lighter, different angle or direction, etc.)), the first portion of the representation of the respective shape that corresponds to the first portion of the handwritten input has a fourth characteristic, different from the second characteristic, based on the third characteristic (912), such as second portion 822-2 based on representation 820-2 in FIG. 8L (e.g., the first portion of the representation of the respective shape has a fourth characteristic (e.g., a different characteristic than when the first portion of the input had the first characteristic)).

Thus, in some embodiments, if the characteristic of the handwritten input changes, then the respective portions of the path of the representation of the respective shape also changes. Thus, in some embodiments, if the user draws the exact same path multiple times, but each with a different speed, with a different contact intensity, at a different angle, and/or in different directions, each representation of the handwritten input is different (e.g., has different visual characteristics) and the resulting representation of the respective shape is different (e.g., has different visual characteristics).

In some embodiments, in accordance with a determination that the handwritten input does not satisfy the one or more shape insertion criteria, the electronic device forgoes (914) displaying, in the content entry region, the representation of the respective shape, such as in FIG. 8D (e.g., if the handwritten input does not satisfy the shape insertion criteria, then do not propose a respective shape for insertion in the content entry region).

In some embodiments, the device displays a representation of the user's handwritten input, and inserts the representation of the user's handwritten input in the content entry region without displaying and/or inserting a proposed shape generated by the device. In some embodiments, the shape insertion criteria are not satisfied if the handwritten input is not recognized as a predetermined compatible shape (e.g., the user does not draw a recognized shape). In some embodiments, the shape insertion criteria are not satisfied if the handwritten input does not maintain contact with the touch-sensitive display for a threshold amount of time after drawing a respective shape (e.g., the user lifts off immediately after drawing the respective shape or lifts off before the threshold amount of time).

The above-described manner of inserting shapes in a content entry region (e.g., by receiving handwritten input drawing a shape and displaying a proposed shape with characteristics based on the user's handwritten input) allows the device to provide for quick and efficient insertion of well-formed shapes with variations that are based on the user's handwritten input, which simplifies the interaction between the user and the electronic device and enhances the operability of the electronic device and makes the user-device interface more efficient (e.g., without requiring the user to perform additional inputs or switch to a shape insertion tool to insert desired shapes or to modify the shapes to achieve the variation in characteristics), which additionally reduces power usage and improves battery life of the electronic device by enabling the user to use the electronic device more quickly and efficiency, while reducing errors in usage.

In some embodiments, while displaying the representation of the respective shape corresponding to the handwritten input in the content entry region, the electronic device detects (916) a termination of the handwritten input, such as in FIG. 8H (e.g., while displaying the "clean" shape, detecting a lift-off of contact (e.g., with stylus or finger) with the touch sensitive display or the termination of a selection input).

In some embodiments, in response to detecting the termination of the handwritten input, the electronic device inserts (918) the representation of the respective shape corresponding to the handwritten input into the content entry region, such as the insertion of circle 818 in FIG. 8H (e.g., a termination of the handwritten input while displaying the "clean" shape corresponds to an acceptance of the "clean" shape). In some embodiments, upon termination of the handwritten input, the "clean" shape is inserted into the content entry region at the respective location. In some embodiments, upon termination of the handwritten input, the representation of the handwritten input (e.g., the "trail" of the handwritten input) is removed from display.

The above-described manner of inserting shapes in a content entry region (e.g., upon detecting the termination of the handwritten input) allows the device to provide for quick and efficient insertion of well-formed shapes, which simplifies the interaction between the user and the electronic device and enhances the operability of the electronic device and makes the user-device interface more efficient (e.g., without requiring the user to perform additional inputs to accept the insertion of the well-formed shape based on the user's input), which additionally reduces power usage and improves battery life of the electronic device by enabling the user to use the electronic device more quickly and efficiency, while reducing errors in usage.

In some embodiments, while displaying the representation of the respective shape corresponding to the handwritten input in the content entry region and before detecting a termination of the handwritten input (920), such as in FIG. 8G (e.g., while the "clean" shape is displayed and while continuing to receive the selection input (or while contact with the touch-sensitive display is maintained)), in accordance with a determination that one or more respective criteria are satisfied (e.g., when the handwritten input satisfies the one or more shape insertion criteria, or when touchdown of a stylus is maintained for longer than a predetermined threshold amount of time (e.g., 0.1 seconds, 0.25 seconds, 0.5 seconds, 1 second, 3 seconds, 5 seconds, 8 seconds, etc.) after the one or more shape insertion criteria have been satisfied), the electronic device inserts (922) the representation of the respective shape corresponding to the handwritten input into the content entry region, such as in FIG. 8H (e.g., inserting the representation of the respective shape in response to the criteria being satisfied (e.g., as opposed to upon termination of the handwritten input)). In some embodiments, the representation of the respective shape is inserted as soon as the criteria is satisfied (e.g., as soon as the user holds the selection input for more than the predetermined threshold amount of time (e.g., 0.1 seconds, 0.25 seconds, 0.5 seconds, 1 second, 3 seconds, 5 seconds, 8 seconds, etc.).

The above-described manner of inserting shapes in a content entry region (e.g., as soon as the insertion criteria is satisfied and without detecting termination of the input) allows the device to provide for quick and efficient insertion of well-formed shapes (e.g., without requiring the user to perform additional inputs or terminate the handwritten input to insert the well-formed shape), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, the criterion is satisfied when a shape type of the respective shape is one of one or more predetermined shape types (924), such as circles, triangles, stars, squares, or rectangles as shown in FIGS. 8H, 8N, 8S, 8X, 8KK, etc. (e.g., the criterion is satisfied if the handwritten input is determined to correspond to a predetermined shape type). In some embodiments, the predetermined shape types include a circle, a square, a triangle, a line, a parallelogram, an oval, an ellipse, a star, a diamond, an emoji, etc. In some embodiments, the handwritten input is determined to correspond to a predetermined shape type if the handwritten input diverges from the predetermined shape type by less than a threshold amount of tolerance (e.g., diverges by 1%, 5%, 10%, 20%, 30%, etc.). In some embodiments, if the handwritten input diverges by more than the threshold amount of tolerance, then the handwritten input is not determined to correspond to a predetermined shape type and the criterion is not satisfied.

In some embodiments, the criterion is not satisfied when the shape type of the respective shape is not one of the one or more predetermined shape types (926) (e.g., if the handwritten input is not determined to correspond to a predetermined shape type or if the handwritten input is determined to correspond to a shape type that is not a supported shape type, then the criterion is not satisfied and a "clean" shape is not displayed).

The above-described manner of inserting shapes in a content entry region (e.g., by inserting certain predefined shape types but not other shape types) allows the device to provide for quick and efficient insertion of well-formed shapes without being over inclusive in the clean shapes it generates and displays, which simplifies the interaction between the user and the electronic device and enhances the operability of the electronic device and makes the user-device interface more efficient (e.g., without requiring the user to perform additional inputs to select different shape types to insert), which additionally reduces power usage and improves battery life of the electronic device by enabling the user to use the electronic device more quickly and efficiency, while reducing errors in usage.

In some embodiments, a respective portion of a representation of the handwritten input has a visual characteristic having a first value, and a corresponding respective portion of the representation of the respective shape has the visual characteristic having the first value (928), such as in FIG. 8N (e.g., the visual characteristics of portions of the "clean" shape mimic and/or are based on the respective portion of the handwritten input). For example, if a first portion of the handwritten input is thick, then the corresponding first portion of the "clean" shape is also thick, and if a second portion of the handwritten input is thin, then the corresponding second portion of the "clean" shape is also thin.

In some embodiments, the visual characteristic is any one of color, thickness, or transparency (930), such as in FIG. 8N (e.g., the visual characteristics of the "clean" shape that are based on the visual characteristic of corresponding portions of the handwritten input include the color, thickness, texture. and/or transparency value). In some embodiments, one or more of the color, thickness, and/or transparency of the handwritten input is based on the handwritten input. For example, a fast or slow movement causes thin or thick handwritten inputs and inputs in certain directions cause thin or thick handwritten inputs. In some embodiments, the currently selected content input tool also affects the visual characteristic of the representation of the handwritten input.

The above-described manner of inserting shapes in a content entry region based on the handwriting input (e.g., by matching color, thickness, and/or transparency of the well-formed shape with the color, thickness, and/or transparency of corresponding portions of the handwritten input) allows the device to provide for quick and efficient insertion of well-formed shapes with variations that are based on the user's handwritten input, which simplifies the interaction between the user and the electronic device and enhances the operability of the electronic device and makes the user-device interface more efficient (e.g., without requiring the user to perform additional inputs to change the visual characteristics of the well-formed shape), which additionally reduces power usage and improves battery life of the electronic device by enabling the user to use the electronic device more quickly and efficiency, while reducing errors in usage.

Figure 9A:
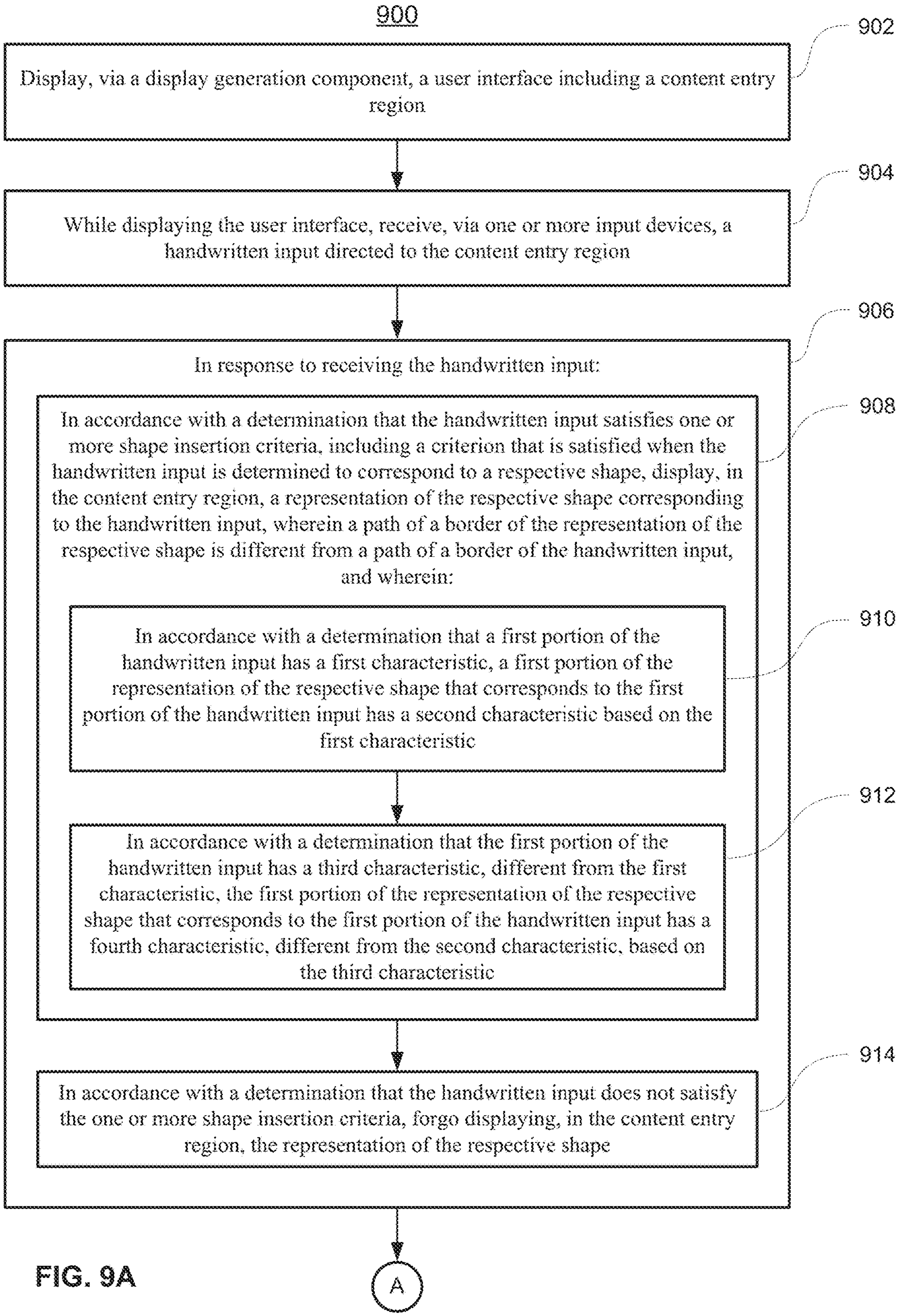
FIGS. 9A-9F are flow diagrams illustrating a method of generating normalized shapes based on handwritten inputs in accordance with some embodiments.
Figure 9B:
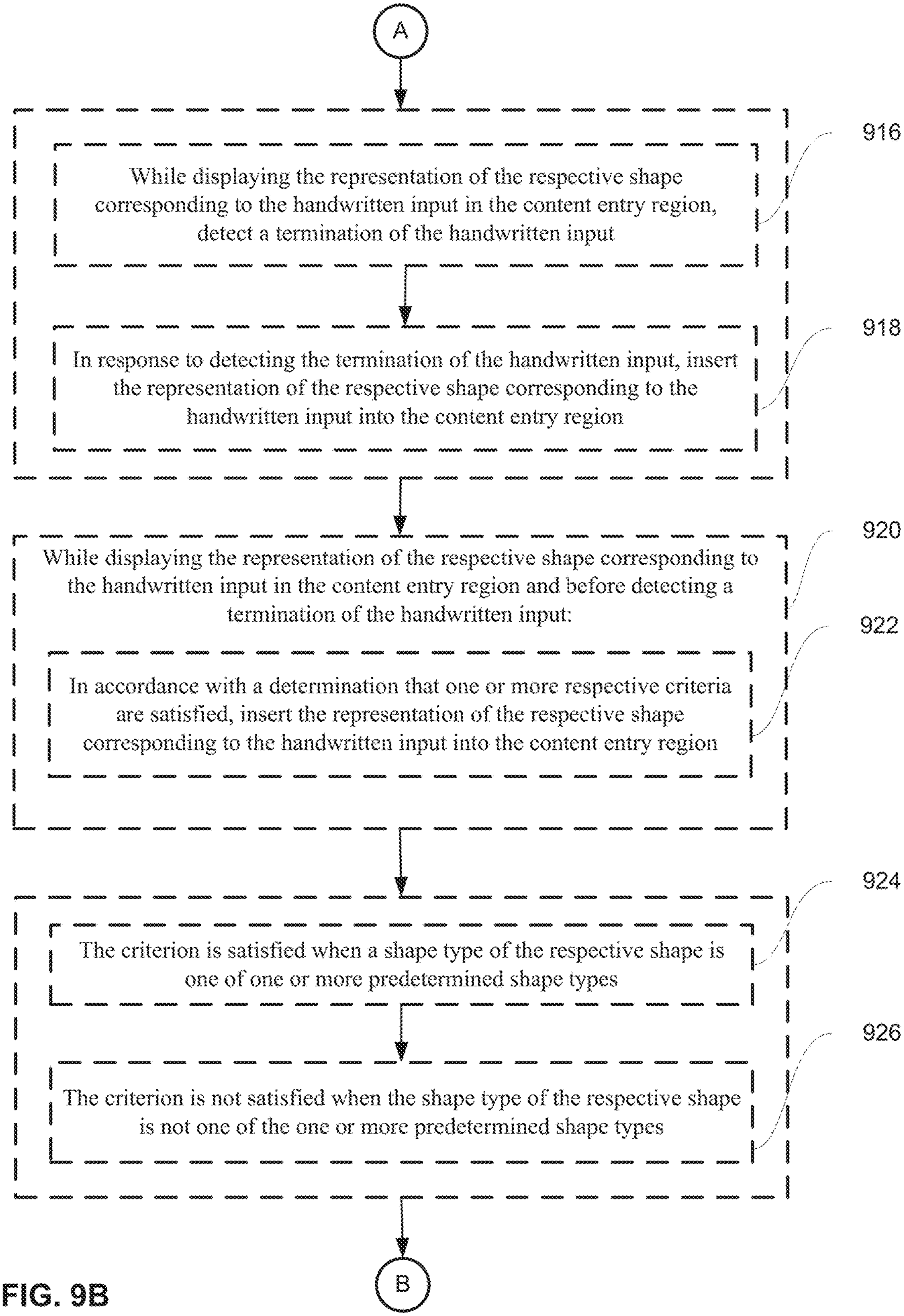
Figure 9C:
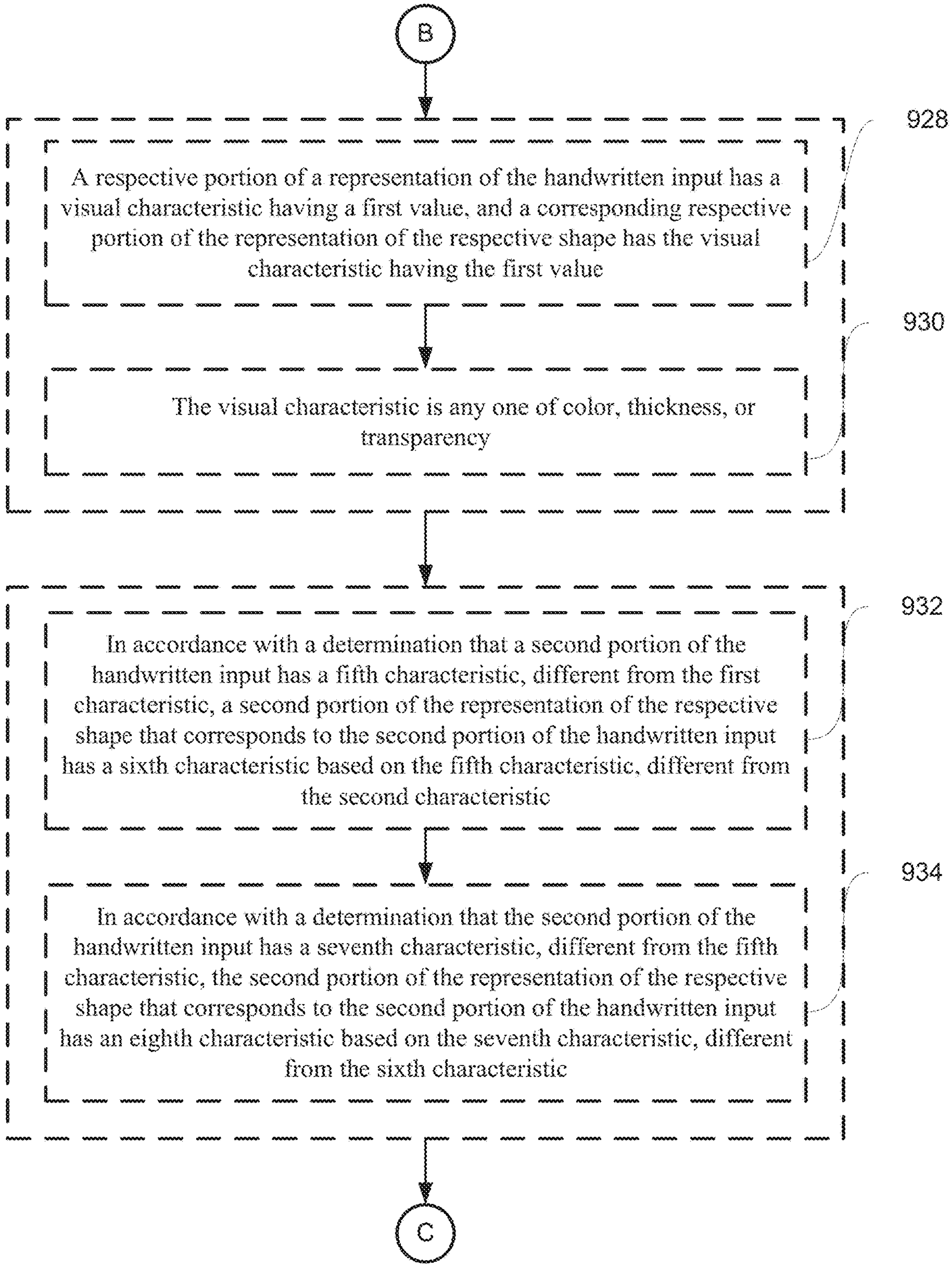
Figure 9D:
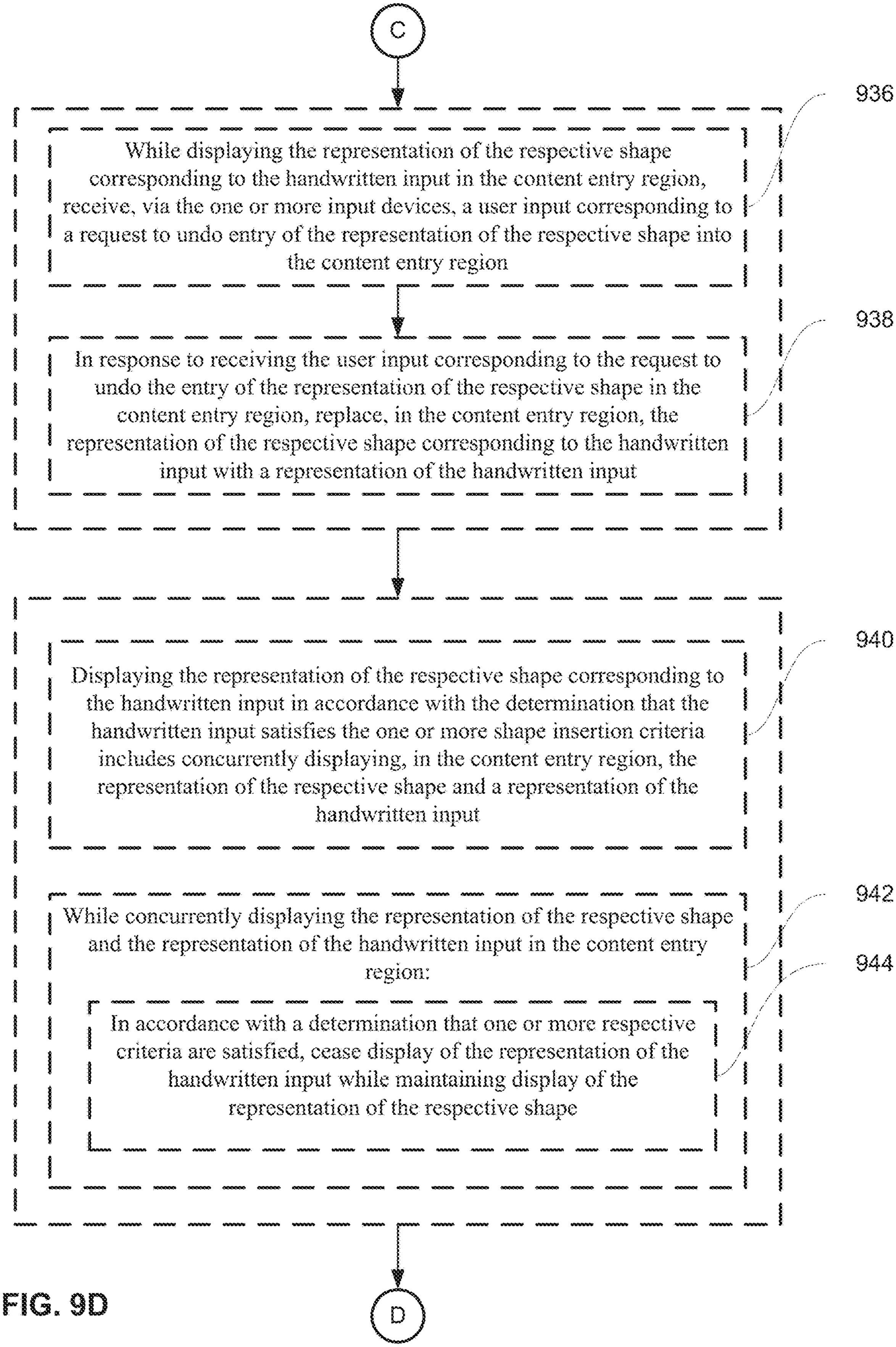
Figure 9E:
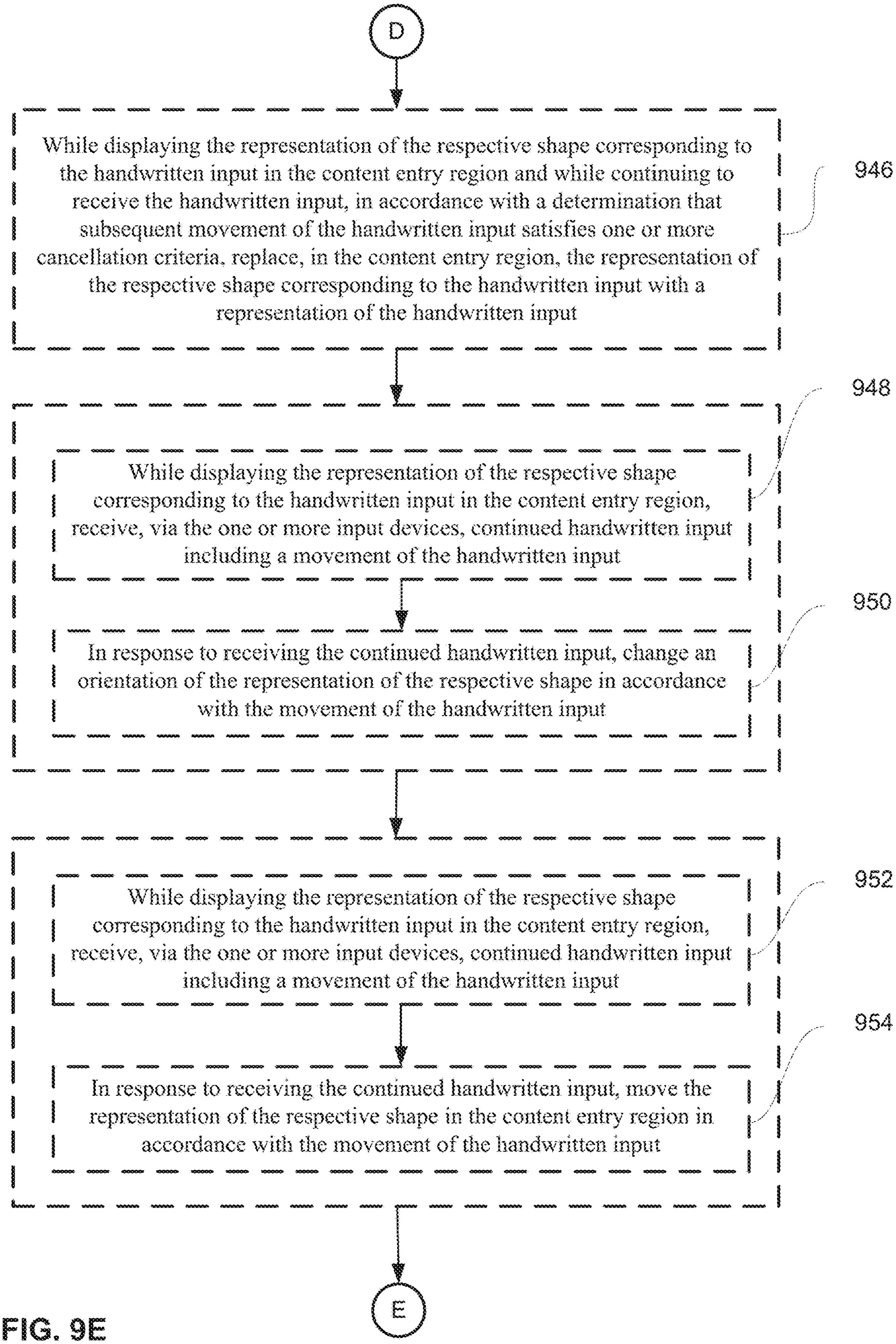
Figure 9F:
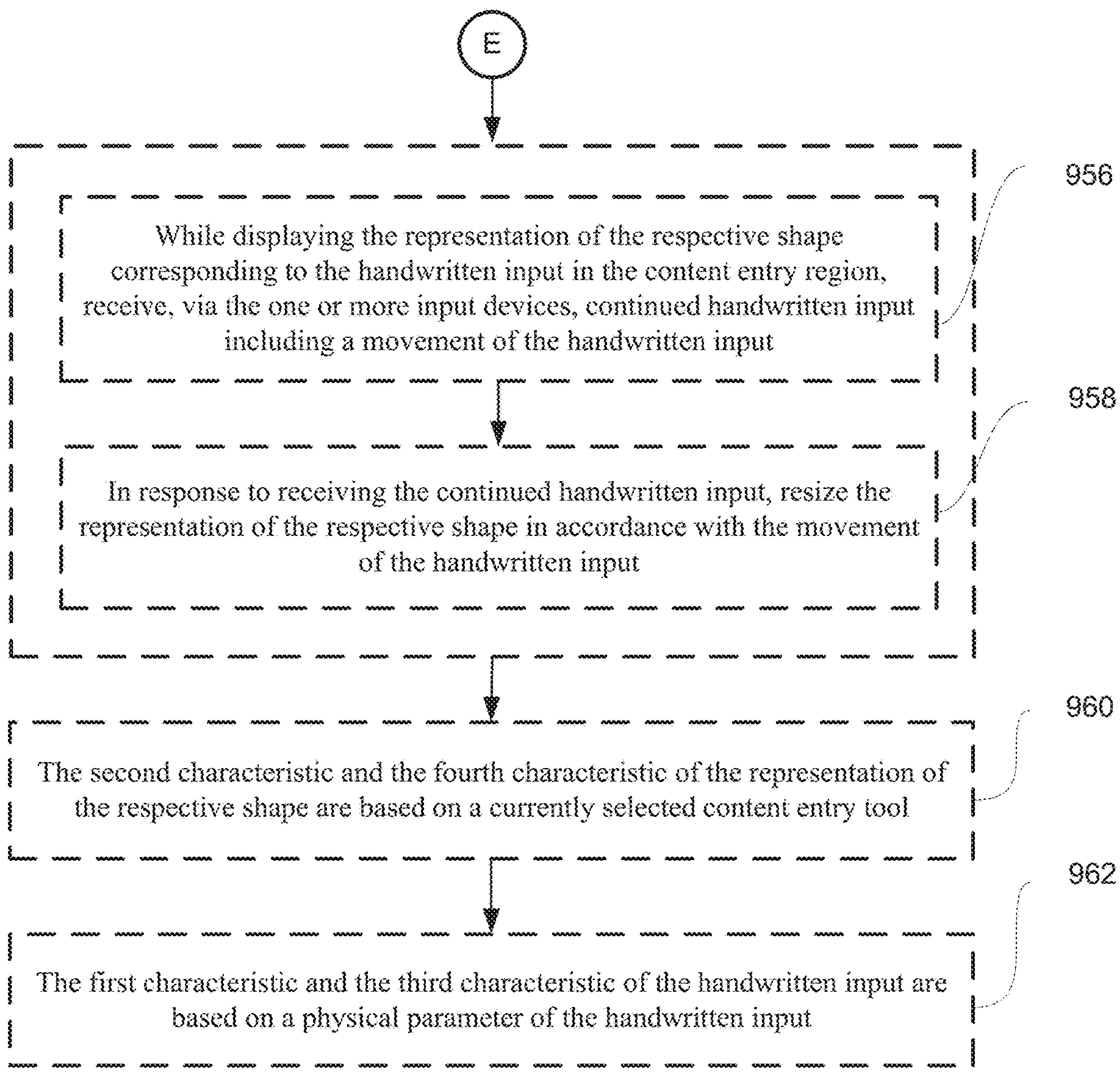

In some embodiments, in accordance with a determination that a second portion of the handwritten input has a fifth characteristic, different from the first characteristic, a second portion of the representation of the respective shape that corresponds to the second portion of the handwritten input has a sixth characteristic based on the fifth characteristic, different from the second characteristic (932), such as in FIG. 9C (e.g., if the handwritten input has a first portion with a certain characteristic and a second portion with a different characteristic, then the resulting representation of the respective shape has a corresponding first portion with a particular characteristic based on the characteristic of the first portion of the handwritten input, and the corresponding second portion of the respective shape has a different characteristic based on the characteristic of the second portion of the handwritten input.

In some embodiments, in accordance with a determination that the second portion of the handwritten input has a seventh characteristic, different from the fifth characteristic, the second portion of the representation of the respective shape that corresponds to the second portion of the handwritten input has an eighth characteristic based on the seventh characteristic, different from the sixth characteristic (934), such as in FIG. 8N (e.g., if, on the other hand, the second portion of the handwritten input has a seventh characteristic, different from the fifth characteristic, then the corresponding second portion of the "clean" shape has a different characteristic than the sixth characteristic (which was based on the fifth characteristic) that is based on the seventh characteristic). Thus, different portions of the respective shape have characteristics that depend on the corresponding potions of the handwritten input.

The above-described manner of inserting shapes in a content entry region based on the handwriting input (e.g., by displaying the proposed shape with different portions that are based on the characteristics of the corresponding portions of the handwritten input) allows the device to provide for quick and efficient insertion of well-formed shapes with variations that are based on the user's handwritten input, which simplifies the interaction between the user and the electronic device and enhances the operability of the electronic device and makes the user-device interface more efficient (e.g., without requiring the user to perform additional inputs to modify the shape to achieve the variation in characteristics at different portions of the shape), which additionally reduces power usage and improves battery life of the electronic device by enabling the user to use the electronic device more quickly and efficiency, while reducing errors in usage.

In some embodiments, while displaying the representation of the respective shape corresponding to the handwritten input in the content entry region, the electronic device receives (936), via the one or more input devices, a user input corresponding to a request to undo entry of the representation of the respective shape into the content entry region, such as selection of undo option 806-1 in FIG. 8PP (e.g., while displaying the "clean" shape in the content entry region (optionally after the "clean" shape has been inserted into the content entry region and/or after the handwriting trail version of the shape has ceased to be displayed by the electronic device), receiving a user input, such as a tap input, selecting an undo affordance.

In some embodiments, in response to receiving the user input corresponding to the request to undo the entry of the representation of the respective shape in the content entry region, the electronic device replaces (938), in the content entry region, the representation of the respective shape corresponding to the handwritten input with a representation of the handwritten input, such as the replacement of normalized shape 856 for cityscape 854 in FIG. 8QQ (e.g., removing the representation of the respective shape from the content entry region and inserting the representation of the handwritten input). Thus, in some embodiments, the shape is reverted from the "clean" shape to the original handwritten input.

The above-described manner of undoing the insertion of the well-formed shape (e.g., by replacing the well-formed shape with the original representation of the handwritten input in response to receiving the user input requesting to undo) allows the device to provide for quick and efficient way to return to the original representation of the handwritten input, which simplifies the interaction between the user and the electronic device and enhances the operability of the electronic device and makes the user-device interface more efficient (e.g., without requiring the user to perform additional inputs to delete the well-formed shape and insert the handwritten input), which additionally reduces power usage and improves battery life of the electronic device by enabling the user to use the electronic device more quickly and efficiency, while reducing errors in usage.

In some embodiments, displaying the representation of the respective shape corresponding to the handwritten input in accordance with the determination that the handwritten input satisfies the one or more shape insertion criteria includes concurrently displaying, in the content entry region, the representation of the respective shape and a representation of the handwritten input (940), such as the concurrent display of representation 814 and normalized shape 818 in FIG. 8G (e.g., while still receiving the handwritten input and before the representation of the respective shape has been inserted into the content entry region, both the representation of the respective shape and the representation of the handwritten input are concurrently displayed).

In some embodiments, as the handwritten input is being received, a representation of the handwritten input is displayed in the content entry region. For example, a trial of the handwritten input is displayed at the location where the handwritten input was received as the input is received. In some embodiments, while contact with the touch-sensitive display is maintained and after or upon the shape insertion criteria being satisfied (e.g., after or when the movement of the handwritten input is paused for a threshold amount of time), the representation of the respective shape is displayed while maintaining display of the representation of the handwritten input. In some embodiments, concurrently with the display of the representation of the respective shape (e.g., in response to, or at the same time), a visual characteristic of the representation of the handwritten input is changed. For example, the representation of the handwritten input changes color to grey (e.g., greyed out).

In some embodiments, while concurrently displaying the representation of the respective shape and the representation of the handwritten input in the content entry region (942), in accordance with a determination that one or more respective criteria are satisfied, the electronic device ceases (944) display of the representation of the handwritten input while maintaining display of the representation of the respective shape, such as in FIG. 8H (e.g., upon detecting termination of the handwritten input (e.g., the respective criteria being satisfied), the representation of the respective shape (e.g., the "clean" shape) is inserted into the content entry region and the representation of the handwritten input (that was concurrently displayed with the representation of the respective shape, optionally greyed out) is ceased from display).

In some embodiments, the one or more respective criteria are satisfied when the handwritten input is terminated (e.g., when contact with the touch-sensitive display is ceased or when a selection input is terminated). In some embodiments, an animation is displayed fading the representation of the handwritten input out of view and/or fading the representation of the respective shape into view. In some embodiments, an animation is displayed morphing the representation of the handwritten input into the representation of the respective shape. Thus, in response to the one or more respective criteria being satisfied, the representation of the handwritten input is no longer displayed and display of the representation of the respective shape is maintained in the content entry region (optionally inserted into the content entry region).

The above-described manner of inserting shapes in a content entry region (e.g., by concurrently displaying both the proposed well-formed shape and the representation of the handwritten input and ceasing display of the representation of input upon insertion of the well-formed shape) allows the device to provide for quick and efficient insertion of well-formed shapes (e.g., by displaying both the original and proposed shape such that the user is able to make a comparison to decide whether to accept the proposed shape), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, while displaying the representation of the respective shape corresponding to the handwritten input in the content entry region and while continuing to receive the handwritten input, in accordance with a determination that subsequent movement of the handwritten input satisfies one or more cancellation criteria (e.g., while displaying the "clean" shape and while continuing to receive the selection input (e.g., while maintaining touchdown on the touch-sensitive display), detect a movement of the handwritten input extending away from the representation of the respective shape (e.g., drawing away from the "clean" shape)), the electronic device replaces (946), in the content entry region, the representation of the respective shape corresponding to the handwritten input with a representation of the handwritten input, such as in FIG. 8GG (e.g., cancelling the insertion of the "clean" shape and inserting the representation of the handwritten input (e.g., the "original" drawing)).

In some embodiments, the "clean" shape is displayed concurrently with the representation of the handwritten input (optionally greyed out). In some embodiments, the one or more cancellation criteria includes a requirement that the subsequent movement be more than a threshold amount (e.g., 0.5 millimeter, 1 millimeters, 2 millimeters, 5 millimeters, 1 centimeter, 1 inch, etc., to prevent accidental triggering of the cancellation criteria). In some embodiments, a representation of the subsequent movement is not displayed in the content entry region (e.g., while the "clean" proposed shape is displayed and before termination of the handwritten input, further movements of the handwritten input does not cause drawing of any content in the content entry region). In some embodiments, the subsequent movement of the handwritten input causes insertion of a representation of the subsequent movement into the content entry region.

In some embodiments, drawing away from the "clean" shape after the "clean" shape appears corresponds to a "cancel" or a "reject" command. In some embodiments, replacing the representation of the respective shape with the representation of the handwritten input includes ceasing display of the representation of the respective shape while maintaining display of the representation of the handwritten input (that was optionally displayed concurrently with the representation of the respective shape). In some embodiments, a visual characteristic of the representation of the handwritten input reverts to its original visual characteristic. For example, the representation of the handwritten input is greyed out while the representation of the respective shape is displayed and in response to the satisfaction of the cancellation criteria, the handwritten input is returned to its original color before the representation of the respective shape was displayed (e.g., the color of the original insertion, the color selected by the user, etc.). Thus, in some embodiments, the proposed "cleaned" shape is rejected and removed from display and the original handwritten input is inserted into the content entry region.

The above-described manner of rejecting insertion of the proposed shape (e.g., in response to a subsequent movement of the handwritten input after displaying the proposed shape) allows the device to provide for quick and efficient insertion of rejecting the proposed well-formed shape (e.g., without requiring the user to perform additional inputs after the shape is inserted to undo the insertion of the well-formed shape and insert the original representation of the handwritten input), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, while displaying the representation of the respective shape corresponding to the handwritten input in the content entry region, the electronic device receives (948), via the one or more input devices, continued handwritten input including a movement of the handwritten input, such as in FIG. 8CC (e.g., while displaying the "clean" shape and while continuing to receive the selection input, detect a movement of the handwritten input. In some embodiments, the "clean" shape is displayed concurrently with the representation of the handwritten input (optionally greyed out)).

In some embodiments, in response to receiving the continued handwritten input, the electronic device changes (950) an orientation of the representation of the respective shape in accordance with the movement of the handwritten input, such as in FIG. 8CC (e.g., rotating the "clean" shape in accordance with the continued movement of the handwritten input).

For example, if, after the "clean" shape is displayed, the handwritten moves in a circular motion, then the "clean" shape also follows the handwritten movement and rotates in a circular fashion in accordance with the movement of the handwritten input. In some embodiments, while rotating the "clean" shape, the "clean" shape does not change size and remains in the same location (e.g., a reference point, such as the geometric center point of the "clean" shape, remains fixed in the content entry region while the shape is rotated). In some embodiments, while rotating the "clean" shape, the representation of the handwritten input (e.g., the original handwritten input) is not rotated and remains at its original orientation (optionally while still greyed out). In some embodiments, a representation of the continued handwritten input is not displayed in the content entry region (e.g., while the "clean" proposed shape is displayed and before termination of the handwritten input, further movements of the handwritten input does not cause drawing of any content in the content entry region). In some embodiments, the continued handwritten input causes insertion of a representation of the continued handwritten input. In some embodiments, in response to detecting a termination of the handwritten input, the representation of the respective shape is inserted into the content entry region with the orientation that it had at the time of the termination (if continued handwritten input was received, then lift-off occurred, for example) and optionally the representation of the handwritten input ceases to be displayed.

The above-described manner of changing the orientation of the proposed shape (e.g., in response to a subsequent movement of the handwritten input after displaying the proposed shape) allows the device to provide for a quick and efficient method of modifying the well-formed shape before insertion (e.g., while still in the process of inserting the well-formed shape, without requiring the user to perform additional inputs after inserting the well-formed shape to change the orientation of the shape), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, while displaying the representation of the respective shape corresponding to the handwritten input in the content entry region, the electronic device receives (952), via the one or more input devices, continued handwritten input including a movement of the handwritten input, such as in FIG. 8EE (e.g., while displaying the "clean" shape and while continuing to receive the selection input, detect a movement of the handwritten input). In some embodiments, the "clean" shape is displayed concurrently with the representation of the handwritten input (optionally greyed out).

In some embodiments, in response to receiving the continued handwritten input, the electronic device moves (954) the representation of the respective shape in the content entry region in accordance with the movement of the handwritten input, such as in FIG. 8EE (e.g., moving the "clean" shape in accordance with the continued movement of the handwritten input).

For example, if, after the "clean" shape is displayed, the handwritten moves away from the original position of the "clean" shape, then the "clean" shape also follows the handwritten movement and moves accordingly. In some embodiments, the "clean" shape does not change size or orientation. In some embodiments, while moving the "clean" shape, the representation of the handwritten input (e.g., the original handwritten input) is not moved and remains at its original position (optionally while still greyed out). In some embodiments, a representation of the continued handwritten input is not displayed in the content entry region (e.g., while the "clean" proposed shape is displayed and before termination of the handwritten input, further movements of the handwritten input does not cause drawing of any content in the content entry region). In some embodiments, the continued handwritten input causes insertion of a representation of the continued handwritten input. In some embodiments, in response to detecting a termination of the handwritten input, the representation of the respective shape is inserted into the content entry region at the position that it had at the time of the termination (if continued handwritten input was received, then lift-off occurred, for example) and optionally the representation of the handwritten input ceases to be displayed.

The above-described manner of moving the proposed shape (e.g., in response to a subsequent movement of the handwritten input after displaying the proposed shape) allows the device to provide for a quick and efficient method of modifying the well-formed shape before insertion (e.g., while still in the process of inserting the well-formed shape, without requiring the user to perform additional inputs after inserting the well-formed shape to move the shape), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, while displaying the representation of the respective shape corresponding to the handwritten input in the content entry region, the electronic device receives (956), via the one or more input devices, continued handwritten input including a movement of the handwritten input, such as in FIG. 8AA (e.g., while displaying the "clean" shape and while continuing to receive the selection input, detect a movement of the handwritten input). In some embodiments, the "clean" shape (e.g., normalized shape) is displayed concurrently with the representation of the handwritten input (optionally greyed out).

In some embodiments, in response to receiving the continued handwritten input, the electronic device resizes (958) the representation of the respective shape in accordance with the movement of the handwritten input, such as in FIG. 8BB (e.g., resizing the "clean" shape in accordance with the continued movement of the handwritten input).

For example, if, after the "clean" shape is displayed, the handwritten moves in away from the original position of the "clean" shape, then the "clean" shape is resized such that one vertex of the "clean" shape also follows the handwritten movement while the other vertices remain fixed in position. In some embodiments, a reference point on the "clean" shape such as the geometric center point of the "clean" shape remains fixed in the content entry region during the resizing, and the other sides/vertices/etc. of the "clean" shape move/resize accordingly in accordance with the further handwritten input. In some embodiments, if the handwritten input moves outwards from the original position of the "clean" shape, then the "clean" shape is enlarged, and if the handwritten input moves inwards from the original position of the "clean" shape, then the "clean" shape is shrunk. In some embodiments, the "clean" shape does not change size or orientation. In some embodiments, while resizing the "clean" shape, the representation of the handwritten input (e.g., the original handwritten input) is not resized and remains at its original size (optionally while still greyed out). In some embodiments, a representation of the continued handwritten input is not displayed in the content entry region (e.g., while the "clean" proposed shape is displayed and before termination of the handwritten input, further movements of the handwritten input does not cause drawing of any content in the content entry region). In some embodiments, the continued handwritten input causes insertion of a representation of the continued handwritten input. In some embodiments, in response to detecting a termination of the handwritten input, the representation of the respective shape is inserted into the content entry region with the size that it had at the time of the termination (if continued handwritten input was received, then lift-off occurred, for example) and optionally the representation of the handwritten input ceases to be displayed).

The above-described manner of resizing the proposed shape (e.g., in response to a subsequent movement of the handwritten input after displaying the proposed shape) allows the device to provide for a quick and efficient method of resizing the well-formed shape before insertion (e.g., while still in the process of inserting the well-formed shape, without requiring the user to perform additional inputs after inserting the well-formed shape to change the size of the shape), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, the second characteristic and the fourth characteristic of the representation of the respective shape are based on a currently selected content entry tool (960), such as in FIG. 8P (e.g., the visual characteristic of the "clean" shape additionally or alternatively depends on the content entry tool used to enter the handwritten input). For example, if the pencil tool is active and the handwritten input has a pencil styling, then the "clean" shape also has a pencil styling. In another embodiment, if a calligraphy tool is active, then the handwritten inputs at certain angles are thicker or thinner to mimic a calligraphy tool and the resulting "clean" shape also has thick and thin sections. Similarly, while using the brush tool, a fast swipe optionally causes a representation of the input to have a higher transparency level than a slow swipe (e.g., to mimic the behavior of an ink brush).

The above-described manner of inserting shapes in a content entry region (e.g., by receiving handwritten input drawing a shape and displaying a proposed shape with characteristics based on the tool used to perform the handwritten input) allows the device to provide for quick and efficient insertion of well-formed shapes with variations that are based on the user's handwritten input, which simplifies the interaction between the user and the electronic device and enhances the operability of the electronic device and makes the user-device interface more efficient (e.g., without requiring the user to perform additional inputs to modify the shapes to achieve the variation in characteristics that mimics the original handwriting input that varies based on the drawing tool used), which additionally reduces power usage and improves battery life of the electronic device by enabling the user to use the electronic device more quickly and efficiency, while reducing errors in usage.

In some embodiments, the first characteristic and the third characteristic of the handwritten input are based on a physical parameter of the handwritten input (962), such as input speed or input intensity in FIG. 8N (e.g., one or more visual characteristics of the representation of the handwritten input (and thus one or more visual characteristics of the "clean" shape) depend on physical characteristics of the input). For example, a fast or slow drawing speed causes a thin or thick drawing, a heavy intensity or light intensity input causes a thick or thin drawing, a movement in certain directions causes a thin or thick drawing, and/or the angle of the stylus causes a thick or thin line, etc.

The above-described manner of inserting shapes in a content entry region (e.g., by displaying a proposed shape with characteristics that are based on the physical characteristics of the user's handwritten input) allows the device to provide for quick and efficient insertion of well-formed shapes with variations that are based on the user's handwritten input, which simplifies the interaction between the user and the electronic device and enhances the operability of the electronic device and makes the user-device interface more efficient (e.g., without requiring the user to perform additional inputs to modify the shapes to achieve the variation in characteristics), which additionally reduces power usage and improves battery life of the electronic device by enabling the user to use the electronic device more quickly and efficiency, while reducing errors in usage.

It should be understood that the particular order in which the operations in FIGS. 9A-9F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1100, 1300, 1500, and 1700) are also applicable in an analogous manner to method 900 described above with respect to FIGS. 9A-9F. For example, the operation of the electronic device generating normalized shapes based on handwritten inputs described above with reference to method 900 optionally have one or more of the characteristics of selecting and providing for interaction with handwritten content, generating normalized shapes based on handwritten inputs, identifying actionable text within handwritten content, presenting tutorials for text manipulation operations, displaying visual feedback of text manipulation operations, selecting units of content, etc., described herein with reference to other methods described herein (e.g., methods 700, 1100, 1300, 1500, and 1700). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5I) or application specific chips. Further, the operations described above with reference to FIGS. 9A-9F are, optionally, implemented by components depicted in FIGS. 1A-1B. For example, displaying operations 902 and 908 and receiving operations 904, 936, 946, 948, 952, 956 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Identifying Actionable Text within Handwritten Content

Users interact with electronic devices in many different manners, including entering text into such devices. In some embodiments, an electronic device receives handwritten inputs inserting handwritten text into content entry regions. The embodiments described below provide ways in which an electronic device determines whether the handwritten text correspond to actionable text and updates the respective portions of the handwritten text to visually distinguish the respective portions of the handwritten text and to become actionable, thus enhancing the user's interactions with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 10A-10EE illustrate exemplary ways in which an electronic device identifies actionable text within handwritten content. The embodiments in these figures are used to illustrate the processes described below, including the processes described with reference to FIGS. 11A-11I.

Figure 10B:
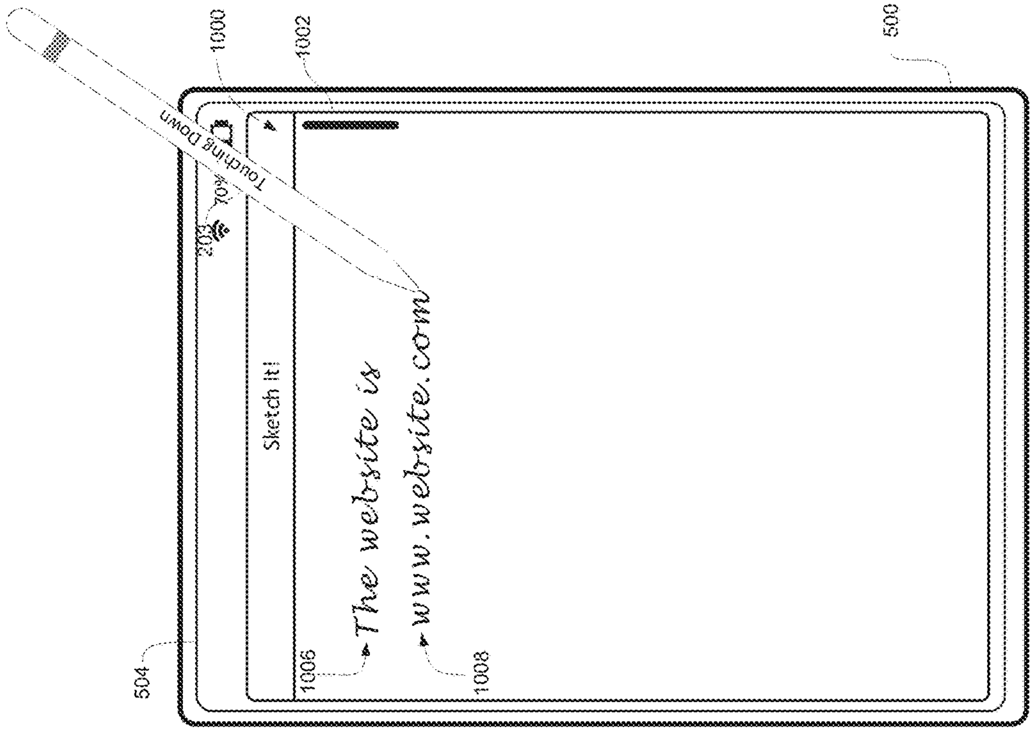
FIGS. 10A-10EE illustrate exemplary ways in which an electronic device identifies actionable text within handwritten content in accordance with some embodiments.
Figure 10A:
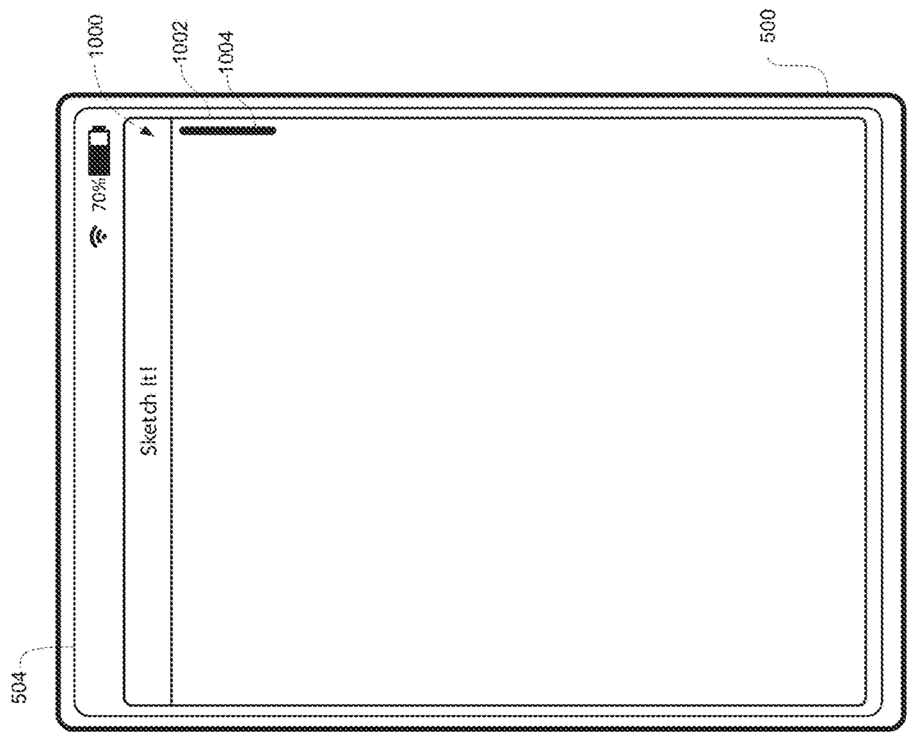

FIG. 10A illustrates electronic device 500 displaying user interface 1000 (e.g., via a display device, via a display generation component, etc.). In some embodiments, user interface 1000 is displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500.

In some embodiments, user interface 1000 is a user interface of a drawing application (e.g., for composing drawings, viewing drawings, etc., similar to user interface 800). In some embodiments, the drawing application is an application installed on device 500.

In FIG. 10A, user interface 1000 includes content entry region 1002. In some embodiments, content entry region 1002 is configured to receive handwritten input (e.g., a drawing input via a stylus device) and display a representation of the handwritten input. In some embodiments, user interface 1000 includes scroll bar 1004. In some embodiments, scroll bar 1004 is interactable to scroll user interface 1000 upwards or downwards (e.g., by dragging scroll bar 1004 upwards or downwards, respectively).

In FIG. 10B, a user input is received from stylus 203 writing sentences 1006 and 1008 in content entry region 1002. In some embodiments, sentence 1008 was written while a pen entry tool is active. In some embodiments, while a pen entry tool is active, the device is in a pen entry mode in which handwritten inputs drawn in a content entry region are stylized as if drawn by a pen (optionally without converting them to font-based text). In some embodiments, sentence 1008 corresponds to a website URL. In some embodiments, device 500 is able to analyze sentence 1008 and determine that sentence 1008 is actionable text without converting display of sentence 1008 to font-based text. In some embodiments, device 500 determines that sentence 1008 is actionable text because sentence 1008 matches a certain predetermined pattern. For example, sentence 1008 includes "www" and ".com", suggesting that sentence 1008 is a website URL.

Figure 10D:
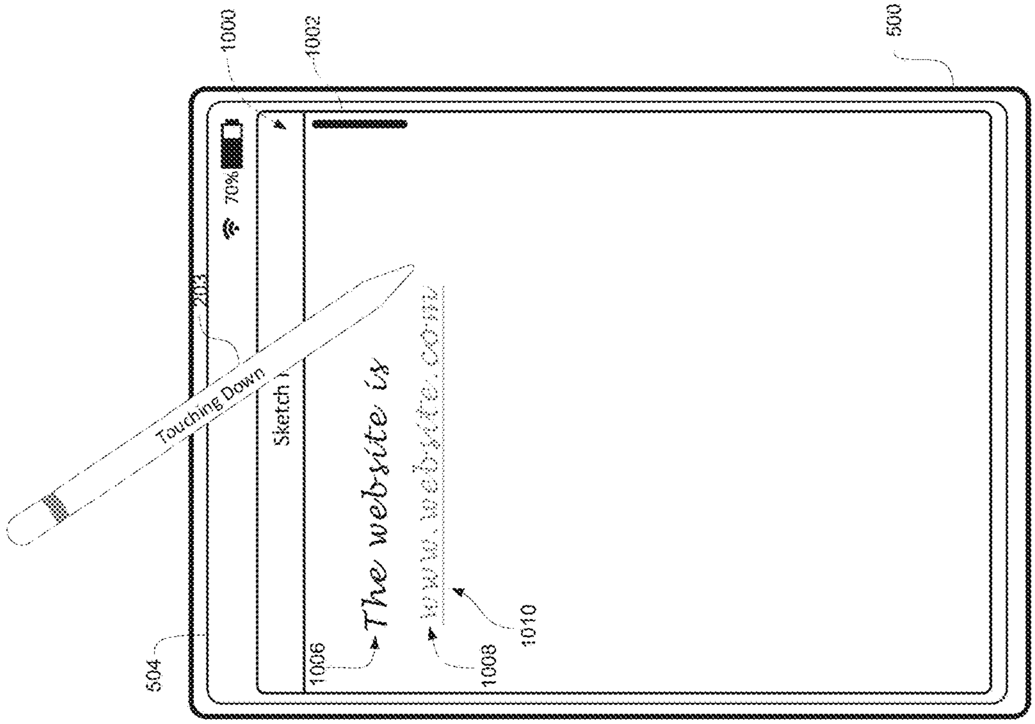
Figure 10C:
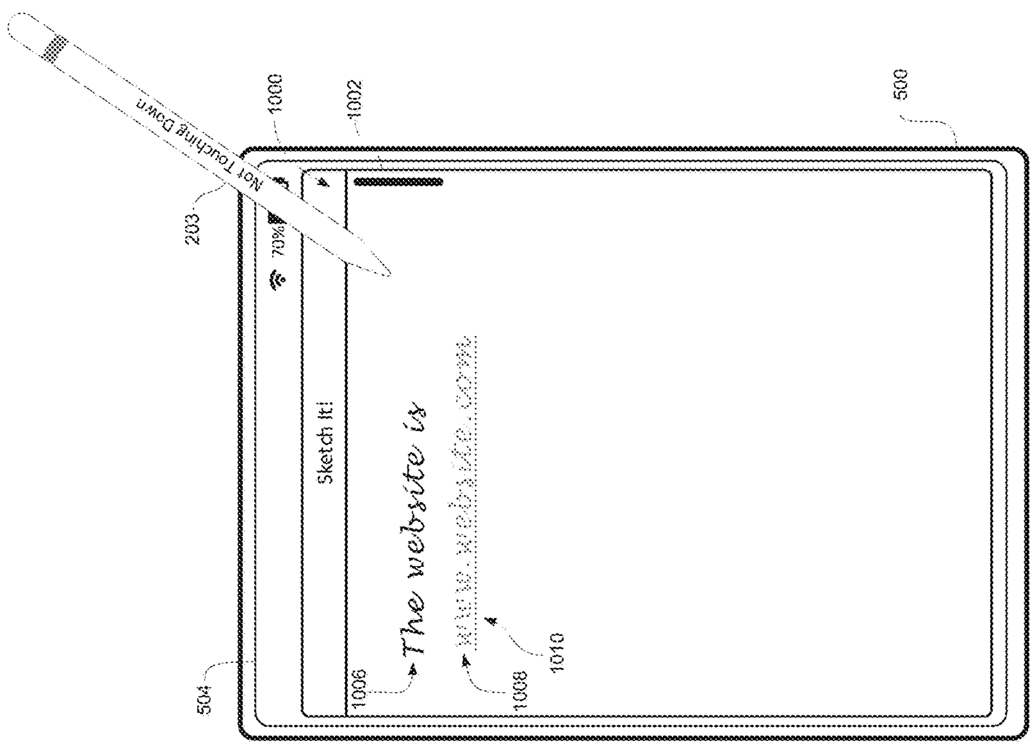

In FIG. 10C, a termination of the contact with touch screen 504 is detected (e.g., lift-off of stylus 203 from touch screen 504). In some embodiments, in response to detecting the termination of the contact (and optionally after a threshold amount of time has elapsed such as 0.25 seconds, 0.5 seconds, 1 second, 3 seconds, 5 seconds, etc.) and in accordance with a determination that sentence 1008 is actionable text, device 500 updates sentence 1008 to be actionable and concurrently changes the visual characteristic of sentence 1008 to indicate that sentence 1008 is actionable. In some embodiments, changing the visual characteristic of sentence 1008 includes changing a color of sentence 1008 and/or displaying underline 1010 beneath sentence 1008. Thus, as shown in FIG. 10C, the combination of sentence 1008 having a modified color and underline 1010 indicates that sentence 1008 is actionable (e.g., similarly to a hyperlink). As will be described in further detail below, after sentence 1008 has been updated to be actionable, a user is able to select sentence 1008 to perform a function associated with sentence 1008.

In FIG. 10D, a contact with touch screen 504 by stylus 203 is detected. In some embodiments, in response to detecting the contact, device 500 reverts the visual characteristic of the actionable text in content entry region 1002 (e.g., removes the actionability of the actionable text, optionally all of the actionable text in content entry region 1002). In some embodiments, reverting the visual characteristics of the actionable text (and optionally removing the actionability of the actionable text) is a visual indication that the content has yet to be re-analyzed for actionable text and allows device 500 to reset the content in content entry region 1002 to its original non-actionable state before re-performing the process to analyze the content in the content entry region 1002 to determine how the user input affected the actionability of the content. In some embodiments, in response to detecting the contact, device 500 does not revert the visual characteristic of the actionable text until new content begins to be inserted. For example, in FIG. 10D, the actionability of sentence 1008 is maintained.

Figure 10F:
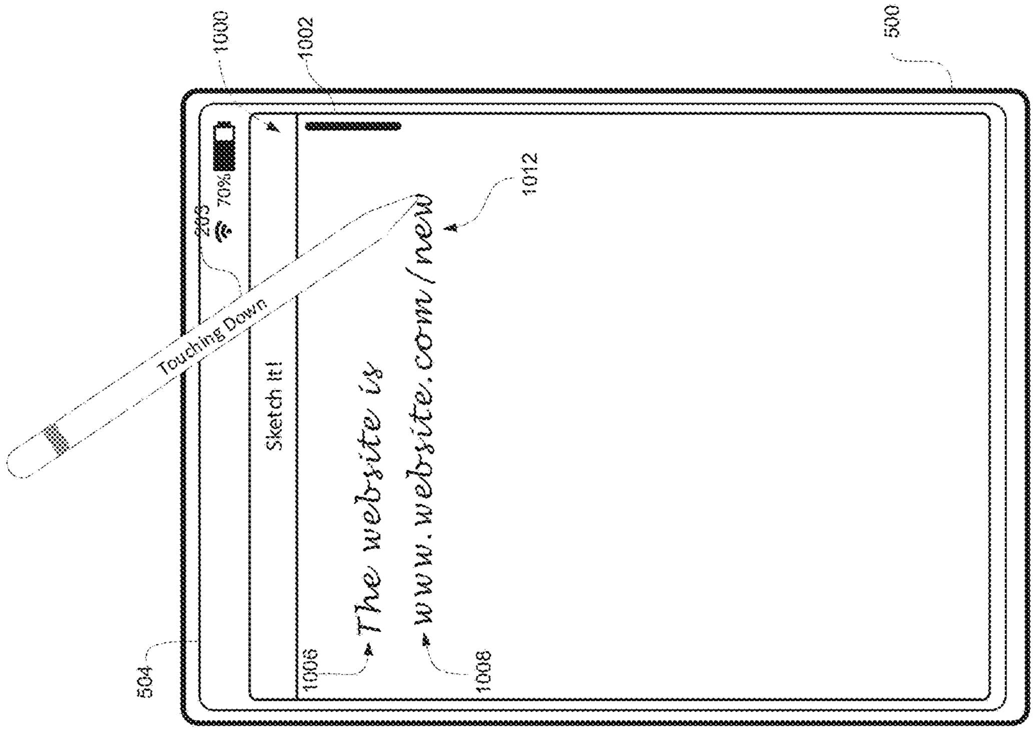
Figure 10E:
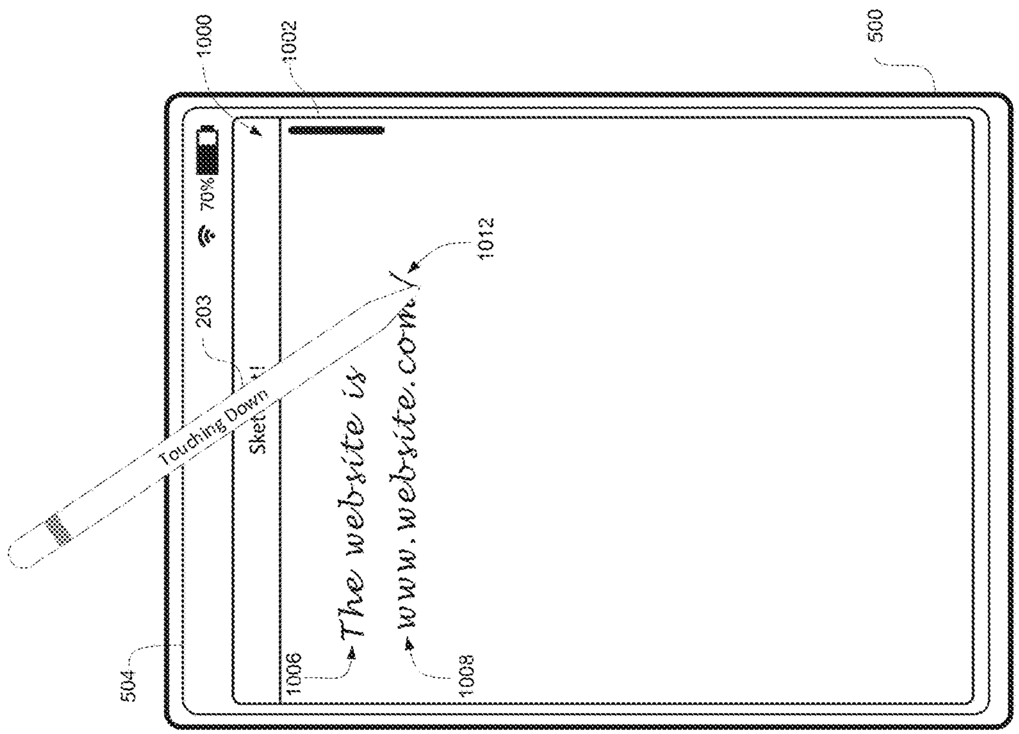

In FIG. 10E, a movement of stylus 203 is detected while maintaining contact with touch screen 504 inserting new character 1012 (e.g., a slash character) at the end of sentence 1008. In some embodiments, in response to detecting the movement of stylus 203, the visual characteristic of sentence 1008 is reverted to its original visual characteristic before it was modified to be actionable (e.g., as in FIG. 10B) and sentence 1008 is no longer selectable to perform a function associated with sentence 1008.

In FIG. 10F, a further handwritten input is received adding additional characters to new character 1012, such that "/new" is added to the end of sentence 1008. As shown in FIG. 10G, the combination of sentence 1008 and new characters 1012 corresponds to a valid website URL and thus is identifiable as actionable text. In FIG. 10G, a termination of the contact with touch screen 504 is detected (e.g., lift-off of stylus 203 from touch screen 504). In some embodiments, in response to detecting the termination of the contact (and optionally after a threshold amount of time has elapsed such as 0.25 seconds, 0.5 seconds, 1 second, 3 seconds, 5 seconds, etc.) and in accordance with a determination that the combination of sentence 1008 and new characters 1012 is actionable text, the combination of sentence 1008 and new characters 1012 is updated to become actionable text—without converting display of sentence 1008 and characters 1012 to font-based text—which includes changing a visual characteristic of the sentence 1008 and new characters 1012 and displaying underline 1010 beneath sentence 1008 and new characters 1012, as shown in FIG. 10G. Thus, the combination of sentence 1008 and new characters 1012 is selectable to perform a function associated with the combination of sentence 1008 and new characters 1012 (e.g., of the newly formed URL "www.website.com/new").

Figure 10H:
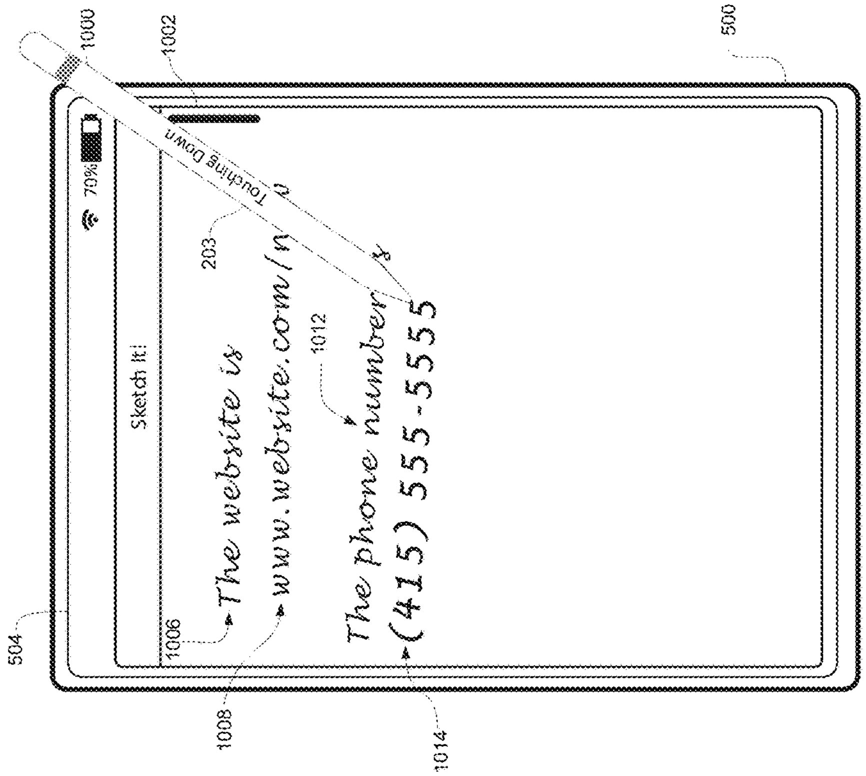
Figure 10G:
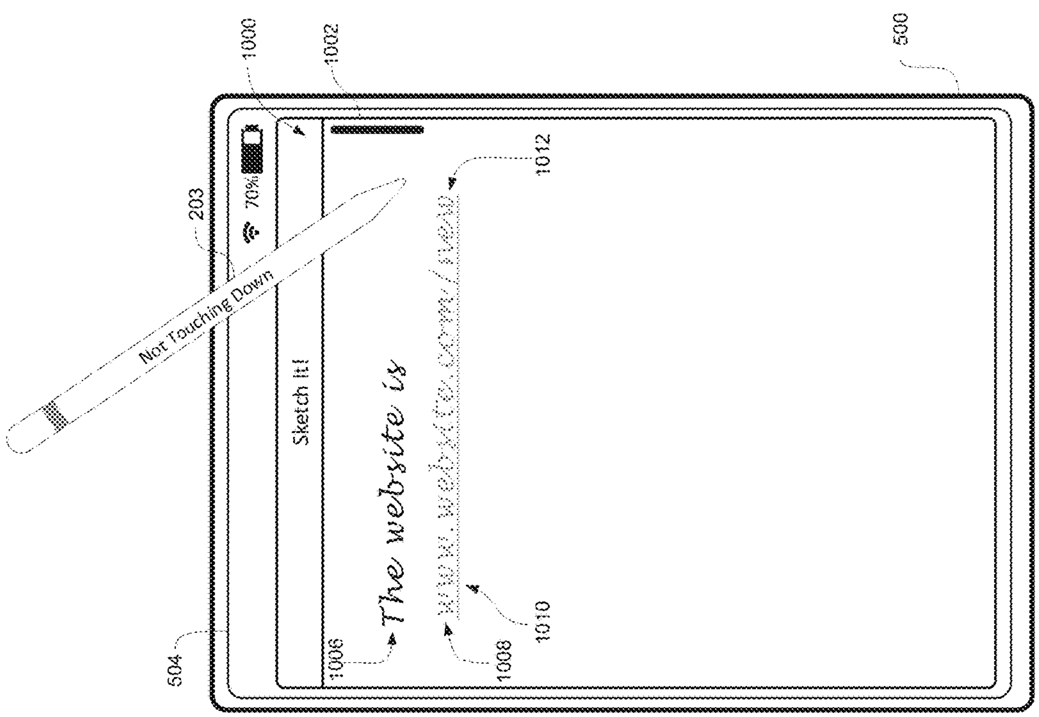

In FIG. 10H, a user input from stylus 203 is received writing sentence 1012 and sentence 1014 in content entry region 1002. In some embodiments, in response to receiving the user input inserting additional content into content entry region 1002, device 500 reverts the visual characteristic of the actionable text in content entry region 1002 (e.g., removes the actionability of the actionable text, including sentence 1008), as shown in FIG. 10H. In some embodiments, sentence 1014 corresponds to a phone number and device 500 is able to determine that sentence 1014 matches certain predetermined pattern corresponding to a phone number and is thus identifiable as actionable. As shown in FIG. 10H, sentence 1014 was written as bold and/or with a larger size (e.g., as compared to sentence 1008, optionally as a result of the physical characteristics of the handwritten input while writing sentence 1014 being different than the physical characteristics of the handwritten input while writing sentence 1008, as described above with respect to method 900).

Figure 10J:
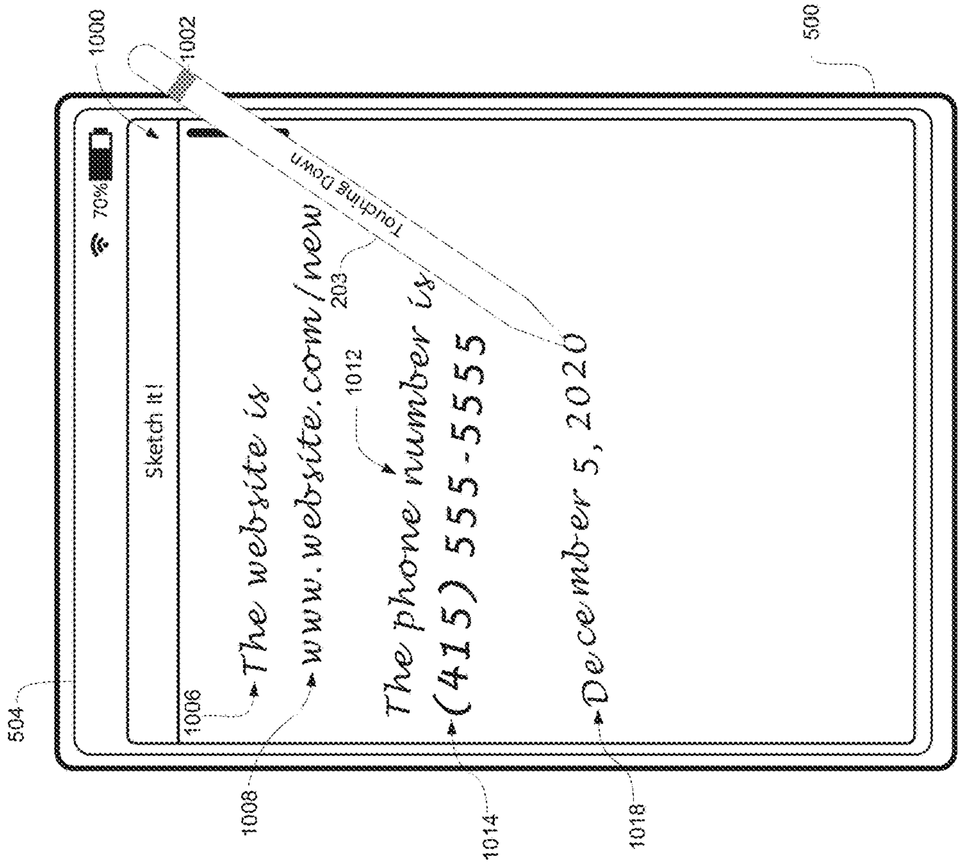
Figure 10I:
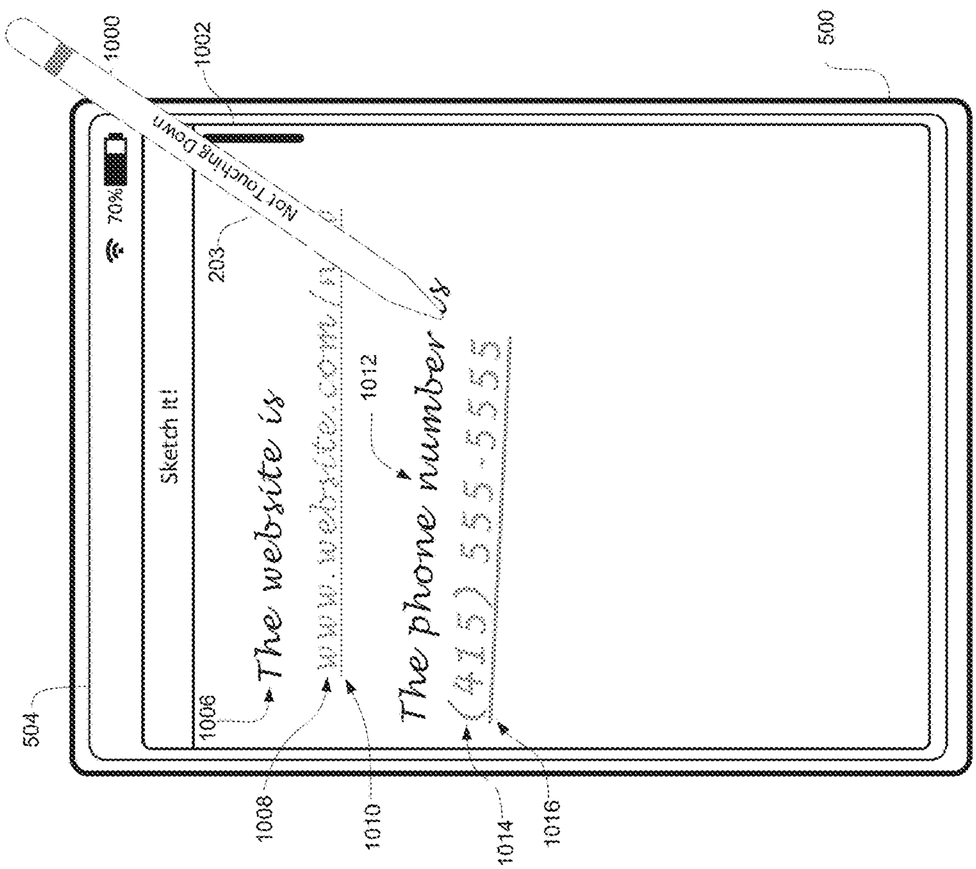

In FIG. 10I, a termination of the contact with touch screen 504 is detected (e.g., lift-off of stylus 203 from touch screen 504). In some embodiments, in response to detecting the termination of the contact (and optionally after a threshold amount of time has elapsed such as 0.25 seconds, 0.5 seconds, 1 second, 3 seconds, 5 seconds, etc.) and in accordance with a determination that sentence 1014 is actionable text, sentence 1014 is updated to become actionable text, which includes changing a visual characteristic of the sentence 1014 and displaying underline 1016 beneath sentence 1014, as shown in FIG. 10I.

In some embodiments, concurrently with analyzing and updating sentence 1014 to become actionable text, device 500 also analyzes the other content in content entry region 1002 to discover other strings of actionable text (e.g., device 500 analyzes the entirety of content entry region 1002 for actionable text). For example, as shown in FIG. 10I, sentence 1008 is also identified as actionable text and updated. In some embodiments, device 500 determines that sentence 1008 was not affected by the handwritten input (e.g., sentence 1008 was not changed and/or the handwritten input was a threshold distance away from sentence 1008 such as 0.5 cm, 1 cm, 3 cm, 5 cm, 10 cm, etc.) and instead of performing the process for analyzing sentence 1008, device 500 is restore the actionability of sentence 1008 without re-analyzing sentence 1008. Thus, in some embodiments, device 500 need not re-analyze the content within content entry region 1002 if device 500 determines that certain content in content entry region 1002 was not modified.

In FIG. 10I, because sentence 1014 was written as bold and/or with a larger size, the updated visual characteristic of sentence 1016 and underline 1016 is also bold and/or a larger size (e.g., underline 1016 has a thicker line width as compared to underline 1010). Thus, as shown, the visual characteristic of underline 1016 matches or is based on the visual characteristic of sentence 1016.

Additionally, as shown in FIG. 10I, sentence 1014 is written at an angle (e.g., not perfectly horizontal) and device 500 is able to identify sentence 1014 as actionable text even though sentence 1014 is not perfectly horizontal. Similarly, underline 1016 has the same slope as the slope of sentence 1014 (e.g., is also displayed at an angle).

In FIG. 10J, a user input from stylus 203 is received writing sentence 1018 in content entry region 1002. In some embodiments, in response to receiving the user input inserting additional content into content entry region 1002 (e.g., sentence 1018), device 500 reverts the visual characteristic of the actionable text in content entry region 1002 (e.g., removes the actionability of the actionable text, including sentence 1008 and sentence 1014), as shown in FIG. 10J. In some embodiments, sentence 1018 corresponds to a date and device 500 is able to determine that sentence 1018 matches certain predetermined pattern corresponding to a date and is thus identifiable as actionable. As shown in FIG. 10J, sentence 1018 is not written straight and has a variable slope.

Figure 10L:
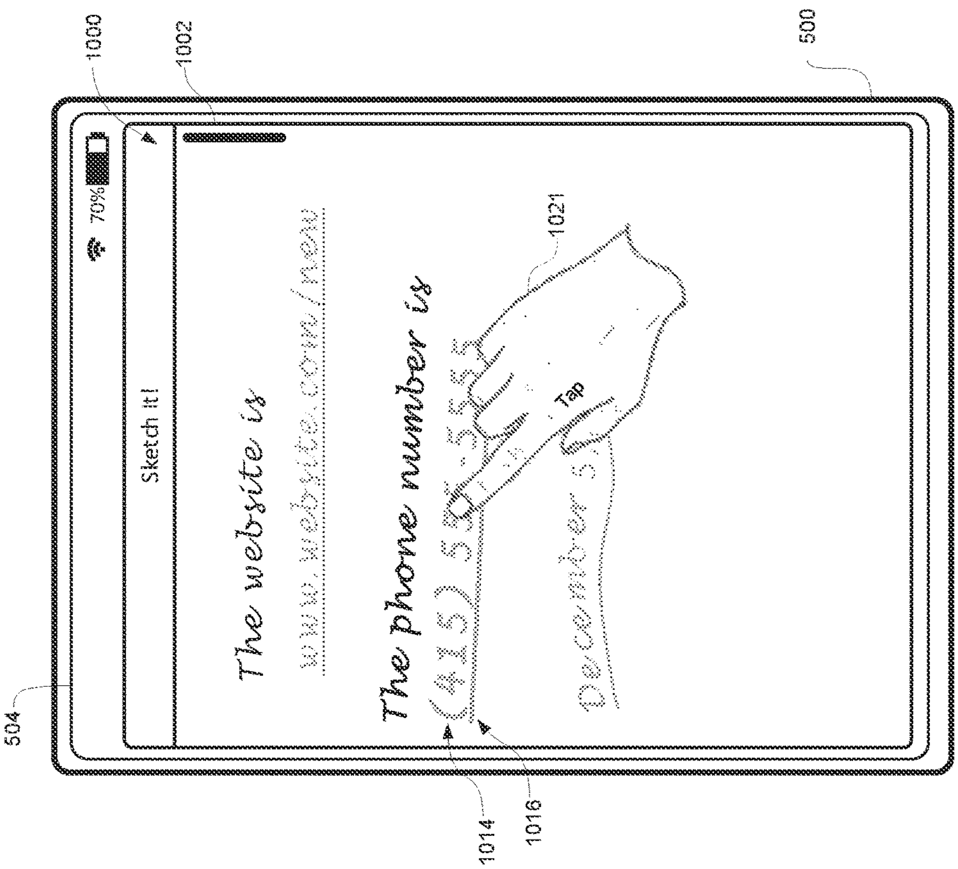
Figure 10K:
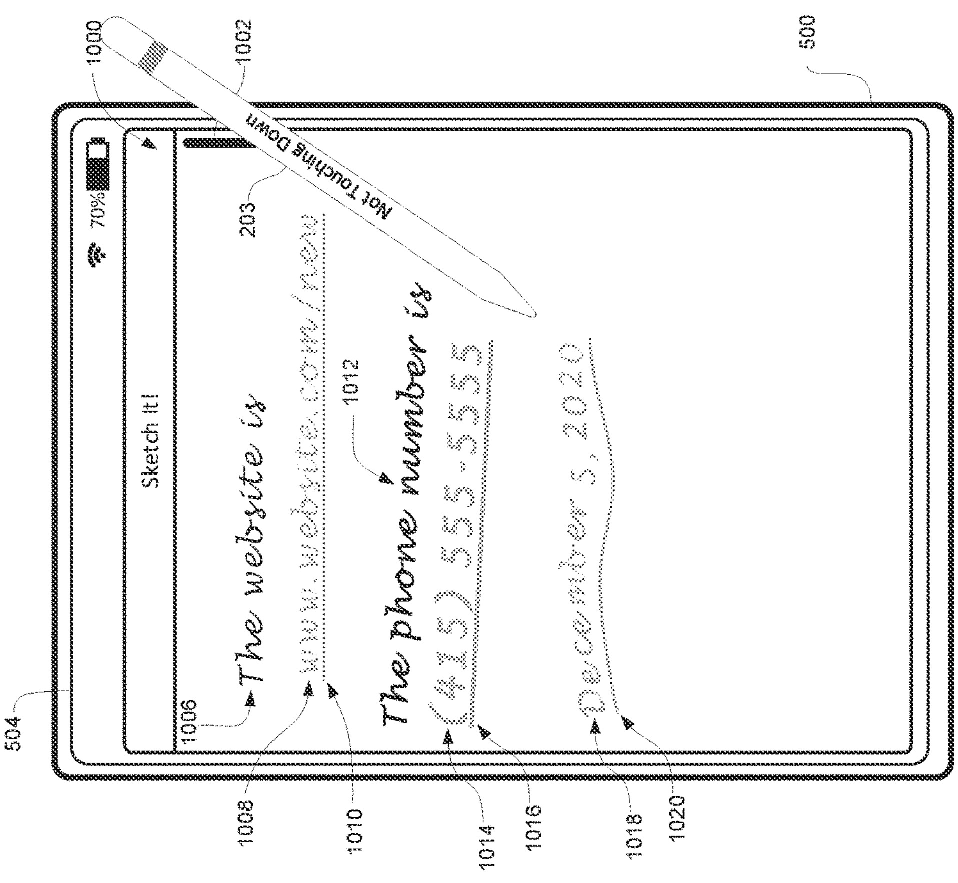

In FIG. 10K, a termination of the contact with touch screen 504 is detected (e.g., lift-off of stylus 203 from touch screen 504). In some embodiments, in response to detecting the termination of the contact (and optionally after a threshold amount of time has elapsed such as 0.25 seconds, 0.5 seconds, 1 second, 3 seconds, 5 seconds, etc.) and in accordance with a determination that sentence 1018 is actionable text, sentence 1018 is updated to become actionable text, which includes changing a visual characteristic of the sentence 1018 and displaying underline 1020 beneath sentence 1018, as shown in FIG. 10K. As shown in FIG. 10K, because sentence 1020 was written crooked (e.g., variable slope), underline 1020 is also displayed with a variable slope that closely matches the contour of sentence 1018. In some embodiments, underline 1020 does not follow the contour of sentence 1018 perfectly. In some embodiments, the slope of underline 1020 is a moving average of the contour of sentence 1018 (e.g., the contour of the bottom profile of sentence 1018). In some embodiments, the visual characteristics or visual styling of the underline does not conform exactly to the visual characteristics or styling of the string of characters that it is underlining. In some embodiments, the underline is displayed with a more mechanical styling (e.g., clean, solid lines, smooth contour, etc.) to visually indicate that the underline is generated by device 500 rather than inserted by the user.

In FIG. 10L, a user input is received by finger 1021 selecting sentence 1014 (e.g., a tap input) while sentence 1014 has been updated to be actionable. In some embodiments, in response to the user input selecting sentence 1014, device 500 displays pop-up 1022. In some embodiments, pop-up 1022 includes one or more options for performing functions associated with sentence 1014. In some embodiments, pop-up 1022 includes text 1024, option 1026-1, option 1026-2, and option 1026-3. As shown in FIG. 10M, text 1024 is a font-based text representation of sentence 1014 (e.g., digital, computer text), which allows a user to confirm that the digits in sentence 1014 that were recognized by device 500 are correct. In some embodiments, option 1026-1 is selectable to send a text message (e.g., SMS, MMS, etc.) to the phone number associated with sentence 1014. In some embodiments, option 1026-2 is selectable to add the phone number associated with sentence 1014 to the device's contacts list. In some embodiments, option 1026-3 is selectable to copy the phone number associated with sentence 1014 to the device's clipboard. In some embodiments, pop-up 1022 includes an option to call the phone number associated with sentence 1014. In some embodiments, more or fewer options than those shown in FIG. 10M are possible.

In some embodiments, pop-up 1022 is displayed in response to a selection of a phone number that is actionable (e.g., regardless of whether the text is handwritten or font-based). In some embodiments, for actionable text that is not a phone number (e.g., addresses, email addresses, website URLs, etc.), selection of the actionable text causes execution of the function associated with the actionable text (e.g., as opposed to display of a pop-up that includes selectable options for performing functions associated with the actionable text).

Figure 10N:
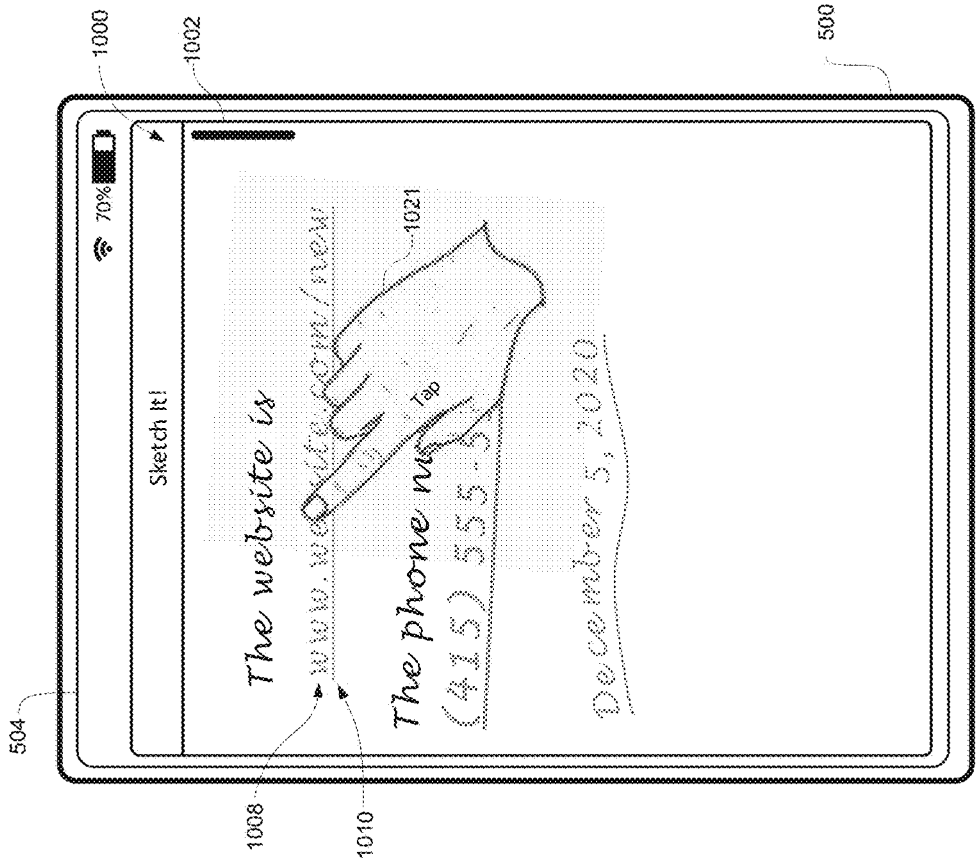
Figure 10M:
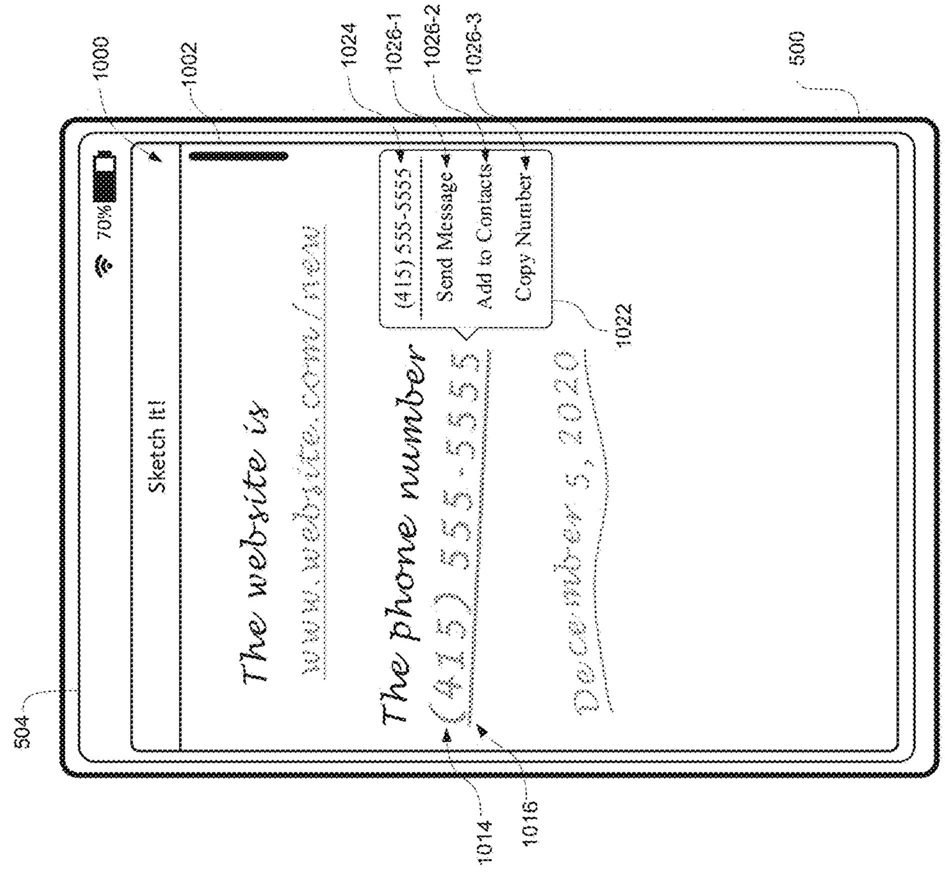

In FIG. 10N, a user input is received by finger 1021 selecting sentence 1008 (e.g., a tap input) while sentence 1008 has been updated to be actionable. In some embodiments, in response to the user input selecting sentence 1008, device 500 displays user interface 1028 corresponding to a web browser application navigated to display the website corresponding to sentence 1008, as shown in FIG. 10O. Thus, as shown above, device 500 performs different functions depending on the type of actionable text a particular string of characters has been identified to be. For example, selection of an actionable string of text that has been identified as a URL causes display of a browser navigated to that URL, selection of an actionable string of text that has been identified as an address causes display of a map application navigated to that address, and selection of an actionable sting of text that has been identified as a date causes display of a calendar application navigated to that date, etc.

Alternatively, in some embodiments, instead of displaying the browser navigated to the URL associated with sentence 1008, device 500 displays a pop-up (e.g., such as pop-up 1022) in response to user selection of sentence 1008. In such embodiments, the pop-up includes a font-based text representation of sentence 1008 (e.g., for the user to confirm the URL) and/or an option to perform the respective function associated with the actionable text (e.g., for the user to execute the function). In some embodiments, a pop-up with the font-based text representation is always displayed in response to selection of a handwritten actionable text (e.g., as opposed to selection of a font-based text that is actionable, which optionally does not display a pop-up to confirm the actionable text, such as described below in FIG. 10DD). In some embodiments, doing so allows a user to confirm the device's interpretation of the handwritten text, but does not require confirmation of actionable text that is not handwritten text because the actionable text is already font-based.

Figure 10P:
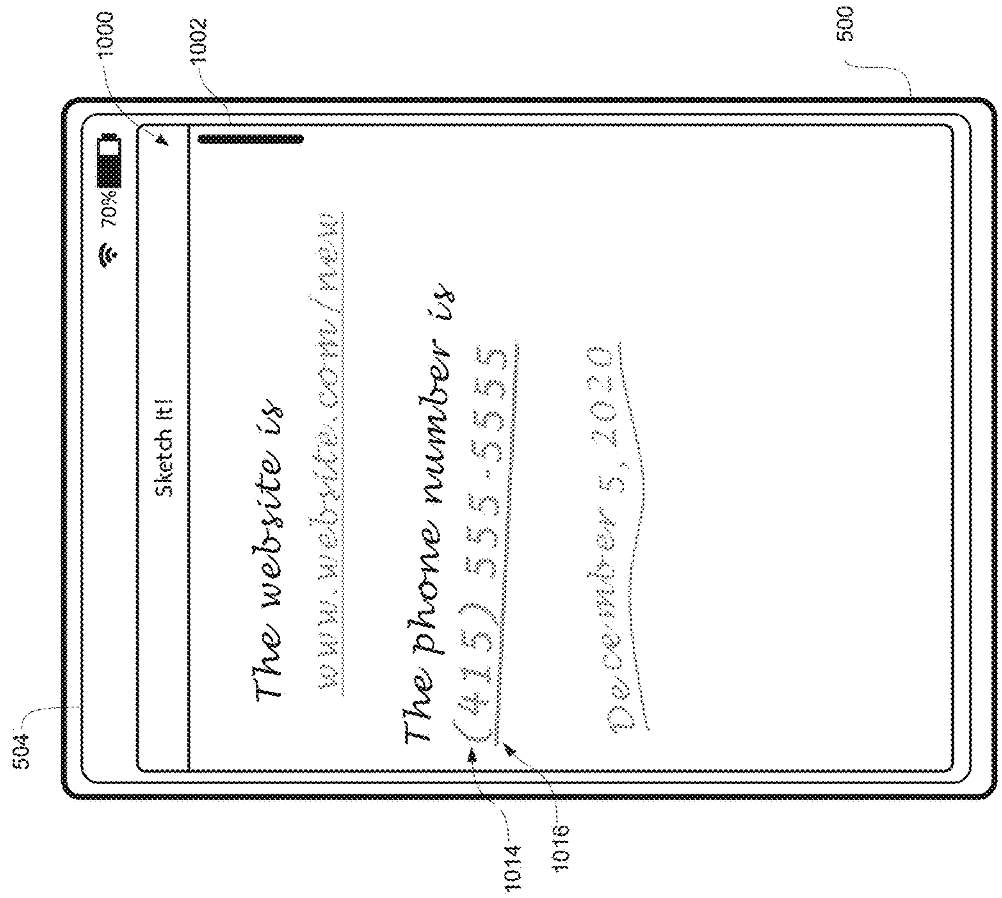
Figure 10O:

FIG. 10P illustrates an embodiment in which sentence 1014 corresponding to a phone number has been identified as an actionable phone number. In FIG. 10Q, a user input from stylus 203 is detected writing additional digit 1030 (e.g., a "5") to the end of sentence 1014. In some embodiments, in response to receiving the user input, the visual characteristic of sentence 1014 is reverted to its original visual characteristic before it was modified to be actionable, and sentence 1014 is no longer selectable to perform a function associated with sentence 1014 (optionally the other actionable text in content entry region is also reverted to their original color and updated to become unactionable), as shown in FIG. 10Q.

Figure 10R:
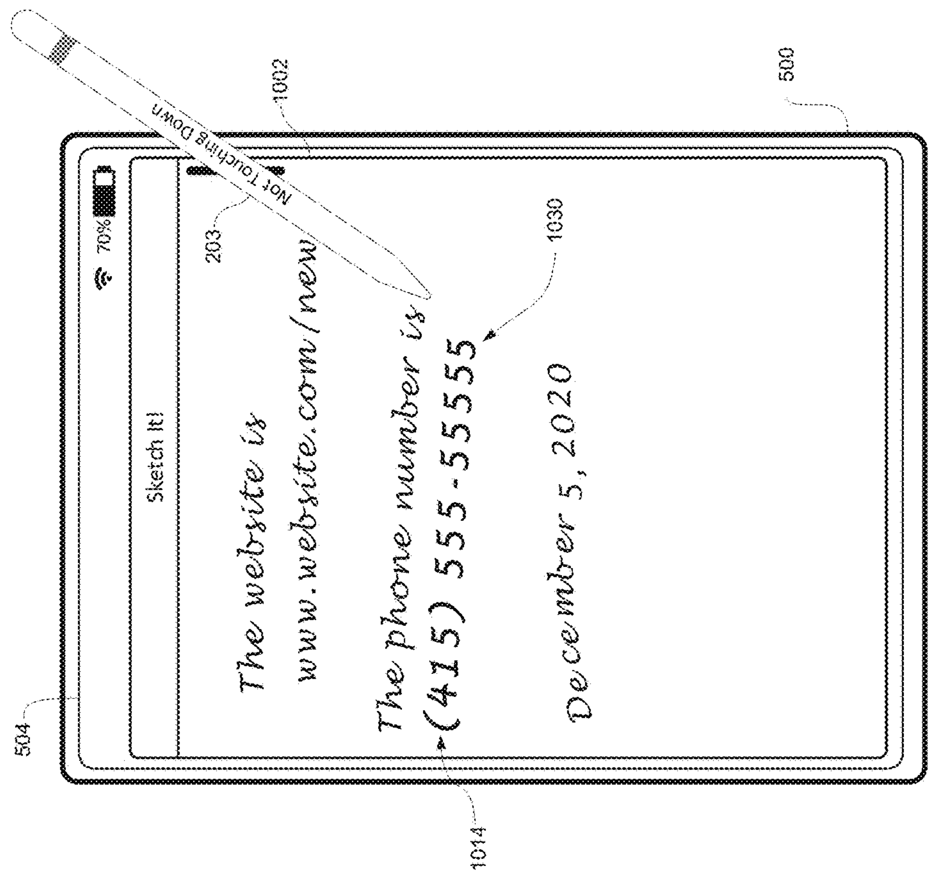
Figure 10Q:
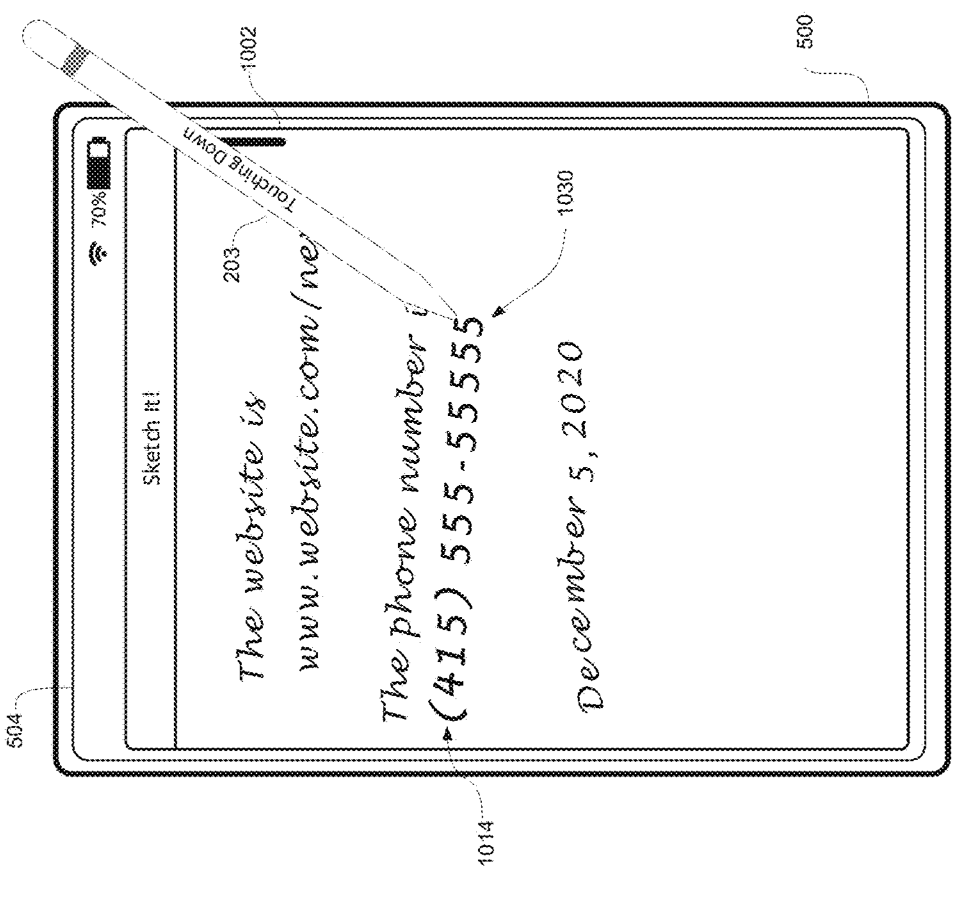
Figure 10T:
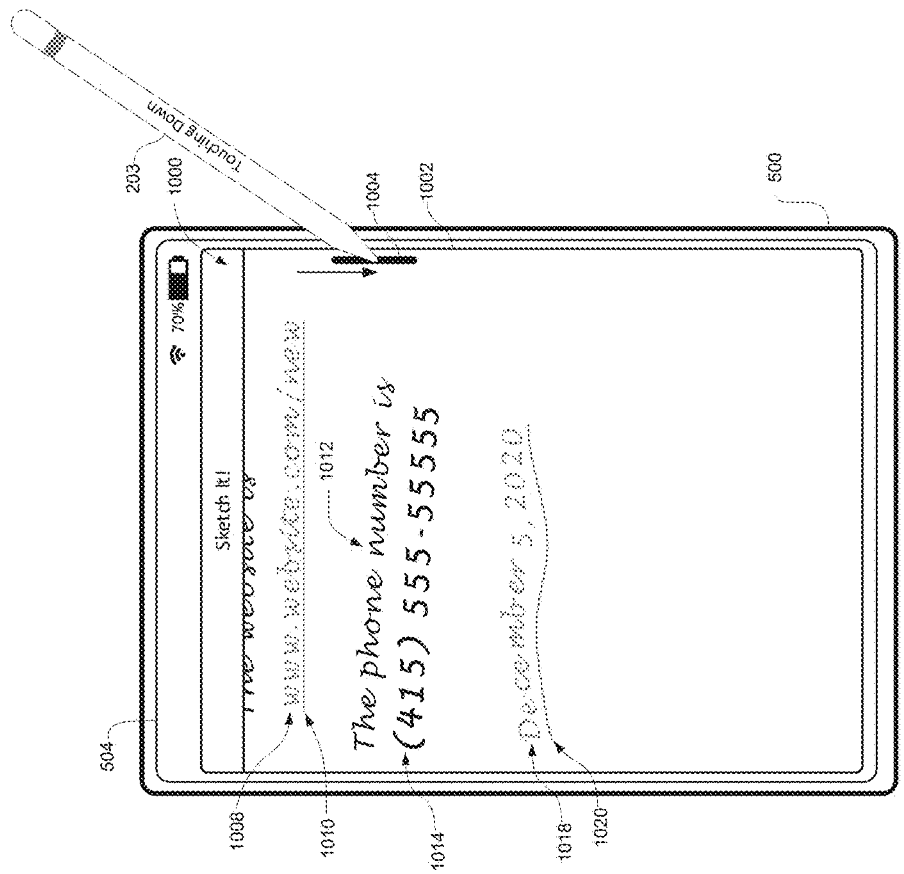

In FIG. 10R, a termination of the contact with touch screen 504 is detected (e.g., lift-off of stylus 203 from touch screen 504). In the embodiment illustrated in FIG. 10R, device 500 does not perform the process to identify and visually differentiate actionable text in response to the termination of the contact. In the embodiment illustrated in FIGS. 10R-10S, device 500 performs the identification process in response to the user interacting with another user interface object, such as scroll bar 1004. For example, in FIG. 10S, a user input is received selecting scroll bar 1004 using stylus 203. In FIG. 10T, a downward movement of stylus 203 is received moving scroll bar 1004. In some embodiments, in response to the downward movement, user interface 1000 scrolls downwards and device 500 performs the detection process on the content in content entry region 1002, as shown in FIG. 10T. In some embodiments, device 500 performs the detection process as soon as the user input is received selecting scroll bar 1004. In some embodiments, the detection is performed after the user begins scrolling (e.g., after scroll bar 1004 is moved). In some embodiments, interaction with another user interface element suggests that the user is done inserting content into content entry region 1002 and thus performing the detection process in response to the user interacting with another user interface element can be advantageous. For example, if the user scrolls the content entry region (as described above), dismisses the content entry palette, or causes display of another user interface.

In FIG. 10T, because sentence 1014 now no longer matches a valid pattern for a phone number (e.g., due to the addition of the "5"), sentence 1014 is not identified as actionable text and sentence 1014 maintains its visual characteristics. In some embodiments, device 500 is able to identify that the final "5" is not a part of sentence 1014 (e.g., either because "5" is too far away from the rest of the digits, because "5" does not semantically belong with sentence 1014, because the "5" is not recognizable as a valid digit, or because device 500 recognizes that the extra "5" character would otherwise cause sentence 1014 to no longer be a valid phone number) and thus device 500 is still able to identify sentence 1014 as actionable and modify sentence 1014 to be actionable (without marking the additional "5" as part of sentence 1012).

Figure 10S:
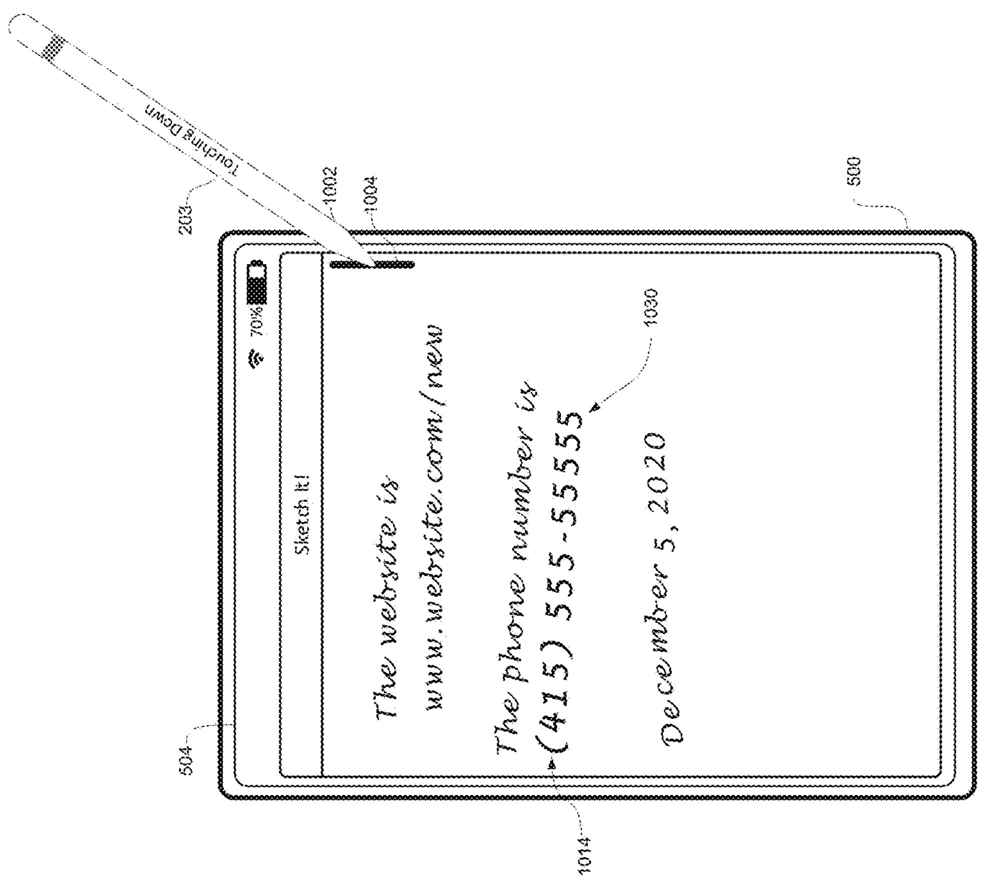
Figure 10V:
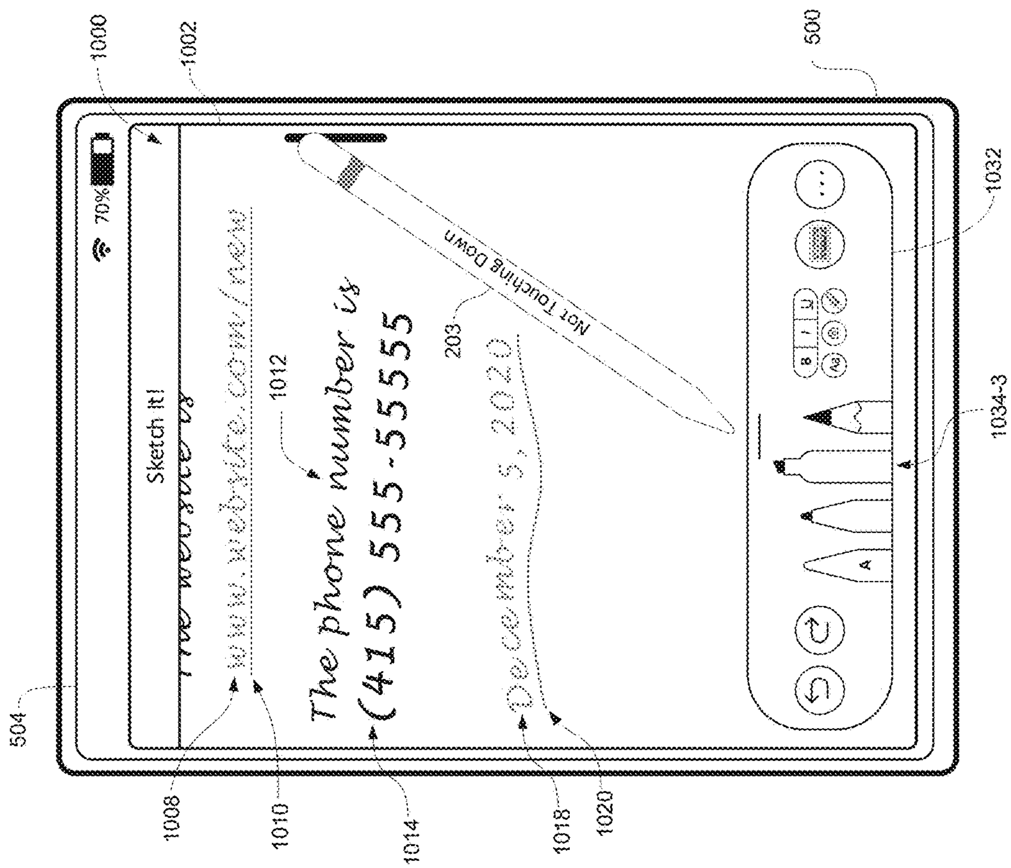
Figure 10U:
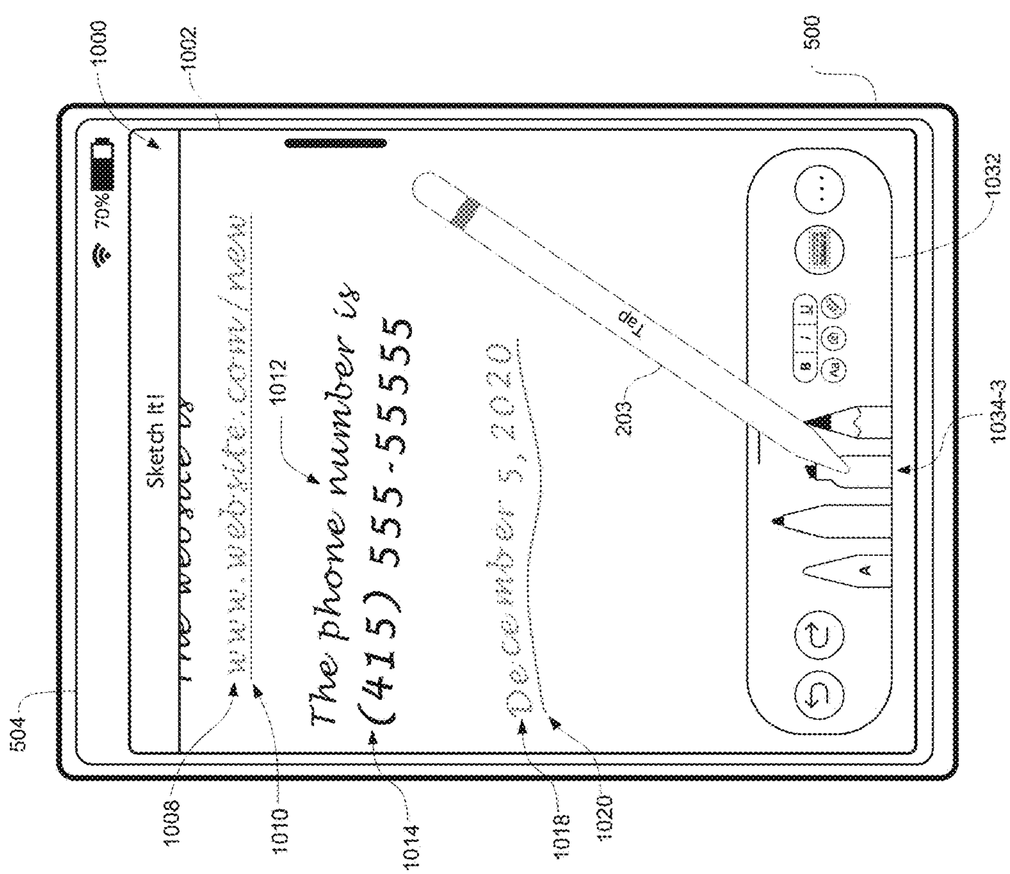

FIGS. 10U-10X illustrate an embodiment in which content that is inserted using certain content entry tools are not analyzed for actionable text. In FIG. 10U, a user input is received selecting highlighter tool 1034-3. In some embodiments, in response to the user input selecting highlighter tool 1034-3, highlighter tool 1034-3 becomes the active content entry tool and handwritten inputs in content entry region 1002 are styled like a highlighter, as shown in FIG. 10V.

Figure 10X:
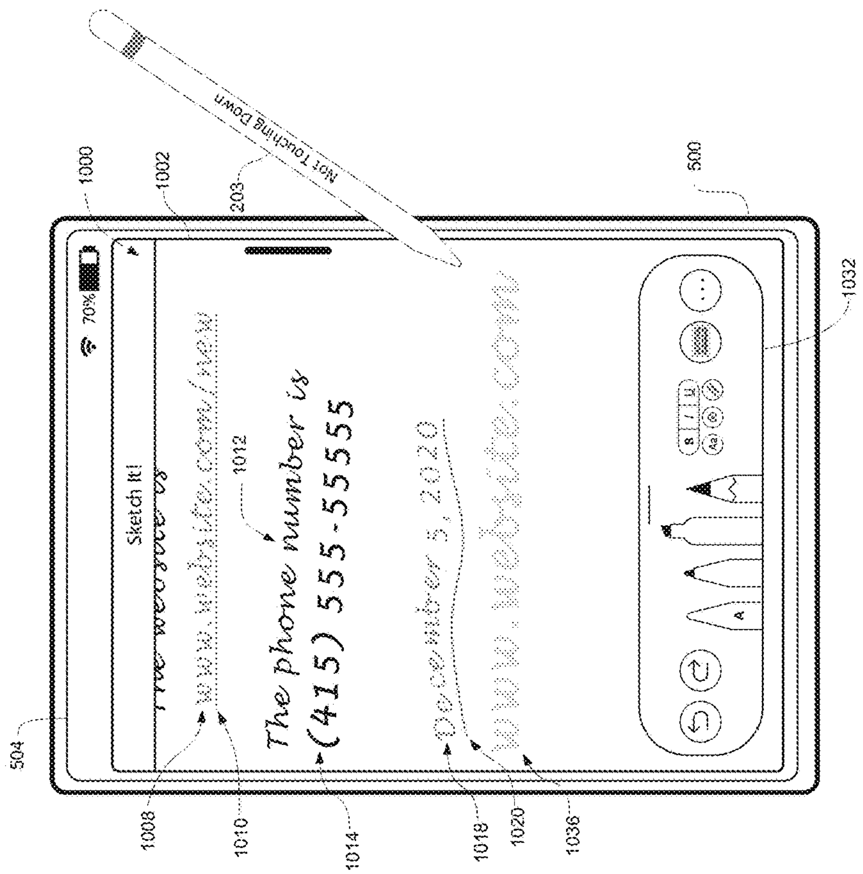
Figure 10W:
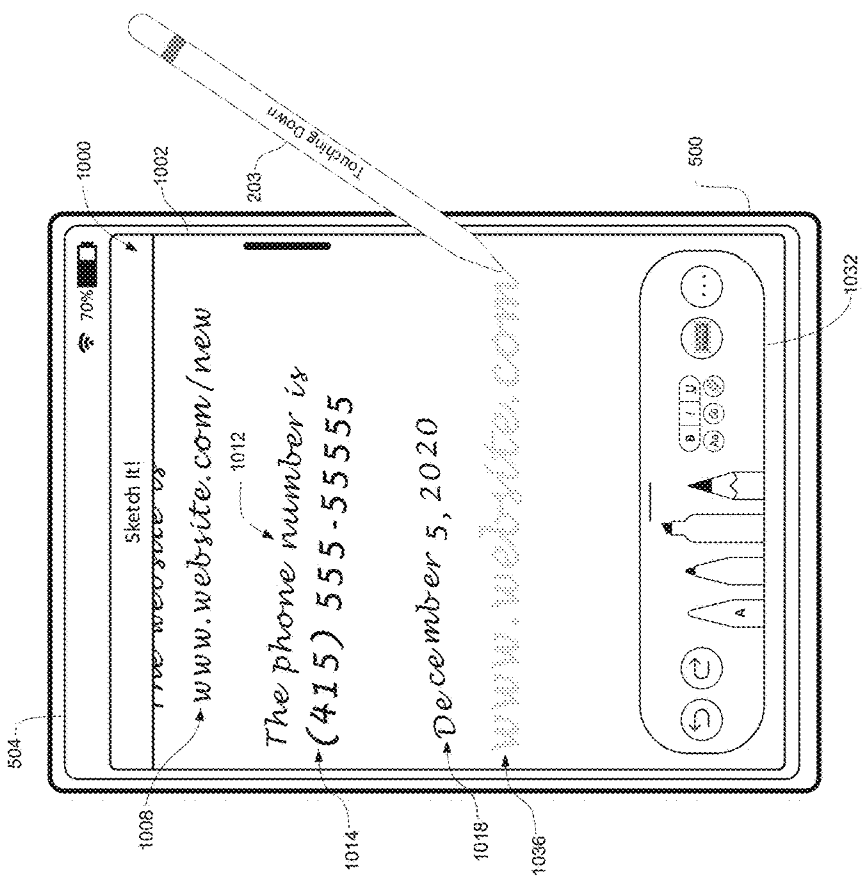

In FIG. 10W, a user input is received from stylus 203 writing sentence 1036 corresponding to a website URL. In some embodiments, as shown in FIG. 10W, sentence 1036 is written while the highlighter tool 1034-3 is active and thus sentence 1036 is styled as a highlighter. In FIG. 10X, a termination of the contact with touch screen 504 is detected (e.g., lift-off of stylus 203 from touch screen 504). In some embodiments, in response to detecting the termination of the contact with touch screen 504, device 500 performs the detection process and identifies sentence 1008 and sentence 1018 as actionable text, as shown in FIG. 10X. In FIG. 10X, sentence 1036 is not identified as actionable text even though the characters written by sentence 1036 match the pattern for being a website URL because sentence 1036 was written using the highlighter tool. Thus, as shown, certain content entry tools, such as the highlighter tool, are not associated with writing text, are not compatible with actionable text and/or are not analyzed by device 500 as potentially including actionable text.

Figure 10Z:
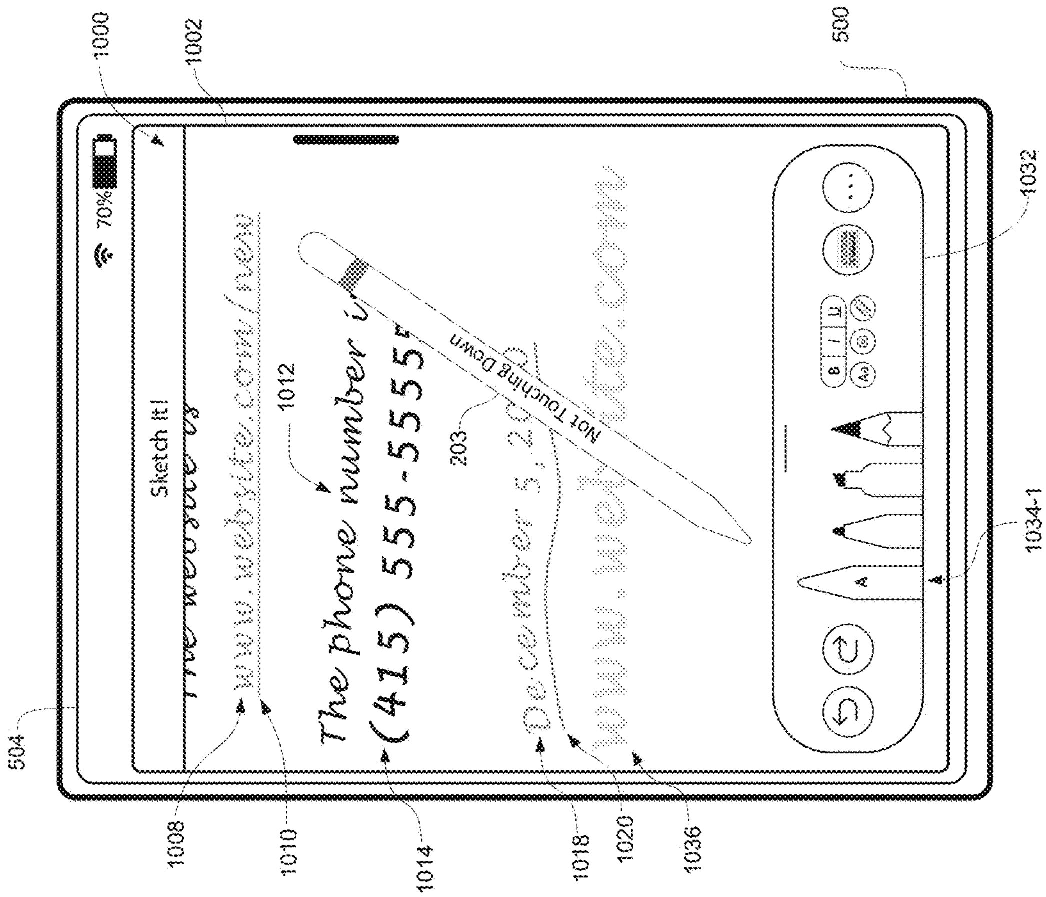
Figure 10Y:
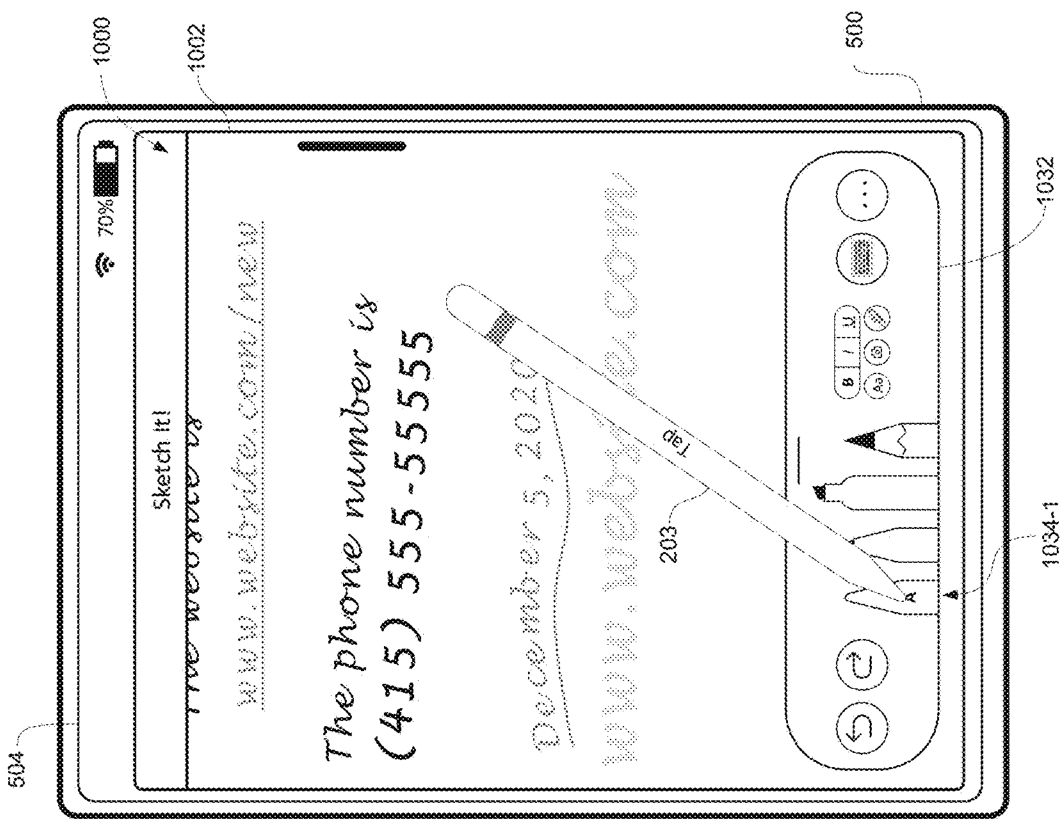
Figure 10B:
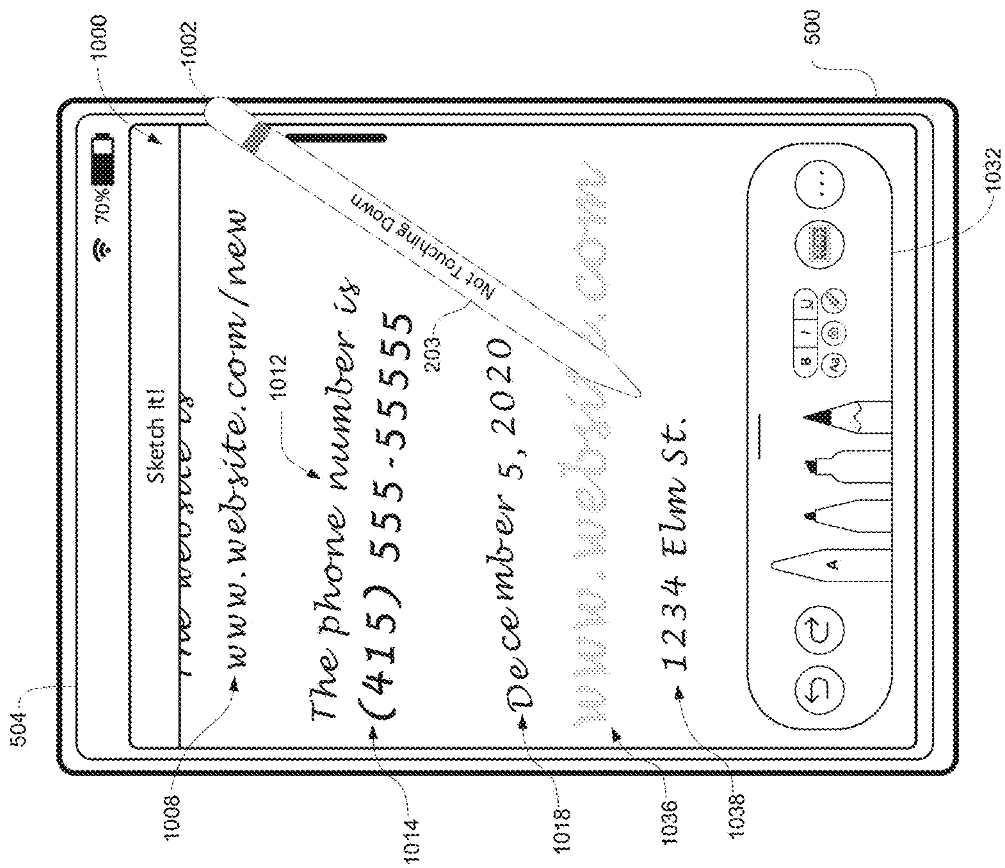
Figure 10A:
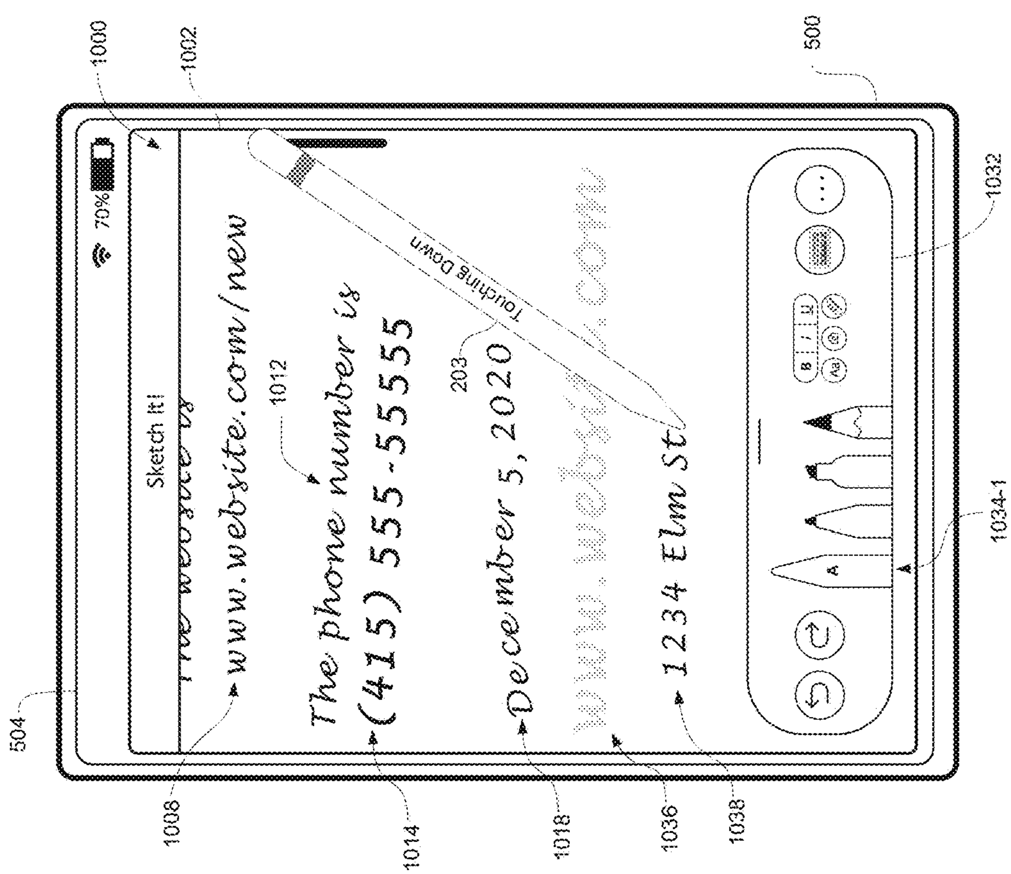
Figure 10D:
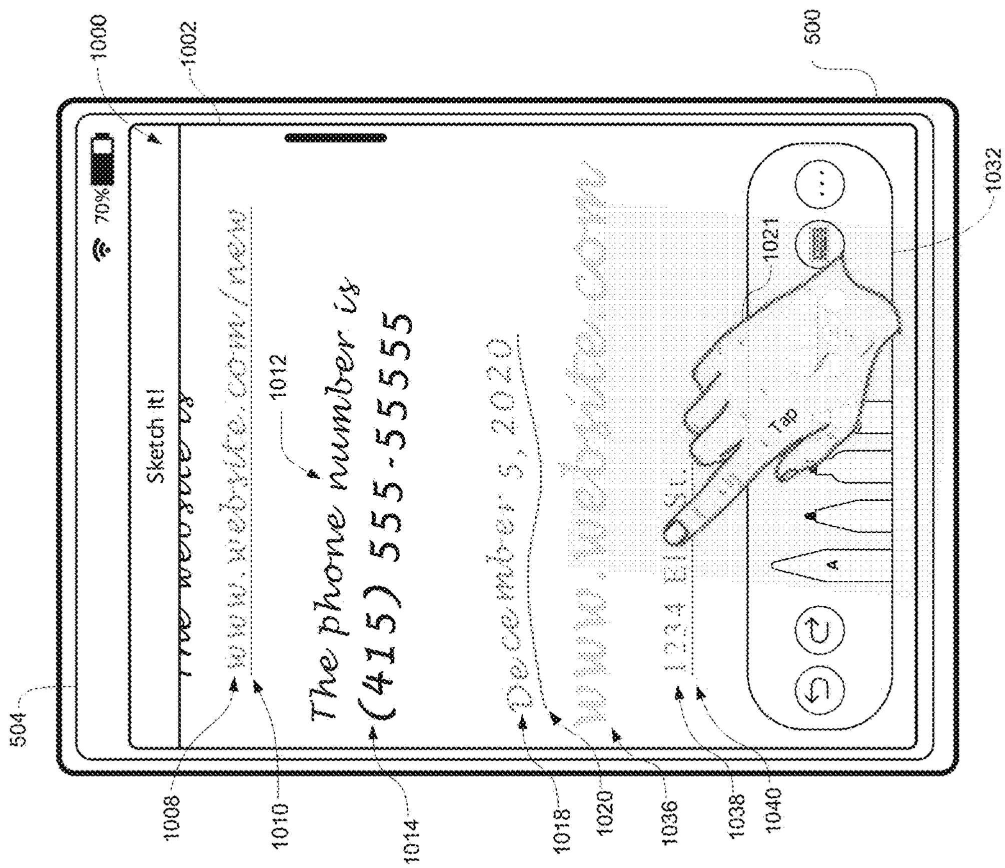
Figure 10C:
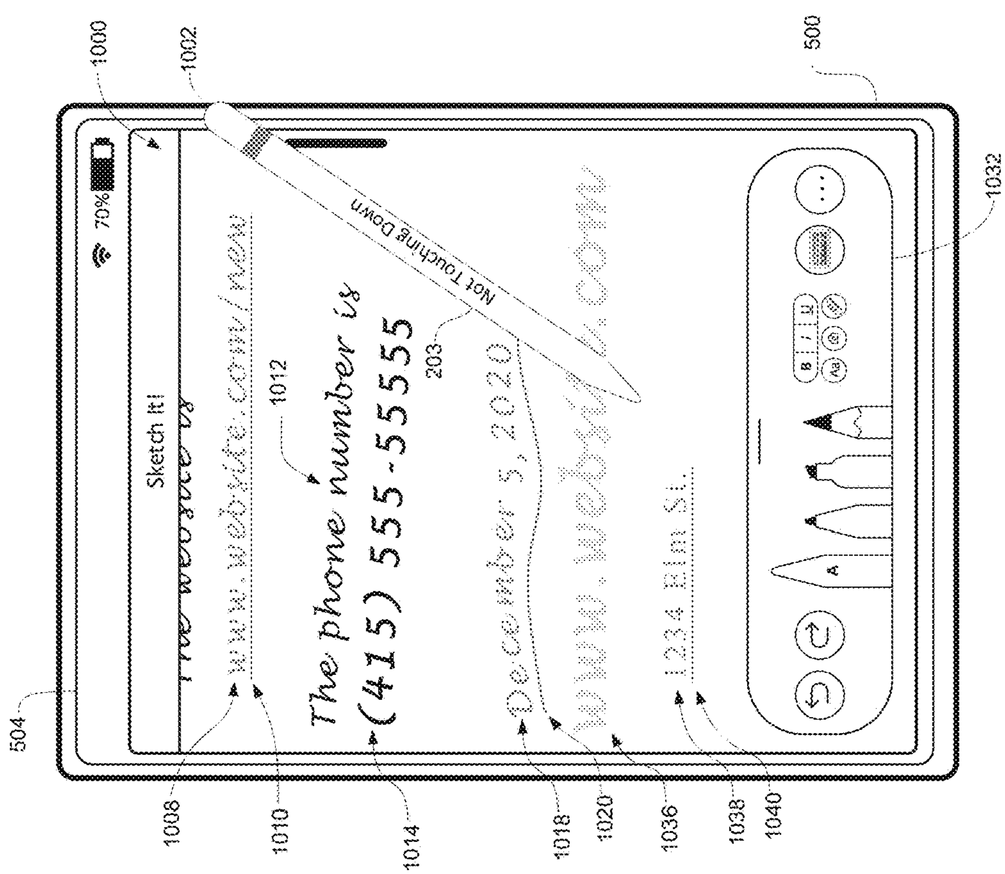
Figure 10E:
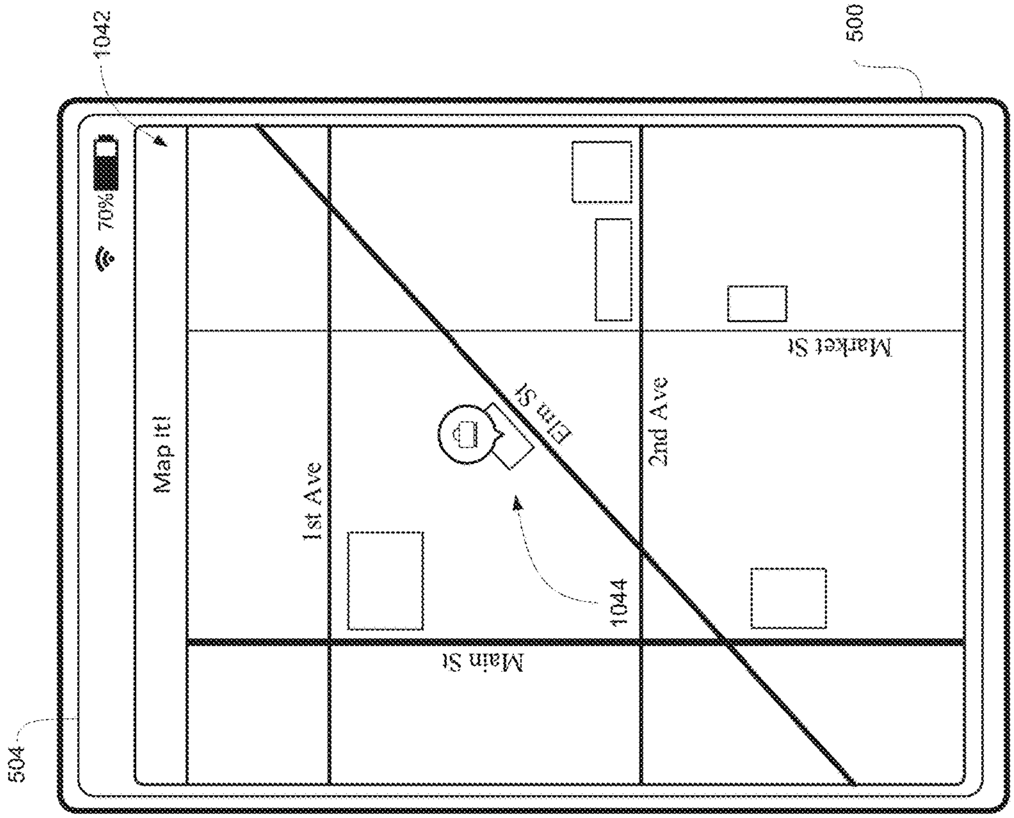
Figure 11A:
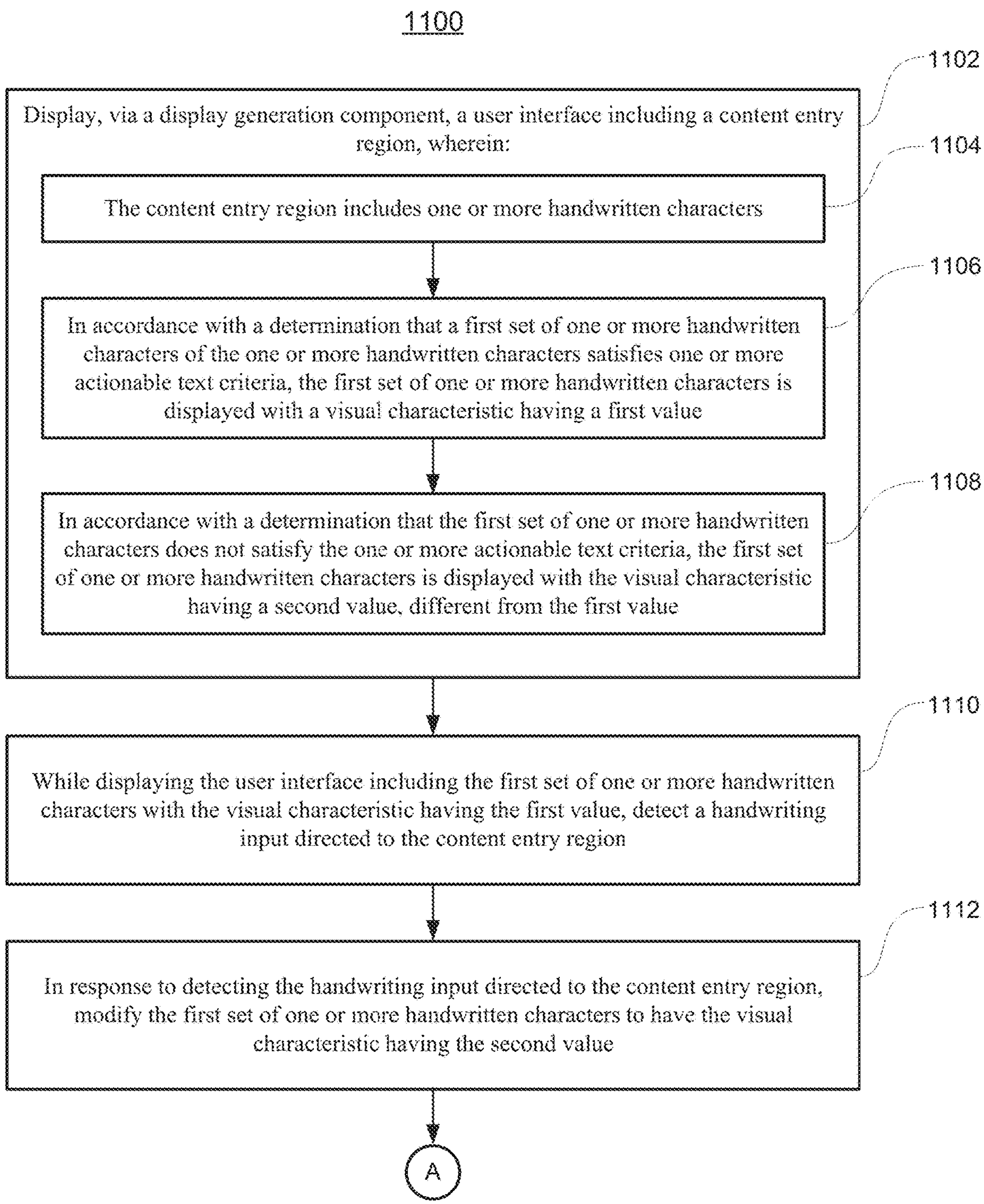
FIGS. 11A-11I are flow diagrams illustrating a method of identifying actionable text within handwritten content in accordance with some embodiments.
Figure 11B:
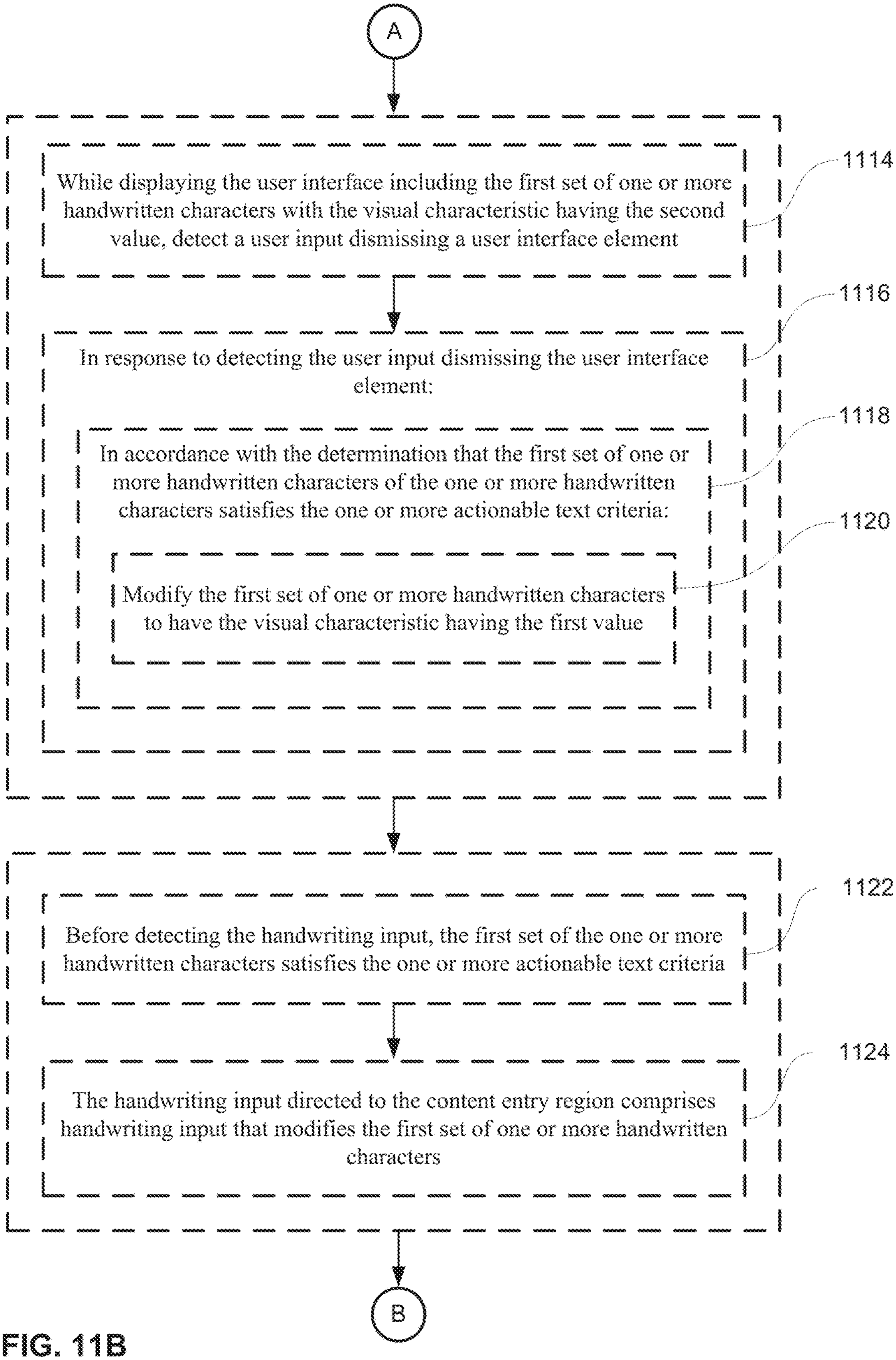
Figure 11C:
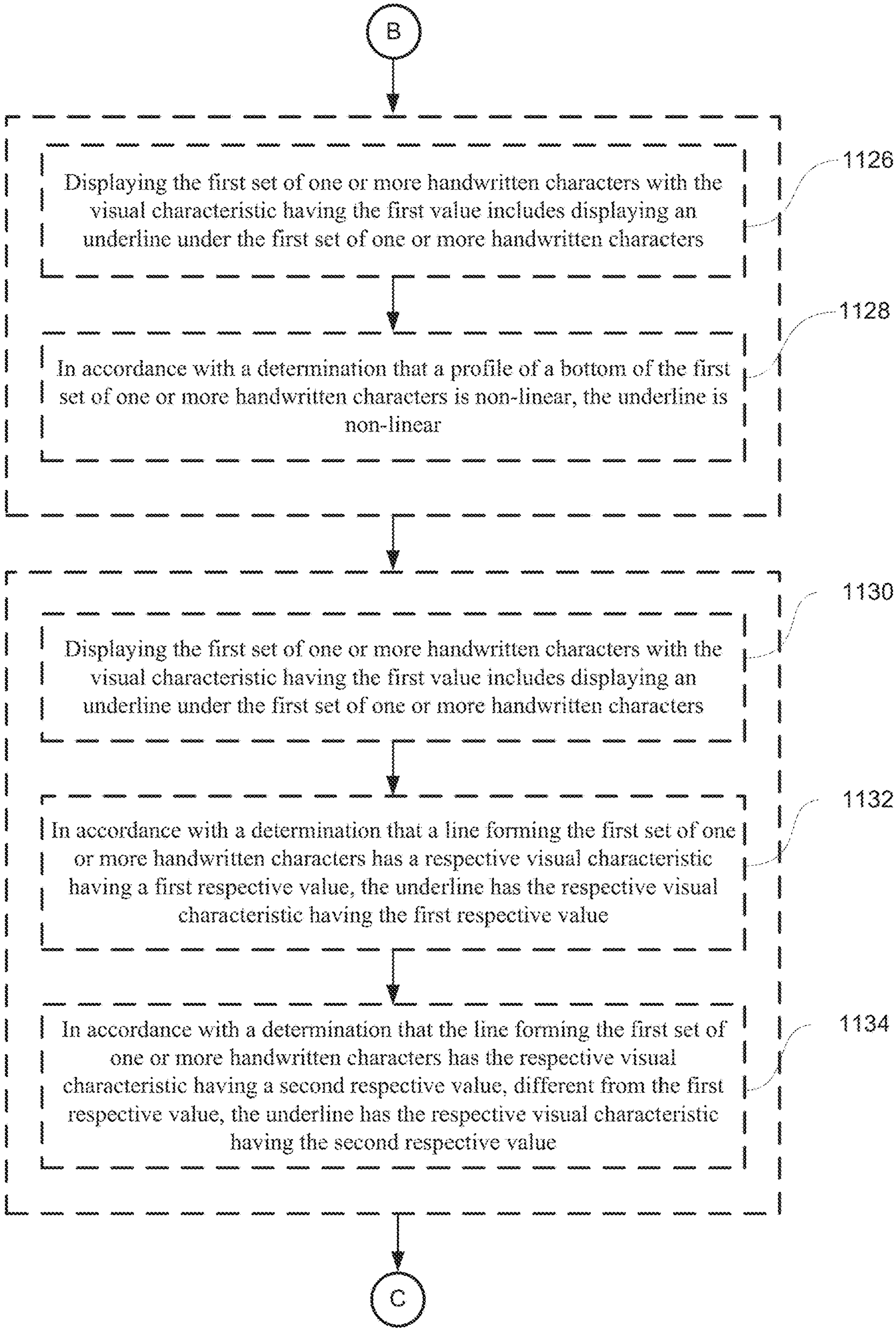
Figure 11D:
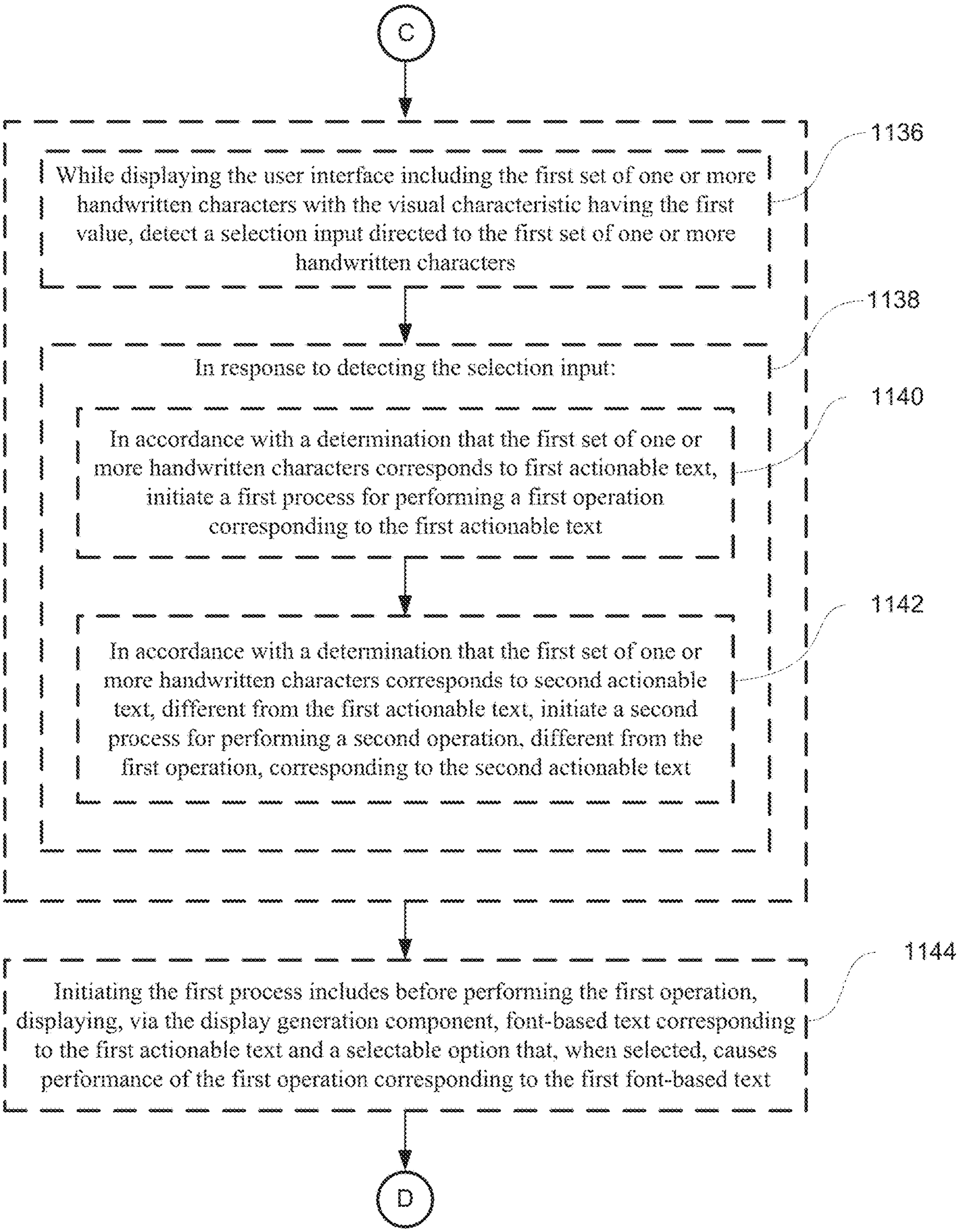
Figure 11E:
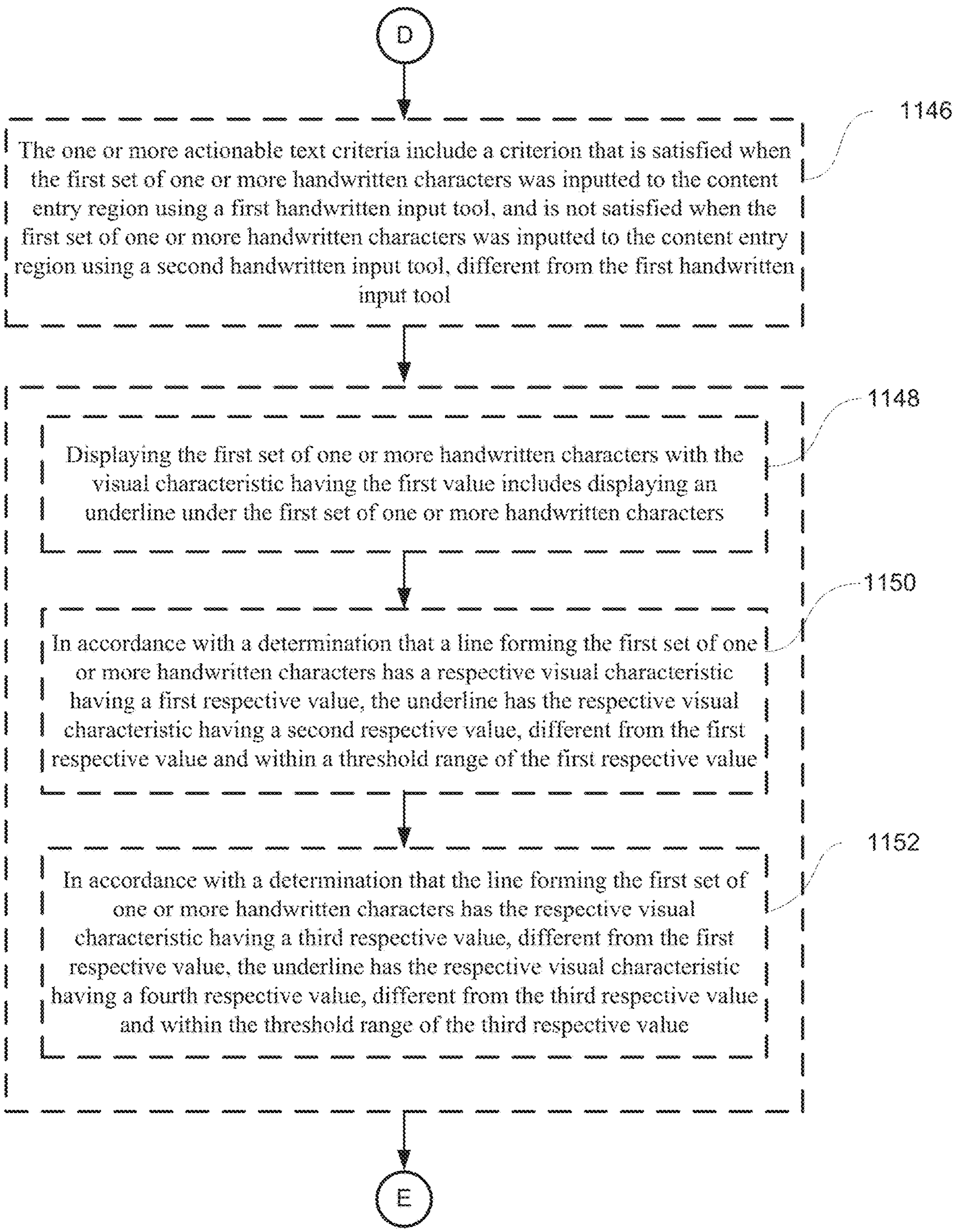
Figure 11F:
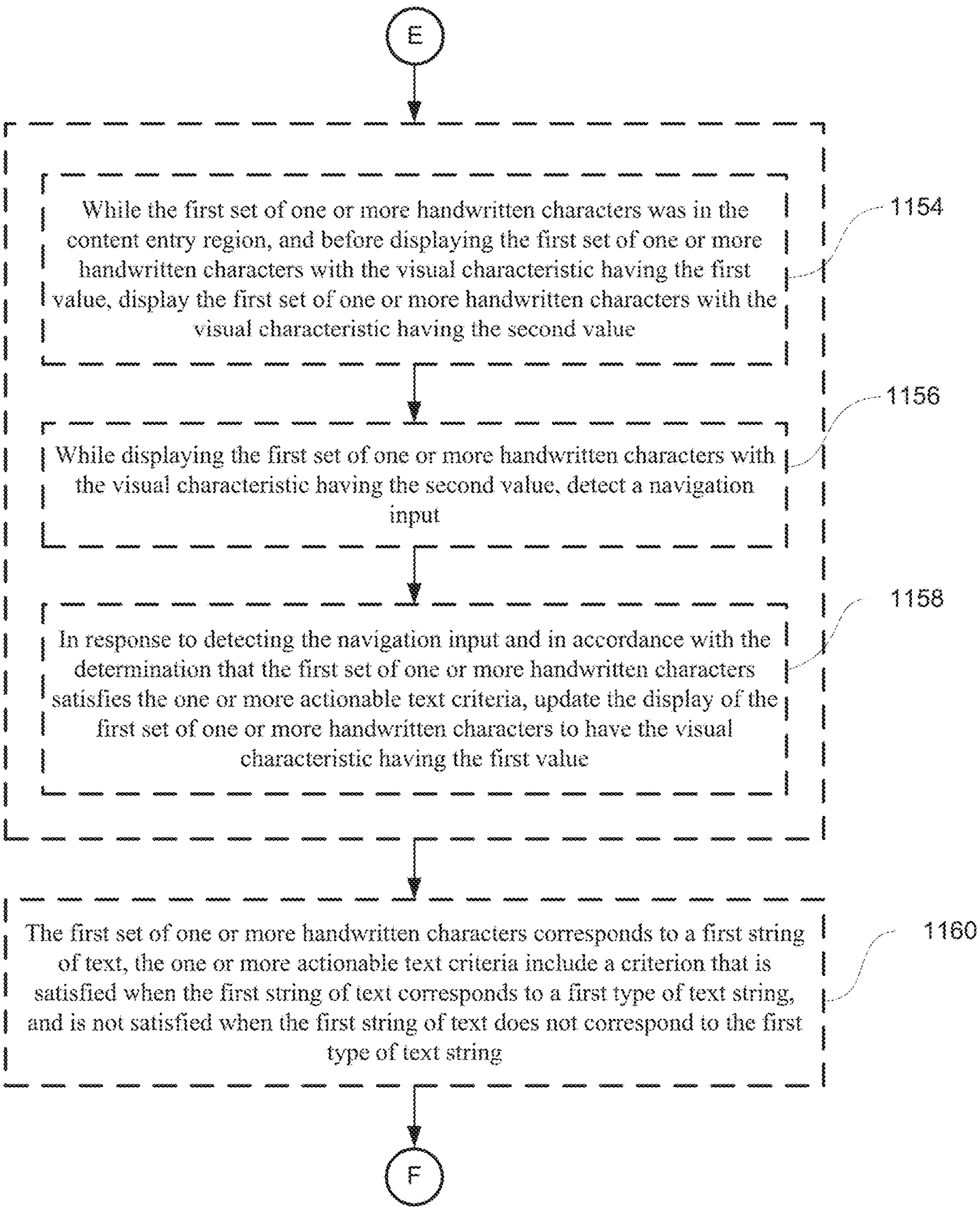
Figure 11G:
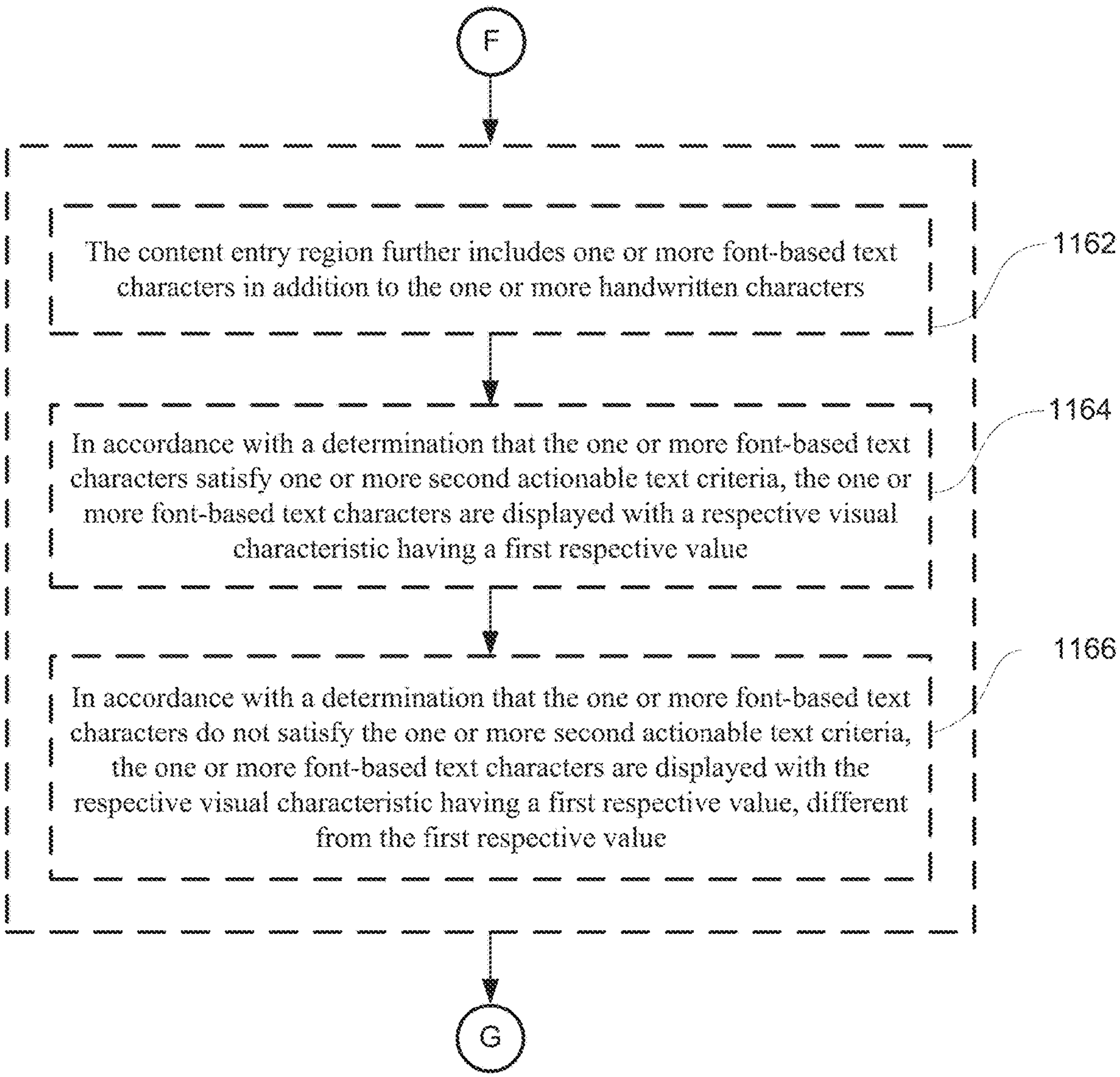
Figure 11H:
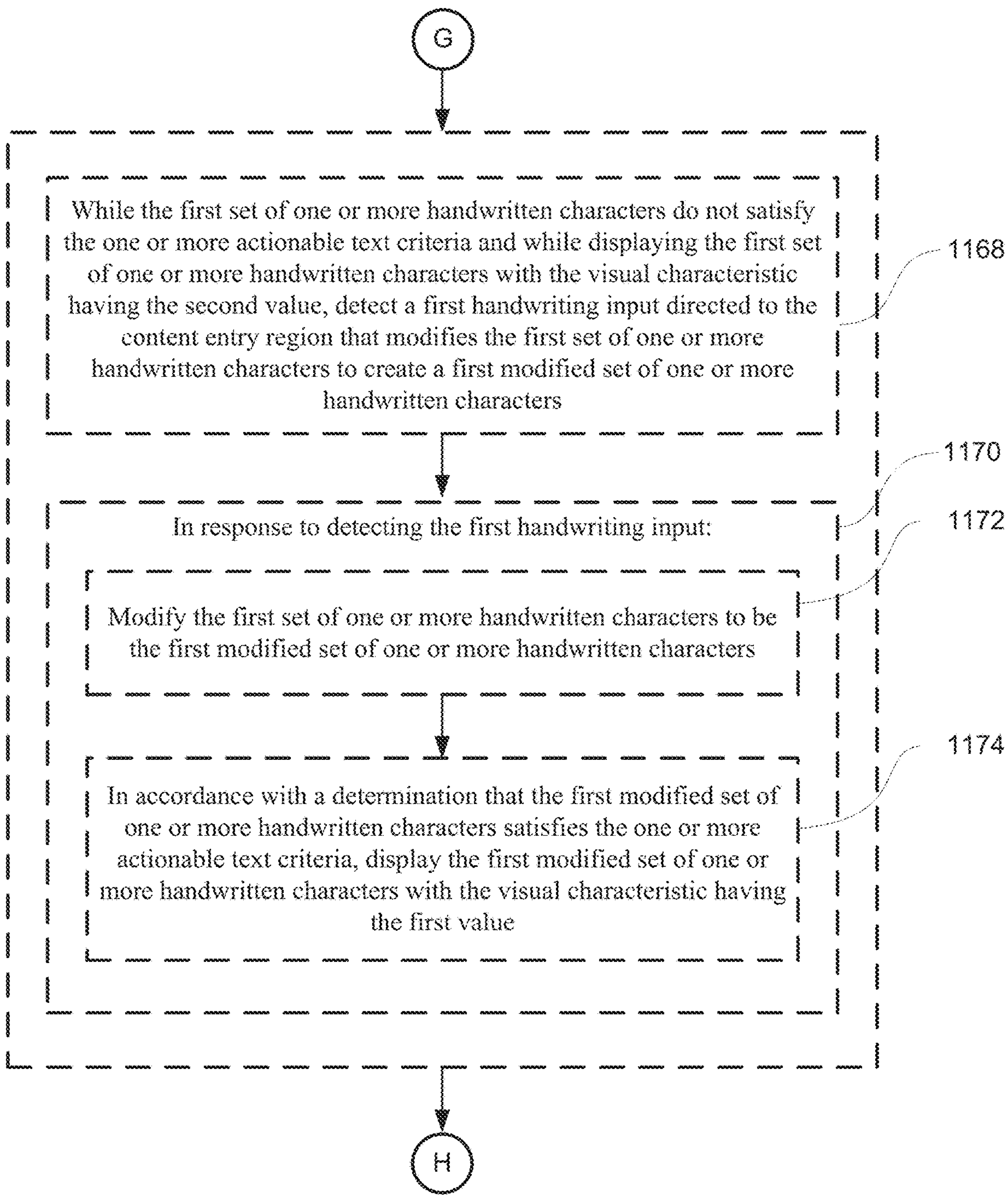
Figure 11I:
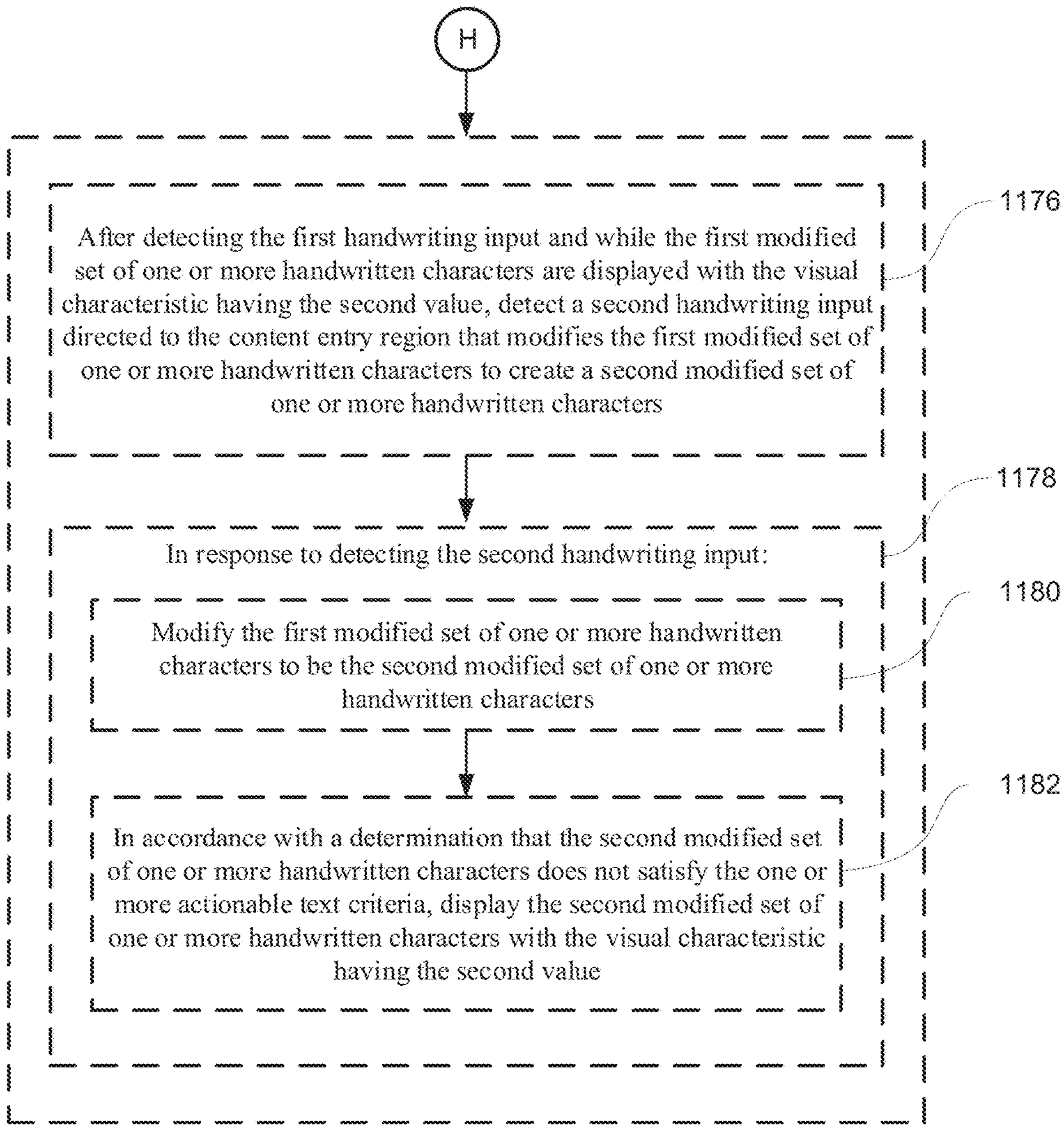

In FIG. 10Y, a user input is received selecting text entry tool 1034-1. In some embodiments, in response to the user input selecting text entry tool 1034-1, text entry tool 1034-1 becomes the active content entry tool and handwritten inputs in content entry region 1002 are analyzed and converted into font-based text (e.g., as opposed to content inserted using pen entry tool 1034-2 illustrated in FIGS. 10A-10T, which are styled like a pen and not converted into font-based text, but are still analyzed by device 500 for potentially including actionable text), as shown in FIG. 10Z.

In FIG. 10AA, a user input is received writing sentence 1038 while text entry tool 1034-1 is active. In FIG. 10BB, a termination of the contact with touch screen 504 is detected (e.g., lift-off of stylus 203 from touch screen 504). In the embodiment illustrated in FIG. 10BB, a threshold amount of time has not yet elapsed since the termination of contact (e.g., 0.1 seconds, 0.25 seconds, 0.5 seconds, 1 second, 3 seconds, 5 seconds, etc.) and thus the content in content entry region 1002 has not yet been identified as actionable (e.g., as opposed to identification of content as actionable upon detecting the termination of contact).

In FIG. 10CC, in response to detecting the termination of the contact and after the threshold amount of time has elapsed, sentence 1038 is converted into font-based text corresponding to sentence 1038. In some embodiments, because sentence 1038 corresponds to an address and is identifiable as actionable text (e.g., in such embodiments, addresses are actionable text), sentence 1038 is updated to become actionable text, which includes changing a visual characteristic of the sentence 1038 and displaying underline 1040 beneath sentence 1038, as shown in FIG. 10CC. In some embodiments, updating sentence 1038 to become actionable text is performed concurrently with the conversion of sentence 1038 into font-based text. In some embodiments, updating sentence 1038 to become actionable text is performed before or after the conversion of sentence 1038 into font-based text. As shown in FIG. 10CC, sentence 1008 and sentence 1018 are also identified as actionable and updated to become actionable text (e.g., in response to detecting the termination of the contact and after the threshold amount of time has elapsed). Thus, as illustrated, device 500 is able to analyze both font-based text and hand-drawn content (e.g., non-font-based text) for actionable text.

In FIG. 10DD, a user input is received by finger 1021 selecting sentence 1038 (e.g., a tap input) while sentence 1038 has been updated to be actionable. In some embodiments, in response to receiving the user input selecting sentence 1038, device 500 displays user interface 1042 corresponding to a map application navigated to display the address corresponding to sentence 1038, as shown in FIG. 10EE.

It is understood that any of the above-described identification of actionable text is applicable to either handwritten text (e.g., optionally when drawn by pre-determined compatible tools) or font-based text. For example, email addresses, website URLs, physical and mailing addresses, phone numbers, etc., can all be identified in both font-based text and handwritten text. Thus, the types of actionable text available for font-based text are also available for handwritten text (e.g., handwritten text and font-based text are treated the same with respect to actionable text).

FIGS. 11A-11I are flow diagrams illustrating a method 1100 of identifying actionable text within handwritten content. The method 1100 is optionally performed at an electronic device such as device 100, device 300, device 500, device 501, device 510, device 591 as described above with reference to FIGS. 1A-1B, 2-3, 4A-4B and 5A-5I. Some operations in method 1100 are, optionally combined and/or order of some operations is, optionally, changed.

As described below, the method 1100 provides ways to identify actionable text within handwritten content. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., device 500) in communication with a display generation component (e.g., a mobile device (e.g., a tablet, a smartphone, a media player, or a wearable device), or a computer, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.) displays (1102), via the display generation component, a user interface including a content entry region, such as user interface 1000 and content entry region 1002 in FIG. 10A (e.g., a region in the user interface in which a user is able to input and/or enter text, images, multimedia, etc.). For example, in an email composition user interface, a content entry region for the body of the email is capable of receiving (and transmitting over email) text, still images, videos, attachments, etc. In another example, in a note taking application, a content entry region capable of receiving handwritten text, drawings, figures, etc. and capable of inserting images, drawings, etc., such as described above with respect to user interface 601.

In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, the content entry region includes one or more handwritten characters (1104), such as sentences 1006 and 1008 in FIG. 10B (e.g., the content entry region includes handwritten text). In some embodiments, the handwritten text was previously inputted by the user or was pre-populated without user input. In some embodiments, the handwritten characters are or were inputted using a stylus.

In some embodiments, in accordance with a determination that a first set of one or more handwritten characters of the one or more handwritten characters satisfies one or more actionable text criteria (e.g., the first set of handwritten characters are identified as actionable), the first set of one or more handwritten characters is displayed with a visual characteristic having a first value (1106), such as sentence 1008 displayed with a different color than sentence 1006 and with underline 1010 in FIG. 10C (e.g., the first set of handwritten characters are displayed with a color different from the default color and/or underlined).

In some embodiments, the system identifies and recognizes the one or more handwritten characters as linguistic characters (e.g., without replacing the handwritten characters with font-based text) and determines that the handwritten characters (or a portion of the string of characters) matches a particular pattern such that a user can perform a function associated with the handwritten characters. For example, if the handwritten characters are recognized as a URL, a phone number, an address, etc., the device identifies the handwritten characters as an actionable string of characters. In some embodiments, the one or more actionable text criteria are satisfied if the characters match a predetermined pattern. In some embodiments, the one or more actionable text criteria are satisfied if the characters include one or more predetermined keywords (e.g., "www", ".com", "Ave.", "St.", etc.). In some embodiments, an actionable string of characters is one which a user is able select to initiate a process for performing a function associated with the string of characters (e.g., navigate to a URL, call or text a phone number, map to an address, etc.).

In some embodiments, the default color is the color selected by the user or set by the device as the color for user-inserted handwritten input that is not recognized as actionable text. In some embodiments, the first set of handwritten characters is first displayed with a default color (e.g., after a user has input the handwritten characters) and after the first set of handwritten characters is identified as actionable and/or after a threshold amount of time (e.g., 0.1 seconds, 0.25 seconds, 0.5 seconds, 1 second, 2 seconds, 3 seconds, 5 seconds, etc.), then the visual characteristic of the first set of handwritten characters is updated to have the different color (e.g., non-default color).

In some embodiments, in accordance with a determination that the first set of one or more handwritten characters does not satisfy the one or more actionable text criteria (e.g., the first set of handwritten characters does not match a predetermined pattern or does not include predetermined keywords that would cause the first set of handwritten characters to be identified as actionable characters), the first set of one or more handwritten characters is displayed with the visual characteristic having a second value, different from the first value (1108), such as sentence 1006 in FIG. 10C (e.g., the first set of handwritten characters is displayed with a default color and/or not underlined).

In some embodiments, the one or more actionable text criteria is not satisfied if the first set of handwritten characters include characters that cannot be identified or recognized. In some embodiments, the default color is set by the user, and/or set by the active content insertion mode and/or set by the device.

In some embodiments, while displaying the user interface including the first set of one or more handwritten characters with the visual characteristic having the first value, the electronic device detects (1110) a handwriting input (e.g., a start of a handwriting input) directed to the content entry region, such as the contact by stylus 203 in FIG. 10E (e.g., detecting a contact of a stylus with the touch-sensitive display). In some embodiments, the contact is the initiation of the insertion of more content. In some embodiments, the contact is the activation of a user interface element, a navigation input such as a scrolling input, or any other interactive input.

In some embodiments, in response to detecting the handwriting input directed to the content entry region, the electronic device modifies (1112) the first set of one or more handwritten characters to have the visual characteristic having the second value, such as sentence 1008 reverting to its original color in FIG. 10E (e.g., reverting the visual characteristic of the first set of handwritten characters to its default values). For example, changing the first set of handwritten characters to the default color and/or without underlining.

The above-described manner of distinguishing actionable handwritten characters (e.g., by displaying actionable characters with a visual characteristic having a first value if characters are recognized as actionable characters, and reverting the visual characteristic to the default value if the user performs new inputs) allows the electronic device to quickly and efficiently indicate that the user's additional inputs may affect whether the characters in the content entry region are actionable (e.g., by reverting the appearance of the actionable characters to appear like non-actionable characters, while the user is inputting additional content or otherwise interacting with the user interface, thus preventing the user from being confused or distracted by characters that have different visual characteristics), which simplifies the interaction between the user and the electronic device and enhances the operability of the electronic device and makes the user-device interface more efficient (e.g., by automatically detecting whether new content inserted by the user causes more sets of characters to be actionable or fewer sets of characters to be actionable, without requiring the user to perform additional inputs to cause the device to re-scan for actionable characters), which additionally reduces power usage and improves battery life of the electronic device by enabling the user to use the electronic device more quickly and efficiency, while reducing errors in usage.

In some embodiments, while displaying the user interface including the first set of one or more handwritten characters with the visual characteristic having the second value (e.g., while the first set of handwritten characters have not yet been identified as an actionable string of characters and are not selectable to perform a respective function), the electronic device detects (1114) a user input dismissing a user interface element, such as described in FIG. 10T (e.g., an input dismissing a drawing palette or an input dismissing the user interface that includes the content entry region and optionally displaying another user interface).

In some embodiments, a drawing palette includes a plurality of options for controlling the input of content from the respective handwriting device. For example, the drawing palette includes one or more handwriting tools such as a text entry tool, a drawing tool, a highlighting tool, etc. In some examples, the palette includes one or more options for selecting the color of the representation of handwriting input (e.g., the color of future handwriting inputs or the color of representations of handwriting inputs that are currently selected).

In some embodiments, in response to detecting the user input dismissing the user interface element (1116), in accordance with the determination that the first set of one or more handwritten characters of the one or more handwritten characters satisfies the one or more actionable text criteria (1118) (e.g., the first set of handwritten characters are actionable), the electronic device modifies (1120) the first set of one or more handwritten characters to have the visual characteristic having the first value, such as in FIG. 10T (e.g., performing the determination of whether the first set of handwritten characters is actionable and if it is actionable, updating the visual characteristics of the first set of characters to have the first value).

In some embodiments, the handwritten characters matches a particular pattern and is identifiable as a URL, a phone number, an email address, an address, etc. For example, changing the first set of handwritten characters from the original handwritten color and/or style to have a color other than the original handwritten color and/or underlining the first set of handwritten characters. In some embodiments, if the actionable text criteria is not satisfied, maintaining the first set of handwritten characters with the visual characteristic having the second value (e.g., maintaining the original style of the handwritten characters). In some embodiments, the determination is performed in response to the user interacting with user interface elements other than the content entry region (e.g., optionally any user input other than the entry of content in the content entry region).

The above-described manner of distinguishing actionable handwritten characters (e.g., in response to receiving a user input dismissing a user interface element) allows the electronic device to quickly and efficiently recognize actionable characters when inputs writing additional characters are not likely, which simplifies the interaction between the user and the electronic device and enhances the operability of the electronic device and makes the user-device interface more efficient (e.g., without requiring additional inputs to manually trigger detection of actionable characters), which additionally reduces power usage and improves battery life of the electronic device by enabling the user to use the electronic device more quickly and efficiency, while reducing errors in usage.

In some embodiments, before detecting the handwriting input, the first set of the one or more handwritten characters satisfies the one or more actionable text criteria (1122), such as sentence 1008 in FIG. 10D (e.g., the one or more handwritten characters matches one of the predetermined patterns and has been previously identified as actionable). In some embodiments, before detecting the handwritten input, the first set of the one or more handwritten characters have a visual characteristic with the first value (e.g., the characters have a particular color and/or are underlined). In some embodiments, the one or more handwritten characters are selectable to perform a function corresponding to the one or more handwritten characters (e.g., open a map, navigate to a web page, call or text a phone number, etc.).

In some embodiments, the handwriting input directed to the content entry region comprises handwriting input that modifies the first set of one or more handwritten characters (1124), such as the additional of additional characters 1012 in FIGS. 10E-10F (e.g., the handwritten input adds characters to or removes characters from the first set of characters).

In some embodiments, in response to the handwritten input editing the first set of one or more characters, the device modifies the visual characteristic of the first set of handwritten characters to have the second value (e.g., during the handwriting input, as soon as the handwriting input begins, etc.). In some embodiments, the second value is the default value of handwritten characters. In some embodiments, the second value is the same value as the respective visual characteristic of the newly inserted characters (e.g., in the embodiment when the user is adding characters). For example, upon receiving additional handwritten characters, the device inserts the additional handwritten characters as black, and changes the first set from blue to black to match the new characters. In some embodiments, after detecting the handwritten input (e.g., after adding, removing, or otherwise editing the first set of characters), the device determines whether the modified set satisfies the one or more actionable text criteria and responds accordingly (e.g., maintains the visual characteristic having the second value if not satisfied, or modifies the visual characteristic to have the first value if satisfied).

The above-described manner of reverting the appearance of characters that were previously identified as actionable (e.g., by reverting the visual characteristic to the default value if the user modifies a string of characters that were previously identified as actionable) allows the electronic device to quickly and efficiently indicate that the user's edits to actionable characters may affect whether the characters remain actionable (e.g., by reverting the appearance of the actionable characters to appear like non-actionable characters as the user is modifying the actionable characters, thus preventing the user from being confused or distracted by characters that have different visual characteristics), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, displaying the first set of one or more handwritten characters with the visual characteristic having the first value includes displaying an underline under the first set of one or more handwritten characters (1126), such as underline 1010 in FIG. 10C (e.g., underlining the text that is actionable or otherwise interactable by the user). In some embodiments, the underline has the same visual characteristic as the first set of handwritten characters (e.g., both blue). In some embodiments, if the first set of one or more handwritten characters does not satisfy the actionable text criteria, the handwritten characters are not displayed with the underline.

In some embodiments, in accordance with a determination that a profile defined by bottoms of characters in the first set of one or more handwritten characters is non-linear, the underline is non-linear (1128), such as sentence 1018 having a wavy shape in FIG. 10K (e.g., the underline has the same general profile or contour of the bottom of the first set of handwritten characters).

For example, a hypothetical line drawn just below the characters in the first set of handwritten characters (e.g., drawn just below each character) and/or that follows the bottom of the characters in the first set of handwritten characters (e.g., follows the bottom of each of the characters) has a particular profile or contour (e.g., the bottom of each of the characters of the first set of handwritten characters is in contact with the hypothetical line) and the underline displayed below the first set of characters is based on the hypothetical line. Thus, in some embodiments, the underline follows the shape of the bottom of the first set of handwritten characters. In some embodiments, the underline is an exponential trendline, a moving average trend line, a polynomial trend line, a logarithmic trend line, etc. associated with the profile of the bottom of the handwritten characters (e.g., a smoothing effect is applied to the hypothetical line to prevent the underline from having sharp angles or corners). In some embodiments, if the profile of the bottom of the first set of characters is linear, then the underline is linear (optionally having the same slope as the profile of the bottom of the first set of characters).

The above-described manner of distinguishing actionable handwritten characters (e.g., by an underline beneath the actionable characters with a profile that tracks with the profile of the actionable character) allows the electronic device to quickly and efficiently indicate that the actionable handwritten characters are actionable (e.g., by underlining the actionable characters with a line that follows the general curvature of the characters, thus clearly indicating that the characters are identified as actionable even though the characters may not be perfectly straight), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, displaying the first set of one or more handwritten characters with the visual characteristic having the first value includes displaying an underline under the first set of one or more handwritten characters (1130), such as underline 1010 in FIG. 10D (e.g., underlining the text that is actionable or otherwise interactable by the user). In some embodiments, the underline has the same visual characteristic as the first set of handwritten characters (e.g., both blue). In some embodiments, if the first set of one or more handwritten characters does not satisfy the actionable text criteria, the handwritten characters are not displayed with the underline.

In some embodiments, in accordance with a determination that a line forming the first set of one or more handwritten characters has a respective visual characteristic having a first respective value, the underline has the respective visual characteristic having the first respective value (1132), such as in FIG. 10K (e.g., the underline has the same or similar visual characteristics as the first set of characters). For example, the underline has the same line size/thickness, line color, transparency value, drawing style, etc. as the first set of characters.

In some embodiments, in accordance with a determination that the line forming the first set of one or more handwritten characters has the respective visual characteristic having a second respective value, different from the first respective value, the underline has the respective visual characteristic having the second respective value (1134), such as underline 1016 in FIG. 10I (e.g., if the first set has a visual characteristic with a second value, then the underline has a visual characteristic with the second value). Thus, in some embodiments, one or more visual characteristics of the underline matches the respective visual characteristic of the set of handwritten characters that it is underlining.

The above-described manner of distinguishing actionable handwritten characters (e.g., by underlining the actionable characters with an underline that shares similar visual characteristics as the handwritten characters that it is underlining) allows the electronic device to quickly and efficiently indicate that the actionable handwritten characters are actionable (e.g., by matching the visual characteristic of the underline with the visual characteristic of the handwritten characters, thus preventing the user from being confused and distracted by elements of the actionable characters that have different visual characteristics), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, while displaying the user interface including the first set of one or more handwritten characters with the visual characteristic having the first value (e.g., while the first set of handwritten characters have been identified as an actionable string of characters and is displayed with a visual characteristic having the first value), the electronic device detects (1136) a selection input directed to the first set of one or more handwritten characters, such as the tap input in FIG. 10L (e.g., receiving a selection input such as a tap input on the first set of characters or the underline).

In some embodiments, in response to detecting the selection input (1138), in accordance with a determination that the first set of one or more handwritten characters corresponds to first actionable text, the electronic device initiates (1140) a first process for performing a first operation corresponding to the first actionable text, such as display of pop-up 1022 in FIG. 10M (e.g., if the first set of characters is identified as a first actionable text, then perform the operation associated with the first actionable text). For example, if the first set of characters is identified as a first website, then in response to a selection input, display a browser application navigated to display the first website.

In some embodiments, in accordance with a determination that the first set of one or more handwritten characters corresponds to second actionable text, different from the first actionable text, the electronic device initiates (1142) a second process for performing a second operation, different from the first operation, corresponding to the second actionable text, such as display of the browser in FIG. 10O (e.g., if the first set of characters is identified as a second actionable text, then perform the operation associated with the second actionable text).

For example, if the second set of characters is identified as a second website (e.g., a different website than the first website), then in response to a selection input, display a browser application navigated to display the second website. Thus, the operation performed in response to the selection corresponds to the type of actionable text and the content of the actionable text. In some embodiments, if the actionable text is a phone number, then in response to a selection, the device displays a pop-up with options to text or call the phone number. In some embodiments, if the actionable text is an email address, then in response to a selection, the device displays an email application and composes a new email addressed to the email address. In some embodiments, if the actionable text is a street address, then in response to a selection, the device displays a map application navigated to display the address in the map user interface.

The above-described manner of performing functions corresponding to the actionable text (e.g., in response to a user input selecting the actionable handwritten characters) allows the electronic device to quickly and efficiently execute the actions of the actionable text, which simplifies the interaction between the user and the electronic device and enhances the operability of the electronic device and makes the user-device interface more efficient (e.g., without requiring additional inputs to display the appropriate application and perform the appropriate operation), which additionally reduces power usage and improves battery life of the electronic device by enabling the user to use the electronic device more quickly and efficiency, while reducing errors in usage.

In some embodiments, initiating the first process includes before performing the first operation, displaying, via the display generation component, font-based text corresponding to the first actionable text and a selectable option that, when selected, causes performance of the first operation corresponding to the first font-based text (1144), such as text 1024 in pop-up 1022 in FIG. 10M (e.g., in response to a selection of the actionable characters, display the first actionable text styled as font-based text).

In some embodiments, the font-based text is displayed in a pop-up or dialog box. Thus, the device provides the user with confirmation of the characters that are recognized. In some embodiments, display of the font-based text is performed for certain types of actionable characters and not other types of actionable characters. For example, font-based text is displayed for phone numbers (e.g., optionally on the same dialog box that includes options to text or call the phone number), but font-based text is not displayed for websites (e.g., optionally load the website without first displaying the confirmation of the website). In some embodiments, the pop-up includes a button that is selectable to initiate the process corresponding to the identified text (e.g., calling the phone number, displaying the website in the web browser, displaying the address in the map application, etc.).

The above-described manner of displaying font-based text corresponding to the actionable text (e.g., in response to a user input selecting the actionable handwritten characters) provides a quick and efficient method of confirming that the recognized characters are correct, which simplifies the interaction between the user and the electronic device and enhances the operability of the electronic device and makes the user-device interface more efficient (e.g., without requiring execution of the function before being able to confirm whether the correct characters were recognized), which additionally reduces power usage and improves battery life of the electronic device by enabling the user to use the electronic device more quickly and efficiency, while reducing errors in the usage of the device.

In some embodiments, the one or more actionable text criteria include a criterion that is satisfied when the first set of one or more handwritten characters was inputted to the content entry region using a first handwritten input tool, and is not satisfied when the first set of one or more handwritten characters was inputted to the content entry region using a second handwritten input tool, different from the first handwritten input tool (1146), such as the highlighter tool in FIG. 10W (e.g., the first set of handwritten characters satisfies the actionable text criteria if it was inputted using a tool from a predetermined set of tools that support actionable text).

Handwritten input using an input tool other than the predetermined set does not support actionable text and is not recognized as actionable. In some embodiments, the predetermined set of tools include a marker tool, a pencil tool, a pen tool, a text insertion tool. In some embodiments, tools that do not support actionable text include a highlighter tool, a crayon tool, etc.

The above-described manner of identifying actionable characters (e.g., by identifying characters that were entered using certain drawing tools but not others) allows the electronic device to quickly and efficiently identify as actionable handwritten characters that are likely intended to be interpreted as characters rather than drawings (e.g., by not identifying handwritten drawings that were input using a tool that is indicative that the user is most likely drawing rather than writing characters), which simplifies the interaction between the user and the electronic device and enhances the operability of the electronic device and makes the user-device interface more efficient (e.g., by automatically determining whether the user is likely writing words or drawing without requiring the user to perform additional inputs to enable or disable identification of characters as actionable), which additionally reduces power usage and improves battery life of the electronic device by enabling the user to use the electronic device more quickly and efficiency, while reducing errors in usage.

In some embodiments, displaying the first set of one or more handwritten characters with the visual characteristic having the first value includes displaying an underline under the first set of one or more handwritten characters (1148), such as underline 1010 in FIG. 10C (e.g., underlining the text that is actionable or otherwise interactable by the user). In some embodiments, the underline has the same visual characteristic as the first set of handwritten characters (e.g., both blue). In some embodiments, if the first set of one or more handwritten characters does not satisfy the actionable text criteria, the handwritten characters are not displayed with the underline.

In some embodiments, in accordance with a determination that a line forming the first set of one or more handwritten characters has a respective visual characteristic having a first respective value, the underline has the respective visual characteristic having a second respective value, different from the first respective value and within a threshold range of the first respective value (1150), such as in FIG. 10K (e.g., the underline does not exactly follow the contour of the first set of handwritten characters).

In some embodiments, the underline is straighter than the contour of the first set of handwritten characters. In some embodiments, the difference between the shape of the underline and the contour of the first set of handwritten characters is within a threshold amount (e.g., 5% difference, 10% difference, 15% difference, 30% difference, etc.). For example, if the handwritten character has a 50% transparency value, the underline has a 25% transparency value. In some embodiments, the style of the underline is different from the style of the handwritten characters. For example, if the handwritten characters has thick and thin portions, the underline has a constant thickness throughout that is within the threshold range of the average thickness of the handwritten character.

In some embodiments, in accordance with a determination that the line forming the first set of one or more handwritten characters has the respective visual characteristic having a third respective value, different from the first respective value, the underline has the respective visual characteristic having a fourth respective value, different from the third respective value and within the threshold range of the third respective value (1152), such as in FIG. 10K (e.g., if the contour of the handwritten characters has a third value, then the underline has a fourth value that is different than the value that the underline has if the contour of the handwritten character had a second value).

Thus, in some embodiments, the visual characteristics of the underline is different than the visual characteristics of the handwritten characters but is based on the visual characteristics of the handwritten characters so that it is clear that the underline was generated and/or displayed by the electronic device rather than being an underline drawn by the user.

The above-described manner of displaying the actionable text with an underline (e.g., with a visual characteristic different from the actionable text but within a threshold range of the visual characteristic of the actionable text) allows the electronic device to quickly and efficiently visually indicate that the underline is computer generated and not drawn by the user, and thus that the handwritten input has been recognized as actionable, which simplifies the interaction between the user and the electronic device and enhances the operability of the electronic device and makes the user-device interface more efficient (e.g., by providing visual indication that the actionable text has been modified to be actionable by the device), which additionally reduces power usage and improves battery life of the electronic device by enabling the user to use the electronic device more quickly and efficiency, while reducing errors in usage.

In some embodiments, while the first set of one or more handwritten characters was in the content entry region, and before displaying the first set of one or more handwritten characters with the visual characteristic having the first value, the electronic device displays (1154) the first set of one or more handwritten characters with the visual characteristic having the second value, such as in FIG. 10R (e.g., before the first set of handwritten characters is recognized as actionable text and/or before the visual characteristic of the first set of handwritten characters is modified to have the first value to indicate that the first set is actionable text).

In some embodiments, while displaying the first set of one or more handwritten characters with the visual characteristic having the second value, the electronic device detects (1156) a navigation input, such as in FIG. 10S (e.g., a user input scrolling the user interface, displaying another user interface, or otherwise interacting with a user interface element other than the content entry region).

In some embodiments, in response to detecting the navigation input and in accordance with the determination that the first set of one or more handwritten characters satisfies the one or more actionable text criteria, the electronic device updates (1158) the display of the first set of one or more handwritten characters to have the visual characteristic having the first value, such as in FIG. 10T (e.g., perform the determination of whether the first set of characters satisfies the one or more actionable text criteria).

In some embodiments, the determination of whether the first set of characters satisfies the one or more actionable text criteria is performed after not receiving an input after a threshold amount of time (e.g., 0.05 seconds, 0.1 seconds, 0.25 seconds, 0.5 seconds, 1 second, 2 seconds, 3 seconds, 5 seconds, 10 seconds, etc.). In some embodiments, as described above, if the actionable text criteria is satisfied, the first set of characters is updated to have the visual characteristic having the first value. If the actionable text criteria is not satisfied, the first set of characters is not updated and the visual characteristic is maintained at its value when the input was received (e.g., its original value before and/or when the determination was performed).

The above-described manner of identifying handwritten characters as actionable (e.g., by performing the detection of actionable characters in response to detecting a navigation input) allows the electronic device to quickly and efficiently perform detection of actionable characters (e.g., in response to a navigation input when it is likely that the user has completed inputting characters), which simplifies the interaction between the user and the electronic device and enhances the operability of the electronic device and makes the user-device interface more efficient (e.g., by automatically identifying actionable characters without requiring the user to perform additional inputs to trigger detection of actionable characters), which additionally reduces power usage and improves battery life of the electronic device by enabling the user to use the electronic device more quickly and efficiency, while reducing errors in usage.

In some embodiments, the first set of one or more handwritten characters corresponds to a first string of text, the one or more actionable text criteria include a criterion that is satisfied when the first string of text corresponds to a first type of text string, and is not satisfied when the first string of text does not correspond to the first type of text string (1160), such as sentence 1008 as opposed to sentence 1006 in FIG. 10C (e.g., the first set of handwritten characters are identified are actionable if the characters match a predetermined pattern of characters).

In some embodiments, the predetermined pattern of characters are associated with one or more applications. In some embodiments, the predetermined pattern of characters are associated with one or more functions executable by the one or more applications. For example, a string of seven or ten numbers is recognizable as a phone number (optionally the pattern for phone numbers depends on the pattern of phone numbers for the particular country or geographic location) and is selectable to call or send text message using a phone application. In another example, a string of characters is recognizable as an address and is selectable to display the address on a map application. In another example, a string of characters followed by "@" followed by another string of characters ending in ".com", ".net", ".org" or any other valid domain extension is recognizable as an email address. In another example, a string of characters that includes "www" or "http", followed by a string of characters ending in ".com", ".net", ".org" or any other valid domain extension (optionally with another string of characters after the domain extension) is recognizable as a website (e.g., a web address).

The above-described manner of identifying actionable handwritten characters (e.g., by identifying characters that match certain predetermined criteria as actionable but not characters that do not match the criteria) allows the electronic device to quickly and efficiently identify characters as actionable, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, the content entry region further includes one or more font-based text characters in addition to the one or more handwritten characters (1162), such as sentence 1038 in FIG. 10CC (e.g., the content entry region is a mixed content entry region that supports font-based text as well as handwritten content, such as drawings).

In some embodiments, the font-based text is text that was inserted using a text entry tool (e.g., as handwritten characters) and converted into font-based text. In some embodiments, the font-based text is pre-existing text. In some embodiments, the handwritten characters are characters that were entered using a text entry tool and have not been converted into font-based text yet. In some embodiments, the text entry tool is a tool that, when selected, configures the device (e.g., sets the device into a text entry mode) to receive handwritten input and convert the handwritten into font-based text. In some embodiments, while in text entry mode, handwritten inputs are analyzed, identifiable characters are identified, and the identifiable characters are then converted into font-based text. In some embodiments, the handwritten characters are characters that were entered using a drawing tool other than the text entry tool, such as a pencil tool, pen tool, etc.

In some embodiments, in accordance with a determination that the one or more font-based text characters satisfy one or more second actionable text criteria, the one or more font-based text characters are displayed with a respective visual characteristic having a first respective value (1164), such as sentence 1038 in FIG. 10CC (e.g., the font-based text is also recognizable as actionable text and if the font-based text satisfies the actionable text criteria, then the font-based text is displayed with the first respective characteristic having the first respective value (e.g., displayed with a particular color and/or with an underline)). In some embodiments, the one or more second actionable text criteria include a requirement that the font-based text match one or more predetermined patterns (optionally similar to or the same as the predetermined patterns of the actionable text criteria).

In some embodiments, in accordance with a determination that the one or more font-based text characters do not satisfy the one or more second actionable text criteria, the one or more font-based text characters are displayed with the respective visual characteristic having a first respective value, different from the first respective value (1166) (e.g., if the font-based text does not satisfy the second actionable text criteria, then the font-based text has its default visual characteristic).

Thus, in some embodiments, the device is able to determine whether font-based text and handwritten characters in the same content entry region are actionable and modify their visual characteristics appropriately. In some embodiments, the visual characteristics of handwritten characters that have been identified as actionable and the visual characteristics of font-based text that have been identified as actionable are the same. For example, actionable handwritten characters are displayed with a blue color and a blue underline and actionable font-based text are also displayed with the same blue color and a blue underline. In some embodiments, the visual characteristics of handwritten characters that have been identified as actionable and the visual characteristics of font-based text that have been identified as actionable are different. In some embodiments, the visual characteristics of handwritten characters that have been identified as actionable are different from the visual characteristics of handwritten characters that have not been identified as actionable (optionally only after the actionable text criteria are satisfied). In some embodiments, the visual characteristics of font-based text that have been identified as actionable are different from the visual characteristics of font-based text that have not been identified as actionable (optionally only after the second actionable text criteria are satisfied).

The above-described manner of identifying actionable characters (e.g., regardless of whether the characters are font-based or handwritten) allows the electronic device to quickly and efficiently identify characters that are actionable, which simplifies the interaction between the user and the electronic device and enhances the operability of the electronic device and makes the user-device interface more efficient (e.g., without requiring conversion of handwritten characters into font-based text or vice versa for the device to identify the characters as actionable), which additionally reduces power usage and improves battery life of the electronic device by enabling the user to use the electronic device more quickly and efficiency, while reducing errors in usage.

In some embodiments, while the first set of one or more handwritten characters do not satisfy the one or more actionable text criteria and while displaying the first set of one or more handwritten characters with the visual characteristic having the second value (e.g., the first set of handwritten characters are identified as not actionable and thus have their default visual characteristic), the electronic device detects (1168) a first handwriting input directed to the content entry region that modifies the first set of one or more handwritten characters to create a first modified set of one or more handwritten characters, such as in FIG. 10F (e.g., the first handwriting input adds to, erases from, or otherwise modifies the first set of handwritten characters). For example, the first handwriting input removes characters, adds new characters, or replaces characters in the first set with other characters.

In some embodiments, in response to detecting the first handwriting input (1170), the electronic device modifies (1172) the first set of one or more handwritten characters to be the first modified set of one or more handwritten characters (e.g., modifying the first set in accordance with the handwritten input) and in accordance with a determination that the first modified set of one or more handwritten characters satisfies the one or more actionable text criteria, the electronic device displays (1174) the first modified set of one or more handwritten characters with the visual characteristic having the first value, such as in FIG. 10G (e.g., if the modified set of handwritten characters now satisfies the actionable text criteria, then modify the visual characteristic of the modified first set to have the first value).

For example, if the handwritten input changes the first set such that it is now recognized as an actionable set of characters (e.g., completing an address, removing extraneous digits from what would otherwise have been a phone number, etc.), then the device recognizes the modified set as actionable. In some embodiments, if the modified set does not satisfy the one or more actionable text criteria (e.g., remains un-actionable), then the device maintains the visual characteristic having the second value and does not modify the visual characteristic to have the first value.

The above-described manner of identifying actionable handwritten characters (e.g., by reverting the visual characteristic of handwritten characters to its default visual characteristic in response to input modifying the handwritten characters and re-distinguishing the handwritten characters if the modification maintains the actionability of the characters) allows the electronic device to quickly and efficiently re-detect actionable characters after the user modifies previously identified actionable characters, which simplifies the interaction between the user and the electronic device and enhances the operability of the electronic device and makes the user-device interface more efficient (e.g., without requiring the user to remove the entire string of actionable characters and re-inserting the modified string to trigger detection of the modified string as actionable), which additionally reduces power usage and improves battery life of the electronic device by enabling the user to use the electronic device more quickly and efficiency, while reducing errors in usage.

In some embodiments, after detecting the first handwriting input and while the first modified set of one or more handwritten characters are displayed with the visual characteristic having the second value (e.g., the first modified set of handwritten characters are identified as actionable and thus have a visual characteristic with a second value), the electronic device detects (1176) a second handwriting input directed to the content entry region that modifies the first modified set of one or more handwritten characters to create a second modified set of one or more handwritten characters, such as in FIG. 10Q (e.g., the second handwriting input adds to, erases from, or otherwise modifies the first modified set of handwritten characters). For example, the second handwriting input removes characters, adds new characters, or replaces characters in the first modified set with other characters.

In some embodiments, in response to detecting the second handwriting input (1178), the electronic device modifies (1180) the first modified set of one or more handwritten characters to be the second modified set of one or more handwritten characters (e.g., modifying the first modified set in accordance with the handwritten input), and in accordance with a determination that the second modified set of one or more handwritten characters does not satisfy the one or more actionable text criteria, the electronic device displays (1182) the second modified set of one or more handwritten characters with the visual characteristic having the second value, such as in FIG. 10R (e.g., if the newly modified set of handwritten characters now does not satisfy the actionable text criteria, then modify the visual characteristic of the second modified first set to have the second value).

For example, if the handwritten input changes the first modified set such that it is now no longer recognized as an actionable set of characters (e.g., removing essential digits from a phone number, etc.), then the device determines that the second modified set is no longer actionable. In some embodiments, if the second modified set does continue to satisfy the one or more actionable text criteria (e.g., remains actionable), then the device maintains the visual characteristic having the first value and does not modify the visual characteristic to have the second value.

The above-described manner of identifying actionable handwritten characters (e.g., by reverting the visual characteristic of handwritten characters to its default visual characteristic in response to input modifying the handwritten characters and maintaining the default visual characteristic if the modification is no longer actionable) allows the electronic device to quickly and efficiently remove the actionability of characters when a user modifies previously identified actionable characters (e.g., without requiring the user to remove the entire string and re-insert the modified string in order to remove the actionability of the string of characters), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

It should be understood that the particular order in which the operations in FIGS. 11A-11I have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1300, 1500, and 1700) are also applicable in an analogous manner to method 1100 described above with respect to FIGS. 11A-11I. For example, the operations of the electronic device identifying actionable text within handwritten content described above with reference to method 1100 optionally have one or more of the characteristics of selecting and providing for interaction with handwritten content, generating normalized shapes based on handwritten inputs, presenting tutorials for text manipulation operations, displaying visual feedback of text manipulation operations, selecting units of content, etc., described herein with reference to other methods described herein (e.g., methods 700, 900, 1300, 1500, and 1700). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5I) or application specific chips. Further, the operations described above with reference to FIGS. 11A-11I are, optionally, implemented by components depicted in FIGS. 1A-1B. For example, displaying operations 1102, 1126, 1130, 1154, 1174, 1182, and detecting operations 1110, 1114, 1136, 1156, 1168, and 1176 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Presenting Tutorials of Text Manipulation Operations

Users interact with electronic devices in many different manners, including performing manipulation operations on text, such as selecting, deleting, inserting, etc. In some embodiments, an electronic device receives inputs from a handwriting input device such as a stylus and performs corresponding manipulation operations based on the input received from the handwriting input device. The embodiments described below provide ways in which an electronic device displays tutorials of how to perform respective manipulation operations using a handwritten input device (e.g., a stylus), thus enhancing the user's interactions with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 12A-12LLL illustrate exemplary ways in which an electronic device presents tutorials for text manipulation operations. The embodiments in these figures are used to illustrate the processes described below, including the processes described with reference to FIGS. 13A-13F.

Figure 12A:
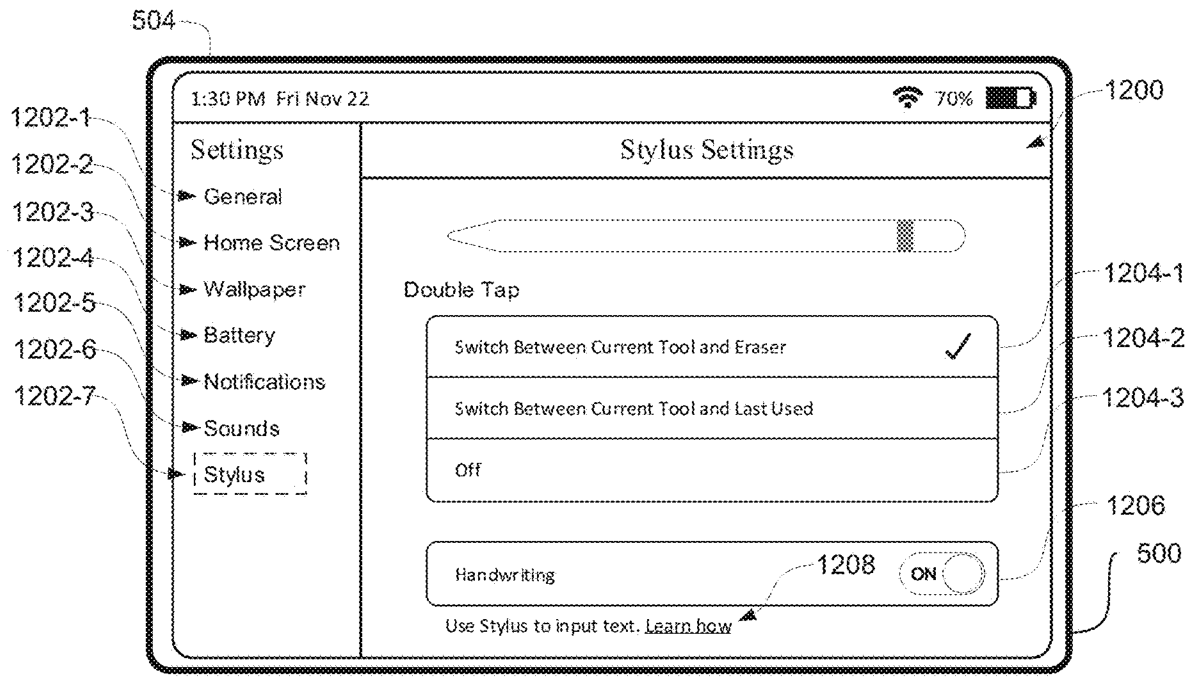
FIGS. 12A-12LLL illustrate exemplary ways in which an electronic device presents tutorials for text manipulation operations in accordance with some embodiments.

FIGS. 12A-12LLL illustrate operation of the electronic device 500 for presenting tutorials for text manipulation operations. FIG. 12A illustrates electronic device 500 displaying user interface 1200 (e.g., via a display device, via a display generation component, etc.). In some embodiments, user interface 1200 is displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500.

In some embodiments, user interface 1200 is a settings user interface for viewing, changing, or otherwise managing one or more settings for device 500. For example, in FIG. 12A, user interface 1200 includes one or more settings categories 1202-1 to 1202-7 corresponding to settings for different functions of device 500 (e.g., General settings, Home Screen settings, Wallpaper settings, etc.). It is understood that the categories shown in FIG. 12A is merely exemplary and there can be more or fewer settings than those shown. In FIG. 12A, settings category 1202-7 corresponding to stylus settings has a focus and thus user interface 1200 includes one or more settings options for a stylus (e.g., a handwriting input device). For example, user interface 1200 includes options 1204-1, 1204-2 and 1204-3 for configuring the behavior of the stylus when a double-tap input is received on the stylus. In FIG. 12A, option 1204-1 is selected indicating that when a double-tap input is received on the stylus, device 500 switches toggles the stylus drawing mode between an erasing mode and the tool that was active when the double-tap input was initially received.

In FIG. 12A, user interface 1200 includes setting option 1206 corresponding to a handwriting input setting. In some embodiments, enabling the handwriting input setting configures device 500 to accept inputs from a stylus (e.g., contacts by stylus with touch screen 504), recognize the inputs from the stylus as handwritten text characters, and optionally convert the handwritten text characters into font-based text (e.g., digital text, text that is visually styled based on a font or typeface, etc.). In some embodiments, enabling the handwritten input setting additionally or alternatively configures device 500 to receive inputs from a stylus, recognize the inputs as a request to perform a text manipulation operation, and perform the text manipulation operation. Examples of text manipulation operations are selection operations, deletion operations, insertion operations, etc. In some embodiments, disabling the handwritten input setting configures device 500 to not recognize inputs from the stylus as handwritten text characters and/or not convert the handwritten text characters into font-based text. Similarly, disabling the handwritten input setting configures device 500 to not recognize inputs as requests to perform text manipulation operations.

As shown in FIG. 12A, setting option 1206 is enabled, thus enabling the stylus features discussed above. User interface 1200 optionally includes a selectable option 1208 that is selectable to present one or more tutorials for the one or more operations that are available due to enabling setting option 1206. In some embodiments, selectable option 1208 is only displayed when setting option 1206 is enabled. In some embodiments, selectable option 1208 is displayed even if setting option 1206 is disabled. Other methods of causing display of the one or more tutorials are possible. For example, the one or more tutorials may be automatically displayed in response to the first time a user enables settings option 1206 or the first time that a stylus input device is connected to (e.g., paired with) device 500.

Figure 12B:
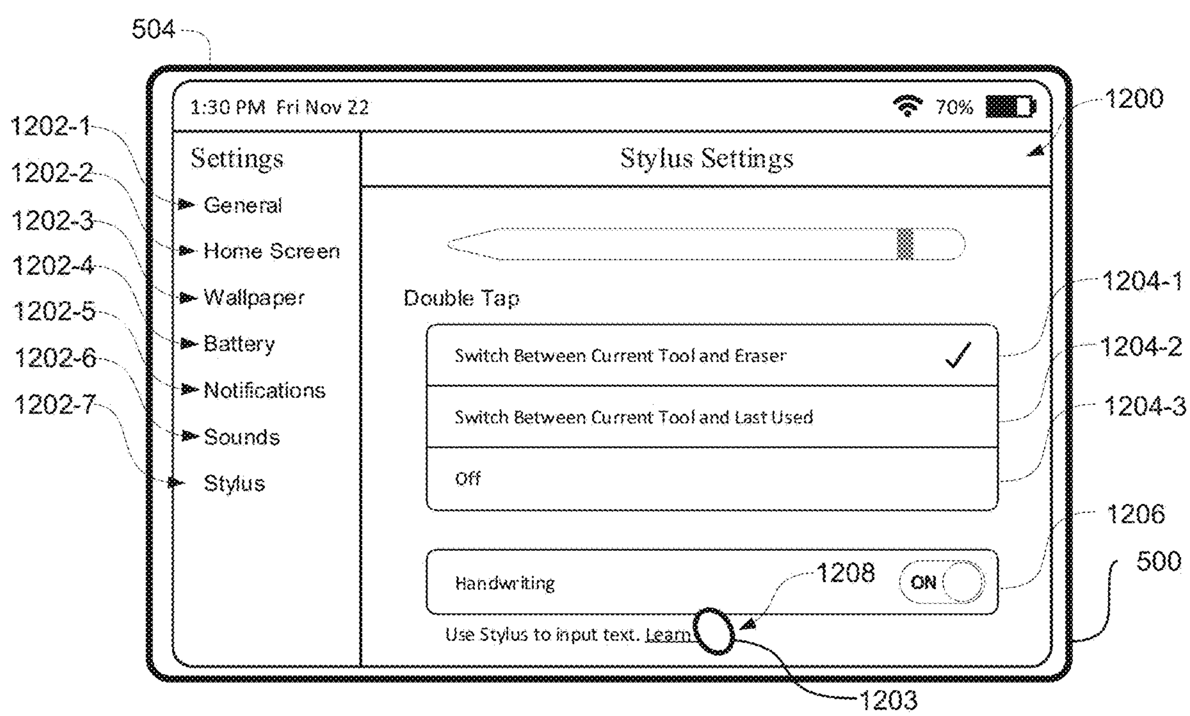
Figure 12C:
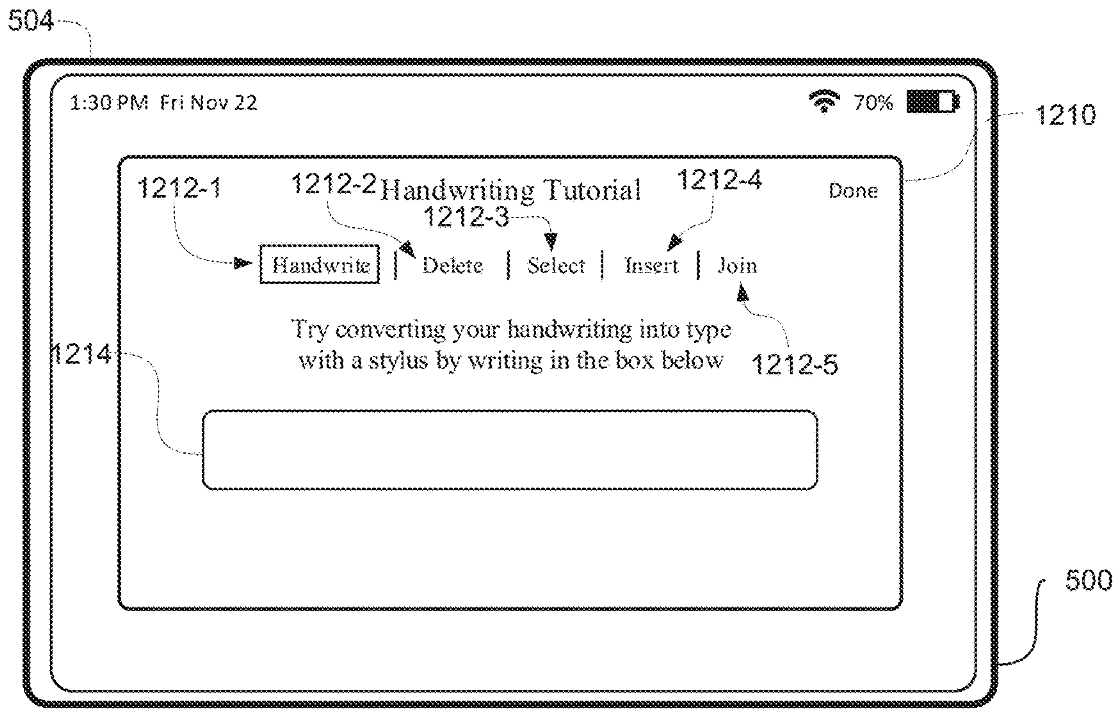

In FIG. 12B, a user input 1203 is received selecting selectable option 1208. In some embodiments, in response to user input 1203, device 500 displays user interface 1210, as shown in FIG. 12C. In some embodiments, user interface 1210 is overlaid over the user interface that was displayed before user interface 1210 was displayed (e.g., user interface 1200).

In FIG. 12C, user interface 1210 includes a plurality of "tabs" or "pages" that correspond to different text manipulation operations. In some embodiments, a respective "tab" displays a tutorial for its respective text manipulation operation(s). For example, in FIG. 12C, user interface 1210 includes a handwriting tab 1212-1, deletion tab 1212-2, selection tab 1212-3, insertion tab 1212-4, and join tab 1212-5. Thus, in the embodiment illustrated in FIG. 12C, user interface 1210 displays tutorials for the handwriting operation, deletion operation, selection operation, insertion operation, and join operation. It is understood that more or fewer tutorials for more or fewer operations are possible.

In FIG. 12C, handwriting tab 1212-1 is currently selected and user interface 1210 is configured to display a tutorial of the handwriting operation. User interface 1210 optionally includes content entry region 1214. Content entry region 1214 is a user interface element that is able to accept and display text (e.g., font-based text, handwritten input, etc., inserted into the content entry region via a soft keyboard, a physical keyboard, a stylus, etc.). In some embodiments, a user is able to write text using a stylus input device into a content entry region (e.g., such as content entry region 1214). Based on the handwritten input, device 500 is able to recognize the characters, words, sentences, etc. in the user's input and convert the handwritten input into font-based text. For example, as the user is performing the input in a content entry region, a representation of the user's input is "drawn" into the content entry region. In some embodiments, after the user completes the input (or optionally while the user is still performing the input), device 500 is able to recognize the characters in the handwritten input and convert the handwritten text into font-based text. In some embodiments, converting the handwritten text into font-based text includes displaying an animation of the handwritten text becoming font-based text.

Figure 12D:
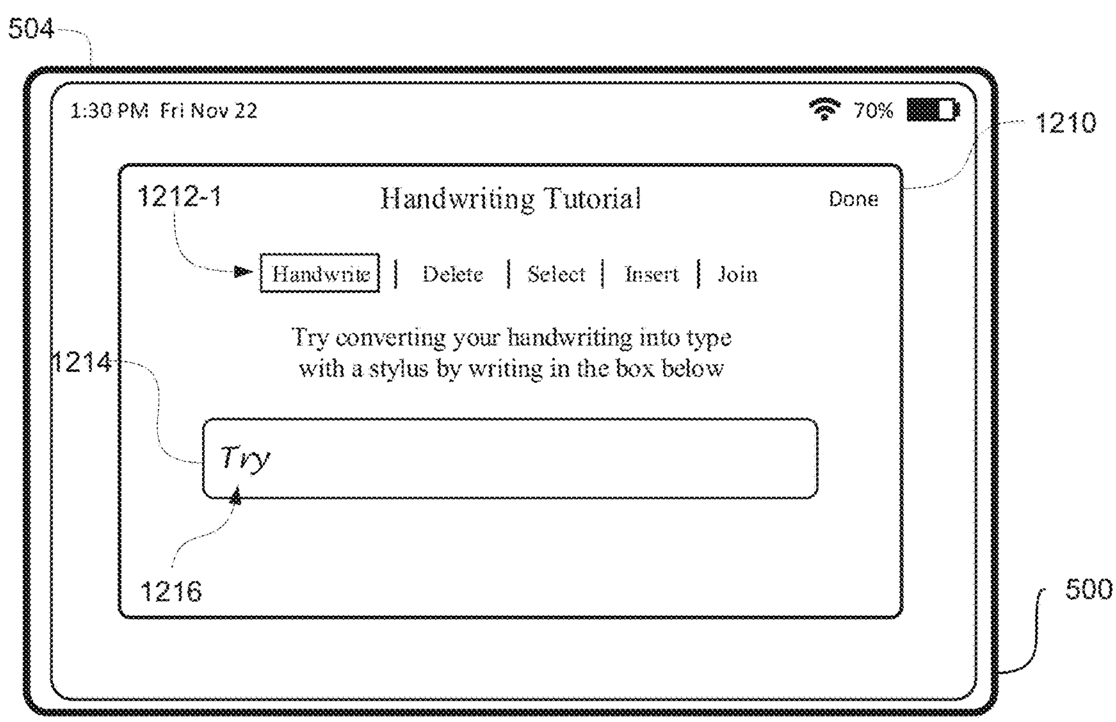
Figure 12E:
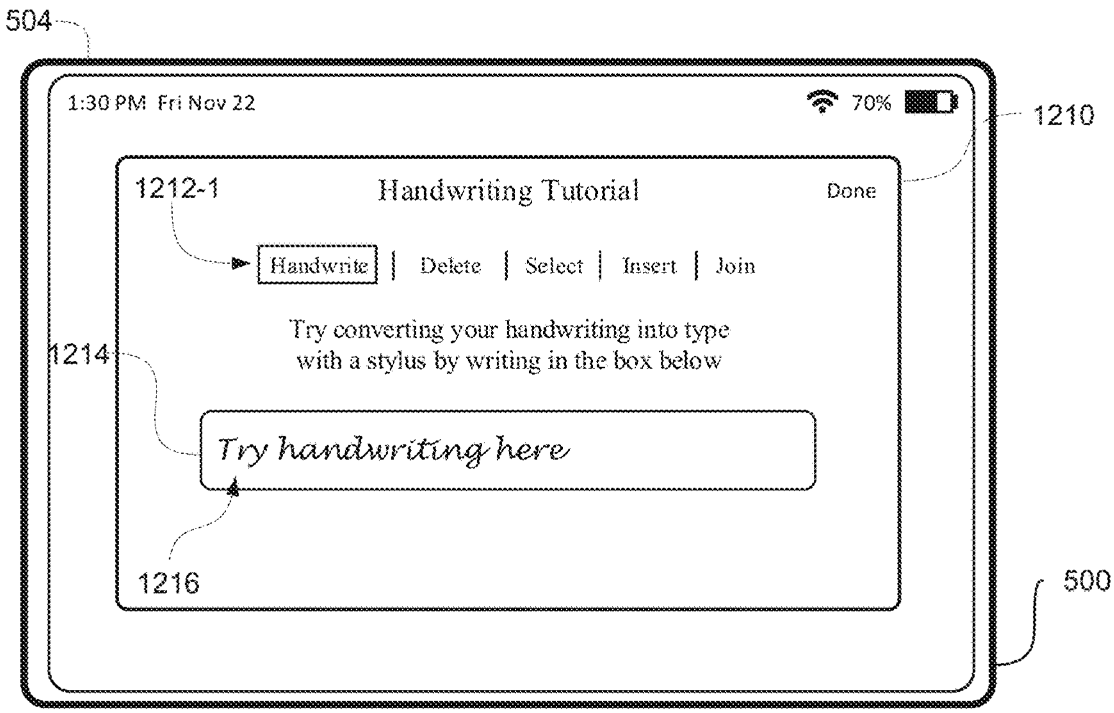
Figure 12F:
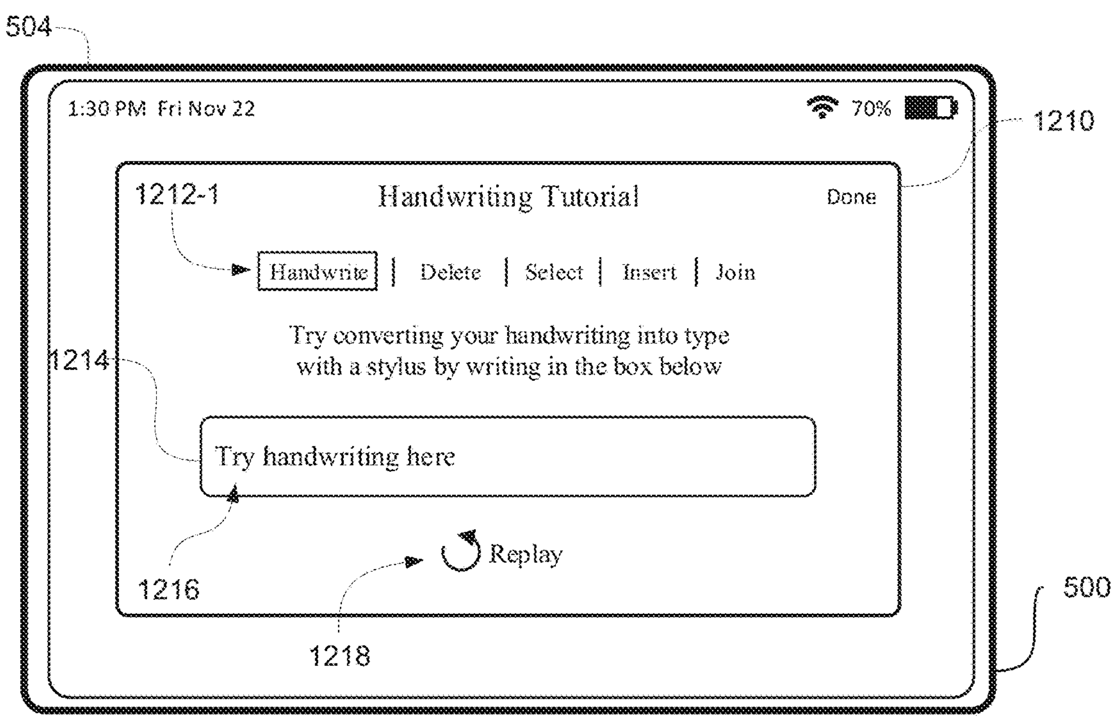

In FIG. 12C, upon display of user interface 1210, a tutorial for performing a handwriting operation (e.g., converting handwritten inputs into font-based text) is automatically displayed. In some embodiments, the tutorial includes displaying an animation demonstrating the respective handwriting operation. For example, in FIG. 12C, content entry region 1214 begins as an empty text box. In FIG. 12D, device 500 displays an animation of text 1216 being written into content entry region 1214. In some embodiments, text 1216 is styled as if it were written using a stylus (e.g., is not font-based text). In FIG. 12E, the animation continues and text 1216 is expanded to read "Try handwriting here". As shown in FIG. 12E, text 1216 is styled as if it were written using a stylus and instructs the user to write into content entry region 1214 (e.g., using a stylus input device). In FIG. 12E, after the animation of text 1216 being written into content entry 1214 completes, device 500 displays an animation of text 1216 converting from being styled as handwritten text to being styled as font-based text, as shown in FIG. 12F. Thus, device 500 displays a demonstration that if a user performs a handwritten input in a content entry region that is recognizable as characters, device 500 is able to convert the handwritten input into font-based text. In some embodiments, when the animation of the tutorial ends, replay affordance 1218 is displayed in user interface 1210, which is selectable to restart the tutorial animation.

Figure 12G:
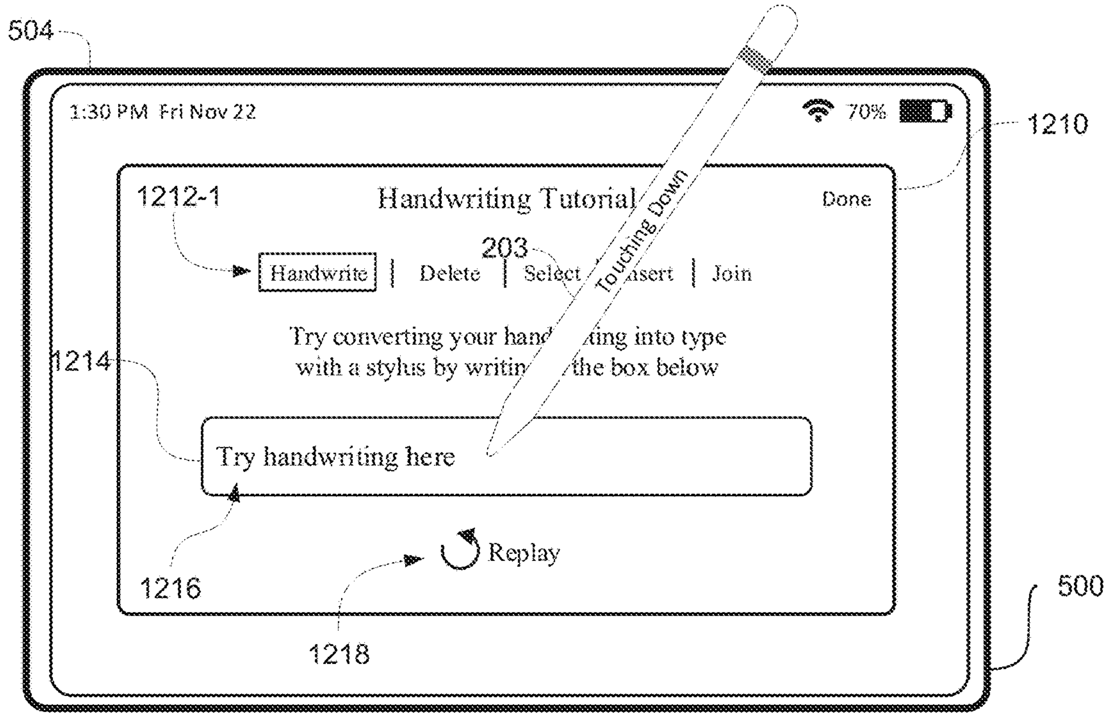
Figure 12H:
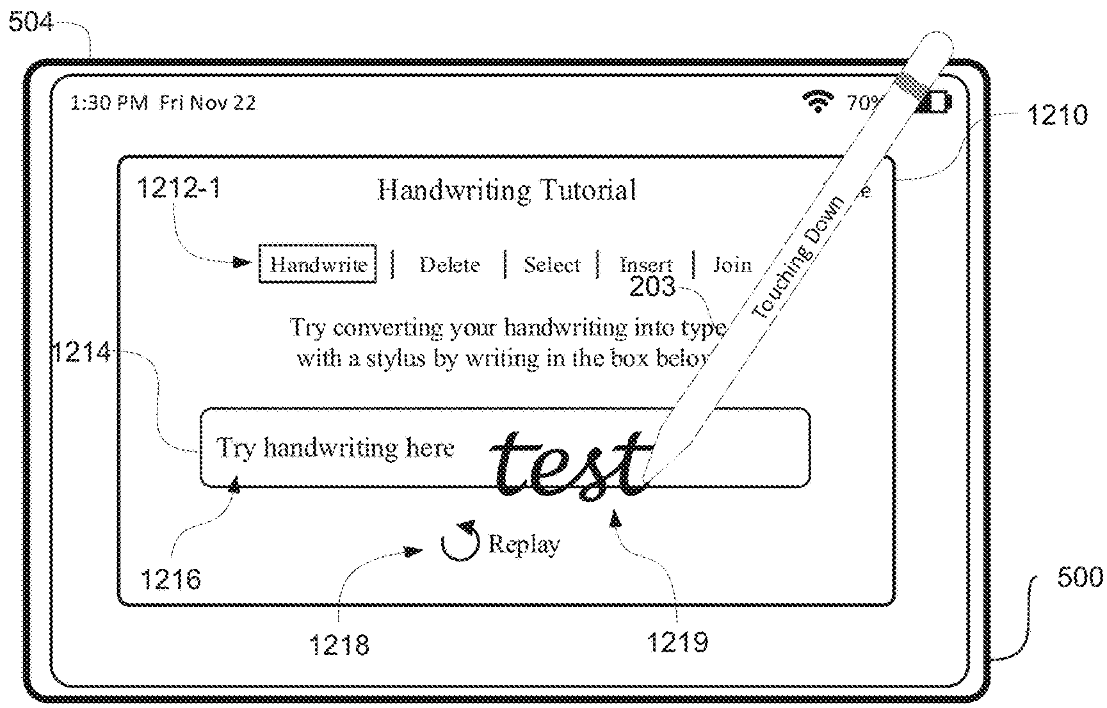
Figure 12I:
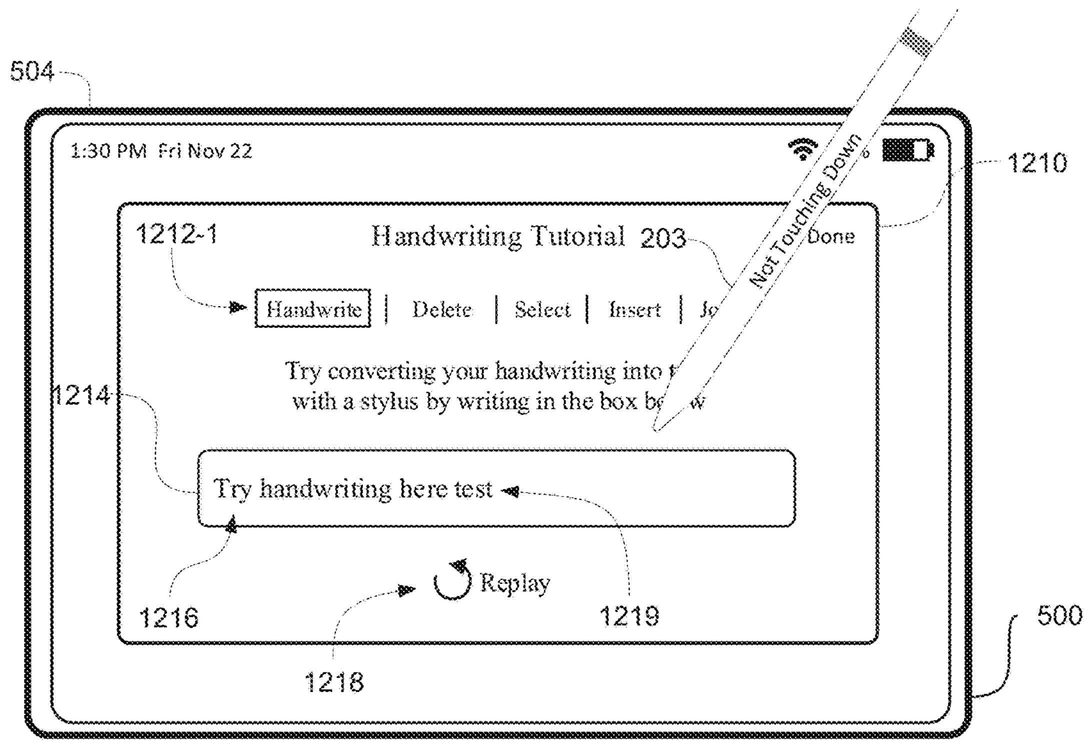

In FIG. 12G, a contact by stylus 203 on touch screen 504 is received on content entry region 1214. In FIG. 12H, while maintaining contact with touch screen 504, a movement by stylus 203 is detected writing the word 1219 "test" into content entry region 1214. As shown, while receiving the input from stylus 203, device 500 displays a representation of the input (e.g., displays the user's "drawing" at the location that it was received, as it is received). In FIG. 12H, at least a portion of word 1219 is drawn in content entry region and at least a portion of word 1219 is drawn outside of the boundary of content entry region 1214. In some embodiments, device 500 is able to determine that the handwritten user input is directed to content entry region 1214 even though a portion of word 1219 is drawn outside of the boundary of content entry region 1214 (e.g., if less than 5% of the word is outside of the boundary, less than 10%, 20%, 30%, 50%, 70%, etc.). In some embodiments, after detecting termination of the handwritten input (e.g., after detecting a lift-off of the contact by stylus 203 with touch screen 504), device 500 recognizes word 1219 as valid characters and converts word 1219 into font-based text, as shown in FIG. 12I. In some embodiments, converting word 1219 into font-based text includes displaying an animation of word 1219 changing into font-based text. In some embodiments, word 1219 is converted to font-based text after a threshold time period (e.g., 0.1 seconds after the termination of the input, 0.5 seconds, 1 second, 3 seconds, 5 seconds, 10 seconds, etc.). As shown in FIG. 12I, word 1219 is aligned with text 1216 upon conversion into font-based text.

Figure 12J:
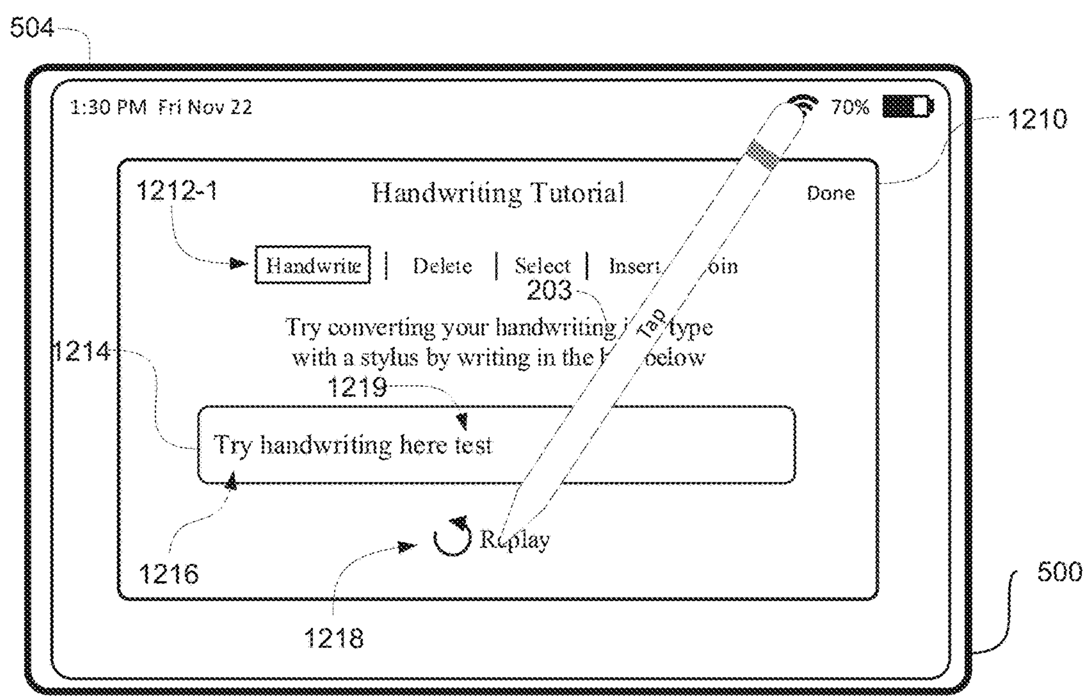
Figure 12K:
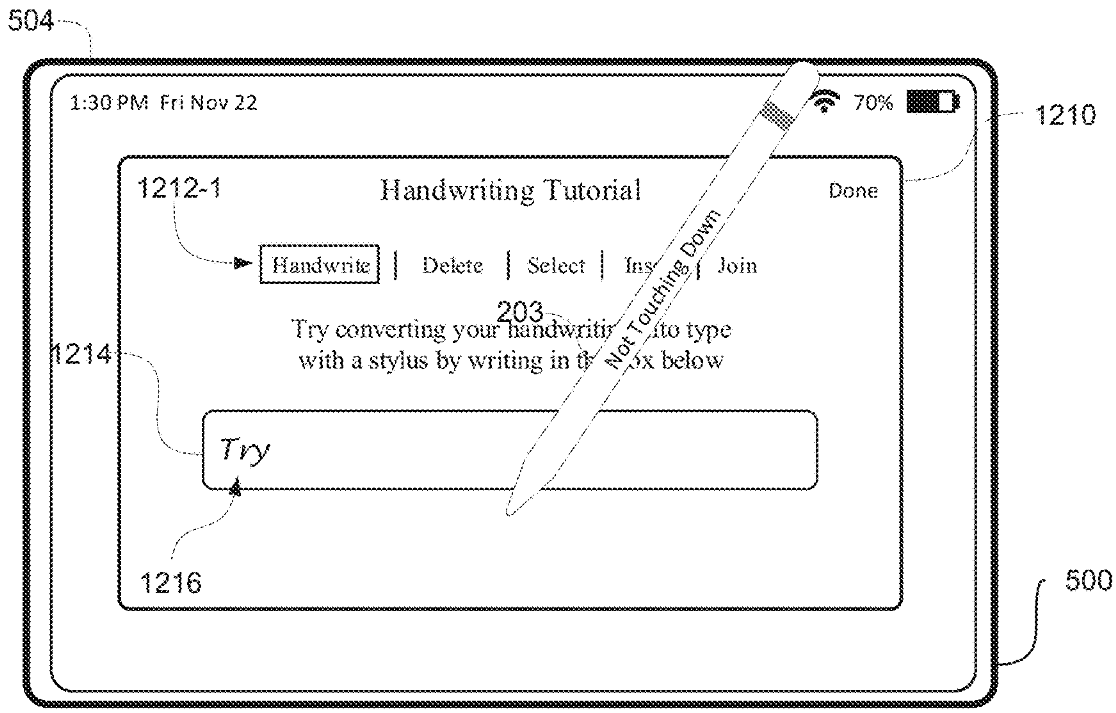

In FIG. 12J, a user input is received from stylus 203 selecting replay affordance 1218. It is understood that replay affordance 1218 need not be selected using stylus 203 and can be selected wither other suitable input devices and/or a finger. In some embodiments, in response to the user input, device 500 replays the tutorial animation, as shown in FIG. 12K. Replaying the tutorial animation optionally includes removing the content from content entry region 1214 (including word 1219 that was inserted by the user) and displaying the tutorial animation from the beginning. For example, in FIG. 12K, device 500 displays an animation of text 1216 being written into content entry region 1214 (e.g., similarly to the animation of text 1216 being written into the content entry region in FIG. 12D).

Figure 12L:
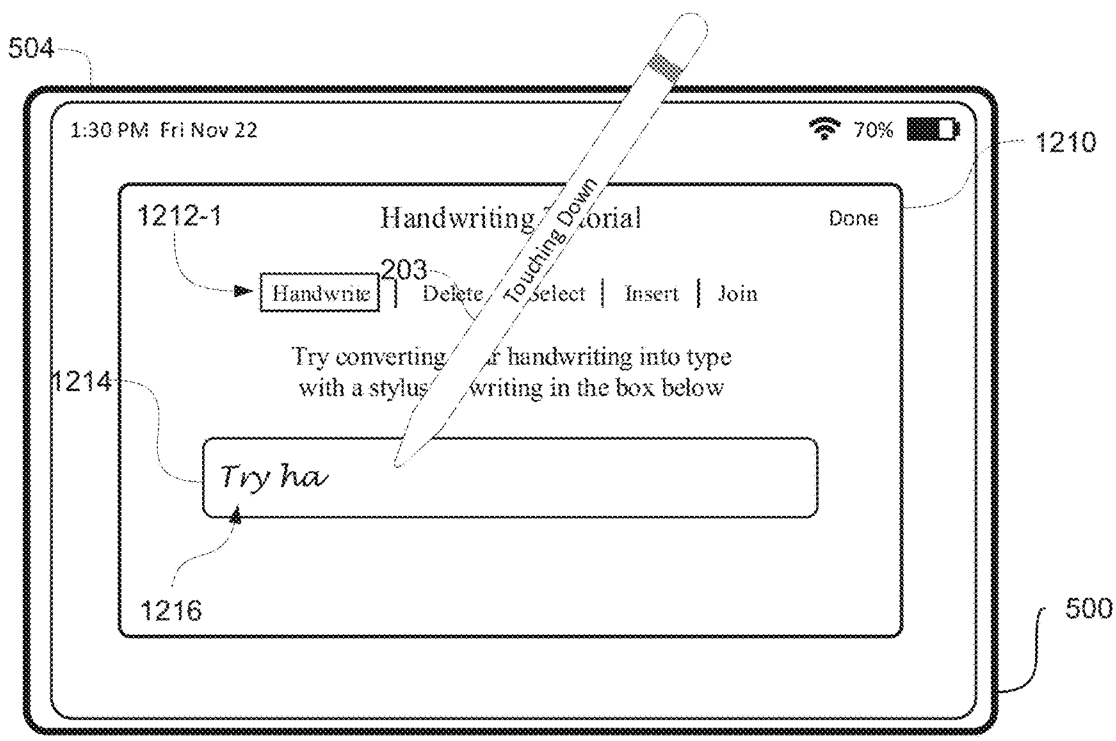
Figure 12M:
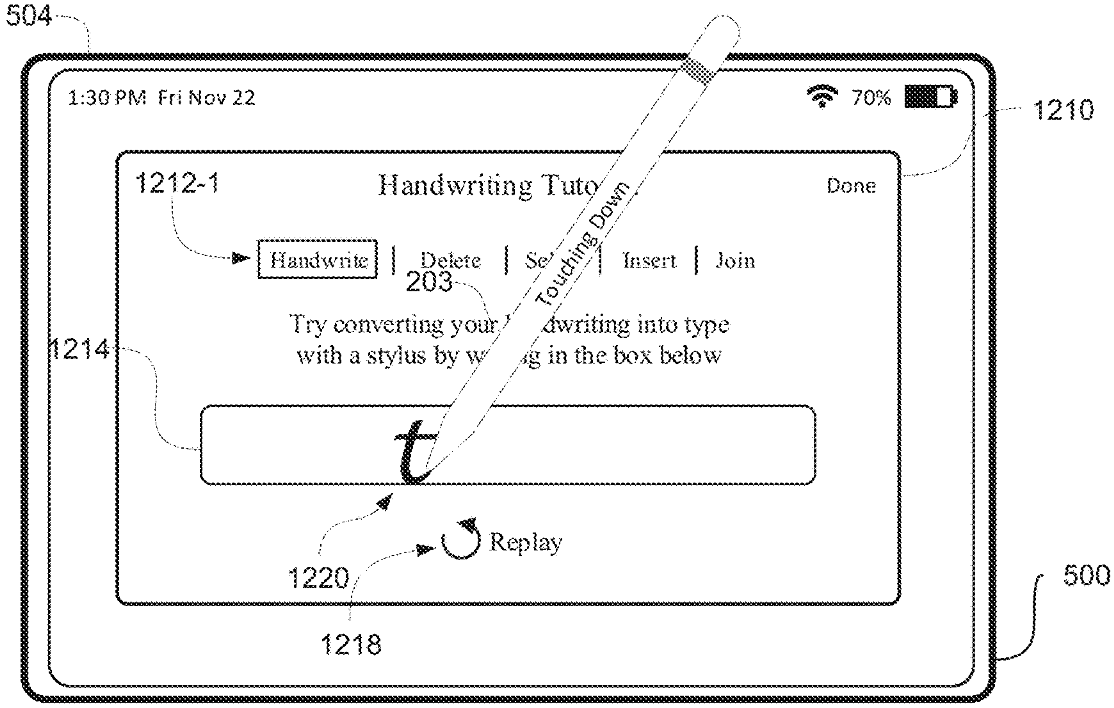
Figure 12N:
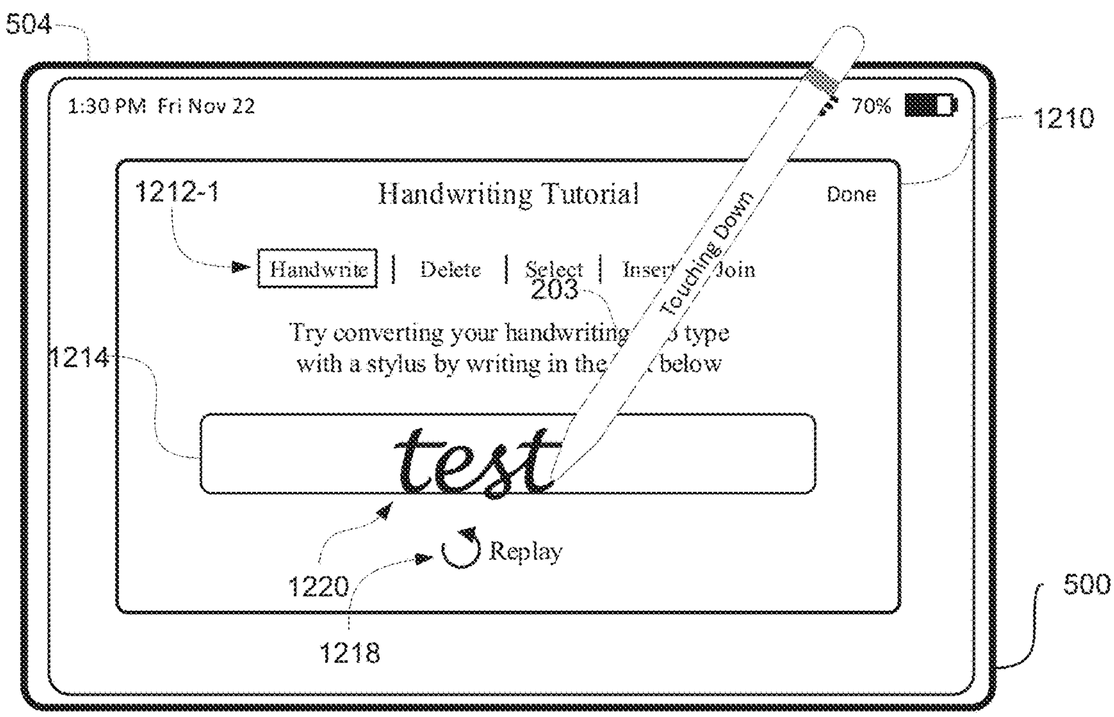

In FIG. 12L, as the animation of text 1216 being written into content entry region 1214 is in progress (e.g., text 1216 is still in the process of being written), a contact by stylus 203 is received on content entry region 1214. In some embodiments, in response to the contact by stylus 203, device 500 terminates the animation and removes text 1216 (e.g., the text that has been written so far) from content entry region, as shown in FIG. 12M. In some embodiments, replay affordance 1218 is displayed because the tutorial animation has terminated. In FIGS. 12M-12N, as the user performs handwritten input, word 1220 is drawn into content entry region 1214 in accordance with the user input. In FIG. 120, after detecting termination of the handwritten input (e.g., after detecting a lift-off of the contact by stylus 203 with touch screen 504), device 500 recognizes word 1220 as valid characters and converts word 1220 into font-based text, as shown in FIG. 120. In some embodiments, word 1220 is left-aligned with content entry region 1214 upon conversion. In some embodiments, word 1220 is displayed at the same location as the input (e.g., near the center of content entry region 1214). Thus, in some embodiments, interrupting a tutorial animation while the animation is in progress causes the content inserted into the content entry region by the tutorial to be removed from the content entry region.

Figure 12O:
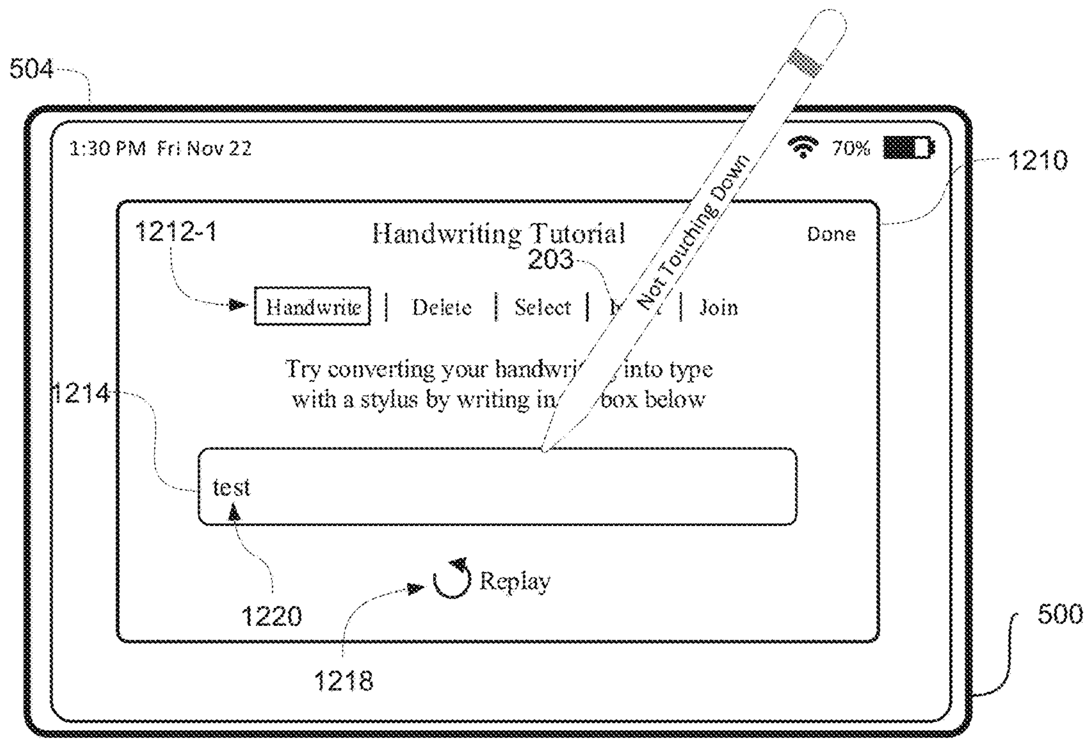
Figure 12P:
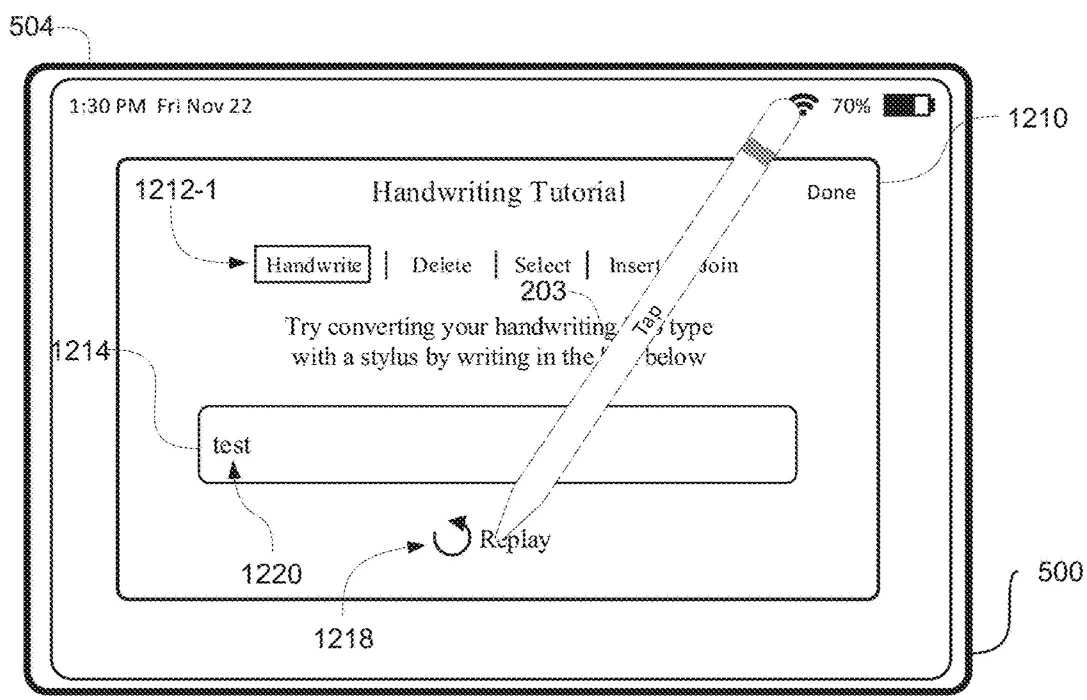
Figure 12Q:
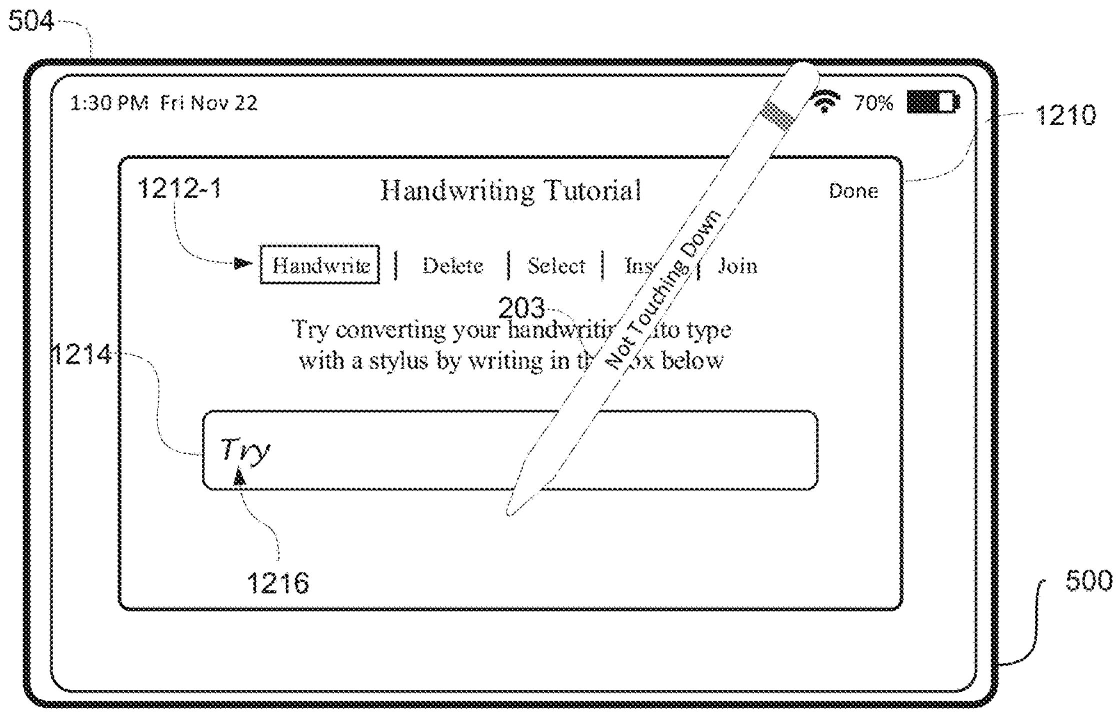

FIGS. 12P-12U illustrate an alternative embodiment in which interrupting a tutorial animation does not cause the content inserted by the tutorial to be removed. In FIG. 12P, a user input is received from stylus 203 selecting replay affordance 1218. In some embodiments, in response to the user input, device 500 replays the tutorial animation, as shown in FIG. 12Q. In FIG. 12K, device 500 begins displaying the animation of text 1216 being written into content entry region 1214 (e.g., similarly to the animation of text 1216 being written into the content entry region in FIG. 12D).

Figure 12R:
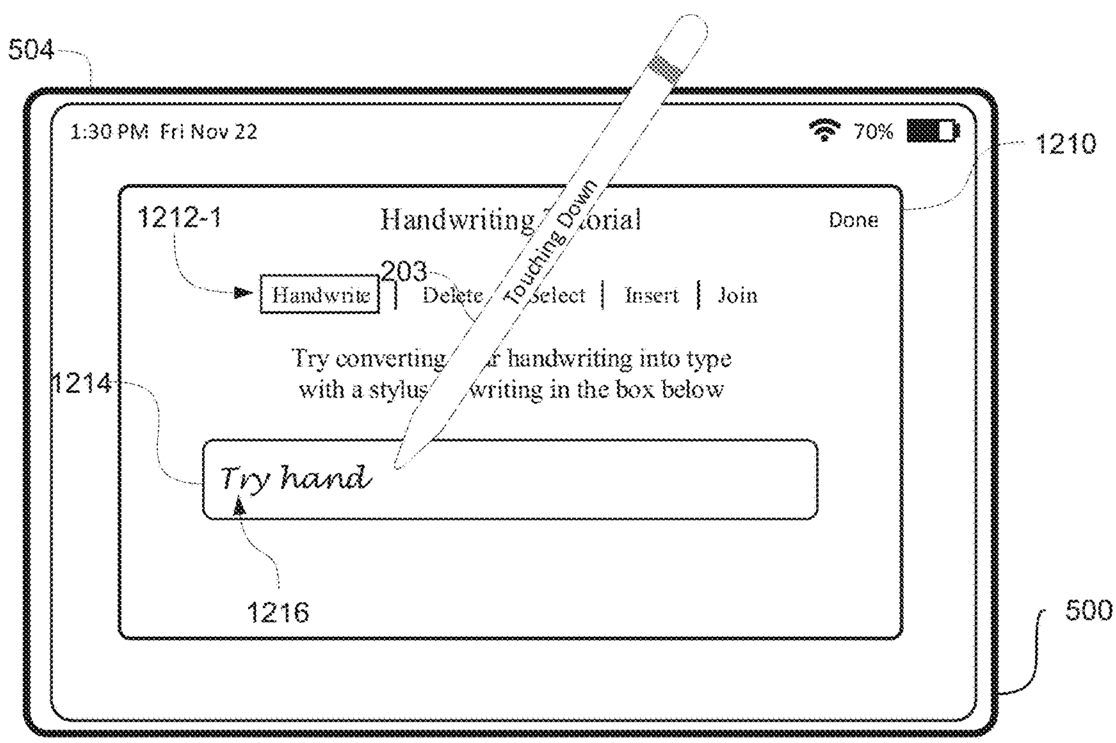
Figure 12S:
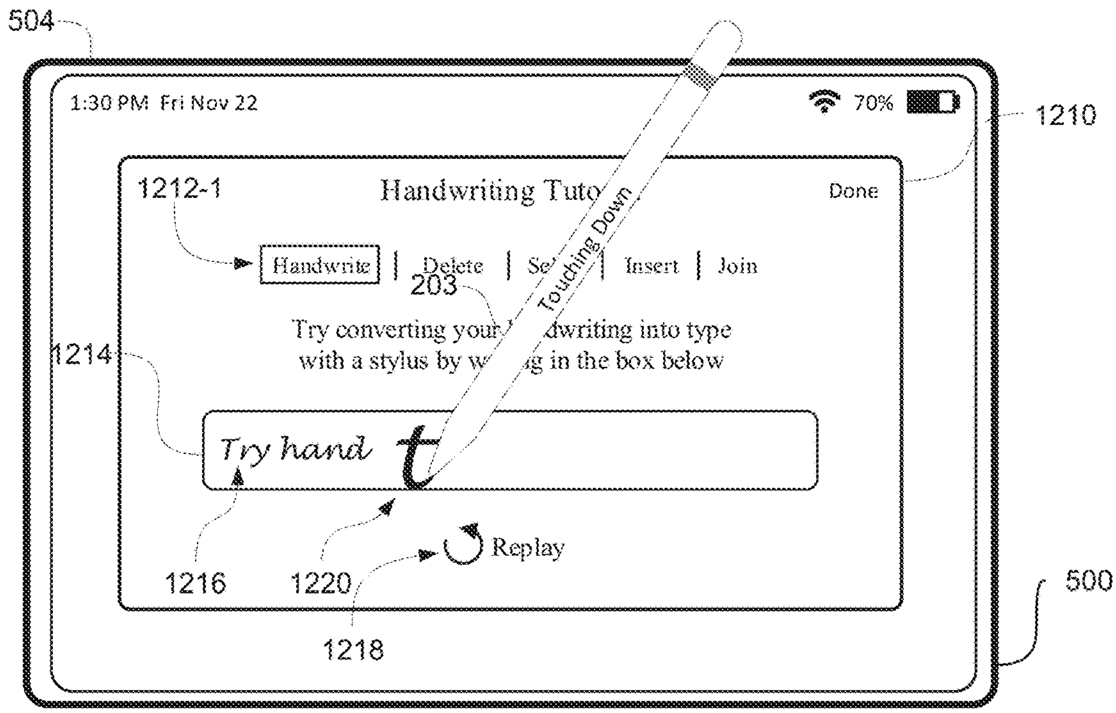
Figure 12T:
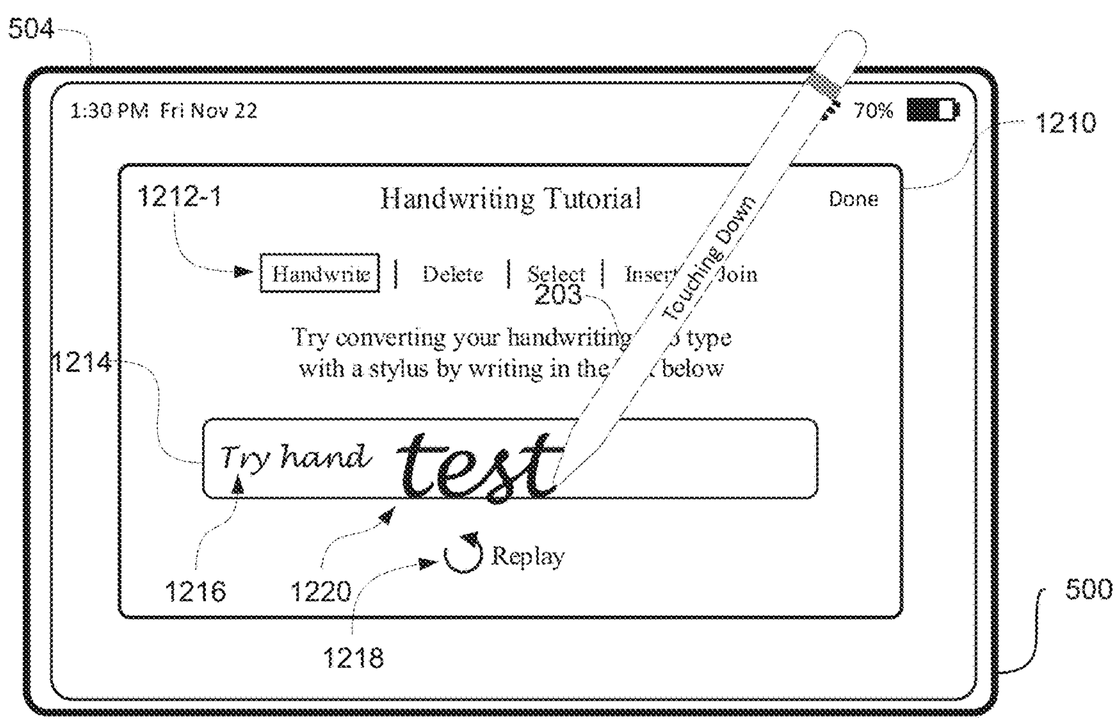
Figure 12U:
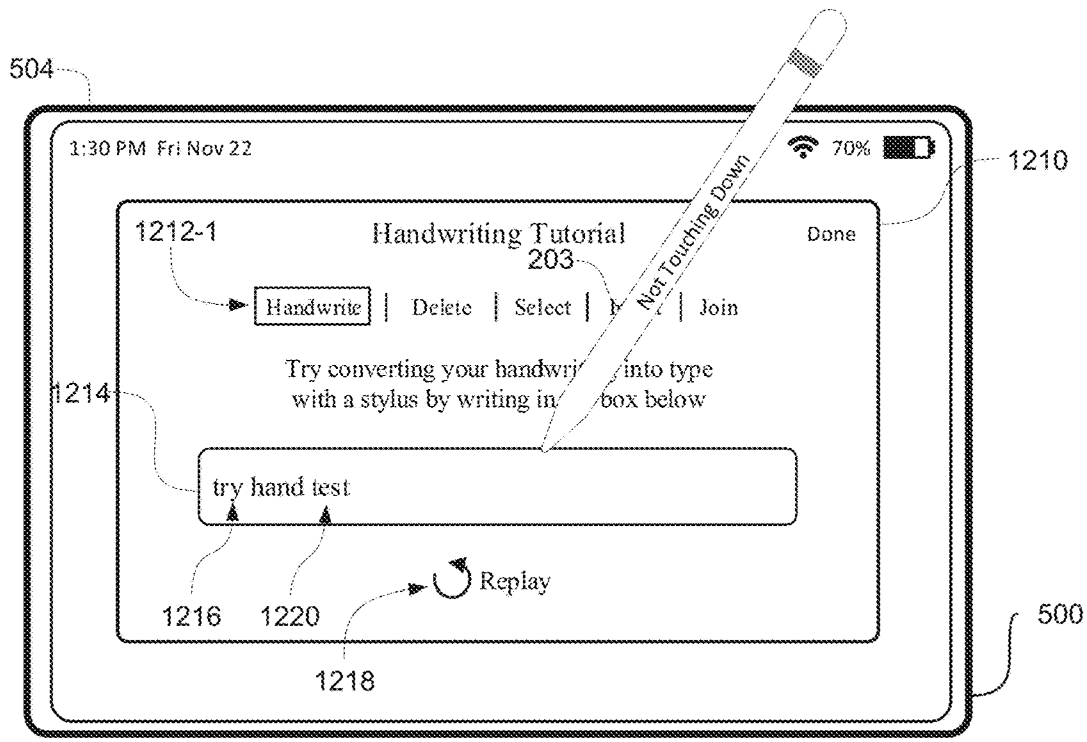

In FIG. 12R, as the animation of text 1216 being written into content entry region 1214 is in progress (e.g., text 1216 is still in the process of being written), a contact by stylus 203 is received on content entry region 1214. In some embodiments, in response to the contact by stylus 203, device 500 terminates the animation, but maintains display of text 1216 (e.g., the text that has been written so far) in content entry region, as shown in FIG. 12S. In some embodiments, replay affordance 1218 is displayed because the tutorial animation has terminated. In FIGS. 12S-12T, as the user performs handwritten input, word 1220 is drawn into content entry region 1214 in accordance with the user input. In FIG. 12U, after detecting termination of the handwritten input (e.g., after detecting a lift-off of the contact by stylus 203 with touch screen 504), device 500 recognizes word 1220 as valid characters and converts word 1220 into font-based text, as shown in FIG. 12U. In some embodiments, upon conversion, word 1220 is aligned with text 1216 in content entry region 1214 that was inserted by the animation. In some embodiments, word 1220 is displayed at the same location as the input (e.g., near the center of content entry region 1214). Thus, in some embodiments, interrupting a tutorial animation while the animation is in progress causes the animation to terminate, but the content inserted into the content entry region by the tutorial is maintained in the content entry region.

Figure 12V:
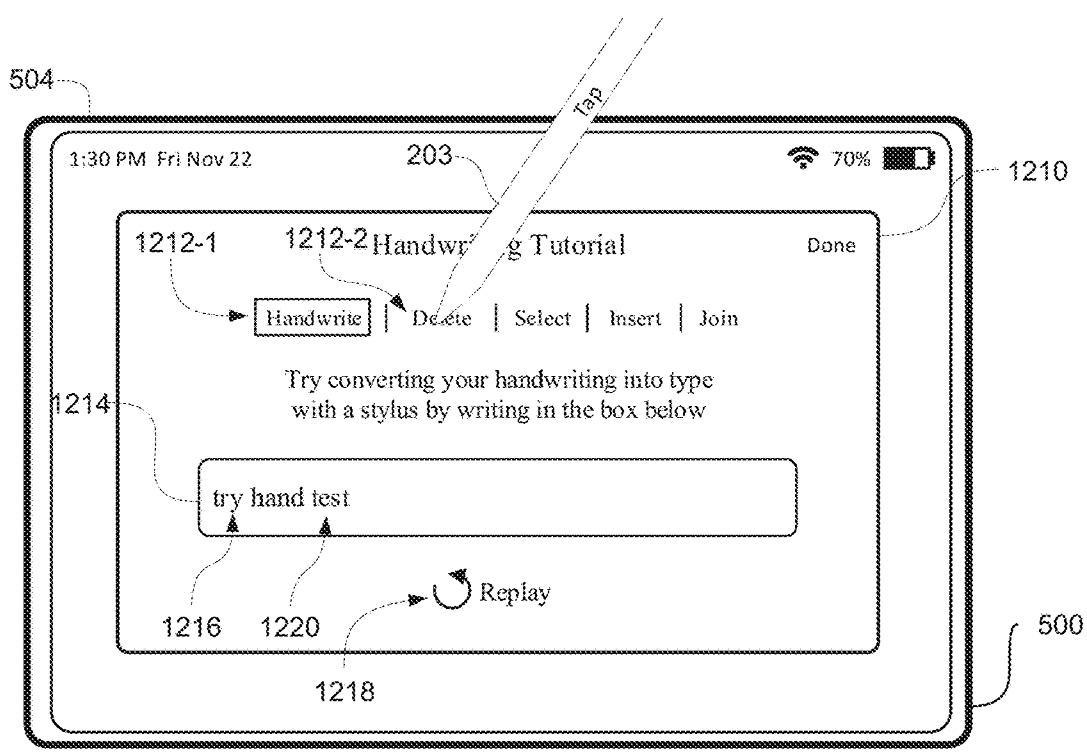
Figure 12W:
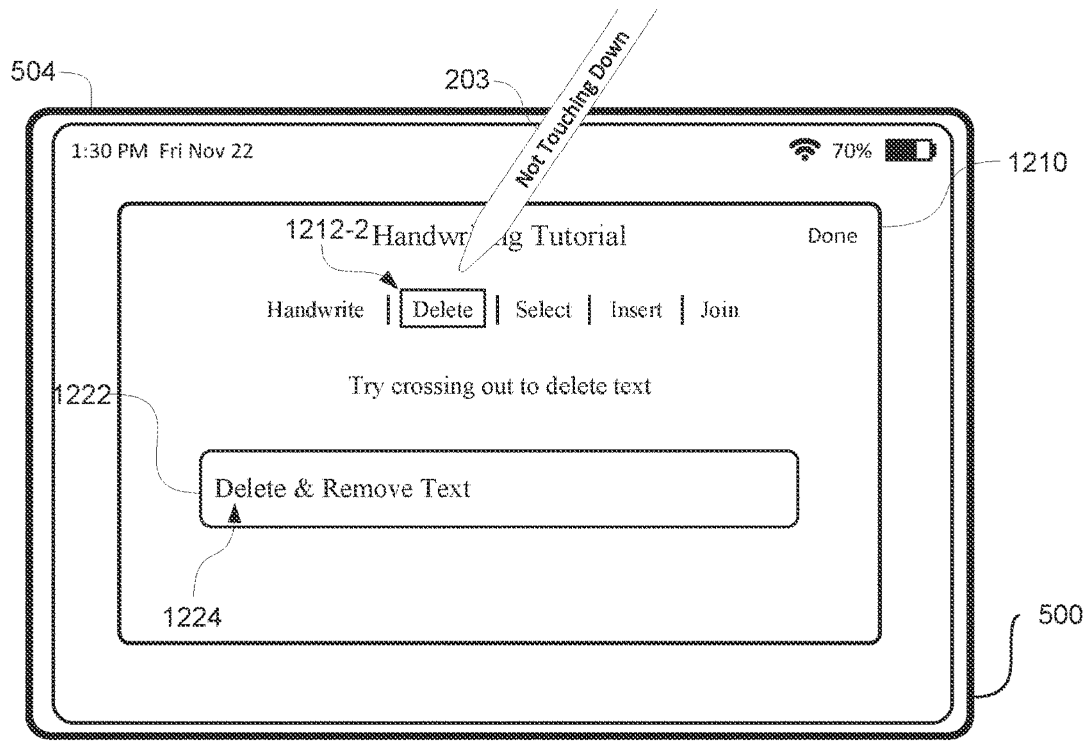

In FIG. 12V, a user input is received from stylus 203 selecting deletion tab 1212-2 (although it is understood that the selection input can be received from any input device and/or a finger). In response to the user input, device 500 updates user interface 1210 to display the tutorial for the deletion operation, as shown in FIG. 12W. In some embodiments, a deletion operation is an operation to remove text from a content entry region. In some embodiments, a deletion operation is performed in response to a crossing-out or zigzagging gesture across one or more characters. In some embodiments, the crossing-out gesture can be horizontal (e.g., horizontal or substantially horizontal), vertical (e.g., vertical or substantially vertical), or a combination of the two. In some embodiments, the crossing-out or zigzagging gesture includes at least one doubling-back movement (e.g., movement in one direction followed by a movement in the opposite direction without lift-off of contact). In some embodiments, the crossing-out or zigzagging gesture includes one or more sharp turns or angles such that the gesture is not substantially horizontal or substantially vertical throughout the gesture. For example, a movement in one general direction followed by a gesture that changes the direction of the movement more than a threshold amount (e.g., more than a 20-degree change, more than a 30-degree change, more than a 45-degree change, more than 90-degree change, more than a 180-degree change, etc.) is optionally recognized as a crossing-out or zigzagging gesture and interpreted as a request to perform a deletion operation.

In some embodiments, device 500 displays a user interface different than user interface 1210 (e.g., each tab has its own user interface). In some embodiments, device 500 maintains display of the same user interface but changes the contents of the user interface to correspond to the operation being demonstrated. In FIG. 12W, content entry region 1222 is pre-populated with text 1224. In some embodiments, text 1224 reads "Delete & Remove Text". Thus, text 1224 optionally includes instructions and/or an indication of the deletion operation that is or will be demonstrated.

In FIG. 12W, upon updating user interface 1210 to display the demonstration for the deletion operation, device 500 begins displaying the tutorial for performing the deletion operation. For example, in FIG. 12X, the tutorial animation for the deletion operation includes displaying a representation of a gesture 1226 across a first portion of word 1224-1 (e.g., crossing out "D" in "Delete"). In FIG. 12Y, the animation continues and representation of a gesture 1226 continues in a crossing-out manner over word 1224-1 (e.g., the rest of the letters in "Delete"). In some embodiments, representation of a gesture 1226 corresponds to a request to delete one or more characters. Thus, in some embodiments, device 500 changes the visual characteristic of word 1224-1 to indicate that word 1224-1 is marked for deletion. For example, in FIG. 12Y, word 1224-1 is greyed out. In some embodiments, marking a character or word for deletion indicates that upon termination of a user input (e.g., lift-off of the contact), the marked character or word is removed from the content entry region. In FIG. 12Z, the animation completes with the execution of the deletion operation on word 1224-1. In some embodiments, the other content in content entry region 1222 (e.g., ampersand 1224-2 and words 1224-3 and 1224-4) are re-arranged (e.g., left-aligned) in response to the deletion of word 1224-1. In FIG. 12Z, upon completion of the animation, replay affordance 1228 is displayed.

In FIG. 12AA, a user input is received from stylus 203 performing a cross-out gesture on word 1224-3. In some embodiments, in response to receiving the user input, device 500 displays a representation of the gesture 1230 across word 1224-3 in accordance with the user input (e.g., as if the user drew representation 1230). As shown in FIG. 12AA, device 500 recognizes the gesture as a deletion operation and greys out word 1224-3 to indicate that word 1224-3 has been marked for deletion. In FIG. 12BB, a termination of the contact by stylus 203 is detected. In response to detecting the termination of the contact, device 500 executes the deletion operation and deletes word 1224-1 from content entry region 1222, as shown in FIG. 12BB. In some embodiments, word 1224-4 is aligned with ampersand 1224-2.

In FIG. 12CC, a user input is received from stylus 203 writing word 1232 in content entry region 1222. In FIG. 12DD, in response to detecting a termination of the contact by stylus 203, device 500 converts word 1232 into font-based. Thus, even though device 500 is displaying the page for demonstrating the deletion operation, the page is not limited to the performance of only the deletion operation and one or more other stylus operations are available. For example, as shown in FIGS. 12CC-12DD, while displaying the tutorial for the deletion operation, a user is able to perform the handwriting operation (e.g., text entry operation). Similarly, the selection operation, insertion operation, and/or join operation can also be performed in content entry region 1222. Thus, in some embodiments, any or all of the stylus operations demonstrated by user interface 1210 (optionally including other operations that are not demonstrated by user interface 1210) can be performed in the content entry regions included in user interface 1210 (e.g., in any of the content entry regions for any of the tutorial pages).

In FIG. 12EE, a user input is received from stylus 203 performing a cross-out gesture on word 1232 (e.g., the word inserted by the user in FIG. 12CC). In some embodiments, in response to receiving the user input, device 500 displays a representation of the gesture 1234 across word 1232 in accordance with the user input (e.g., as if the user drew representation 1234). As shown in FIG. 12EE, device 500 recognizes the gesture as a deletion operation and greys out word 1232 to indicate that word 1232 has been marked for deletion. In FIG. 12FF, a termination of the contact by stylus 203 is detected. In response to detecting the termination of the contact, device 500 executes the deletion operation and deletes word 1232 from content entry region 1222, as shown in FIG. 12FF.

Thus, as shown above, a user is able to perform the deletion operation on both content that was inserted by the tutorial animation and content that the user inserted. In some embodiments, the content inserted by the tutorial animation is a simulation of a user input, has the same behaviors, and/or is treated the same as if the content were inserted by the user. For example, in FIG. 12FF, ampersand 1224-2 and word 1224-4 are treated as actual characters in content entry region 1222 (e.g., and optionally not an image object or graphics object).

In FIG. 12GG, a user input is received from stylus 203 selecting selection tab 1212-3 (although it is understood that the selection input can be received from any input device and/or a finger). In response to the user input, device 500 updates user interface 1210 to display the tutorial for the selection operation, as shown in FIG. 12HH. In some embodiments, a selection operation is an operation in which one of more characters are selected (e.g., highlighted). In some embodiments, a selection operation is performed in response to a horizontal gesture (e.g., substantially horizontal gesture, a gesture in a substantially horizontal direction, a gesture from one end of a letter/word/sentence to the other end of the letter/word/sentence, etc.) across one or more characters. In some embodiments, a selection operation is recognized if the gesture does not include a change in the direction of the movement by more than a threshold amount (e.g., the threshold amount that would cause the gesture to be interpreted as a deletion operation instead of a selection operation, such as by more than a 20-degree change, more than a 30-degree change, more than a 45-degree change, more than 90-degree change, more than a 180-degree change, etc.).

In some embodiments, additionally or alternatively, a selection operation is performed in response to a gesture encircling one or more characters. In some embodiments, selecting one or more characters provides the user with the ability to perform one or more operations on the selected characters (e.g., move, copy, cut, duplicate, etc.). In some embodiments, if a respective operation can be triggered by performance of a plurality of different gestures, the tutorial demonstrates only one of the gestures, demonstrates only a subset of the gestures, or demonstrates all of the gestures (e.g., the animation demonstrates the first gesture, then the second gesture before displaying the replay affordance).

Returning to FIG. 12HH, content entry region 1230 is pre-populated with text 1232. In some embodiments, text 1232 reads "Select text". Thus, text 1232 optionally includes instructions and/or an indication of the selection operation that is or will be demonstrated.

In FIG. 12HH, upon updating user interface 1210 to display the demonstration for the selection operation, device 500 begins displaying the tutorial for performing the selection operation (e.g., without additional user input). For example, in FIG. 12II, the tutorial animation for the selection operation includes displaying a representation of a gesture 1234 across a first portion of word 1232-1 (e.g., a horizontal line across "S" in "Select"). In FIG. 12Y, the animation continues and representation of a gesture 1234 continues horizontally rightwards over more letters of word 1232-1 (e.g., letters "e" and "l" in "Select"). In some embodiments, representation of a gesture 1234 corresponds to a request to select one or more characters. Thus, in some embodiments, device 500 recognizes the gesture as a selection operation and changes the visual characteristic of the letters of word 1232-1 that indicates that the letters of word 1232-1 are marked for selection. For example, in FIG. 12JJ, the letters "Sel" of word 1232-1 are displayed with a highlighting effect (e.g., a colored background, such as yellow, blue, or grey). In some embodiments, marking a character or word for selection indicates that upon termination of a user input (e.g., lift-off of the contact), the marked character or word is selected (e.g., highlighted).

In FIG. 12KK, the animation continues and representation of a gesture 1234 continues horizontally rightwards over more letters of word 1232-1 (e.g., the remaining letters in "Select"). In response, device 500 expands the highlighting effect to indicate that the additional letters of word 1232-1 are marked for selection (e.g., all of word 1232-1 is marked for selection). In some embodiments, while displaying the animation of word 1232-1 being marked for selection, representation 1234 is displayed to illustrate a user input that caused word 1232-1 to be marked for selection. In some embodiments, representation 1234 is not displayed (e.g., due to a corresponding representation not being displayed when a user performs a selection operation, as will be illustrated in further detail below).

In FIG. 12LL, the animation completes with the execution of the selection operation on word 1232-1. In some embodiments, performing the selection operation on word 1232-1 includes selecting (e.g., highlighting) word 1232-1 and displaying one or more selection user interface elements to the left and/or right of word 1232-1. In some embodiments, selection user interface elements are selectable and moveable to select fewer or more characters. In some embodiments, performing the selection operation on word 1232-1 includes displaying a pop-up menu that includes one or more operations that can be performed on the selected word. In some embodiments, the pop-up menu is displayed in response to a tap input on selected word 1232-1. In FIG. 12LL, upon completion of the animation, replay affordance 1228 is displayed.

FIGS. 12MM-12OO illustrate another embodiment of performing the selection operation. In FIGS. 12MM-12OO, a gesture different than the gesture shown above in FIGS. 12II-12LL is also recognized as a request to perform a selection operation. As discussed above, in some embodiments, the selection operation can be triggered via the horizontal gesture described above and/or via the circling gesture described below. Thus, in some embodiments, the tutorial displays a demonstration of both gestures (e.g., before termination and displaying the replay affordance). For example, device 500 displays the demonstration of the horizontal gesture described above followed by a demonstration of the circling gesture described below. In some embodiments, the tutorial only displays a demonstration of one gesture (e.g., only a demonstration of the horizontal gesture or only a demonstration of the circling gesture).

In FIG. 12MM, the tutorial animation for the selection operation includes displaying a representation of a gesture 1234 being drawn around word 1232-1 (e.g., a circling of word 1232-1). In FIG. 12NN, the animation continues and representation of a gesture 1234 partially or fully encircles word 1232-1. In some embodiments, representation of a gesture 1234 corresponds to a request to select one or more characters. In some embodiments, device 500 recognizes the gesture as a selection operation and optionally changes the visual characteristic of word 1232-1 that indicates that word 1232-1 is marked for selection. In FIG. 1200, the animation completes with the execution of the selection operation on word 1232-1. In FIG. 1200, upon completion of the animation, replay affordance 1228 is displayed.

In FIG. 12PP, a user input is received from stylus 203 drawing a representation 1242 around word 1232-2. In some embodiments, device 500 recognizes the gesture as a request to select word 1232-2. In some embodiments, device 500 changes the visual characteristic of word 1232-2 to indicate that word 1232-2 has been marked for selection (e.g., if the user encircled word 1232-2 but has not yet lifted-off from touch screen 504).

In FIG. 12QQ, in response to detecting a termination of the user input (e.g., a lift-off of the contact of stylus 203 from touch screen 504), device 500 selects word 1232-2. In some embodiments, selecting word 1232-2 includes expanding the selection of word 1232-1 to include word 1232-2.

In FIG. 12RR, a contact by stylus 203 is received selecting user interface element 1236-2. In some embodiments, user interface element 1236-2 is displayed to the right of a set of selected characters and is selectable and moveable to select more or fewer characters. For example, in FIG. 12SS, while maintaining contact with touch screen 504, a leftward movement of stylus 203 is received moving user interface element 1236-2 leftwards. In some embodiments, in response to user interface element 1236-2 moving leftwards towards user interface element 1236-1, the characters that are no longer located between user interface element 1236-1 and user interface element 1236-2 are no longer selected (e.g., word 1232-2 is no longer selected).

In FIG. 12TT, a user input is received from stylus 203 selecting insertion tab 1212-4 (although it is understood that the selection input can be received from any input device and/or a finger). In response to the user input, device 500 updates user interface 1210 to display the tutorial for the insertion operation, as shown in FIG. 12UU. In some embodiments, an insertion operation is an operation in which space is inserted in the middle of text to provide space for insertion of new text. In some embodiments, an insertion operation is performed in response to a contact at a location in the middle of text that is held for longer than a threshold amount of time (e.g., 0.1 seconds, 0.5 seconds, 1 second, 3 seconds, 5 seconds, 10 seconds, etc.). In some embodiments, after text has been inserted into the inserted space (and optionally after a threshold amount of time, such as 0.5 seconds, 1 second, 3 seconds, 5 seconds, etc.), any remaining space that has not been consumed by newly inserted text is collapsed (e.g., any unused space is removed).

Returning to FIG. 12UU, content entry region 1242 is pre-populated with text 1244. In some embodiments, text 1244 reads “Insert space between text”. Thus, text 1244 optionally includes instructions and/or an indication of the insertion operation that is or will be demonstrated.

In FIG. 12UU, upon updating user interface 1210 to display the demonstration for the insertion operation, device 500 begins displaying the tutorial for performing the insertion operation (e.g., without additional user input). For example, in FIG. 12VV, the tutorial animation for the insertion operation includes displaying a cursor 1246 between two words in text 1244. In some embodiments, cursor 1246 represents a contact by stylus 203. In FIG. 12VV, cursor 1246 has been displayed for less than a threshold amount of time (as indicated by timer 1248). In FIG. 12WW, after the cursor has been displayed for more than the threshold amount of time (e.g., representing a stylus making contact at the location of the cursor for more than the threshold amount of time), device 500 inserts a space between first portion of text 1244-1 (e.g., the portion to the left of cursor 1246) and second portion of text 1244-2 (e.g., the portion to the right of cursor 1246). In some embodiments, a user interface element 1250 is displayed in the space that is inserted between first portion of text 1244-1 and second portion of text 1244-2 to indicate that space has been inserted and is available to receive text.

Figure 12X:
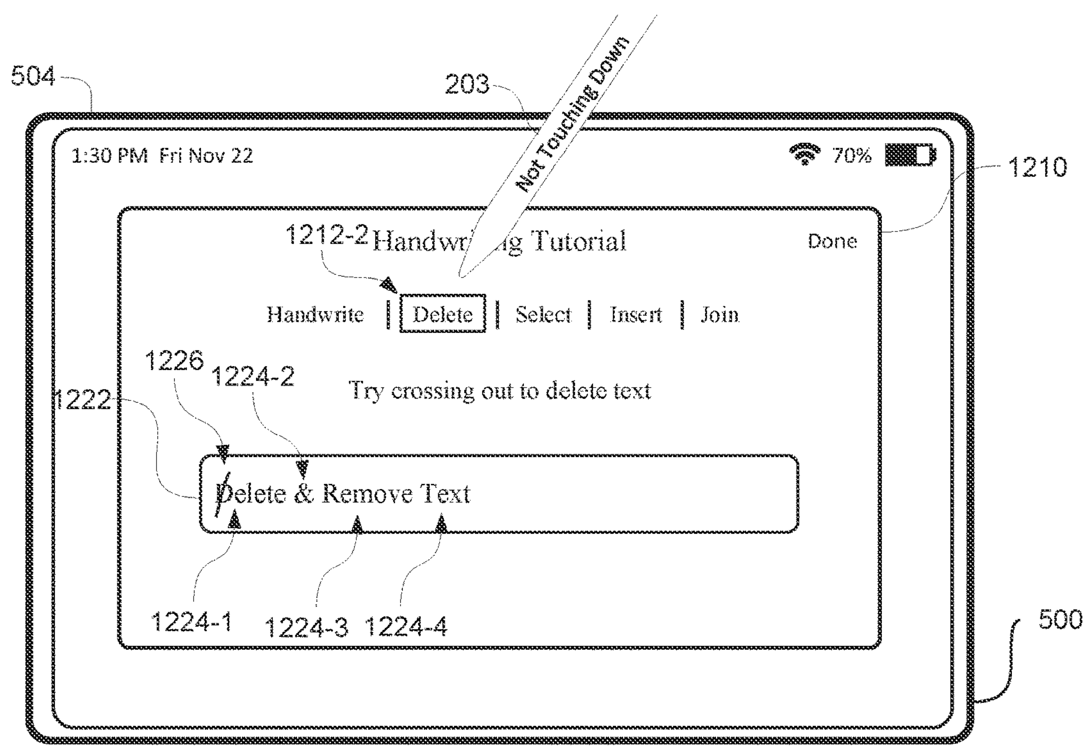
Figure 12Y:
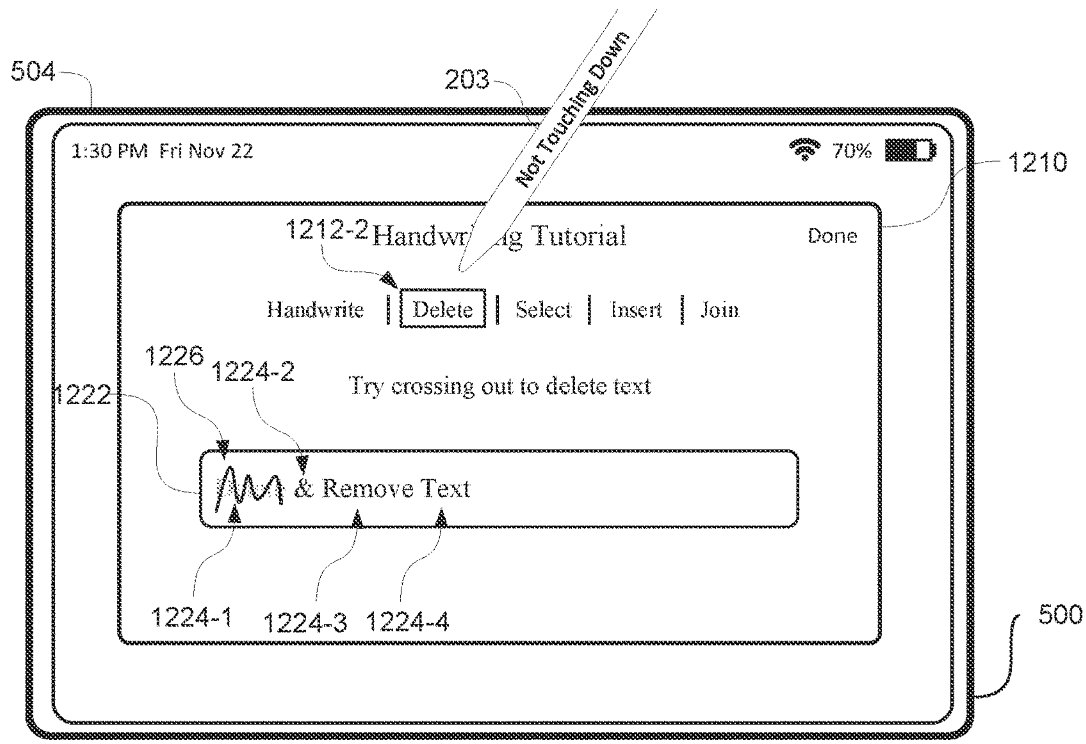
Figure 12Z:
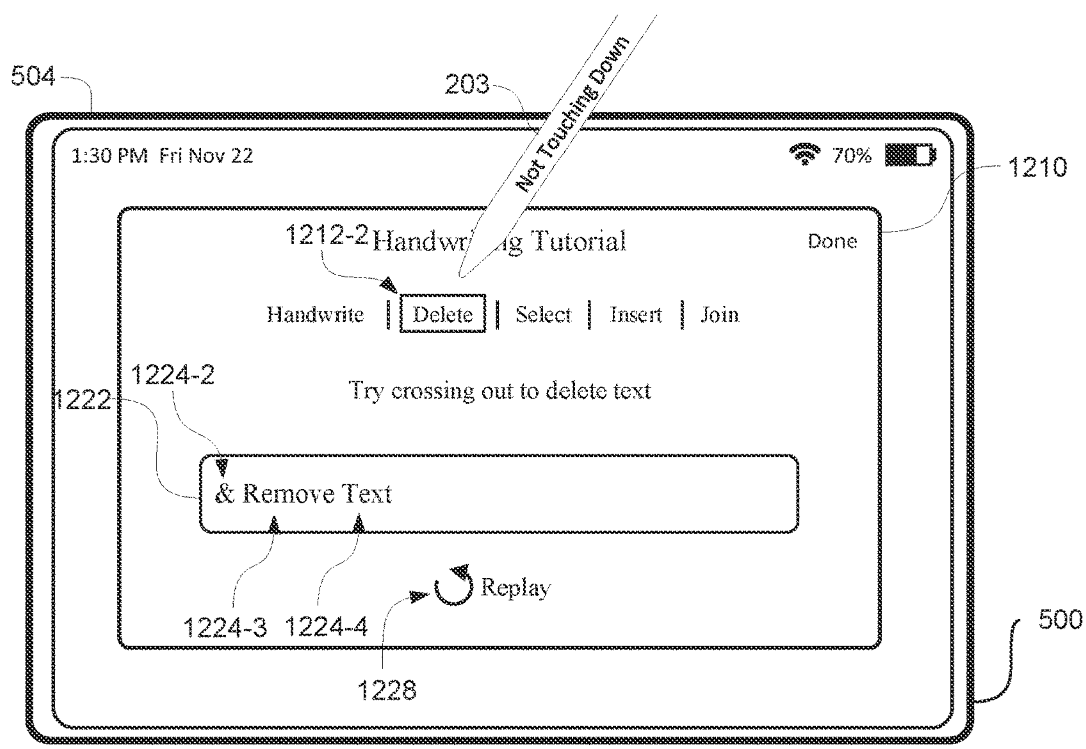
Figure 12A:
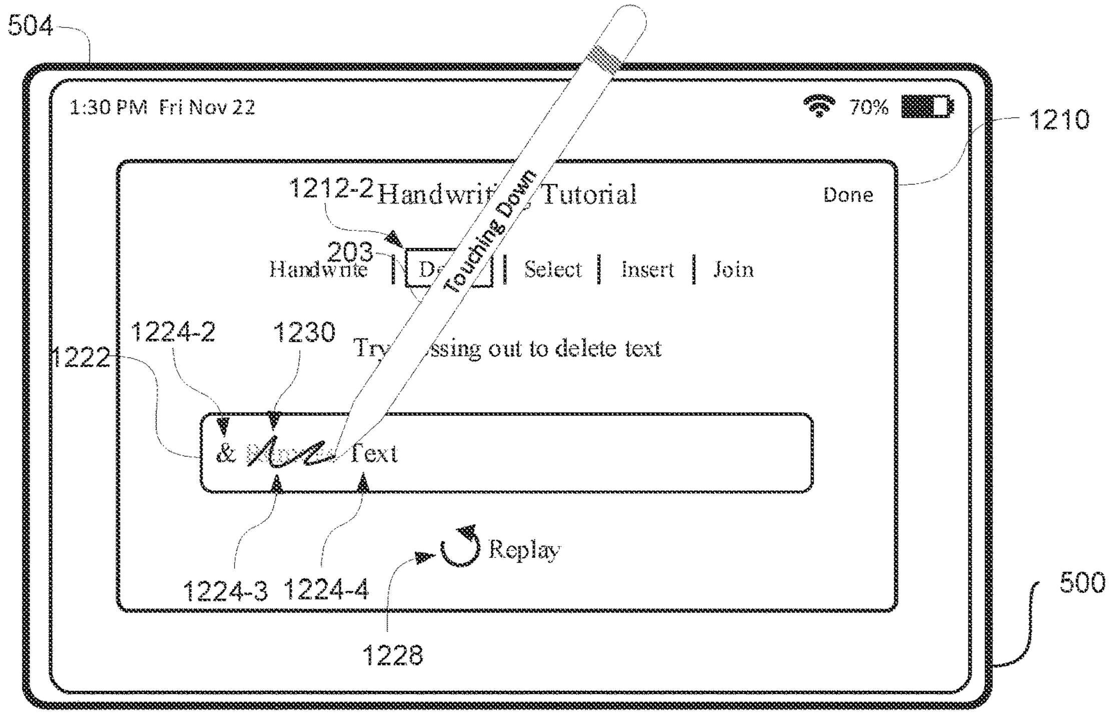
Figure 12B:
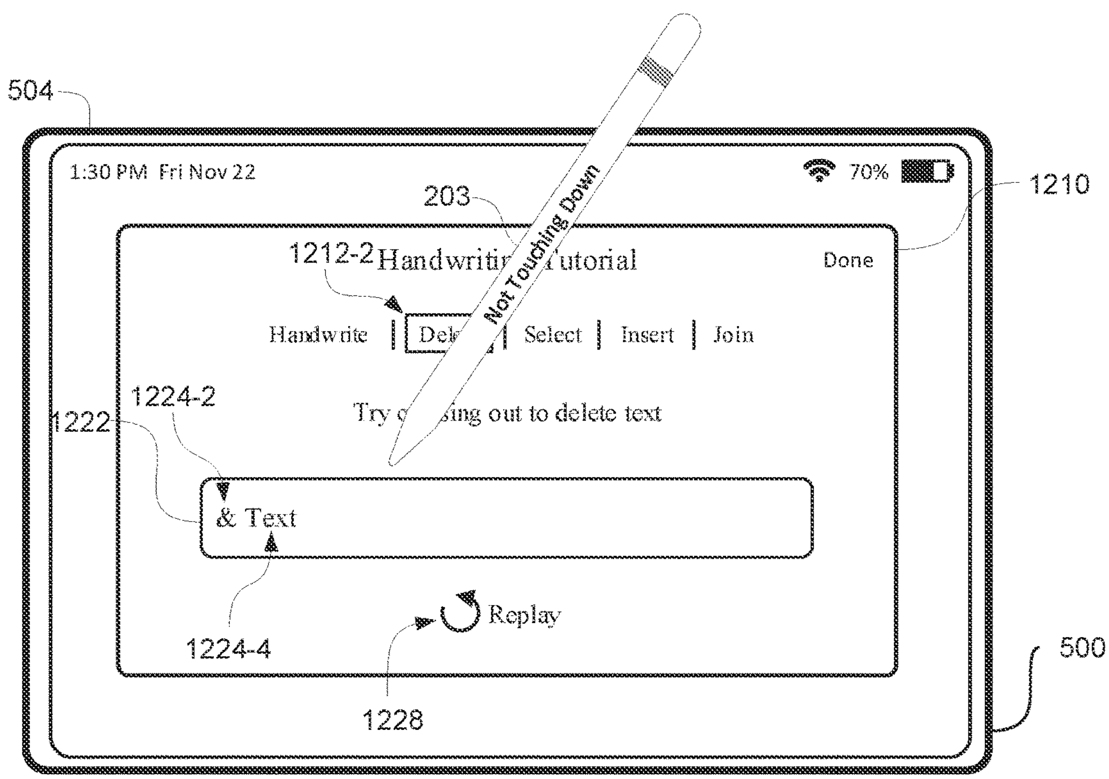
Figure 12C:
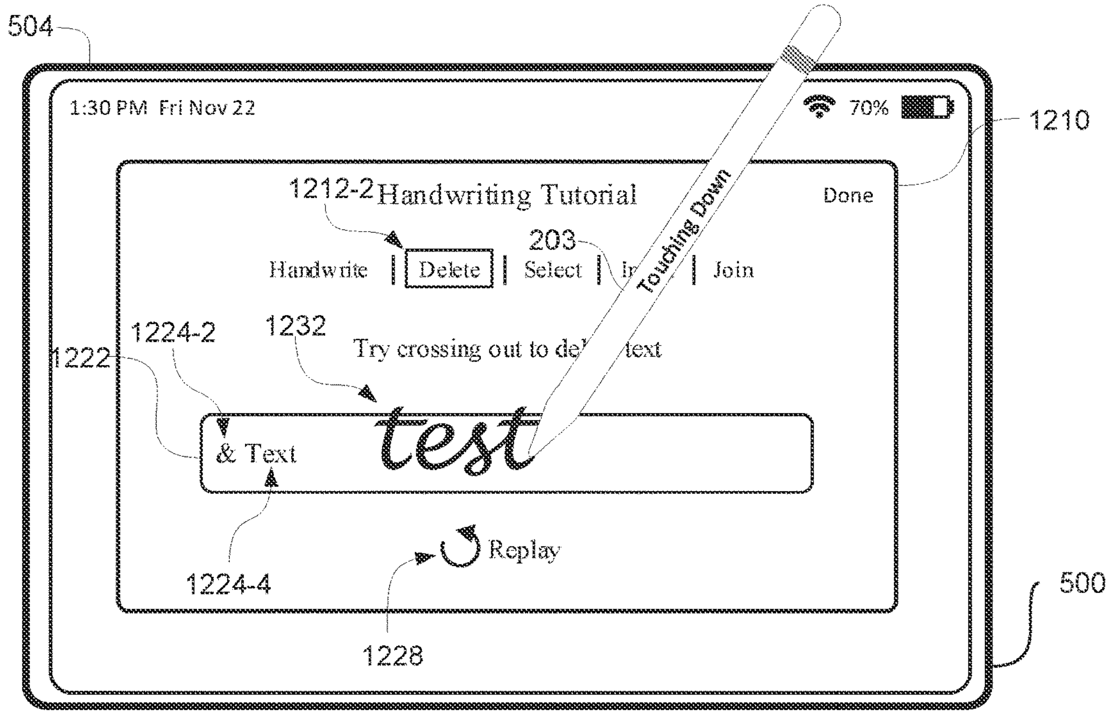
Figure 12D:
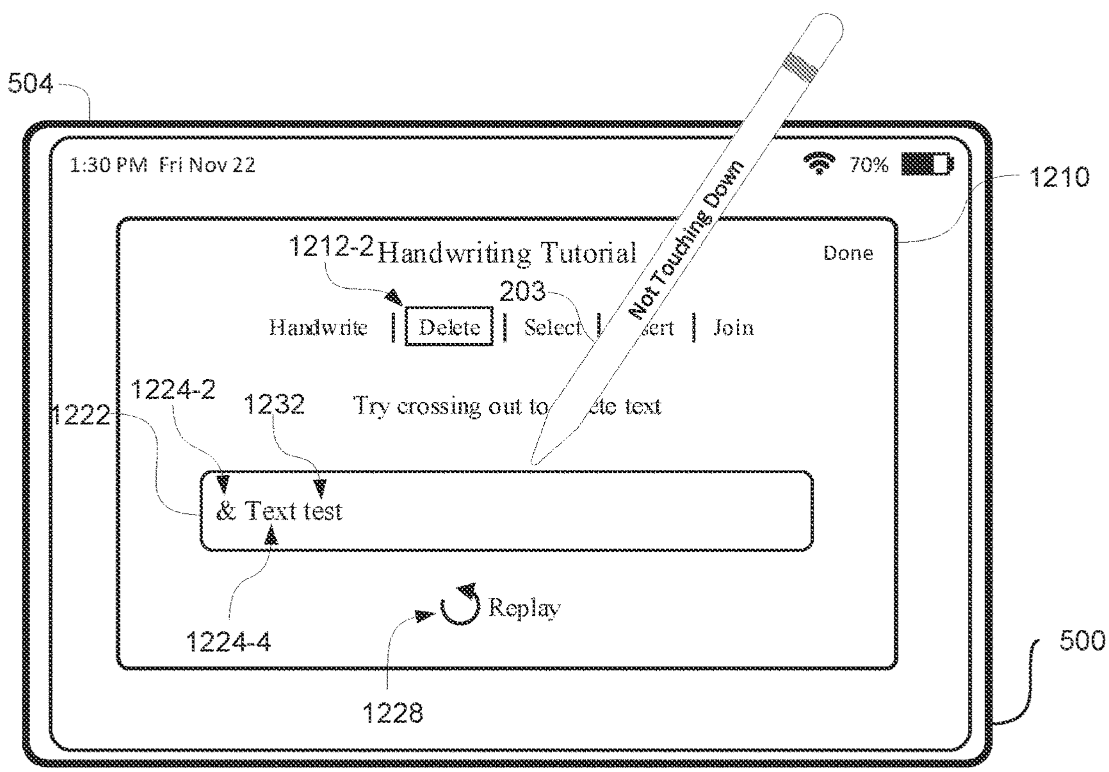
Figure 12E:
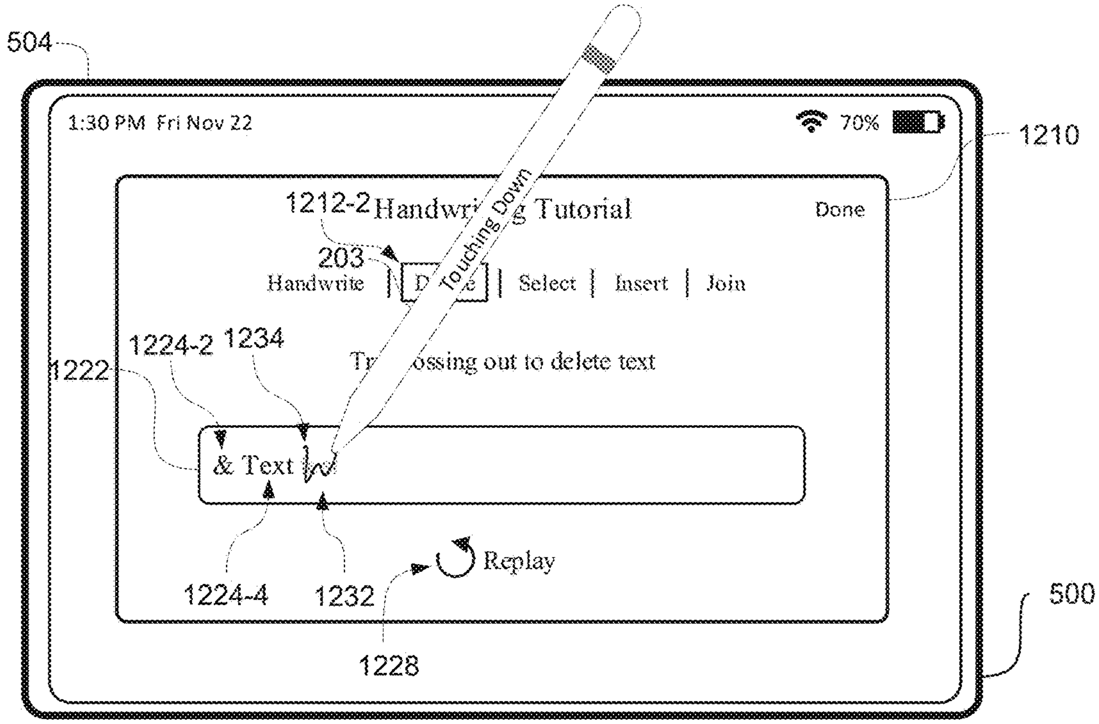
Figure 12F:
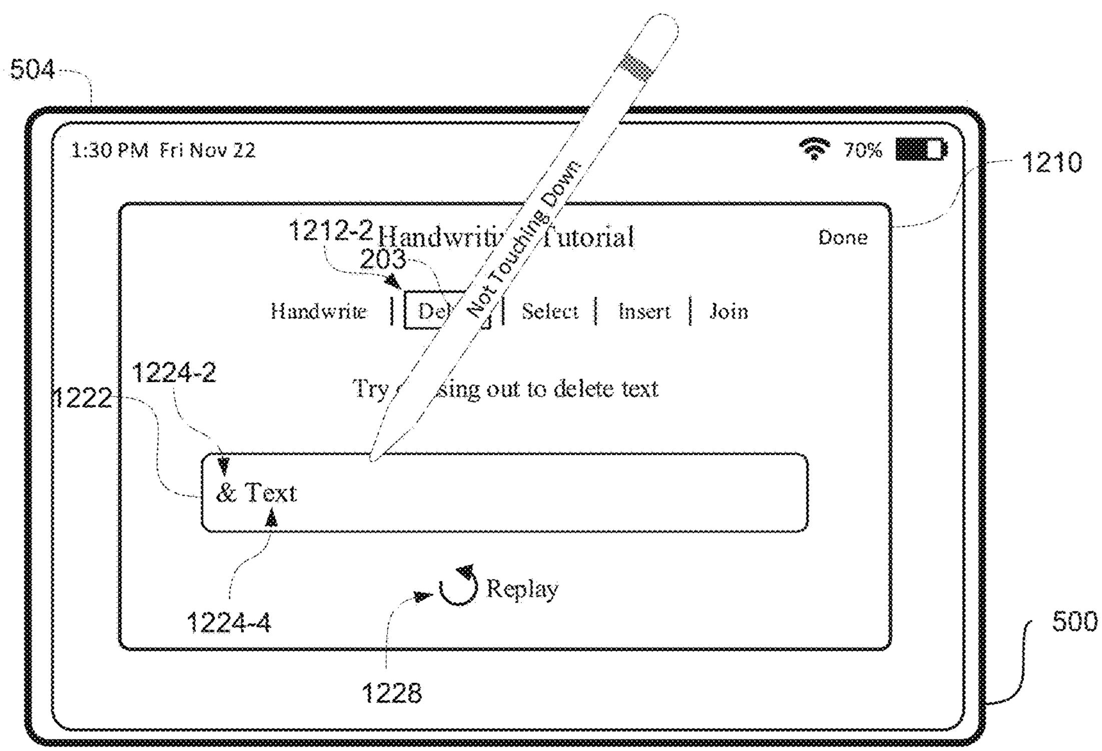
Figure 12G:
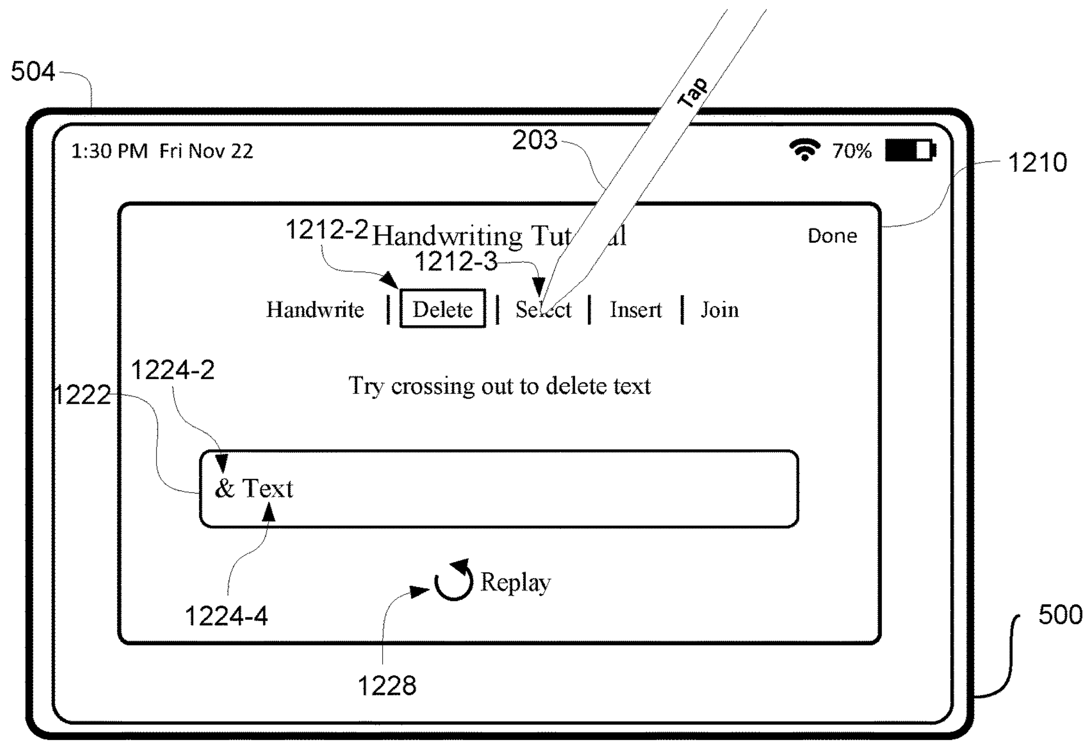
Figure 12H:
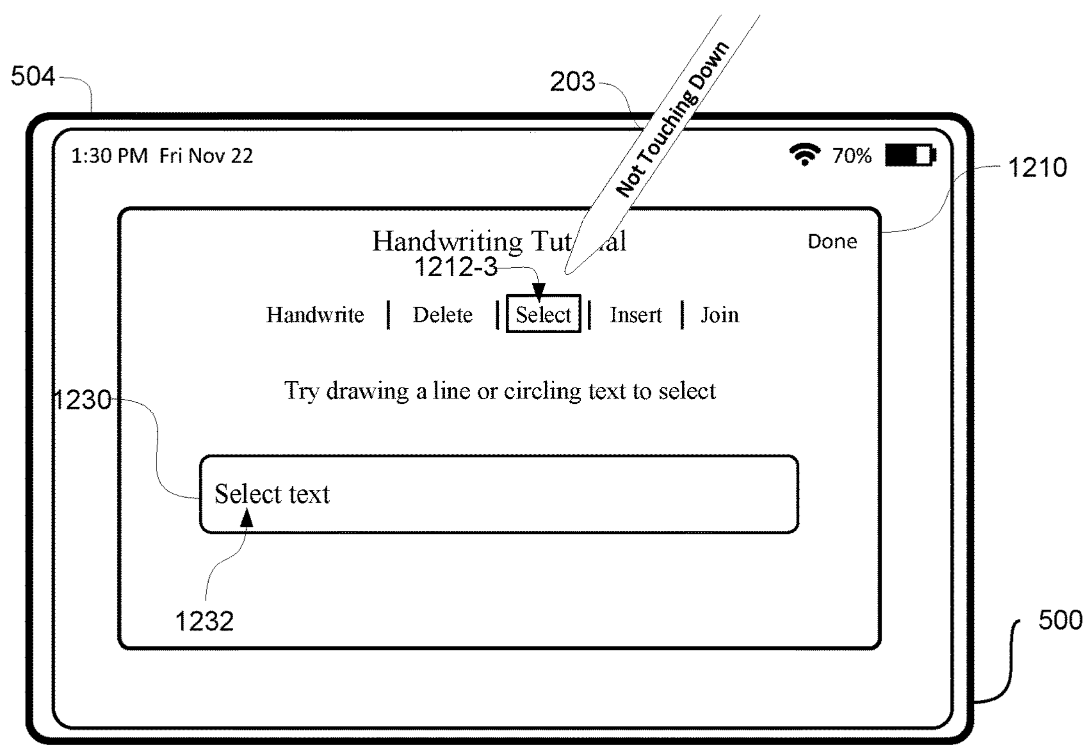
Figure 12I:
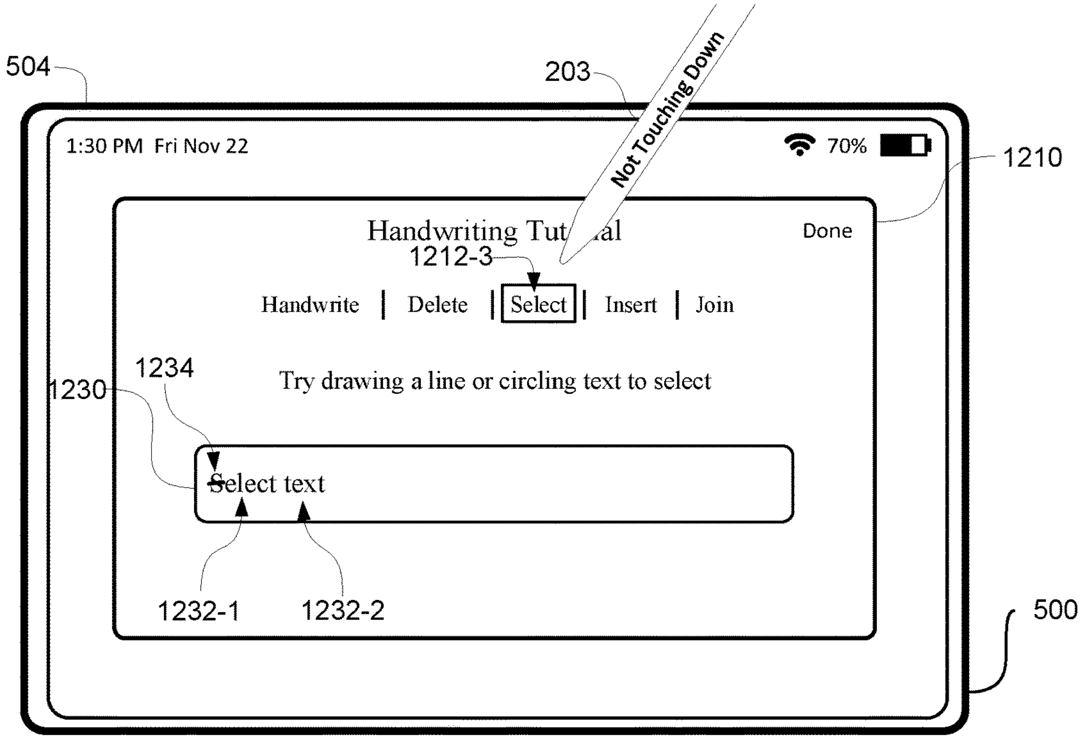
Figure 12J:
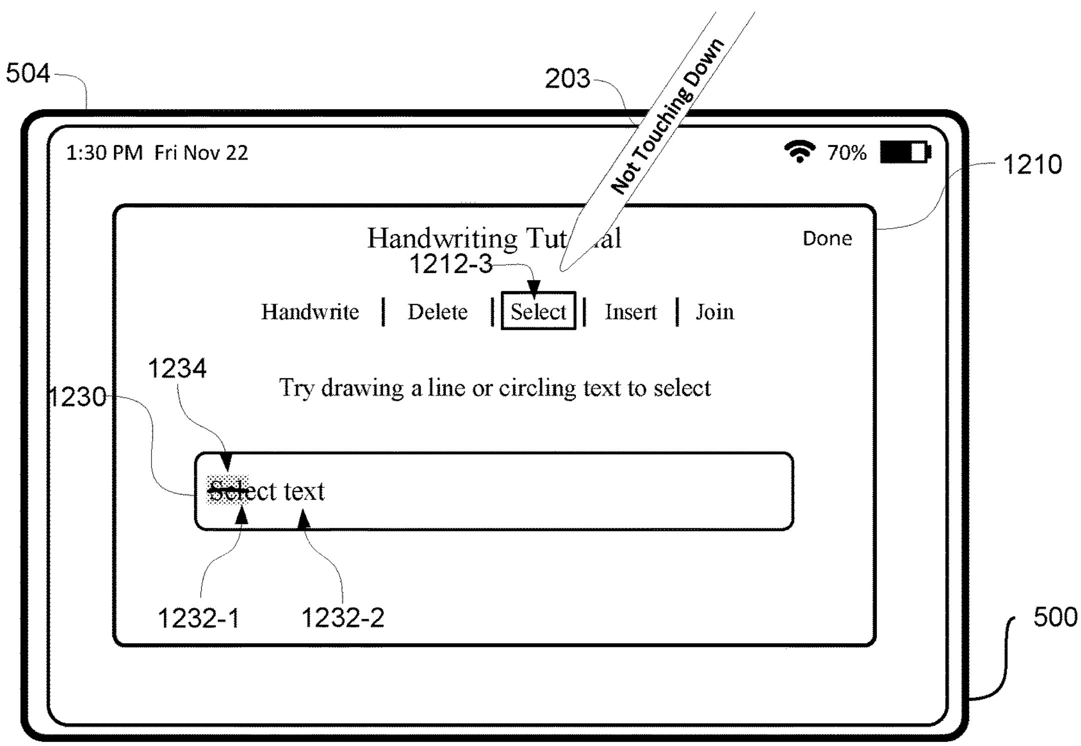
Figure 12K:
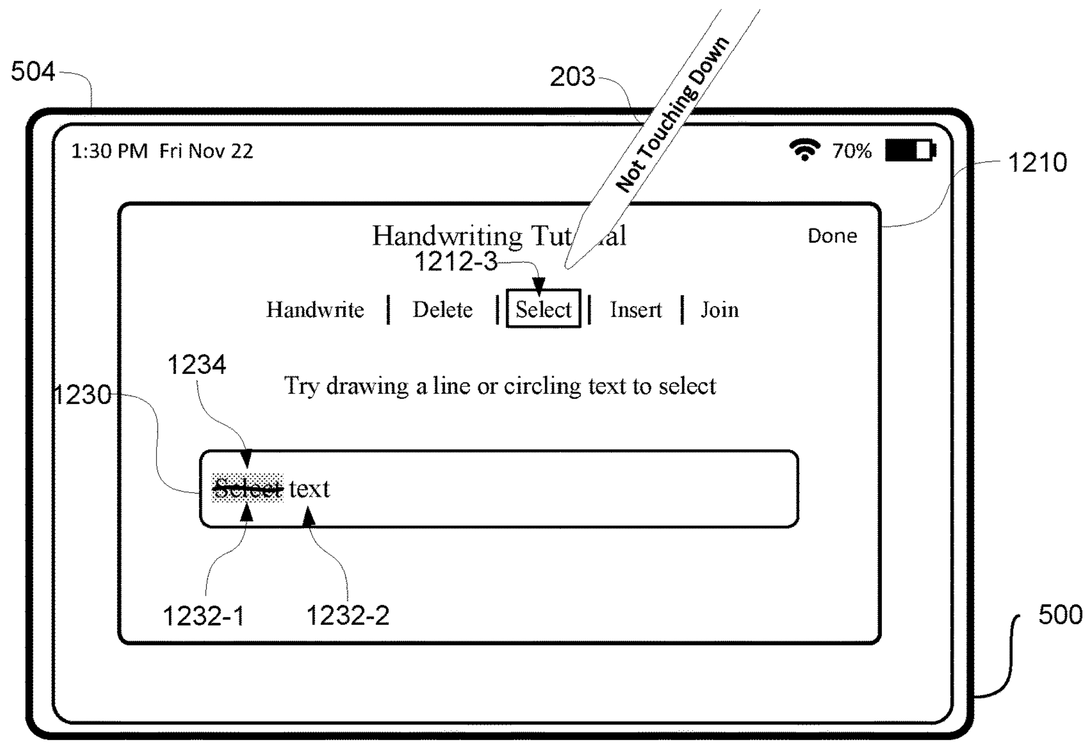
Figure 12L:
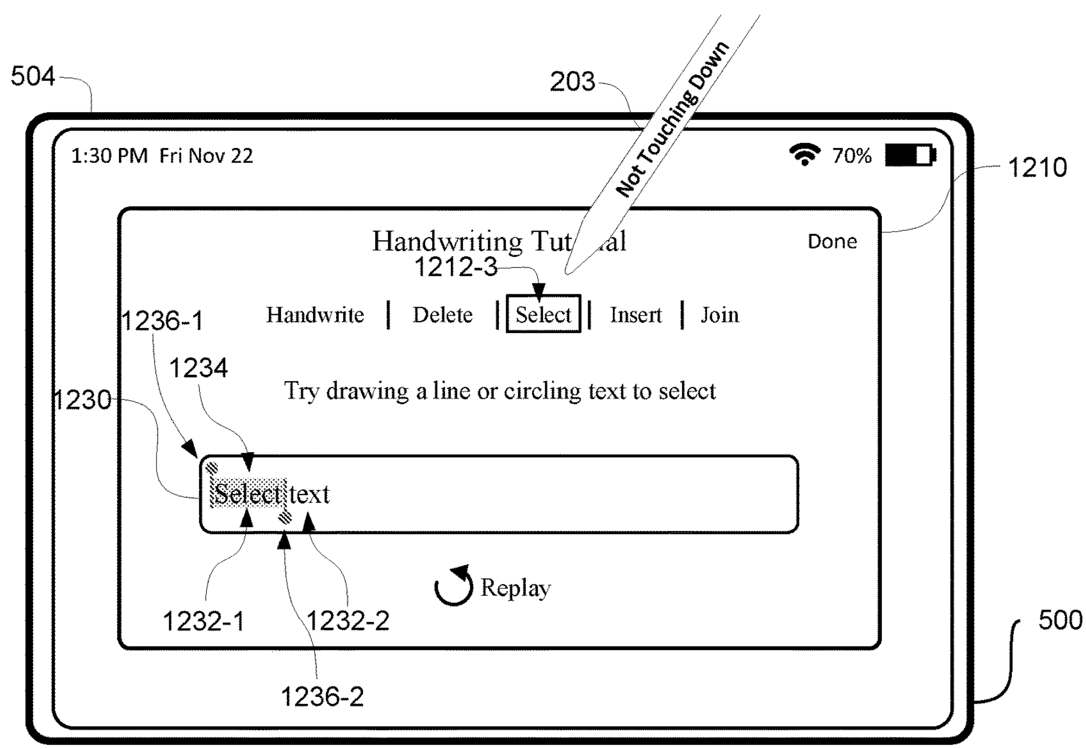
Figure 12M:
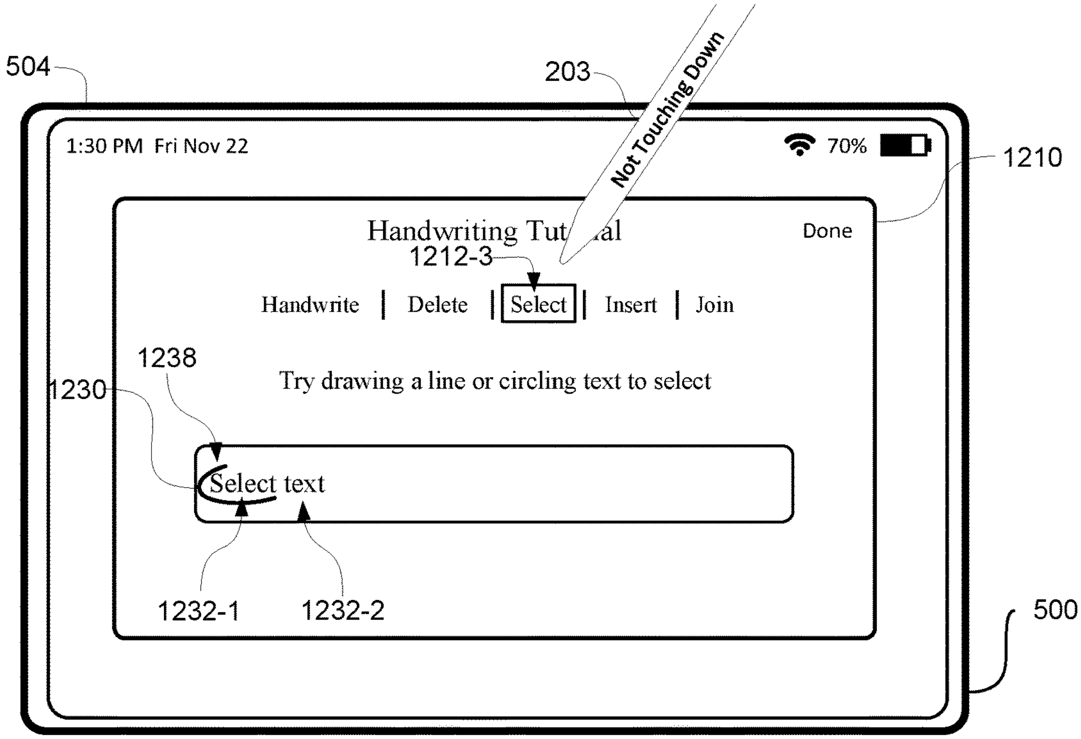
Figure 12N:
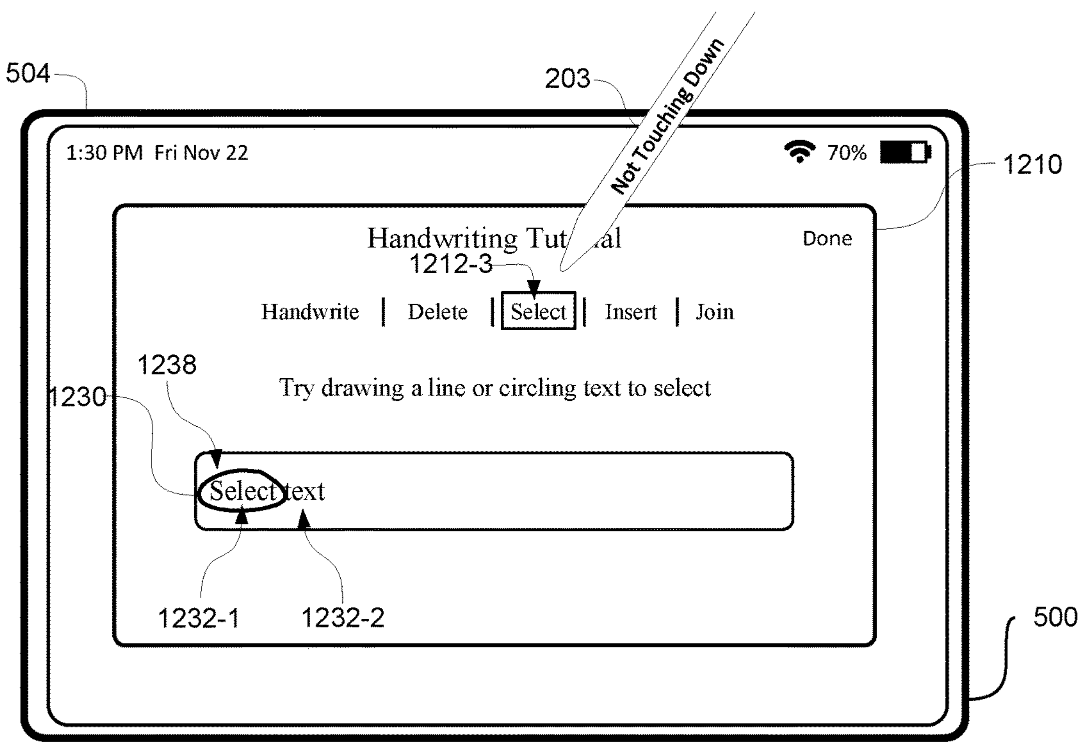
Figure 12O:
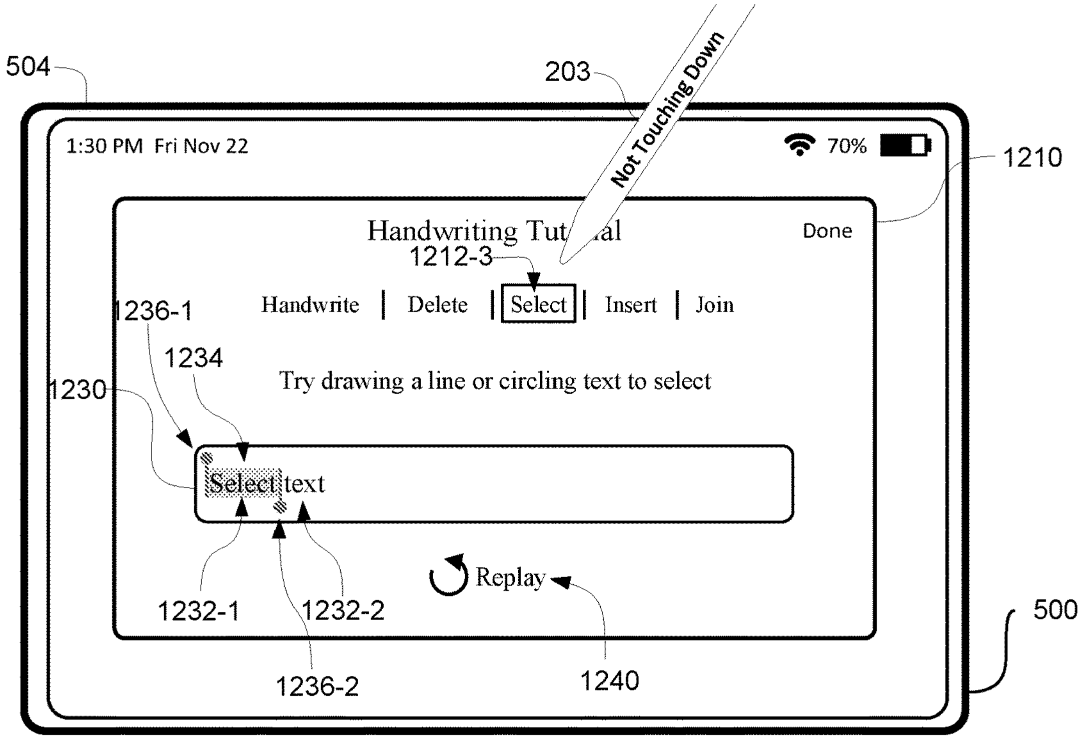
Figure 12P:
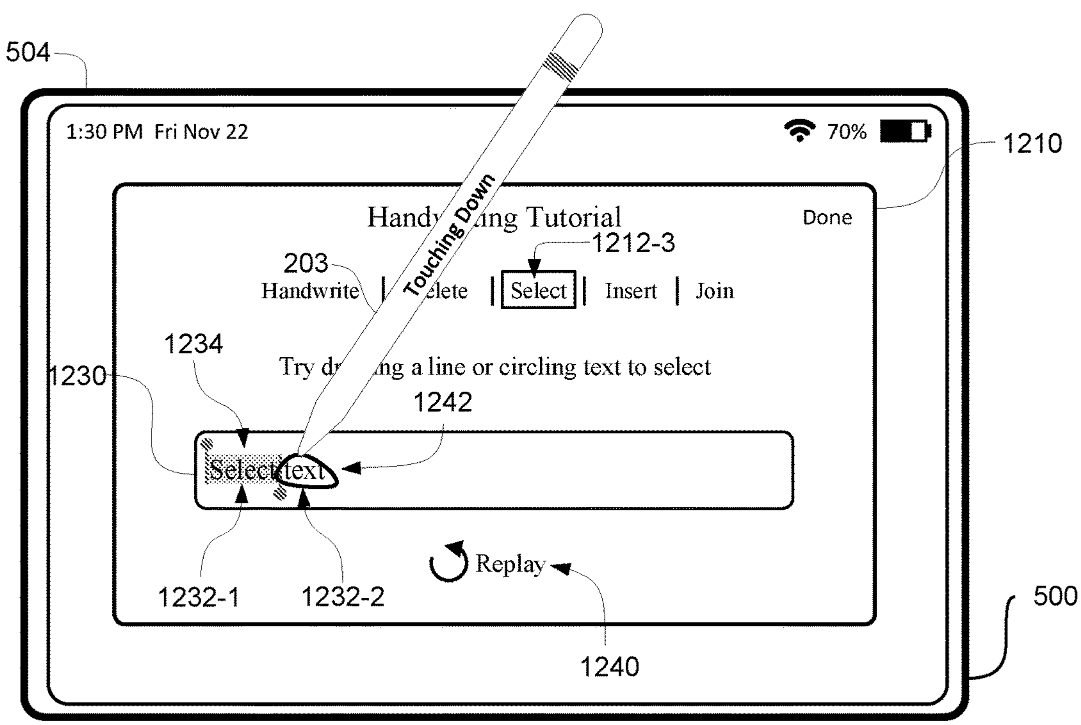
Figure 12Q:
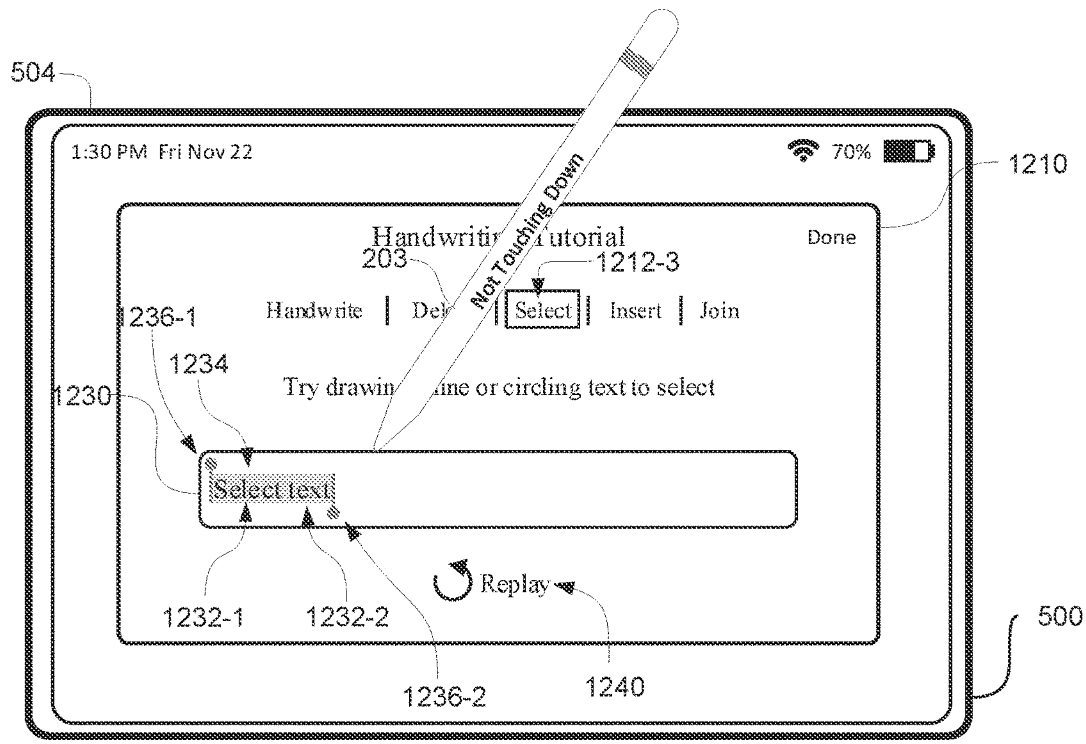
Figure 12R:
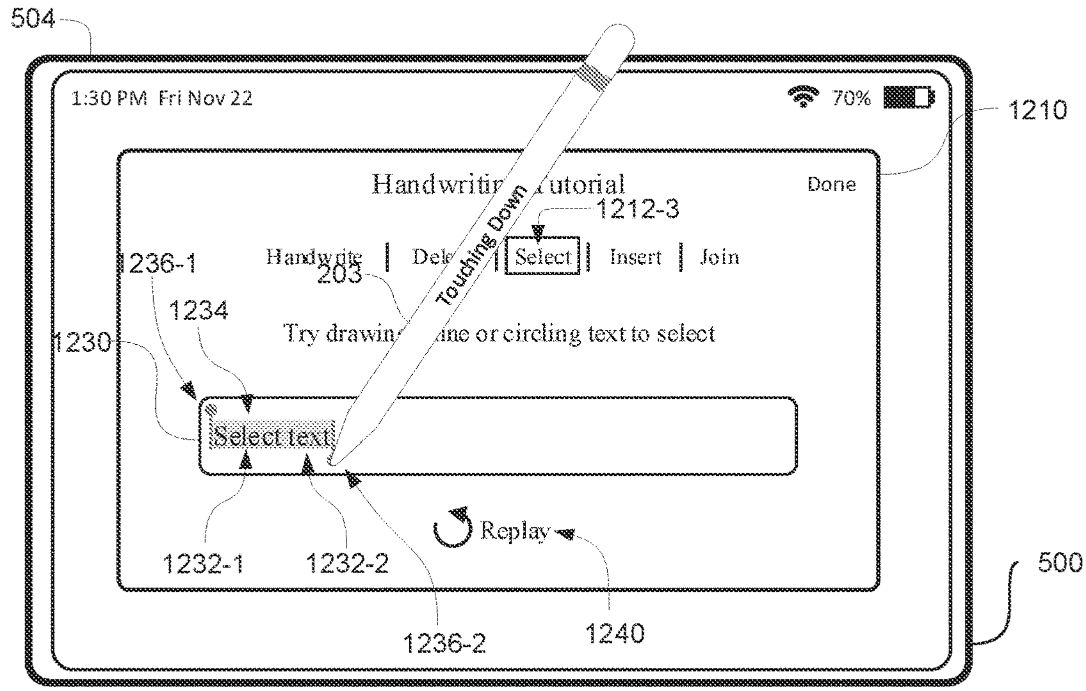
Figure 12S:
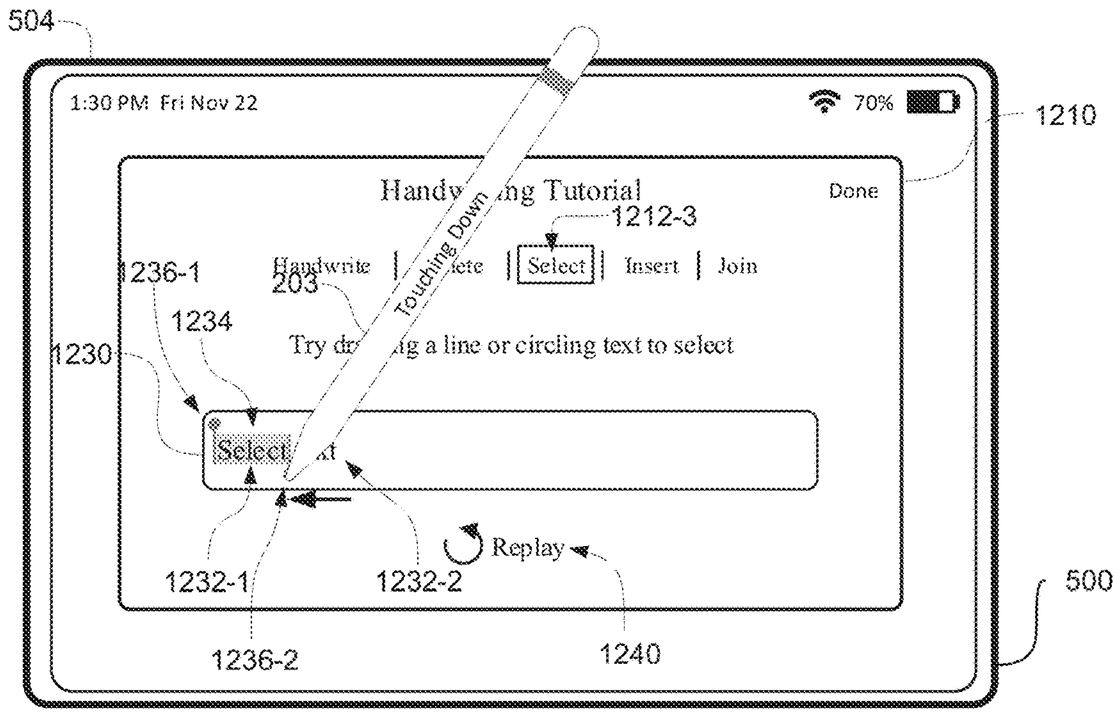
Figure 12T:
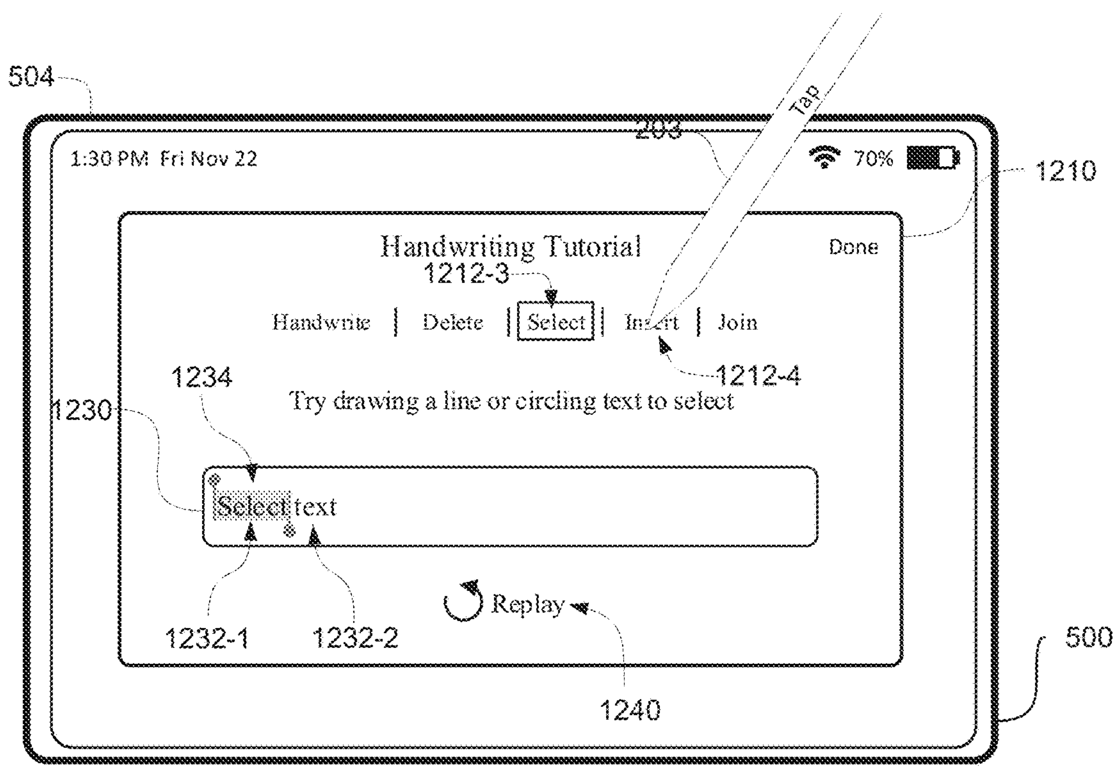
Figure 12U:
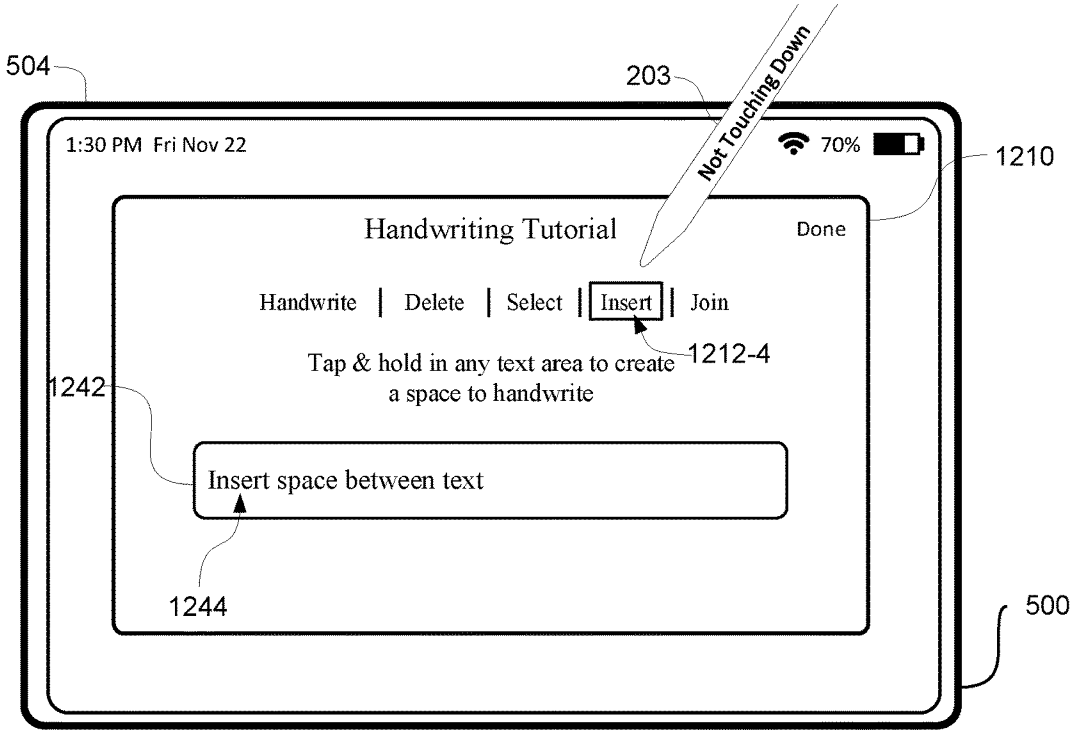
Figure 12V:
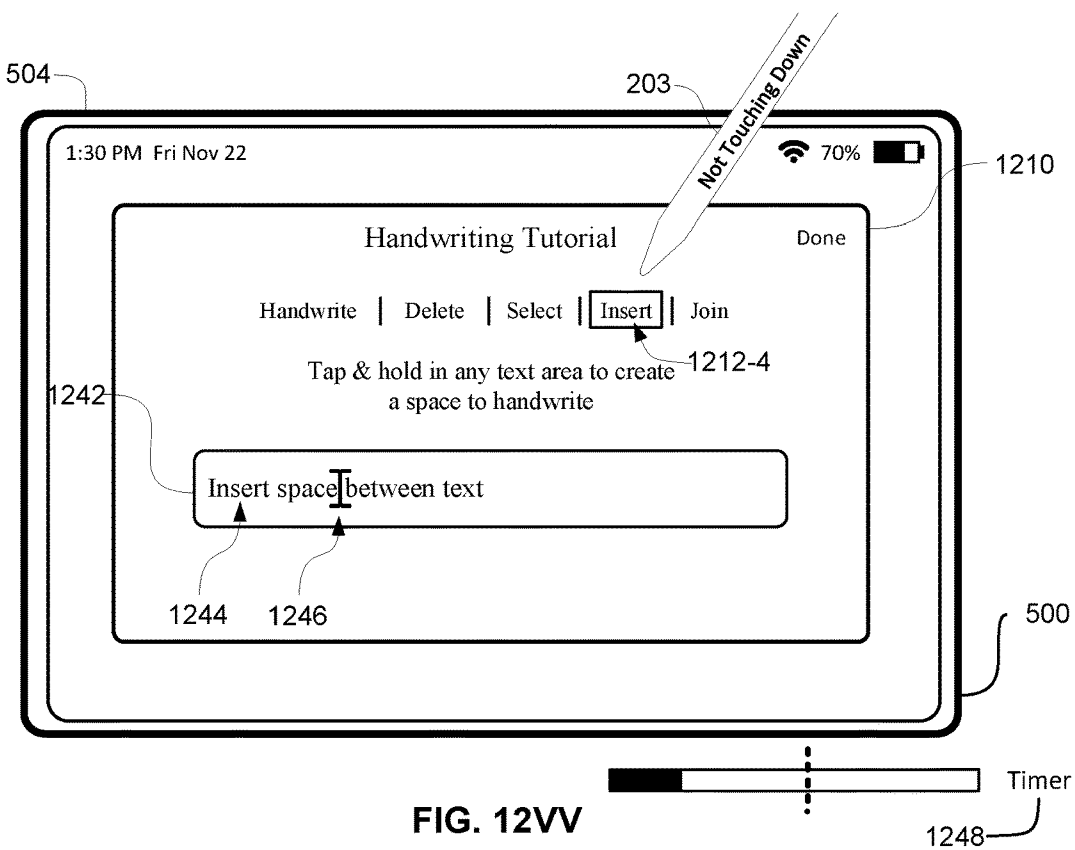
Figure 12W:
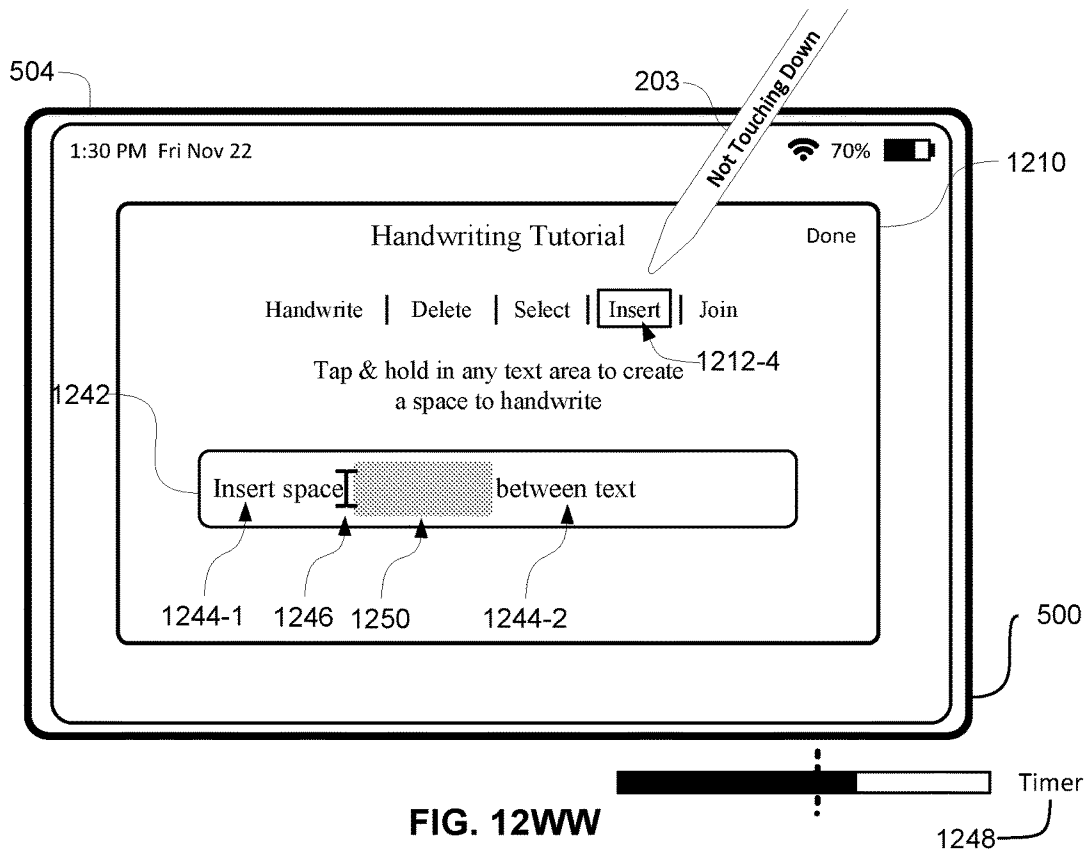
Figure 12X:
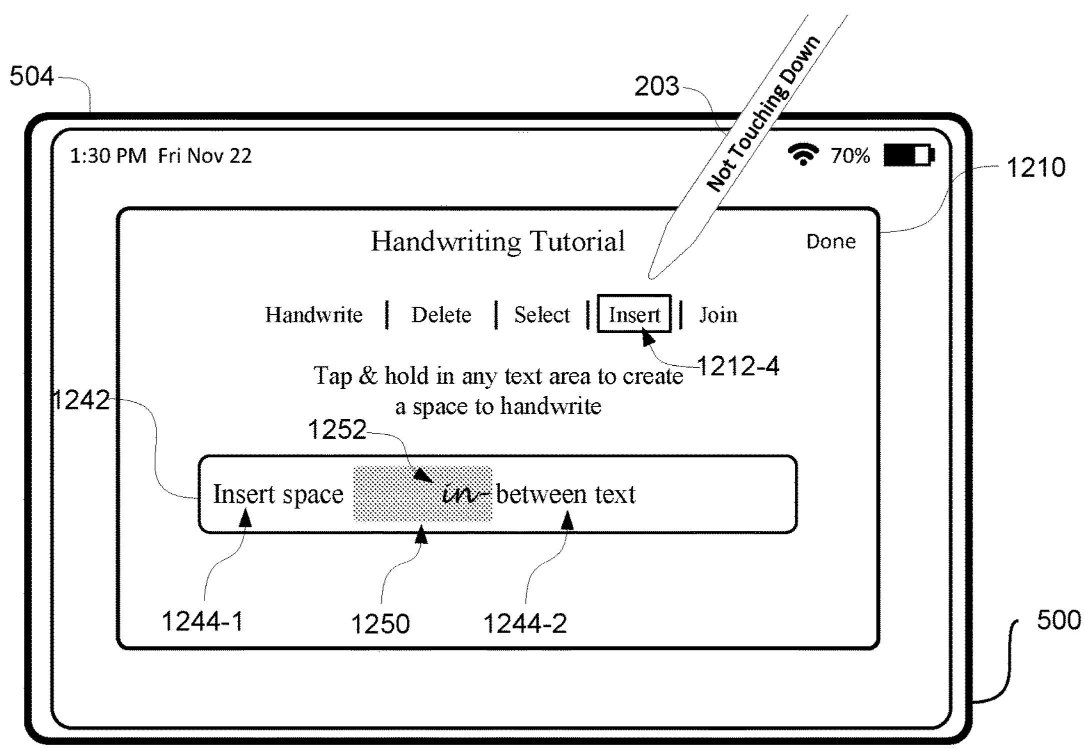
Figure 12Y:
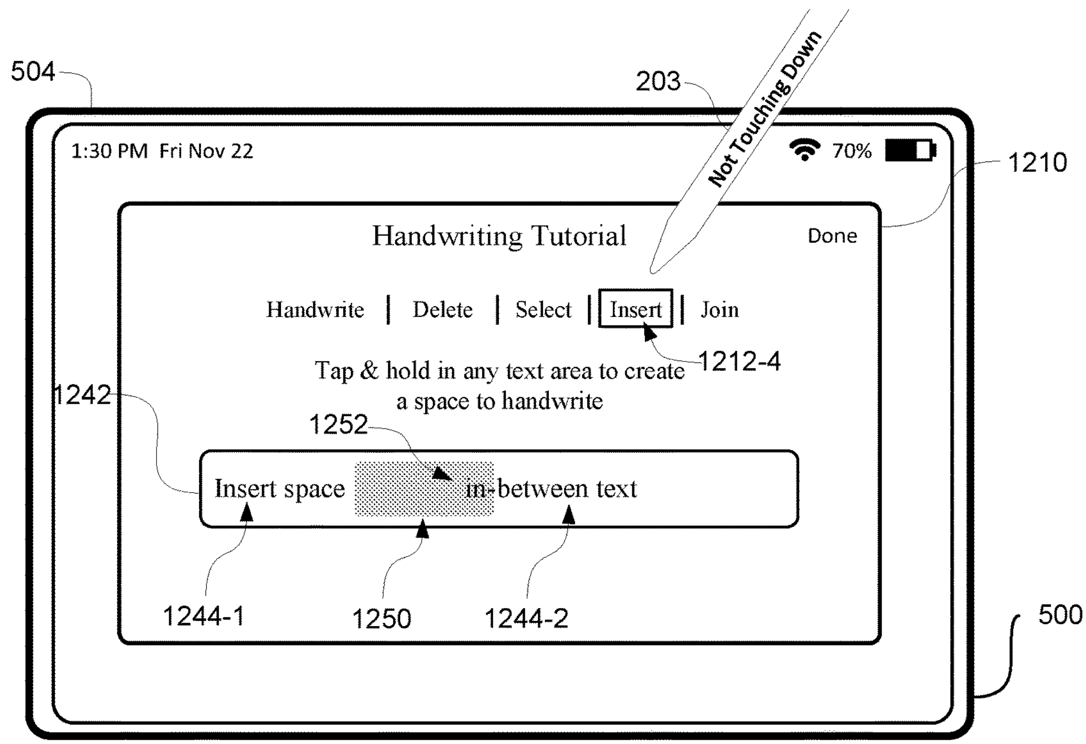
Figure 12Z:
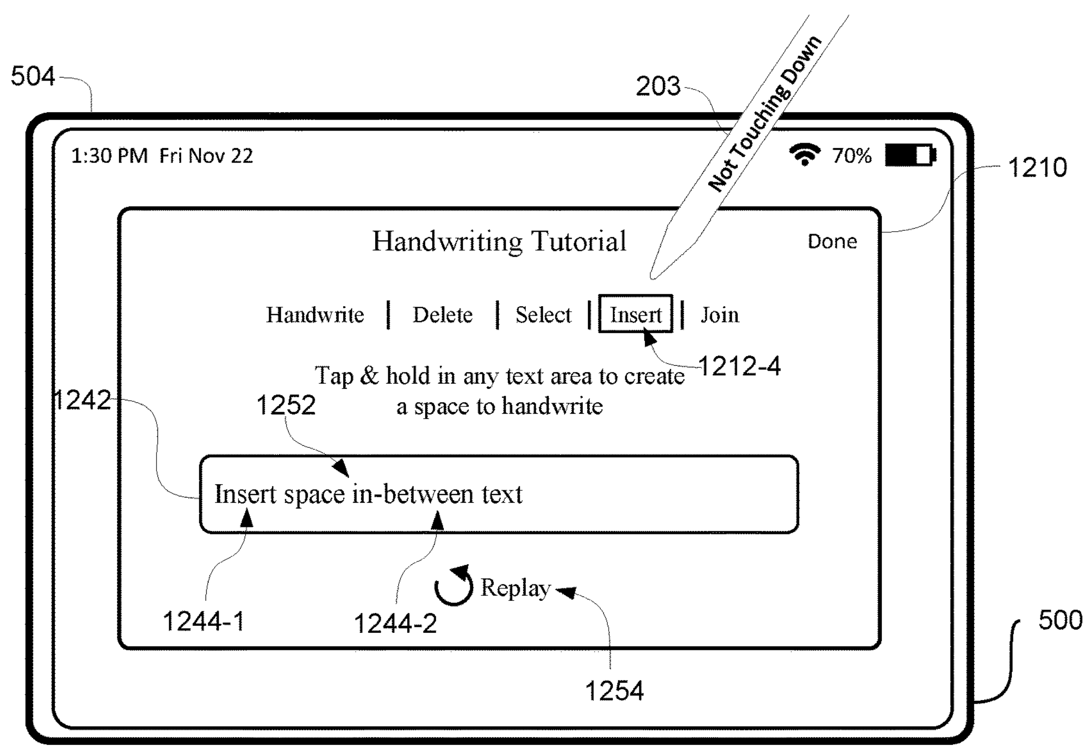
Figure 13A:
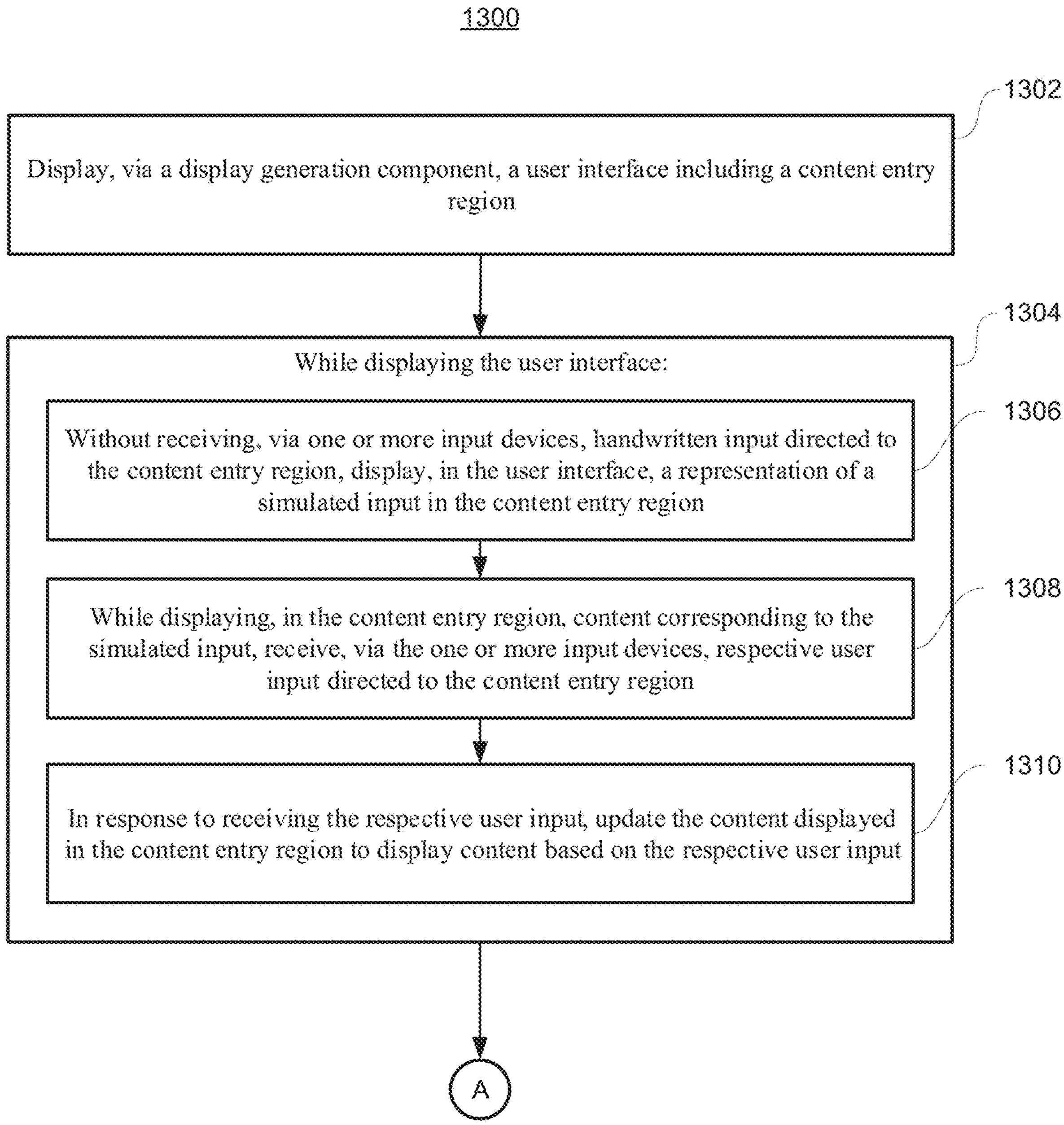
FIGS. 13A-13F are flow diagrams illustrating a method of presenting tutorials for text manipulation operations in accordance with some embodiments.
Figure 13B:
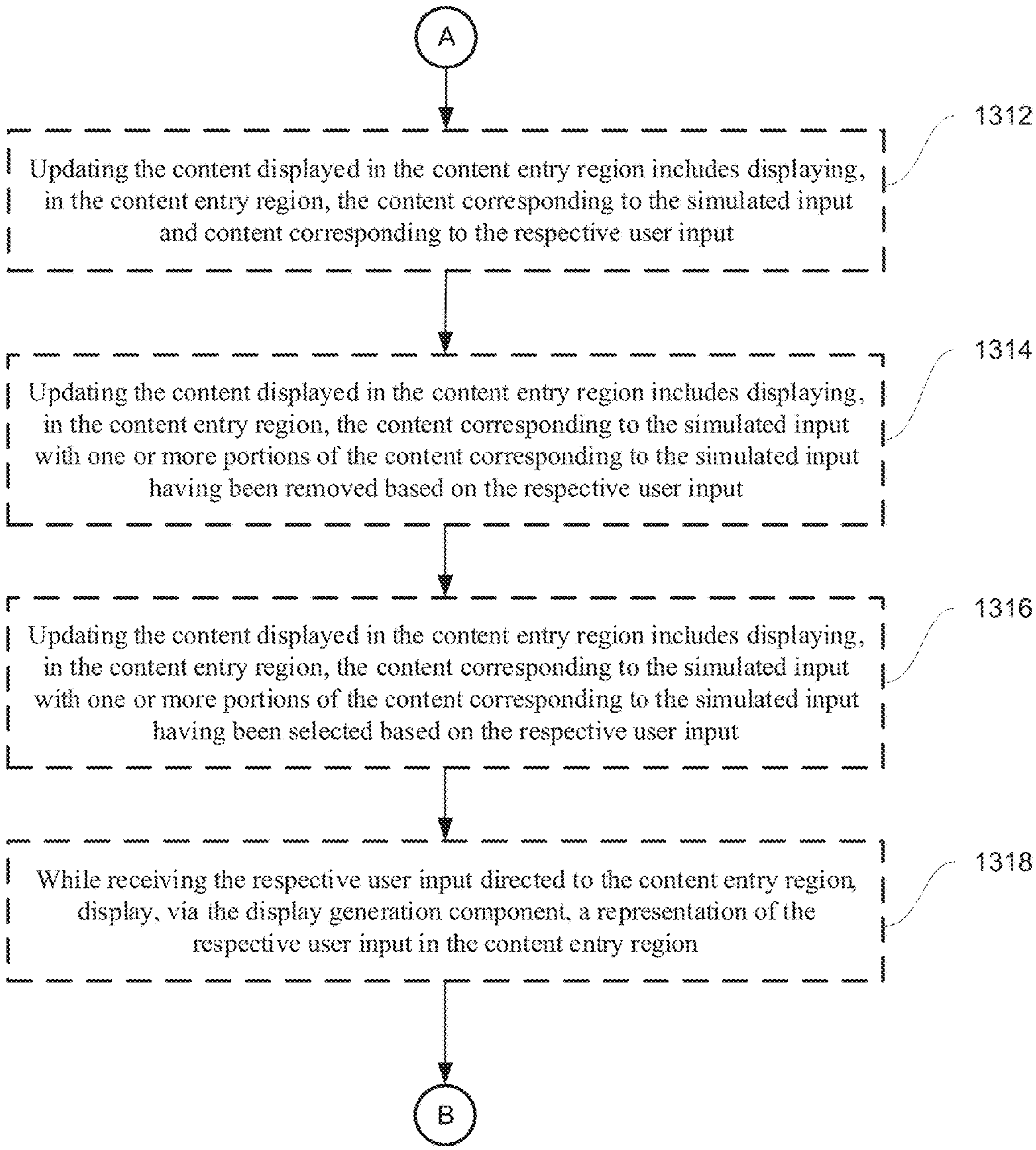
Figure 13C:
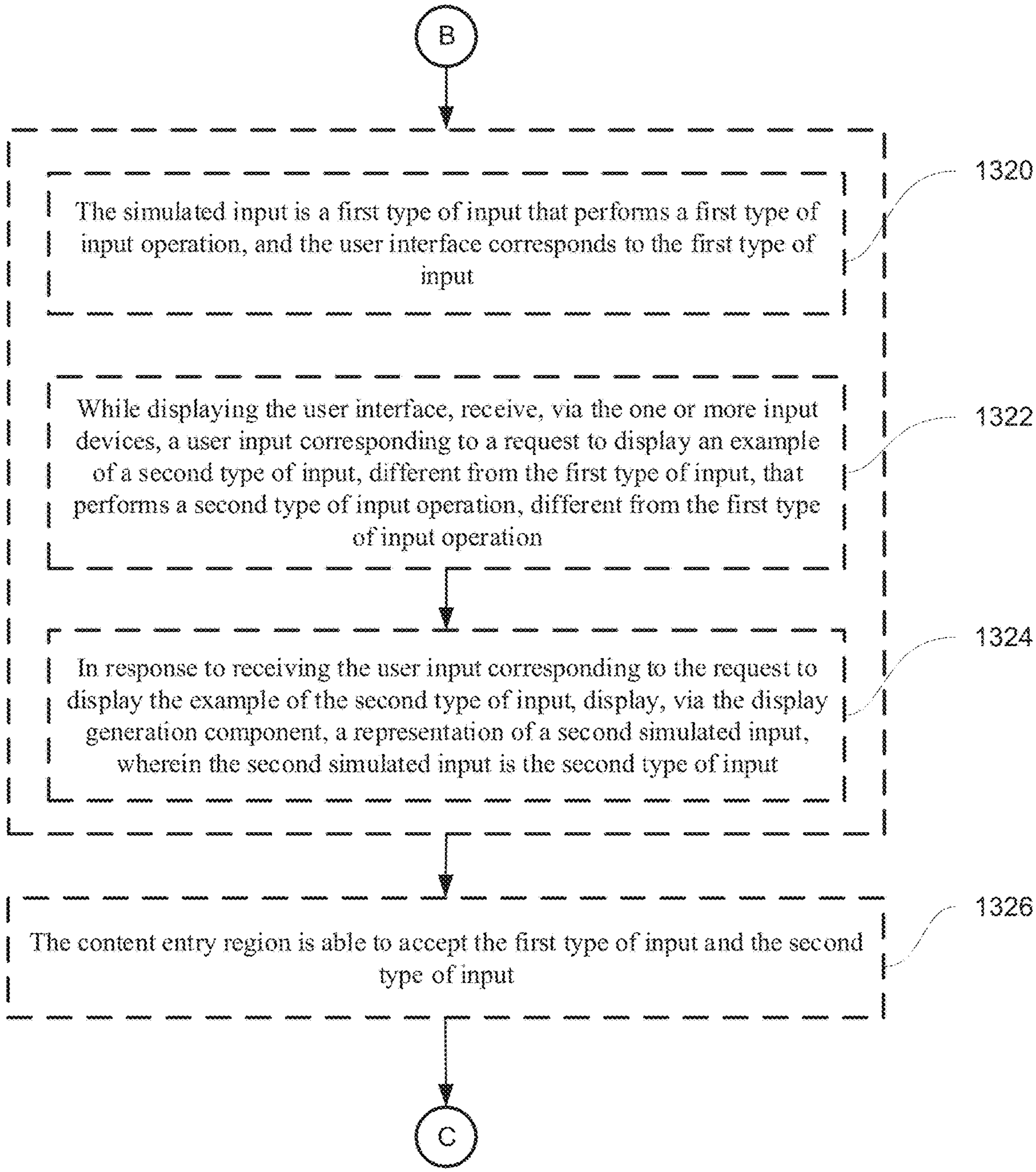
Figure 13D:
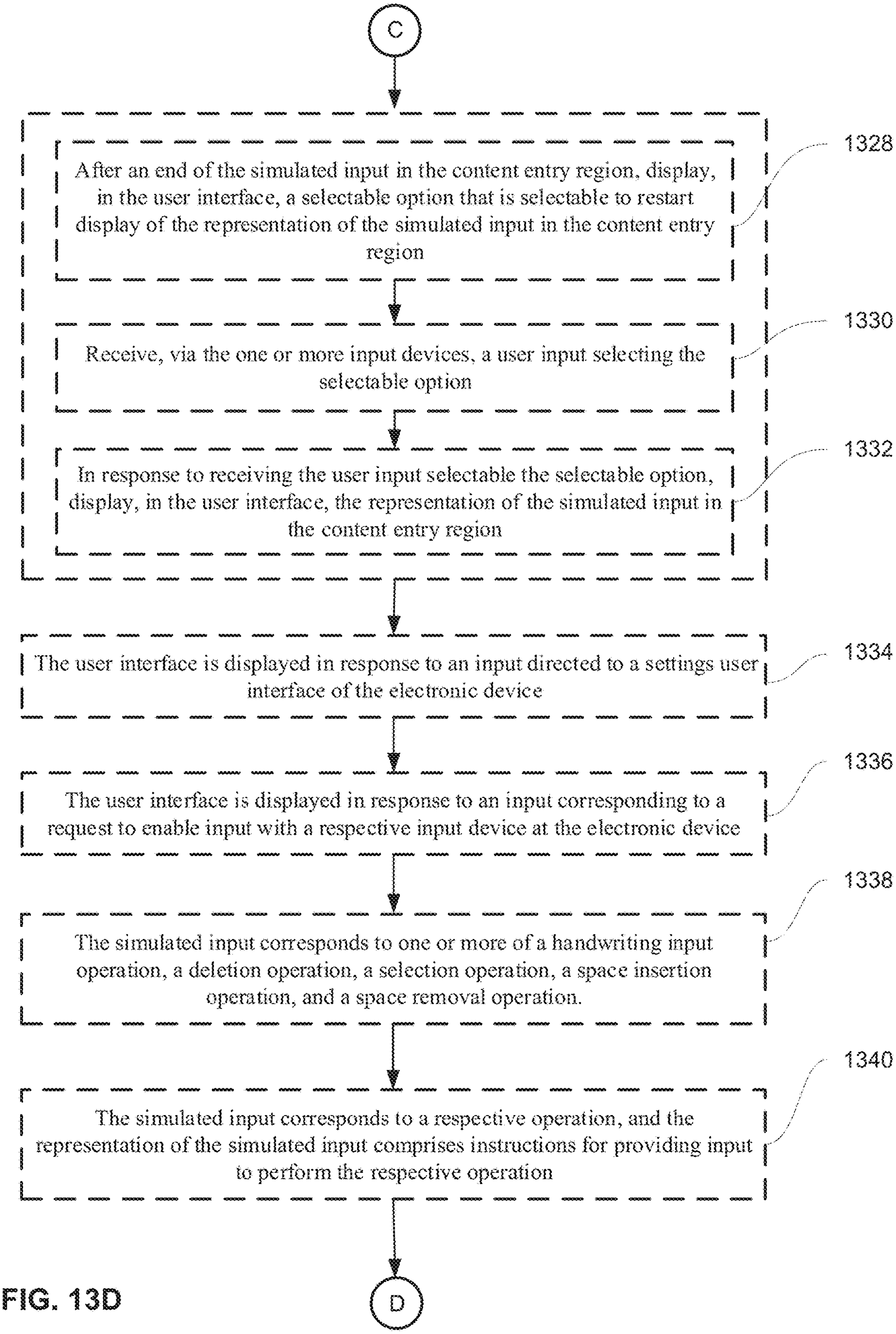
Figure 13E:
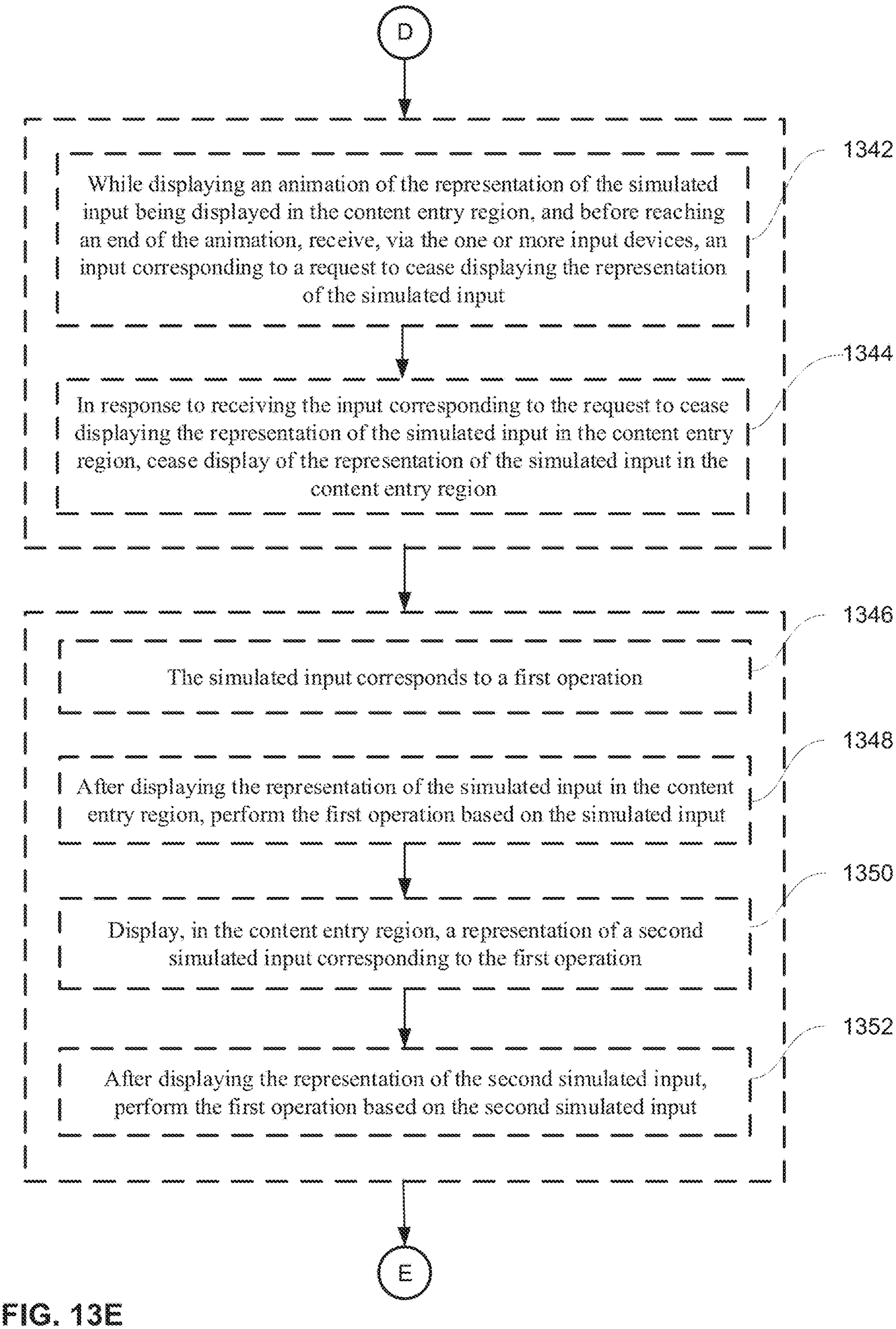
Figure 13F:
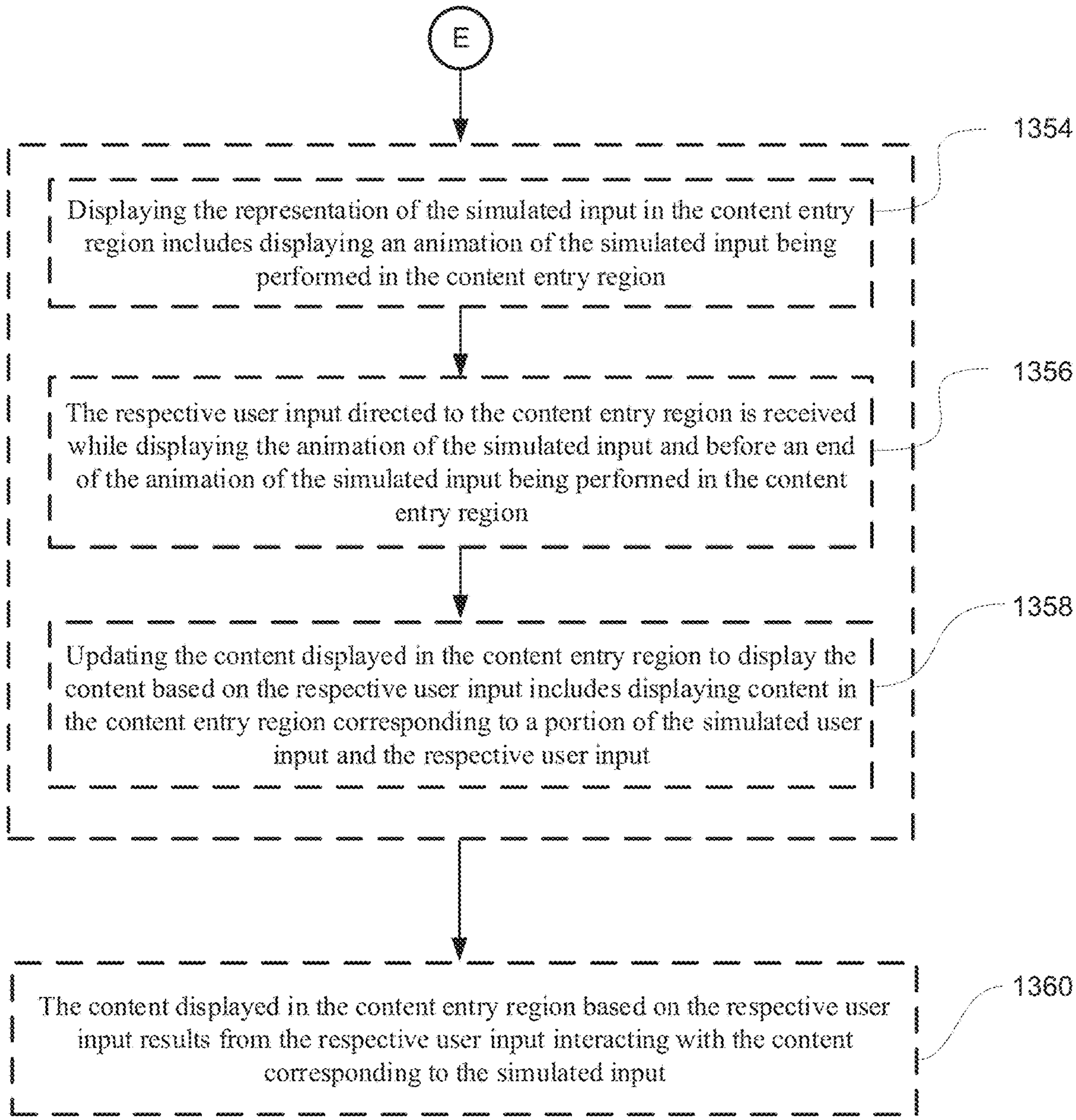

In FIG. 12XX, the animation continues and displays characters 1252 being written into user interface element 1250. In FIG. 12YY, characters 1252 has been converted into font-based text (e.g., similar to the process described above with respect to the handwriting operations). In FIG. 12ZZ, the space between first portion 1244-1 and second portion 1244-2 that has not been consumed by new characters is collapsed. Thus, as shown in FIG. 12ZZ, the words in content entry region 1242 have been aligned and extraneous spaces between first portion 1244-1, characters 1252 and second portion 1244-2 have been removed. In FIG. 12ZZ, upon completion of the animation, replay affordance 1254 is displayed.

In FIG. 12AAA, a user input is received from stylus 203 between first portion 1244-1 and second portion 1244-2 of the text in content entry region 1242 (e.g., between “Insert” and “space”). In FIG. 12AAA, the contact of stylus 203 with touch screen 504 has been held for less than a threshold amount of time. In FIG. 12BBB, the contact of stylus 203 at the location between first portion 1244-1 and second portion 1244-2 has been held for longer than a threshold amount of time (e.g., as indicated by timer 1248). In some embodiments, in response to the contact being held for longer than the threshold amount of time, space is inserted between first portion 1244-1 and second portion 1244-2 and user interface element 1250 is displayed in the inserted space indicating that the space is available to receive inputs.

In FIG. 12CCC, a user input is received from stylus 203 writing word 1256 in the space between first portion 1244-1 and second portion 1244-2. In some embodiments, while receiving the user input, if the user input begins to approach second portion 1244-2, second portion 1244-2 moves rightwards to create more space for the user input. In FIG. 12DDD, after detecting a termination of the contact of stylus 203 with touch screen 504, device 500 converts word 1256 into font-based text and collapses the space between first portion 1244-1 and second portion 1244-2 that was not consumed by word 1244-2.

In FIG. 12EEE, a user input is received from stylus 203 selecting join tab 1212-5 (although it is understood that the selection input can be received from any input device and/or a finger). In response to the user input, device 500 updates user interface 1210 to display the tutorial for the insertion operation, as shown in FIG. 12FFF. In some embodiments, a join operation (and the corresponding separation operation) is an operation in which a whitespace character is removed from two adjacent characters, thus joining the adjacent characters. In some embodiments, a separation operation is an operation in which a whitespace character is added between two adjacent characters, thus separating the adjacent characters. In some embodiments, a join operation or separation operation is performed in response to a vertical gesture received between adjacent characters. In some embodiments, a join operation is performed if there is at least one whitespace character between the adjacent characters. In some embodiments, a separation operation is performed if there are no whitespace characters between the adjacent characters.

Returning to FIG. 12GGG, content entry region 1258 is pre-populated with text 1260. In some embodiments, text 1260 reads “Join this word and separate this word”. Thus, text 1260 optionally includes instructions and/or an indication of the join operation that is or will be demonstrated.

In FIG. 12FFF, upon updating user interface 1210 to display the demonstration for the join operation, device 500 begins displaying the tutorial for performing the join operation (e.g., without additional user input). For example, in FIG. 12GGG, the tutorial animation for the join operation includes displaying a vertical gesture 1262 between words 1260-2 and 1260-3 in content entry region 1258. In some embodiments, device 500 recognizes vertical gesture 1262 as a join operation. In FIG. 12HHH, the animation continues and device 500 performs the join operation and causes the white space between words 1260-2 and 1260-3 to be removed (e.g., creating a single word, "thisword"). Thus, in some embodiments, performing a vertical swipe gesture at a location of a whitespace character (e.g., such as between two words) causes the whitespace character to be removed and the characters to the left and right of the whitespace character to be joined. In some embodiments, one whitespace character is removed at a time. In some embodiments, all whitespace characters between two adjacent characters are removed.

In FIG. 12III, the animation continues and device 500 displays a vertical gesture 1264 in the middle of word 1260-5 (e.g., between "sepa" and "rate"). In some embodiments, device 500 recognizes vertical gesture 1264 as a separation operation. In FIG. 12JJJ, the animation continues and device 500 performs the separation operation and inserts whitespace between first portion 1260-5*a* and second portion 1260-5*b* or word 1260-5 (e.g., resulting in two words: "sepa" and "rate"). Thus, in some embodiments, performing a vertical swipe gesture at a location without a whitespace character causes a whitespace character to be inserted at that location and the characters to the left and right of the location to be separated by the inserted whitespace character. In some embodiments, a single whitespace character is inserted.

In some embodiments, a further vertical gesture at that location causes the inserted whitespace character to be removed. For example, in FIG. 12KKK, a user input from stylus 203 is received drawing a vertical gesture 1262 in the space between first portion 1260-5*a* and second portion 1260-5*b* of word 1260-5. In some embodiments, in response to the user input, device 500 joins first portion 1260-5*a* and second portion 1260-5*b* (e.g., removes the whitespace between first portion 1260-5*a* and second portion 1260-5*b*), as shown in FIG. 12LLL.

FIGS. 13A-13F are flow diagrams illustrating a method 1300 of presenting tutorials for text manipulation operations. The method 1300 is optionally performed at an electronic device such as device 100, device 300, device 500, device 501, device 510, and device 591 as described above with reference to FIGS. 1A-1B, 2-3, 4A-4B and 5A-5I Some operations in method 1300 are, optionally combined and/or order of some operations is, optionally, changed.

As described below, the method 1300 provides ways to present tutorials for text manipulation operations. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., device 500) in communication with a display generation component and one or more input devices (e.g., a mobile device (e.g., a tablet, a smartphone, a media player, or a wearable device), or a computer, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.) displays (1302), via the display generation component, a user interface including a content entry region, such as user interface 1210 in FIG. 12C (e.g., a user interface with a content entry region in which a user is able to provide handwritten input, such as a text box).

In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

The content entry region optionally is similar to or has similar behaviors and functions as the content entry regions described above with respect to methods 700, 900, and 1100. In some embodiments, the user interface is a tutorial user interface for teaching the user one or more available functions associated with handwritten input.

In some embodiments, while displaying the user interface (1304) and without receiving, via the one or more input devices, handwritten input directed to the content entry region, the electronic device displays (1306), in the user interface, a representation of a simulated input in the content entry region, such as the animation of text 1216 being written into content entry region 1214 in FIGS. 12D-12E (e.g., displaying a device-generated representation of input in the content entry region). In some embodiments, the device-generated representation of input has the visual characteristic of a handwritten input (e.g., as if the input was provided by a user with a stylus and/or finger). In some embodiments, the device-generated representation of input is displayed without receiving a user input performing the handwritten input. For example, the representation is not based on a user input drawing the representation. In some embodiments, the representation of the simulated input includes an animation of the representation being drawn over time.

In some embodiments, while displaying, in the content entry region, content corresponding to the simulated input (e.g., while displaying the representation of the simulated input or while displaying an animation of the representation of the simulated input), the electronic device receives (1308), via the one or more input devices, respective user input directed to the content entry region, such as the user input writing word 1219 in FIGS. 12G-12H (e.g., receiving a user input, via a stylus and/or a finger, in or near the content entry region (e.g., within 0.5 mm, 1 mm, 3 mm, 10 mm, 3 cm, etc. of the content entry region)).

In some embodiments, the user input is a sequence of gestures, a sequence of strokes, a drawing input, or any other suitable interaction (e.g., freeform interaction) with the device (e.g., with a touch-sensitive surface in communication with the device). In some embodiments, the input interacts with the representation of the simulated input. In some embodiments, the input provides content to the content entry region in addition to the representation of the simulated input, similar to the handwritten inputs described above with respect to methods 700, 900, and 1100.

In some embodiments, in response to receiving the respective user input, the electronic device updates (1310) the content displayed in the content entry region to display content based on the respective user input, such as display of word 1219 as font-based text in FIG. 12I (e.g., display a representation of the received input in or near the content entry region based on the respective input).

The representation of the received input is optionally displayed at the location where the input was received. In some embodiments, the content based on the respective input includes handwritten text. In some embodiments, the content based on the respective input additionally or alternatively, includes a representation of font-based text corresponding to the received handwritten input (e.g., the user input has been converted to font-based text by the device). In some embodiments, the content based on the respective input includes a representation of the input gesture (e.g., not necessarily text). In some embodiments, the content includes at least a portion of the simulated input that has been manipulated by the user via the respective input (e.g., updating the content includes changing one or more visual characteristics of the representation of the simulated input). For example, if the input is a selection input on a portion of the simulated input, then updating the content includes highlighting of respective portions of the simulated input, if the input includes a deletion input on a portion of the simulated input, then updating the content includes removing the respective portions and maintaining display of the remaining portions of the simulated input that were not deleted, if the input includes the insertion of content, then updating the content includes displaying the newly inserted content (optionally concurrently with at least a portion of the representation of the simulated input), etc.

The above-described manner of providing a handwritten input tutorial (e.g., by displaying a simulated input in a content entry region that is able to additionally accept user handwritten inputs) provides a quick and efficient method of demonstrating available handwritten functions (e.g., while concurrently providing the user with the ability to test the demonstrated functions in the same content entry region), which simplifies the interaction between the user and the electronic device and enhances the operability of the electronic device and makes the user-device interface more efficient (e.g., without requiring the user to perform additional inputs to display a content entry region to test the functions that were demonstrated to the user), which additionally reduces power usage and improves battery life of the electronic device by enabling the user to use the electronic device more quickly and efficiency.

In some embodiments, updating the content displayed in the content entry region includes displaying, in the content entry region, the content corresponding to the simulated input and content corresponding to the respective user input (1312), such as display of text 1216 and word 1219 in content entry region 1214 in FIG. 12I (e.g., updating the content includes displaying new content or modifying the content that was in the content entry region at the time that the respective input was received).

For example, if the respective user input is a content entry user input, then updating the content includes displaying a representation of the user input and the representation of the simulated input. In some embodiments, if the respective user input is a manipulation of the representation of the simulated input, such as a highlighting input, then updating the content includes displaying a highlighting on at least a portion of the representation of the simulated input. In another example, if the respective user input is a deletion input, then updating the content includes deleting at least a portion of the representation of the simulated input. In some embodiments, in accordance with a determination that the respective user input is first input, the content displayed in the content entry region is first content that corresponds to the first input and the simulated user input and in accordance with a determination that the respective user input is second input that is different from the first input, the content displayed in the content entry region is second content that corresponds to the second input and the simulated user input.

The above-described manner of providing a handwritten input tutorial (e.g., by displaying a simulated input in a content entry region, accepting a user input in the content entry region, and updating the content in the content entry region in accordance with the user input) provides a quick and efficient method of demonstrating available handwritten functions (e.g., while concurrently providing the user with the ability to test the demonstrated functions in the same content entry region), which simplifies the interaction between the user and the electronic device and enhances the operability of the electronic device and makes the user-device interface more efficient (e.g., without requiring the user to perform additional inputs to display a content entry region to test the functions that were demonstrated to the user), which additionally reduces power usage and improves battery life of the electronic device by enabling the user to use the electronic device more quickly and efficiency.

In some embodiments, updating the content displayed in the content entry region includes displaying, in the content entry region, the content corresponding to the simulated input with one or more portions of the content corresponding to the simulated input having been removed based on the respective user input (1314), such as the removal of word 1224-3 in FIG. 12BB (e.g., if the respective input is a request to remove a portion of the simulated input, then updating the content includes removing the respective portions of the simulated input). In some embodiments, the respective input corresponding to a request to remove a portion of the simulated input includes an input crossing out the portion of the simulated input. For example, a horizontal or vertical gesture that crosses across the portion of the simulated input multiple times is interpreted as a request to delete the portion of the simulated input.

The above-described manner of providing a tutorial for performing a deletion command (e.g., by receiving a user input corresponding to a deletion command and removing respective portions of the content in the content entry region) provides a quick and efficient method of demonstrating the deletion command (e.g., providing the user with the ability to test the deletion command in the same content entry region that demonstrated the deletion command), which simplifies the interaction between the user and the electronic device and enhances the operability of the electronic device and makes the user-device interface more efficient (e.g., without requiring the user to perform additional inputs to test the deletion command in another content entry region), which additionally reduces power usage and improves battery life of the electronic device by enabling the user to use the electronic device more quickly and efficiency.

In some embodiments, updating the content displayed in the content entry region includes displaying, in the content entry region, the content corresponding to the simulated input with one or more portions of the content corresponding to the simulated input having been selected based on the respective user input (1316), such as the selection of word 1232-2 in FIG. 12QQ (e.g., if the respective input is a request to select a portion of the simulated input, then updating the content includes selecting (e.g., highlighting) the portion of the simulated input).

In some embodiments, highlighting the portion of the simulated input includes displaying a color behind or in front of the portion of the simulated input (e.g., yellow highlighting, grey highlighting, etc.). In some embodiments, while the one or more portions of the content is selected (e.g., highlighted), a selection input (e.g., a tap input) on the one or more portions of the content causes display of a user interface that includes one or more options for performing one or more operations associated with the one or more portions of the content (e.g., cut, copy, delete, duplicate, etc.) as described above with respect to method 700.

The above-described manner of providing a tutorial for performing a selection command (e.g., by receiving a user input corresponding to a selection command and selecting respective portions of the content in the content entry region) provides a quick and efficient method of demonstrating the selection command (e.g., providing the user with the ability to test the selection command in the same content entry region that demonstrated the selection command), which simplifies the interaction between the user and the electronic device and enhances the operability of the electronic device and makes the user-device interface more efficient (e.g., without requiring the user to perform additional inputs to test the selection command in another content entry region), which additionally reduces power usage and improves battery life of the electronic device by enabling the user to use the electronic device more quickly and efficiency.

In some embodiments, while receiving the respective user input directed to the content entry region, the electronic device displays (1318), via the display generation component, a representation of the respective user input in the content entry region, such as representation of gesture 1230 in FIG. 12AA (e.g., while receiving the user input, display feedback that indicates the type of command or operation that is being performed or will be performed in response to the user input).

For example, if the user input is a content entry input, then the representation of the respective user input is a drawing in the content entry region based on the user input. In some embodiments, if the user input is a highlighting input, then the representation of the respective user input is an expansion of a highlighting on the portions of the text in the content entry region that the highlighting input is selecting. In some embodiments, if the user input is a deletion input, then the representation of the respective user input is a drawing of the user input crossing out the respective portions of the text, optionally including changing a color of the respective portions of the text (e.g., greying out the text). In some embodiments, the feedback that is displayed while receiving the respective user input is also displayed for the simulated input (e.g., indicating the type of operation that is being performed or will be performed by the simulated input if the simulated input includes an animation of an operation being performed).

The above-described manner of providing feedback to the user (e.g., by displaying a representation of the user input that is based on the type of operation that is or will be performed as the user input is being received) provides a quick and efficient method of indicating the command that is or will be performed, which simplifies the interaction between the user and the electronic device and enhances the operability of the electronic device and makes the user-device interface more efficient (e.g., by providing visual feedback of how the user's inputs are interpreted), which additionally reduces power usage and improves battery life of the electronic device by enabling the user to use the electronic device more quickly and efficiency.

In some embodiments, the simulated input is a first type of input that performs a first type of input operation, and the user interface corresponds to the first type of input (1320), such as the performance of the deletion operation in the user interface for demonstrating the deletion operation in FIG. 12Z (e.g., the simulated input is displayed on a user interface for a respective type of handwritten input). In some embodiments, the device displays different user interfaces as a tutorial for different types of handwritten inputs. Different types of handwritten inputs optionally include a selection input, a deletion input, a space insertion input, a space deletion input, an input for inserting font-based text, etc.

In some embodiments, while displaying the user interface, the electronic device receives (1322), via the one or more input devices, a user input corresponding to a request to display an example of a second type of input, different from the first type of input, that performs a second type of input operation, different from the first type of input operation, such as selection of the selection tab 1212-3 in FIG. 12GG (e.g., receiving a user input selecting an option to display a tutorial for a different type of user input). For example, while displaying the user interface that includes a tutorial for performing a deletion input, receiving a user input requesting display of the tutorial for performing a selection input.

In some embodiments, in response to receiving the user input corresponding to the request to display the example of the second type of input, the electronic device displays (1324), via the display generation component, a representation of a second simulated input, wherein the second simulated input is the second type of input, such as the display of the tutorial for the selection operation in FIGS. 12II-12LL (e.g., displaying an animation of a second simulated user input in the second content entry region).

In some embodiments, the animation of the second simulated user input is a tutorial for performing the input of the second type (e.g., a different command or operation). For example, the animation is a tutorial of how to perform a selection command or a deletion command, etc. In some embodiments, the example is displayed in the same content entry region that displayed the first simulated input. In some embodiments, the example is displayed in a content entry region different than the content entry region that displayed the first simulated input. In some embodiments, the example is displayed in a user interface different than the user interface that displayed the first simulated input (e.g., a different page, a different tab of the tutorial).

The above-described manner of providing a handwritten input tutorial (e.g., by displaying tutorials of different commands on different user interfaces) provides a quick and efficient method of demonstrating available handwritten functions (e.g., by providing the option to select which tutorial to view by selecting the appropriate user interface), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the content entry region is able to accept the first type of input and the second type of input (1326) (e.g., the content entry region is able to receive both the first and second types of inputs corresponding to a first or second operation (or optionally any type of input corresponding to any type of operation)). For example, if the content entry region is presenting a tutorial of a selection command, the content entry region is able to receive selection commands from a user input as well as commands other than selection commands, such as deletion commands, insertion commands, content insertion commands, etc. Thus, in some embodiments, the content entry region is not restricted to only the operation that is being presented.

The above-described manner of providing a handwritten input tutorial (e.g., by accepting different types of input commands regardless of the user interface that is being displayed) provides a quick and efficient method of testing different handwritten functions (e.g., accepting commands other than the one that is being demonstrated, without requiring the user to switch to the respective user interface to test different commands), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, after an end of the simulated input in the content entry region, the electronic device displays (1328), in the user interface, a selectable option that is selectable to restart display of the representation of the simulated input in the content entry region, such as display of replay affordance 1218 in FIG. 12F (e.g., after the end of the animation of the simulated input (or near the end of the animation), display a selectable option to restart the animation).

In some embodiments, the electronic device receives (1330), via the one or more input devices, a user input selecting the selectable option (e.g., a tap input from a stylus or a finger on the selectable option). In some embodiments, in response to receiving the user input selectable the selectable option, the electronic device displays (1332), in the user interface, the representation of the simulated input in the content entry region, such as the replaying of the handwriting tutorial in FIG. 12K (e.g., restarting the animation of the simulated input). In some embodiments, restarting the animation includes removing the content in the content entry region (e.g., optionally all content, including content inserted in the content entry region by the user) and then displaying the representation of the simulated input in the content entry region.

The above-described manner of displaying handwritten input tutorial (e.g., by providing a selectable option that is selectable to restart the tutorial) provides a quick and efficient method of demonstrating handwritten operations (e.g., by providing a method to rewatch the demonstration), which simplifies the interaction between the user and the electronic device and enhances the operability of the electronic device and makes the user-device interface more efficient (e.g., without requiring the user to navigate away from and back to the user interface to replay the tutorial), which additionally reduces power usage and improves battery life of the electronic device by enabling the user to use the electronic device more quickly and efficiency.

In some embodiments, the user interface is displayed in response to an input directed to a settings user interface of the electronic device (1334), such as via selection of selectable option 1208 on settings user interface 1200 in FIG. 12B (e.g., the user interface for the tutorials is displayed in response to a user input on a settings user interface). In some embodiments, a settings user interface for a stylus includes a selectable option to display the user interface to provide a tutorial of the features available with the stylus.

The above-described manner of providing a handwritten input tutorial (e.g., by displaying the user interface from the settings user interface) provides a quick and efficient method of accessing the handwritten input tutorials (e.g., from the settings user interface for handwritten inputs), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the user interface is displayed in response to an input corresponding to a request to enable input with a respective input device (e.g., with a stylus) at the electronic device (1336), such as enabling settings option 1206 in user interface 1200 illustrated in FIG. 12B (e.g., in response to the first time a stylus is connected with the electronic device or in response to a user input enabling the use of a stylus with the electronic device).

In some embodiments, the tutorial user interface is displayed in response to a user enabling respective features. For example, a settings user interface for a stylus includes one or more options to enable respective functionality such as selection, deletion, handwriting, etc. Upon receiving a user input enabling these functions (e.g., a single option that enables all functions, or a plurality of options each corresponding to a respective function), the device displays the user interface to display a tutorial of how to perform the respective function(s). In some embodiments, the user interface is only automatically displayed in response to the a predetermined number of times the user enables the respective functionality for with the respective input device (e.g., only the first time, only the first and second time, or only the first five times that the user enables the respective functionality for with the respective input device).

The above-described manner of providing a handwritten input tutorial (e.g., by displaying the tutorial in response to the user enabling handwritten functions) provides a quick and efficient method of demonstrating the handwritten features (e.g., immediately after the user enables the handwritten features), which simplifies the interaction between the user and the electronic device (e.g., because the user does not need to navigate through multiple menus and user interface screens to manually invoke the tutorial user interface) and enhances the operability of the electronic device and makes the user-device interface more efficient, which additionally reduces power usage and improves battery life of the electronic device by enabling the user to use the electronic device more quickly and efficiency.

In some embodiments, the simulated input corresponds to one or more of a handwriting input operation, a deletion operation, a selection operation, a space insertion operation, and a space removal operation (1338), such as illustrated by handwriting tab 1212-1, deletion tab 1212-2, selection tab 1212-3, insertion tab 1212-4, and join tab 1212-5 in FIG. 12C (e.g., the one or more types of inputs that are demonstrated include a handwriting input (e.g., converting handwritten inputs to font-based text), a deletion input (e.g., deleting handwritten inputs or font-based text), selection input (e.g., selecting handwritten inputs or font-based text), a space insertion input (e.g., inserting a whitespace character between two text characters), and/or a space removal input (e.g., removing a whitespace character)).

The above-described manner of providing a handwritten input tutorials of different operations (e.g., handwriting, deletion, selection, space insertion, and space removal operations) provides a quick and efficient method of demonstrating different handwritten functions (e.g., by displaying multiple tutorials of multiple different possible operations), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the simulated input corresponds to a respective operation, and the representation of the simulated input comprises instructions for providing input to perform the respective operation (1340), such as text 1214 displaying instructions for performing the handwriting operation in FIG. 12E (e.g., the representation of the simulated input itself includes instructions for how to perform the respective operation that the representation is demonstrating). In some embodiments, the instructions are textual instructions. For example, the representation of the simulated input includes the text, "draw a line through text to select" when demonstrating the selection operation.

The above-described manner of providing a handwritten input tutorial (e.g., by displaying textual instructions for how to perform a handwritten operation) provides a quick and efficient method of demonstrating different handwritten operations (e.g., by providing both an animated demonstration and textual instructions), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, while displaying an animation of the representation of the simulated input being displayed in the content entry region, and before reaching an end of the animation, the electronic device receives (1342), via the one or more input devices, an input corresponding to a request to cease displaying the representation of the simulated input, such as the contact of stylus 203 interrupting the animation in FIG. 12L (e.g., while the animation of the demonstration is in progress, receiving a user input directed to the content entry region). For example, a user input inserting content into the content entry region or a user input performing an operation on text in the content entry region.

In some embodiments, in response to receiving the input corresponding to the request to cease displaying the representation of the simulated input in the content entry region, the electronic device ceases (1344) display of the representation of the simulated input in the content entry region, such as the removal of text 1216 in FIG. 12M (e.g., pausing the animation of the demonstration and/or removing the representation of the simulated input). In some embodiments, in response to receiving the input, a selectable option is displayed in the user interface that is selectable to replay the animation.

The above-described manner of terminating the handwriting tutorial (e.g., in response to a request to cease the handwriting tutorial) simplifies the interaction between the user and the electronic device and enhances the operability of the electronic device and makes the user-device interface more efficient (e.g., without requiring for the animation to end and without requiring additional inputs to navigate away from the user interface to terminate the tutorial), which additionally reduces power usage and improves battery life of the electronic device by enabling the user to use the electronic device more quickly and efficiency.

In some embodiments, the simulated input corresponds to a first operation (1346). In some embodiments, after displaying the representation of the simulated input in the content entry region, the electronic device performs (1348) the first operation based on the simulated input, such as the conversion of text 1216 into font-based text in FIG. 12F (e.g., displaying a first animation for performing the first operation on the simulated input). For example, displaying an animation of an input performing a horizontal gesture on text and causing the text to be selected (e.g., highlighted).

In some embodiments, the electronic device displays (1350), in the content entry region, a representation of a second simulated input corresponding to the first operation, such as the display of a second animation for a second way of performing the selection operation in FIGS. 12MM-12OO (e.g., displaying a second animation for performing the first operation on the simulated input). In some embodiments, the device recognizes two types of gestures as requesting the same operation and thus the user interface optionally displays a demonstration of both gestures. For example, a selection operation is performed in response to both a user input performing a horizontal gesture across a portion of text and a user input circling the portion of text.

In some embodiments, after displaying the representation of the second simulated input, the electronic device performs (1352) the first operation based on the second simulated input, such as in FIG. 12OO (e.g., after displaying the second animation, performing the first operation).

The above-described manner of providing a handwritten input tutorial (e.g., by displaying demonstrations of multiple gestures that cause the same operation to be performed) provides a quick and efficient method of demonstrating handwritten functions (e.g., by displaying different gestures that perform the same operation, without requiring the user to separately determine what gestures are available for performing certain operations), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, displaying the representation of the simulated input in the content entry region includes displaying an animation of the simulated input being performed in the content entry region (1354), such as the animation of text 1216 changing into font-based text in FIG. 12F (e.g., displaying an animation of the input and the corresponding operation associated with the input).

In some embodiments, the respective user input directed to the content entry region is received while displaying the animation of the simulated input and before an end of the animation of the simulated input being performed in the content entry region (1356), such as the contact of stylus 203 interrupting the animation in FIGS. 12L-12M (e.g., receiving a user input while the animation is in progress).

In some embodiments, updating the content displayed in the content entry region to display the content based on the respective user input includes displaying content in the content entry region corresponding to a portion of the simulated user input and the respective user input (1358), such as the display of word 1220 in FIG. 12M (e.g., updating the content in the content entry region in accordance with the user input).

In some embodiments, updating the content includes pausing the animation of the simulated input at the time that the user input was received. In some embodiments, content that was displayed in the content entry region when the user input is received (e.g., due to the animation) is maintained in the content entry region. In some embodiments, a representation of the user input is displayed in the content entry region. In some embodiments, an operation corresponding to the user input is performed on at least a portion of the content. For example, if the animation of the simulated input includes displaying text being written into the content entry region and a user input is received after a first word has been inserted into the content entry region by the animation, but not any other words, then if the user input is a selection input on the first word, then the first word is selected. In some embodiments, the animation is paused when the user input is received and thus the second word that otherwise would be displayed in the content entry region by the animation is not displayed. In some embodiments, if the user input is a deletion input on the first word, then the first word is deleted. Thus, even while the animation is in progress, the content inserted into the content entry region by the animation is interactable by the user as if the user inserted the content (e.g., as if it were not a simulation).

The above-described manner of providing a handwritten input tutorial (e.g., by displaying a demonstration of an handwritten operation that can be interrupted by a user input) provides a quick and efficient method of demonstrating handwritten operations (e.g., by allowing the user to perform inputs, such as to test the handwritten operations, while the animation of the tutorial is in progress, without requiring the user to wait until the tutorial completes), which simplifies the interaction between the user and the electronic device and enhances the operability of the electronic device and makes the user-device interface more efficient (e.g., by reducing the total amount of time needed to interact with the device by allowing a user to immediately interact with the content entry region without waiting for the tutorial to complete and/or without providing a dedicated affordance to terminate the animation), which additionally reduces power usage and improves battery life of the electronic device by enabling the user to use the electronic device more quickly and efficiency.

In some embodiments, the content displayed in the content entry region based on the respective user input results from the respective user input interacting with the content corresponding to the simulated input (1360), such as the user performing the deletion operation on word 1224-3 in FIGS. 12AA-12BB (e.g., the user is able to interact with the content that is displayed in the content entry region due to the simulated input (e.g., the content that is inserted by the simulated input)).

For example, if the simulated input includes inserting one or more text characters in the content entry region, then a user is able to perform one or more operations on the text characters. Thus, in some embodiments, the content inserted into the content entry region by the simulated input is interactable by the user as if the user inserted the content (e.g., as if it were not a simulation).

The above-described manner of providing a handwritten input tutorial (e.g., by displaying a demonstration of an handwritten operation that includes inserting content into a content entry region, which the user is able to interact with) provides a quick and efficient method of demonstrating handwritten operations (e.g., by providing a mechanism for the user to mimic the handwritten operations on the same content on which the demonstration simulated the handwritten operation), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

It should be understood that the particular order in which the operations in FIGS. 13A-13F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1500, and 1700) are also applicable in an analogous manner to method 1300 described above with respect to FIGS. 13A-13F. For example, the operation of the electronic device presenting tutorials for text manipulation operations described above with reference to method 1300 optionally has one or more of the characteristics of selecting and providing for interaction with handwritten content, generating normalized shapes based on handwritten inputs, identifying actionable text within handwritten content, displaying visual feedback of text manipulation operations, selecting units of content, etc., described herein with reference to other methods described herein (e.g., methods 700, 900, 1100, 1500, and 1700). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5I) or application specific chips. Further, the operations described above with reference to FIGS. 13A-13F are, optionally, implemented by components depicted in FIGS. 1A-1B. For example, displaying operations 1302, 1306, 1318, 1324, 1328, 1332, and 1350, and receiving operations 1308, 1322, 1330, and 1342 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Providing Visual Feedback of Text Manipulation Operations

Users interact with electronic devices in many different manners, including performing manipulation operations on text, such as selecting and deleting text. In some embodiments, an electronic device receives inputs from a handwriting input device such as a stylus and performs corresponding manipulation operations based on the input received from the handwriting input device. In some embodiments, the initial portion of a gesture to perform one operation can be similar to the initial portion of a gesture to perform a different operation. The embodiments described below provide ways in which an electronic device provides visual feedback of the operation to be performed based on the user's input gesture, thus enhancing the user's interactions with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 14A:
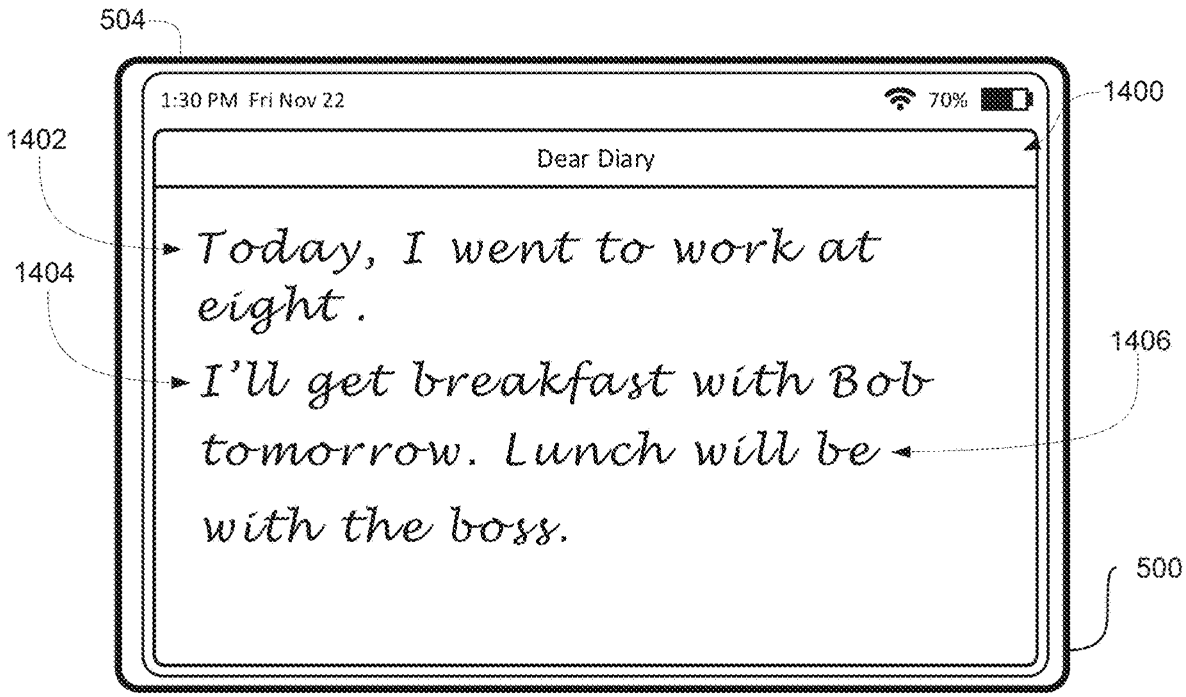
FIGS. 14A-14O illustrate exemplary ways in which an electronic device displays visual feedback of text manipulation operations in accordance with some embodiments.
Figure 14B:
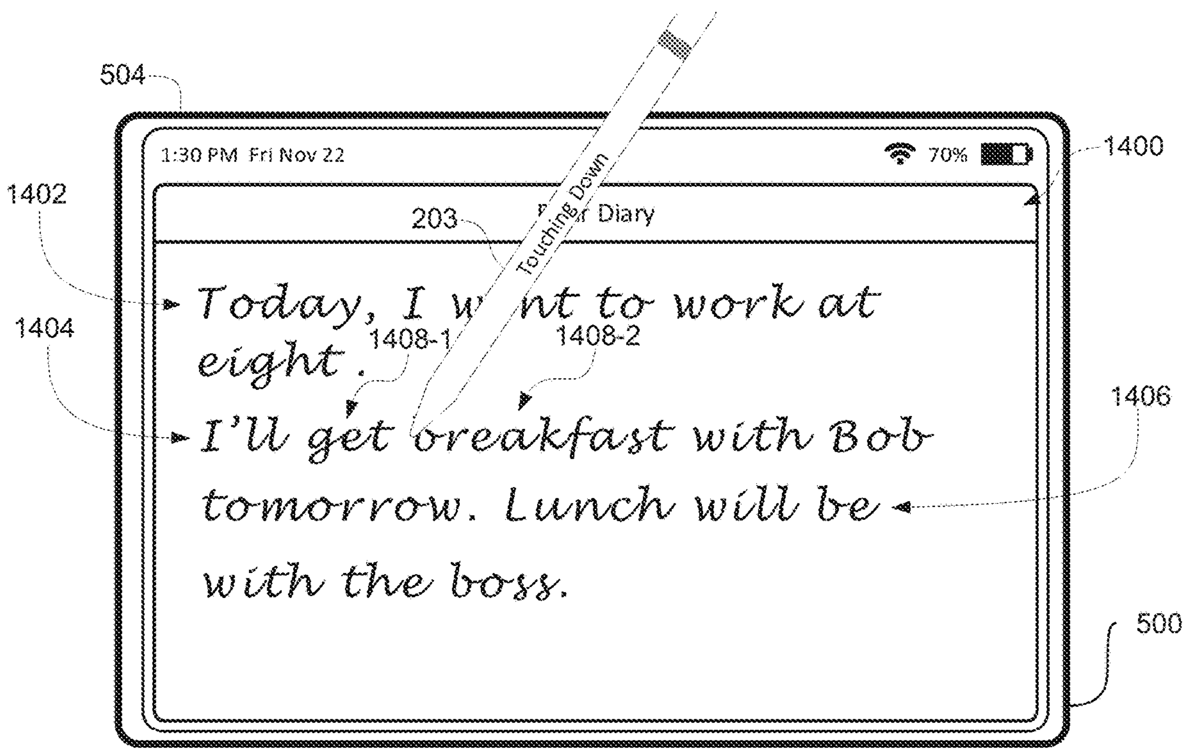
Figure 14C:
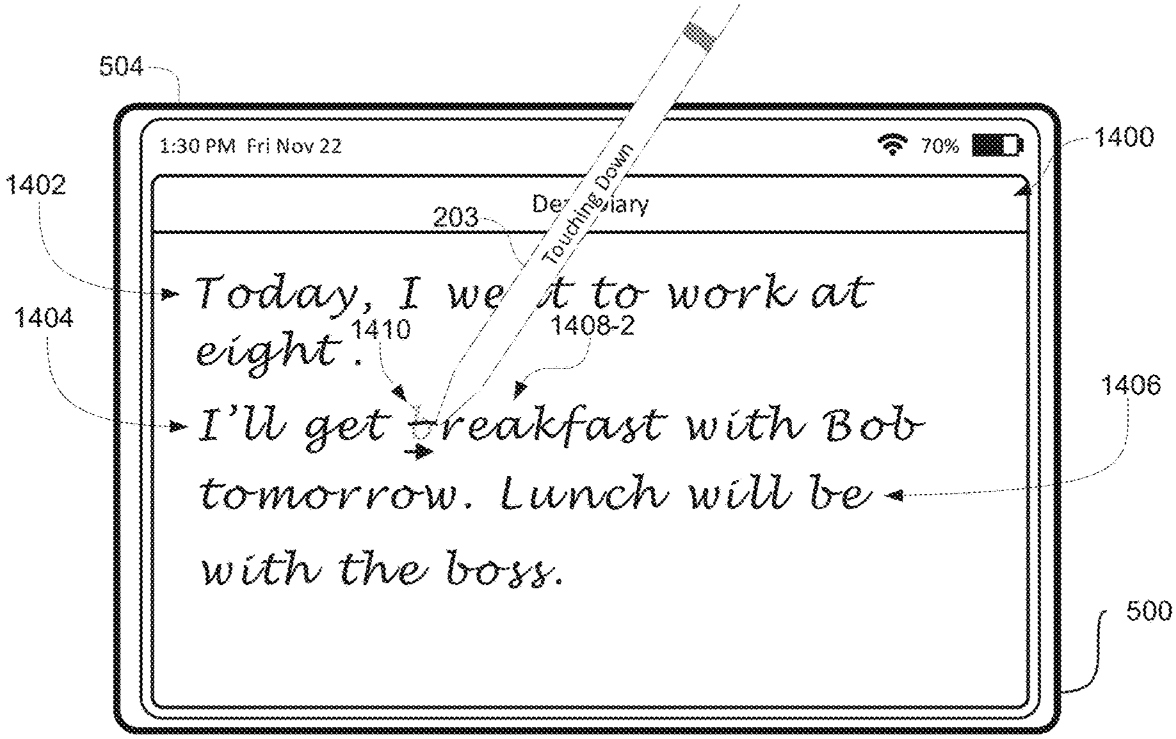
Figure 14D:
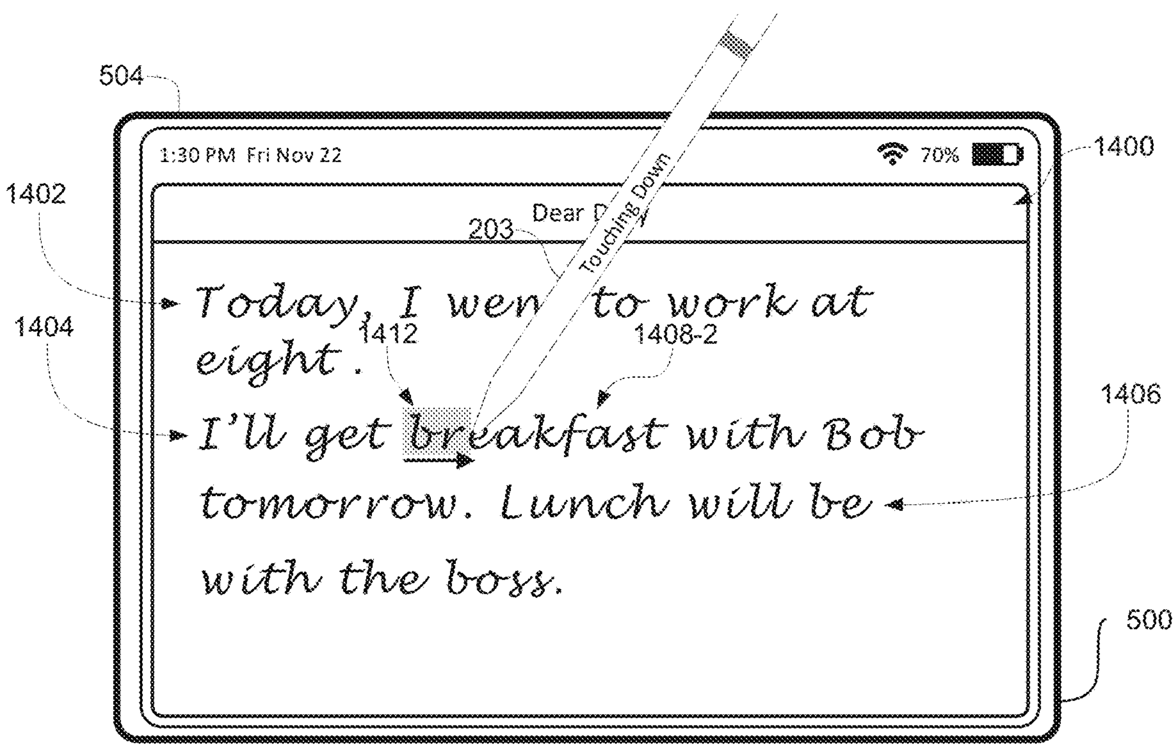
Figure 14E:
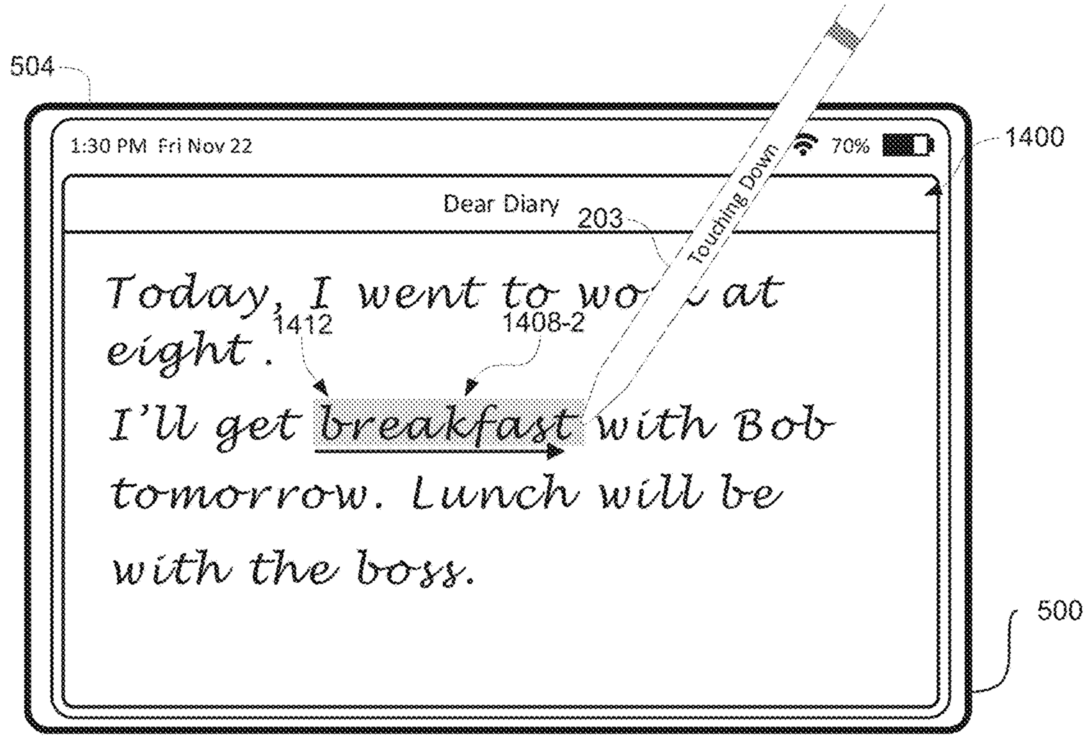
Figure 14F:
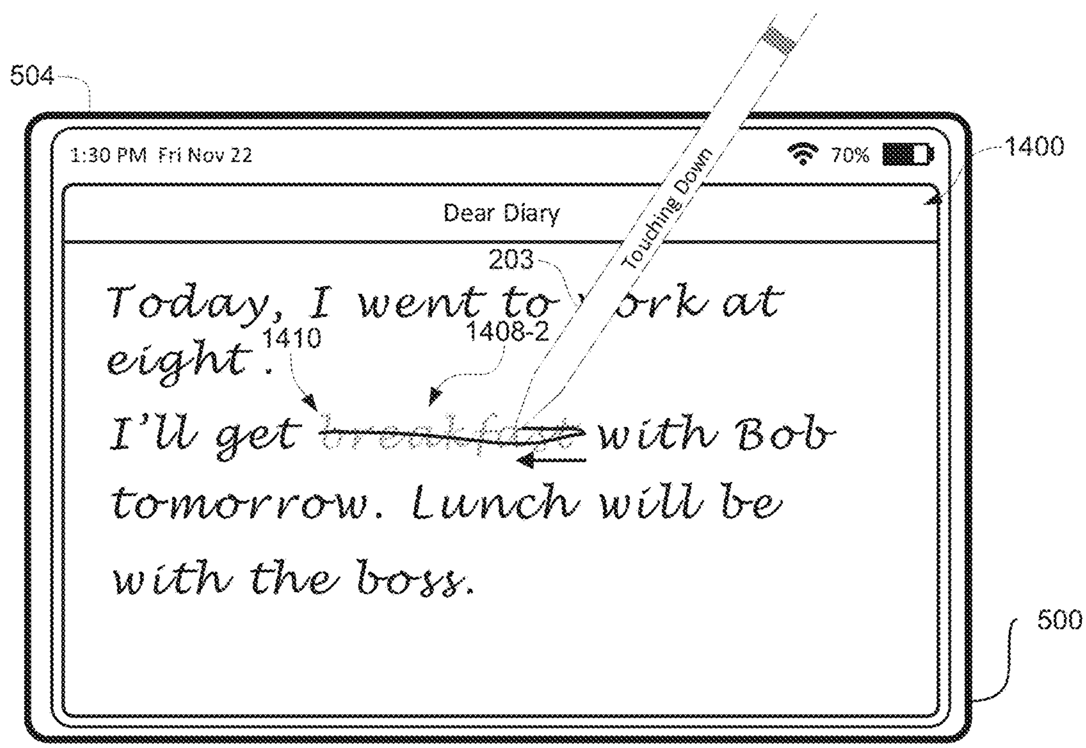
Figure 14G:
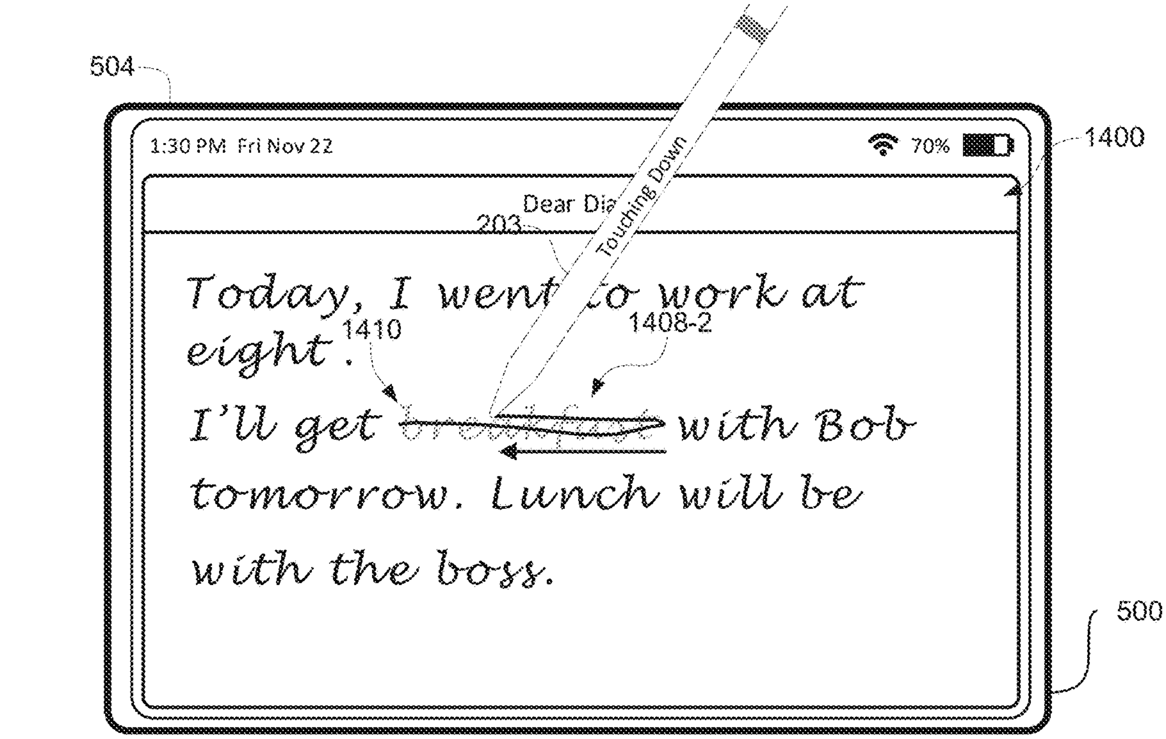
Figure 14H:
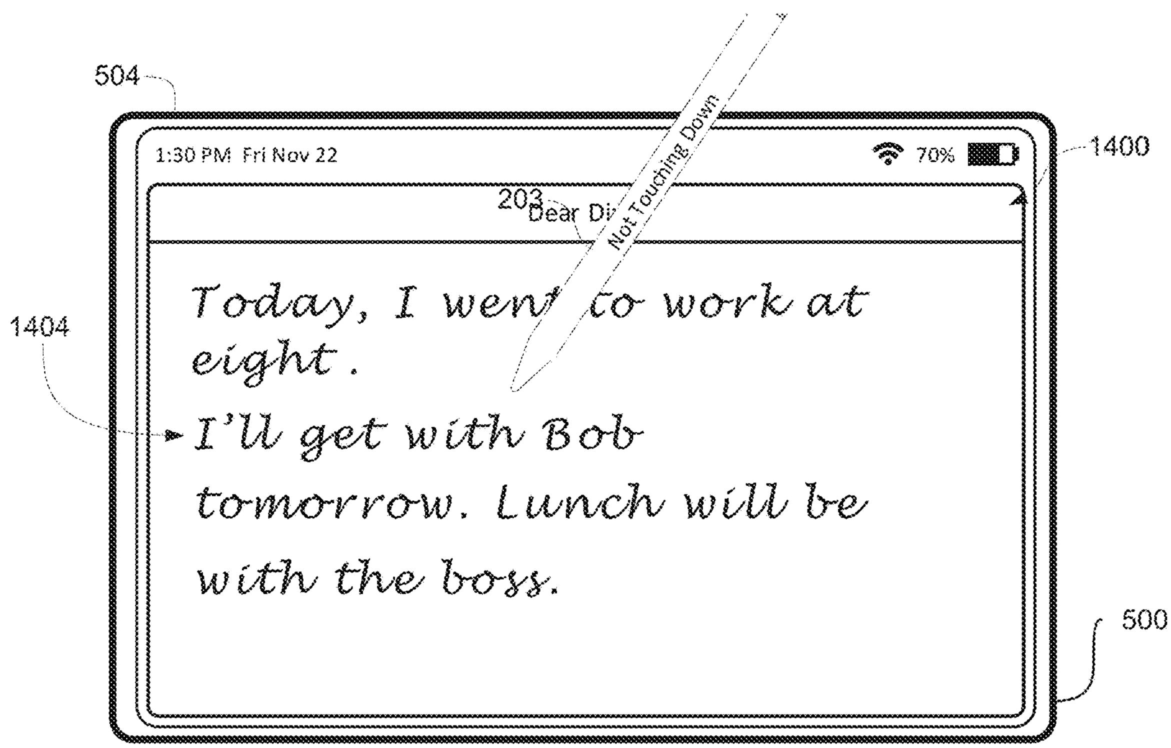
Figure 14I:
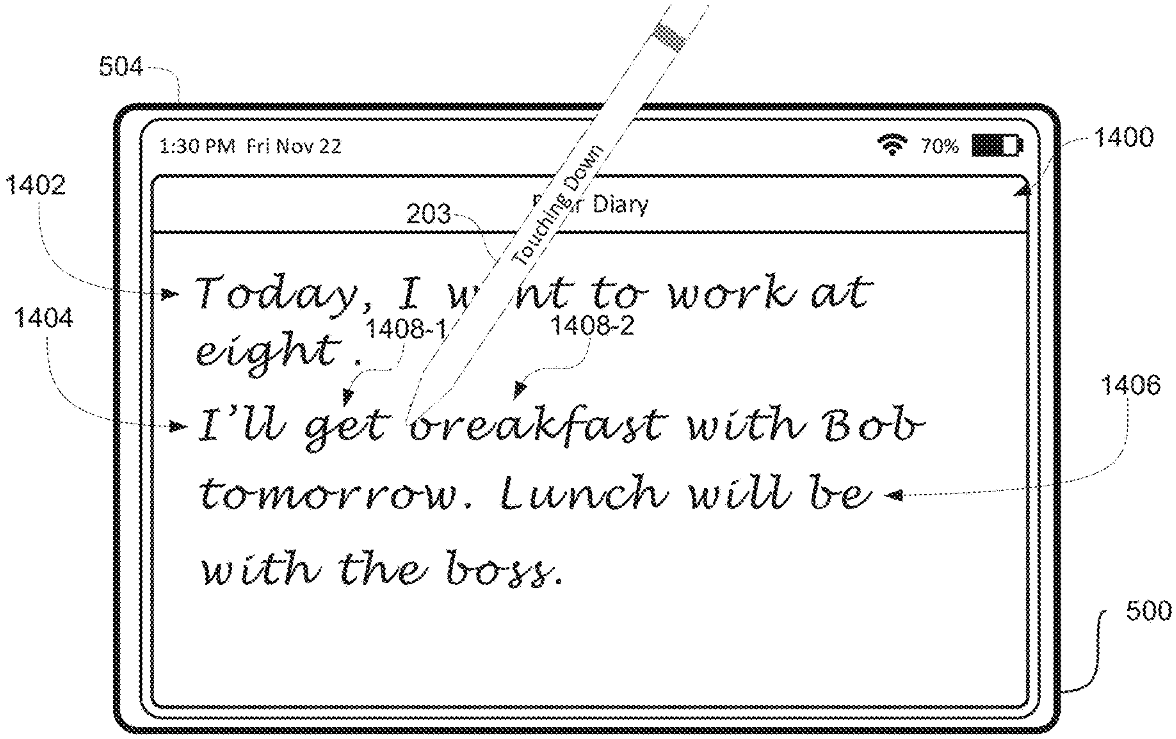
Figure 14J:
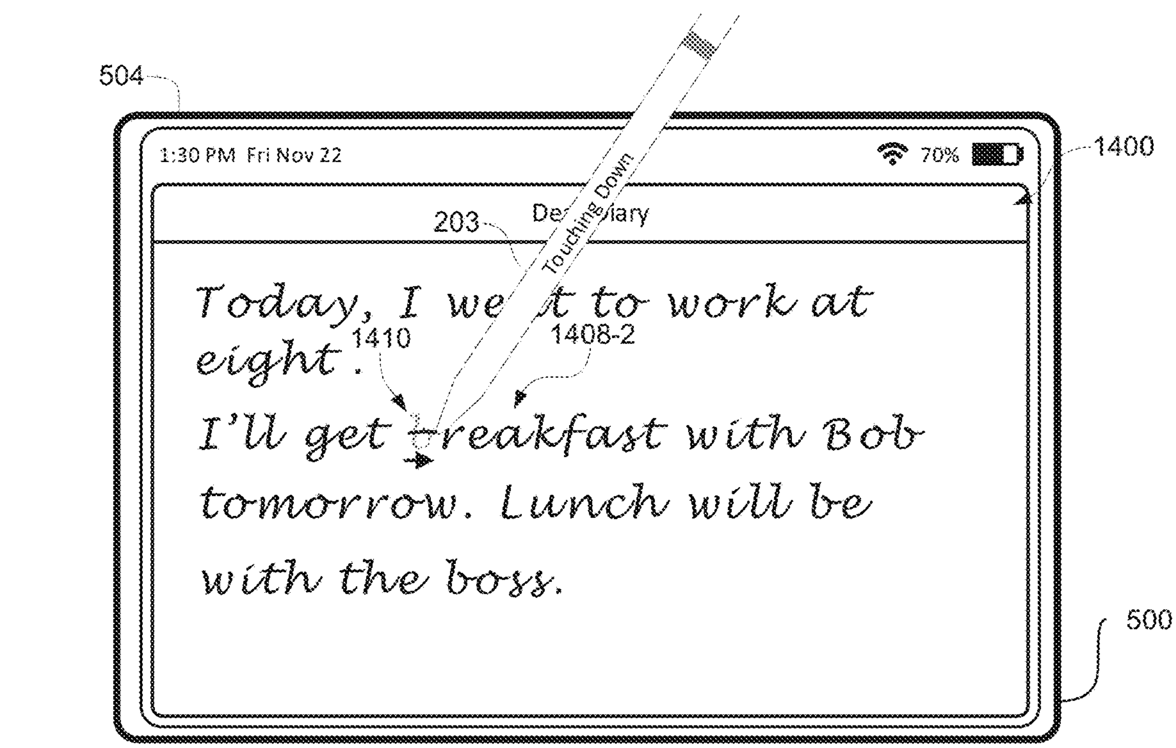
Figure 14K:
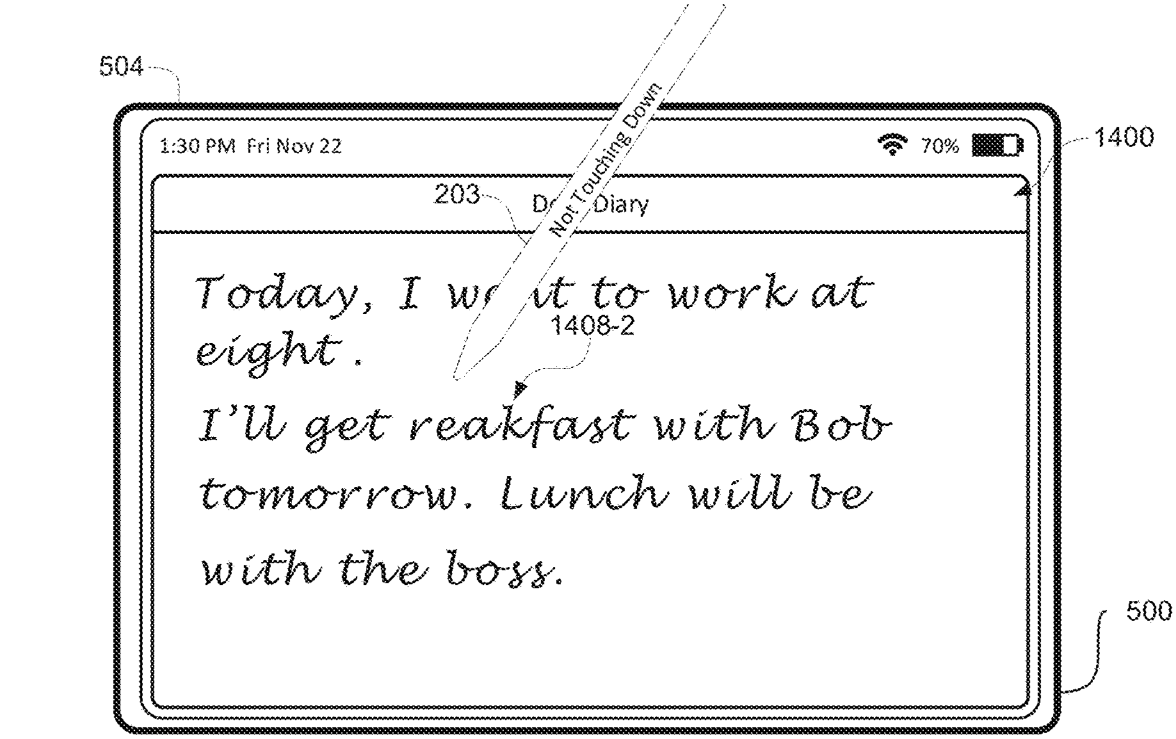
Figure 14L:
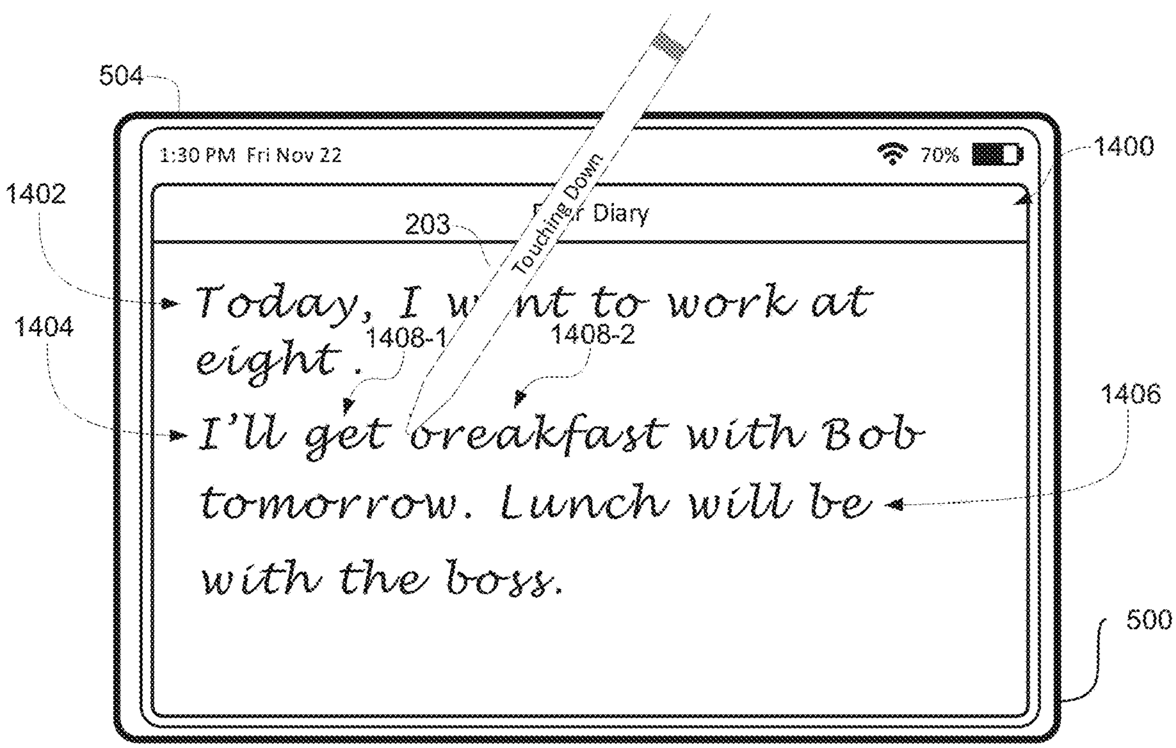
Figure 14M:
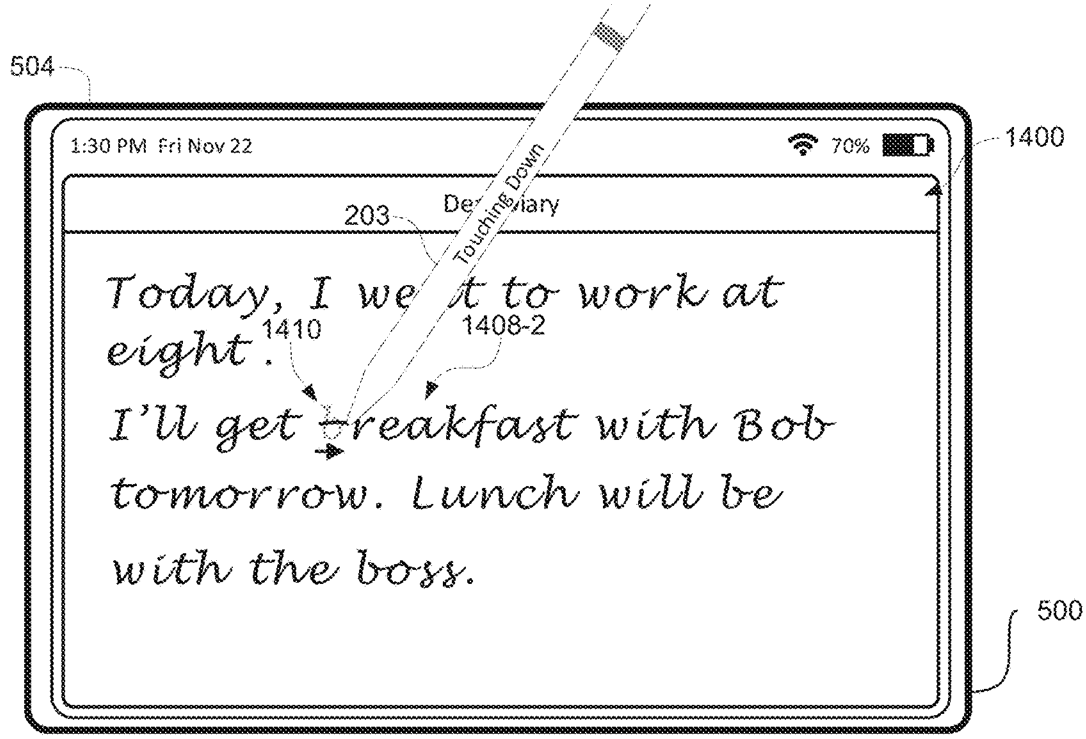
Figure 14N:
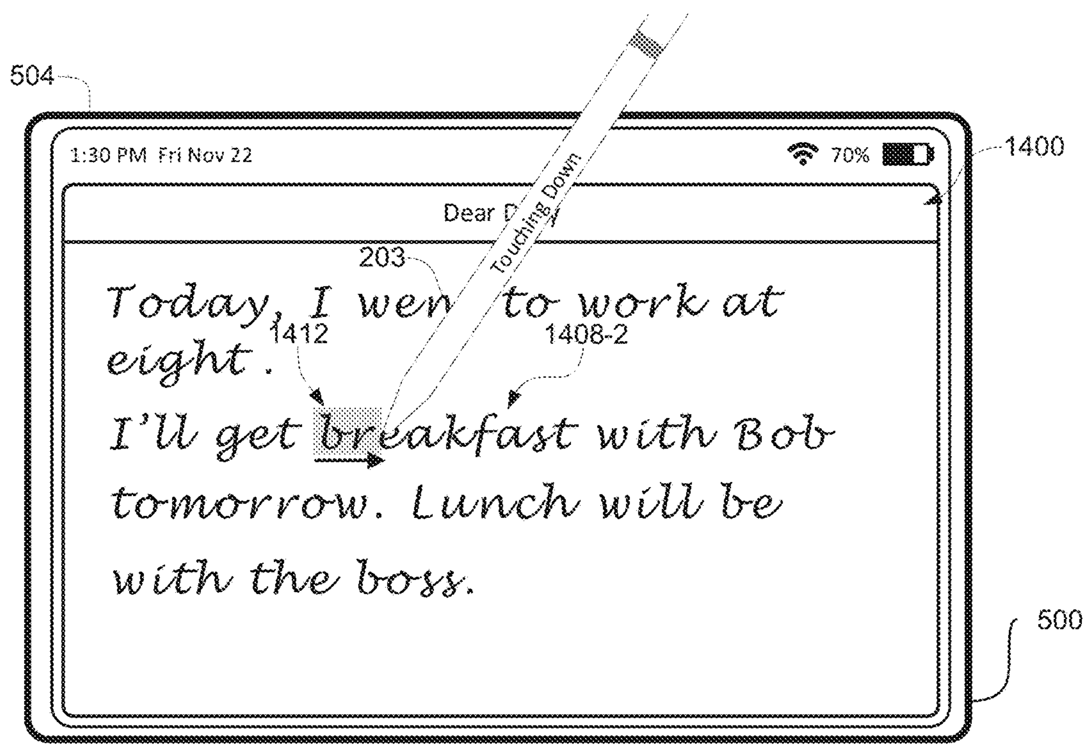
Figure 14O:
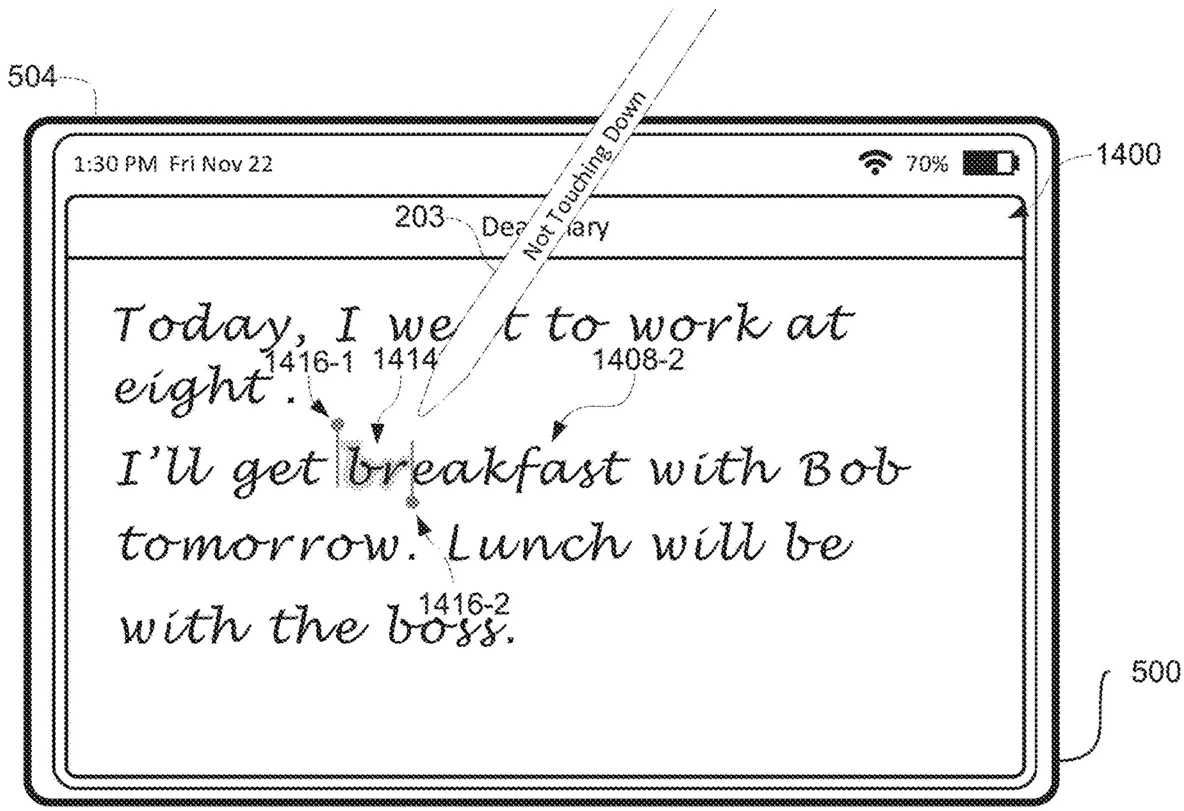
Figure 15B:
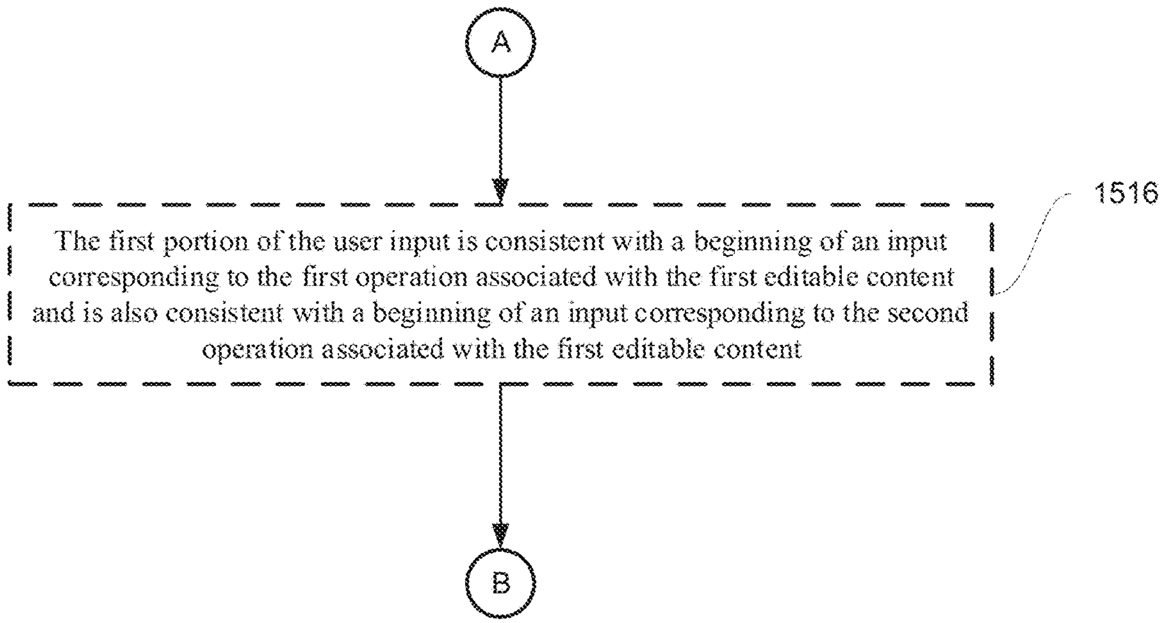
Figure 15C:
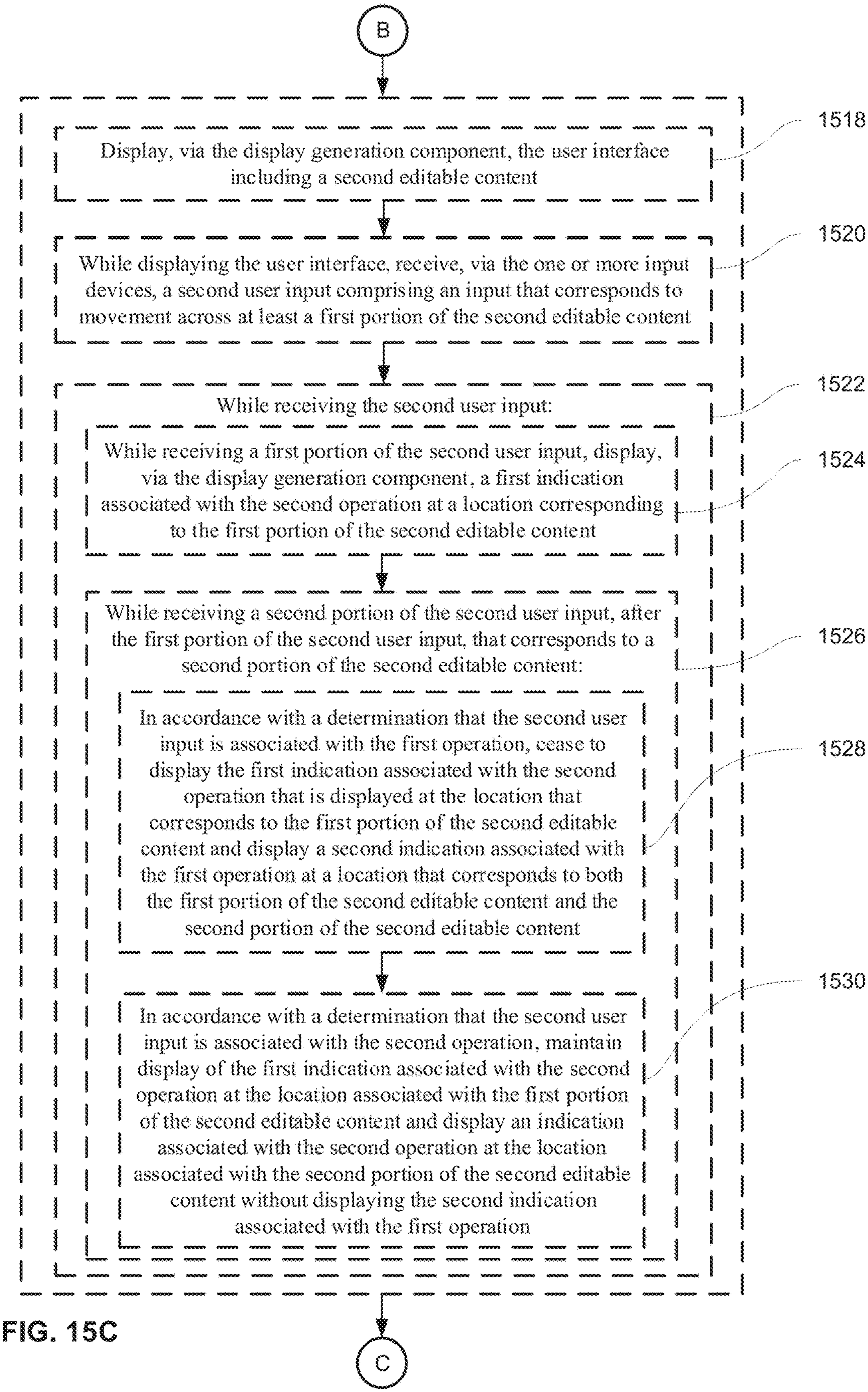
Figure 15D:
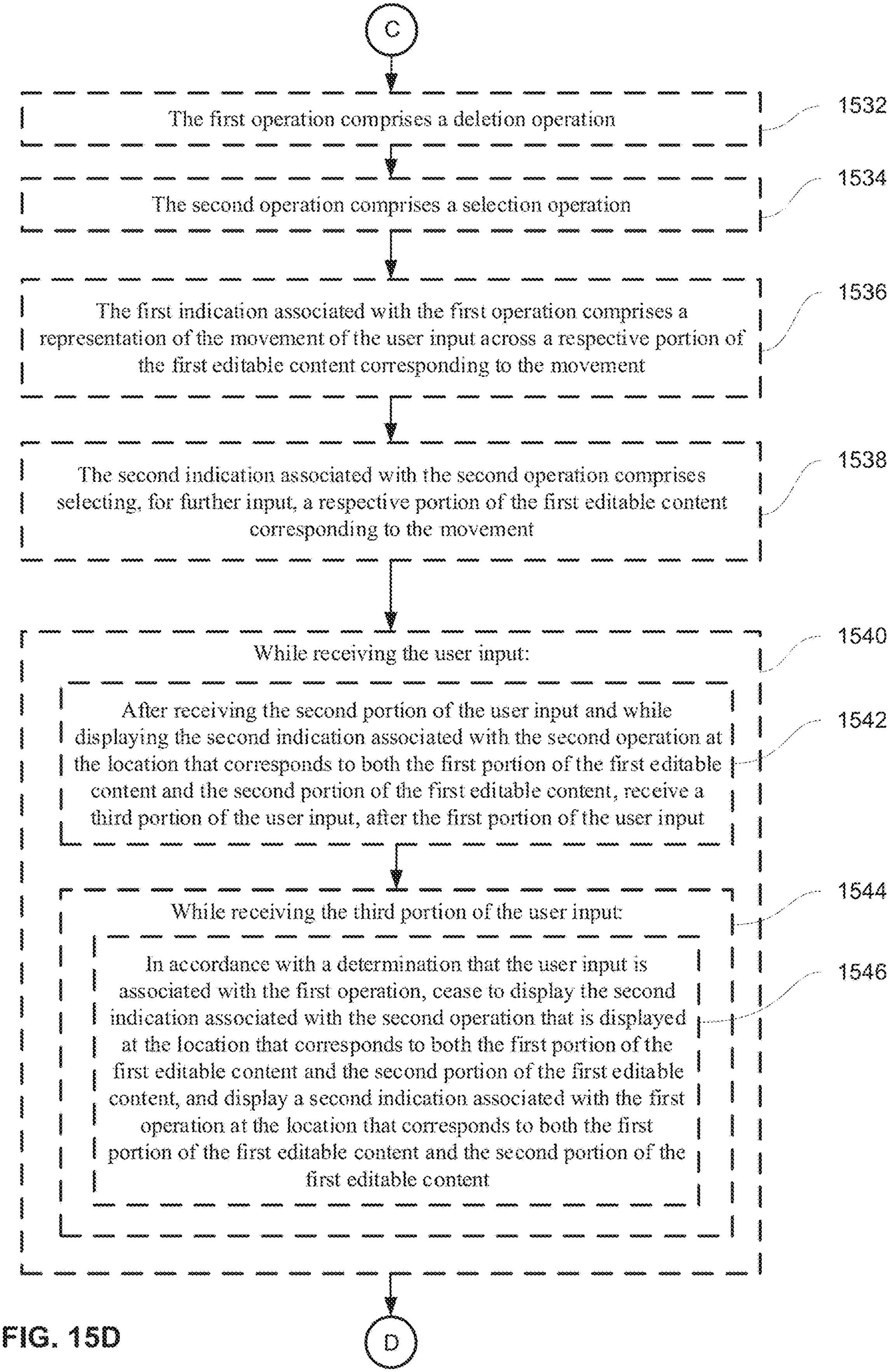
Figure 15E:
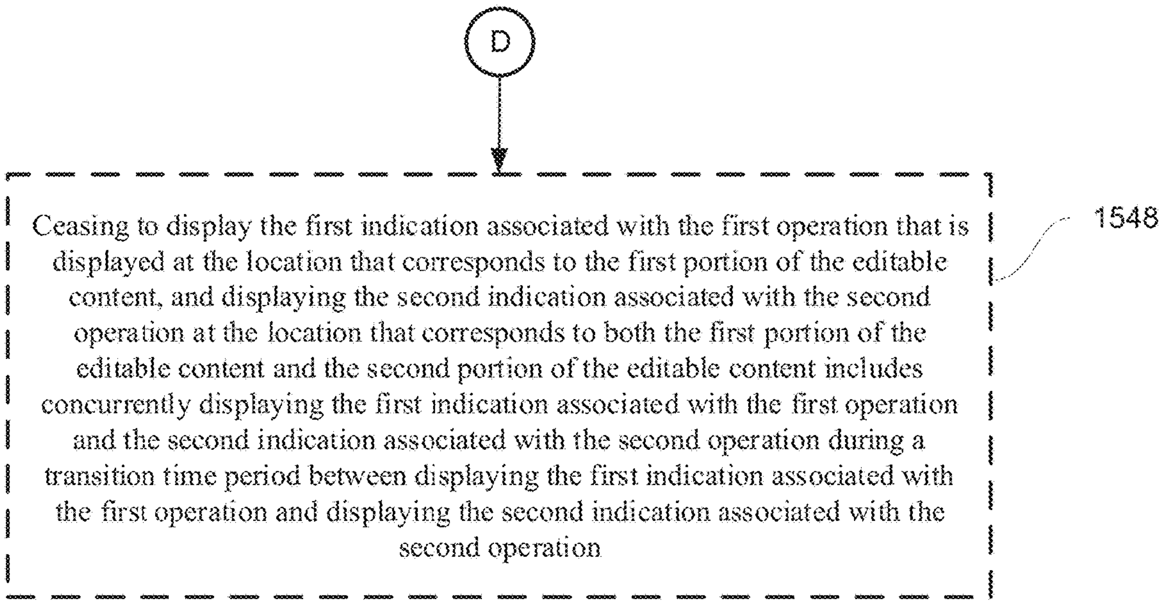

FIGS. 14A-14O illustrate exemplary ways in which an electronic device displays visual feedback of text manipulation operations. The embodiments in these figures are used to illustrate the processes described below, including the processes described with reference to FIGS. 15A-15E.

FIGS. 14A-14O illustrate operation of the electronic device 500 displaying visual feedback of text manipulation operations. FIG. 14A illustrates electronic device 500 displaying user interface 1400 (e.g., via a display device, via a display generation component, etc.). In some embodiments, user interface 1400 is displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500.

In some embodiments, user interface 1400 is a user interface of a notes application. In some embodiments, the notes application is an application installed on device 500. As shown in FIG. 14A, user interface 1400 includes a content entry region. In some embodiments, a content entry region is a region in which a user is able to input and/or enter text, images, multimedia, etc. In FIG. 14A, the content entry region includes sentence 1402, sentence 1404, and sentence 1406. In some embodiments, sentences 1402, 1404, and 1406 are handwritten sentences (e.g., have the original styling of the handwriting input). In some embodiments, sentences 1402, 1404, and 1406 are font-based text (e.g., styled based on a font or typeface). In some embodiments, sentences 1402, 1404, and 1406 are selectable (e.g., the characters and/or the words in sentences 1402, 1404, and 1406 are selectable).

In FIG. 14B, a contact by stylus 203 is received between word 1408-1 and word 1408-2 in sentence 1404. In FIG. 14C, a rightward movement of the contact by stylus 203 is detected across a first letter of word 1408-2 (e.g., across "b"). In some embodiments, device 500 displays representation 1410 of the user input (e.g., a horizontal line "drawn" by the user input).

As discussed above with respect to FIGS. 12V-12FF, a deletion operation is optionally identified if a user input is a crossing-out gesture across one or more characters. Furthermore, as discussed above with respect to FIGS. 12GG-12SS, a selection operation is optionally identified if a user input is a horizontal line across one or more characters (e.g., a substantially horizontal line, does not include a change in direction by more than a threshold amount such as 20 degrees, 30 degrees, 45 degrees, 90 degrees, more 180 degrees, etc.). Thus, certain user inputs can be consistent with both the deletion operation and the selection operation. For example, an initial horizontal gesture can be identified with both a deletion operation and a selection operation. However, in this example, if the gesture doubles back on itself (e.g., a crisscross gesture, a zigzag gesture, includes a sharp turn, includes a change in direction by more than a threshold amount such as by more than 20 degrees, 30 degrees, 45 degrees, 90 degrees, more 180 degrees, etc.), then the gesture is identified as a deletion operation but not a selection operation (e.g., such as illustrated above with respect to FIGS. 12V-12FF). Thus, in some embodiments, a device selects one of the operations and displays an indication of the selected operation until or unless the device determines that the gesture no longer corresponds with the selected operation and corresponds with another operation, at which point the device optionally displays an indication of the other operation and removes the indication of the originally selected operation. In some embodiments, when a gesture is consistent with two or more operations, the device selects one of the operations based on a pre-defined preference order. For example, deletion operations may be preferred over a selection operation (or vice versa).

Returning to FIG. 14C, device 500 initially identifies the user input (e.g., the gesture) as corresponding to a deletion operation. In some embodiments, in accordance with the device identifying the user input as corresponding to a deletion operation, device 500 changes the visual appearance of the character interacted by the user input (e.g., "b") to indicate that the character has been marked for deletion (e.g., greying out the character).

In FIG. 14D, a further rightward movement of the contact by stylus 203 is detected across the letter "r" of word 1408-2. In some embodiments, device 500 now identifies the user input (e.g., the gesture) as corresponding to a selection operation. In some embodiments, device 500 identifies the user input as corresponding to a selection operation based on the entirety of the user input (e.g., the entire movement of the input). In some embodiments, device 500 identifies the user input as corresponding to a selection operation based the more recent portions of the user input (e.g., the most recent 0.1 seconds, 0.2 seconds, 0.5 seconds, 1 second, 3 seconds, etc., the most recent 0.1 mm, 0.3 mm, 1 mm, 5 mm, 1 cm, etc. of movement). For example, because the user input is a horizontal line across two characters and has not doubled back, device 500 identifies the user input as a request to select content (e.g., device 500 determines that it is more likely a request to select content than a request to delete content, even though the gesture continues to be consistent with a request to delete content). Thus, in response to device 500 identifying the user input as corresponding to a selection operation, device 500 removes the indication of the deletion operation and displays an indication of the selection operation that indicates that the respective characters are marked for selection (e.g., device 500 displays selection indication 1412). For example, device 500 ceases display of representation 1410, ceases greying out the character "b", and visually emphasizes the characters "br" (e.g., highlights the characters "br" with selection indication 1412), as shown in FIG. 14D.

In FIG. 14E, a further rightward movement of the contact by stylus 203 is detected across the remainder of word 1408-2 (e.g., the rest of the letters of word 1408-2). In some embodiments, in response to the rightward movement, device 500 visually emphasizes word 1408-2 (e.g., highlights all the characters of word 1408-2). In FIG. 14F, a leftward movement of the contact by stylus 203 while maintaining contact with touch screen 504 is detected. Thus, in FIG. 14F, the user input has "doubled back" on itself and begun moving in the opposite direction (e.g., back towards the beginning of the gesture). In some embodiments, in response to the leftward movement, device 500 identifies the user input as a request to delete content (e.g., and optionally device 500 determines that the user input is not a request to select content because the gesture is no longer consistent with the gesture for the selection command). In some embodiments, device 500 changes the displayed indication to remove the indication of the selection command and display the indication of the deletion command. For example, in FIG. 14F, word 1408-2 is no longer visually emphasized (e.g., highlighted), word 1408-2 becomes greyed out, and representation 1410 is displayed. In some embodiments, representation 1410 is a representation of the user input and corresponds to the entire user gesture, including the portions that were performed when device 500 identified the user input as a selection command. In some embodiments, greying out word 1408-2 indicates that word 1408-2 has been marked for deletion.

In FIG. 14G, a further leftward movement of the contact by stylus 203 is detected across the letters "akfa". In some embodiments, device 500 continues to identify the user input as corresponding to a deletion operation and thus maintains displaying the indication of the deletion operation on word 1408-2.

In FIG. 14H, a termination of the user input (e.g., lift-off of stylus 203 from touch screen 504) is detected. In some embodiments, in response to the termination of the user input, device 500 performs the deletion operation and removes word 1408-2 from user interface 1400, as shown in FIG. 14H. In some embodiments, the words in sentence 1404 are re-arranged to adjust for the removal of word 1408-2. Thus, as shown, while receiving a user input, device 500 can switch from displaying an indication of a first operation and to displaying an indication of a second operation based on further movements of the user input.

FIGS. 14I-14O illustrate embodiments of performing the selection operation or deletion operation. In FIG. 14I, a contact by stylus 203 is received between word 1408-1 and word 1408-2 in sentence 1404. In FIG. 14J, a rightward movement of the contact by stylus 203 is detected across a first letter of word 1408-2 (e.g., across "b"). In some embodiments, device 500 identifies the user input (e.g., the gesture) as corresponding to a deletion operation and displays representation 1410 of the user input (e.g., a horizontal line "drawn" by the user input) and greys out the character "b" to mark the character "b" for deletion, as shown in FIG. 14J. In FIG. 14K, a termination of the user input (e.g., lift-off of stylus 203 from touch screen 504) is detected. In some embodiments, in response to the termination of the user input, device 500 performs the deletion operation and removes the character "b" from word 1408-2, as shown in FIG. 14K. Thus, if a termination of the user input is detected while displaying an indication of the deletion operation, then in response to the termination, the deletion operation is performed on the characters on which the indication is displayed.

In FIG. 14L, a contact by stylus 203 is received between word 1408-1 and word 1408-2 in sentence 1404. In FIG. 14M, a rightward movement of the contact by stylus 203 is detected across a first letter of word 1408-2 (e.g., across "b"). In some embodiments, device 500 identifies the user input (e.g., the gesture) as corresponding to a deletion operation and displays representation 1410 of the user input (e.g., a horizontal line "drawn" by the user input) and greys out the character "b" to mark the character "b" for deletion, as shown in FIG. 14M. In FIG. 14N, a further rightward movement of the contact by stylus 203 is detected across the letter "r" of word 1408-2. In some embodiments, device 500 now identifies the user input (e.g., the gesture) as corresponding to a selection operation and replaces the indication of the deletion operation with an indication of the selection operation, as shown in FIG. 14N. For example, the characters "br" are now highlighted. In FIG. 14O, a termination of the user input (e.g., lift-off of stylus 203 from touch screen 504) is detected. In some embodiments, in response to the termination of the user input, device 500 performs the selection operation and selects the characters "br", as shown in FIG. 14O. In some embodiments, selecting the characters "br" includes visually distinguishing the characters from the other characters that are not selected (e.g., highlighting "br") and displaying one or more user interface elements to the left and/or right of the characters "br" (e.g., user interface elements 1416-1 and 1416-2) that are selectable and moveable to select fewer or more characters. Thus, if a termination of the user input is detected while displaying an indication of the selection operation, then in response to the termination, the selection operation is performed on the characters on which the indication is displayed.

FIGS. 15A-15E are flow diagrams illustrating a method 1500 of displaying visual feedback of text manipulation operations. The method 1500 is optionally performed at an electronic device such as device 100, device 300, device 500, device 501, device 510, and device 591 as described above with reference to FIGS. 1A-1B, 2-3, 4A-4B and 5A-5I. Some operations in method 1500 are, optionally combined and/or order of some operations is, optionally, changed.

As described below, the method 1500 provides ways to display visual feedback of text manipulation operations. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., device 500) in communication with a display generation component and one or more input devices (e.g., a mobile device (e.g., a tablet, a smartphone, a media player, or a wearable device), or a computer, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.) displays (1502), via the display generation component, a user interface including a first editable content, such as sentences 1402, 1404, and 1404 in FIG. 14A (e.g., a content entry region that includes text, drawings, and/or other content).

In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, the content in the content entry region was previously inputted by the user or was prepopulated without user input. In some embodiments, the pre-existing content is also editable (e.g., the content can be deleted, selected, modified, moved, added to, etc.). In some embodiments, the pre-existing content is handwritten text. In some embodiments, the pre-existing content is font-based text (e.g., entered as font-based text, or entered as handwritten input and converted to font-based text by the electronic device). In some embodiments, the content is similar to or has one or more of the behaviors described above with respect to method 700. In some embodiments, the content is a drawing or sketch inserted into the content entry region via a stylus, finger, or other handwriting instrument.

In some embodiments, while displaying the user interface, the electronic device receives (1504), via the one or more input devices, a user input comprising an input that corresponds to movement across at least a first portion of the first editable content, such as in FIG. 14C (e.g., an input, from a stylus or finger, performing a gesture on or near the first editable content). In some embodiments, the gesture is a movement across at least a first portion of the first editable content. In some embodiments, the gesture corresponds to an operation performable on the first editable content, such as a selection operation, a deletion operation, etc.

In some embodiments, while receiving the user input (1506), while receiving a first portion of the user input (e.g., while receiving the first portion of the handwritten input that is interacting with a first portion of the first editable text string), the electronic device displays (1508), via the display generation component, a first indication associated with a first operation at a location corresponding to the first portion of the first editable content, such as the greying out of the letter "b" in FIG. 14C (e.g., display an indication that the first operation has been recognized and will be performed (e.g., instead of the second operation)).

In some embodiments, the indication is displayed on or near the first portion of the editable content. In some embodiments, the type of indication displayed indicates the type of operation that will be performed on the first portion of the editable content in response to a termination of the input. In some embodiments, the first operation is a deletion operation and performing the first operation includes deleting the portions of the editable text string that the input interacted with. In some embodiments, the indication of the first operation is a line displayed across the portion of the editable text string that the input interacted with. In some embodiments, the line is a representation of the input (e.g., as if the user drew the line with the input device). For example, if the first portion of the input is a horizontal gesture across the first three letters of a word, then a horizontal line corresponding to the input is displayed across the first three letters of the word (and optionally not displayed across other letters of the word that were not interacted with by the first portion of the handwritten input). In some embodiments, displaying the first indication includes changing a visual characteristic of the portion of the editable text string that the input interacted with, such as greying out the letters.

In some embodiments, while receiving a second portion of the user input, after the first portion of the user input, that corresponds to a second portion of the first editable content (1510), such as in FIG. 14D (e.g., receiving a continued movement of the input, without detecting a lift-off or termination of the handwritten input between the first and second portions of the input), in accordance with a determination that the user input is associated with a second operation, different from the first operation (e.g., the first portion and the second portion of the input, when taken together, correspond to the second operation and not the first operation), the electronic device ceases (1512) to display the first indication associated with the first operation that is displayed at the location that corresponds to the first portion of the first editable content and displaying a second indication associated with the second operation at a location that corresponds to both the first portion of the editable content and the second portion of the first editable content, such as replacing the greying out of the letter "b" with the display of a selection indicator in FIG. 14D (e.g., displaying an indication of the second operation and removing the indication of the first operation (e.g., removing the horizontal line and/or reverting the color of the editable text string from grey back to the color it had before the input was received)).

In some embodiments, the continued movement is across a second portion of the editable content. In some embodiments, the continued movement is across the first portion of the editable content (e.g., movement back in the opposite direction).

In some embodiments, the device is able to disambiguate the operation corresponding to the input based on the second portion of the input. In some embodiments, the second operation is a highlighting operation. For example, if the continued input is a continued horizontal gesture in the same direction as the first portion of the input (e.g., and not a doubling back across the same portion of the editable content), then the input matches the gesture for performing the second operation and does not match the gesture for performing for the first operation. In such embodiments, the device determines that the input corresponds to the second operation rather than the first operation.

In some embodiments, the second indication is displayed on or near the first portion and second portion of the editable content. In some embodiments, the type of indication displayed indicates the type of operation that will be performed on the first portion and second portion of the editable content in response to a termination of the input. In some embodiments, the indication for the highlighting operation is a highlighting of the portions of the editable content with which the first and second portions of the handwritten input interacted (e.g., a highlighting of the first portion and second portion of the editable content). In some embodiments, highlighting the portions of the editable content include displaying a rectangular element on or behind the portions of the editable text string (optionally with grey, yellow, or another color). In some embodiments, the second indication encompasses more text than the original first indication (e.g., because the second portion of the handwritten input interacted with the second portion of the editable content). In some embodiments, after displaying the second indication, if the input continues and is such that the input (e.g., the first portion, the second portion, and the continued input) begins to match the gesture required for the first operation instead of the second operation, then the second indication is optionally replaced with the first indication. For example, in the example provided above, the horizontal line corresponding to the first portion of the input across the first three letters of a word is replaced (e.g., removed) with a highlight element that highlights the first three letters of the word and any additional letters or words that were selected by the second portion of the input.

In some embodiments, in accordance with a determination that the user input is associated with the first operation (e.g., the first portion and the second portion of the input together continue to correspond to the first operation, but optionally no longer corresponds to the second operation), the electronic device maintains (1514) display of the first indication associated with the first operation at the location associated with the first portion of the editable content and displaying an indication associated with the first operation at the location associated with the second portion of the editable content without displaying the second indication associated with the second operation, such as the continued display of the selection indication in FIG. 14E (e.g., continuing to display the indication of the first operation).

For example, if the continued input includes a doubling back of the handwritten input over the first portion of the editable content (e.g., the portion that received the first portion of the input), then the input matches the gesture for the first operation (e.g., a cross-out of text that includes at least two cross-out gestures, either horizontal or vertical) and does not match (e.g., no longer matches) the gesture associated with the second operation (e.g., a single horizontal line across text). In such embodiments, the device determines that the input (e.g., both the first portions and second portions) corresponds to the first operation rather than the second operation.

In some embodiments, the device updates the indication of the first operation based on the second portion of the handwritten input (e.g., to be displayed at or near the second portion of the editable content). In some embodiments, the first indication of the first operation includes a line that represents the first portion of the input and is updated to extend the line based on the second portion of the input. In some embodiments, the line (e.g., for the first and second portions of the input) are representations of the respective portions of the inputs. For example, the line continues to be drawn on the letters of the editable content while the input is received. In some embodiments, the second portion of the input continues to correspond to the first operation and thus the device continues to recognize the input as a request to perform the first operation. In some embodiments, an indication of the second operation (e.g., highlighting operation) is not displayed. Thus, as described above, while the device is receiving an input on an editable content, the device is able to determine whether the input corresponds to a number of different operations to be performed on the editable content. In some embodiments, if the input is associated with a plurality of operations, the device selects one of the operations with which the input is associated (optionally based on a pre-determined order of preference), and displays an indication of the selected operation. In some embodiments, if the input terminates at that time, then the first operation is performed. In some embodiments, if the input continues (e.g., without termination of contact with the touch-screen or without termination of a selection input), then the device continues to determine whether the input continues to correspond to the originally selected operation or whether the input no longer corresponds to the originally selected operation and now corresponds to another operation. If the device determines that the input no longer corresponds to the originally selected operation and now corresponds to a second operation (which the input originally optionally also corresponded to, but optionally was not selected to be performed by the device), then the device displays an indication of the second operation. Termination of the input at this point optionally causes the performance of the second operation instead of the first operation on the editable content.

The above-described manner of displaying feedback of operations performed by handwritten inputs (e.g., by displaying a first indication corresponding to a first operation while receiving a first portion of a handwritten input and switching to a second indication corresponding to a second operation if the second portion of the handwritten input suggests that the second operation should be performed) provides the user with accurate feedback on what type of operation will be performed if the user were to terminate handwritten input (e.g., by providing the feedback as the handwritten input is received, without requiring the use to complete the gesture to determine whether the gesture would be interpreted as the first operation or the second operation), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the first portion of the user input is consistent with a beginning of an input corresponding to the first operation associated with the first editable content and is also consistent with a beginning of an input corresponding to the second operation associated with the first editable content (1516), such as the initial gesture being consistent with the deletion and the selection operation as shown in FIGS. 14C and 14D (e.g., the first portion of the gesture is the first portion of at least two potential operations).

For example, a first type of input on the first editable content performs a first operation while a second type of input on the first editable content performs a second operation. In some embodiments, a first portion of the gesture for the first operation is similar to the first portion of the gesture for the second operation. Thus, the first portion of an input performing the gesture for either the first operation or the second operation is consistent with both the first operation and second operation. In some embodiments, further user input is able to disambiguate between the first operation and the second operation. In some embodiments, the device selects the first operation to be performed until or unless continued input indicates that the entirety of the input corresponds to the second operation. Thus, operations that are triggered by similar gestures (e.g., gestures that include similar portions) optionally have an order of preference. For example, if a gesture corresponds to two potential operations, a first operation has precedence over the second operation and is selected unless or until the gesture indicates that the input corresponds to the second operation instead of the first operation. In some embodiments, the first operation is a deletion operation and the second operation is a highlighting/selecting operation. In some embodiments, a horizontal cross-out gesture (e.g., horizontal movement in two directions, such as a left-right-etc. movement) is interpreted as a request to perform the deletion operation while a single horizontal gesture (e.g., horizontal movement in one direction without movement in a second direction, such as a leftward movement or a rightward movement) is interpreted as a request to perform a highlighting operation. Thus, in some embodiments, the initial horizontal portions of the gestures corresponding to both operations are similar.

The above-described manner of disambiguating between operations that share similar triggering gestures (e.g., by displaying an indication of a first operation if the input gesture is consistent with two different operations, and switching to display an indication of the second operation if the gesture begins to indicate the second operation rather than the first) provides the user with accurate feedback on what type of operation will be performed (e.g., by providing the feedback as the handwritten input is received, without requiring the use to complete the gesture to determine whether the gesture would be interpreted as the first operation or the second operation), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the electronic device displays (1518), via the display generation component, the user interface including a second editable content, such as in FIG. 14A (e.g., the content entry region includes a second set of content such as text, drawings, and/or other content). In some embodiments, the second set of content in the content entry region was previously inputted by the user or was pre-populated without user input. In some embodiments, the content is also editable (e.g., the content can be deleted, selected, modified, moved, added to, etc.). In some embodiments, the content is handwritten text. In some embodiments, the content is font-based text (e.g., entered as font-based text, or entered as handwritten input and converted to font-based text by the electronic device). In some embodiments, the content is similar to or has one or more of the behaviors described above with respect to method 700. In some embodiments, the content is a drawing or sketch inserted into the content entry region via a stylus, finger, or other handwriting instrument.

In some embodiments, while displaying the user interface, the electronic device receives (1520), via the one or more input devices, a second user input comprising an input that corresponds to movement across at least a first portion of the second editable content, such as in FIG. 14C (e.g., an input, from a stylus or finger, performing a gesture on or near the second editable content). In some embodiments, the gesture is a movement across at least a first portion of the second editable content. In some embodiments, the gesture corresponds to an operation performable on the second editable content, such as a selection operation, a deletion operation, etc.

In some embodiments, while receiving the second user input (1522), while receiving a first portion of the second user input, the electronic device displays (1524), via the display generation component, a first indication associated with the second operation at a location corresponding to the first portion of the second editable content, such as the display of the selection indicator in FIG. 14D (e.g., display an indication that the second operation has been recognized and will be performed (e.g., instead of the first operation)).

In some embodiments, the indication is displayed on or near the first portion of the second editable content. In some embodiments, the type of indication displayed indicates the type of operation that will be performed on the first portion of the second editable content in response to a termination of the input. In some embodiments, the second operation is a selection operation and performing the second operation includes highlighting the portions of the second editable text string that the input interacted with. In some embodiments, the indication of the second operation includes displaying a highlighting on, in front of, or behind the portion of the second editable content that the input interacted with. In some embodiments, the indication of the second operation includes changing a visual characteristic of the portion of the second editable content that the input interacted with, such as changing the color of the content to grey.

In some embodiments, while receiving a second portion of the second user input, after the first portion of the second user input, that corresponds to a second portion of the second editable content (1526) (e.g., receiving a continued movement of the input, without detecting a lift-off or termination of the handwritten input between the first and second portions of the input), in accordance with a determination that the second user input is associated with the first operation (e.g., the first portion and the second portion of the input, when taken together, correspond to the first operation and not the second operation), the electronic device ceases (1528) to display the first indication associated with the second operation that is displayed at the location that corresponds to the first portion of the second editable content and displaying a second indication associated with the first operation at a location that corresponds to both the first portion of the second editable content and the second portion of the second editable content, such as the replacement of the selection indication with the deletion indication (e.g., greying out of text) in FIG. 14F (e.g., displaying an indication of the first operation and removing the indication of the second operation (e.g., removing the highlighting and/or reverting the color of the second editable content from grey back to the color it had before the input was received)).

In some embodiments, the continued movement is across a second portion of the second editable content. In some embodiments, the continued movement is across the first portion of the second editable content (e.g., movement back in the opposite direction).

In some embodiments, the device determines, based on the second portion of the input, that the operation to perform is the first operation and not the second operation. For example, if the continued input is a doubling back across the same portion of the editable content (e.g., and not a continued horizontal gesture in the same direction as the first portion of the input), then the input matches the gesture for performing the first operation. In such embodiments, the device determines that the first operation should be performed.

In some embodiments, the second indication is displayed on or near the first portion and second portion of the second editable content. In some embodiments, the indication of the first operation is a line displayed across the portion of the editable text string that the input interacted with. In some embodiments, the second indication encompasses more text than the original first indication (e.g., because the second portion of the handwritten input interacted with the second portion of the second editable content).

In some embodiments, in accordance with a determination that the second user input is associated with the second operation (e.g., the first portion and the second portion of the input together continue to correspond to the second operation (optionally no longer corresponds to the first operation)), the electronic device maintains (1530) display of the first indication associated with the second operation at the location associated with the first portion of the second editable content and displaying an indication associated with the second operation at the location associated with the second portion of the second editable content without displaying the second indication associated with the first operation, such as the continued display of the selection indication in FIG. 14E (e.g., continuing to display the indication of the second operation).

For example, if the continued input includes a continued horizontal gesture in the same direction as the first portion of the input, then the input continues to match the gesture for the second operation. In such embodiments, the device determines that the input (e.g., both the first portions and second portions) corresponds to the first operation and the first operation should be performed.

In some embodiments, the device updates the indication of the second operation based on the second portion of the handwritten input (e.g., to be displayed at or near the second portion of the second editable content). In some embodiments, the first indication of the second operation includes a highlighting of the portions that the input interacted with and is updated to extend the highlighting based on the second portion of the input (e.g., to also highlight the second portion of the second editable content).

The above-described manner of displaying feedback of operations performed by handwritten inputs (e.g., by displaying a first indication corresponding to the second operation while receiving a first portion of a handwritten input and switching to a second indication corresponding to the first operation if the second portion of the handwritten input suggests that the second operation should be performed) provides the user with accurate feedback on what type of operation will be performed if the user were to terminate handwritten input (e.g., by providing the feedback as the handwritten input is received, without requiring the use to complete the gesture to determine whether the gesture would be interpreted as the first operation or the second operation), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the first operation comprises a deletion operation (1532), such as the deletion of the letter "b" in FIG. 14K (e.g., the first operation is a deletion operation in which the respective portions of the editable content that were interacted with by the user input is deleted (e.g., removed) from the content entry region).

In some embodiments, the user input that corresponds to the deletion operation is a cross-out of the respective portions of the editable content that includes at least one doubling back of the user input (e.g., a crossing-out gesture, a zigzaging gesture, such as a horizontal or substantially horizontal gesture followed by a second horizontal or substantially horizontal gesture in the opposite direction, or a vertical or substantially vertical gesture followed by a second vertical or substantially vertical gesture in the opposite direction). For example, a deletion operation is optionally recognized if the gesture includes a movement in one general direction followed by a gesture that changes the direction of the movement by more than a threshold amount (e.g., a sharp turn, such as a turn of more than 20 degrees, more than 30 degrees, more than 45 degrees, more than 90 degrees, more than a 180 degrees, etc.). In some embodiments, the indication of the deletion operation is a greying out of the respective portions of the editable content and/or display of a representation of the user input across the respective portions of the editable content. In some embodiments, the first operation is executed in response to detecting a termination of the user input (e.g., upon lift-off of the contact by stylus or finger with the touch screen). Thus, in some embodiments, the feedback provided to the user indicates the operation that will be performed upon termination of the user input.

The above-described manner of displaying feedback of operations performed by handwritten inputs (e.g., by displaying an indication that the user input is consistent with a deletion operation and a deletion operation will be performed) provides the user with accurate feedback on what type of operation will be performed if the user were to terminate handwritten input (e.g., by indicating that a deletion command will be performed as the handwritten input is received, without requiring the use to complete the gesture to determine whether the gesture would be interpreted as a deletion operation), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the second operation comprises a selection operation (1534), such as the selection of the letters "br" in FIG. 14O (e.g., the second operation is a selection operation in which the respective portions of the editable content that were interacted with by the user is selected (e.g., highlighted)).

In some embodiments, the user input that corresponds to the selection operation is a horizontal gesture across respective portions of the editable content. In some embodiments, the indication of the selection operation includes the display of a highlighting element on, above, or behind the respective portions of the editable content (e.g., a grey rectangular element, a blue rectangular element, a grey halo effect, a blue halo effect, etc.).

The above-described manner of displaying feedback of operations performed by handwritten inputs (e.g., by displaying an indication that the user input is consistent with a selection operation and a selection operation will be performed) provides the user with accurate feedback on what type of operation will be performed if the user were to terminate handwritten input (e.g., by indicating that a selection command will be performed as the handwritten input is received, without requiring the use to complete the gesture to determine whether the gesture would be interpreted as a selection operation), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the first indication associated with the first operation comprises a representation of the movement of the user input across a respective portion of the first editable content corresponding to the movement (1536), such as the display of representation 1410 of the user input in FIG. 14C (e.g., the indication of the deletion operation is a display of a representation of the user input across the respective portions of the editable content).

For example, the display of a horizontal (e.g., substantially horizontal) line across the respective portions of the editable content in accordance with the user input (e.g., a drawn line based on the user input). In some embodiments, the first indication includes greying out of the respective portions of the editable content.

The above-described manner of displaying feedback of a deletion operation (e.g., by a line across the portion of text that will be deleted) provides the user with accurate feedback on what type of operation will be performed if the user were to terminate handwritten input (e.g., by crossing out the content that will be deleted, without requiring the use to complete the gesture to determine how much content will be deleted), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the second indication associated with the second operation comprises selecting, for further input, a respective portion of the first editable content corresponding to the movement (1538), such as the selection indicator (e.g., the highlighting) in FIG. 14D (e.g., the indication of the selection operation includes the display of a highlighting element on, above, or behind the respective portions of the editable content (e.g., a rectangular element, or a halo effect, etc.)).

The above-described manner of displaying feedback of a selection operation (e.g., by highlighting the portion of text that is being selected) provides the user with accurate feedback on what type of operation will be performed if the user were to terminate handwritten input (e.g., by highlighting the content that is being selected, without requiring the use to complete the gesture to determine how much content will be selected), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, while receiving the user input (1540), after receiving the second portion of the user input and while displaying the second indication associated with the second operation at the location that corresponds to both the first portion of the first editable content and the second portion of the first editable content, the electronic device receives (1542) a third portion of the user input, after the first portion of the user input, such as in FIG. 14F (e.g., while displaying the second indication, receiving a further continued movement of the input, without detecting a lift-off or termination of the handwritten input between the first, second, and third portions of the input). In some embodiments, the continued movement is across a third portion of the first editable content. In some embodiments, the continued movement is across the first portion and/or the second portion of the first editable content (e.g., movement back in the opposite direction).

In some embodiments, while receiving the third portion of the user input (1544), in accordance with a determination that the user input is associated with the first operation (e.g., the first portion, second portion, and third portions of the input together correspond to the first operation (e.g., optionally no longer corresponds with the second operation)), the electronic device ceases (1546) to display the second indication associated with the second operation that is displayed at the location that corresponds to both the first portion of the first editable content and the second portion of the first editable content, and displaying a second indication associated with the first operation at the location that corresponds to both the first portion of the first editable content and the second portion of the first editable content, such as removing display of the selection indication and displaying the deletion indication in FIG. 14F (e.g., displaying an indication of the first operation and removing the indication of the second operation (e.g., removing the highlighting)).

For example, if the continued input includes a doubling back, a criss-crossing, a zigzagging, and/or sharp turns of the handwritten input over the first portion or second portion of the first editable content (e.g., the portion that received the first portion or second portion of the input), then the input matches the gesture for the first operation (e.g., a cross-out of text that includes at least two cross-out gestures, either horizontal or vertical) and does not match (e.g., no longer matches) the gesture associated with the second operation (e.g., a single horizontal line across text). For example, if the continued input includes a gesture that changes the direction of the movement more than a threshold amount (e.g., more than a 20-degree change, more than a 30-degree change, more than a 45-degree change, more than 90-degree change, more than a 180-degree change, etc.), the gesture is optionally recognized as a request to perform a deletion operation. In such embodiments, the device determines that the input (e.g., the first, second, and third portions together) corresponds to the first operation rather than the second operation. In some embodiments, the device performs the determination based on only the third portion of the user input (e.g., as opposed to all three portions). In some embodiments, the device performs the determination based on the most recent portions of the user input (e.g., the most recent 0.3 seconds, 0.5 seconds, 1.0 seconds, 2.0 seconds, whether that includes only part of the third portion, all of the third portion, the third portion and some of the second portion, the third portion and all of the second portion, etc.).

In some embodiments, the second indication is displayed on or near the first portion, second portion, and third portion of the first editable content. In some embodiments, the indication of the first operation includes one or more connected horizontal line segments based on the first, second, and third portions of the user input.

The above-described manner of displaying feedback of operations performed by handwritten inputs (e.g., by switching back to displaying the first indication of the first operation after previously switching from displaying the first indication to displaying the second indication of the second operation) provides the user with accurate feedback on what type of operation will be performed if the user were to terminate handwritten input (e.g., by continuing to determine whether the user input is consistent with the first operation or the second operation, and switching back to displaying an indication of the first operation if the user input becomes consistent with the first operation), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, ceasing to display the first indication associated with the first operation that is displayed at the location that corresponds to the first portion of the editable content, and displaying the second indication associated with the second operation at the location that corresponds to both the first portion of the editable content and the second portion of the editable content includes concurrently displaying the first indication associated with the first operation and the second indication associated with the second operation during a transition time period between displaying the first indication associated with the first operation and displaying the second indication associated with the second operation (1548), such as if representation 1410 is faded away while selection indication 1412 faded into view in FIG. 14D (e.g., while switching from displaying the first indication to displaying the second indication, display an animation of the first indication ceasing to be displayed while displaying an animation of the second indication being displayed). For example, displaying an animation of the first indication fading away while displaying an animation of the second indication fading in. Thus, during the transition period, at least a portion of the first indication is displayed while at least a portion of the second portion is displayed.

The above-described manner of displaying feedback of operations performed by handwritten inputs (e.g., by concurrently displaying the first indication corresponding to the first operation and the second indication corresponding to the second operation during the transition from displaying the first indication to the second indication) provides the user with visual feedback that the device has recognized the input as the second operation and the second operation will be performed instead of the first operation (e.g., by displaying an animation of the first indication ceasing to be displayed while concurrently displaying an animation of the second indication coming into view), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

It should be understood that the particular order in which the operations in FIGS. 15A-15E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300, and 1700) are also applicable in an analogous manner to method 1500 described above with respect to FIGS. 15A-15E. For example, the operation of the electronic device displaying visual feedback of text manipulation operations described above with reference to method 1500 optionally has one or more of the characteristics of selecting and providing for interaction with handwritten content, generating normalized shapes based on handwritten inputs, identifying actionable text within handwritten content, presenting tutorials for text manipulation operations, selecting units of content, etc., described herein with reference to other methods described herein (e.g., methods 700, 900, 1100, 1300, and 1700). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5I) or application specific chips. Further, the operations described above with reference to FIGS. 15A-15E are, optionally, implemented by components depicted in FIGS. 1A-1B. For example, displaying operations 1502, 1508, 1518, and 1524, and receiving operations 1504, 1520, and 1542, are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Selecting Content in a User Interface

Users interact with electronic devices in many different manners, including interactions such as viewing and selecting selectable content. In some embodiments, selectable content is organized into one or more units of content. For example, a paragraph is organized into sentences, which are organized into words, which are further organized into characters and/or strokes. The embodiments described below provide ways in which an electronic device selects different units of content based on characteristics of the user input, thus enhancing the user's interactions with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 16A:
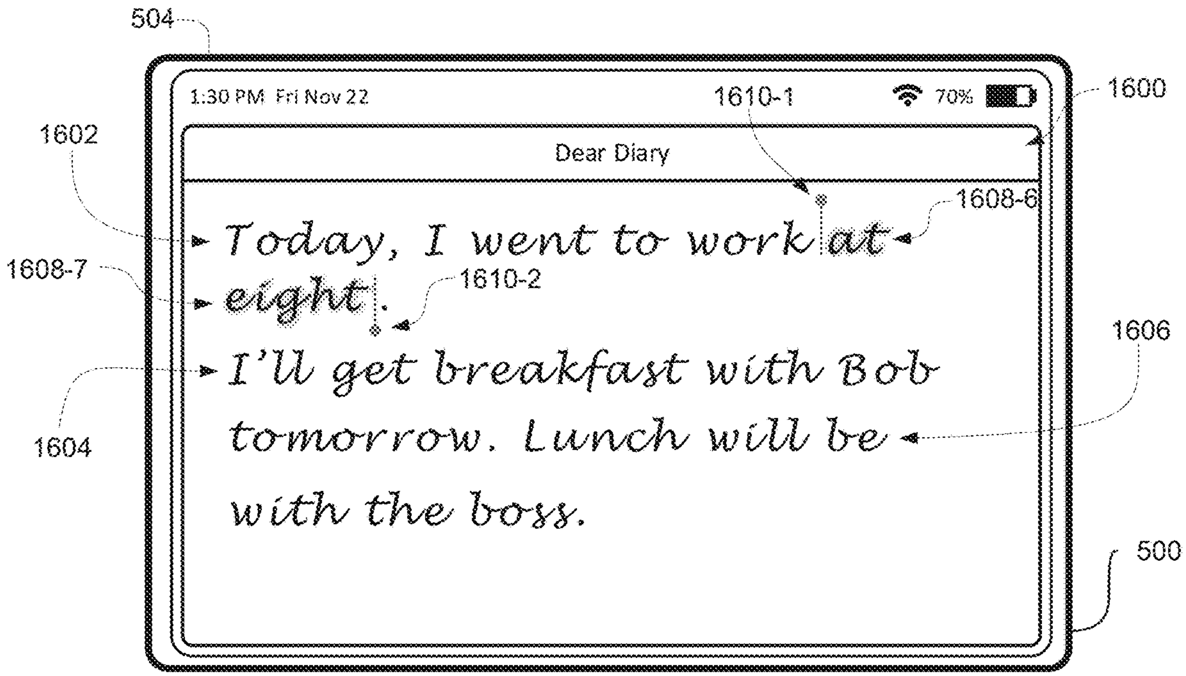
FIGS. 16A-16CC illustrate exemplary ways in which an electronic device selects units of content in accordance with some embodiments.
Figure 16B:
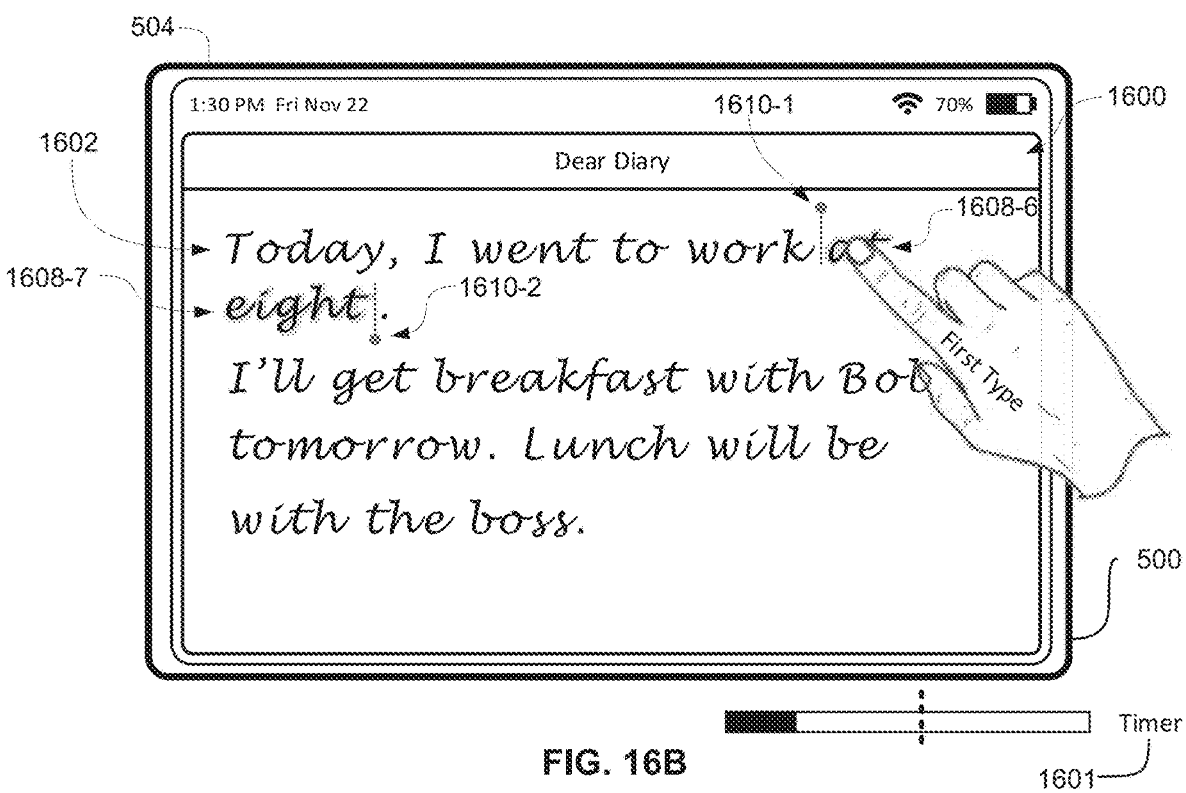
Figure 16C:
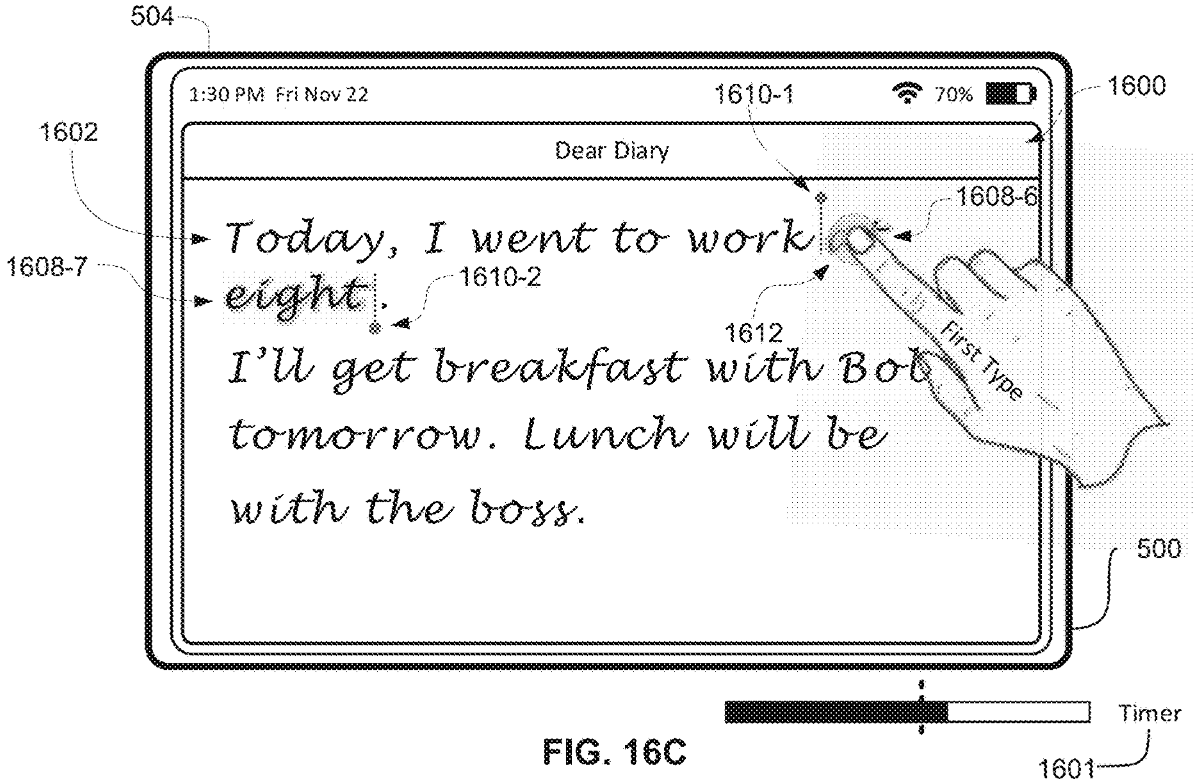

FIGS. 16A-16CC illustrate exemplary ways in which an electronic device selects units of content. The embodiments in these figures are used to illustrate the processes described below, including the processes described with reference to FIGS. 17A-17I.

FIGS. 16A-16CC illustrate operation of the electronic device 500 selecting units of content. FIG. 16A illustrates electronic device 500 displaying user interface 1600 (e.g., via a display device, via a display generation component, etc.). In some embodiments, user interface 1600 is displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500.

In some embodiments, user interface 1600 is a user interface of a notes application. In some embodiments, the notes application is an application installed on device 500. As shown in FIG. 16A, user interface 1600 includes a content entry region. In some embodiments, a content entry region is a region in which a user is able to input and/or enter text, images, multimedia, etc. In FIG. 16A, the content entry region includes sentence 1602, sentence 1604, and sentence 1606. In some embodiments, sentences 1602, 1604, and 1606 are handwritten sentences (e.g., have the original styling of the handwriting input). In some embodiments, sentences 1602, 1604, and 1606 are font-based text (e.g., styled based on a font or typeface). In some embodiments, sentences 1602, 1604, and 1606 are selectable (e.g., the words, characters, and/or strokes in sentences 1602, 1604, and 1606 are selectable).

In FIG. 16A, words 1608-6 and 1608-7 are currently selected and user interface 1600 includes user interface element 1610-1 and user interface element 1610-2 displayed to the left and right of words 1608-6 and 1608-7, respectively. In some embodiments, user interface elements 1610-1 and 1610-2 are selectable and moveable to select more or fewer characters (e.g., by moving the user interface elements so that more or fewer characters fall between the two user interface elements).

In FIG. 16B, a user input of a first type is received on word 1608-6. In some embodiments, the user input of the first type is a tap input followed, in quick succession (e.g., within 0.1 seconds, 0.5 seconds, 1 second, 2 seconds, 5 seconds, etc.), by a contact (e.g., touch-down) at the same location (optionally within 0.1 mm, 0.5 mm, 1 mm, 5 mm, 1 cm, 3 cm, etc. of the initial tap) that is held for a threshold amount of time (e.g., 0.1 seconds, 0.5 seconds, 1 second, 3 seconds, 5 seconds, 10 seconds, etc.). In FIG. 16B, the contact has been held for less than the threshold amount of time (e.g., as shown by timer 1601). In FIG. 16C, the contact has been held for more than the threshold amount of time and in response to the contact being held for more than the threshold amount of time, device 500 enters into a selection painting mode (e.g., a freeform selection mode, similar to the selection painting mode described above with respect to method 700) and displays painter element 1612 (e.g., similar to painter element 620 described above with respect to FIGS. 6R-6CC).

In FIG. 16C, while in the selection painting mode, a user is able to interact with selectable content in user interface 1600 to cause the content to be selected. In some embodiments, painter element 1612 moves in accordance with the movement of the contact with touch screen 504 and selectable content that falls within the area of painter element 1612 is selected. In some embodiments, the speed of the movement of the user input determines the unit of selection. For example, the sentences in user interface 1600 are optionally organized into progressively smaller units of content. One example of a unit of content is a sentence, which includes sub-units of words, which themselves include sub-units of characters (e.g., letters), which themselves include sub-units of strokes (e.g., handwriting strokes). In some embodiments, device 500 selects content one unit at a time (e.g., the entire unit, including the sub-units within the unit) and the type of unit (or sub-unit) that is selected is optionally based on the speed of the movement of the user input. As described below, increasing the speed of the movement of the user input optionally causes the unit of selection to be increased (e.g., from one sub-unit to the next larger sub-unit). It is understood that device 500 need not traverse, sequentially, through varying units of selection—rather, certain units of selection can be skipped in response to increases and/or decreases in the speed of the movement of the user input (e.g., device 500 optionally need not select on a letter-by-letter basis in response to increasing movement speed, but rather can switch from selecting content on a stroke-by-stroke basis to selecting content on a word-by-word basis, without operating in a mode in which content is selected on a letter-by-letter basis). It is also understood that in some embodiments, increasing the speed of the movement optionally causes the unit of selection to be decreased rather than increased (e.g., increasing speed causes selection to switch from selecting content on a sentence-by-sentence basis to a word-by-word basis, to a letter-by-letter basis, etc.). In some embodiments, other units and sub-units of content are similarly selected (e.g., paragraphs, lines, etc.).

Figure 16D:
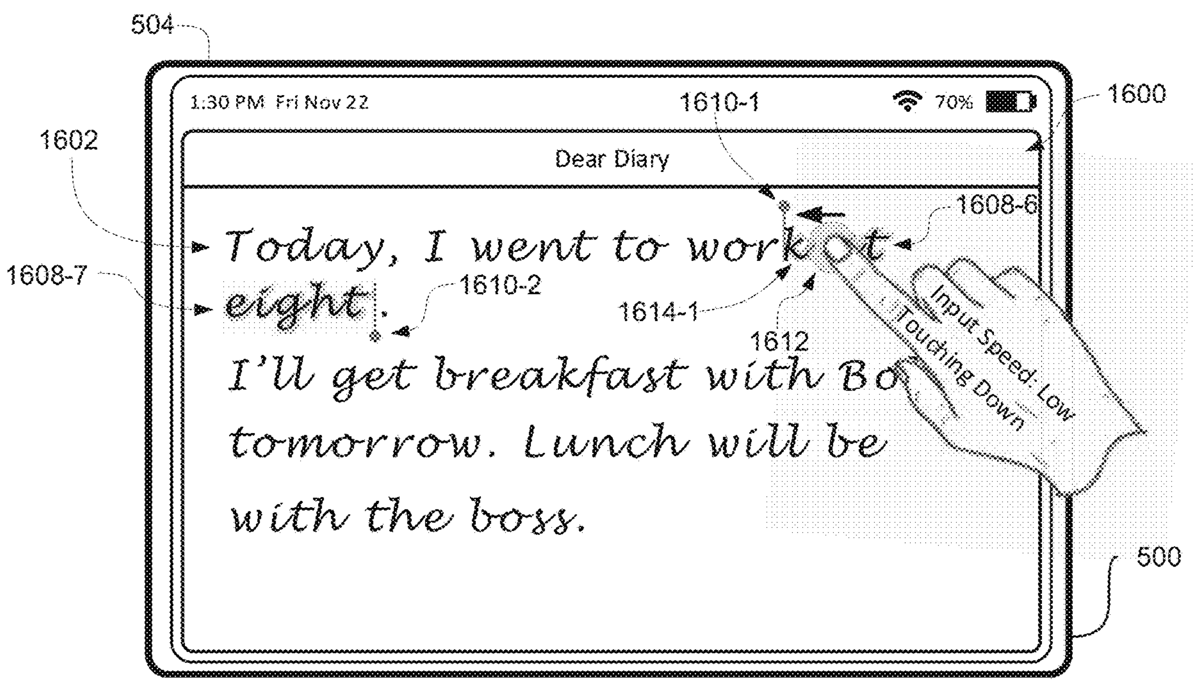

For example, in FIG. 16D, a leftward movement of the user input is detected while the speed of the leftward movement is low. Thus, device 500 is in a first selection mode in which the unit of selection is a stroke (e.g., content is selected stroke-by-stroke). In FIG. 16D, because device 500 is in a first selection mode, the radius of painter element 1612 is small, indicating that the unit of selection is a small unit (e.g., a stroke). In FIG. 16D, the leftward movement of the user input caused painter element 1612 to encompass a portion of stroke 1614-1 of the letter "k" (e.g., a portion of stroke 1614-1 falls within the area of painter element 1612). In response to painter element 1612 encompassing a portion of stroke 1614-1, stroke 1614-1 is selected. Thus, as discussed above, when device 500 is in the first selection mode, the unit of selection is a stroke such that content is selected on a stroke-by-stroke basis.

Figure 16E:
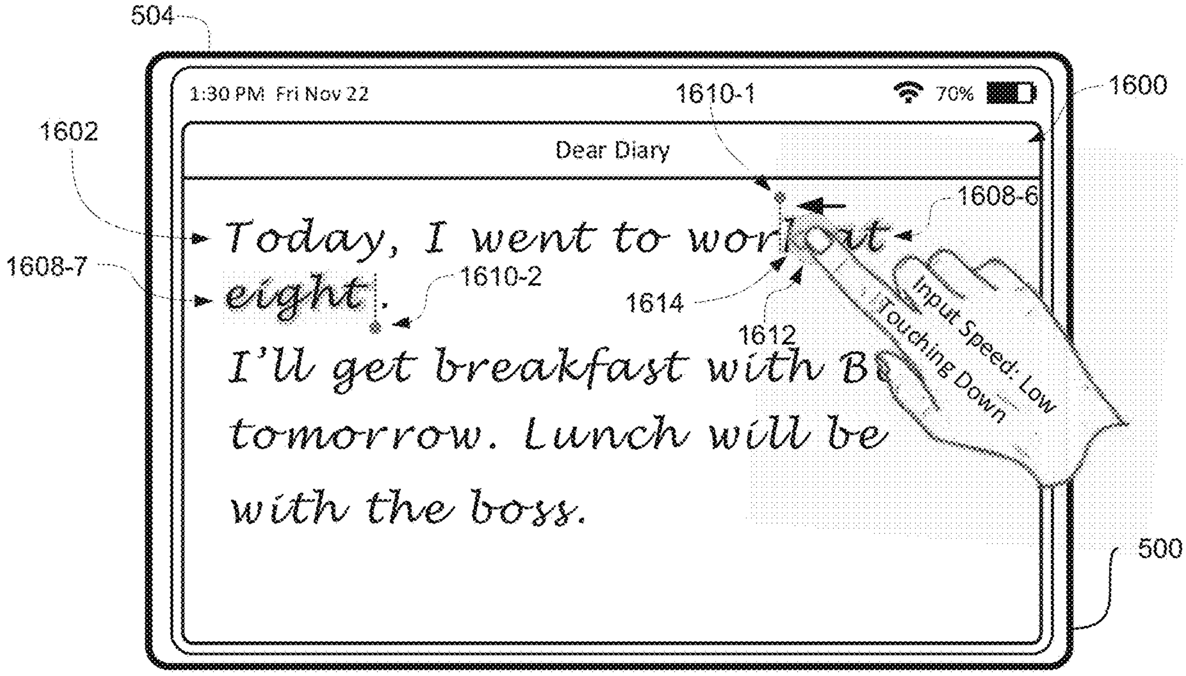
Figure 16F:
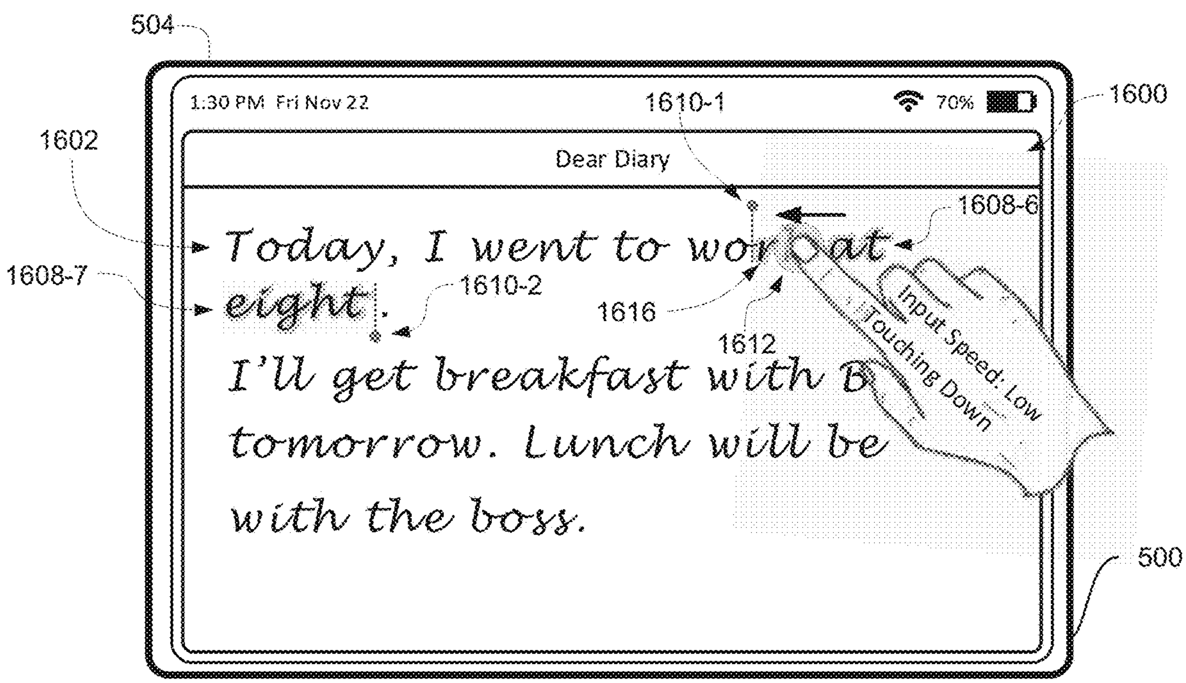

In FIG. 16E, a further leftward movement of the user input is detected while the movement speed is low, causing painter element 1612 to encompass letter 1614 (e.g., painter element 1612 encompasses at least a portion of both strokes of the letter "k"). Thus, in response to painter element 1612 encompassing letter 1614, both strokes of letter 1614 are selected, such as in FIG. 16E. In FIG. 16F, a further leftward movement of the user input is detected while the movement speed is low, causing painter element 1612 to encompass at least a portion of letter 1616. In some embodiments, because letter 1616 consists a single stroke (e.g., it took one stroke to write the letter "r"), in response to painter element 1612 encompassing at least a portion of letter 1616, letter 1616 is selected, as shown in FIG. 16F. Thus, as described above, device 500 is able to identify the individual strokes of a letters and select content on a stroke-by-stroke basis.

Figure 16G:
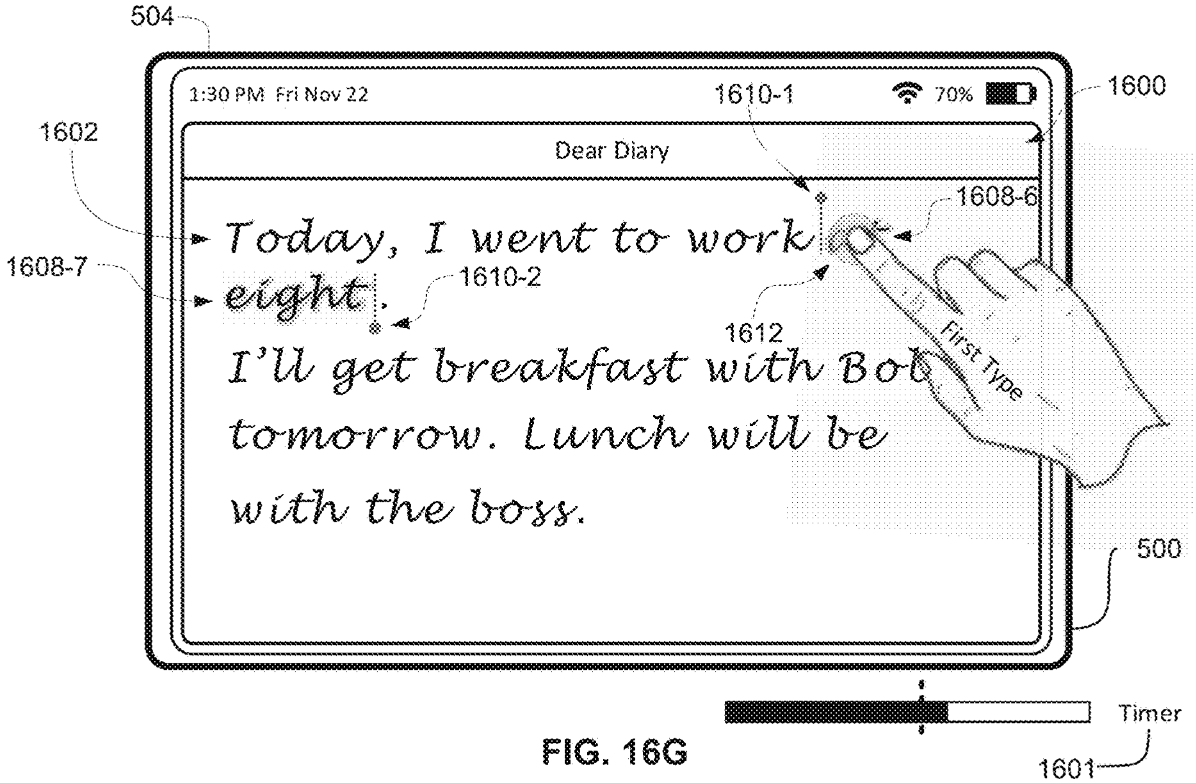
Figure 16H:
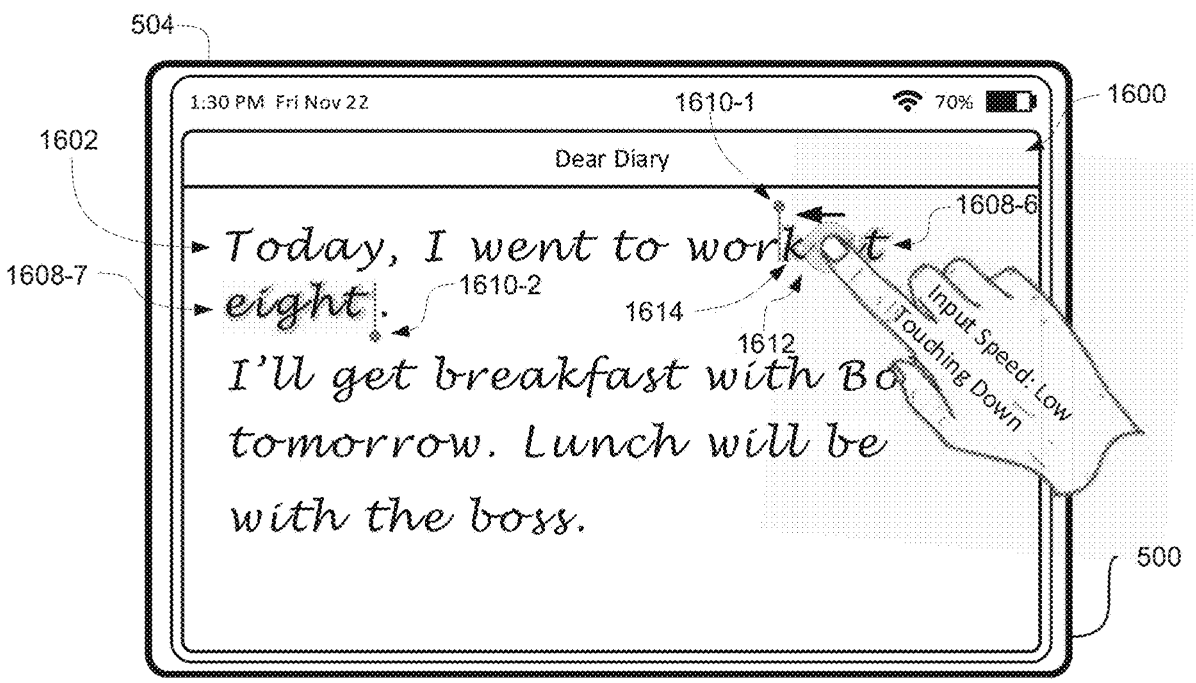
Figure 16I:
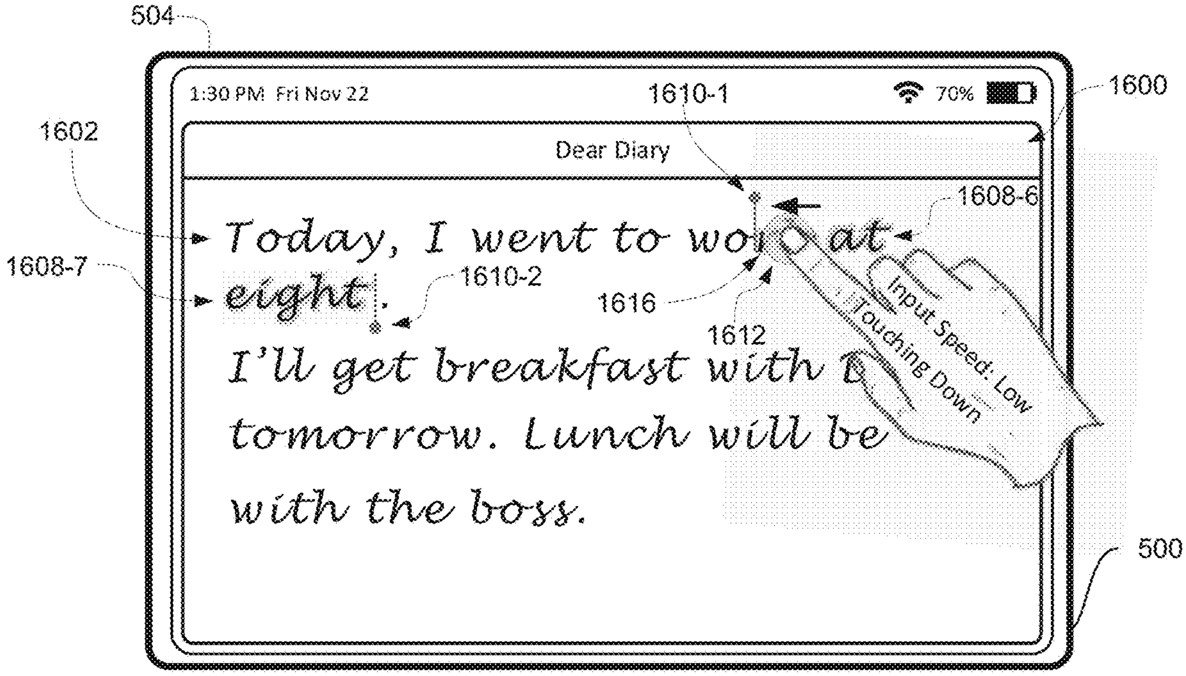

FIGS. 16G-16I illustrates an embodiment in which content is selected on a letter-by-letter basis. In FIG. 16G, a contact has been held for more than the threshold amount of time and in response to the contact being held for more than the threshold amount of time, device 500 enters into a selection painting mode and displays painter element 1612. In FIG. 16H, while in the selection painting mode, a leftward movement of the user input is detected while the speed of the leftward movement is low. Thus, because the movement of the user input is low, device 500 is in a first selection mode in which the unit of selection is a letter (e.g., content is selected letter-by-letter). For example, in FIG. 16H, the leftward movement of the user input caused painter element 1612 to encompass at least a portion of letter 1614. In response to painter element 1612 encompassing at least a portion of letter 1614, device 500 optionally selects letter 1614, as shown in FIG. 16H.

In FIG. 16I, a further leftward movement of the user input is detected while the movement speed is low, causing painter element 1612 to encompass at least a portion of letter 1616. In some embodiments, in response to painter element 1612 encompassing at least a portion of letter 1616, device 500 selects letter 1616, as shown in FIG. 16I. Thus, as shown, when device 500 is in a first selection mode (e.g., associated with a low movement speed), device 500 selects content on a letter-by-letter basis. It is understood selecting content on a letter-by-letter basis can be in addition to or alternatively to selecting content on a stroke-by-stroke basis (e.g., when device 500 is in a first selection mode). For example, device 500 can select content on a letter-by-letter basis while in a second selection mode (e.g., instead of a first selection mode) that is associated with a movement speed faster than the movement speed for the first selection mode.

Figure 16J:
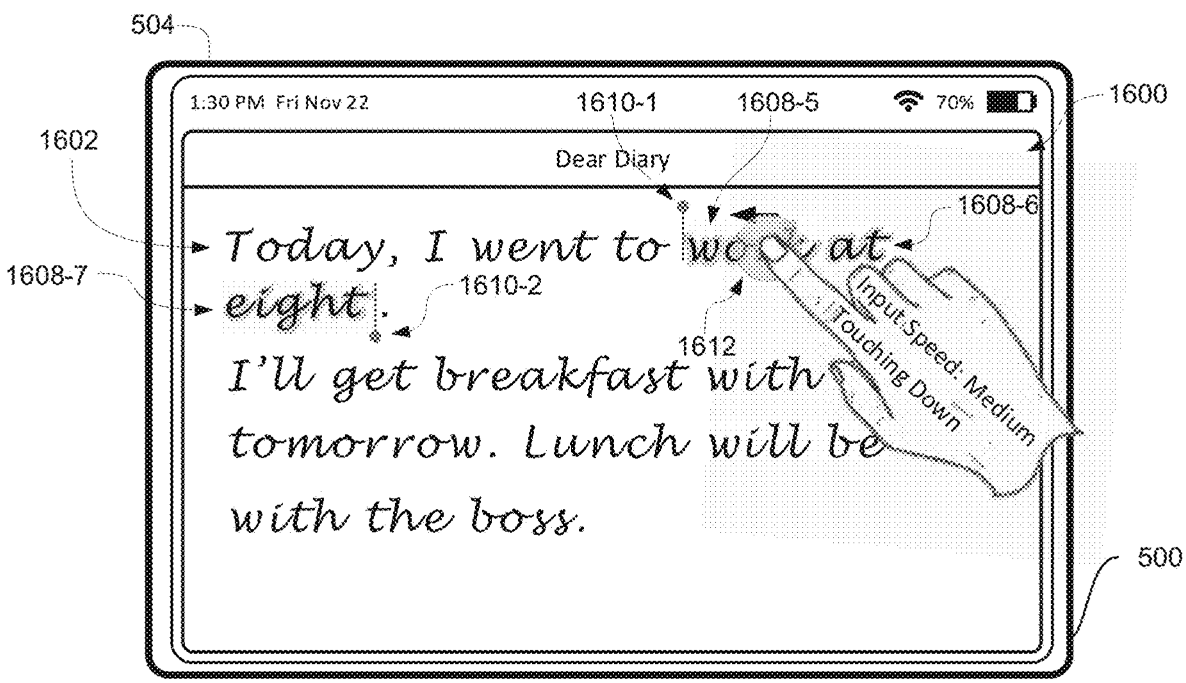

In FIG. 16J, a further leftward movement of the user input is detected while the movement speed is medium. In some embodiments, because the movement speed has increased, device 500 enters into a second selection mode and the size (e.g., radius, length, width, area, minor axis, and/or major axis) of painter element 1612 increases to indicate that the unit of selection has increased (e.g., increasing from selecting content on a stroke-by-stroke basis or a letter-by-letter basis to a word-by-word basis). For example, in FIG. 16J, the leftward movement of the user input caused selection painter 1612 to encompass at least a portion of word 1608-5. In some embodiments, in response to selection painter 1612 encompassing at least a portion of word 1608-5, word 1608-5 is selected, as shown in FIG. 16J. In some embodiments, user interface element 1610-1 moves leftwards to the left of word 1608-5. Thus, even though painter element 1612 did not encompass the first letter of word 1608-5 (e.g., the "w"), the letter "w" is selected because device 500 is in a mode in which content is selected on a word-by-word basis and the letter "w" is a part of word 1608-5, which has been selected in response to the user encompassing at least a portion of word 1608-5.

Figure 16K:
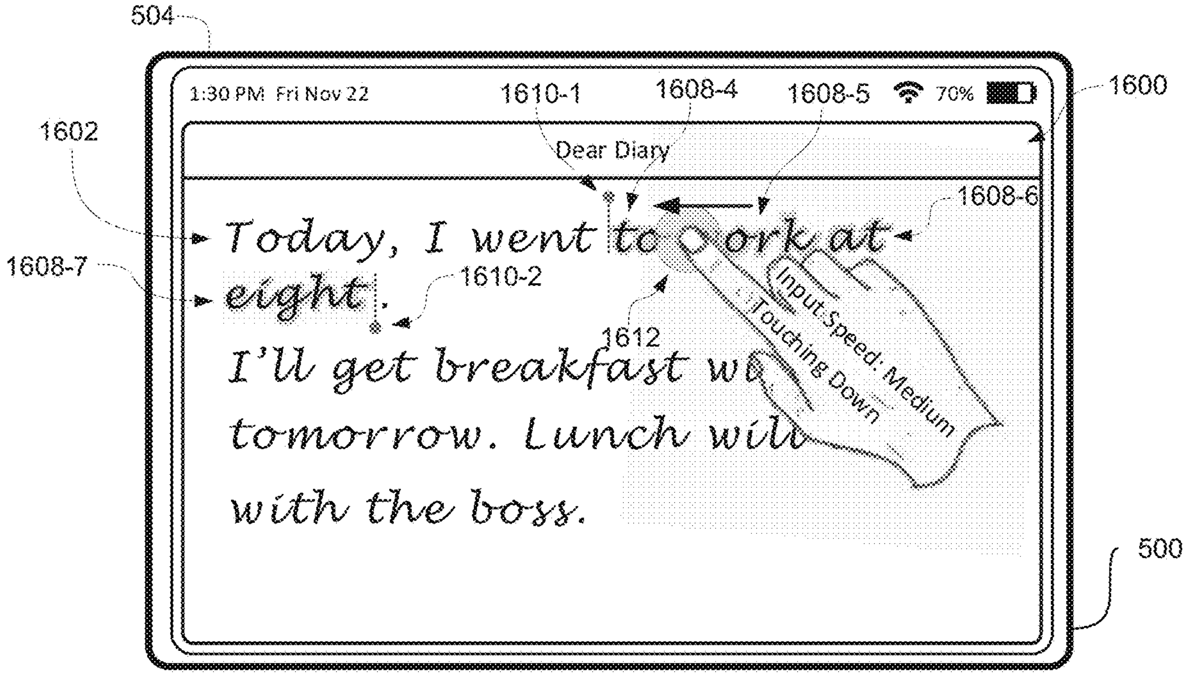

In FIG. 16K, a further leftward movement of the user input is detected while the movement speed is medium, causing painter element 1612 to encompass at least a portion of word 1608-4 (e.g., the letter "o" of the word "to"). In some embodiments, in response to painter element 1612 encompassing at least a portion of word 1608-4, word 1608-4 is selected, as shown in FIG. 16K. Thus, as shown above, while device 500 is in a second selection mode in which content is selected on a word-by-word basis, interaction with a portion of a word by painter element 1612 causes the word to be selected (e.g., the entire word).

Figure 16L:
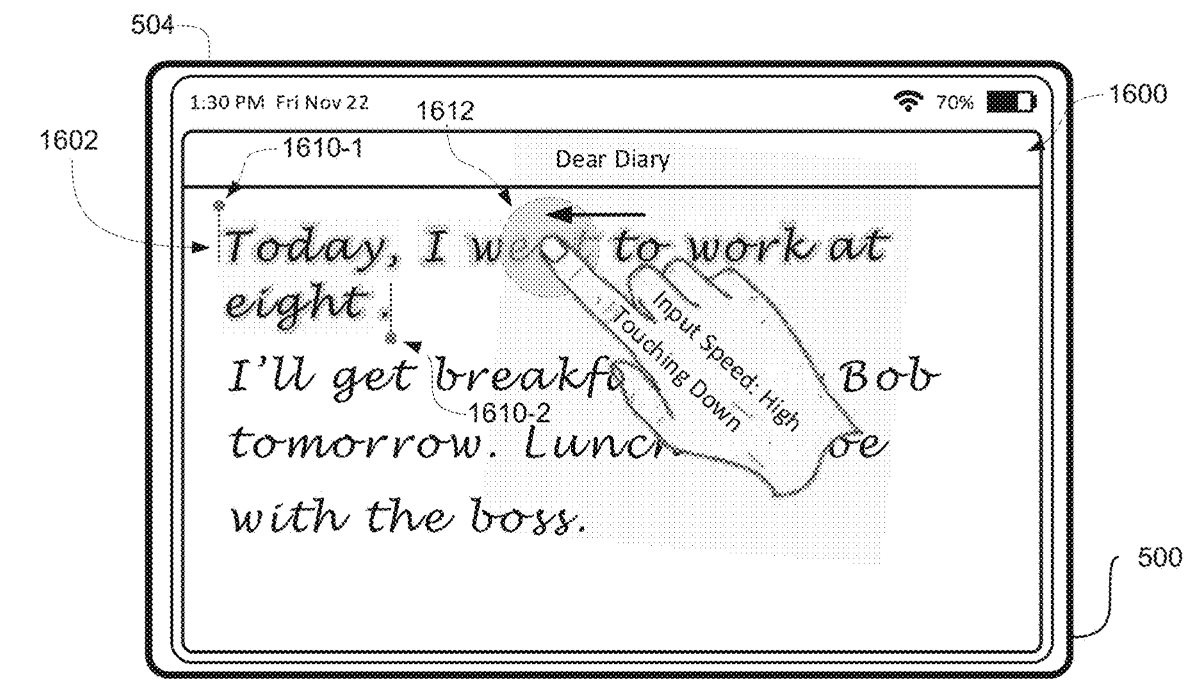

In FIG. 16L, a further leftward movement of the user input is detected while the movement speed is high. In some embodiments, because the movement speed has increased, device 500 enters into a third selection mode and the size (e.g., radius) of painter element 1612 increases to indicate that the unit of selection has increased (e.g., increasing from selecting content on a word-by-word basis to a sentence-by-sentence basis). For example, in FIG. 16L, the leftward movement of the user input caused selection painter 1612 to encompass at least a portion of sentence 1602 (e.g., by encompassing a portion of the word "went", which is a constituent part of sentence 1602). In some embodiments, in response to selection painter 1612 encompassing at least a portion of sentence 1602, sentence 1602 is selected, as shown in FIG. 16L. In some embodiments, selection of sentence 1602 causes user interface element 1610-1 to move to the left of sentence 1602 (e.g., to the left of the word "Today") and user interface element 1610-2 to move to the right of sentence 1602 (e.g., to the right of the period). Thus, selection of a unit of content (e.g., such as a sentence in FIG. 16L) can cause more content to be selected to the left and/or to the right side selection painter 1612 (e.g., based on the size of selection painter 1612 as compared to the size of the unit of content being selected).

Figure 16M:
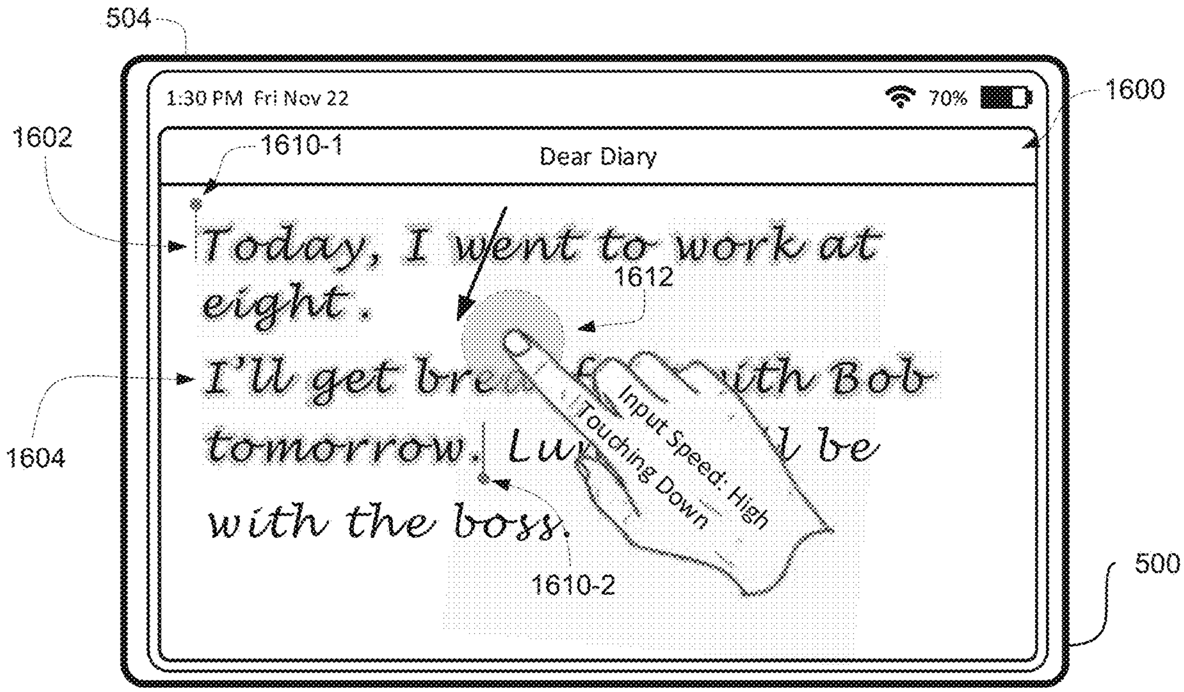

In FIG. 16M, a downward movement of the user input is detected while the movement speed is high, thus moving selection painter 1612 to encompass at least a portion of sentence 1604 (e.g., selection painter 1612 encompasses at least a portion of the letters "ea" of the word "breakfast", which is a constituent part of sentence 1604). In some embodiments, in response to selection painter 1612 encompassing at least a portion of sentence 1604 while device 500 is in the third selection mode (e.g., the selection mode in which content is selected sentence-by-sentence), sentence 1604 is selected, as shown in FIG. 16M. In some embodiments, user interface element 1610-2 is moved to the right of sentence 1604 (e.g., to the right of the period of sentence 1604).

Figure 16N:
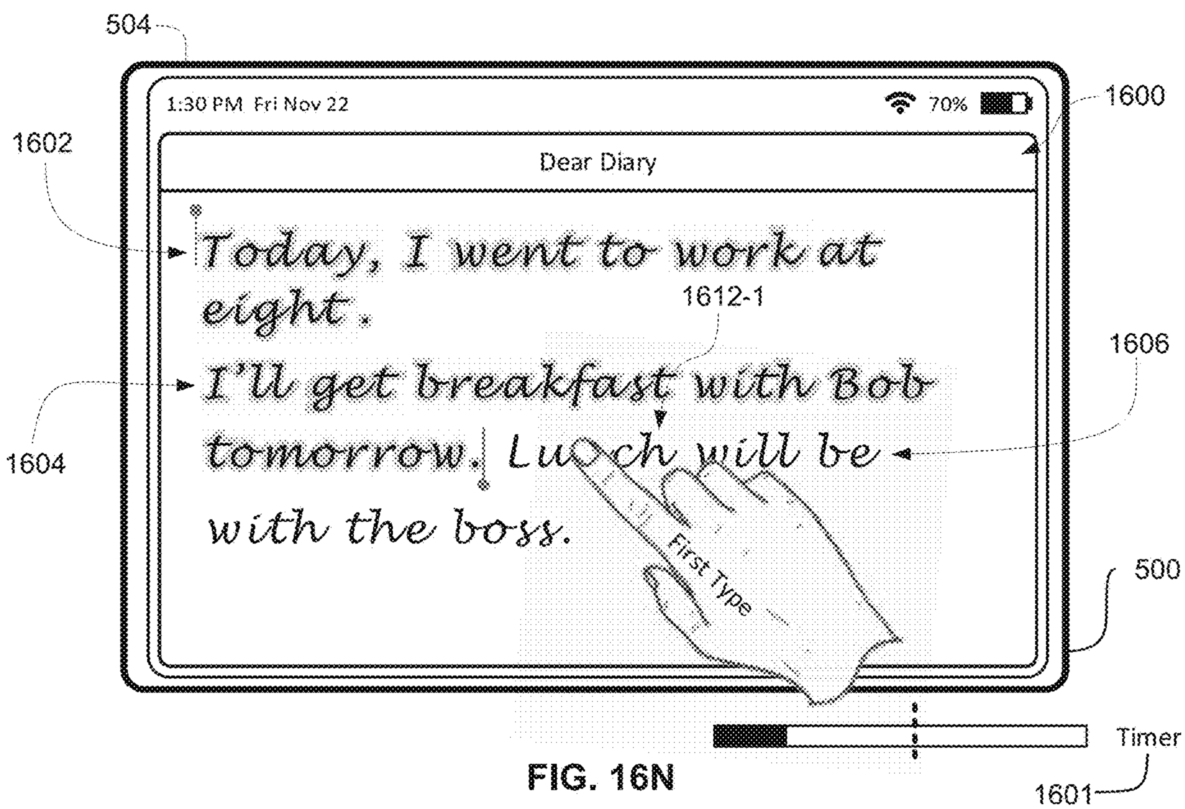

FIGS. 16N-16Q illustrate an embodiment of the selection painting mode in which content is de-selected. In FIG. 16N, a user input of a first type is received on word 1612-1. As shown in FIG. 16N, word 1612-1 is not selected when the user input was received. In some embodiments, entering into selection painting mode by selecting selectable content that is not selected causes the selection painting mode to de-select content (e.g., as opposed to selecting content as illustrated above in FIGS. 16B-16M).

Figure 16O:
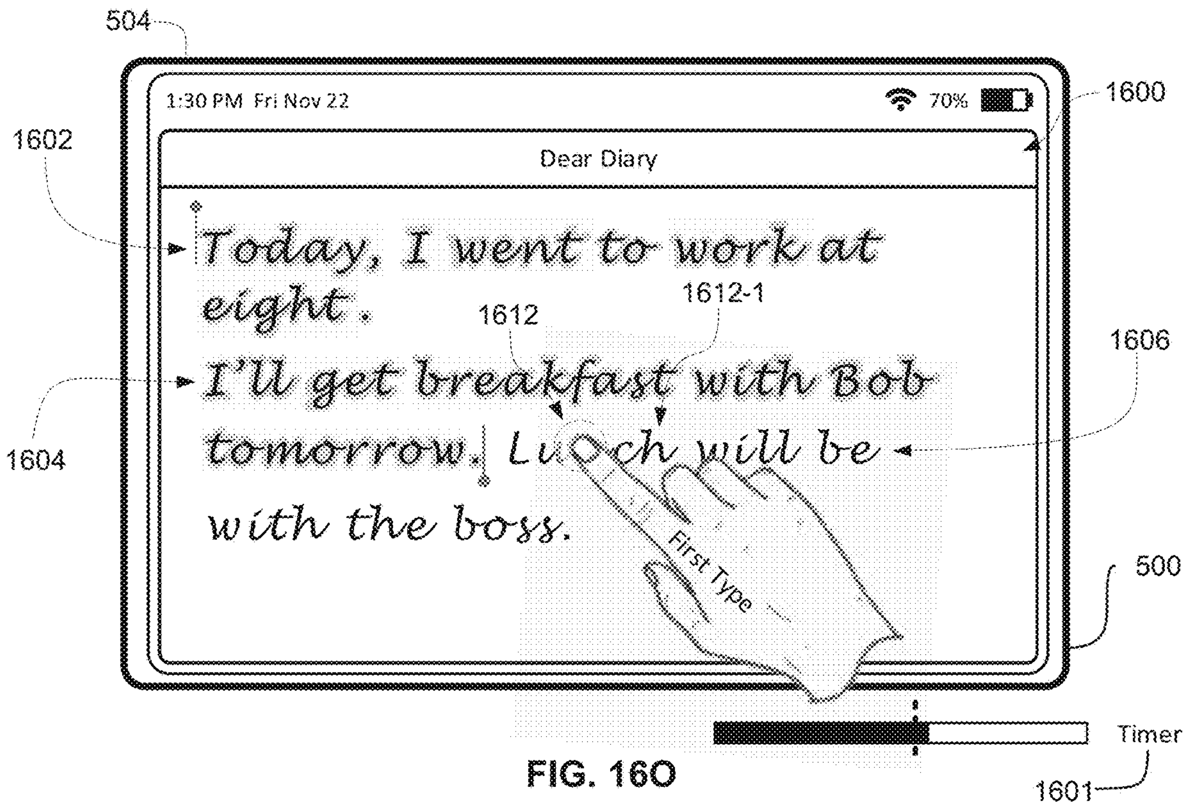

In FIG. 16O, in response to the contact being held for more than the threshold amount of time, device 500 enters into a selection painting mode and displays painter element 1612. In some embodiments, because the contact was on selectable content that was not selected at the time the input was received, the selection painting mode causes de-selection of content. Thus, the selection state of the content on which the user input was initially received determines whether selection painting mode causes selection or de-selection of content. In some embodiments, painter element 1612 has a different visual characteristic when in de-selection mode as opposed to selection mode. For example, in FIG. 16O, painter element 1612 is displayed with a lighter color (e.g., a more transparent color, a different color, etc.) than when in selection painting mode was in selection mode. In some embodiments, while in selection or de-selection mode, the behavior of the de-selection of units of content is similar to the behavior of selecting units of content. For example, increasing movements speeds causes increasingly larger units of content to be de-selected (e.g., from stroke-by-stroke, to letter-by-letter, to word-by-word, to sentence-by-sentence, etc.).

Figure 16P:
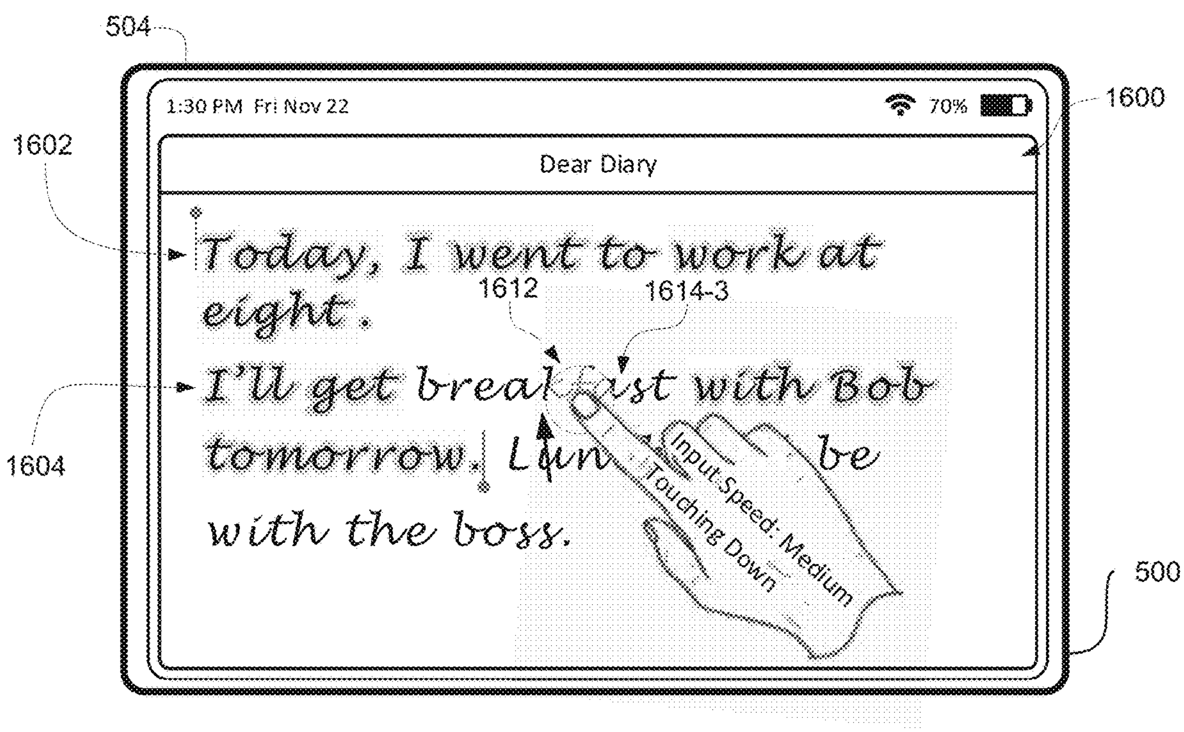
Figure 16Q:
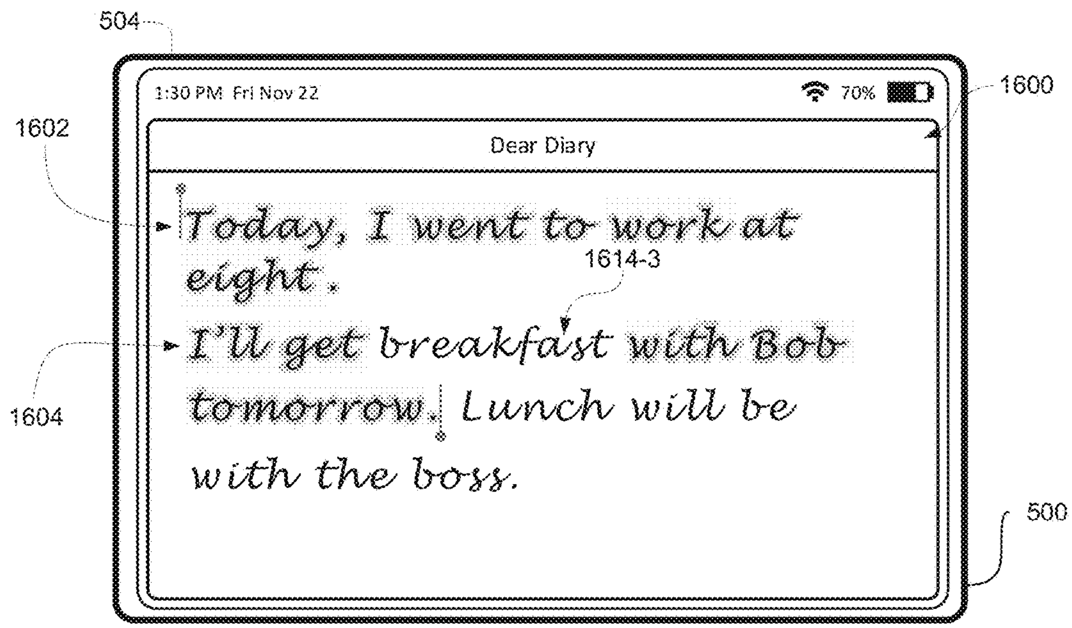

In FIG. 16P, an upward movement of the user input is detected while the speed of the movement is medium. Thus, device 500 is in second selection mode in content is selected word-by-word. In FIG. 16P, the upward movement of the user input caused painter element 1612 to encompass at least a portion of word 1614-3 (e.g., painter element 1612 encompassed at least a portion of the letters "kfa"). In some embodiments, in response to painter element 1612 encompassing at least a portion of word 1614-3, device 500 de-selects word 1614-3, as shown in FIG. 16P. Thus, content interacted with by painter element 1612 optionally becomes de-selected, as shown in FIG. 16Q. In FIG. 16Q, after detecting a termination of the user input (e.g., lift-off of the contact), painter element 1612 is ceased to be displayed and device 500 exits selection painting mode (optionally after a threshold amount of time after receiving no user inputs, such as 0.1 seconds, 0.5 seconds, 1 second, 3 seconds, 5 seconds, 10 seconds, etc.).

Figure 16R:
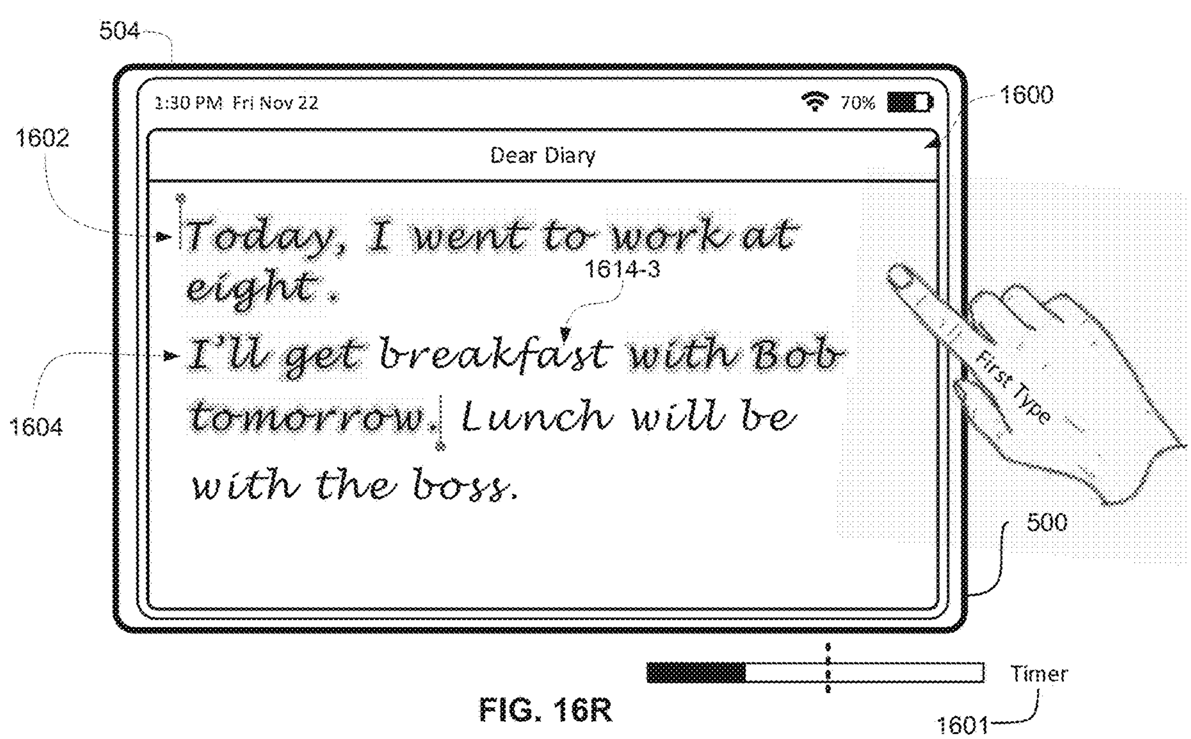

FIGS. 16R-16Z illustrate embodiments in whether selection painting mode causes selection or de-selection is based on the first content interacted with by a painter element. In FIG. 16R, a user input of a first type is received at a location not associated with any selectable content (e.g., a location where there are no words). Thus, because the location of the user input does not include any selectable content, whether selection painting mode causes selection or de-selection of content is not based on the selection state of the content at the location of the initial input (e.g., because there is no content at the location of the initial input). Thus, in such an embodiment, whether selection painting mode causes selection or de-selection is based on the selection state of the first content interacted with by the painter element (e.g., in response to a movement of the user input).

Figure 16S:
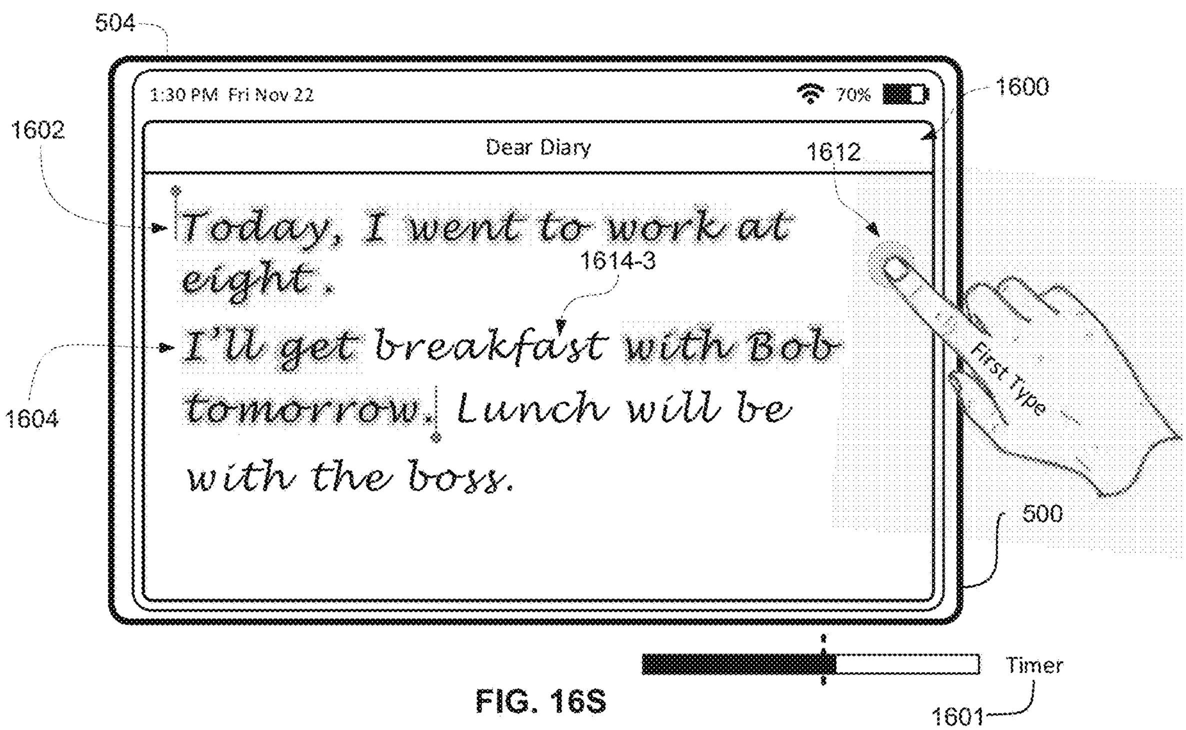

In FIG. 16S, the contact has been held for more than the threshold amount of time and in response to the contact being held for more than the threshold amount of time, device 500 enters into a selection painting mode and displays painter element 1612. In some embodiments, painter element 1612 is displayed with the same visual characteristic as selection painting mode causes selection (e.g., such as in FIG. 16C).

Figure 16T:
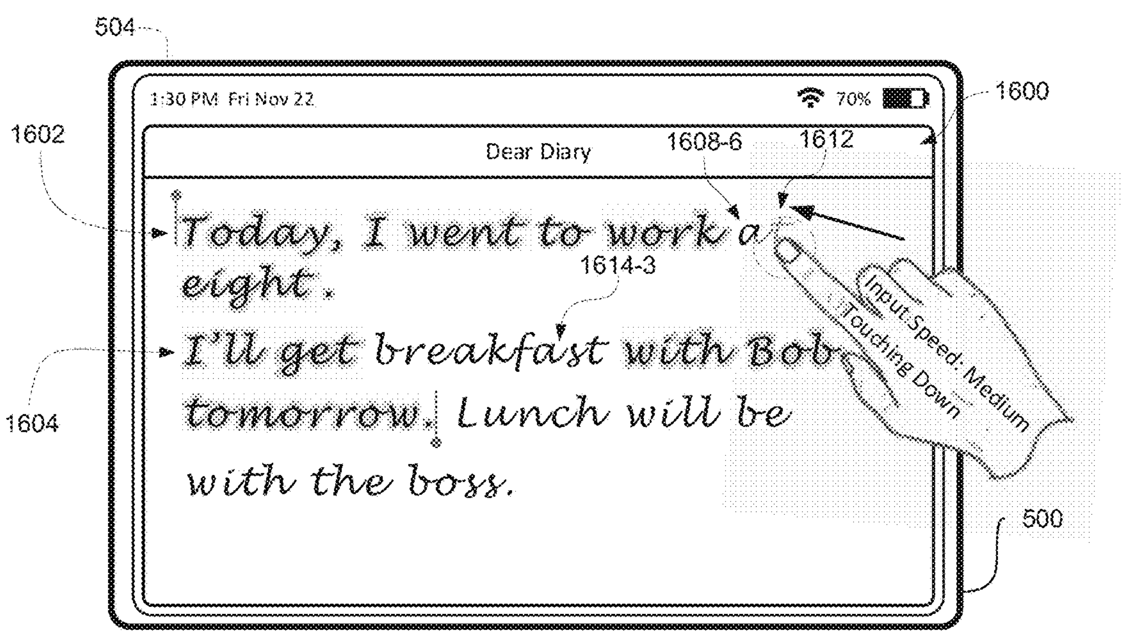
Figure 16U:
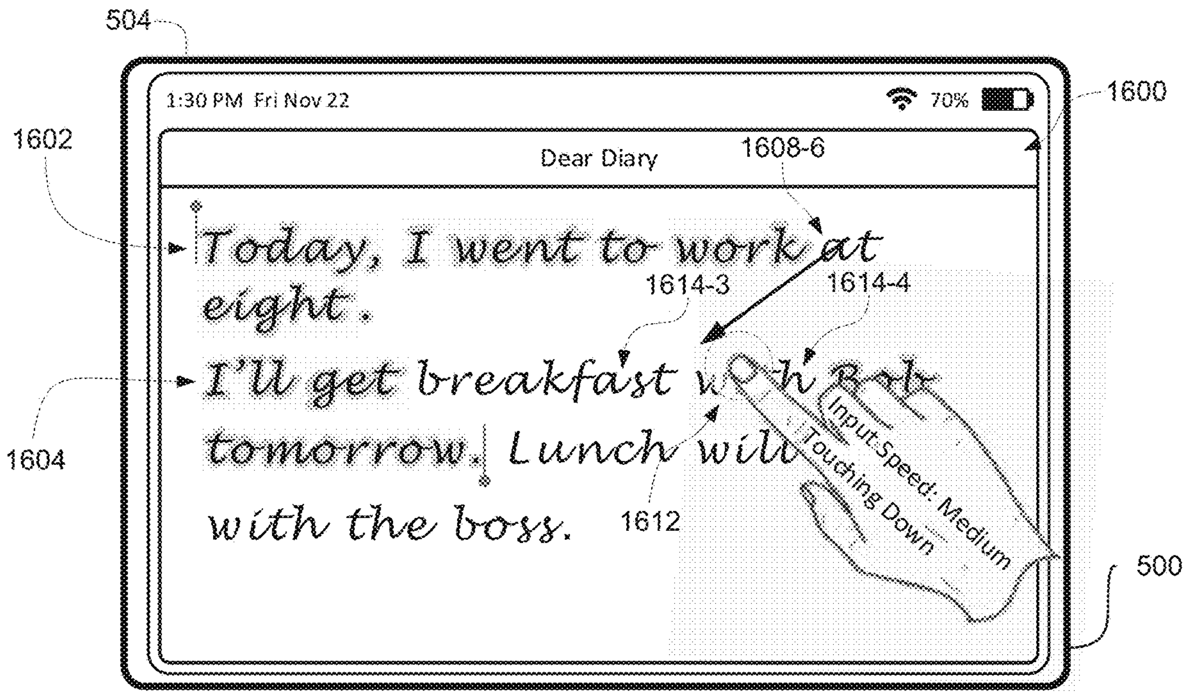

In FIG. 16T, an upward and leftward movement of the user input is detected while the movement speed is medium, causing painter element 1612 to encompass at least a portion of word 1608-6. In some embodiments, word 1608-6 was selected before painter element 1612 was moved to encompass at least a portion of word 1608-6. Thus, because the first content interacted with by painter element 1612 is selected, the selection painting mode locks into de-selecting content. For example, further movements of the user input cause content to be de-selected, regardless of whether the content is selected or de-selected. In some embodiments, because the selection painting mode locks into de-selection content, painter element 1612 is updated to visually indicate that content will be de-selected (e.g., painter element 1612 is displayed with a lighter color than when in selection painting mode was in selection mode). Thus, in some embodiments, in response to painter element 1612 encompassing at least a portion of word 1608-6, word 1608-6 is de-selected, as shown in FIG. 16T In FIG. 16U, a downward and leftward movement of the user input is detected while the movement speed is medium, causing painter element 1612 to encompass at least a portion of word 1614-4. In some embodiments, word 1614-4 was selected before painter element 1612 encompassed at least a portion of word 1614-4 and in response to painter element 1612 encompassing at least a portion of word 1614-4, word 1614-4 is de-selected, as shown in FIG. 16U.

Figure 16V:
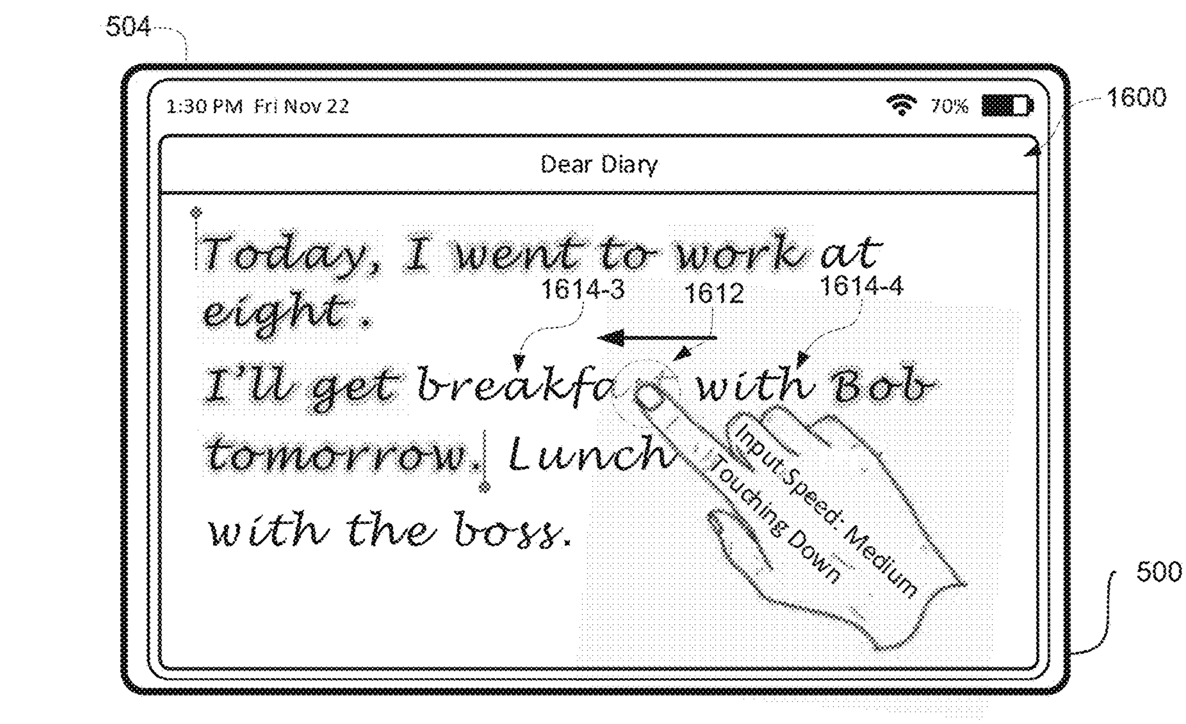

In FIG. 16V, a leftward movement of the user input is detected while the movement speed is medium, causing painter element 1612 to encompass at least a portion of word 1614-3. In some embodiments, word 1614-3 was not selected before painter element 1612 encompassed at least a portion of word 1614-3. Thus, in response to painter element 1612 encompassing at least a portion of word 1614-3, word 1614-3 maintains its de-selected state (e.g., does not become selected), as shown in FIG. 16V.

Figure 16W:
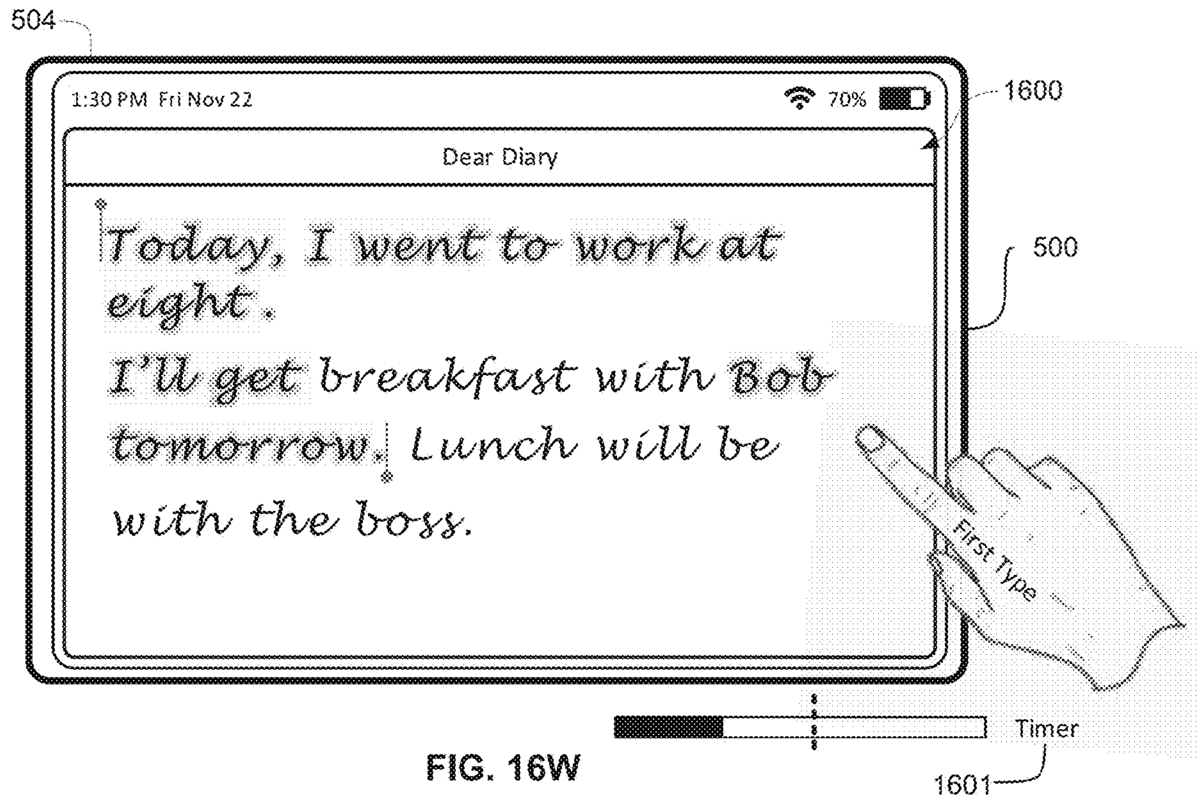

FIGS. 16W-16Z illustrate an embodiment in which the content first interacted with by the painter element is not selected. In FIG. 16W, a user input of a first type is received at a location not associated with any selectable content (e.g., a location where there are no words). Thus, because the location of the user input does not include any selectable content, whether selection painting mode causes selection or de-selection of content is based on the selection state of the first content interacted with by the painter element (e.g., in response to a movement of the user input).

Figure 16X:
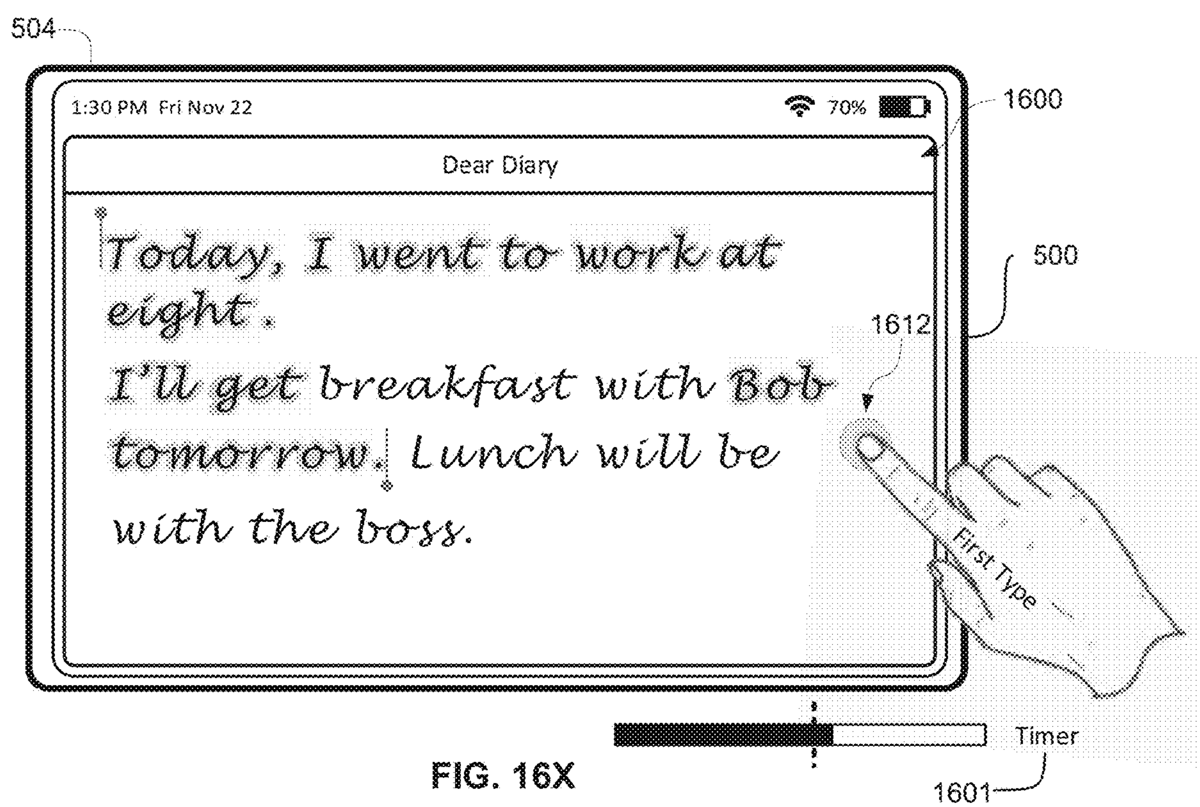

In FIG. 16X, the contact has been held for more than the threshold amount of time and in response to the contact being held for more than the threshold amount of time, device 500 enters into a selection painting mode and displays painter element 1612. In some embodiments, painter element 1612 is displayed with the same visual characteristic as selection painting mode causes selection (e.g., such as in FIG. 16C).

Figure 16Y:
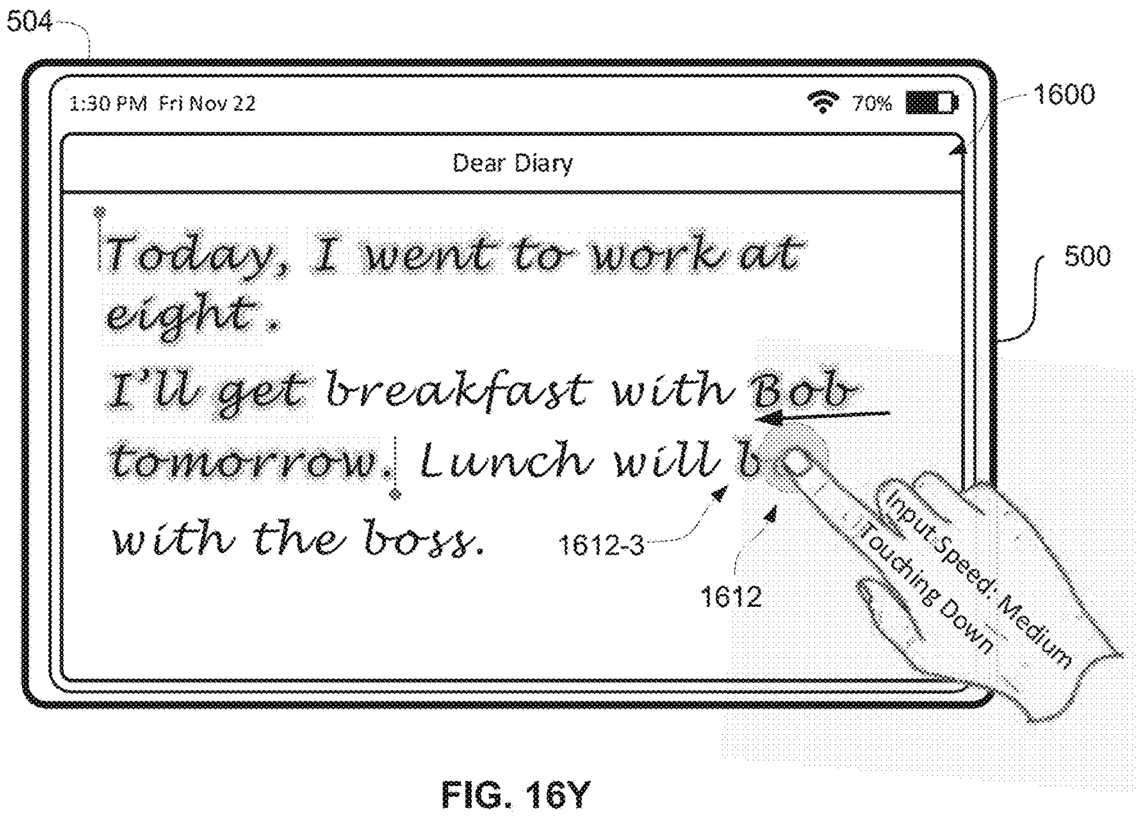

In FIG. 16Y, a leftward movement of the user input is detected while the movement speed is medium, causing painter element 1612 to encompass at least a portion of word 1612-3. In some embodiments, word 1612-3 was not selected before painter element 1612 was moved to encompass at least a portion of word 1612-3. Thus, because the first content interacted with by painter element 1612 was not selected, the selection painting mode locks into selection of content. For example, further movements of the user input cause content to be selected, regardless of whether the content is selected or de-selected. In some embodiments, because the selection painting mode locks into selection content, painter element 1612 maintains its visual characteristic that indicates that content will be selected (e.g., as opposed to de-selected). Thus, in some embodiments, in response to painter element 1612 encompassing at least a portion of word 1612-3, word 1612-3 is selected, as shown in FIG. 16Y.

Figure 16Z:
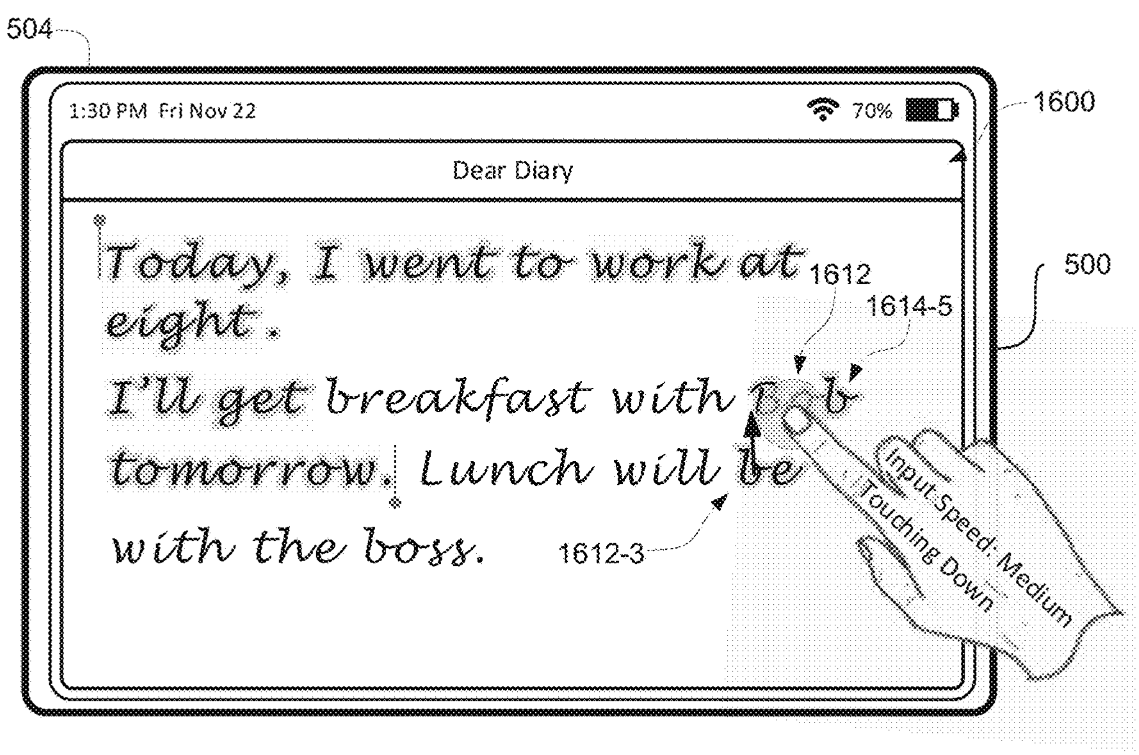
Figure 16A:
Figure 16B:
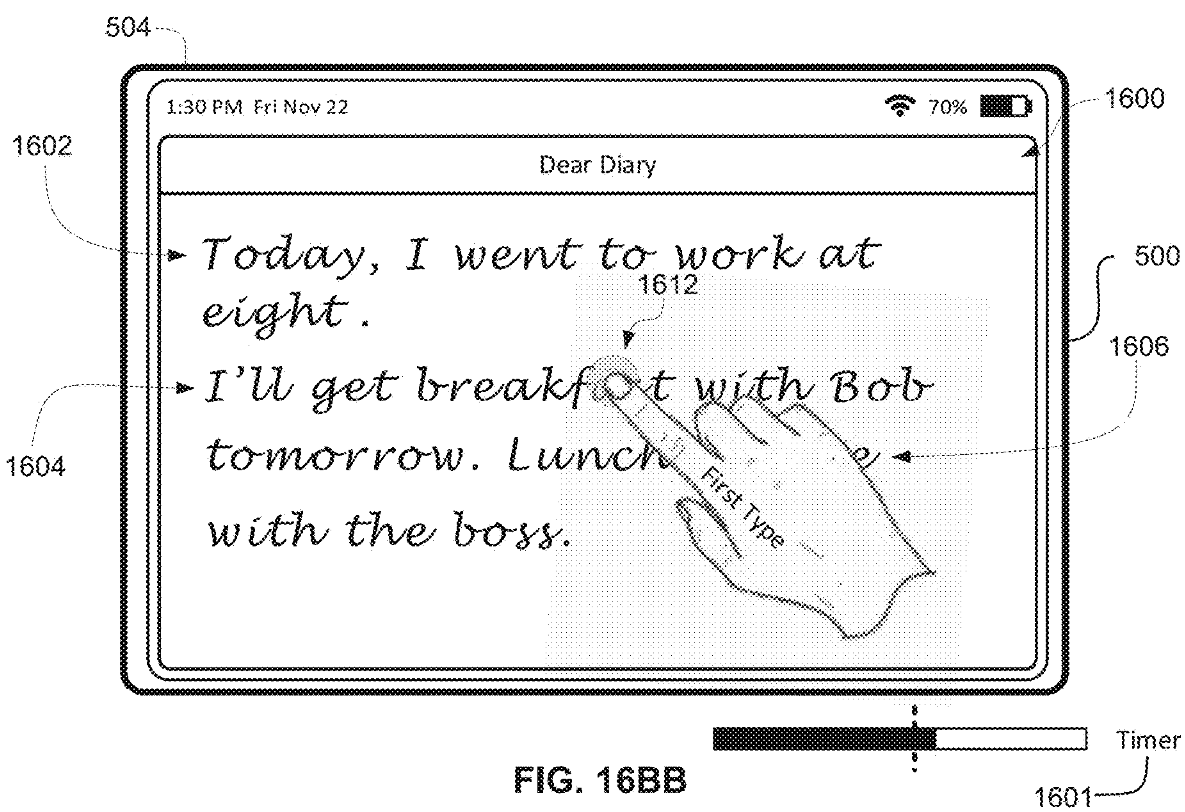
Figure 16C:
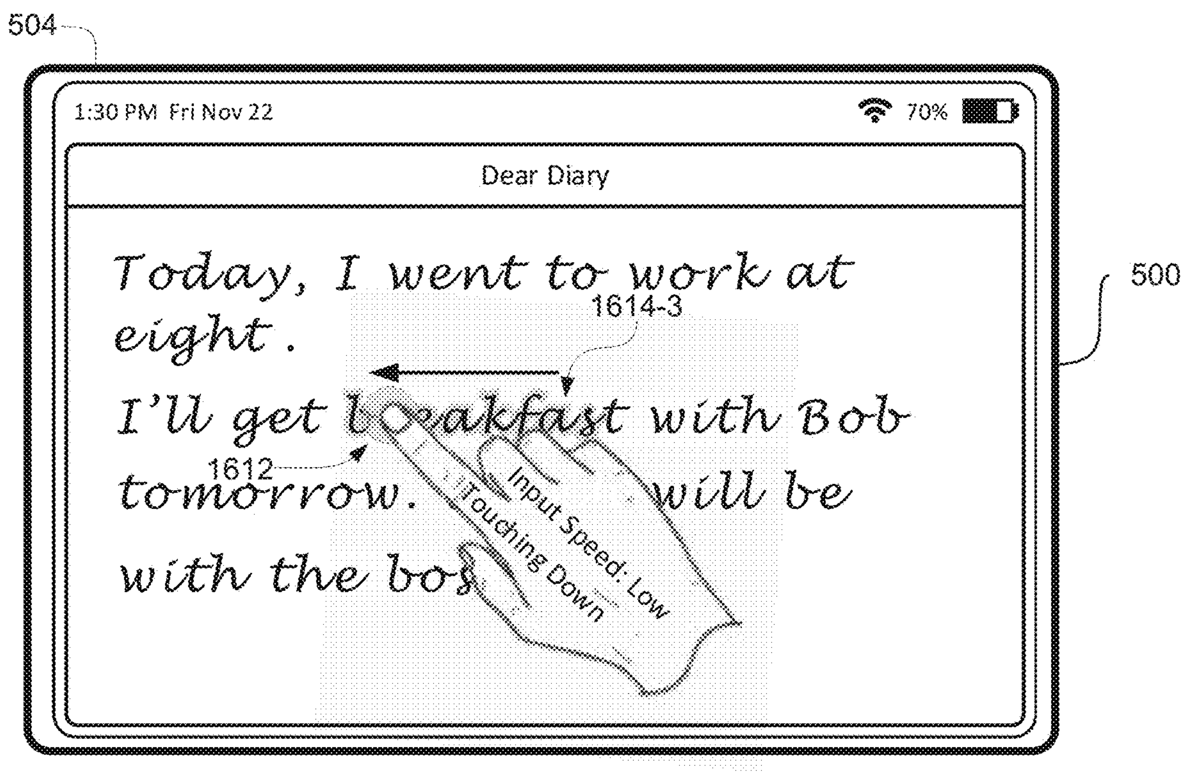
Figure 17A:
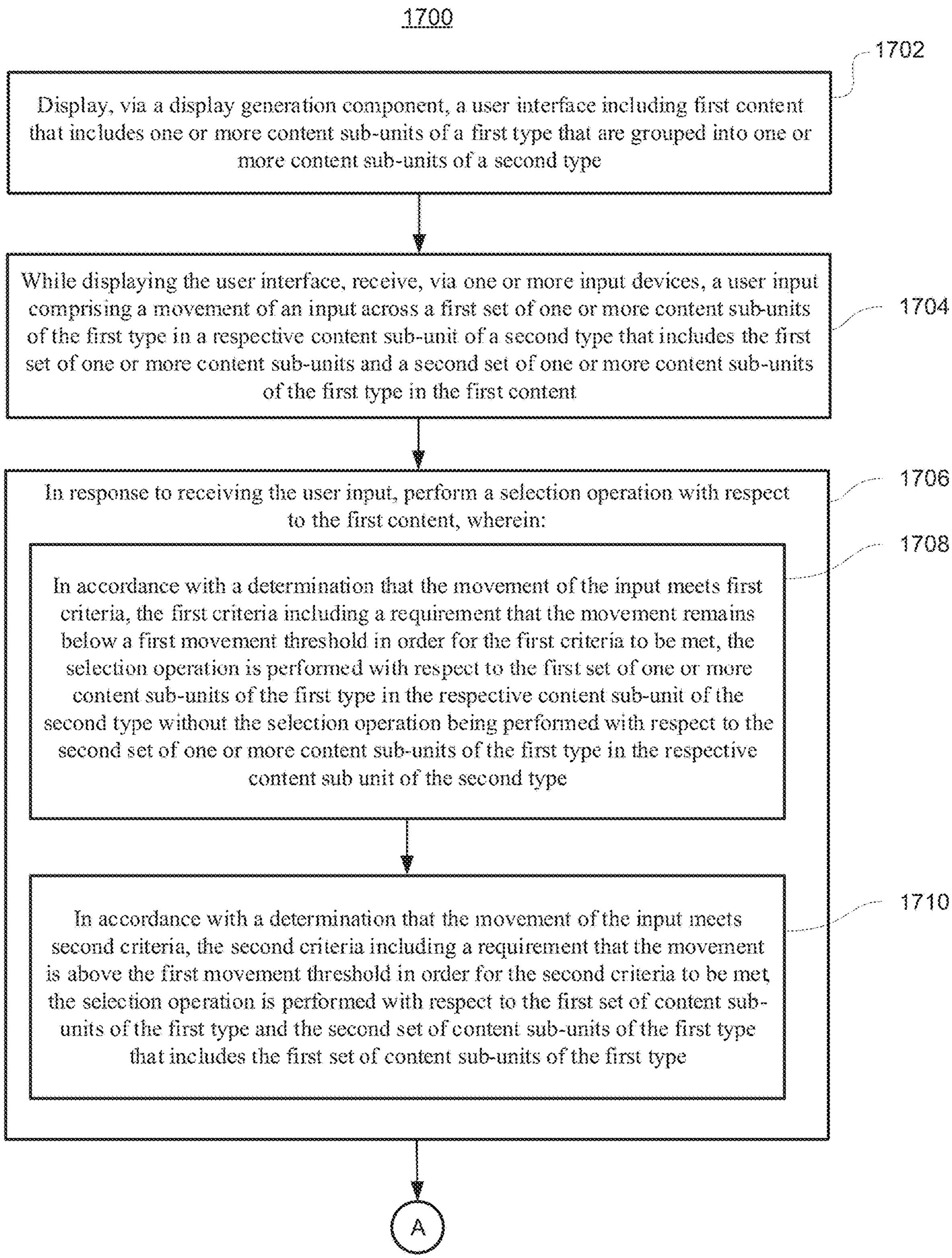
Figure 17B:
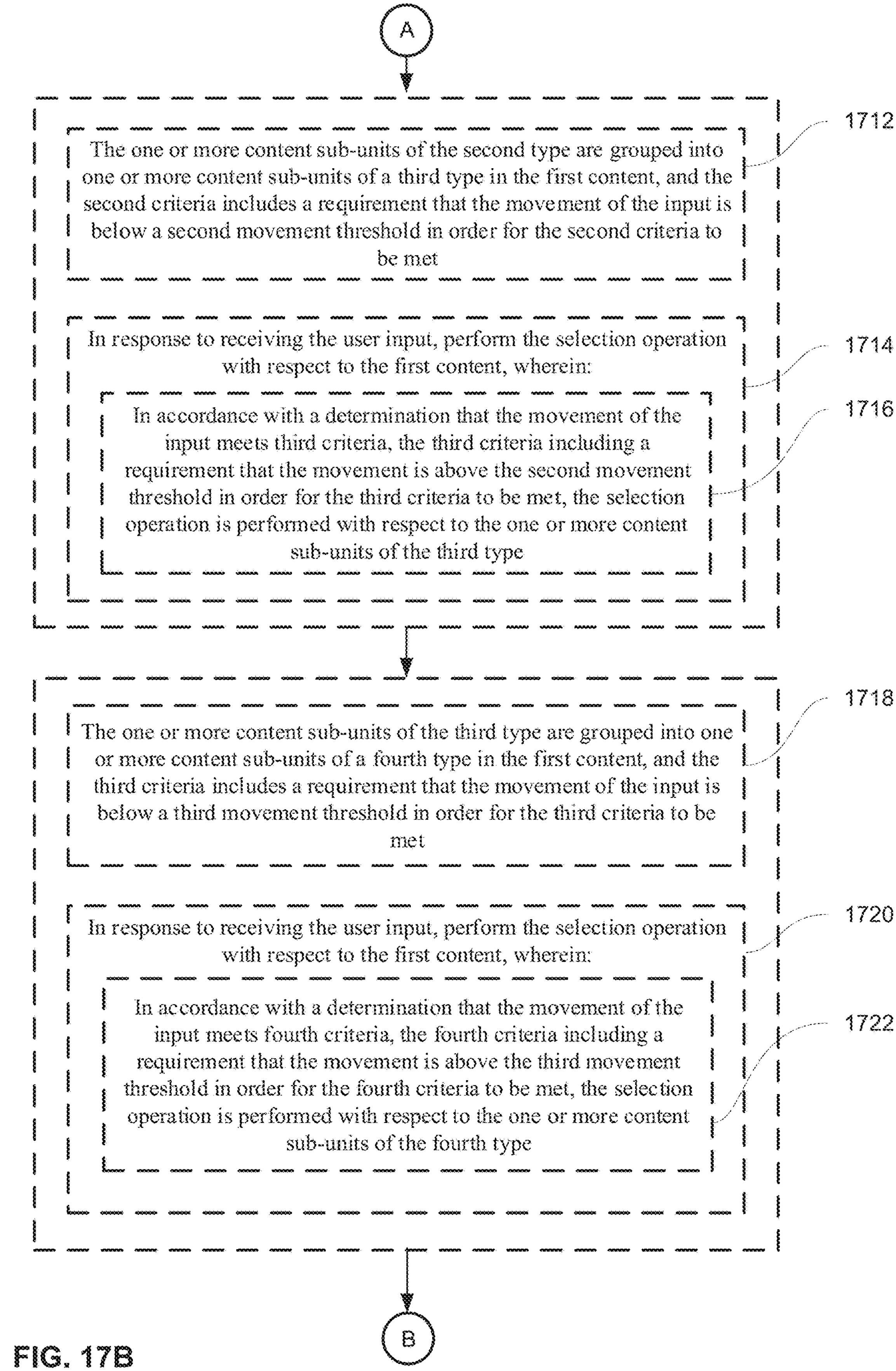
Figure 17C:
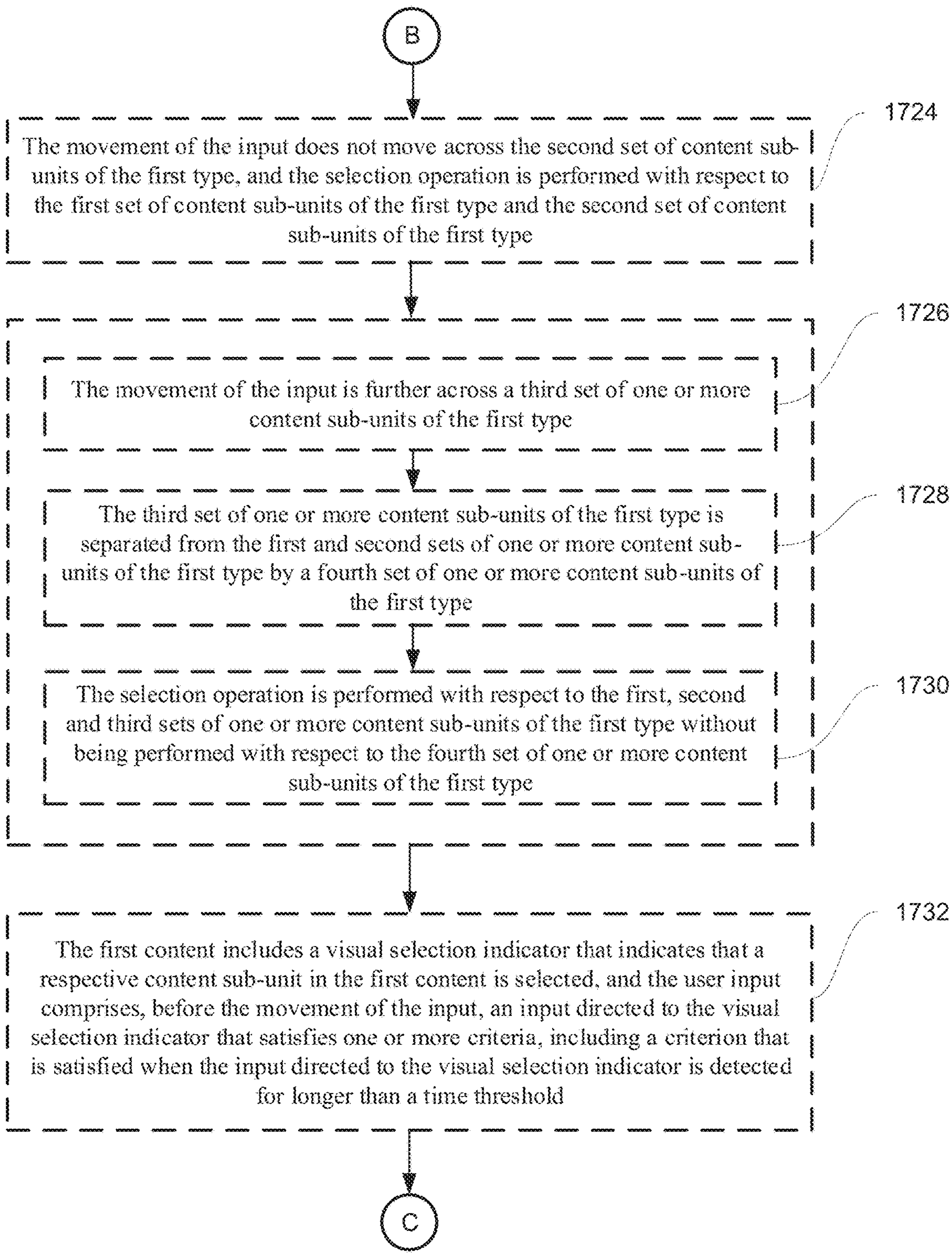
Figure 17D:
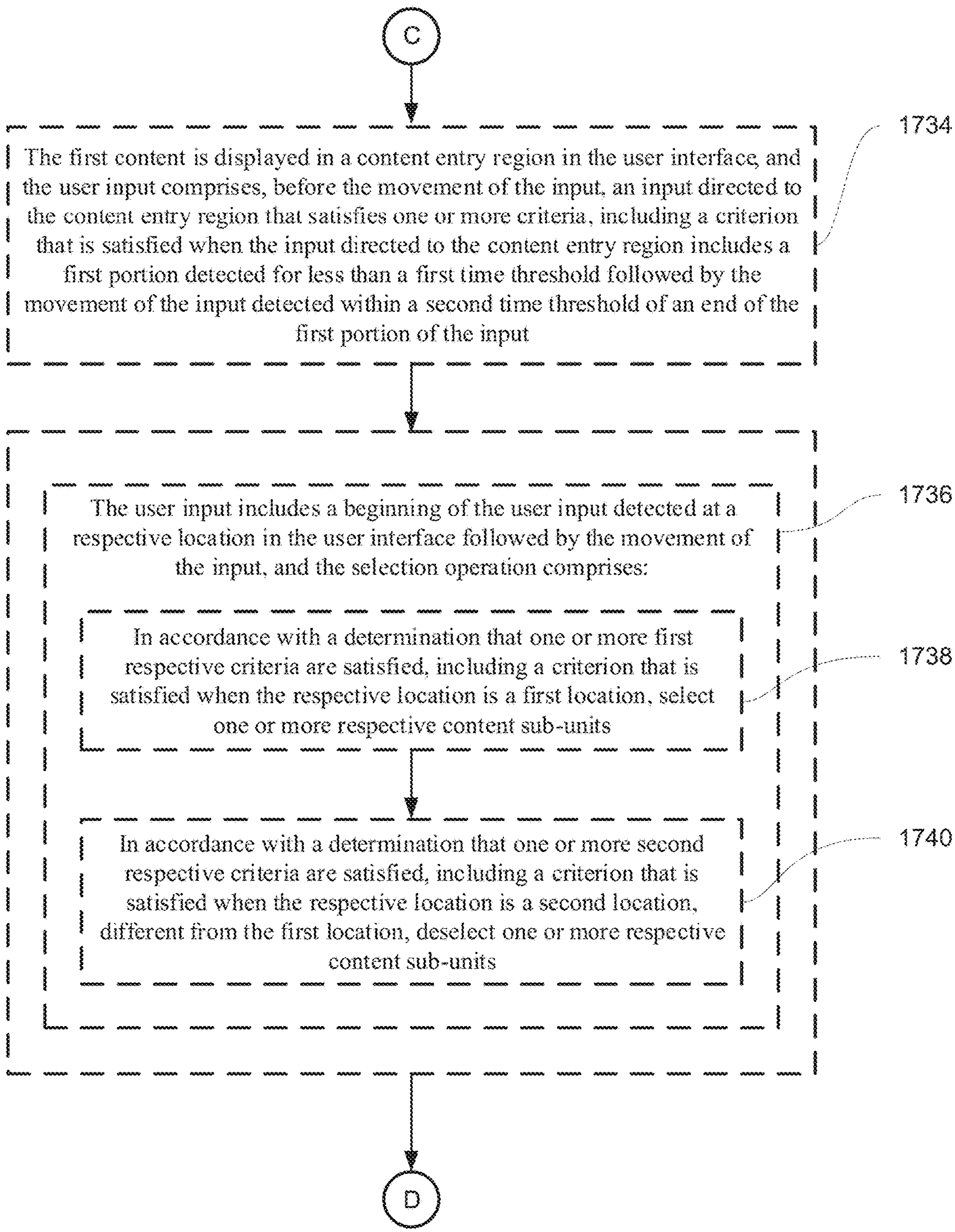
Figure 17F:
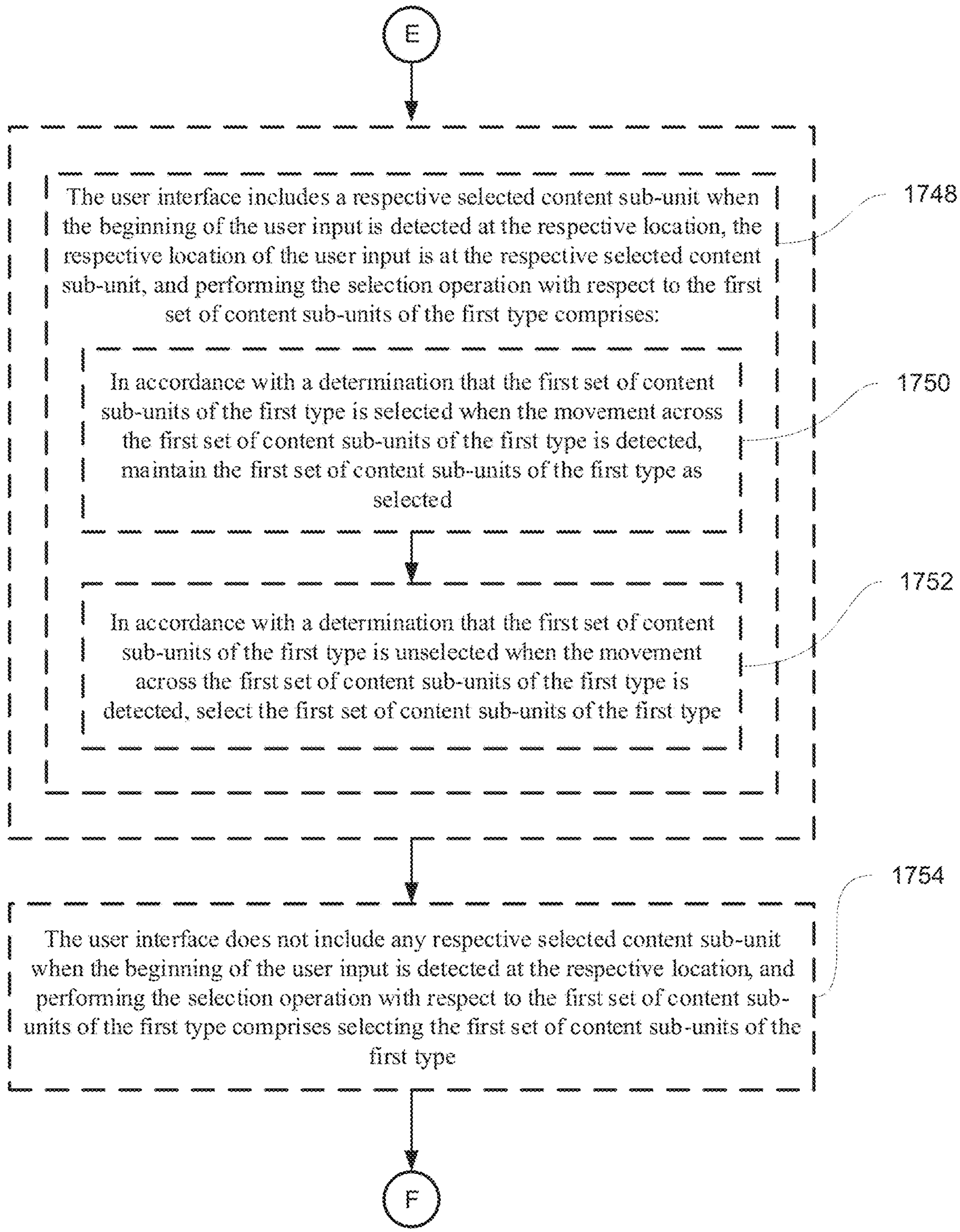
Figure 17G:
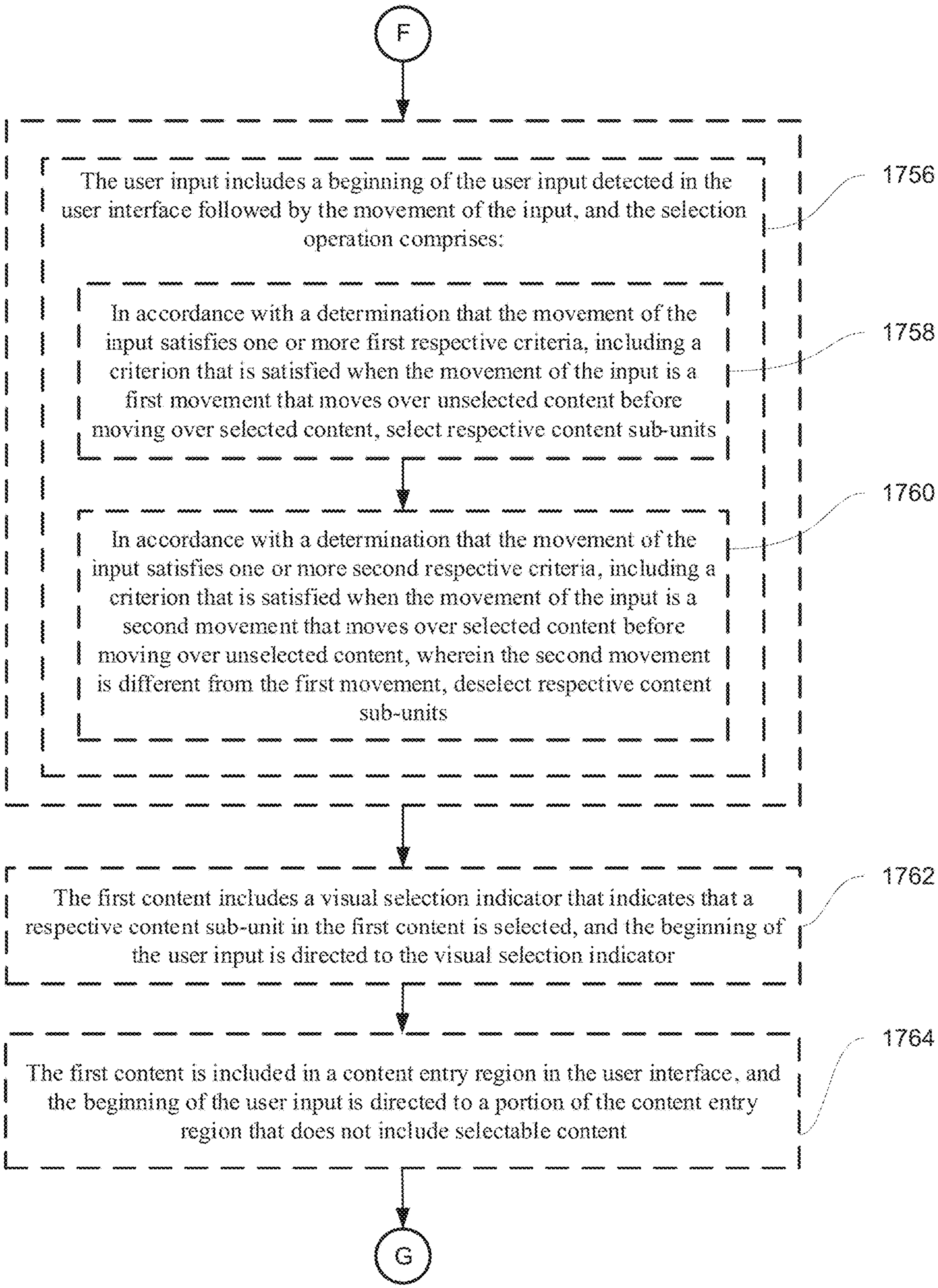
Figure 17H:
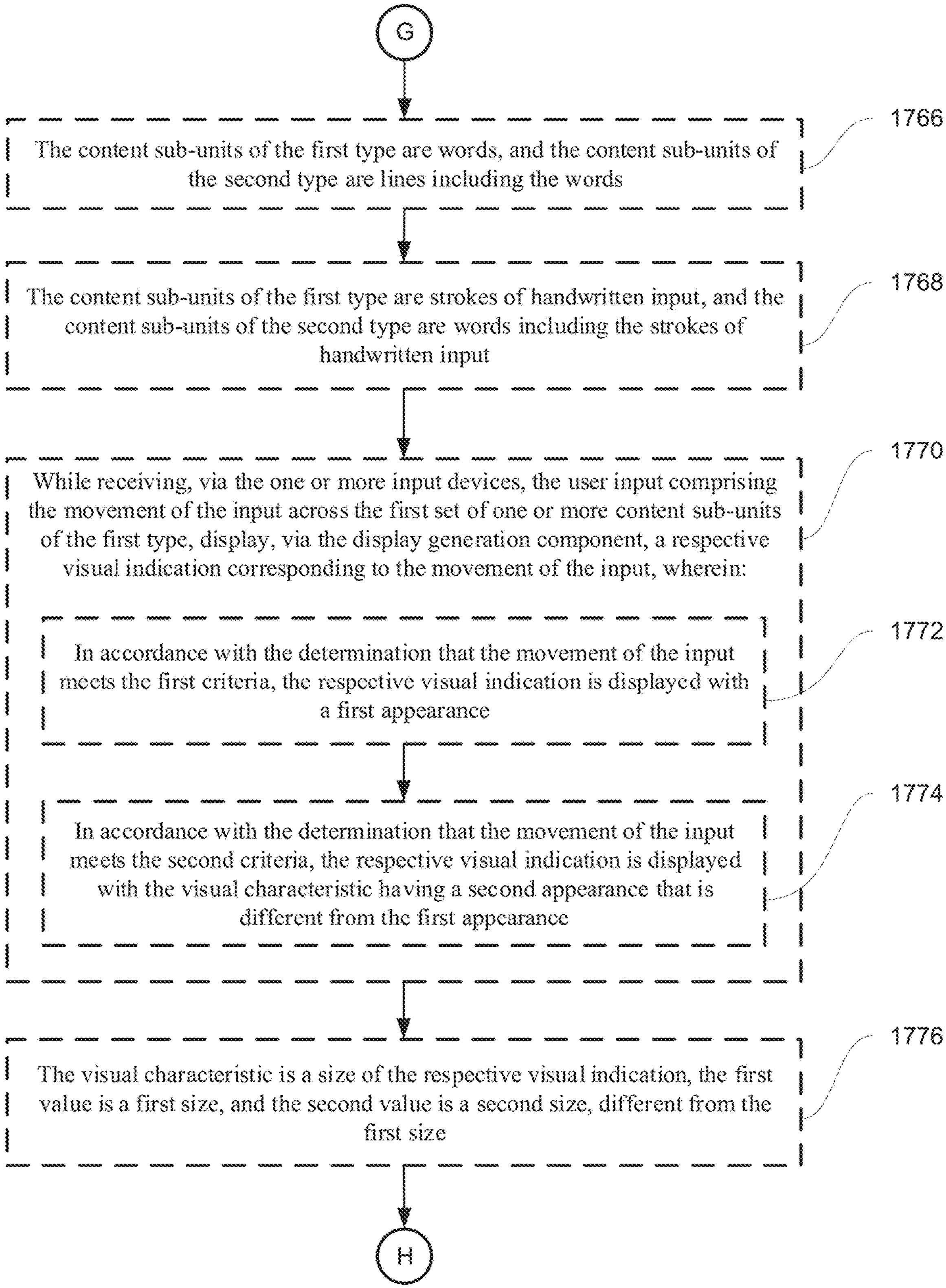
Figure 17I:
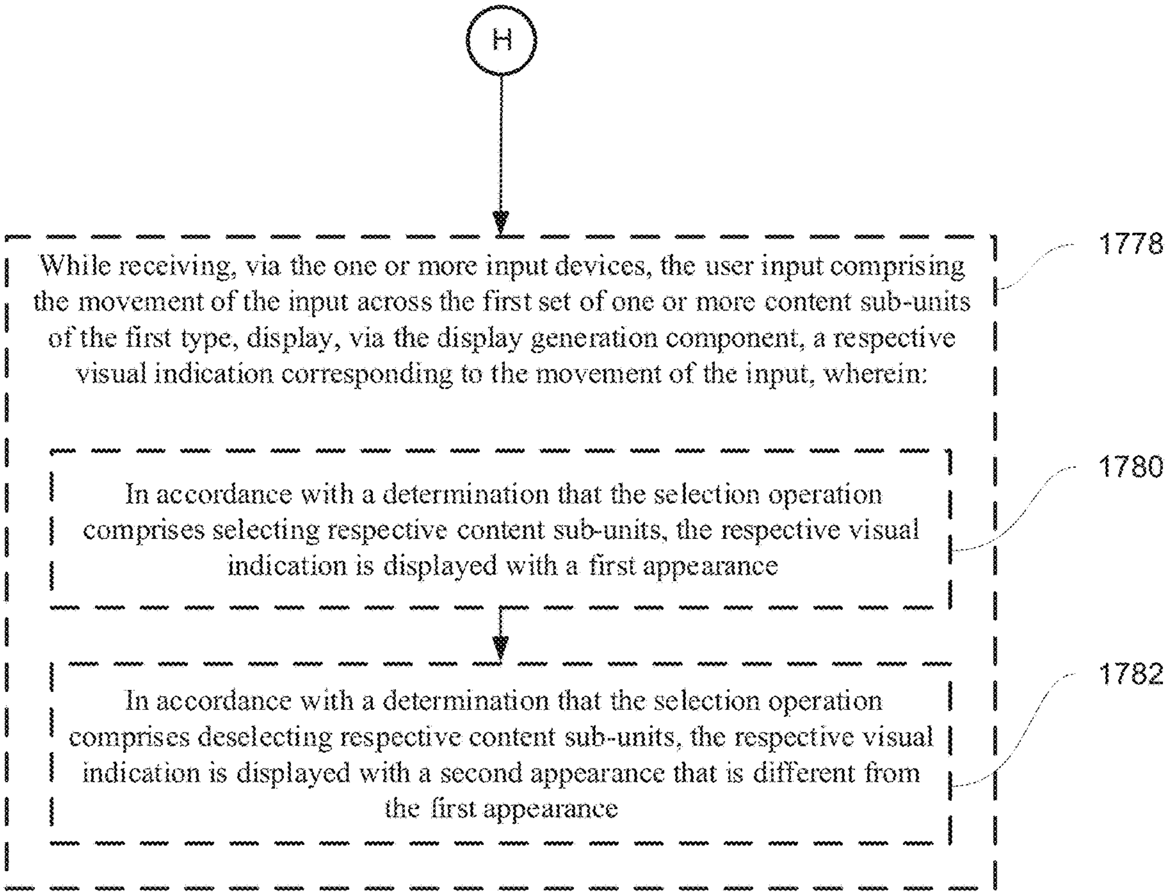

In FIG. 16Z, an upward movement of the user input is detected while the movement speed is medium, causing painter element 1612 to encompass at least a portion of word 1614-5. In some embodiments, word 1614-5 was selected before painter element 1612 was moved to encompass at least a portion of word 1614-5. Thus, in some embodiments, in response to painter element 1612 encompassing at least a portion of word 1614-5, word 1614-5 maintains its selected state, as shown in FIG. 16Z. Thus, as discussed above, if the user input of a first type is performed on selectable content, then the selection state of the content dictates whether the selection painting mode causes selection or de-selection (optionally selection painting mode is the same state as the selection state of the content), but if the user input of the first type is performed at a location without selectable content, then the selection state of the content first interacted by the painter element dictates whether the selection painting mode causes selection or de-selection (optionally selection painting mode is the opposite state as the selection state of the content).

In some embodiments, entering into selection painting mode via selection of user interface element 1610-1 or 1610-2 similarly causes the content first interacted with by the painter element to determine whether content is selected or de-selected (e.g., because user interface element 1610-1 and user interface element 1610-2 is not considered a selectable/highlight-able object), similarly to described above with respect to FIGS. 6Q-6CC.

FIGS. 16AA-16CC illustrate entering into selection painting mode when no selectable content is selected. In FIG. 16AA, while no selectable content is currently selected, a user input of the first type is received on word 1614-3 (e.g., "breakfast"). In FIG. 16BB, in response to the contact being held for more than the threshold amount of time, device 500 enters into a selection painting mode and displays painter element 1612. In some embodiments, because no content is currently selected, the selection painting mode causes content to be selected (e.g., as opposed to become de-selected). For example, in FIG. 16CC, a leftward movement of the user input is detected while the movement speed is low, causing painter element 1612 to interact with the letters "breakfas" of word 1614-3. Thus, in response to painter element 1612 interacting with the letters "breakfas" of word 1614-3, the letters "breakfas" of word 1614-3 are selected, as shown in FIG. 16CC. Thus, if no content is selected when device 500 enters into selection painting mode (e.g., due to there being no selectable content or due to the selectable content not being selected), then the selection painting mode always causes content to be selected and selection painting mode locks into selecting content until selection painting mode ends (optionally regardless of whether the user input was received on selectable content or at a location without selectable content).

FIGS. 17A-17I are flow diagrams illustrating a method 1700 of selecting units of content. The method 1700 is optionally performed at an electronic device such as device 100, device 300, device 500, device 501, device 510, and device 591 as described above with reference to FIGS. 1A-1B, 2-3, 4A-4B and 5A-5I. Some operations in method 1700 are, optionally combined and/or order of some operations is, optionally, changed.

As described below, the method 1700 provides ways to select units of content. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., device 500) in communication with a display generation component and one or more input devices (e.g., a mobile device (e.g., a tablet, a smartphone, a media player, or a wearable device), or a computer, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.) displays (1702), via the display generation component, a user interface including first content (e.g., a first selectable or editable text string) that includes one or more content sub-units of a first type (e.g., text characters, drawings, sketches, graphics, icons, UI elements, or any other selectable content) that are grouped into one or more content sub-units of a second type, such as sentences 1602, 1604, and 1606, which are grouped into sub-units of words, letters, strokes, etc., in FIG. 16A (e.g., letters grouped into words, words grouped into sentences, a content entry region that includes text, drawings, and/or other types of selectable content).

In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, the content in the content entry region was previously input by the user or was pre-populated without user input. In some embodiments, the pre-existing content in the content entry region is also editable (e.g., the content can be deleted, modified, moved, added to, etc.). In some embodiments, the pre-existing content is handwritten text. In some embodiments, the pre-existing content is font-based text. In some embodiments, the content is a drawing or sketch inserted into the content entry region via a stylus, finger, or other handwriting instrument.

In some embodiments, while displaying the user interface, the electronic device receives (1704), via the one or more input devices, a user input comprising a movement of an input across a first set of one or more content sub-units of the first type (e.g., characters) in a respective content sub-unit of a second type (e.g., a word) that includes the first set of one or more content sub-units and a second set of one or more content sub-units of the first type in the first content, such as the leftward movement in FIG. 16D (e.g., the word includes the characters of the first set of content sub-units and another set of letters other than the letters of the first set).

In some embodiments, the input is a gesture across the first set of characters in a word and not across other characters in the word. In some embodiments, the input is a movement across the first set of characters received from a stylus or finger within a threshold distance (e.g., 0.5 cm, 1 cm, etc.) of the characters in the first set of characters.

In some embodiments, in response to receiving the user input, the electronic device performs (1706) a selection operation with respect to the first content, such as the selection of stroke 1614-1 in FIG. 16D (e.g., selecting or de-selecting a respective set of characters in the first content, such as described above with respect to method 700)).

In some embodiments, the respective set of characters includes at least the first set of characters that the user interacted with. In some embodiments, the respective set of characters includes more characters than the first set of characters based on the characteristic of the input. In some embodiments, as will be described in more detail below, the device performs either a selection or de-selection operation based on certain criteria, such as whether the first set of characters is highlighted (e.g., selected) or not highlighted (e.g., not selected) when the input moved across the first set of characters.

In some embodiments, in accordance with a determination that the movement of the input meets first criteria, the first criteria including a requirement that the movement remains below a first movement threshold (e.g., movement below a speed and/or acceleration threshold, such as 0.1 mm/s, 0.5 mm/s, 1 mm/s, 5 mm/s, 10 mm/s) in order for the first criteria to be met, the selection operation is performed with respect to the first set of one or more content sub-units of the first type (e.g., characters) in the respective content sub-unit of the second type (e.g., word) without the selection operation being performed with respect to the second set of one or more content sub-units of the first type in the respective content sub unit of the second type (1708), such as the selection of a first stroke 1614-1 of the letter "k" but not the other stroke of the letter "k" in FIG. 16D (e.g., selecting the first set of letters but not the second set of letters in the word).

In some embodiments the one or more other characters are selected based on the speed of the handwritten input. If the handwritten input speed is below a first threshold, then the device is optionally in a first selection mode, if the handwritten input speed is above the first threshold but below a second threshold, then the device is optionally in a second selection mode, and if the handwritten input speed is above the second threshold, then the device is optionally in a third selection mode. While in the first selection mode, the device optionally selects (or de-selects) content on a letter-by-letter basis (e.g., in the first selection mode, the sub-unit of the first type are letters and the sub-unit of the second type are words), while in the second selection mode, the device optionally selects (or de-selects) content on a word-by-word basis (e.g., in the second selection mode, the sub-unit of the first type are words and the sub-unit of the second type are sentences or lines of words), and while in the third selection mode, the device optionally selects (or de-selects) content on a sentence-by-sentence basis (e.g., in the third selection mode, the sub-unit of the first type are sentences and the sub-unit of the second type are paragraphs, lines, or all the text in the content entry region). Thus, while the device is in the first selection mode (e.g., while the speed of the handwritten input is below the first threshold), in response to the handwritten input interacting with at least a portion of a first letter of a word but not the second letter of the same word, the first letter is optionally selected (e.g., the entirety of the first letter, including the portion interacted by the user), but the second letter is not selected. But while in the second selection mode (e.g., while the speed is above the first threshold but below the second threshold), in response to the handwritten input interacting with at least a portion of the first letter of a word but not the second letter of the same word and not with an adjacent word, the first word optionally is selected (e.g., the entirety of the first word including the portion interacted by the user and including the second letter), but the adjacent word is optionally not selected. While in the third selection mode (e.g., while the speed is above the second threshold), in response to the handwritten input interacting with at least a portion of the first letter of a word, but not with the second letter of the same word, not with an adjacent word in the same sentence, and not with an adjacent sentence, the sentence associated with the word is optionally selected (e.g., the entirety of the sentence, including the word and the adjacent word), but the adjacent sentence is optionally not selected. It is understood that the number of selection modes described herein is merely illustrative and any number of thresholds and corresponding selection modes are possible (for example, a fourth selection mode that selects content on a paragraph-by-paragraph basis and/or a fifth selection mode that selects content on a stroke-by-stroke basis).

In some embodiments, in accordance with a determination that the movement of the input meets second criteria, the second criteria including a requirement that the movement is above the first movement threshold (e.g., the movement speed of the input is above the first threshold speed, such as 0.1 mm/s, 0.5 mm/s, 1 mm/s, 5 mm/s, 10 mm/s) in order for the second criteria to be met, the selection operation is performed with respect to the first set of content sub-units of the first type and the second set of content sub-units of the first type (e.g., all of the content sub-units of the first type that are contained within a content sub-unit of the second type (e.g., a word) are selected) that includes the first set of content sub-units of the first type (1710), such as the selection of the word 1608-5 in FIG. 16J (e.g., selecting the second set of characters that are included in the word that includes the first set of characters, without requiring interaction of the second set of characters by the user input).

For example, while in the second selection mode (e.g., the speed of the input is faster than the first threshold), the device selects content on a word-by-word basis (e.g., whole words are selected at a time). Thus, in response to the input moving across the first set of characters, another set of characters are also selected. In some embodiments, if the speed is faster than the first threshold, then the other set of characters are the other characters of the same word as the first set of characters (e.g., the other characters of the same word are also selected). Thus, as described above, in response to the input, the device selects the first set of characters (or strokes) and optionally selects additional characters (or strokes) based on the speed of the handwritten input (e.g., based on whether the device is in a letter selection mode, a word selection mode, a sentence selection mode, a paragraph selection mode, a stroke selection mode, etc., which is based on the speed of the input). As described above, the characteristic of the input optionally determines the unit of selection (e.g., the sub-unit of the first type is either strokes, letters, words, sentences, paragraphs, etc. based on the characteristic of the handwritten input). As described above, in some embodiments, increasing the speed of the movement causes selection of larger sub-units. In some embodiments, increasing the speed of the movement causes selection of smaller sub-units. In some embodiments, the above-described operations are performable on selectable objects/content other than handwritten characters and/or font-based characters (e.g., files in a list of files, photos in a grid of photos, etc.). In some embodiments, the above-described operations are performable on content other than text, such as drawings and/or images. For example, a drawing (e.g., a sketch) includes one or more sub-units of a first type and one or more sub-units of a second type. For example, a respective drawing includes a series of strokes that form a first object in the drawing, and a second series of strokes that form a second object in the drawing. Thus, if the user input meets the first criteria, then a selection operation is optionally performed per stroke, and if the user input meets the second criteria, then the selection operation is performed per object (e.g., selecting the strokes in the object).

The above-described manner of selecting characters (e.g., by setting the unit of selection based on the speed of the handwritten input) provides a quick and efficient method of selecting different amounts of content (e.g., by providing different selection modes without requiring the user to perform additional inputs to change the selection mode), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency.

In some embodiments, the one or more content sub-units of the second type are grouped into one or more content sub-units of a third type in the first content (e.g., the words are grouped into sentences), and the second criteria includes a requirement that the movement of the input is below a second movement threshold in order for the second criteria to be met (1712), such as the movement of the input being above the "low" speed threshold, but below the "high" speed threshold in FIG. 16J (e.g., the second criteria includes a requirement that the movement speed be above the first threshold and below the second threshold).

In some embodiments, in response to receiving the user input, the electronic device performs (1714) the selection operation with respect to the first content, such as selection of word 1608-5 in FIG. 16J. In some embodiments, in accordance with a determination that the movement of the input meets third criteria, the third criteria including a requirement that the movement is above the second movement threshold in order for the third criteria to be met, the selection operation is performed with respect to the one or more content sub-units of the third type (1716), such as the selection of sentence 1602 when the movement speed is high in FIG. 16L (e.g., if the movement speed is above the second speed threshold, then device is in a third selection mode in which content is selected (or de-selected) on a sentence-by-sentence basis).

Thus, if the user input interacts with content (optionally, any of the content) in the respective content sub-unit of a third type (e.g., a word in the sentence, a stroke in a of the words in the sentence, etc.), then if the movement is above the second threshold, then the sentence is selected (e.g., the words in the sentence are selected, the strokes in the sentence are selected, etc.). For example, a respective content sub-unit includes a first set of one or more content sub-units of a second type and a second set of one or more content sub-units of a second type (e.g., a sentence that includes at least two words), then a user input interacting with the first set of one or more content sub-units of the second type optionally causes both the first and second sets of one or more content sub-units of the second type to be selected (e.g., select both words in the sentence).

The above-described manner of selecting content (e.g., by selecting a sentence if the movement speed is above a second threshold) provides a quick and efficient method of selecting different amounts of content (e.g., by providing different selection modes without requiring the user to perform additional inputs to change the selection mode), which simplifies the interaction between the user and the electronic device and enhances the operability of the electronic device and makes the user-device interface more efficient (e.g., by reducing the number of inputs and amount of interaction time required to select an entire sentence), which additionally reduces power usage and improves battery life of the electronic device by enabling the user to use the electronic device more quickly and efficiency.

In some embodiments, the one or more content sub-units of the third type are grouped into one or more content sub-units of a fourth type in the first content (e.g., the sentences are grouped into paragraphs), and the third criteria includes a requirement that the movement of the input is below a third movement threshold in order for the third criteria to be met (1718), such as in FIG. 16L (e.g., the third criteria includes a requirement that the movement speed be above the second threshold and below the third threshold).

In some embodiments, in response to receiving the user input, the electronic device performs (1720) the selection operation with respect to the first content, such as selection of sentence 1602 in FIG. 16L. In some embodiments, in accordance with a determination that the movement of the input meets fourth criteria, the fourth criteria including a requirement that the movement is above the third movement threshold in order for the fourth criteria to be met, the selection operation is performed with respect to the one or more content sub-units of the fourth type (1722), such as if the movement speed was faster than the input speed in FIG.

16L (e.g., above the third movement threshold), device 500 optionally selects the entire paragraph that optionally includes a plurality of sentences (e.g., if the movement speed is above the third speed threshold, then device is in a fourth selection mode in which content is selected (or de-selected) on a paragraph-by-paragraph basis).

Thus, if the user input interacts with any of the content in the respective content sub-unit of a fourth type (e.g., any sentence in a paragraph, any word in the paragraph, any stroke in any of the words in the paragraph, etc.), then if the movement is above the third threshold, then the paragraph is selected (e.g., the sentences in a paragraph are selected, the words in the paragraph are selected, the strokes in the sentence are paragraph, etc.). For example, a respective content sub-unit includes a first set of one or more content sub-units of a third type and a second set of one or more content sub-units of a third type (e.g., a paragraph that includes at least two sentences), then a user input interacting with the first set of one or more content sub-units of the third type optionally causes both the first and second sets of one or more content sub-units of the third type to be selected (e.g., select both sentences in the paragraph).

The above-described manner of selecting content (e.g., by selecting a paragraph if the movement speed is above a third threshold) provides a quick and efficient method of selecting different amounts of content (e.g., by providing different selection modes without requiring the user to perform additional inputs to change the selection mode), which simplifies the interaction between the user and the electronic device and enhances the operability of the electronic device and makes the user-device interface more efficient (e.g. by reducing the number of inputs and amount of interaction time required to select a paragraph), which additionally reduces power usage and improves battery life of the electronic device by enabling the user to use the electronic device more quickly and efficiency.

In some embodiments, the movement of the input does not move across the second set of content sub-units of the first type, and the selection operation is performed with respect to the first set of content sub-units of the first type and the second set of content sub-units of the first type (1724), such as the user interaction with the word "went" in sentence 1602, but not the words "Today" or "I", in FIG. 16L (e.g., user input interacts with the character in a word, but not the second character in the word).

In some embodiments, if the input meets second criteria, then a selection operation is performed on both the first set of content and the second set of content even though the user did not directly interact with the second set of content (e.g., select both characters).

The above-described manner of selecting characters (e.g., by selecting the characters in a word even if the user did not directly interact with all of the characters) provides a quick and efficient method of selecting different amounts of content (e.g., by selecting the characters of a word if the movement speed is above a threshold speed), which simplifies the interaction between the user and the electronic device and enhances the operability of the electronic device and makes the user-device interface more efficient (e.g., without requiring the user to directly interact with every sub-unit of the content to select the content, which reduces the number of inputs and amount of interaction time required to select content), which additionally reduces power usage and improves battery life of the electronic device by enabling the user to use the electronic device more quickly and efficiency.

In some embodiments, the movement of the input is further across a third set of one or more content sub-units of the first type (1726) (e.g., the input is a gesture across the third set of characters in the word). In some embodiments, the third set of one or more content sub-units of the first type is separated from the first and second sets of one or more content sub-units of the first type by a fourth set of one or more content sub-units of the first type (1728), such as word 1614-3 in FIG. 16P (e.g., the third set of characters is not contiguous with the first and second sets of characters). For example, a fourth set of characters is located between the third set of characters and the first and second set of characters.

In some embodiments, the selection operation is performed with respect to the first, second and third sets of one or more content sub-units of the first type without being performed with respect to the fourth set of one or more content sub-units of the first type (1730), such as in FIG. 16P (e.g., performing a selection of the first, second, and third sets of characters without selecting the fourth characters). Thus, the device is able to perform a selection operation on non-contiguous characters (e.g., selecting the first, second, and third characters when a fourth character is located between the third character and the first and second characters).

The above-described manner of selecting characters (e.g., characters that the user interacted with, even if the characters are not contiguous with other characters that have been or are selected) provides a quick and efficient method of selecting content, which simplifies the interaction between the user and the electronic device and enhances the operability of the electronic device and makes the user-device interface more efficient (e.g., without requiring the user to remove the selection of the first and second sets of characters in order to select the third set of characters or without requiring the user to perform additional inputs to de-select the fourth set of characters), which additionally reduces power usage and improves battery life of the electronic device by enabling the user to use the electronic device more quickly and efficiency.

In some embodiments, the first content includes a visual selection indicator that indicates that a respective content sub-unit in the first content is selected (e.g., one or more user interface elements that are selectable and moveable to select more or fewer characters), and the user input comprises, before the movement of the input, an input directed to the visual selection indicator that satisfies one or more criteria, including a criterion that is satisfied when the input directed to the visual selection indicator is detected for longer than a time threshold (1732), such as in FIGS. 6Q-6R (e.g., the device enters into the selection modes discussed above in response to a user input selecting one of the one or more user interface elements).

In some embodiments, the one or more user interface elements are located at the beginning and/or end of a set of selected content (e.g., the elements book-end the selected content). In some embodiments, the user input is a selection input for longer than a threshold amount of time (e.g., 0.1 seconds, 0.5 seconds, 1 second, 3 seconds, 5 seconds, etc.). Thus, after the user input selects the visual selection indicator for longer than the threshold amount of time, the device enters into a freeform selection mode. In some embodiments, whether the freeform selection mode causes content to be selected or de-selected optionally depends on whether the content first interacted by the user input after entering freeform selection mode is selected or not selected, as described above with respect to method 700.

The above-described manner of entering into a freeform selection mode (e.g., in response to a user input on a visual selection indicator that is displayed on highlighted text) provides a quick and efficient method of selecting more content, which simplifies the interaction between the user and the electronic device and enhances the operability of the electronic device and makes the user-device interface more efficient (e.g., without requiring the user to perform additional inputs to expand the current selection to include the desired content or without requiring an affordance dedicated for entering into freeform selection mode, which reduces the number of inputs and amount of interaction time required to select more content), which additionally reduces power usage and improves battery life of the electronic device by enabling the user to use the electronic device more quickly and efficiency.

In some embodiments, the first content is displayed in a content entry region in the user interface, and the user input comprises, before the movement of the input, an input directed to the content entry region that satisfies one or more criteria, including a criterion that is satisfied when the input directed to the content entry region includes a first portion detected for less than a first time threshold followed by the movement of the input detected within a second time threshold of an end of the first portion of the input (1734) (e.g., the device enters into the selection modes discussed above in response to a user input that satisfies the one or more criteria directed to the content entry region).

In some embodiments, the one or more criteria includes a requirement that the input includes a tap (e.g., a contact less than a threshold time, such as 0.1 seconds, 0.3 seconds, 0.5 seconds, 1 seconds, 3 seconds, etc., followed by a lift-off of the contact) and a touchdown and hold (e.g., a hold for more than a threshold amount of time such as 0.3 seconds, 0.5 seconds, 1 second, 3 seconds, 5 seconds, etc., optionally within a threshold amount of time after the tap input, such as 0.1 seconds, 0.3 seconds, 0.5 seconds, 1 seconds, 3 seconds, etc., and optionally within a threshold distance from the tap input, such as 0.1 mm, 0.5 mm, 1 mm, 3 mm, 5 mm, 2 cm, etc.). In some embodiments, the input is received on content that is already selected, on content that is not selected, and/or on whitespace (e.g., a location that does not include content).

The above-described manner of entering into a freeform selection mode (e.g., in response to a user input that satisfies the one or more criteria directed to the content entry region) provides a quick and efficient method of selecting more content (by performing a particular input on the content entry region, without requiring the user to interact with a visual selection indicator), which simplifies the interaction between the user and the electronic device and enhances the operability of the electronic device and makes the user-device interface more efficient (e.g., without requiring an affordance dedicated for entering into freeform selection mode, which reduces the number of inputs and amount of interaction time required to select more content), which additionally reduces power usage and improves battery life of the electronic device by enabling the user to use the electronic device more quickly and efficiency.

In some embodiments, the user input includes a beginning of the user input detected at a respective location in the user interface followed by the movement of the input (1736). In some embodiments, the selection operation comprises, in accordance with a determination that one or more first respective criteria are satisfied, including a criterion that is satisfied when the respective location is a first location, selecting one or more respective content sub-units (1738), such as in FIG. 16Y (e.g., whether the device enters into freeform selection mode (in which content is selected) or freeform de-selection mode (in which content is de-selected) optionally depends on the position of the user input that triggered the device to enter the freeform selection/de-selection mode), and in accordance with a determination that one or more second respective criteria are satisfied, including a criterion that is satisfied when the respective location is a second location, different from the first location, deselecting one or more respective content sub-units (1740), such as in FIG. 16T (e.g., if the initial input that triggered the device to enter the freeform selection/de-selection mode is a second location that is different than the first location (such as a location that includes text that is not currently selected), then the device enters freeform de-selection mode in which subsequent user inputs interacting with text causes the respective text to be de-selected).

In some embodiments, if the location of the input is on text that is current selected, then the device enters into freeform selection mode (e.g., in which subsequent user inputs interacting with text causes the respective text to be selected), but if the location of the input is on text that is currently not selected, then the device enters into freeform de-selection mode. Thus, in some embodiments, whether the device enters into selection or de-selection mode depends on whether the content that is selected by the user was selected or not selected when the input was received. In some embodiments, the respective content sub-unit that is selected is any type of sub-unit (e.g., a stroke, a character, a word, a sentence, etc.). In some embodiments, the type of sub-unit that is selected is based on the speed of the movement of the input, as described above. In some embodiments, the respective content sub-unit that is de-selected is any type of sub-unit (e.g., a stroke, a character, a word, a sentence, etc.). In some embodiments, the type of sub-unit that is de-selected is based on the speed of the movement of the input, as described above.

The above-described manner of entering into either a selection mode or a de-selection mode (e.g., if the initial location of the user input is at a first location or a second location in the user interface) provides a quick and efficient method of selecting or de-selecting content (e.g., by performing a user input on content that is selected or content that is not selected), which simplifies the interaction between the user and the electronic device and enhances the operability of the electronic device and makes the user-device interface more efficient (e.g., without requiring the user to perform additional inputs to select between selection mode or de-selection mode), which additionally reduces power usage and improves battery life of the electronic device by enabling the user to use the electronic device more quickly and efficiency.

In some embodiments, the user interface includes a respective selected content sub-unit when the beginning of the user input is detected at the respective location (e.g., the user interface includes selectable content that is selected when the user input is received), the respective location of the user input is outside of any selected content sub-unit in the user interface (1742), such as in FIG. 16N (e.g., the location of the initial user input is at a location other than the location corresponding to the selected content).

In some embodiments, performing the selection operation with respect to the first set of content sub-units of the first type comprises, in accordance with a determination that the first set of content sub-units of the first type is selected when the movement across the first set of content sub-units of the first type is detected, deselecting the first set of content sub-units of the first type (1744), such as in FIG. 16P (e.g., if the content that is interacted with by the movement of the user input is currently selected, then de-selecting the content), and in accordance with a determination that the first set of content sub-units of the first type is unselected when the movement across the first set of content sub-units of the first type is detected, maintaining the first set of content sub-units of the first type as unselected (1746), such as if the user input interacted with any of sentence 1606 in FIG. 16P, sentence 1606 would remain unselected (e.g., if the content that is interacted with by the movement of the user input is not selected, then maintain the unselected state of the content).

Thus, in some embodiments, if the user interface includes selected content and the user input is initially received at a location other than the location of the selected content (optionally on content that is not currently selected), then the device enters into de-selection mode in which subsequent movements of the user input causes content to become unselected (e.g., either de-selecting selected content or maintaining the unselected state of content that is not selected).

The above-described manner of entering into de-selection mode (e.g., if the initial location of the user input is on content that is not selected when the user interface includes selected content) provides a quick and efficient method of de-selecting content (e.g., by performing a user input on content that is not selected), which simplifies the interaction between the user and the electronic device and enhances the operability of the electronic device and makes the user-device interface more efficient (e.g., by providing the user with control over whether to enter selection or de-selection mode, without requiring the user to perform additional inputs to select between selection mode or de-selection mode), which additionally reduces power usage and improves battery life of the electronic device by enabling the user to use the electronic device more quickly and efficiency.

In some embodiments, the user interface includes a respective selected content sub-unit when the beginning of the user input is detected at the respective location (e.g., the user interface includes selectable content that is selected when the user input is received), the respective location of the user input is at the respective selected content sub-unit (1748) (e.g., the location of the initial user input is at a location corresponding to the selected content).

In some embodiments, performing the selection operation with respect to the first set of content sub-units of the first type comprises, in accordance with a determination that the first set of content sub-units of the first type is selected when the movement across the first set of content sub-units of the first type is detected, maintaining the first set of content sub-units of the first type as selected (1750), such as in FIG. 16Z (e.g., if the content that is interacted with by the movement of the user input is currently selected, then maintain the selected state of the content), and in accordance with a determination that the first set of content sub-units of the first type is unselected when the movement across the first set of content sub-units of the first type is detected, selecting the first set of content sub-units of the first type (1752), such as in FIG. 16D (e.g., if the content that is interacted with by the movement of the user input is currently selected, then selecting the content). Thus, in some embodiments, if the user interface includes selected content and the user input is initially received on the selected content, then the device enters into selection mode in which subsequent movements of the user input causes content to become selected (e.g., either selecting un-selected content or maintaining selection of selected content).

The above-described manner of entering into selection mode (e.g., if the initial location of the user input is on content that is selected) provides a quick and efficient method of selecting content (e.g., by performing a user input on content that is selected), which simplifies the interaction between the user and the electronic device and enhances the operability of the electronic device and makes the user-device interface more efficient (e.g., by providing the user with control over whether to enter selection or de-selection mode, without requiring the user to perform additional inputs to select between selection mode or de-selection mode), which additionally reduces power usage and improves battery life of the electronic device by enabling the user to use the electronic device more quickly and efficiency.

In some embodiments, the user interface does not include any respective selected content sub-unit when the beginning of the user input is detected at the respective location, and performing the selection operation with respect to the first set of content sub-units of the first type comprises selecting the first set of content sub-units of the first type (1754), such as in FIGS. 16AA-16CC (e.g., if the user interface does not include selectable content that is selected (e.g., the user interface includes selectable content, but the content is not selected, or the user interface does not include any selectable content), then the device enters into selection mode (e.g., without regard to where the location that the initial input was received)).

The above-described manner of entering into selection mode (e.g., if the user interface does not include any selectable content that is selected when the user input was initially received) provides a quick and efficient method of selecting content (e.g., by automatically defaulting to selection mode if no content was selected when the user input was received), which simplifies the interaction between the user and the electronic device and enhances the operability of the electronic device and makes the user-device interface more efficient (e.g., without requiring the user to perform additional inputs to select between selecting content or de-selecting content if no selectable content exists to be de-selected), which additionally reduces power usage and improves battery life of the electronic device by enabling the user to use the electronic device more quickly and efficiency.

In some embodiments, the user input includes a beginning of the user input detected in the user interface followed by the movement of the input (1756). In some embodiments, the selection operation comprises, in accordance with a determination that the movement of the input satisfies one or more first respective criteria, including a criterion that is satisfied when the movement of the input is a first movement that moves over unselected content before moving over selected content (e.g., the first content interacted by the movement of the input is unselected content), selecting respective content sub-units (1758), such as in FIGS. 16Y-16Z (e.g., if the first respective criteria are satisfied, then the device is in selection mode such that future movements of the user input causes selection of the selectable content that was interacted by the movements), and in accordance with a determination that the movement of the input satisfies one or more second respective criteria, including a criterion that is satisfied when the movement of the input is a second movement that moves over selected content before moving over unselected content (e.g., the first content interacted by the movement of the input is selected content), wherein the second movement is different from the first movement, deselecting respective content sub-units (1760), such as in FIGS. 16T-16U (e.g., if the second respective criteria are satisfied, then the device is in de-selection mode such that future movements of the user input causes de-selection of the selectable content that was interacted by the movements).

In some embodiments, the first respective criteria includes a requirement that the first selectable content interacted by the movement of the input was not selected. For example, if the user performs a respective gesture to enable freeform selection or de-selection mode, and then, without lifting off, performs a movement across content that was not selected, the device selects the content and enters into selection mode. Thus, subsequent movements after the initial movement optionally cause content to be selected (e.g., unselected content becomes selected and selected content maintains its selection state). Thus, if the first content interacted by the user is not selected, then the device locks into selection mode (e.g., until the user terminates the user input).

In some embodiments, the second respective criteria includes a requirement that the first selectable content interacted by the movement of the input was selected. For example, if the user performs a respective gesture to enable freeform selection or de-selection mode, and then, without lifting off, performs a movement across content that was selected, the device de-selects the content and enters into de-selection mode. Thus, subsequent movements after the initial movement optionally cause content to be de-selected (e.g., unselected content maintains its unselected state and selected content becomes de-selected). Thus, if the first content interacted by the user is selected, then the device locks into de-selection mode (e.g., until the user terminates the user input). Thus, in some embodiments, the device enters into a mode that is the opposite of the selection state of the first content interacted by the movement of the user input.

The above-described manner of entering into either a selection mode or a de-selection mode (e.g., based on whether the first content interacted by the user is de-selected or selected) provides a quick and efficient method of selecting or de-selecting content (e.g., by interacting with content that is either selected or not selected), which simplifies the interaction between the user and the electronic device and enhances the operability of the electronic device and makes the user-device interface more efficient (e.g., by providing the user with control over whether to enter selection or de-selection mode, without requiring the user to perform additional inputs to select between selection mode or de-selection mode), which additionally reduces power usage and improves battery life of the electronic device by enabling the user to use the electronic device more quickly and efficiency.

In some embodiments, the first content includes a visual selection indicator that indicates that a respective content sub-unit in the first content is selected, and the beginning of the user input is directed to the visual selection indicator (1762), such as in FIGS. 6Q-6R (e.g., the device enters into the mode described above in which the first content interacted by the movement of the user input determines whether the device is in selection or de-selection mode if the initial input is a selection of the visual selection indicator).

As described above, the visual selection indicator is optionally a user interface element that is placed to the left and/or right of a set of selected content that is selectable and moveable to select more or fewer content. In some embodiments, the device enters into the mode in which the first content interacted by the user input determines whether the device is in selection or de-selection mode if the initial input is a contact on the visual selection indicator for longer than a threshold time period (e.g., 0.1 seconds, 0.5 seconds, 1 second, 3 seconds, 5 seconds, etc.).

The above-described manner of entering a mode in which the first content interacted by the movement of the user input determines whether the device is in selection or de-selection mode (e.g., in response to a user input selecting the visual selection indicator) provides a quick and efficient method of either selecting or de-selecting content (e.g., by providing a method for the user to enter into a freeform selection mode and then select whether the freeform selection mode is a selection or de-selection mode based on content first interacted with by the movement of the user input), which simplifies the interaction between the user and the electronic device and enhances the operability of the electronic device and makes the user-device interface more efficient (e.g., by providing the user with control over whether to enter selection or de-selection mode, without requiring the user to perform additional inputs to select between selection mode or de-selection mode), which additionally reduces power usage and improves battery life of the electronic device by enabling the user to use the electronic device more quickly and efficiency.

In some embodiments, the first content is included in a content entry region in the user interface, and the beginning of the user input is directed to a portion of the content entry region that does not include selectable content (1764), such as in FIG. 16R (e.g., the device enters into the mode described above in which the first content interacted by the movement of the user input determines whether the device is in selection or de-selection mode if the initial input is on a location that does not include selectable content). For example, if the initial input is performed on a whitespace (e.g., where there is no content), then the device enters into the mode in which the first content interacted by the movement of the user input determines whether the device is in selection or de-selection mode.

The above-described manner of entering a mode in which the first content interacted by the movement of the user input determines whether the device is in selection or de-selection mode (e.g., in response to a user input at a location with no content) provides a quick and efficient method of either selecting or de-selecting content (e.g., by providing a method for the user to enter into a freeform selection mode and then select whether the freeform selection mode is a selection or de-selection mode based on content first interacted with by the movement of the user input), which simplifies the interaction between the user and the electronic device and enhances the operability of the electronic device and makes the user-device interface more efficient (e.g., without requiring the user to perform additional inputs to select between selection mode or de-selection mode), which additionally reduces power usage and improves battery life of the electronic device by enabling the user to use the electronic device more quickly and efficiency.

In some embodiments, the content sub-units of the first type are words, and the content sub-units of the second type are lines including the words (1766), such as in FIGS. 16K and 16L (e.g., if the movement of the user input is below the first movement threshold, then select on a word-by-word basis (e.g., select the entirety of a word if the user interacts with a letter of the word), and if the movement of the user input is above the first movement threshold, then select on a line-by-line basis (e.g., select the entirety of the line on which the word is located if the user interacts with the word)). Thus, in some embodiments, the device is able to recognize the words in a line and select the words in the line if the speed of the movement of the user input is above the first movement threshold.

The above-described manner of selecting content (e.g., by selecting a word if the movement speed is below the first threshold, and selecting a line if the movement speed is above the first threshold) provides a quick and efficient method of selecting different amounts of content (e.g., by providing different selection modes without requiring the user to perform additional inputs to change the selection mode), which simplifies the interaction between the user and the electronic device and enhances the operability of the electronic device and makes the user-device interface more efficient (e.g., by reducing the number of inputs and amount of interaction time required to select more content), which additionally reduces power usage and improves battery life of the electronic device by enabling the user to use the electronic device more quickly and efficiency.

In some embodiments, the content sub-units of the first type are strokes of handwritten input, and the content sub-units of the second type are words including the strokes of handwritten input (1768), such as in FIGS. 16D and 16J (e.g., if the movement of the user input is below the first movement threshold, then select on a stroke-by-stroke basis).

In some embodiments, a stroke is a representation of a continuous gesture performed when writing a letter, and if the movement of the user input is above the first movement threshold, then select on a word-by-word basis (e.g., select the entirety of the word on which the stroke is located if the user interacts with the stroke). Thus, in some embodiments, the device is able to recognize the strokes within a character and the characters within a word and select the strokes in a line if the speed of the movement of the user input is above the first movement threshold.

The above-described manner of selecting content (e.g., by selecting a stroke if the movement speed is below the first threshold, and selecting a word if the movement speed is above the first threshold) provides a quick and efficient method of selecting different amounts of content (e.g., by providing different selection modes without requiring the user to perform additional inputs to change the selection mode), which simplifies the interaction between the user and the electronic device and enhances the operability of the electronic device and makes the user-device interface more efficient (e.g., by reducing the number of inputs and amount of interaction time required to select more content), which additionally reduces power usage and improves battery life of the electronic device by enabling the user to use the electronic device more quickly and efficiency.

In some embodiments, while receiving, via the one or more input devices, the user input comprising the movement of the input across the first set of one or more content sub-units of the first type, the electronic device displays (1770), via the display generation component, a respective visual indication corresponding to the movement of the input, such as painter element 1612 in FIG. 16C (e.g., displaying a respective visual indication that indicates the effective area of the selection or de-selection gesture). For example, the respective visual indication is a circular indicator in which content that falls within the circular indicator is either selected or de-selected as the case may be.

In some embodiments, in accordance with the determination that the movement of the input meets the first criteria, the respective visual indication is displayed with a first appearance (1772), such as painter element 1612 having a small size in FIG. 16D (e.g., if the device is in the first selection mode, the respective visual indication has a visual characteristic having a first value). For example, if the device is in the first selection mode, the respective visual indication has a small size.

In some embodiments, in accordance with the determination that the movement of the input meets the second criteria, the respective visual indication is displayed with a second appearance that is different from the first appearance (1774), such as painter element 1612 having a medium size in FIG. 16J (e.g., if the device is in the second selection mode, the respective visual indication has a visual characteristic having a second value).

For example, if the device is in the second selection mode, the respective visual indication has a medium size. Thus, in some embodiments, the appearance (e.g., size, color, opacity, and/or radius, etc.) of the respective visual indication indicates how much content will be selected (e.g., what sub-unit will be selected) if the respective content falls within the respective visual indication.

The above-described manner of displaying a visual indication of the selection mode (e.g., by displaying the visual indication with a characteristic having a first value if in the first selection mode or a second value if in the second selection mode) provides a quick and efficient method of indicating the type of selection mode, which simplifies the interaction between the user and the electronic device and enhances the operability of the electronic device and makes the user-device interface more efficient (e.g., without requiring the user to select or de-select text to determine what selection mode the device is in, which reduces the number of inputs and amount of interaction time required to select or de-select content), which additionally reduces power usage and improves battery life of the electronic device by enabling the user to use the electronic device more quickly and efficiency, while reducing errors in the usage of the device.

In some embodiments, the visual characteristic is a size of the respective visual indication, the first value is a first size, and the second value is a second size, different from the first size (1776), such as in FIG. 16J (e.g., if the device is in the first selection mode, the respective visual indication has a first size and if the device is in the second selection mode, the respective visual indication has a second size).

In some embodiments, the larger the selection unit, the larger the size of the respective visual indication. For example, if the device is in a character-by-character selection mode, then the respective visual indication has a small size, if the device is in a word-by-word selection mode, then the respective visual indication has a medium size, and if the device is in a sentence-by-sentence selection mode, then the respective visual indication has a large size.

The above-described manner of displaying a visual indication of the selection mode (e.g., by displaying the visual indication with a size based on whether the device is in the first selection mode or in the second selection mode) provides a quick and efficient method of indicating the type of selection mode, which simplifies the interaction between the user and the electronic device and enhances the operability of the electronic device and makes the user-device interface more efficient (e.g., without requiring the user to select or de-select text to determine what selection mode the device is in, which reduces the number of inputs and amount of interaction time required to select content), which additionally reduces power usage and improves battery life of the electronic device by enabling the user to use the electronic device more quickly and efficiency, while reducing errors in the usage of the device.

In some embodiments, while receiving, via the one or more input devices, the user input comprising the movement of the input across the first set of one or more content sub-units of the first type, the electronic device displays (1778), via the display generation component, a respective visual indication corresponding to the movement of the input, such as painter element 1612 in FIG. 16C (e.g., displaying a respective visual indication that indicates the effective area of the selection or de-selection gesture). For example, the respective visual indication is a circular indicator in which content that falls within the circular indicator is either selected or de-selected as the case may be.

In some embodiments, in accordance with a determination that the selection operation comprises selecting respective content sub-units, the respective visual indication is displayed with a first appearance (1780), such as in FIG. 16C (e.g., if the device is in a selection mode (e.g., as opposed to de-selection mode), the respective visual indication has a visual characteristic having a first value). For example, if the device is in the selection mode, the respective visual indication has a first color or shading pattern.

In some embodiments, in accordance with a determination that the selection operation comprises deselecting respective content sub-units, the respective visual indication is displayed a second appearance that is different from the first appearance (1782), such as in FIG. 16O (e.g., if the device is in a de-selection mode, the respective visual indication has a visual characteristic having a second value).

For example, if the device is in the de-selection mode, the respective visual indication has a second color or shading pattern. Thus, in some embodiments, the appearance of the respective visual indication indicates whether the device is in selection mode or de-selection mode.

The above-described manner of displaying a visual indication of the selection mode (e.g., by displaying the visual indication with a visual characteristic based on whether the device is in the selection or de-selection mode) provides a quick and efficient method of indicating whether movement across content causes selection or de-selection, which simplifies the interaction between the user and the electronic device and enhances the operability of the electronic device and makes the user-device interface more efficient (e.g., without requiring the user to select or de-select text to determine what selection mode the device is in, which reduces the number of inputs and amount of interaction time required to select content), which additionally reduces power usage and improves battery life of the electronic device by enabling the user to use the electronic device more quickly and efficiency, while reducing errors in the usage of the device.

It should be understood that the particular order in which the operations in FIGS. 17A-17I have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300, and 1500) are also applicable in an analogous manner to method 1700 described above with respect to FIGS. 17A-17I. For example, the operation of the electronic device selecting units of content described above with reference to method 1700 optionally has one or more of the characteristics of selecting and providing for interaction with handwritten content, generating normalized shapes based on handwritten inputs, identifying actionable text within handwritten content, presenting tutorials for text manipulation operations, displaying visual feedback of text manipulation operations, etc., described herein with reference to other methods described herein (e.g., methods 700, 900, 1100, 1300, and 1500). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5I) or application specific chips. Further, the operations described above with reference to FIGS. 17A-17I are, optionally, implemented by components depicted in FIGS. 1A-1B. For example, displaying operations 1702, 1770, and 1778, and receiving operation 1704, are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology potentially involves the gathering and use of data available from specific and legitimate sources to facilitate the analysis and identification of handwritten inputs. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information, usage history, handwriting styles, etc.

The present disclosure recognizes that the use of such personal information data, in the present technology, can be used to the benefit of users. For example, the personal information data can be used to automatically perform operations with respect to interacting with the electronic device using a stylus (e.g., recognition of handwriting as text). Accordingly, use of such personal information data enables users to enter fewer inputs to perform an action with respect to handwriting inputs. Further, other uses for personal information data that benefit the user are also contemplated by the present disclosure. For instance, handwriting styles may be used to identify valid characters within handwritten content.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/ sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the user is able to configure one or more electronic devices to change the discovery or privacy settings of the electronic device. For example, the user can select a setting that only allows an electronic device to access certain of the user's handwriting entry history when analyzing handwritten content.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, handwriting can be recognized based on aggregated non-personal information data or a bare minimum amount of personal information, such as the handwriting being handled only on the user's device or other non-personal information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method, comprising:

at an electronic device in communication with a display generation component and one or more input devices:

displaying, via the display generation component, a user interface including a content entry region, wherein the content entry region includes a plurality of handwritten characters corresponding to a plurality of words, including a first word and a second word;

while displaying the user interface including the plurality of handwritten characters, receiving, via the one or more input devices, a user input directed to a respective handwritten character of the plurality of handwritten characters; and in response to receiving the user input, in accordance with a determination that the user input satisfies one or more selection criteria:

in accordance with a determination that the respective handwritten character corresponds to the first word, selecting one or more handwritten characters of the plurality of handwritten characters corresponding to the first word without selecting handwritten characters of the second word; and in accordance with a determination that the respective handwritten character corresponds to the second word, selecting one or more handwritten characters of the plurality of handwritten characters corresponding to the second word without selecting handwritten characters of the first word;

while displaying the plurality of handwritten characters corresponding to the plurality of words and while the one or more handwritten characters corresponding to the first word are selected, receiving, via the one or more input devices, a second user input that satisfies one or more first criteria followed by movement with respect to one or more respective handwritten characters that satisfies one or more second criteria; and in response to receiving the second user input:

in accordance with a determination that the one or more respective handwritten characters were not selected when the movement with respect to the one or more respective handwritten characters was received, selecting the one or more respective handwritten characters in addition to the one or more handwritten characters corresponding to the first word, wherein selecting the one or more respective handwritten characters in addition to the one or more handwritten characters corresponding to the first word includes selecting the one or more respective handwritten characters without selecting one or more second respective handwritten characters that are selectable and that are located between the one or more respective handwritten characters and the one or more handwritten characters corresponding to the first word that were selected when the movement with respect to the one or more respective handwritten characters was received.

2. The method of claim 1, wherein selecting first respective handwritten characters of a first respective word includes displaying one or more user interface elements in proximity to the first respective handwritten characters corresponding to the first respective word that are selectable and movable to select more or fewer handwritten characters of the plurality of handwritten characters.

3. The method of claim 2, wherein the plurality of handwritten characters includes the first respective handwritten characters and second respective handwritten characters on a first line and third respective handwritten characters on a second line, different from the first line, the method further comprising:

while displaying the one or more user interface elements that are selectable and movable to select more or fewer handwritten characters, receiving, via the one or more input devices, a third user input directed to a respective user interface element of the one or more user interface elements, including a selection input directed to the respective user interface element and a movement from a first location on the first line corresponding to the respective user interface element to a second location on the second line corresponding to the third respective handwritten characters; and in response to receiving the third user input:

in accordance with a determination that one or more criteria are satisfied, selecting the second respective handwritten characters and the third respective handwritten characters.

4. The method of claim 2, further comprising:

while displaying the one or more user interface elements that are selectable and movable to select more or fewer handwritten characters, receiving a third user input directed to a respective user interface element of the one or more user interface elements, including a selection input directed to the respective user interface element and a movement across one or more second respective handwritten characters, different from the first respective handwritten characters and handwritten content other than one or more handwritten characters; and in response to receiving the third user input, selecting the one or more second respective handwritten characters without selecting the handwritten content.

5. The method of claim 1, wherein:

in accordance with a determination that a speed of the movement with respect to the one or more respective handwritten characters is a first speed, the movement with respect to the one or more respective handwritten characters satisfies the one or more second criteria when the movement is within a first threshold distance from the one or more respective handwritten characters; and in accordance with a determination that the speed of the movement with respect to the one or more respective handwritten characters is a second speed, faster than the first speed, the movement with respect to the one or more respective handwritten characters satisfies the one or more second criteria when the movement is within a second threshold distance from the one or more respective handwritten characters, larger than the first threshold distance.

6. The method of claim 1, wherein the one or more respective handwritten characters are part of a respective word that also includes one or more third respective handwritten characters, the method further comprising:

in response to the second user input and without detecting movement across the one or more third respective handwritten characters, selecting the one or more third respective handwritten characters of the respective word.

7. The method of claim 1, wherein the one or more respective handwritten characters are part of a respective word that also includes one or more third respective handwritten characters, and selecting the one or more respective handwritten characters includes selecting the one or more respective handwritten characters without selecting the one or more third respective handwritten characters.

8. The method of claim 1, further comprising:

in response to receiving the second user input:

in accordance with a determination that the one or more respective handwritten characters were selected when the movement with respect to the one or more respective handwritten characters was received, ceasing selection of the one or more respective handwritten characters while maintaining the selection of the one or more handwritten characters corresponding to the first word.

9. The method of claim 1, further comprising:

while one or more respective handwritten characters are selected, receiving, via the one or more input devices, a third user input directed to the one or more respective handwritten characters, wherein the third user input includes a selection input and a movement while maintaining the selection input; and in response to receiving the third user input, moving the one or more respective handwritten characters in accordance with the movement of the third user input.

10. The method of claim 1, further comprising:

while one or more respective handwritten characters are selected, receiving a third user input corresponding to a further selection of the one or more respective handwritten characters; and in response to the third user input, displaying, via the display generation component, one or more selectable options for performing one or more respective operations with respect to the one or more respective handwritten characters.

11. The method of claim 10, further comprising:

while the one or more respective handwritten characters are selected, receiving, via the one or more input devices, a fourth user input selecting a respective selectable option of the one or more selectable options for performing a copying operation with respect to the one or more respective handwritten characters;

after receiving the fourth user input, receiving, via the one or more input devices, a fifth user input corresponding to a request to perform a pasting operation into a second content entry region; and in response to receiving the fifth user input:

in accordance with a determination that the second content entry region is a content entry region of a first type, inserting a representation of the one or more respective handwritten characters into the second content entry region; and in accordance with a determination that the second content entry region is a content entry region of a second type, different from the first type, inserting font-based text corresponding to the one or more respective handwritten characters in the second content entry region.

12. The method of claim 10, wherein the one or more selectable options include a first selectable option for copying a representation of the one or more respective handwritten characters, and a second selectable option for copying a transcription of the one or more respective handwritten characters.

13. The method of claim 10, wherein the one or more selectable options include a first selectable option for displaying a user interface element in the content entry region above the one or more respective handwritten characters that is selectable to move content, including the one or more respective handwritten characters, in the content entry region that is on a respective side of the user interface element.

14. The method of claim 1, wherein the plurality of words includes a first respective word and a second respective word in a same respective sentence, the method further comprising:

while first respective handwritten characters corresponding to the first respective word are selected, receiving, via the one or more input devices, a third user input directed to the first respective handwritten characters; and in response to receiving the third user input:

in accordance with a determination that the third user input satisfies the one or more selection criteria, selecting second respective handwritten characters corresponding to the second respective word in addition to the first respective handwritten characters corresponding to the first respective word.

15. The method of claim 1, further comprising:

in response to selecting the one or more respective handwritten characters in the content entry region, displaying a user interface element in the content entry region above the one or more respective handwritten characters;

while displaying the user interface element above the one or more respective handwritten characters, receiving a user input directed to the user interface element that includes movement; and in response to receiving the user input:

moving content in the content entry region that is on a respective side of the user interface element in accordance with the movement of the user input.

16. An electronic device, comprising:

one or more processors;

memory; and one or more programs, wherein the one or more programs are stored in the memory and configured to be executed by the one or more processors, the one or more programs including instructions for:

displaying, via a display generation component, a user interface including a content entry region, wherein the content entry region includes a plurality of handwritten characters corresponding to a plurality of words, including a first word and a second word;

while displaying the user interface including the plurality of handwritten characters, receiving, via one or more input devices, a user input directed to a respective handwritten character of the plurality of handwritten characters; and in response to receiving the user input, in accordance with a determination that the user input satisfies one or more selection criteria:

in accordance with a determination that the respective handwritten character corresponds to the first word, selecting one or more handwritten characters of the plurality of handwritten characters corresponding to the first word without selecting handwritten characters of the second word;

and in accordance with a determination that the respective handwritten character corresponds to the second word, selecting one or more handwritten characters of the plurality of handwritten characters corresponding to the second word without selecting handwritten characters of the first word;

while displaying the plurality of handwritten characters corresponding to the plurality of words and while the one or more handwritten characters corresponding to the first word are selected, receiving, via the one or more input devices, a second user input that satisfies one or more first criteria followed by movement with respect to one or more respective handwritten characters that satisfies one or more second criteria; and in response to receiving the second user input:

in accordance with a determination that the one or more respective handwritten characters were not selected when the movement with respect to the one or more respective handwritten characters was received, selecting the one or more respective handwritten characters in addition to the one or more handwritten characters corresponding to the first word, wherein selecting the one or more respective handwritten characters in addition to the one or more handwritten characters corresponding to the first word includes selecting the one or more respective handwritten characters without selecting one or more second respective handwritten characters that are selectable and that are located between the one or more respective handwritten characters and the one or more handwritten characters corresponding to the first word that were selected when the movement with respect to the one or more respective handwritten characters was received.

17. A non-transitory computer readable storage medium storing one or more programs, the one or more programs comprising instructions, which when executed by one or more processors of an electronic device, cause the electronic device to perform a method comprising:

displaying, via a display generation component, a user interface including a content entry region, wherein the content entry region includes a plurality of handwritten characters corresponding to a plurality of words, including a first word and a second word;

while displaying the user interface including the plurality of handwritten characters, receiving, via one or more input devices, a user input directed to a respective handwritten character of the plurality of handwritten characters; and in response to receiving the user input, in accordance with a determination that the user input satisfies one or more selection criteria:

in accordance with a determination that the respective handwritten character corresponds to the first word, selecting one or more handwritten characters of the plurality of handwritten characters corresponding to the first word without selecting handwritten characters of the second word;

and in accordance with a determination that the respective handwritten character corresponds to the second word, selecting one or more handwritten characters of the plurality of handwritten characters corresponding to the second word without selecting handwritten characters of the first word;

while displaying the plurality of handwritten characters corresponding to the plurality of words and while the one or more handwritten characters corresponding to the first word are selected, receiving, via the one or more input devices, a second user input that satisfies one or more first criteria followed by movement with respect to one or more respective handwritten characters that satisfies one or more second criteria; and in response to receiving the second user input:

in accordance with a determination that the one or more respective handwritten characters were not selected when the movement with respect to the one or more respective handwritten characters was received, selecting the one or more respective handwritten characters in addition to the one or more handwritten characters corresponding to the first word, wherein selecting the one or more respective handwritten characters in addition to the one or more handwritten characters corresponding to the first word includes selecting the one or more respective handwritten characters without selecting one or more second respective handwritten characters that are selectable and that are located between the one or more respective handwritten characters and the one or more handwritten characters corresponding to the first word that were selected when the movement with respect to the one or more respective handwritten characters was received.

18. The electronic device of claim 16, wherein selecting first respective handwritten characters of a first respective word includes displaying one or more user interface elements in proximity to the first respective handwritten characters corresponding to the first respective word that are selectable and movable to select more or fewer handwritten characters of the plurality of handwritten characters.

19. The electronic device of claim 18, wherein the plurality of handwritten characters includes the first respective handwritten characters and second respective handwritten characters on a first line and third respective handwritten characters on a second line, different from the first line, the one or more programs further including instructions for:

while displaying the one or more user interface elements that are selectable and movable to select more or fewer handwritten characters, receiving, via the one or more input devices, a third user input directed to a respective user interface element of the one or more user interface elements, including a selection input directed to the respective user interface element and a movement from a first location on the first line corresponding to the respective user interface element to a second location on the second line corresponding to the third respective handwritten characters; and in response to receiving the third user input:

in accordance with a determination that one or more criteria are satisfied, selecting the second respective handwritten characters and the third respective handwritten characters.

20. The electronic device of claim 18, the one or more programs further including instructions for:

while displaying the one or more user interface elements that are selectable and movable to select more or fewer handwritten characters, receiving a third user input directed to a respective user interface element of the one or more user interface elements, including a selection input directed to the respective user interface element and a movement across one or more second respective handwritten characters, different from the first respective handwritten characters and handwritten content other than one or more handwritten characters; and in response to receiving the third user input, selecting the one or more second respective handwritten characters without selecting the handwritten content.

21. The electronic device of claim 16, wherein:

in accordance with a determination that a speed of the movement with respect to the one or more respective handwritten characters is a first speed, the movement with respect to the one or more respective handwritten characters satisfies the one or more second criteria when the movement is within a first threshold distance from the one or more respective handwritten characters; and in accordance with a determination that the speed of the movement with respect to the one or more respective handwritten characters is a second speed, faster than the first speed, the movement with respect to the one or more respective handwritten characters satisfies the one or more second criteria when the movement is within a second threshold distance from the one or more respective handwritten characters, larger than the first threshold distance.

22. The electronic device of claim 16, wherein the one or more respective handwritten characters are part of a respective word that also includes one or more third respective handwritten characters, the one or more programs further including instructions for:

in response to the second user input and without detecting movement across the one or more third respective handwritten characters, selecting the one or more third respective handwritten characters of the respective word.

23. The electronic device of claim 16, wherein the one or more respective handwritten characters are part of a respective word that also includes one or more third respective handwritten characters, and selecting the one or more respective handwritten characters includes selecting the one or more respective handwritten characters without selecting the one or more third respective handwritten characters.

24. The electronic device of claim 16, the one or more programs further including instructions for:

in response to receiving the second user input:

in accordance with a determination that the one or more respective handwritten characters were selected when the movement with respect to the one or more respective handwritten characters was received, ceasing selection of the one or more respective handwritten characters while maintaining the selection of the one or more handwritten characters corresponding to the first word.

25. The electronic device of claim 16, the one or more programs further including instructions for:

while one or more respective handwritten characters are selected, receiving, via the one or more input devices, a third user input directed to the one or more respective handwritten characters, wherein the third user input includes a selection input and a movement while maintaining the selection input; and in response to receiving the third user input, moving the one or more respective handwritten characters in accordance with the movement of the third user input.

26. The electronic device of claim 16, the one or more programs further including instructions for:

while one or more respective handwritten characters are selected, receiving a third user input corresponding to a further selection of the one or more respective handwritten characters; and in response to the third user input, displaying, via the display generation component, one or more selectable options for performing one or more respective operations with respect to the one or more respective handwritten characters.

27. The electronic device of claim 26, the one or more programs further including instructions for:

while the one or more respective handwritten characters are selected, receiving, via the one or more input devices, a fourth user input selecting a respective selectable option of the one or more selectable options for performing a copying operation with respect to the one or more respective handwritten characters;

after receiving the fourth user input, receiving, via the one or more input devices, a fifth user input corresponding to a request to perform a pasting operation into a second content entry region; and in response to receiving the fifth user input:

in accordance with a determination that the second content entry region is a content entry region of a first type, inserting a representation of the one or more respective handwritten characters into the second content entry region; and in accordance with a determination that the second content entry region is a content entry region of a second type, different from the first type, inserting font-based text corresponding to the one or more respective handwritten characters in the second content entry region.

28. The electronic device of claim 26, wherein the one or more selectable options include a first selectable option for copying a representation of the one or more respective handwritten characters, and a second selectable option for copying a transcription of the one or more respective handwritten characters.

29. The electronic device of claim 26, wherein the one or more selectable options include a first selectable option for displaying a user interface element in the content entry region above the one or more respective handwritten characters that is selectable to move content, including the one or more respective handwritten characters, in the content entry region that is on a respective side of the user interface element.

30. The electronic device of claim 16, wherein the plurality of words includes a first respective word and a second respective word in a same respective sentence, the one or more programs further including instructions for:

while first respective handwritten characters corresponding to the first respective word are selected, receiving, via the one or more input devices, a third user input directed to the first respective handwritten characters; and in response to receiving the third user input:

in accordance with a determination that the third user input satisfies the one or more selection criteria, selecting second respective handwritten characters corresponding to the second respective word in addition to the first respective handwritten characters corresponding to the first respective word.

31. The electronic device of claim 16, the one or more programs further including instructions for:

in response to selecting the one or more respective handwritten characters in the content entry region, displaying a user interface element in the content entry region above the one or more respective handwritten characters;

while displaying the user interface element above the one or more respective handwritten characters, receiving a user input directed to the user interface element that includes movement; and in response to receiving the user input:

moving content in the content entry region that is on a respective side of the user interface element in accordance with the movement of the user input.

32. The non-transitory computer readable storage medium of claim 17, wherein selecting first respective handwritten characters of a first respective word includes displaying one or more user interface elements in proximity to the first respective handwritten characters corresponding to the first respective word that are selectable and movable to select more or fewer handwritten characters of the plurality of handwritten characters.

33. The non-transitory computer readable storage medium of claim 32, wherein the plurality of handwritten characters includes the first respective handwritten characters and second respective handwritten characters on a first line and third respective handwritten characters on a second line, different from the first line, the method further comprising:

while displaying the one or more user interface elements that are selectable and movable to select more or fewer handwritten characters, receiving, via the one or more input devices, a third user input directed to a respective user interface element of the one or more user interface elements, including a selection input directed to the respective user interface element and a movement from a first location on the first line corresponding to the respective user interface element to a second location on the second line corresponding to the third respective handwritten characters; and in response to receiving the third user input:

in accordance with a determination that one or more criteria are satisfied, selecting the second respective handwritten characters and the third respective handwritten characters.

34. The non-transitory computer readable storage medium of claim 32, the method further comprising:

while displaying the one or more user interface elements that are selectable and movable to select more or fewer handwritten characters, receiving a third user input directed to a respective user interface element of the one or more user interface elements, including a selection input directed to the respective user interface element and a movement across one or more second respective handwritten characters, different from the first respective handwritten characters and handwritten content other than one or more handwritten characters; and in response to receiving the third user input, selecting the one or more second respective handwritten characters without selecting the handwritten content.

35. The non-transitory computer readable storage medium of claim 17, wherein:

in accordance with a determination that a speed of the movement with respect to the one or more respective handwritten characters is a first speed, the movement with respect to the one or more respective handwritten characters satisfies the one or more second criteria when the movement is within a first threshold distance from the one or more respective handwritten characters; and in accordance with a determination that the speed of the movement with respect to the one or more respective handwritten characters is a second speed, faster than the first speed, the movement with respect to the one or more respective handwritten characters satisfies the one or more second criteria when the movement is within a second threshold distance from the one or more respective handwritten characters, larger than the first threshold distance.

36. The non-transitory computer readable storage medium of claim 17, wherein the one or more respective handwritten characters are part of a respective word that also includes one or more third respective handwritten characters, the method further comprising:

in response to the second user input and without detecting movement across the one or more third respective handwritten characters, selecting the one or more third respective handwritten characters of the respective word.

37. The non-transitory computer readable storage medium of claim 17, wherein the one or more respective handwritten characters are part of a respective word that also includes one or more third respective handwritten characters, and selecting the one or more respective handwritten characters includes selecting the one or more respective handwritten characters without selecting the one or more third respective handwritten characters.

38. The non-transitory computer readable storage medium of claim 17, the method further comprising:

in response to receiving the second user input:

in accordance with a determination that the one or more respective handwritten characters were selected when the movement with respect to the one or more respective handwritten characters was received, ceasing selection of the one or more respective handwritten characters while maintaining the selection of the one or more handwritten characters corresponding to the first word.

39. The non-transitory computer readable storage medium of claim 17, the method further comprising:

while one or more respective handwritten characters are selected, receiving, via the one or more input devices, a third user input directed to the one or more respective handwritten characters, wherein the third user input includes a selection input and a movement while maintaining the selection input; and in response to receiving the third user input, moving the one or more respective handwritten characters in accordance with the movement of the third user input.

40. The non-transitory computer readable storage medium of claim 17, the method further comprising:

while one or more respective handwritten characters are selected, receiving a third user input corresponding to a further selection of the one or more respective handwritten characters; and in response to the third user input, displaying, via the display generation component, one or more selectable options for performing one or more respective operations with respect to the one or more respective handwritten characters.

41. The non-transitory computer readable storage medium of claim 40, the method further comprising:

while the one or more respective handwritten characters are selected, receiving, via the one or more input devices, a fourth user input selecting a respective selectable option of the one or more selectable options for performing a copying operation with respect to the one or more respective handwritten characters;

after receiving the fourth user input, receiving, via the one or more input devices, a fifth user input corresponding to a request to perform a pasting operation into a second content entry region; and in response to receiving the fifth user input:

in accordance with a determination that the second content entry region is a content entry region of a first type, inserting a representation of the one or more respective handwritten characters into the second content entry region; and in accordance with a determination that the second content entry region is a content entry region of a second type, different from the first type, inserting font-based text corresponding to the one or more respective handwritten characters in the second content entry region.

42. The non-transitory computer readable storage medium of claim 40, wherein the one or more selectable options include a first selectable option for copying a representation of the one or more respective handwritten characters, and a second selectable option for copying a transcription of the one or more respective handwritten characters.

43. The non-transitory computer readable storage medium of claim 40, wherein the one or more selectable options include a first selectable option for displaying a user interface element in the content entry region above the one or more respective handwritten characters that is selectable to move content, including the one or more respective handwritten characters, in the content entry region that is on a respective side of the user interface element.

44. The non-transitory computer readable storage medium of claim 17, wherein the plurality of words includes a first respective word and a second respective word in a same respective sentence, the method further comprising:

while first respective handwritten characters corresponding to the first respective word are selected, receiving, via the one or more input devices, a third user input directed to the first respective handwritten characters; and in response to receiving the third user input:

in accordance with a determination that the third user input satisfies the one or more selection criteria, selecting second respective handwritten characters corresponding to the second respective word in addition to the first respective handwritten characters corresponding to the first respective word.

45. The non-transitory computer readable storage medium of claim 17, the method further comprising:

in response to selecting the one or more respective handwritten characters in the content entry region, displaying a user interface element in the content entry region above the one or more respective handwritten characters;

while displaying the user interface element above the one or more respective handwritten characters, receiving a user input directed to the user interface element that includes movement; and in response to receiving the user input:

moving content in the content entry region that is on a respective side of the user interface element in accordance with the movement of the user input.

* * * * *